US010491575B2

(12) United States Patent
Verzun et al.

(10) Patent No.: US 10,491,575 B2
(45) **Date of Patent: *Nov. 26, 2019**

(54) SECURE DYNAMIC COMMUNICATION NETWORK AND PROTOCOL

(71) Applicant: Listat Ltd., Kiev (UA)

(72) Inventors: Ievgen Verzun, Kiev (UA); Oleksandr Holub, Kiev (UA); Richard K. Williams, Cupertino, CA (US)

(73) Assignee: LISTAT LTD. (BZ)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,863

(22) Filed: Apr. 6, 2018

(65) Prior Publication Data

US 2018/0241727 A1 Aug. 23, 2018

Related U.S. Application Data

(63) Continuation of application No. 14/803,869, filed on Jul. 20, 2015, now Pat. No. 9,998,434.

(Continued)

(51) Int. Cl.

*H04L 29/06* (2006.01)
*H04L 9/06* (2006.01)

(Continued)

(52) U.S. Cl.

CPC ........ *H04L 63/0464* (2013.01); *G06F 21/606* (2013.01); *H04L 9/0662* (2013.01); *H04L 9/34* (2013.01); *H04L 63/102* (2013.01)

(58) Field of Classification Search

CPC ......... H04L 45/38; H04L 45/42; H04L 45/64; H04L 45/745; H04L 49/3009; H04L 63/0464; H04L 63/102; H04L 9/0662; H04L 9/34; H04L 41/08; H04L 65/102; H04L 65/1069; G06F 21/606; G06F 8/61;

(Continued)

(56) References Cited

U.S. PATENT DOCUMENTS 5,321,748 A 6/1994 Zeidler et al.
7,069,438 B2 * 6/2006 Balabine ................ A63F 13/12 713/151

(Continued)

FOREIGN PATENT DOCUMENTS

EP 1802119 A1 6/2007

OTHER PUBLICATIONS

Menezes, Handbook of Applied Cryptography.

(Continued)

*Primary Examiner* — Abiy Getachew
(74) *Attorney, Agent, or Firm* — Patentability Associates; David E. Steuber

(57) ABSTRACT

In a secure cloud for transmitting packets of digital data, the packets may be repeatedly scrambled (i.e., their data segments reordered) and then unscrambled, split and then mixed, and/or encrypted and then decrypted as they pass through media nodes in the cloud. The methods used to scramble, split, mix and encrypt the packets may be varied in accordance with a state such as time, thereby making the task of a hacker virtually impossible inasmuch as he or she may be viewing only a fragment of a packet and the methods used to disguise the data are constantly changing.

70 Claims, 271 Drawing Sheets

| Layer | IPv6 Packet Field | | Size | | Function | |
|---|---|---|---|---|---|---|
| 3 | Version | Traffic Class | 4b | 8b | Binary 0110 sets IP to version 6 | 6b differentiated services & 2b ECN |
| 3 | Flow Label | | 20b | | Maintains path to avoid reordering in real-time applications | |
| 3 | Payload Length | | 2B | | Payload size in octets, including any extension headers | |
| 3 | Next Header | | 1B | | Specifies the type of next header, same as IPv4 protocol field | |
| 3 | Hop Limit | | 1B | | Replaces IPv4 time to live field, decrements by 1 for each node passed | |
| 3 | Source Address | | 16B | | The IPv6 address of the sending node | |
| 3 | Destination Address | | 16B | | The IPv6 address of the destination node(s) | |

Related U.S. Application Data

(60) Provisional application No. 62/107,650, filed on Jan. 26, 2015.

(51) Int. Cl.
*G06F 21/60* (2013.01)
*H04L 9/34* (2006.01)

(58) Field of Classification Search
CPC ............. H04N 21/435; H04N 21/4351; H04N 21/443; H04N 21/8166; H04N 5/4401; H04W 28/12; H04W 4/06; H04W 84/12; H04W 88/16
See application file for complete search history.

(56) References Cited

U.S. PATENT DOCUMENTS 8,204,217 B2 6/2012 Bjorkengren et al.
9,386,116 B2 * 7/2016 Li ........................... H04L 12/14
9,628,579 B2 * 4/2017 Li ........................... H04L 12/14
2002/0003881 A1 1/2002 Reitmeier et al.
2004/0160903 A1 8/2004 Gai et al.
2009/0136034 A1 5/2009 Gaal et al.
2009/0153747 A1 6/2009 Grimes
2009/0169001 A1 7/2009 Tighe et al.
2011/0280143 A1 * 11/2011 Li ........................... H04L 12/14 370/252
2011/0280153 A1 * 11/2011 Li ........................... H04L 12/14 370/254
2012/0166582 A1 6/2012 Binder
2012/0216034 A1 8/2012 Chen et al.
2012/0297111 A1 11/2012 Hsu et al.
2013/0041931 A1 2/2013 Brand
2016/0219024 A1 * 7/2016 Verzun .................. H04L 63/102

OTHER PUBLICATIONS

Schneier, Applied Cryptography.
Matalas, Yannis et al., A Scalable Framework for Content Replication in Multicast-Based Content Distribution Networks; Walter Didimo et al.: 18th international conference on medical image computing and computer-assisted intervention, Oct. 25, 2006.

* cited by examiner

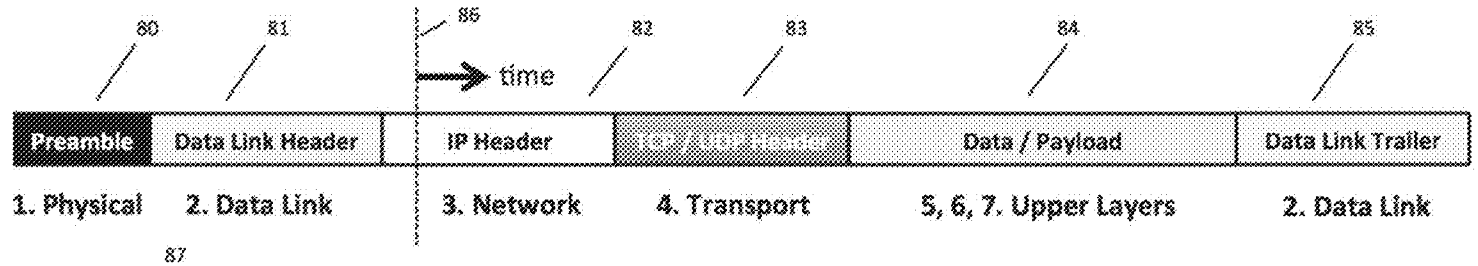

87

| OSI Layer | Data Type | Current Examples |
|---|---|---|
| 7. Application | Data (Upper Layers, App Layers, Payload) | Telnet, files (FTP, SFTP, FTAM, ZIP), email (SMTP, IMAP, POP3), web (DNS, HTTP, Safari, Firefox, Chrome, etc.), coms (SIP, IRC, NNTP, OTT), network mgmt (SNMP, DHCP, BGP, LDAP, CMIP), drivers (printer, scanner, camera), backup (NFS, online, custom) |
| 6. Presentation | | text (ASCII, EBCDIC, ZIP), graphics (PNG, JPG, GIF, BMP), sound & video (MP4, WMV, MOV, AVI, MIDI), documents (PDF, DOC, PPT, HTML, XML, MIME), streaming (RTP, RTSP, RTMP), encryption (TLS/SSL, SSH) |
| 5. Session | | SOCKS, RPC, authentication, full/half duplex, simplex |
| 4. Transport | Segments, datagram | UDP, TCP, DCCP, VPN (GRE, PPTP, SSTM, SSH...), LCM |
| 3. Network | Packet, datagram | IP, ICMP, IGMP |
| 2. Data Link | Bit, frame, VLAN (802.1Q) | 802.11, 802.3, ATM, PPP, HSUPA, LTE, DOCSIS, LLC |
| 1. Physical (PHY) | Electrical, optical & RF signals (incl. bit streams) | WiFi, Ethernet, Serial, Parallel, Fiber, T1, 4G, Cable, Cu wire, RF Broadcast (FM, TV, DAB, DMB), Bluetooth, Bits |

Figure 4

OSI Layer 1 : Physical, *"last mile"*

OSI Layer 2 : Data Link (Hub Architecture)

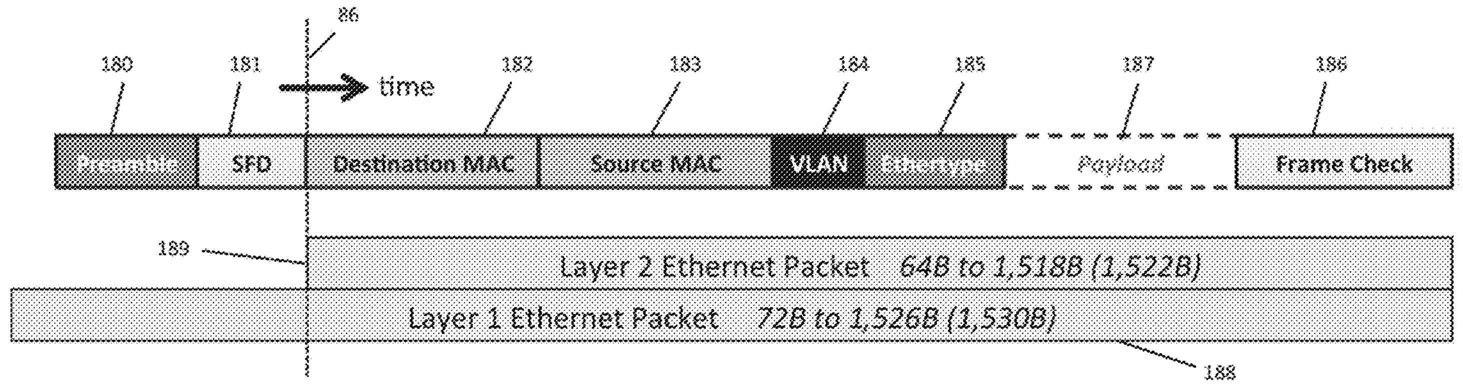

190

OSI Layers 1 & 2 : Data Link for Ethernet Packets (IEEE 802.3)

| Layer | Packet Field | Size | Function |
|---|---|---|---|
| 1 | **Preamble** | 7B | Data frame header |
| 1 | **SFD** | 1B | Synchronize hardware devices (start frame delimiter) |
| 2 | **Destination MAC** | 6B | Media Access Control (MAC) destination address on LAN |
| 2 | **Source MAC** | 6B | Media Access Control (MAC) source address on LAN |
| 2 | **VLAN** | (4B) | 802.1Q tag (optional) |
| 2 | **Ethertype** | 2B | Type of data link (Ethernet II) or length (IEEE 802.3) |
| 2–7 | **Payload** | 42B – 1500B | Content of packet (including network, IP, app info & data) |
| 2 | **Frame Check** | 4B | Checksum of entire packet (32-bit CRC data link trailer) |

Figure 9

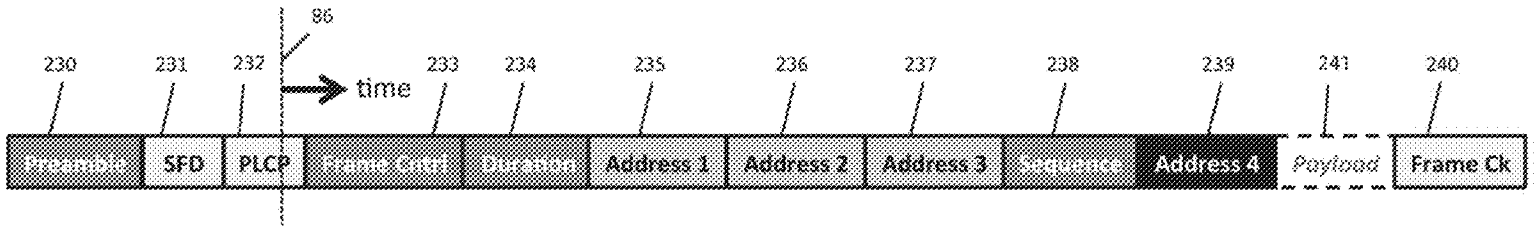

OSI Layers 1 & 2 : Data Link for WLAN Packets (WiFi, IEEE 802.11, etc.)

242

| Layer | Packet Field | Size | Function |
|---|---|---|---|
| 1 | **Preamble** | 10B | Data frame header |
| 1 | **SFD** | 2B | Synchronize hardware devices (start frame delimiter) |
| 1-2 | **PLCP** | 2B | Physical layer convergence procedure (length, rate, header error ck) |
| 2 | **Frame Control** | 2B | Version Type (Management, Control, Data, Reserved) |
| 2 | **Duration & ID** | 2B | NAV duration (except in power save mode, then Station ID) |
| 2 | **Address 1** | 6B | BSS receiving station address (depends on To DS / From DS setting) |
| 2 | **Address 2** | 6B | BSS transmitting station address (depends on To DS / From DS) |
| 2 | **Address 3** | 6B | Conditional address (depends on To DS / From DS setting) |
| 2 | **Sequence Cntrl** | 2B | Sequence & fragment number defining the packet frame |
| 2 | **Address 4** | 6B | Source station address in WDS (wireless distribution system) mode |
| 2–7 | **Payload** | 0 – 2312B | Content of packet (including network, IP, app info & data) |
| 2 | **Frame Check** | 4B | Checksum of entire packet (32-bit CRC data link trailer) |

Figure 11

IPv4 Internet Protocol

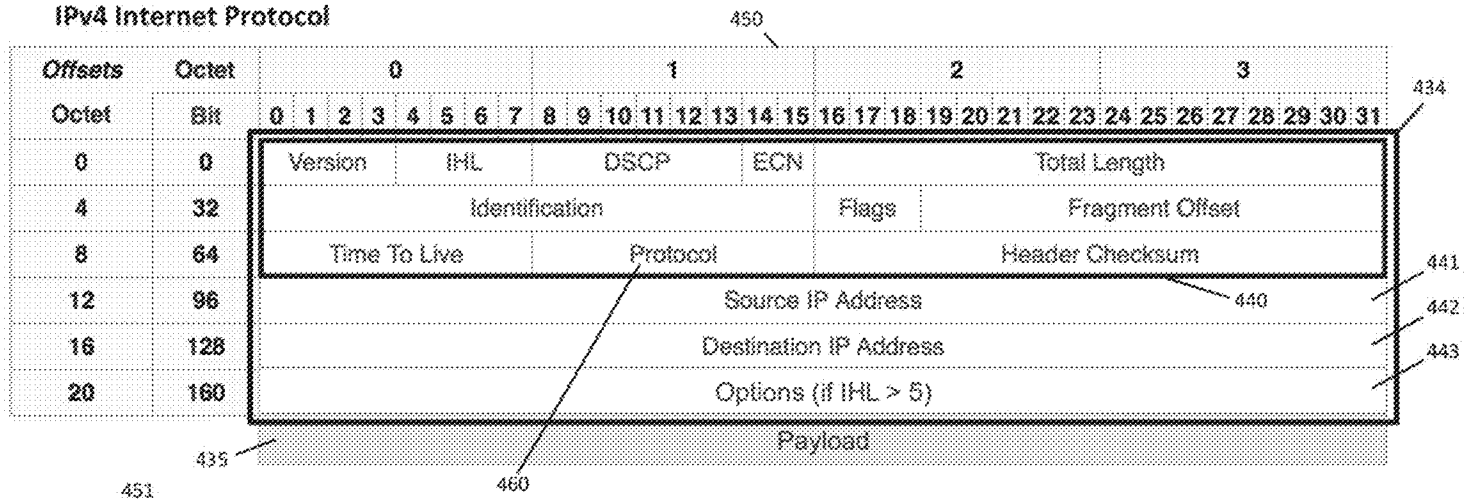

451

| Layer | IPv4 Packet Field | | Size | | Function | |
|---|---|---|---|---|---|---|
| 3 | Version | IHL | 4b | 4b | Binary 0100 sets IP to version 4 | # of 32b words in header 20 to 60B |
| 3 | DSCP | ECN | 6b | 2b | Differentiated services for QoS | Explicit network congestion notice |
| 3 | Total Length | | 2B | | Length of IP packet incl. header and data, 20B to 65,535B | |
| 3 | Identification | | 2B | | Uniquely identifies a group of fragments of a single IP datagram | |
| 3 | Flags | Frag Offset | 3b | 13b | Flags to manage fragmentation | Fragment offset from packet start |
| 3 | TTL | Protocol | 1B | 1B | Time-to-live to prevent immortals | Describes type of IP payload |
| 3 | Header Checksum | | 2B | | 16-bit checksum used for header error-checking, drops error packets | |
| 3 | Source Address | | 4B | | IPv4 address of the sender of the packet, NAT may change IP address | |
| 3 | Destination Address | | 4B | | IPv4 address of the receiver of the packet, NAT may change IP address | |
| 3 | Options (if IHL > 5) | | 4B | | Infrequently used field, subject to security risks, active for IHL = 6 to 15 | |

Figure 23

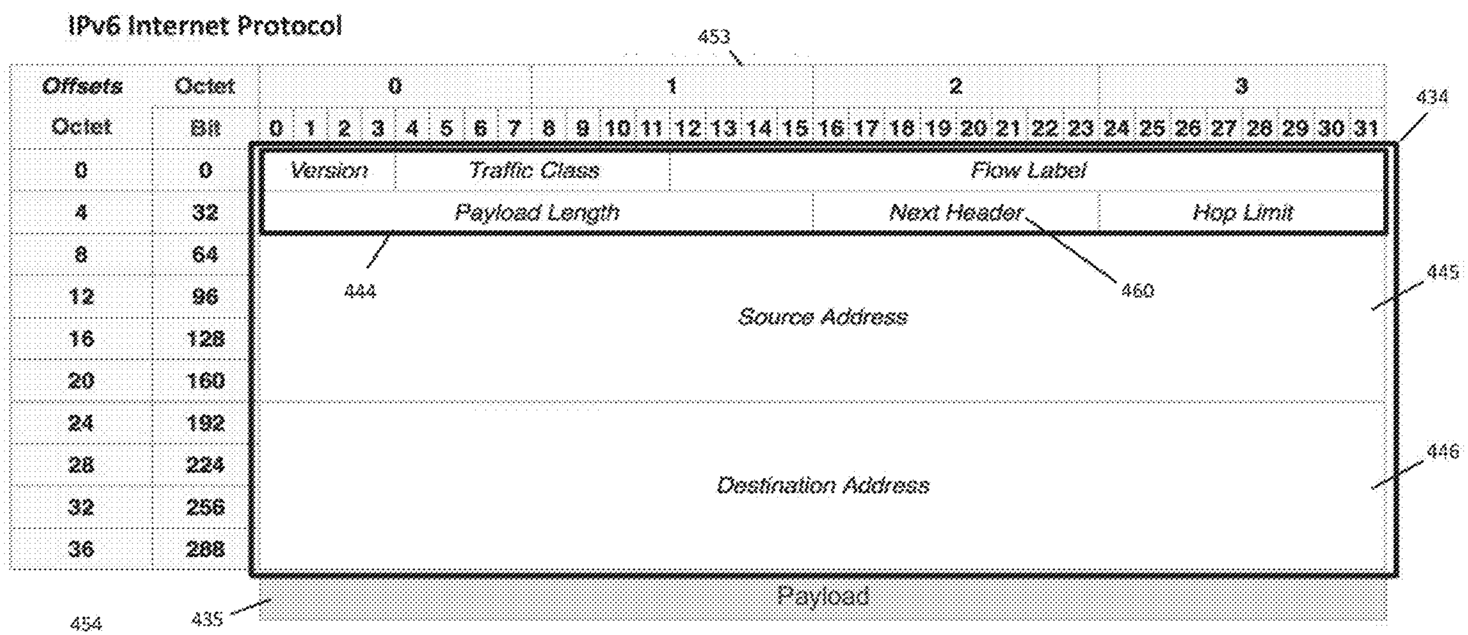

| Layer | IPv6 Packet Field | | Size | | Function | |
|---|---|---|---|---|---|---|
| 3 | Version | Traffic Class | 4b | 8b | Binary 0110 sets IP to version 6 | 6b differentiated services & 2b ECN |
| 3 | Flow Label | | 20b | | Maintains path to avoid reordering in real-time applications | |
| 3 | Payload Length | | 2B | | Payload size in octets, including any extension headers | |
| 3 | Next Header | | 1B | | Specifies the type of next header, same as IPv4 protocol field | |
| 3 | Hop Limit | | 1B | | Replaces IPv4 time to live field, decrements by 1 for each node passed | |
| 3 | Source Address | | 16B | | The IPv6 address of the sending node | |
| 3 | Destination Address | | 16B | | The IPv6 address of the destination node(s) | |

| Layer | TCP Field | Size | TCP Function |
|---|---|---|---|
| 4 | **Source Port** | 2B | Senders port, port for which reply should be sent |
| 4 | **Destination Port** | 2B | Receiver's port (required), well known port # if server |
| 4 | **Sequence Number** | 4B | Packet counter (SEQ #) incrementing each ACK reply by one |
| 4 | **Acknowledgement #** | 4B | Acknowledges receipt of each packet in a sequence by sequence # |
| 4 | **Offset** | 4b | Size of TCP header (offset from TCP header to data start), 20B to 60B |
| 4 | **Reserved** | 3b | Reserved for future, default to 000 binary |
| 4 | **Flags** | 9b | Control bits for congestion, urgency, acknowledgement, sync & reset |
| 4 | **Window Size** | 2B | Size of the receive window |
| 4 | **Checksum** | 2B | Error checking comprising 16b checksum of header and payload data |
| 4 | **Urgent Pointer** | 2B | Offset from SEQ # indicating last urgent data byte (if URG is set to 1) |
| 4 | **Options** | 1B to 40B | Option- Kind (1B required), Length (1B option), Data (var), as per Offset |
| 4–7 | **TCP Payload** | variable | TCP payload data |

Figure 28B

OSI Layer 4 : Transport (UDP)

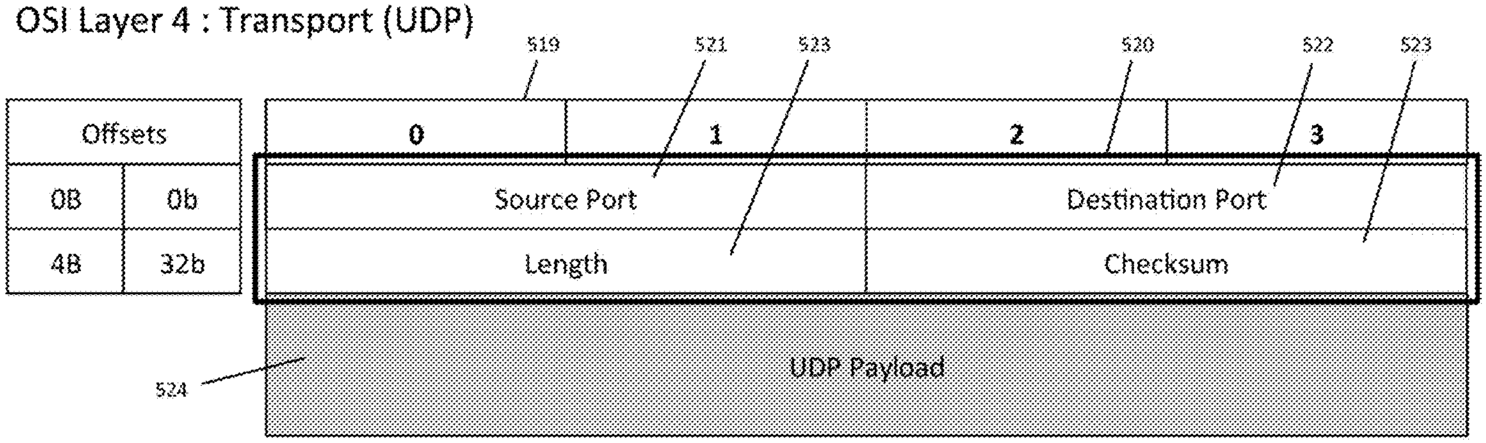

525

| Layer | UDP Field | Size | Function |
|---|---|---|---|
| 4 | **Source Port** | 2B | Senders port, port for which reply should be sent |
| 4 | **Destination Port** | 2B | Receiver's port (required), well known port # if server |
| 4 | **Length** | 2B | Total length of UDP header and payload, 8B to 65,535B |
| 4 | **Checksum** | 2B | Error checking, required in IPv6, uses pseudo-header in IPv4 and IPv6 |
| 4–7 | **UDP Payload** | variable | UDP payload data, 0B to 65,507B in IPv4 |

| Port # | UDP | TCP | Port Description | Registered |
|---|---|---|---|---|
| 7 | UDP | TCP | Echo/Ping (generally superseded by ICMP) | Official |
| 20 | UDP | TCP | FTP Data Transfer | Official |
| 21 | -- | TCP | FTP Control (command) | Official |
| 22 | UDP | TCP | Secure shell (SSH) for secure login (SCP), SFTP, port forwarding | Official |
| 23 | UDP | TCP | Telnet | Official |
| 25 | -- | TCP | Simple Mail Transfer (SMTP) | Official |
| 26 | UDP | TCP | Encrypted SMTP | Official |
| 53 | UDP | TCP | Domain Name Server (DNS) | Official |
| 80 | -- | TCP | Hypertext Transfer Protocol (HTTP) | Official |
| 110 | -- | TCP | Post Office Protocol (POP3) | Official |
| 143 | -- | TCP | Internet Mail Access Protocol (IMAP) | Official |
| 220 | UDP | TCP | Internet Mail Access Protocol (IMAP v3) | Official |
| 443 | -- | TCP | Hypertext Transfer Protocol over TLS/SSL (HTTPS) | Official |
| 465 | -- | TCP | Simple Mail Transfer Protocol over TLS/SSL (SMTPS) | Official |
| 989 | UDP | TCP | FTPS Protocol (data): FTP over TLS/SSL | Official |
| 990 | UDP | TCP | FTPS Protocol (control): FTP over TLS/SSL | Official |
| 992 | UDP | TCP | TELNET protocol over TLS/SSL | Official |
| 993 | -- | TCP | Internet Message Access Protocol over TLS/SSL (IMAPS) | Official |
| 995 | -- | TCP | Post Office Protocol 3 over TLS/SSL (POP3S) | Official |

| Port Number | UDP | TCP | Port Description | Registered |
|---|---|---|---|---|
| 0 to 1,023 | UDP | TCP | System Ports | Generally |
| 1,024 to 49,151 | UDP | TCP | Registered Ports, Open (Dynamic) Ports | Mixed |
| 49,152 to 65,535 | UDP | TCP | Open (Dynamic), Private and Ephemeral Ports | No |

Figure 31D

OSI Layer 7 : Content Download via FTP

OSI Layer 7 : web page download via HTTP

* pseudo-address PA disguises real device ID

Sub-packet A
Sub-packet B
Sub-packet C
Mixing
Parse
slot
Sub-packet D
Sub-packet E
Sub-packet F
1091
1094
1097
1092

SDNP Nodal Function of Meshed Re-Packeting

Single-Route Unscrambled Decryption

Meshed SDNP Gateway Input

Scrambled Encrypted SDNP Gateway Input

Unscrambled Decrypted SDNP Gateway Output

1279

| Time In | Source Nodes | Receiving Nodes | Inbound Packet | Time Last Encrypted | Time Last Scrambled | Last Meshed | Outbound Packet |
|---|---|---|---|---|---|---|---|
| $t_3$ | $M_{a,b}$ | $M_{a,s}$ | 1A (1262A) | $t_2$ | $t_1$ or $t_2$ | $t_2$ | 1A (1263A) |
| $t_3$ | $M_{a,b}$ | $M_{a,d}$ | 1B (1262B) | $t_2$ | $t_1$ or $t_2$ | $t_2$ | 1B 1C 1F (1263B) |
| $t_3$ | $M_{a,j}$ | $M_{a,d}$ | 1C 1F (1262C) | $t_2$ | $t_1$ or $t_2$ | $t_2$ | |
| $t_3$ | $M_{a,j}$ | $M_{a,f}$ | 1D (1262D) | $t_2$ | $t_1$ or $t_2$ | $t_2$ | 1D 1E (1263C) |
| $t_3$ | $M_{a,h}$ | $M_{a,f}$ | 1E (1262E) | $t_2$ | $t_1$ or $t_2$ | $t_2$ | |

Figure 91B

SDNP Client Interface

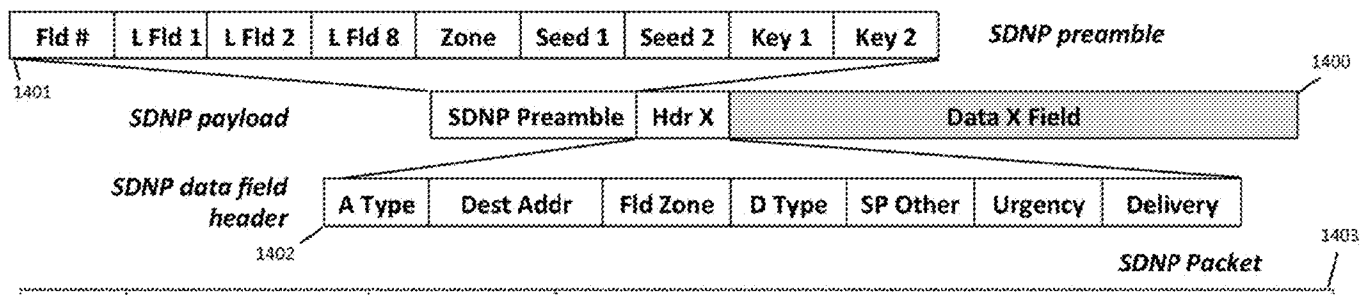

| Layer | Packet Field | Size | Function |
|---|---|---|---|
| 3 | **Field #** | 4b | Number of Fields |
| 3 | **L Field 1, 2, X** | 8B | Length of Data Field1, 2, ..., 8 |
| 3 | **Zone** | 12b | Current SDNP zone (one of 4096 zones) |
| 5 | **Seed 1, 2** | 8B, 8B | Two 32 bit seeds (for scrambling, mixing, etc.) |
| 6 | **Key 1, 2** | 64B, 64B | Two 512 bit keys (for encryption) |
| 3 | **A (Address) Type** | 2b | Type of Destination Address (SDNP Zip, IPv4, IPv6, NAT, POTS #) |
| 3 | **Destination Addr** | 1B to 12B | IP Address, SDNP address, NAT address, SDNP ZIP, phone # |
| 3 | **Field Zone** | 12b | SDNP zone carry-forward (one of 4096 zones) |
| 4 | **D (Data) Type** | 2b | Type of Data (voice, text, video, data, software...) |
| 6 | **Field Other** | 8B | Field expansion, Field unscrambling info, etc. |
| 4 | **Urgency** | 2b | Urgency of sub-packet (snail, normal, priority, urgent) |
| 4 | **Delivery** | 2b | QoS Marker (Normal, Redundant, Special, VIP...) |
| 5 to 7 | **Data in Packet X** | 0 to 200B | Data up to 200B per sub-packet, 8 sub-packet max |

Figure 114

Command & Control Signal Packets (Path 1-2)

SDNP Packet Race Routing

| Parameter | OTT | VPN | PTP | SDNP |
|---|---|---|---|---|
| Source Addr | Visible | Encrypted | Visible | None (NAT) |
| Destination Addr | Visible | Encrypted | Visible | None (NAT) |
| Encrypted Payload | Static (Optional) | Static (Optional) | Static (Optional) | Dynamic |
| Scrambled Payload | No | No | No | Dynamic |
| Meshed Routing | No | No | No | Dynamic |
| Routing Nodes | Internet Servers | Dedicated Servers | Users | Dedicated Servers |
| Delay | Uncontrolled | Single Route | Minimal Control | Dynamic Minimum |

Figure 135

SECURE DYNAMIC COMMUNICATION NETWORK AND PROTOCOL

CROSS-REFERENCE TO RELATED APPLICATIONS

This application is a continuation of application Ser. No. 14/803,869, filed Jul. 20, 2015, which claims the priority of Provisional Application No. 62/107,650, filed Jan. 26, 2015, each of which is incorporated herein by reference in its entirety.

FIELD OF THE INVENTION

This invention relates to communication networks including methods and apparatus designed to optimize performance and quality of service, insure data integrity, maximize system uptime and network stability, and maintain privacy and security.

BACKGROUND OF THE INVENTION

Improving means of communication have fueled the progress of civilization from mankind's earliest beginnings. From the use of couriers and messengers traveling by foot or horseback; through mail postal delivery by train, truck and airplane; to the advent of the telegram and telegraph, telephone, radio, television, computers, the cell phone; the Internet, email and World Wide Web; and more recently, through social media, voice-over-Internet, machine-to-machine (M2M) connectivity, the Internet of Things (IoT), and the Internet of Everything (IoE), communication has always led the way in exploiting the newest technologies of the day. With each new generation of telecommunications technology employed, the number of people connected and the rate by which information is transferred among them has also increased.

The effect of this trend is that humanity is more connected than at any time in history, with people trusting and relying on communication technology to safely and reliably deliver their private, personal, family, and financial information to only those to which they intend to contact. Knowledge and information can now be distributed in seconds to millions of people, and friends and family can contact one another half way around the world as casually as pushing a button. It is often said, "the world has become a very small place."

While such progress is tremendously beneficial to everyone, there are also negative consequences of our heavy reliance on technology. It is not surprising that when the communication system fails to perform, e.g. during an earthquake or severe weather, people become disoriented or even panicked by their being "unplugged", even if only temporarily. The quality of service, or QoS, of a communication system or media is then a critical measurement of a communication network's performance. Peoples' peace-of-mind, financial assets, identity, and even their very lives rely on dependable and secure communication.

Another key consideration of a communication network is its ability to insure privacy, safety, and security to the client using it. As communication technology has evolved, so too has the sophistication of criminals and "hackers" intending to inflict mischief, disrupt systems, steal money, and accidentally or maliciously harm others. Credit card fraud, stolen passwords, identity theft, and the unauthorized publicizing of confidential information, private pictures, files, emails, text messages, and private tweets (either stolen to embarrass or blackmail victims) are but a few examples of modern cyber-crime.

Notable examples of privacy violations and cybercrime at the time of this patent application are listed below to highlight the epidemic proportion of the security problem in today's open communication networks (arranged chronologically):

"Target: Stolen Information Involved at Least 70 million People," *CNBC* 10 Jan. 2014

"Hackers Made Smart Fridge and TV Send Malicious emails," *BGR* (*www.bgr.com*) 20 Jan. 2014

"Nest Google Privacy Row Resumes as Thermostat Hacked," *Slash Gear* (*www.slashgear.com*) 24 Jun. 2014

"Account Hijackings Call Line's Data Security into Question. Line, the free call and messaging app, has been rocked by a recent spate of data security breaches. The app has seen hundreds of user accounts illegally accessed by parties other than the accounts' users," *Nikkei Asian Review,* 2 Jul. 2014

"Ordinary Americans Caught up in NSA Data Sweep, Report Claims," *AP* 6 Jul. 2014

"Smart LED Light Bulbs Leak Wi-Fi Passwords," *BBC News* 8 Jul. 2014

"Six People Charged Over StubHub Scam for Prime Tickets. StubHub was targeted by hackers who used stolen passwords and credit card numbers to buy and sell thousands of tickets for pop-music concerts and Yankees games, New York authorities said", *Bloomberg,* 24 Jul. 2014

"'Internet Of Things' Very Susceptible To Hacking, Study Shows," *International Business Times* (*www.ibtimes.com*) 4 Aug. 2014

"Russian Hackers Amass Over a Billion Internet Passwords", *New York Times* 5 Aug. 2014

"New Leaker Disclosing U.S. Secrets, Government Concludes," *CNN* 6 Aug. 2014

"Hackers Root Google's Nest Thermostat in 15 seconds," *The Enquirer* (*www.theinquirer.net*) 11 Aug. 2014

"Dairy Queen Hacked by Same Malware that Hit Target," *Christian Science Monitor* 29 Aug. 2014

"Celebrity Victims in Leak of Nude Photos—Security Vulnerability in iCloud Accounts," *CBS News,* 1 Sep. 2014

"Home Depot May be the Latest Target of Credit Card Breach . . . Home Depot breach could be much larger than Target (40M cards stolen over 3 weeks)," *Fortune,* 2 Sep. 2014

"Mysterious Fake Cellphone Towers Are Intercepting Calls All Over The US," *Business Insider* 3 Sep. 2014

"Hack Attack: From Banks to Retail, Signs of Cyberwarfare?" *Yahoo Finance* 3 Sep. 2014

"Home Depot Confirms Payment System Hacked In U.S. And Canadian Stores," *Fox News* 9 Sep. 2014

"Yahoo Waged Court Fight with U.S. Government Over Surveillance," *CBS/AP* 11 Sep. 2014

"Your Medical Record is Worth More to Hackers than Your Credit Card," *Reuters* 24 Sep. 2014

"Red Alert: HTTPS Has Been Hacked. Browser exploit against SSL/TLS (BEAST) attack will rank among the worst hacks [sic] because it compromises browser connections hundreds of millions of people rely on every day," *InfoWorld,* 26 Sep. 2014

"Sony Cyberattack, First A Nuisance, Swiftly Grew Into a Firestorm," *New York Times,* 30 Dec. 2014

In what appears to be an escalating pace of cybercrime, security breaches, identity thefts, and privacy invasions, it begs the question, "how are all these cyber-attacks possible and what can be done to stop them?" At the same time that society seeks greater privacy and security, consumers also want greater connectivity, cheaper higher-quality communication, and more convenience in conducting financial transactions.

To understand the performance limitations and vulnerabilities in modern communication networks, data storage, and connected devices, it is first important to understand how today's electronic, radio, and optical communication operates, transports, and stores data including files, email, text, audio, and video images.

Circuit-Switched Telephonic Network Operation

Electronic communication involves a variety of hardware components or devices connected into networks of wires, radio, microwave, or optical fiber links. Information is passed from one device to others by sending electrical or electromagnetic energy through this network, using various methods to embed or encode informational "content" into the data stream. Theoretically, the laws of physics set the maximum data rate of such networks at the speed of light, but in most cases practical limitations in data encoding, routing and traffic control, signal-to-noise quality, and overcoming electrical, magnetic and optical noise and unwanted parasitics disturb or inhibit information flow, limiting the communication network's capability to a fraction of its ideal performance.

Historically, electronic data communication was first achieved using dedicated "hardwired" electrical connections forming a communication "circuit" between or among two or more electrically connected devices. In the case of a telegraph, a mechanical switch was used to manually make and break a direct current (DC) electrical circuit, magnetizing a solenoid which in turned moved a metallic lever, causing the listening device or "relay" to click in the same pattern that the sender depressed the switch. The sender then used an agreed upon language, i.e. Morse code, to encode information into the pulse stream. The listener would likewise need to understand Morse code, a series of long and short pulses, called dots and dashes, to interpret the message.

Later, Alexander Graham Bell developed the first telephone using the concept of an "undulating current", now referred to as alternating current (AC), in order to carry sound through an electrical connection. The telephone network comprised two magnetic transducers connected by an electrical circuit where each magnetic transducer comprised a movable diaphragm and coil, or "voice coil", surrounded by a fixed permanent magnet enclosure. When speaking into the transducer, changes in air pressure from the sound causes the voice coil to move back and forth within the surrounding magnetic field inducing an AC current in the coil. At the listener's end, the time-varying current flowing in the voice coil induces an identical waveform and time-varying magnetic field opposing the surrounding magnetic field causing the voice coil to move back-and-forth in the same manner as the transducer capturing the sound. The resulting movement reproduces the sound in a manner similar to the device capturing the sound. In the modern vernacular, when the transducer is converting sound into electrical current, it is operating as a microphone and when the transducer is converting electrical current into sound it is operating as a speaker. Also, because the conducted electrical signal is analogous to the audio waveform carried as an elemental pressure wave in air, i.e. sound, today such electrical signals are referred to as analog signals or analog waveforms.

Since the transducer, as described, is used both for speaking and for listening, in conversation both parties have to know when to speak and when to listen. Similar to two tin cans connected by a string, in such a system, a caller cannot talk and listen at the same time. While such one-way operation, called "half-duplex" mode, may sound archaic, it is actually still commonly used in radio communication today in walkie-talkies, and in modern telephony by the name "push-to-talk" or PTT.

Later full-duplex (i.e., two-way or send-and-receive) telephones with separate microphones and speakers became commonplace, where the parties could speak and listen at the same time. But even today care is required in operating full-duplex telephonic communication to prevent feedback, a condition where a receiver's sound is picked up by its microphone and fed back to the caller resulting in confusing echoes and sometimes uncomfortable whistling sounds—problems especially plaguing long distance telephonic communication.

Early telegraphic and telephonic systems suffered from another issue, one of privacy. In these early incarnations of communication networks, everyone connected to the network hears everything communicated on the circuit, even if they don't want to. In rural telephone networks, these shared circuits were known as "party lines". The phone system then rapidly evolved into multi-line networks where dedicated circuits connected a telephone branch office directly to individual customers' phones. Within the branch exchange office, a system operator would manually connect callers to one another through a switchboard using jumper cables, and also had the capability of connecting one branch to others to form the first "long distance" phone call services. Large banks of relays forming telephonic "switch" networks gradually replaced human operators, which was subsequently replaced by electronic switches comprising vacuum tubes.

After Bell Laboratories developed the transistor in the late 1950s, telephone switches and branch exchanges replaced their fragile and hot vacuum tubes with cool running solid-state devices comprising transistors and ultimately integrated circuits. As the network grew, phone numbers expanded in digits from a seven-digit prefix and private number to include area codes and ultimately country codes to handle international calls. Copper cables carrying voice calls soon covered the world and crossed the oceans. Despite the magnitude of the network, the principle of operation remained constant, that calls represented a direct electrical connection or "circuit" between the callers with voice carried by analog signals and the routing of the call determined by telephone switches. Such a telephonic system eventually came to be known as a "circuit-switched telephonic network", or colloquially as the plain old telephone system or POTS. Circuit switched telephony reached its peak adoption in the 1980s and thereafter relentlessly has been replaced by "packet-switched telephony" described in the next section.

Evolving nearly in parallel to the telephone network, regular radio communication commenced with radio broadcasting in the 1920s. The broadcast was unidirectional, emanating from radio broadcast stations on specific government-licensed frequencies, and received by any number of radio receivers tuned to that specific broadcast frequency or radio station. The broadcasted signal carried an analog signal using either amplitude modulation (AM) or later by frequency modulation (FM) methods, each on dedicated portions of the licensed radio spectrum. In the United States, the Federal Communications Commission or FCC evolved in order to manage the assignment and regulation of such licensed bands. The broadcast concept was expanded into airing television programs using radio transmission, initially comprising black and white content, then in color. Later, television signals could also be carried to people's homes either by microwave satellite dishes or through coaxial cables. Because any listener tuned to the specific broadcast frequency can receive the broadcast, the term "multicast" is now used for such unidirectional multi-listener communication.

Concurrent with advent of radio broadcasting, the first two-way communication commenced with commercial and military ocean ships, and by the time of World War II, radios had evolved into walkie-talkie handheld radio transceivers, devices combining transmitters and receivers into single unit. Like telephony, early two-way radio transmission, operated in "simplex" mode, allowing only one radio to broadcast on a single radio channel while others listened. By combining transmitters and receivers on different frequencies, simultaneous transmission and reception became possible at each end of the radio link, enabling full-duplex mode communication between two parties. To prevent overlapping transmissions from multiple parties, however, a protocol called half-duplex or push-to-talk is commonly used for channel management, letting anyone exclusively transmit on a specific channel on a first-come first serve basis. Industry standard radio types using analog modulation include amateur (ham or CB) radio, marine VHF radio, UNICOM for air traffic control, and FRS for personal walkie-talkie communication. In these two-way radio networks, radios send their data over specific frequency "channels" to a central radio tower, where the tower amplifies and repeats the signal, sending it on to the entire radio network. The number of available frequencies carrying information over the broadcast area sets the total bandwidth of the system and the number of users able to independently communicate on the radio network at one time.

In order to expand the total capacity of the radio network to handle a greater number of callers, the concept of a cellular network, one where a large area is broken into smaller pieces or radio "cells" was demonstrated in the 1970s and reached widespread adoption within a decade thereafter. The cellular concept was to limit the broadcast range of a radio tower to a smaller area, i.e. to a shorter distance, and therefore be able to reuse the same frequency bands to simultaneously handle different callers present in different cells. To do so, software was created to manage the handoff of a caller passing from one cell into an adjacent cell without "dropping" and suddenly disconnecting the call. Like POTS, two-way radio, as well as radio and television broadcasting, the initial cellular networks were analog in nature. To control call routing, the telephone number system was adopted to determine the proper wireless electrical connection. This choice also had the benefit that it seamlessly connected the new wireless cellular network to the "wire-line" plain old telephone system, providing interconnection and interoperability across the two systems.

Starting in the 1980s, telephonic and radio communication, along with radio and TV broadcasting began an inexorable migration from analog to digital communication methods and formats, driven by the need to reduce power consumption and increase battery life, to improve quality with better signal-to-noise performance, and to begin addressing the need to carry data and text with voice. Radio formats such as EDACS and TETRA emerged capable of concurrently enabling one-to-one, one-to-many, and many-to-many communication modes. Cellular communication also quickly migrated to digital formats such as GPRS, as did TV broadcasting.

By 2010, most countries had ceased, or were in the process of ceasing, all analog TV broadcasting. Unlike broadcast television, cable TV carriers were not required to switch to the digital format, maintaining a hybrid composite of analog and digital signals till as recently as 2013. Their ultimate migration to digital was motivated not by government standards, but by commercial reasons to expand the number of available channels of their network, to be able to deliver HD and UHD content, to offer more pay-per-view (PPV, also know an as "unicast") programming, and to enable high-speed digital connectivity services to their customers.

While it is common to equate the migration of global communication networks from analog to digital formats with the advent of the Internet and more specifically with the widespread adoption of the Internet protocol (IP), the switch to digital formats preceded the commercial acceptance of IP in telephony, enabling, if not catalyzing, the universal migration of communication to IP and "packet-switched networks" (described in the next section).

The resulting evolution of circuit-switched telephony is schematically represented by FIG. 1, as a "public switched telephone network" or PSTN comprising an amalgamation of radio, cellular, PBX, and POTS connections and sub-networks, each comprising dissimilar technologies. The network includes PSTN gateways 1A and 1B connected by high bandwidth trunk lines 2 and, by example, connected through wire-line connections 4 to POTS gateway 3, cellular network 17, PBX 8 and two-way radio network 14. Each sub-network operates independently, driving like-kind devices. For example, POTS gateway 3, still common in rural communities, connects by twisted copper pair wire 7 to conventional analog phones 6 or alternatively to cordless phones 5. Cordless phones 5 typically employing the digital enhanced cordless telecommunications standard or DECT, its ultra-low power variant DECT-ULE or its precursor CT2, are all dedicated closed system RF systems, typically with carrier frequencies at 0.9, 1.9, 2.4, and 5.8 GHz. Pure DECT phones cannot access cellular networks directly despite being wireless RF based devices.

PBX 8 controls any number of devices used in company offices, including wired desktop phones 9, speaker phone 10 for conference calls, and private wireless network base station 11 linked by wireless connections 12 to cordless or wireless roaming phones 13. Wireless roaming phones 13 represent a business-centric enhancement to a conventional cordless phone, providing the phone access to corporate WiFi connections or in the case of Japan's personal handphone system or PHS, to access a public microcellular network located outside of the company in high traffic volume corridors and in the business districts of densely populated cities such as Shinjuku Tokyo. Bandwidth, transmission range, and battery life are extremely limited in PHS products.

The PSTN also connects to circuit-switched cellular networks 17 running AMPS, CDMA and GSM analog and digital protocols. Through cellular tower 18, circuit-switched cellular networks 17 connect using standardized cellular radio frequencies 28 to mobile devices such as cell phones 19A. In the case of GPRS networks, an enhancement to GSM, the circuit-switched cellular networks 17 may also connect to tablets 19B, concurrently delivering low speed data and voice. Two-way radio networks 14 such as TETRA and EDACS connect the PSTN to handheld radios 16A and larger in-dash and desktop radios 16B via high-power radio towers 15 and RF links 28. Such two-way radio networks, commonly used by police officers, ambulances, paramedics, fire departments, and even port authorities, are also referred to as professional communication networks and services, and target governments, municipalities, and emergency responders rather than consumers. (Note: As used herein, the terms "desktop," "tablet' and "notebook" are used as a shorthand reference to the computers having those names.)

Unlike POTS gateway 3, cellular network 17, and PBX 8 which use traditional phone numbers to complete call routing, two-way radio network 14 uses dedicated RF radio channels (rather than phone numbers) to establish radio links between tower 15 and the mobile devices it serves. As such, professional radio communication services remain distinct and uniquely dissimilar from consumer cellular phone networks.

FIG. 1 graphically illustrates the flexibility of a PSTN network to interconnect sub-networks of diverse technologies. It is this very diversity that defines an intrinsic weakness of today's circuit switched networks—interoperability among sub-networks. Because the various sub-networks do not communicate with any common control protocol or language, and since each technology handles the transport of data and voice differently, the various systems are essentially incompatible except for their limited capability of placing a phone call through the PSTN backbone or trunk lines. For example, during the September 11 terrorist attack on the World Trade Center in New York City, many emergency responders from all over the USA flocked to Manhattan in an attempt to help fight the disaster, only to learn their radio communication system and walkie-talkies were incompatible with volunteers from other states and cities, making it impossible to manage a centralized command and control of the relief effort. With no standardization in their radio's communication protocol, their radios simply couldn't connect to one another.

Moreover with the direct electrical and RF connections of circuit switched telephonic networks, especially using analog or unsecured digital protocols, it is simple matter for a hacker with a RF scanner to find active communication channels and to sniff, sample, listen, or intercept the conversations occurring at the time. Because the PSTN forms a "continuously on" link or circuit between the parties communicating, there is plenty of time for a hacker to identify the connection and to "tap it", either legally by governments operating under a federal court ordered wiretap, or criminally by cybercriminals or governments performing illegal, prohibited, or unsanctioned surveillance. The definition of legal and illegal spying and surveillance and any obligation for compliance for cooperation by a network operator varies dramatically by country and has been a heated point of contention among global companies such as Google, Yahoo, and Apple operating across numerous international boundaries. Communication networks and the Internet are global and know no borders or boundaries, yet laws governing such electronic information are local and subject to the jurisdictional authority of the government controlling domestic and international communication and commerce at the time.

Regardless of its legality or ethics, electronic snooping and surveillance today is commonplace, ranging from the monitoring of ubiquitous security cameras located at every street corner and overhead in every roadway or subway, to the sophisticated hacking and code cracking performed by various countries' national security divisions and agencies. While all networks are vulnerable, the antiquity and poor security provisions of PSTNs render them especially easy to hack. As such, a PSTN connected to even a secure modern network represents a weak point in the overall system, creating vulnerability for security violations and cybercrimes. Nonetheless, it will still take many years, if not decades, to retire the global PSTN network and completely replace it with IP-based packet-switched communication. Such packet-based networks (described here below), while more modern than PSTNs, are still unsecure and subject to security breaks, hacks, denial of service attacks, and privacy invasions.

Packet-Switched Communication Network Operation

If two tin cans connected by a string represent a metaphor for the operation of modern day circuit-switched telephony, then the post office represents the similar metaphor for packet-switch communication networks. In such an approach, text, data, voice, and video are converted into files and streams of digital data, and this data is then subsequently parsed into quantized "packets" of data to be delivered across the network. The delivery mechanism is based on electronic addresses that uniquely identify where the data packet is going to and where it is coming from. The format and communication protocol is also designed to include information as to the nature of the data contained in the packet including content specific to the program or application for which it will be used, and the hardware facilitating the physical links and electrical or radio connections carrying the packets.

Born in the 1960s, the concept of packet switching networks was created in the paranoiac era of the post Sputnik cold war. At that time, the US Department of Defense (DoD) expressed concerns that a spaced-based nuclear missile attack could wipe out the entire communication infrastructure of the United States, disabling its ability to respond to a USSR preemptive strike, and that the vulnerability to such an attack could actually provoke one. So the DoD sponsored the creation of a redundant communication system or grid-like "network", one where the network's ability to deliver information between military installations could not be thwarted by destroying any specific data link or even numerous links within the network. The system, known as ARPANET, became the parent of the Internet and the proverbial Eve of modern digital communications.

Despite the creation of the packet-switched network, explosive growth of the Internet didn't occur until the 1990s when the first easy-to-use web browser Mosaic, the advent of hypertext defined web pages, the rapid adoption of the World Wide Web, and the widespread use of email, collectively drove global acceptance of the Internet platform. One of its fundamental tenets, lack of central control or the need for a central mainframe, propelled the Internet to ubiquity in part because no country or government could stop it (or even were fully aware of its global implications) and also because its user base comprised consumers using their newly acquired personal computers.

Another far reaching implication of the Internet's growth was the standardization of the Internet Protocol (IP) used to route data packets through the network. By the mid 1990s, Internet users realized that the same packet-switched network that carries data could also be used to carry voice, and soon thereafter "voice over Internet protocol" or VoIP was born. While the concept theoretically enabled anyone with Internet access to communicate by voice over the Internet for free, propagation delays across the network, i.e. latency, rendered voice quality poor and often unintelligible. While delay times have improved with the adoption of high-speed Ethernet links, high-speed WiFi connectivity, and 4G data to improve connection quality in the "last-mile", the Internet itself was created to insure accurate delivery of data packets, but not to guarantee the time required to deliver the packets, i.e. the Internet was not created to operate as a real-time network.

So the dream of using the Internet to replace expensive long distance telecommunication carriers or "telco's" has remained largely unfulfilled despite the availability of "over-the-top" (OTT) providers such as Skype, Line, KakaoTalk, Viper, and others. OTT telephony suffers from poor quality of service (QoS) resulting from uncontrolled network latency, poor sound quality, dropped calls, echo, reverberation, feedback, choppy sound, and oftentimes the inability to even initiate a call. The poor performance of OTT communication is intrinsically not a weakness of the VoIP based protocol but of the network itself, one where OTT carriers have no control over the path which data takes or the delays the communication encounters. In essence, OTT carriers cannot insure performance or QoS because OTT communication operates as an Internet hitchhiker. Ironically, the companies able to best utilize VoIP based communications today are the long distance telephone carriers with dedicated low-latency hardware-based networks, the very telco's that have the least motivation to do so.

Aside from its intrinsic network redundancy, one of the greatest strengths of packet-switched communication is its ability to carry information from any source to any destination so long that the data is arranged in packets consistent with the Internet Protocol and provided that the communicating devices are connected and linked to the Internet. Internet Protocol manages the ability of the network to deliver the payload to its destination, without any care or concern for what information is being carried or what application will use it, avoiding altogether any need for customized software interfaces and expensive proprietary hardware. In many cases, even application related payloads have established predefined formats, e.g. for reading email, for opening a web page on a browser, for viewing a picture or video, for watching a flash file or reading a PDF document, etc.

Because its versatile file format avoids any reliance on proprietary or company-specific software, the Internet can be considered an "open source" communication platform, able to communicate with the widest range of devices ever connected, ranging from computers, to cell phones, from cars to home appliances. The most recent phrase describing this universal connectivity is the "Internet of Everything" or IoE.

FIG. 2 illustrates but a few examples of such Internet connected devices. As shown, a large array of computers including high-speed cloud servers 21A, 21B and 21C and cloud data storage 20 are interconnected by high bandwidth connections 23, typically optical fiber, among with countless other servers (not shown) to form Internet cloud 22. The cloud metaphor is appropriate because there is no well-defined boundary defining which servers are considered part of the cloud and which ones are not. On a daily and even on a minute-to-minute basis, servers come online while others may be taken offline for maintenance, all without any impact to the Internet's functionality or performance. This is the benefit of a truly redundant distributed system—there is no single point of control and therefore no single point of failure.

The cloud may be connected to the user or connected device through any variety of wire-line, WiFi or wireless links. As shown, cloud server 21A connects through a wired or fiber link 24 to wireless tower 25, to WiFi access point 26, or to wire-line distribution unit 27. These "last-mile" links in turn connect to any number of communication or connected devices. For example wireless tower 25 may connect by cellular radio 28 to smartphone 32, to tablet 33, or to connected car 31, and may be used to serve mobile users 40 including for example, pedestrians, drivers of personal vehicles, law enforcement officers, and professional drivers in the trucking and delivery industry. Wireless packet-switched capable telephonic communication comprises cellular protocols 3G including HSUPA and HSDPA, as well as 4G/LTE. LTE, or long-term-evolution, refers to the network standards to insure interoperability with a variety of cellular protocols including the ability to seamlessly hand-off phone calls from one cell to another cell even when the cells are operating with different protocols. Note: As a matter of definition, as used herein "last-mile" refers to the link between any type of client device, such as a tablet, desktop or cell phone, and a cloud server. Directionally, the term "first-mile" is sometimes also used to specify the link between the device originating the data transmission and the cloud server. In such cases the "last-mile" link is also the "first-mile" link.

For shorter distance communication, WiFi access point 26 connects by WiFi radio 29 to smartphone 32, tablet 33, notebook 35, desktop 36 or connected appliance 34 and may be used in localized wireless applications in homes, cafes, restaurants, and offices. WiFi comprises communication operating in accordance with IEEE defined standards for single-carrier frequency specifications 802.11a, 802.11b, 802.11g, 802.11n, and most recently for the dual frequency band 802.11ac format. WiFi security, based on a simple static login key, is primarily used to prevent unauthorized access of the connection, but is not intended to indefinitely secure data from sniffing or hacking.

Wire-line distribution unit 27 may connect by fiber, coaxial cable, or Ethernet 30A to notebook 35, desktop 36, phone 37, television 39 or by twisted pair copper wire 30B phone lines to point of sale terminal 38 serving immobile or fixed wire-line connected markets 42 including hotels, factories, offices, service centers, banks, and homes. The wire-line connection may comprise fiber or coaxial cable distribution to the home, office, factory, or business connected locally though a modem to convert high-speed data (HSD) connection into WiFi, Ethernet, or twisted pair copper wire. In remote areas where fiber or cable is not available, digital subscriber line (DSL) connections are still used but with dramatically compromised data rates and connection reliability. Altogether, counting access through wireless, WiFi, and wire-line connections, the number of Internet connected objects is projected to reach 20 billion globally by the year 2020.

In contrast to circuit switched networks that establish and maintain a direct connection between devices, packet-switched communications uses an address to "route" the packet through the Internet to its destination. As such, in packet-switched communication networks, there is no single dedicated circuit maintaining a connection between the communicating devices, nor does data traveling through the Internet travel in a single consistent path. Each packet must find its way through the maze of interconnected computers to reach its target destination.

FIG. 3 illustrates a hypothetical example of the routing of an IP packet from notebook 60 to desktop 61 using packet-switched network communication. In operation, the first data packet sent from notebook 60 to WiFi router 62A via wireless connection 63A is directed toward array of DNS servers 70, DNS being an acronym for domain name servers. The purpose of the array of DNS servers 70 is to convert the textual name or phone number of the destination device, in this case desktop 61, into an IP address. Prior to routing the packet, DNS root server 72 downloaded a large table of addresses into DNS secondary-server 71. When the query from notebook 60 arrives, DNS secondary-server 71 replies with the IP address of the destination, i.e. desktop 61. In the event that DNS secondary-server 71 does not know the address of the destination device, it can request the missing information from DNS root server 72. Ultimately, the IP address is passed from the array of DNS servers 70 back to the source address, i.e. to notebook 60.

Thereafter notebook 60 assembles its IP data packets and commences sending them sequentially to their destination, first through WiFi radio 63A to WiFi router 62A and then subsequently across the network of routers and servers acting as intermediary routers to its destination. For example, a series of dedicated routers as shown include 65A, 65B, and 65C and computer servers operating as routers include 66A through 66E, together form a router network operating either as nodes in the Internet or as a point of presence or POP, i.e. gateways of limited connectivity capable of accessing the Internet. While some routers or servers acting as a POP connect to the Internet through only a small number of adjacent devices, server 66A, as shown, is interconnected to numerous devices, and is sometimes referred to as a "super POP". For clarity's sake it should be noted the term POP in network vernacular should not be confused with the application name POP, or plain old post office, used in email applications.

Each router, or server acting as a router, contains in its memory files a routing table identifying the IP addresses it can address and possibly also the addresses that the routers above it can address. These routing tables are automatically downloaded and installed in every router when it is first connected to the Internet and are generally not loaded as part of routing a packet through the network. When an IP packet comes into a router, POP or super POP, the router reads enough of the IP address, generally the higher most significant digits of the address, to know where to next direct the packet on its journey to its destination. For example a packet headed to Tokyo from New York may be routed first through Chicago then through servers in San Francisco, Los Angeles, or Seattle before continuing on to Tokyo.

In the example of FIG. 3, a packet from notebook 60 to WiFi router 62A is then forwarded to router 65A through route 64A, which although it has numerous choices, decides to forward the packet to super POP 66A through route 67A. Although super POP 66A also has many choices, it decides the best path at that particular moment is route 68 to server-router 66D, sending it on to local router 65C through route 67B, which in turn connects through route 64B to WiFi router and access point 62B communicating by WiFi radio 63B to desktop 61. So while the path traversed traveled from super POP 66A to server-router 66D to local router 65C, it could have just as likely had traveled from super POP 66A to router 65B to local router 65C, or from super POP 66A to server-router 66D to server-router 66E to local router 65C. And since the number of routers a packet traverses and the available data rate of each of the connections between routers varies by infrastructure and by network traffic and loading, there is no way to determine a priori which path is fastest or best.

Unlike in circuit-switched telephonic communication that establishes and maintains a direct connection between clients, with packet-switched data, there is no universal intelligence looking down at the Internet to decide which path is the best, optimum, or fastest path to route the packet nor is there any guarantee that two successive packets will even take the same route. As such, the packet "discovers" its way through the Internet based on the priorities of the companies operating the routers and servers the packet traverses. Each router, in essence, contains certain routing tables and routing algorithms that define its preferred routes based on the condition of the network. For example, a router's preferences may prioritize sending packets to other routers owned by the same company, balancing the traffic among connections to adjacent routers, finding the shortest delay to the next router, directing business to strategic business partners, or creating an express lane for VIP clients by skipping as many intermediate routers as possible. When a packet enters a router, there is no way to know whether the routing choices made by the specific POP were made in the best interest of the sender or of the network server operator.

So in some sense, the route a packet takes is a matter of timing and of luck. In the previous New York to Tokyo routing example, the routing and resulting QoS can vary substantially based on even a small perturbation in the path, i.e. in non-linear equations the so-called "butterfly effect". Consider the case where the packet from New York goes through "router A" in Chicago and because of temporary high traffic in California, it is forwarded to Mexico City rather than to California. The Mexico City router then in turn forwards the IP packet to Singapore, from where it is finally sent to Tokyo. The very next packet sent is routed through Chicago "router B", which because of low traffic at that moment directs the packet to San Francisco and then directly to Tokyo in only two hops. In such a case, the second packet may arrive in Tokyo before the first one routed through a longer more circuitous path. This example highlights the problematic issue of using the Internet for real-time communication such as live video streaming or VoIP, namely that the Internet is not designed to guarantee the time of delivery or to control network delays in performing the delivery. Latency can vary from 50 ms to over 1 second just depending on whether a packet is routed through only two servers or through fifteen.

The Internet's lack of routing control is problematic for real-time applications and is especially an issue of poor QoS for OTT carriers—carriers trying to provide Internet based telephony by catching a free ride on top of the Internet's infrastructure. Since the OTT carrier doesn't control the routing, they can't control the delay or network latency. Another issue with packet-switched communication, is that it is easy to hijack data without being detected. If a pirate intercepts a packet and identifies its source or destination IP address, they can use a variety of methods to intercept data from intervening routers and either sniff or redirect traffic through their own pirate network to spy on the conversation and even crack encrypted files.

The source and destination IP addresses and other important information used to route a packet (and also used by pirates to hack a packet) are specified as a string of digital data illustrated in FIG. 4. The IP packet contains digital information defining the physical connection between devices, the way the data is organized to link the devices together, the network routing of the packet, a means to insure the useful data (payload) was delivered accurately and what kind of data is in the payload, and then the payload data itself to be used by various application programs.

The IP packet is sent and received in sequence as a string of serial digital bits, shown in advancing time 86 from left to right and is organized in a specific manner called the Internet Protocol as established by various standards committees including the Internet Engineering Task Force or IETF among others. The standard insures that any IP packet following the prescribed protocol can communicate with and be understood by any connected device complying with the same IP standard. Insuring communication and interoperability of Internet connected devices and applications are hallmarks of the Internet, and represent a guiding principal of the Open Source Initiative or OSI, to prevent any company, government, or individual from taking control of the Internet or limiting its accessibility or its functionality.

The OSI model, an abstraction comprising seven layers of functionality, precisely prescribes the format of an IP packet and what each segment of the packet is used for. Each portion or "segment" of the IP packet corresponds to data applying to function of the particular OSI layer summarized in table 87 of FIG. 4. The roles of the seven OSI layers are as follows:

Layer 1, the physical or PHY layer, comprises hardware specific information articulating the physical nature of communication as electrical, RF and optical signals and the way those signals can be converted into bits for use in the communicating system. Converting a specific communication medium such as WiFi radio, Ethernet, serial ports, optical fiber, 3G or 4G cellular radio, DSL on twisted pair copper wire, USB, Bluetooth, cable or satellite TV, or digital broadcasts of audio, video, or multimedia content into a bit stream is the task of the PHY layer. In the IP packet, preamble 80, represents Layer 1 data, and is used to synchronize the entire data packet or "frame", to the hardware transceiving it.

Layer 2, the data link layer, comprising bits arranged as frames, defines the rules and means by which bit streams delivered from PHY Layer 1 are converted into interpretable data. For example, WiFi radio based bit streams may comply with any number of IEEE defined standards including 802.11a, b, g, n, and ac; 3G radio communication may be modulated using high-speed packet access methods HSDPA or HSUPA; modulated light in an optical fiber or electrical signals on a coaxial cable can be decoded into data in accordance with the DOCSIS 3 standard; etc. In the IP packet, Layer 2 data encapsulates the remainder of the packet, segments 82, 83, and 84, with a leading "data link header" 81, and a trailing "data link trailer" 85, together defining when the encapsulated payload being delivered starts and stops, as well as to insure nothing was lost in the transmission process. One key element of Layer 2 data is the MAC or media access address, used to direct the data traffic to and from specific Ethernet addresses, RF links, or hardware specific transceiver links.

Layer 3, the network or Internet layer, comprises packets called "datagrams" containing Internet Protocol (IP) information used for routing an IP packet including whether the packet contains IPv4 or IPv6 data and the corresponding source and destination IP addresses as well as information regarding the nature of the payload contained within the packet, i.e. whether the type of transport protocol used comprises Transmission Control Protocol (TCP), User Datagram Protocol (UDP) or something else. Layer 3 also includes a function to prevent immortals—IP packets that are never delivered but never die. A specific type of Layer 3 packet, ICMP is used to diagnose the condition of a network, including the well-known "ping" function. In the IP packet, Layer 3 comprises "IP header" 82 and encapsulates its payload comprising transport and upper layer segments 83 and 84.

Layer 4, the transport layer, comprises segments of data defining the nature of the connection between communicating devices, where UDP defines a minimal description of the payload for connectionless communication, namely how large is the payload, were any bits lost, and what application service (port) will use the delivered data. UDP is considered connectionless because it does not confirm delivery of the payload, relying instead on the application to check for errors or lost data. UDP is typically used for time sensitive communication such as broadcasting, multicasting, and streaming where resending a packet is not an option. In contrast, TCP insures a virtual connection by confirming the packet and payload are reliably delivered before the next packet is sent, and resends dropped packets. TCP also checks the data integrity of the delivered packets using a checksum, and includes provisions for reassembling out-of-sequence packets in their original order. Both TCP and UDP define the source and destination ports, a description of an upper layer service or application, e.g. a web server or an email server, concerned with the information contained within the Layer 4 payload. In the IP packet, Layer 4 comprises the TCP/UDP header 83 and encapsulates the data/payload 84 comprising content for use by the upper OSI Layers 5, 6 and 7.

Layers 5, 6 and 7, the upper or application layers describe the content delivered by the Internet as data/payload 84. Layer 7, the "application" layer, represents the highest level in the OSI model and relies on the six underlying OSI layers to support both open source and proprietary application software. Commonly used Level 7 applications include email using SMTP, POP or IMAP, web browsing using HTTP (Chrome, Safari, Explorer, Firefox), file transfers using FTP, and terminal emulation using Telnet. Proprietary applications include the Microsoft Office suite of products (Word, Excel, PowerPoint), Adobe Illustrator and Photoshop; Oracle and SAP database applications; Quicken, Microsoft Money, and QuickBooks financial software; plus audio and video players (such as iTunes, QuickTime, Real Media Player, Window Media Player, Flash), as well as document readers such Adobe Acrobat Reader and Apple Preview. Level 7 applications generally also utilize embedded objects defined syntactically by Level 6, the "presentation" layer, comprising text, graphics & pictures, sound and video, document presentations such as XML or PDF, along with security functions such as encryption. Level 5, the "session" layer, establishes cross-application connectivity, such as importing one object into another program file, and control initiating and terminating a session.

As described, the OSI seven-layer model defines the functions of each layer, and the corresponding IP packet encapsulates data relating to each layer, one inside the other in a manner analogous to the babushka or Russian nesting doll, the wooden dolls with one doll inside another inside another and so on . . . . The outer packet or Layer 1 PHY defines the entire IP frame containing information relating to all the higher levels. Within this PHY data, the Layer 2 data frame describes the data link layer and contains the Layer 3 network datagram. This datagram in turn describes the Internet layer as its payload, with Layer 4 segment data describing the transport layer. The transport layer carries upper layer data as a payload including Layer 5, 6 and 7 content. The seven-layer encapsulation is also sometimes referred to by the mnemonic "all people seem to need data processing" ordering the seven OSI layers successively from top to bottom as application, presentation, session, transport, network, data-link, and physical layers.

While the lower physical and link layers are hardware specific, the middle OSI layers encapsulated within the IP packet describing the network and transport information are completely agnostic to the hardware used to communicate and deliver the IP packet. Moreover, the upper layers encapsulated as the payload of the transport layer are specific only to the applications to which they apply and operate completely independently from how the packet was routed or delivered through the Internet. This partitioning enables each layer to essentially be supervised independently, supporting a myriad of possible combinations of technologies and users without the need for managerial approval of packet formatting or checking the viability of the packet's payload. Incomplete or improper IP packets are simply discarded. In this manner, packet-switched networks are able to route, transport and deliver diverse application related information over disparate communication mediums in a coherent fashion between and among any Internet connected devices or objects.

In conclusion, switched circuit networks require a single direct connection between two or more parties communicating (similar to the plain old telephone system of a century ago), while packet switches network communication involves a fragmenting documents, sound, video, and text into multiple packets, deliver those packets through multiple network paths (similar to the post office using best efforts to provide delivery in an accurate and timely manner), then reassembling the original content and confirming nothing was lost along the way. A comparison between circuit-switched PSTNs versus packet-switched VoIP is summarized in the following table:

| Network | PSTN | Internet |
|---|---|---|
| Technology | Circuit-switched | Packet-switched |
| Connection | Dedicated electrical connection | Each packet routed over Internet |
| Data delivery | Real-time (circuit) | Best effort (packet) |
| Signal | Analog or digital | Digital, IP, VoIP |
| Content | Voice | Voice, text, data, video |
| Data Rate | Low | High |
| Error Checking | None, or minimal | Extensive |
| Effect of Broken Line | Broken or cropped call | Call rerouted |
| Effect of Power Failure | Network delivers power | Battery backup required |

It should be mentioned here that while PSTNs operate using real-time electrical circuit connections, packet-switched networks deliver content using "best effort" methods to find a way to deliver a packet and payload, not unlike the post office using different trucks and letter carriers to eventually deliver the mail, even if its late to arrive. To better understand the method by which packet-switched networks accomplish this goal, it is necessary to look deeper into the function and role of each layer in the seven-layer OSI model for networks.

OSI Layer 1—Physical (PHY) Layer

The physical layer described by OSI Layer 1 addresses operation of hardware used to facilitate communication. While it is the most basic layer, describing only electrical, radio, and optical transmission, it is also the most diverse, with each detailed description specific to a particular piece of hardware. Broadly viewed, communication hardware can be broken into two types—high-bandwidth communication used for high-traffic-volume pipes connecting servers forming the backbone of the Internet, i.e. the "cloud", and lower bandwidth connections completing local communication between devices or connecting the "last-mile" link from the cloud to consumers, businesses, and machines.

FIG. 5A illustrates by example, high-bandwidth communication between POP-servers 21A and 21B connected via microwaves towers 98, optical fibers 91, and microwave satellites 93. Microwave communication requires direct line-of-sight links between microwave towers 96A and 96B. The towers are connected as shown to POP-servers 21A and 21B by wire-line connections 97A and 97B. Similarly, satellite communication requires microwave uplinks and downlinks 95A and 95B between satellite 93 and satellite dishes 92A and 92B connected to POP-servers 21A and 21B. As in the prior example, wire-line connections 94A and 94B connect the servers 21A and 21B to the satellite dishes 92A and 92B. Servers 21A and 21B can also connect directly using a high-bandwidth optical connection 90 carried on optical fibers 91. While terrestrial and undersea cables previously comprised large multi-conductor conduits of copper wire, the limited bandwidth and high cost of copper has accelerated a global migration to optical fiber.

FIG. 5B illustrates various examples of the "last-mile" link from the cloud 22 comprising servers 21B and 21C and high bandwidth connection 23, and a large variety of computers, phones, radios, and connected "things". As shown, wire-line connections may comprise optical fiber 91 and coaxial cable 105, and to diminishing degree twisted pair copper wire. Wireless connections may be transmitted by a number of means including cellular radio tower 18, two-way radio tower 15, WiFi access point 26, and satellite 93.

As some examples, server 21C acting as a cloud gateway connects by fiber connection 24 to LTE base station 17 driving radio tower 18 for cellular communication 28 connecting to cell phone 32, tablet 33, or notebook 35. Server 21C also connects to public WiFi router 100 transmitting WiFi 29 to cell phone 32, tablet 33, or notebook 35.

Server 21C connects to cable modem transmission system CMTS 101 which in turn connects by coaxial cable 105 to set top box (TV STB) 102 driving TV 39 using HDMI 107 and to cable modem 103. Cable modem 103 generates two different types of outputs—voice and high speed digital (HSD). The voice output may be used with cordless phone 5 while the HSD drives desktop 36 as well as tablet 33, home appliance 34, and cell phone (not shown) via WiFi signal 29 generated by home WiFi access point 26. Cable modem 103 may in some instances produce HSD as Ethernet 104 wired to desktop 36. Alternatively TV STB 102 can receive its signals via satellite link 95 comprising satellite dishes 92A and 92B with satellite 93. Collectively TV STB 102 and the various outputs of cable modem 103 create home communication network 100.

Server 21C may also connect to professional communication devices via two-way radio 20 signals driving radios 16A and 16B from TETRA or EDACS base station 14 and radio tower 15 or through corporate PBX 8 driving desktop phones 9. Because most two-way radio and private branch exchange systems are not based on packet-switched techniques and do not use public telephone numbers for call routing, information is lost whenever data is sent between server 21C and PBX 8 or radio base station 14. The same is true of PSTN-bridge 3 connected to POTS 6, since POTS is not designed to handle a mixture of voice and data.

The role of the physical or PHY layer varies in systems depending on whether the communication is one-to-one, one-to-many, or many-to-many. In one-to-one communication, illustrated conceptually in FIG. 6A, two and only two electronic devices 140A and 140B communicate directly with one another using a dedicated electrical, optical or RF connection to realize a point-to-point connection. By using a prescribed and predefined communication protocol installed in interfaces 143A and 143B, a hardware only interface can be established between devices to perform communication. More specifically, data generated from electronic circuitry 141A is transferred to physical layer communication interface 143A connected via electrical, RF or optical signals 144 to an identically constructed physical communication interface 143B. The data received is processed by electronic circuitry 141B and in some cases a response is returned to interface 143A in device 140A.

Since in one-to-one communication there are only two devices, there is no need to include software to direct traffic, identify devices, or to decide which devices respond to instructions. Examples of such dedicated point-to-point communication includes serial communication buses like RS232 originally used to connect printers to desktop computers, and the simple serial control or $S^2C$ bus (U.S. Pat. No. 7,921,320) used to control the LED backlight brightness in cell phone displays.

Dedicated point-to-point communication offers several advantages. Firstly, it is easy to implement and if desired, can be performed entirely in hardware, even within a single integrated circuit, with no need for a central processing unit (CPU) core. Alternatively, the interface can be implemented in firmware, i.e. hardware specific software, requiring only minimal CPU processing power to execute a limited instruction set for managing data exchange. Secondly, without the need for traffic management, such interfaces can operate at very high data rates. Lastly, it offers various advantages in security because no other device is sharing the line or able to "listen" to its communication. In this case, the interface can be implemented to "validate" or "authenticate" the identity of any device at the time the device is plugged into its port, and to disable the port if the connection is interrupted even for an instant. Devices that are not authenticated are ignored and the port remains shut down until a valid device replaces the offending device.

The relationship between two devices in one-to-one communication can be managed in two fundamentally different ways. In "peer-to-peer" communication, each device has equal decision making authority and control of the communication exchange is generally prioritized on a first-come first-served basis. Alternatively, in a "master-slave" configuration, the master device takes control of the decision making process and the slave has to make requests and receive approval from the master device to initiate any action.

A one-to-many PHY-only interface is illustrated in FIG. 6B where three or more devices 140A, 140B and 140C are connected together by common communication line, shown as a data "bus" 144. Each device includes electronic circuitry 141A, 141B or 141C connected by corresponding data lines 142A, 142B, and 142C to physical interfaces 143A, 143B, and 143C. In this configuration, data communicated from any one device is passed to all the other devices connected to the bus or communication medium. For example, if device 140C sends data on to bus 144, both devices 140A and 140B will receive the communication, if device 140B sends data on to bus 144, devices 140A and 140C will receive the communication, and so on. Communication where everyone listens is known as "broadcasting", a means similar to broadcast TV stations transmitting content to many TV receivers.

In the modern vernacular, one-to-many broadcasting is known as multicasting. Layer 1 PHY-only one-to-many broadcasting is intrinsically not a secure form of communication because the broadcaster has no idea who is listening. In World War II, broadcasting was used to send information to troops, fleets, and submarines over insecure channels using "encryption" designed to prevent a listener's ability to interpret a message by using a secret algorithm to scramble the information. If an unauthorized listener is able to "break the code", security is severely compromised not only because the interloper can intercept confidential communiqués, but because the broadcaster doesn't know they are able to. So in Layer-1 PHY-only implementations, one-to-many communication suffers several major disadvantages, namely:

Any device able to connect to the communication bus or medium is able to receive or monitor the content of the communication, even if they represent an unintended recipient or a security threat;

The device sending the information, i.e. the "transmitting device" has no idea what other devices are listening;

The transmitting device cannot confirm if the sent data was received correctly and accurately; and Transmission of communication traffic to unintended or disinterested recipients wastes valuable communication channel bandwidth by forcing recipients to receive messages they don't want, need, or care about.

The problem of multi-device connectivity using a PHY-only implementation is further exacerbated in one-to-many and especially in many-to-many device communication because of competition for channel bandwidth and in determining prioritization of which device is authorized to transmit. To prevent data collisions, cases where multiple devices try to broadcast simultaneously, PHY-only communication must adopt a predetermined hierarchy of priority rights for each device sharing the communication channel or medium. In a central processing unit or CPU design, several methods are combined to manage communication within the CPU and between the CPU and memory. These concepts include the principle of an "address bus" used to identify what device or memory location the CPU is attempting to communicate with, a "data bus" used to carry the data separately from the address, and one or more "interrupt' lines used to identify when some task must be performed.

In this manner a CPU can react dynamically to required tasks, allowing the CPU to communicate with and support multiple peripherals on an as needed basis, absolving the CPU of any responsibility to constantly poll or solicit status information from its connected peripherals. In operation, whenever a peripheral component needs attention, it generates an "interrupt" signal, i.e. a request for service by electrically shorting a shared connection, the interrupt line, to ground, momentarily. After generating the interrupt, the peripheral waits for the CPU to ask the device what it needs in a manner analogous to the "call attendant" light in an airplane. Since the interrupt service routine generally allows the CPU to finish what it is doing before servicing the interrupting device, such a method is not good for dealing with priority treatment of real-time events requiring immediate attention.

To augment the capability of interrupt-based communication for real-time applications, CPU architecture introduced the concept of a priority line called a "non-maskable interrupt" to force the CPU to drop whatever it's doing and immediately service a high-priority or real-time event, e.g. a message coming into a router or a call coming into a cell phone. Like VIP treatment for a small number of passengers in a first class cabin, while such methods work for a limited number of devices connected to central communication or master device, the approach does not scale to handle a large number of users nor does it support peer-distributed systems where there is no centralized control.

Expanding on the CPU's principle of a device address, OSI Layers 2, 3, and 4 likewise all utilize device "identity" as a key component in directing communication traffic among devices. For example, Layer 2, the data link layer, identifies input and output connections using media access or MAC addresses, Layer 3, the network layer, routes packets through the network using IP addresses, and Layer 4, the transport layer, employs port addresses to identify what kind of data is being transported, e.g. email, web pages, files, etc. In a CPU, the address bus, data busses, and interrupt lines comprise separate lines, also known as a "parallel" port connection. While parallel ports are effective in maximizing data rates for interconnections within a single chip or for short distance high-speed connections on a computer motherboard, the large number-of-lines are expensive and impractical for longer distance communication.

Instead, serial communication, delivering information in packets transmitted over time, forms the prevailing method for electronic communication today. The IP packet shown previously in FIG. 4 contains all the necessary routing and communication data to deliver content, payload 84, between a sender and a recipient over a communication network, either locally or globally. Each IP packet contains requisite addresses including the data link layer information in data link header 81, the IP address info in IP header 82, and the port address information in TCP/UDP header 83, except they are arranged sequentially and received in order over time 86 instead of being sent simultaneously in parallel.

OSI Layer 2—Data Link Layer

To overcome the aforementioned problems in controlling information flow in PHY-only multi-device communication, the seven-layer OSI model includes the abstraction of a Layer 2 or "data link" layer. In essence the data link layer performs the duties of a traffic cop, directing the flow of data, and deciding which data on a shared data bus or shared medium is intended for a particular device. The role of the Layer 2 data link layer is exemplified in FIG. 7A where devices 145A, 145B and 145C share a common connection or "bus" 144, but each have their own data link layer communication interface 146A, 146B, and 146C supporting only one data link communication 147 at a time. So even though many devices are connected together at the physical layer, i.e. sharing a common hardware bus, on the data link layer only two of them are connected to one another at one time. Specifically, should device 145A wish to communicate exclusively with device 145B, i.e. the data link 147 occurs only between device A and device B even though device C is connected at a physical level to the other two.

By introducing Layer 2 related hardware or software as a data link layer interface in all three devices, i.e. data link interfaces 146A, 146B, and 146C, data sent across data bus 144 can be inspected and filtered to limit communication between the sender and the intended recipient devices. The other bus connected devices, while they still receive the same data, ignore it and take no action as a result of receiving the incoming message. Such a protocol is used by the serial peripheral interface or SPI bus, where multiple devices are connected to a common "data bus", the bus carrying data, but only respond if their particular address appears on the address lines. In this way, the SPI bus is used to control LEDs in LCD TV backlight systems, allowing independent control of each string of LEDs in the TV display to facilitate brightness control and "local dimming" for high contrast HD and UHD video content. The same concept is also used in computer memory bus architectures to select which bank of memory is being read or written to, in PCI Express expansion slots in computers, and in the CAN bus used in automobiles.

Likewise, the concept of the data link layer is used in Bluetooth wireless communication of wireless headphones, speakers, video cameras, etc., where only paired devices, devices previously authorized or "bonded", can communicate with one another. In the Bluetooth protocol, the bonding process, steps that establish the data link, occurs independently from and prior to any actual data communication. Once the bond is complete, the two bonded devices can, at least theoretically, communicate undisturbed by other Bluetooth conversations transpiring concurrently among other parties. In reality, Bluetooth communication bus 144 represents a shared radio frequency channel of limited bandwidth and data capacity. Defined by the Bluetooth standards committee and assigned by mutual consent of the FCC and their foreign equivalent agencies, every Bluetooth compliant device broadcasts on the same shared radio frequency band or "channel". Each simultaneous broadcast consumes a portion of the channel's available bandwidth and data rate. Despite the overlapping transmissions, the data does not collide so long that the channel doesn't become overly populated. To minimize the risk of data collisions and to circumvent challenges of channel overpopulation and availability, Bluetooth communication is intentionally limited to very short distances and extremely low data rates.

In the bus architecture described previously, the physical connection is a common line, electrical connection, or medium connected directly to or shared among multiple devices. In a bus architecture, any device connected to the bus consumes some energy from the bus in order to communicate and degrades the bus performance, even if but by a small amount. This phenomenon, incrementally degrading bus performance with each additional device connection is known as "loading". In the event the loading it too great, the bus no longer is able to operate within its specified performance limits, and communication will fail either by becoming too slow or by exhibiting a high error rate. The maximum number of devices that may be connected to a line or bus before it fails to meet its specified performance rating is referred to as the "fan out" of the bus or connection. To alleviate the risk of loading, the bus can be broken into numerous segments, each operating in a point-to-point manner, where the signal integrity is boosted or buffered in magnitude before sending it on to other devices. From the point of view of connectivity, the data or signal being communicated, the data link, is the same as in bus architectures, but the electrical, optical, or radio signal strength, the PHY data, is consistently maintained at a constant level independent of the number of connected devices.

One such connected network comprising point-to-point connections with boosted signals is the hub architecture shown in FIG. 7B, where devices A, B and C shown in simplified form by communication stacks 146A, 146B, and 146C respectively are used to connect to one other through a signal boosting bus or "hub" 148. The hub faithfully reproduces its incoming signal content without modifying, filtering, or interpreting the data stream, then outputs a boosted version of the same signal on lines connected to other devices.

Each device connects to hub 148 through its own dedicated communication line, specifically, 151A, 151B, and 151C connecting peripheral device communication stack 146A to hub communication stack 150A, device communication stack 146B to hub communication stack 150B, and device communication stack 146C to hub communication stack 150C, respectively. In turn, the communication stacks within hub 148 connect to a high-speed internal bus 149 to interconnect the hub-connected devices. Although the PHY layer data all travels through hub 148 and internal data bus 149, the Layer 2 data link layer communication 147 operates as though only communication stack 146A in device A is talking exclusively to communication stack 146B in device B, and not to device C. The PHY-layer data is however delivered to every device connected to the hub and with identical propagation delays. Also, since there is no way to know which device is broadcasting and which ones are listening, the hub device must support multidirectional communication. Hubs for Ethernet and Thunderbolt operate in such a manner. In other hubs, for example for the "universal serial bus" or USB, the hub has one input and a number of outputs, typically to two to six, using different shaped USB connectors to distinguish the two types and the default direction of data flow.

Another method to interconnect devices to provide signal boosting is the "daisy chain" architecture shown FIG. 7C where Devices A, B and C are connected in successive fashion with Device A communication stack 152A connected to Device B communication stack 152B through physical bus connection 151A, and with Device B communication stack 152B connected to Device C communication stack 152C through physical bus connection 151B, and with Device C communication stack 152C connected through physical bus connection 152C to the next device connected in the daisy chain, if any. To clarify the fact that the physical connection, and literally the mechanical connector itself in wire-line systems, are distinct, communication stacks 152A, 152B and 152C each contain two Layer 1 physical interfaces but only one Layer 2 data link layer.

In daisy chain operation PHY data flows from the data link layer of communication stack 152A into its PHY interface, then through a cable constituting physical bus connection 151A into the PHY interface of communication stack 152B, up into its data link layer, down into the second PHY interface of Device B, through a cable constituting physical bus connection 151B, into the PHY interface of communication stack 152C, and up into its data link layer. So while the physical signal meanders its way through all three devices shown, the data link layer connects only communication stack 152A of Device A to communication stack 152C of Device C, where Device B ignores the data that it is carrying. Examples of network communication based on daisy chain architecture include Firewire, i.e. IEEE1394, musical digital interface or MIDI, and the now obsolete token ring used by early Window-based personal computers. A positive feature of daisy-chaining devices is that there is no need for an extra device, i.e. the hub, or all the network wiring connecting to it. One negative attribute of the daisy chain architecture is that the propagation delay between devices increases with each device the data passes through, causing inconsistent performance especially in high-speed real-time applications.

In all three examples, the bus architecture, the hub architecture, and the daisy-chain architecture, PHY-layer data is sent to every network-connected device, even if it is not the intended recipient. The device itself performs packet identification and filtering, where it compares the address of the data it receives to its own address, typically pre-programmed as a fixed permanent address using nonvolatile memory, micromechanical switches, or wire jumpers in the device or in one of its ICs. When a specific device recognizes a data packet containing a destination that matches its address, it responds, otherwise it ignores the packet altogether. The device address in the packet must comply with the communication protocol being used, whether MIDI, USB, IEEE1394, Thunderbolt, etc. In the case where the packet uses Internet Protocol as its data link layer, the address is given a specific name called the "media access" or MAC address, to be described later in this disclosure.

One key attribute of the bus, hub, and daisy chain architectures shown is that the data being broadcast on the PHY layer, i.e. the electrical, RF, or optical signals are sent to every connected device. This method consumes valuable network bandwidth by unnecessarily sending packets to devices that do not need them and for which they are not intended. As Ethernet emerged as the prevailing standard for local area network or LAN connectivity, this wasted network bandwidth was identified and ultimately eliminated by the introduction of a network "switch".

In LAN implementations like that shown in the three-device example of FIG. 8A, a LAN switch 159 is inserted in between the communicating PHY layer of communication interfaces 146A, 146B, and 146C contained within devices 145A, 145B, and 145C. In contrast to the bus connection shown previously in FIG. 7A, having a single shared data bus 144 interconnecting the devices, the addition of LAN switch 159 breaks the bus into three discrete point-to-point connections, namely PHY connection 148A between device 145A and switch 159, PHY connection 148B between device 145B and switch 159, PHY connection 148C between device 145C and switch 159, and so on. As shown, each physical connection occurs point-to-point, between only two devices, with intermediate devices responsible to pass the serial data stream along to its adjacent connected devices.

The principle can scale to any number of devices, and the operation of the LAN switch 159 can be unidirectional or bidirectional and half-duplex or full duplex. In operation, to establish data link 147 exclusively between communication interfaces 146A and 146B of network connected devices 145A and 145B, LAN switch 159 establishes a physical layer connection only between the two communicating devices 145A and 145B. As such, PHY layer connection is established exclusively between the two communicating devices, namely device 145A and device 145B, but with no other network connected devices, e.g. device 145C. One benefit of using LAN switch 159 is that device 145C is not bothered to listen to the chatter of other communication occurring in the network and its communication interface 146C remains free until called upon.

A second benefit of using LAN switch 159, is that the signal coming into LAN switch 159 is boosted before being sent onward to an adjacent network connected device, so that no loading, signal degradation, or speed impact results from connecting more devices to LAN switch 159. So the fan out of LAN switch 159 is essentially unlimited, determined only by the number of connections in the LAN switch.

A schematic representation of LAN switch 159 is illustrated in FIG. 8B, comprising lines 160A through 160F. At the intersection point in every combination of two lines is a LAN crosspoint 161, representing a bidirectional switch and amplifier. For example, crosspoint AB interconnects B line 160B to A line 160A, crosspoint BE interconnects B line 160B to E line 160E, crosspoint CE interconnects C line 160C to E line 160E, and so on. In normal communication, each line is connected to at most only one other line to create an interconnection pair. Once a device is located, a routing table of Layer 2 MAC addresses (not shown) is maintained with LAN switch to keep track of which devices are connected and to what connector. The table essentially maps the MAC address to their physical connection to the LAN switch, establishing a precise relationship between Layer 2, the data link layer, and Layer 1, the PHY layer. The table is dynamic, so if one device is unplugged and another is plugged in, the MAC address routing table is automatically updated in LAN switch 159.

In special cases where a broadcast of data is sent to every device in the network, for example in startup where one device may be looking for another but hasn't identified its location on the LAN switch, then every device may be interconnected simultaneously with only one source broadcasting the data and the rest of the devices receiving it. Because of the built-in amplifiers, even in the broadcast mode, every signal is buffered and no speed or signal integrity degradation results.

The third and most important advantage of using LAN switch 159 is it dramatically increases the bandwidth of the overall network, allowing multiple conversations to occur simultaneously and independently between pairs of devices as illustrated in FIG. 8C. In the example, devices 145A, 145B, 145C and 145F are connected to LAN switch 159 with physical lines 160A, 160B, 160C, and 160F, respectively. Through the data link Layer 2, devices 160A and 160B establish a dedicated communication channel AB through pairing 164 while concurrently devices 160C and 160F establish a dedicated communication channel CF through pairing 165. In the communication of device 145A to 145B, data is sent along line 160A through "on" LAN crosspoint 162 and through line 160B to device 145B. Simultaneously, in the communication of device 145C to device 145F, data is sent along line 160C through on LAN crosspoint 163 and through line 160F to device 145F. All other LAN crosspoint connections remain off even if devices are plugged in to the other lines.

In this manner two independent communication channels, or "conversations" can occur at full data rates in AB pairing 164 and CF pairing 165 without waiting to share a common data bus. So in the example shown the bandwidth of the network connecting four devices is doubled by using LAN switch 159 and a LAN architecture compared to using a bus, hub, or daisy chain network architecture. In a LAN switch with "n" lines and connections, the maximum number of simultaneous conversations is then "n/2," compared to the alternative networks using serial connections that are only able to support one single conversation at a time.

It should be noted that when two devices are connected, e.g. devices 145A and 145B in AB pairing 164, the communication using a single line is only half duplex because only one device can "talk" at one time while the other listens. If full duplex communication is required, the number of lines and crosspoint connections in LAN switch 159 must be doubled, with device 145A having its output connected to the input of 145B and, in parallel, with device 145B having its output connected to the input of 145A. So a device A to device B full duplex conversation would simultaneously involve two pairings—an AB pairing where device A sends data to device B and a BA pairing where device B sends data to device A, each on different lines and through unique crosspoint connections.

While the illustration of FIG. 8C may imply that lines 160A through 160F represent wires and plugs of an electrical connector, the description is equally valid even if the lines represent radio or optical communication. In radio communication, each line may for example represent a unique frequency band, or "subchannel" used to carry one line's data, and where 20 radio frequencies, bands, or subchannels may be used to carry up to 10 different conversations simultaneously and independently. In optical communication each line, may represent a different wavelength of light or a unique modulation scheme. The radio or optical interface converts the electromagnetic communication back into electrical signals within the communicating devices. So in this manner, a LAN switch may be used to enhance the bandwidth of any network configured communication medium.

While numerous protocols and standards have emerged to direct traffic and transport data in packet-switched networks, several widespread standards have emerged that warrant greater explanation. Either widely adopted or evolving from existing aging standards, these communication protocols and their associated hardware, discussed here below, include:

Ethernet (IEEE802.3) for electrical based communication networks

WiFi (802.11) for near range radio communication networks

4G/LTE for long range radio communication networks

DOCSIS3 for cable and fiber based communication networks

Ethernet (IEEE802.3)—

When electrical connections are used to form a LAN in modern networking, most proprietary networks have been replaced by a globally accepted standard IEEE802.3 known as Ethernet. The Ethernet specification prescribes the data packet used by the data link Layer 2 as well as defining the electrical connections, voltages, data rates, communication speeds and even the physical connector plugs and sockets. So Ethernet is, as a standard, both a data link Layer 2 and PHY Layer 1 specification. Specification of the content of an Ethernet data packet, either as a Layer 1 Ethernet packet 188 or a Layer 2 Ethernet packet 189, is illustrated graphically as serial data in FIG. 9 represented from left to right in the direction of increasing time 86. Associated table 190 describes the function of each block or sub-packets in the Ethernet packet.

Layer 2 Ethernet packet 189 as shown contains destination MAC address 182, source MAC address 183, an optional virtual LAN block 184, Ethertype block 185, frame check 186, and payload 187, representing the actual data being carried by the Ethernet packet. To insure speed specifications, the size of the Layer 2 Ethernet packet may, according to the Ethernet specification, range from 64B to 1,518B in order to carry a payload from 42B to 1500B. In the event the optional VLAN block 184 is included in the packet, the packet length increases by 4B with a maximum Layer 2 Ethernet length of 1,522B.

Layer 1 Ethernet packet 188 combines the entire contents of Layer 2 Ethernet packet 189 with a header comprising SFD 181 for synchronization and preamble 180 as a data frame header. The maximum length of the Layer 1 Ethernet packet 188 is then 8B longer then the Layer 2 Ethernet packet 189, ranging from a minimum size of 72B to a maximum length of 1,526B without the VLAN option or 1,530B with the VLAN block 184 included.

In operation, the purpose of preamble 180 as a Layer 1 data frame header subfield is to assist the hardware in initially identifying a device is trying to send data. Start frame header SFD 181, another Layer 1 artifact, is used for synchronizing the incoming packet data to the timing clocks to enable reading the data reliably. After these two blocks of Layer 1 Ethernet packet 188 are received, the Layer 2 Ethernet packet 189 commences with the destination MAC address 182 and source MAC address 183 describing what LAN-connected device the data is going to and where it is coming from. The LAN switch is intelligent and able to route data according to these addresses. VLAN block 184 is optional and if present facilitates filtering of the packets by partitioning them into sub-networks or virtual local area networks in accordance with the IEEE specification 802.1Q. Ethertype 185 specifies the format of the data either as the type of data or its length depending on its format. Ethertype 185 and VLAN 184 follow a format that prevents confusion as to whether optional VLAN 184 data is inserted or not.

After all of this header data is received, payload 187 contains the actual data being delivered by the Ethernet packet. This data may comply with Internet Protocol, and may contain data encapsulating Layer 3 to Layer 7 content as described in the OSI model. Alternatively, in custom designed systems, payload 187 may contain protocols proprietary to specific hardware or manufacturers. If all the required data cannot be sent in the maximum packet size of 1,500B allowed by the Ethernet standard, then the payload can be broken into pieces, or sent using an alternative protocol, for example a Jumbo frame which can carry up to 9,000B of data, six times that of a standard Ethernet packet. Frame check 186 carries simple error checking-related information for the Layer 2 Ethernet packet 189 but not Layer 1 data for preamble 180 or SFD 181. Frame check 186 utilizes a 32-bit (32b) cyclic redundancy check algorithm, able to detect unintended changes in raw data of the Layer 2 Ethernet packet 189.

The physical standard for Ethernet includes both electrical and optical fiber, with the electrical cable being the most common today. Data rates have evolved over time from 10 Mbps to 100 Mbps to more recently 1 Gbps up to 100 Gbps, called "Gigabit Ethernet. Ethernet cables utilize easily recognized RJ-45 connectors to secure connections between LAN switches and devices such as servers, desktops, notebooks, set top boxes, and modems. In some instances, Ethernet may be used to deliver power to a device, known as "power over Ethernet" or POE.

WiFi (802.11)—

In many instances, Ethernet is employed to establish a wireless network connection with mobile devices, using a short distance radio link. Over time, proprietary wireless links have been replaced by a standardized short distance communication protocol defined by the IEEE802.11 standard, commercially called WiFi. Often merging router and switch functionality with radio receivers and transmitters, WiFi routers are now commonplace in homes, offices, businesses, café s, and public venues.

The radio link shown in FIG. 10 illustrates the combination of two interconnected networks, one comprising "Ethernet MAC access" 200A and the other comprising a radio link, namely "radio access point" 200B. Interface circuitry and related firmware block 202 provides the Layer 1 PHY interface, i.e. the physical bridge 204A and 204B between the electrical network and the radio network, as well as facilitating the Layer 2 data link 205A and 205B between the Ethernet protocol and radio protocol, e.g. WiFi. In operation, data coming from Ethernet 201 enters communication stack 203A, with physical signals connecting to interface 202 through Layer 1 PHY connection 204A and Layer 2 data link information passed through connection 205A.

After processing, data is passed from interface 202 into the communication stack 203B of radio access point 200B, with physical signals connecting through Layer 1 PHY connection 204B and Layer 2 data link information passed through connection 205B. This information is then passed on connection 204 to the radio transceiver and broadcast on any one of several "n" radio channels through radios 206A through 206N as output on radio antenna 207. When receiving radio signals, the data path is the same but in opposite direction to the aforementioned description.

Interface 202 also can also act as LAN switch to support concurrent communication on different radio channels can occur with different Ethernet-connected devices simultaneously, in which case more than one Ethernet cable 201 is plugged into the radio link device. Alternatively, multiple radio conversations can be sequentially sent over a single Ethernet connection to an upstream device, using Layer 3 and Layer 4 to manage the routing of the packets to different recipients.

One standardized device and protocol for short distance radio communication is a wireless local area network or WLAN device operating in accordance with the IEEE802.11 specification. Such devices, commercially known as WiFi, are used for wireless Internet access and for wireless distribution systems or WDS, i.e. radio connections used to replace wireline connections where cabling is inconvenient, difficult, or expensive to deploy. Aside from the master IEEE802.11 specification, subversions such as 802.11a, 802.11n, 802.11ac, etc. are used to specify carrier frequencies, channels, modulation schemes, data rates, and RF communication range. A summary of the subversions of the 802.11 standard approved by the IEEE at the time of this application is listed in the following table:

| 802.11 Version | Release Date | Carrier Freq. GHz | Channel BW MHz | Max Data Rate Mbps | Max # MIMO | Modulation | Indoor Range m | Outdoor Range m |
|---|---|---|---|---|---|---|---|---|
| a | September 1999 | 5 | 20 | 6 to 54 | None | OFDM | 35 | 120 |
| | | 3.7 | | | | | — | 5,000 |
| b | September 1999 | 2.4 | 22 | 1 to 11 | None | DSSS | 35 | 140 |
| g | June 2003 | 2.4 | 20 | 6 to 54 | None | OFDM<br>DSSS | 38 | 140 |
| n | October 2009 | 2.4 or 5 | 20<br>40 | 7.2 to 72.2<br>15 to 150 | 5 | OFDM | 70 | 250 |
| ac | December 2013 | 5 | 20<br>40<br>80<br>160 | 7.2 to 96.3<br>15 to 200<br>32.5 to 433.3<br>65 to 866.7 | 8 | OFDM | 35 | — |
| ad | December 2012 | 60 | 2,160 | 6,912 | None | OFDM single carrier or low power | — | — |

As shown, WiFi operates primarily at 2.4 GHz and 5 Ghz, with 3.7 Ghz designed for long distance WDS routing thus far adopted only by the U.S. The 60 GHz carrier is newly adopted and designed for Gigabit data rates consistent with connecting to other high bit rate networks such as Gigabit Ethernet and fiber/cable using DOCSIS 3. To support parallel operation of multiple users common in café s and public venues, 802.11n and 802.11g offer parallel 5 channel and 8 channel multiple-input multiple-output or MIMO connectivity. To achieve high bandwidth, WiFi primarily uses OFDM or orthogonal frequency-division multiplexing as a method of encoding digital data on multiple closely spaced orthogonal sub-carrier channels.

In operation, OFDM separates a single signal into subcarriers, dividing one extremely fast signal into numerous slow signals. Orthogonality in this context means adjacent sub-carrier channels do not overlap, avoiding confusion as to which channel data is intended. The numerous subcarriers are then collected at the receiver and recombined to reconstitute one high-speed transmission. Because the data rate on the subcarrier channels is lower than a single high-speed channel, signal susceptibility to distortion and interference is reduced, making the method well suited for reliable RF communication even in noisy ambient environments or over long distances. Except for the special 3.7 GHz band, WiFi is limited to short range 70 m indoors and 250 m outdoors with higher broadcast powers. WiFi lacks cellular handoff capability so its use in long distance mobile communication is problematic and relegated to the LTE technology described below.

In WiFi using OFDM modulation, transmitted data is organized into "symbols", a type of data representation that naturally compresses many digital states into a lesser number of symbols. The symbols are then transmitted at a low "symbol rate" to provide immunity from data loss related to carrier transport issues. This approach insures a higher bit rate with a lower error rate, improved QoS, and reduced sensitivity to signal strength fluctuations, RF ghosting, and ambient noise or EMI. A symbol may be any modulation such as a frequency, tone, or specific pulse pattern correlating to each specific symbol, where a sequence of symbols in a fixed duration may be converted to a data stream at a bit rate higher than the symbol rate. The method is analogous to semaphore flags where the flag can be moved into one of sixteen fixed positions in set duration, e.g. in one second. The symbol rate, also known as the "baud" rate, is then one symbol per second, or one baud, where the term one baud is defined as, "the number of distinct symbol changes made to the transmission medium per second". Since the flag may have 16 different values, in binary form, eight states are equivalent to 4 bits, because $2^4=16$ states. Then a symbol rate of 1 per second or 1 baud equals a data bit rate of 4 bps, four times higher than the symbol rate. Similarly, using 16 different tones to represent the symbols, a symbol rate of 10M symbols per second can result in a digital data bit rate of 40 Mbps.

The number of symbols employed affects, however, not only the bit rate but the error rate and communication QoS as well. For example, if too many symbols are employed it may be difficult for the radio's digital signal processor or DSP to accurately discern the symbols in a noisy environment, and the data error rate will rise, requiring retransmission of the data to maintain a valid checksum in the packet's dynamic CRC check. Using fewer symbols at any given symbol rate, makes it easier to discern one from another, but in turn lowers the digital bit rate and communication bandwidth. By analogy, if the semaphore flag can only be moved into one of four positions instead of sixteen, it is easier to see in a rainstorm so the chance of a communication error, i.e. reading it wrong, is greatly diminished. But using only one of four flag positions, the baud rate is still 1 symbol per second but the bit data rate drops to only 2 bps because $2^2=4$. So there is in an intrinsic tradeoff between bit data rate and bit error rate which WiFi can modulate by dynamically adjusting the symbol rate. A similar tradeoff is made in LTE radio communication.

In 802.11 versions a, g, and n, a new symbol can be transmitted every 4 microseconds, or at 250,000 baud for each sub-carrier channel. WiFi employs 64 sub-carrier channels so theoretically the maximum symbol rate should be 16M baud at full channel capacity. But to guard against inter-channel interference only 48 of the 64-subcarrier channels are actually available, reducing the symbol rate to 12M baud at full channel capacity. In modern radio communications, symbols are converted into bits at multiple-levels, the levels changing dynamically with the RF communication conditions using a variety of phase modulation schemes summarized in the table below:

| Phase Modulation | Radio Channel Conditions | Bits per Symbol | Symbol Rate per Subcarrier | Multi-channel Max WiFi Symbol Rate | WiFi Max Bit Rate |
|---|---|---|---|---|---|
| BPSK | Noisy or distant | 1 | 250k baud | 12M baud | 12 Mbps |
| QPSK | Good, medium range | 2 | | | 24 Mbps |
| 16-QAM | Very good, short range | 4 | | | 48 Mbps |
| 64-QAM | Excellent, close proximity | 6 | | | 72 Mbps |

where the relationship between symbol rate and bit rate is defined by the following equation"

$$(\text{Bit Data Rate})/(\text{Symbol Rate})=\text{Bits per Symbol}$$

where the bit data rate is measured in bits per second or bps and the symbol rate is measured in symbols per second or "baud". Of the phase modulation schemes shown, "binary phase shift keying or BPSK works best over long distances and in noisy radio environments, but uses a purely binary method of one bit per symbol, as such it is limited to low data rates. In good radio conditions, the data rate exceeds the symbol rate, i.e. bits per symbol >1 and the radio's bit rate can be increased anywhere from two to six times that of the BPSK rate, depending on radio conditions, the absence of EMI, shorter distances between transceivers, and broadcast power of the radio. For example, in good conditions or for medium range radio links, "quadrature phase shift keying" or QPSK methods offers double the data rate of BPSK with 2 bits per symbol. In very good conditions limited to shorter-range operation "16-level quadrature amplitude modulation", called 16-QAM, can be used to increase the bit rate to 4 times the symbol rate offering 48 Mbps in WiFi communications. Under excellent noise-free radio conditions, the data rate can increase to 6 bits per symbol using 64-QAM, i.e. 64-level quadrature amplitude modulation. Phase modulation schemes in communication are well known to those skilled in the art and will not be discussed further in this disclosure.

In the case of 802.11b and 802.11g, another modulation scheme employed is direct-sequence spread spectrum or DSSS where the term "spread" refers to the fact that in DSSS that carrier signals occur over the full bandwidth, i.e. spectrum, of the radio's device's transmitting frequency. In DSSS, modulating circuitry utilizes a continuous string of pseudonoise code symbols shorter than one information bit to phase-shift a sine wave pseudorandomly prior to transmission and to subtract the same noise from the receiver signal. The result of the filtering is that uncorrelated noise is removed altogether and communication can occur reliably even in the presence of radio noise and EMI, even with signal to noise ratios below unity. Because the spread spectrum utilizes the full radio band, such methods are no longer preferred over OFDM, and are not employed in the newest WiFi implementations.

Aside from stipulating PHY layer details on radio bands and modulation schemes, the 802.11 standard also defines the serial data packet format required when communicating to WiFi radios. Compared to Ethernet packet, the WiFi packet header is more complex, in part because it must specify the radio receiving and transmitting station addresses as well as one or two network addresses. The data structure of a WiFi packet is illustrated in FIG. 11, graphically illustrated as serial data represented from left to right in the direction of increasing time 86. Associated table 242 describes the function of each block or sub-packet in the WiFi packet. Like an Ethernet packet, the data frame includes Layer 2 data link information encapsulated in a Layer 1 data frame with a Layer 1 header.

The Layer 1 header comprises a 10B long preamble 230 and 2B long SFD 231 as well as a 2B long PLCP 232. While PLCP is considered as containing both Layer 1 and Layer 2 data, herein it will be considered as Layer 1 data. Together, then the Layer 1 header can be considered 14B long and the remainder of the WiFi packet constitutes Layer 2 data varying in length from 34B for empty payloads to 2,346B for a maximum payload 241 length of 2,312B. At a maximum payload length of 2,312B, the WiFi packet is longer than Ethernet packets, which in standard form are limited to only 1,500B long payloads. Components of Layer 2 WiFi packet as shown include frame control 233, duration 234, radio base station MAC addresses 1 and 2 shown as blocks 235 and 236 respectfully, conditional MAC addresses 3 and 4 shown as blocks 237 and optional block 239 respectively, sequence 238, and frame check 240.

In operation the purpose of preamble 230 as a Layer 1 data frame header subfield is to assist the hardware in initially identifying a device is trying to send data. Start frame header SFD 231, another Layer 1 artifact, is used for synchronizing the incoming packet data to the timing clocks to enable reading the data reliably. After these two blocks, physical layer convergence procedure or PLCP 232 provides information relating to the length of the packet, the data rate, and error checking of the header.

Frame control 233, the first purely data link Layer 2 data defines the version type of the WiFi packet, i.e. if it contains management related info, control commands, data, or reserved features, including the "To DS/From DS" control bits used to determine if the radio operates as an access point or a wireless distribution system. Duration 234, also known as "duration & ID", defines the network allocation vector duration or NAV duration, i.e. how long the RF medium will be busy before another station can contend for the medium, except in power savings mode, where it contains information identifying its "station ID" used to recognize its beacons when checking for activity. Following the Duration info, Address 1 and Address 2 blocks 235 and 236 define the base station addresses, essentially the MAC addresses of the radio transceiver.

Specifically Address 1 in block 235 contains the BSS receiving station address while Address 2 in block 236 contains the BSS transmitting station address. In the communication of two radios which radio's address is loaded in Address 1 and Address 2 depends on the "To DS/From DS" setting defined in block 233 defining frame control. Address 3 defined in block 237 is used to link the radio to a physical network, e.g. using Ethernet, essentially describing where the data being broadcast is coming from, or alternatively where the data being received is going to. As such, the address present in Address 3 also depends on the "To DS/From DS" setting defined in the WiFi packet. To insure interoperability with Ethernet connections, WiFi addresses are 6B long, the same of the MAC addresses used in Ethernet LANs.

To define the direction of the data and to be able to reorder packets received out of order, i.e. affected from radio phase delays, Sequence 238 block contains sequence and fragment numbers defining the packet frame. Unless the WiFi packet is identified as a WDS or wireless distribution system packet, then optional Address 239 is excluded from the WiFi packet. After the address and sequence control blocks, payload 241 contains the actual content being delivered by the WiFi packet including OSI Layer 3 through Layer 7 data. Thereafter, Frame Check 240 utilizing a 32-bit (32b) cyclic-redundancy-check algorithm is employed to detect unintended changes in raw data of the Layer 2 Ethernet packet.

As described, when a WiFi radio is used as an "access point", e.g. providing a radio connection of a mobile device to the Internet, only three MAC addresses are needed—the transmitting radio, the receiving radio, and the Ethernet connection. The ordering of the addresses depends on the direction of the data flow as defined by the "To DS/From DS" setting. The term DS is an acronym for distribution system, the wireline network or Ethernet connection to which the radio is connected. The ordering of the addresses in a WiFi packet in the case of WiFi access point are illustrated in FIG. 12A, wherein the top figure represents the case where the mobile radio, in this example notebook 260, is wirelessly sending data to WiFi access point 261 and on to the distribution system over Ethernet 265, and wherein the lower figure represents the case where data from the distribution system is routed to WiFi access point 261 via Ethernet 265 then wirelessly sent to notebook 260.

Referring again to the top figure, in operation data is sent from the WiFi radio in notebook 260 using RF signal 264 transmitted from antenna 262A and received by antenna 262B of the base station system or BSS in WiFi access point 261, which in turn sends the packet to the distribution system via Ethernet 265. In this case Sequence 238 contains the "To DS/From DS" bits shown in table 263 where the "To DS" bit is set to binary 1 and the "From DS" bit is reset to binary 0. In such a case Address 1 in block 235, the radio destination MAC address, contains the address of the WiFi BSS receiver, Address 2 in block 236, the radio source MAC address, contains the notebook's transmitting radio address, and Address 3 in block 237 contains the destination MAC address of any distribution system connected device using Ethernet 265.

Referring to the lower figure, where the data flow is in the opposite direction, the radio source and destination MAC addresses are swapped, and the Internet address changes from a MAC destination address to a MAC source address. In this case Sequence 238 contains the "To DS/From DS" bits shown in table 263 where the "To DS" bit is reset to binary 0 and the "From DS" bit is set to binary 1, whereby Address 1 in block 235, the radio destination MAC address, contains the address of the notebook's receiving radio address, Address 2 in block 236, the radio source MAC address, contains the WiFi BSS transmitter address, and Address 3 in block 237 contains the source MAC address of any connected device using Ethernet 265. In operation, data packets are sent across the distribution system from a network connected device and thru Ethernet 265 into base station system BSS in WiFi access point 261 which in turn broadcasts RF signal 264 transmitted from antenna 262B to be received by antenna 262A in the WiFi radio of notebook 260.

The WiFi specification also provides for using WiFi radios for the purpose of implementing a wireless distribution system or WDS as shown in FIG. 12B. In principle, a WDS is a wireless realization of a wireline network, i.e. an RF version of a network cable. To implement a WDS, however, an additional address, Address 4 contained in block 239, is required in the packet routing. In simplified terms, packet routing over a WiFi wireless distribution system requires sequentially using four MAC addresses, whereby (1) an incoming packet from a network MAC source address connects via Ethernet to (2) a transmitting radio source MAC address, which in turn wirelessly connects to (3) a receiving radio destination MAC address, which finally sends the packet via Ethernet to (4) a network MAC destination address. To operate a WiFi radio in WDS mode, WiFi packet Sequence block 238 contains data shown in table 263 where "To DS" and "From DS" are both set to a binary 1 state.

The data direction of a packet is then easily determined by the use of the four MAC addresses, two for the distribution system network and two for the WiFi radio. Referring to the topmost graphic in FIG. 12B, an incoming packet received on Ethernet 269A is received by WiFi WDS A base station 268A, broadcasted as RF signal 264 from antenna 262A of transmitting radio, received by antenna 262B of receiving radio WiFi WDS B base station 262B and forwarded via Ethernet 269B to the destination MAC address. To control the routing, Address 1 in block 235 represents the destination MAC address of the radio link, i.e. the WiFi WDS B address, Address 2 in block 236 contains the source address of the radio link, i.e. WiFi WDS A address, Address 3 in block 237 represents the Ethernet destination MAC address forwarded on Ethernet 269B, and Address 4 in block 239 contains the Ethernet source address received on Ethernet 269A. For data flowing in the opposite direction from WiFi WDS B base station 268B to WiFi WDS A base station 268A shown in lower graphic of FIG. 12B, the source and destination addresses are simply swapped whereby Address 1 in block 235 represents the destination MAC address of the radio link, i.e. the WiFi WDS A address, Address 2 in block 236 contains the source address of the radio link, i.e. WiFi WDS B address, Address 3 in block 237 represents the Ethernet destination MAC address forwarded on Ethernet 269A, and Address 4 in block 239 contains the Ethernet source address received on Ethernet 269B.

In this way, the WiFi packet mirrors the Ethernet data frame comprising Address 3 as a destination MAC address, and Address 4 as the source MAC address as though the radio link wasn't even present in the routing. As such, a WiFi implemented wireless distribution system behaves like a wireline network in routing packets through a packet-switched network. Furthermore, the function of the "To DS/From DS" control bits allow the same WiFi radio to operate as a bidirectional data link, i.e. a WDS, or bidirectionally as a network access point. 4G Telephony/Long Term Evolution (LTE)—

Just as wire-line telephony has migrated from circuit-switched telephonic networks to packet-switched communication, replacing POTS and PSTNs, first with proprietary-hardware based digital networks such as ISDN, and then later with Internet-Protocol-based networks run on privately-managed computer clouds, so too has wireless communication evolved. As illustrated in FIG. 13, the evolution of digital cellular communication started with voice and simple messaging service or SMS services 290 delivered over circuit switched networks referred to as GSM, an acronym originally "Groupe Special Mobile" and as an afterthought changed to mean "Global System for Mobile Communications". Considered the second generation or 2G of wireless telephonics, GSM optimized for full duplex voice communication replaced the original analog cellular or 1G networks using a time-division multiple access (TDMA) protocol. The next improvement in telephony, shown by block 291, emerged to augment GSM's capability by offering higher bandwidth and adding features such as multimedia messaging (MMS). Still relying on circuit switched network technology, the enhanced networks were viewed as a half step improvement as reflected by the name 2.5G.

The first step to 3G mobile telephony occurred with the introduction of "general packet radio service" or GPRS, by transitioning both wireless infrastructure and phone software to a packet-switched communication network, enhancing voice, SMS, and MMS services with push to talk or PTT, always-on Internet access, wireless application protocol or WAP, and more, as shown by block 292. Based on code-division multiple access or CDMA, GPRS also enhanced call quality, increased network capacity, and improved the system performance. For example, SMS messaging over GPRS delivered messages at least triple the rate of GSM. At 384 kbps, the performance of CDMA was 40 times faster than previous GSM solutions.

The switch to CDMA was a significant event, as it involved replacing and reinstalling the entire world's mobile communication infrastructure with new transceivers and antennas. Once deployed, WCDMA enabled a second, even more significant step in 3G-telephony with the introduction of UMTS, the "universal mobile telecommunications system", a standard developed by the 3rd Generation Partnership Project or 3GPP encompassing a more global and inclusive approach to defining and deploying a truly universal network and standardized protocol. To enhance its capability and expand network bandwidth, UMTS adopted a new protocol, wideband code division multiple access or WCDMA radio access technology, to offer greater spectral efficiency and bandwidth to mobile network operators without requiring replacement of their 3G hardware investment. Initial networks offered 3.6 Mbps peak downlink rates.

Coincidently, the concurrent development of the white LED and efficient miniature LED drive circuitry enabled for the first time, the use of color displays in mobile devices, and gave birth to the smartphone. The smartphone was a critical catalyst for commercially driving network bandwidth, as the higher quality color displays created immediate demand for fast Internet access, movie downloads, high-resolution photography, multimedia broadcasting, and even limited real-time video streaming. To fill the demand, high-speed packet access (HSPA), also known as 3.5G, was deployed over upgraded networks boosting both upload and downlink speeds while still using WCDMA modulation techniques. The rollout occurred in phases with high-speed download packet access or HSDPA released first as 3GPP Release 5, and high-speed upload packet access or HSUPA made available soon thereafter in 3GPP Release 6. Peak data rates improved to around 14 Mbps in the downlink and approximately 5.8 Mbps in the uplink but vary dramatically geographically depending on the infrastructure Even before HSUPA could be widely deployed, cellular operators migrated to HSPA+ as first defined and standardized in 3GPP Release 8, also known as "3GPP Long Term Evolution" or LTE. The technology represents a packet-switched only network based on "orthogonal frequency division multiple access" or OFDMA, based on the same OFDM method employed in WiFi as discussed previously. While OFDM was developed for single user point-to-point communication, OFDMA can be considered as its multiuser version because has the ability to dynamically assign a subset of its subcarriers to individual users.

Initial HSPA+ based LTE deployments started at 21 Mbps. In 2008, the International Telecommunications Union-Radio or ITUR communications sector specified a set of requirements for 4G standards, named the International Mobile Telecommunications Advanced or IMTA specification, setting minimum peak speed requirements for 4G service at 100 Mbps for high mobility communication such as from trains and cars and 1 Gbps for low mobility communication such as pedestrians and stationary users.

Since early HSPA+ based LTE systems did not meet the IMTA speed specification, such early 4G precedents were not officially recognized as 4G telephony despite the fact that they utilized OFDMA modulation and entirely packet-switched networks. Consequentially there is no consensus whether to consider HSPA+ technology as late 3G or early 4G packet-switched telephony. Even the name 3.9G has been suggested. Regardless of naming issues, 4G telephony shown in block 293 today refers to packet-switched communication based on OFDMA modulation and various implementations thereof. Despite technical and historical variations of the data protocols and the use of inhomogeneous wireless networks, in the popular vernacular the terms 4G, LTE, and 4G/LTE are used ambiguously and interchangeably.

The high data rates and relatively robust performance of 4G/LTE telephony is largely due to its modulation methods and data frame structure. As shown in FIG. 14A, 4G modulation comprises up to a 20 MHz bandwidth around a center carrier frequency, typically in the range of 700 MHz to 2.6 GHz range, subdivided into subcarrier frequency bands, where downlink communication is subdivided into many narrow bands 296A through 296N needed to implement the subcarrier channels required by OFDMA. To save power in mobile devices, uplink communication is subdivided into fewer wide bands 295A through 295N and employs single-channel version of frequency division multiple access technology, or SC-FDMA. The various bands 295A through 295N are used to concurrently support multiple users but unlike in OFDMA, are not employed to divide up one high-speed data stream into many. As a result, SC-FDMA upload data rates are necessarily slower than OFDMA based download data rates.

Licensed carrier frequencies, listed in the following table, vary by region where phones from one country may not work in another country, unless a multi-band or world phone designed for global roaming is used.

| Region | Frequencies (MHz) | Bands |
|---|---|---|
| North America | 700, 750, 800, 850, 1900, 1700/2100 (AWS), 2500, 2600 | 4, 7, 12, 13, 17, 25, 26, 41 |
| South America | 2500 | 3, 7, 20 |

-continued

| Region | Frequencies (MHz) | Bands |
|---|---|---|
| Europe | 800, 900, 1800, 2600 | 3, 7, 20 |
| Asia | 1800, 2600 | 1, 3, 5, 7, 8, 11, 13, 40 |
| Australia/NZ | 1800, 2300 | 3, 40 |

The above licensed frequencies are subject to change based on the communication commissions managing radio frequency licensing in the various regions.

Shown in FIG. 14B, the 4G PHY layer comprises bursts of RF data 10 ms long to form the 4G-packet or frame 300. Each frame 300 is subdivided into 20 slots of 0.5 ms duration containing 7 OFDM symbols 302. Each symbol 304 is separated from the others by a cyclic prefix 303 and contains fifty resource blocks 305 numbered from 0 to 49 with each block 306 comprising 84 resource elements 307 containing 7 symbols and 12 subcarriers. This data structure supports a flexible encoding used for realizing high bit rates, providing redundancy, and mitigating errors.

FIG. 15 illustrates the encapsulation of data link Layer 2 content within 4G data frame 299 for OFDMA modulation used for 4G data downloads. A similar 4G data packet exists for SC-FDMA uploads, but is not included herein because of its similarity to the packet shown. As shown, each PHY Layer 1 data packet or "data frame" 299 comprises a 10 ms frame 300 with twenty 0.5 ms slots 301 encapsulating data link Layer 2. The Layer 2 data link content of a 4G packet is nested three deep, comprising MAC sublayer for media access control RLC sublayer for "radio link control"

PDCP sublayer for "packet data convergence protocol"

The Layer 2 MAC sublayer comprises MAC header 303, a single-frame of MAC SDUs 304, and time padding 305, where the term SDU is an acronym for service data units. MAC header 303 includes the necessary source and destination MAC addresses for the radio connection. Each single frame of MAC SDUs 304 in turn, contains Layer 2 "RLC PDUs" 306, an acronym for "radio link control protocol data unit" used to control radio operation. Specifically, the RLC PDUs 306 contain RLC header 307 specifying information as to radio operation and protocols and encapsulates "radio link control service data unit" information, i.e. single frame RLC SDUs 308 as its nested payload. Following the completion of RLC SDUs 308 at time 309, new radio link control data with RLC header 311 and another set of RLC SDUs commences after a short delay time 310. The result is a sequential data stream of multi-frame RLC SDUs 319 where the data for K and K+1 blocks 313 and 314 is carried exclusively by single frame RLC SDUs 308, and where K+2 block 314 is composed of both blocks 308 from the current frame and 312 from the next.

In the Layer 2 packet data conversion protocol sublayer, each SDU block contains a combination of a PDCP header and a PDCP SDU. For example K block 313 comprises PDCP header 312A and PDCP SDU 323, K+1 block 314 comprises PDCP header 321B and PDCP SDU 324, and K+2 block 315 comprises PDCP header 321C and PDCP SDU 325, collectively forming PDCP PDUs 320. The content PDCP SDUs 323, 324, 325 in turn contains the payload 330 of the 4G packet, namely data blocks 333, 334, and 335 including network, transport and application layer data. Today all the aforementioned processing required to assemble, transmit, receive, and decode 4G/LTE communication is accomplished in a single dedicated communication IC or digital signal processor (DSP).

Using the aforementioned 4G Layer 2 protocol, 4G offers numerous enhancements over predecessor networks and communication standards, including:

- The ability to utilize multiple input multiple output or MIMO technology to maximize data rates and insure high QoS connectivity;
- Using software based radios to connect to multiple radio networks simultaneously so as to dynamically identify the most appropriate service parameters, e.g. cost, QoS and capacity among others, for a given application;
- Utilizing base stations that support intra- and inter-technology handovers, assuring service continuity with zero or minimal interruption, without a noticeable loss in service quality; and
- The ability to access services and applications on different mobile and wireless networks simultaneously.

Applications of 4G/LTE communication include HD and UHD video streaming, cloud computing, high capacity cloud based storage and online backups, faster web access, ability to send and receive large email files, and more.

DOCSIS3/Cable & Fiber Networks—

Until recently, cable TV and fiber video distribution systems packet-switched lagged the rest of the communication industry in adopting digital broadcasting and packet-switched technology. With the rapid adoption of the third generation release of "data over cable service interface specification" or DOCSIS3, however, cable network capability dramatically improved, offering the unique ability to service a large number of clients with multiple channels of high bandwidth communication concurrently. DOCSIS3 concurrently provides high-speed digital two-way communication and Internet access, VoIP, as well supporting multiple channels of high-definition video streaming including hundreds of broadcast and premium TV channels, unicast TV for pay-per-view, and IPTV downloads.

An example of a DOCSIS3 based cable & fiber network supporting multiple independent users is illustrated in FIG. 16. In cable distribution, the broadcasting of content and management of client communication is directed from a central cable headend device known as "cable modem termination system" or CMTS 350. Various devices feed content to CMTS 350 including a video headend 351 delivering network TV, IPTV system 352 delivering pay-per-view unicast as well as IPTV and movie downloads, VoIP system 353 for telephony, and Internet 20 for web and cloud connectivity. The aggregated information comprising high-speed digital (HSD), voice over Internet protocol (VoIP), broadcast and IPTV is sent to clients as multiple channels 354 carried on a single coaxial cable or optical fiber.

Data packets distributed from CMTS 350 are then connected to a variety of subscribers, and devices including a cable modem merged into set top box CM/STB 357 is connected to high-definition TV 39, or a cable modem CM 358 is used to supply voice communication to phone 37 and high speed digital connectivity to desktop 38 and home WiFi transmitter 26. In a manner similar to bus and hub networks, the aggregated content carried on channels 354 are all carried on the same cable or fiber and received by all CMTS connected devices.

With DOCSIS3, cable model termination system CMTS 350 became a switched network where all the content is not necessarily distributed to every subscriber. This feature known as "bundling" allows CMTS 350 to control which channels can be received by various subscriber's connected devices. As shown, bundled channels 355 carry content for TV 39 and IPTV while bundled channels 356 carry high-speed digital content and voice. The merged cable modem and set top box CM/STB 359 is able to access both bundles 355 and 356 useful in TV 39 is a smart TV while cable model CM 360 used for desktop 36, phone 37 and home WiFi 26 is only connected to HSD/VoIP bundled channels 356 since it doesn't require video connectivity.

Like the previous examples of Ethernet, WiFi and 4G/LTE, content distribution using DOCSIS3 over cable and fiber is bidirectional capable of full duplex operation, all implemented using packet-switched technology. By employing light instead of electrical or microwave signals to carry information on its PHY layer, optical fiber, in particular offers superior bandwidth compared to other forms of communication. The OSI communication stack for DOCSIS3 in a cable distribution system is illustrated in FIG. 17 illustrates Layer 1 PHY connectivity, the Layer 2 data link, and the overlying Layer 3 network for both the cable modem termination device CMTS 101 as well as examples of cable connected devices, e.g. cable modem CM 103 or set top box STB 102. Specifically, cable modem termination device CMTS 101 contains a Layer 1 PHY network interface 361 connected to cloud severs 22 and Internet 20, or alternatively to a video headend 351, IPTV system 352 or VoIP system 352 shown in the prior figure. The combination of network interface 361 and data link layer 366 comprise the device interface communication stack of CMTS 101.

On data link Layer 2, data is passed from the network interface communication stack to the cable network interface communication stack through forwarding function 370, specifically into link level control LLC 369. Link level control LLC 369 comprises a hardware-independent protocol defined in accordance with IEEE specification 802.2. The packet data is then modified by link security 368 to provide limited packet security, primarily to prevent unauthorized viewing of content such as pay-per-view unicast broadcasts. The data packets are then formatted in accordance with DOCSIS3 to include cable MAC 367 addresses in a manner similar to the example shown by WiFi radio bridge of FIG. 10. The Layer 1 PHY cable interface 362 then sends the data frames over distribution network 102 comprising either coaxial cable 104 or optical fiber 91 to the corresponding Layer 1 PHY cable interface 363 within cable modem CM 103 or set top box STB 102. Cable interface 363 represents the PHY layer of the cable network interface communication stack of cable modem CM 103 or set top box STB 102.

Upon receiving a data packet, cable MAC interface 371 then interprets the cable MAC addresses, passing its payload to link security 372 for decryption and ultimately to hardware independent link layer control LLC 373 for interpretation. The input data to the CM or STB cable network communication stack is then passed through transparent bridging 374 to the CM or STB device interface communication stack, specifically to device independent link layer control LLC 375 in accordance with the specification for IEEE 802.2. The packet is then passed to either HSD & IPTV MAC block 376 or to WiFi 802.11 MAC block 377 to update the packet's MAC addresses. In the case of WiFi communication, the data packet is then passed from 802.11 MAC block 377 to WiFi PHY Layer 1 radio interface 365 for transmission on WiFi radio 26. In the case of wireline connections, the data packet is then passed from HSD & IPTV MAC block 376 to Ethernet or HDMI interface block 364 for connecting to TV 39 or desktop 36.

Similar to OFDM used in WiFi or OFDMA used in 4G/LTE communication, DOCSIS3 communication employs multiple orthogonal, i.e. non-overlapping frequencies, either in the microwave or optical spectrum of electromagnetic radiation in which in encodes and transmits its information. Rather than assigning content specifically dedicated to each channel, DOCSIS3 supports "trellis encoding", the ability to dynamically allocate and reallocate content including video, high-speed data, and voice across all its available frequency channels. As shown in several encoding examples of FIG. 18 utilizing 1 to 6 channels, data packets representing a given type of content can be assigned to a single channel or allocated across multiple channels. Data is arranged both by channels 385 and by time slots 386. In the example labeled m=1 (QPSK), time slots $t_0$ through $t_8$ are encoded on a single channel to deliver content from a single source #1. In the example labeled m=2 (8-QAM), two channels encoded using 8-QAM are employed to deliver content from two sources. The modulation method, quadrature amplitude modulation or QAM, is the same employed by WiFi discussed earlier and will not be repeated here. Source #1 delivers data from times $t_0$ to $t_4$ then from source #2 from $t_4$ to $t_8$. In the example labeled m=3 (16-QAM), three channels encoded using 16-QAM are employed to deliver data from three sources. Concurrent to source #2 delivering content 390 on channel m=1 from time $t_0$ to $t_8$, source #1 delivers content 391*a* from times $t_0$ to $t_4$ on channels m=2, while source #2 delivers content 391*b* from $t_4$ to $t_8$. In the example labeled m=5 (64QAM), six channels encoded using 64QAM are employed to deliver contents from five sources. For example, on two sub-channels of m=5 labeled m=2, content from source #3 is delivered from times $t_0$ to $t_4$ and content from source #3 is delivered from times $t_4$ to $t_8$. Meanwhile on the subchannels labeled m=4, content from source #1 is delivered on four channels for time $t_0$ to $t_2$ and then on only three channels from time $t_2$ to time $t_3$. Content from source #2 starts out at time $t=t_2$ on only one of four channels and then increases to m=4 at time $t_3$. In the example labeled m=6 (128QAM), content 389 from source #3 is delivered on two channels of six from time $t_0$ to $t_4$ while the other four channels are used to deliver content 388*a* from source #1 from time $t_0$ to $t_2$ and used to deliver content 388*b* from source #2 time $t_2$ to $t_4$. In the examples shown, trellis encoding provides a cable operator the maximum flexibly in bandwidth management and content allocation.

In the corresponding data packet used in DOCSIS3, shown FIG. 19, PHY Layer 1 comprises physical media device frame 390 of variable length and duration, containing data link Layer 2 MAC data comprising preamble 391, variable length payload or codewords 392 and guardtime 393. Preamble 391 contains either an upstream preamble or a downstream preamble, depending on the direction of communication. In the case of an upstream preamble, preamble 391 contains physical media device PMD header 398, MAC header 399 and data PDU 400. In the case of the downstream preamble, preamble 391 contains MPEG header 401, MAC header 399 and data PDU 400. The content of variable length payload 392 may comprise a short codeword 394 or a long codeword 397.

Short codeword 394 contains payload 395A comprising data A and error correction 396A containing FEC A. In the event of long codeword 397, the payload is divided into multiple payload blocks 395A, 395B, and 395C carrying data A, data B, and data C, respectively, with each payload containing its own error checking blocks 396A, 396B, and 396C including corresponding data FEC A, FEC B, and FEC C. After error checking, the delivered data from DOCSIS3 comprises data blocks 395A, 395B and 395C in the case of a long codeword and only data block 295A in the case of a short codeword.

In this manner DOCSIS3 flexibly delivers data over a cable network using packet-switched data protocol.

OSI Layer 3—Network (Internet) Layer

As described previously, data payloads can be delivered over a variety of PHY Layer 1 hardware configurations and data link Layer 2 interface protocols. While Layers 1 and 2 are specific to devices, Layer 3, the network layer, provides a device independent form of communication, ubiquitous and agnostic to the PHY network used for carrying the signal and data. Layer 3 communication is illustrated in FIG. 20 where three network connected devices 420A, 420B, and 420C comprising computing and data storage functionality 423A, 423B, or 423C all share Internet connectivity 421. As such, each device's corresponding communication stack 422A, 422B, and 422C connects the devices to one another using Layer 3 network 421, which except in proprietary systems generally represents the Internet.

To guarantee interoperability in packet-switched networks operating across various hardware platforms, networks, and systems, the OSI model prescribes a well-defined protocol organized in seven layers as shown in FIG. 21. As mentioned previously, like the babushka or Russian nesting doll where each wooden doll contains another smaller doll inside it, the data packets or "datagrams" for packet-switched networks are arranged in similar fashion where Layer 1, the PHY layer packet or "frame" contains all the other layers within its payload including Layer 2 link layer data which in turn encapsulates a payload comprising Layers 3 through 7, including Layer 4 network packets, and so on.

In greater detail, Layer 1 frame 430 contains all data of the physical or PHY layer comprising electrical, radio or optical signals. Embedded within the PHY layer data 430, is the media access control or data link layer information on Layer 2 comprising MAC header 431, MAC payload 432, and MAC footer 433. MAC payload 432 encapsulates the network (Internet) layer or IP packet on Layer 3 comprising Internet protocol or IP header 434 and IP payload 435. The IP payload 435 encapsulates transport layer datagram or Layer 4 data comprising transport header 436 and transport payload 437. The transport payload 437 then encapsulates all application data 438 for the application layers 5 through 7 consistent with the OSI model shown previously in FIG. 4.

In operation, upon receiving an IP data packet shown in FIG. 21, the network connected device and its firmware interpret the Layer 1 and Layer 2 data and ignore any information contained within MAC payload 432. Network software in turn interprets the IP addresses, routing, and control contained within the IP Layer 3 data but ignores the contents of IP payload 435. Transport Layer 4 software then interprets information contained within IP payload 435 as a transport layer "datagram" comprising transport header 436 and transport payload 437 providing any required handshaking between the communicating parties to insure reliable delivery of the IP packet. Transport payload 437, encapsulates information comprising application data 438 for the remaining upper layer applications including packets containing data for session Layer 5, presentation Layer 6, and application Layer 7. In summary, Layer 1 and Layer 2 are concerned with establishing physical connections and rules for network connected devices, Layers 3 and 4 are concerned with identifying the recipient of an IP packet and confirming its delivery, and Layer 5 through Layer 8 contain the actual information being delivered as a data payload.

Accordingly, Layer 1 and Layer 2 hardware and firmware have no interest in the contents of the data being sent or in its application, Layer 3 and Layer 4 network software doesn't concern itself with what physical devices are sending the packets nor what is the content of the packets, and Layers 5 through 7 do not care how the packet was sent or its reception was confirmed. In this manner routing of a datagram of unknown content can be managed in packet-switched networks without any concern for the hardware used in sending the packet or in the intended use of the packet's data.

To maintain interoperability, packets sent over networks use a standardized format known as Internet Protocol or IP, even in cases when the actual network is not directly connected to the Internet. Layer-3 connectivity may comprise any collection of devices connected to a common packet-switched network using IP packets, including communication over (1) hosted or private servers connected directly to the Internet, (2) private closed networks or "intranets" not connected to the Internet, or (3) closed networks connected to the Internet through "network address translators" or NATs described later in this application. In the former case, any IP address used on the Internet must be registered and licensed to a client as an exclusive and valid Internet address. In the latter two cases, the IP address has meaning only in the isolated network where their use is intended and is not registered as Internet address. Attempts to use non-registered IP addresses on the Internet will result in connection errors.

As shown in FIG. 22, every IP packet contains two elements, an IP header 434 and an IP payload 435. The IP header 434 commonly comprises one of two well-established versions—one for "Internet protocol version four" or IPv4, and the other for "Internet protocol version six" or IPv6. The first 4 bits of IP header 434 contained with the header's preamble 440 or 444 provide a binary code for the Internet version of the packet where 0100 shown as data field 447 represents version 4 and 0110 shown by data field 448 represents version 6. In the event that IPv4 is selected, preamble 440 comprises a field 12B long including the version bits 447, followed by 4B long source address 441, 4B long destination address 442, and 8B long options field 443. In the event that IPv6 is selected preamble 444 comprises a field 8B long including the version bits 448, followed by 16B long source address 445, and 16B long destination address 448. Unlike IPv4, version six has no option field.

Importantly, IPv4 preamble 440 and IPv6 preamble 444 differ in length, content, and format and must be considered separately. Moreover the IP address field of IPv6 is 16B long with the ability to uniquely specify an almost uncountable number of IP addresses, i.e. $2^{128}$. By comparison, IPv4 is only 4B in length and can specify only $2^{32}$ addresses. Because of the limited number of combinations in IPv4, other information is required to identify and separate networks from clients, as specified in preamble 440. IPv6 does not require the need for providing such a distinction. Most modern networks and IP routers today are able to support both IPv4 and IPv6.

Internet Protocol IPv4—

Looking into greater detail in the data packet construction of IPv4 datagram 450, FIG. 23 illustrates a two-dimensional graphical representation of time arranged sequentially from left-to-right by columns and from top-to-bottom by rows, specifically where for each row, time is illustrated by bytes or octets 0 to 3 (or alternatively represented by bits as 0 to 31), and from top-to-bottom each row is labeled with an offset octet where the topmost row labeled "0" is followed by the row labeled "4", then "8", then "12", etc. To properly read the sequential data from datagram 450, the packet starts in the offset octet row labeled "0" where from left-to-right, the first data sent or received comprising preamble 451 contains the aforementioned "version" field, followed by "IHL, DSCP, ECN", and "total length" fields. Following immediately thereafter, data from the next row offset labeled offset octet row "4" is read comprising the fields labeled "identification, flags, fragment offset". Finally the last row labeled "8" in preamble 450 contains the fields "time to live, protocol, and checksum." After the preamble the datagram includes a 4B source IP address, a 4B destination IP address, and on the row labeled as offset octet 20, an "options" field. The last field in datagram 450 comprises variable length payload packet 435. Although the example shows a 4B length, the payload length is variable.

Table 451 provides a brief summary of the information contained in the IPv4 datagram fields. As mentioned previously, the four-bit long (4b) version field sets the Internet protocol to binary 0100 for version 4. The IHL field specifies the number of 32b words in the IP header 434, the length of IPv4 packet 450 excluding payload 435, ranging in value from 20B to 62B. DSCP comprises a 6b field defining differentiated service to control the communication quality of service or QoS. ECN represents a 4b field for explicit congestion notices or ECNs describing the network's loading condition. Total length describes the total length of the IPv4 packet datagram including both IP header 434 and IP payload 435, ranging from a minimum length of 20B to a maximum length of 65,535B. The maximum packet length may be limited to smaller datagrams by the Layer 2 data link protocol for a specific PHY medium. The 2B long "identification" field uniquely identifies a group of fragments of a single IP datagram to enable reassembly of a packet with segments received out of order, used in conjunction with the 3b "flags" and 13b "flags offset" used to manage packet fragmentation. The 1B long TTL or "time to live" field limits the lifetime of datagrams in the network to prevent immortals, packets that cannot be delivered to their intended destination but never expire. The TTL field specifies the maximum number of routers that any specific packet can traverse before being discarded as undeliverable. Each time the packet traverses a router the TTL count is decremented by one count.

Field 460, the 1B long "protocol" field, describes the type of data contained in the IPv4 packet's payload 435. In some cases, this data provides specific instructions, e.g. to check the network condition or propagation delay, to be executed as a Layer 3 packet, while in other instances the payload may be identified as containing Layer 4 transport protocol used to manage packet delivery and confirmation, including ICMP, IGMP, TCP, UDP standard transport protocols or other proprietary formats. In essence, the protocol field is a Layer-4 datagram description in a Layer-3 IPv4 packet, intimately linking the OSI layer 3 to Layer 4 in the Internet Protocol. The header checksum field is used to insure the header data is correct so that the packet is not delivered to the wrong destination. It comprises a 16-bit checksum used to detect errors and data drops. Collectively, the aforementioned fields form IPv4 packet preamble 440

The following two fields, the source IP address and destination IP address, are 4B long and may be represented in a number of formats. The traditional format, referred to as the dot-decimal format, comprises four decimal numbers separated by decimal points, e.g. 192.0.2.235 or in dotted hexadecimal form as 0xC0.0x00.0x02.0xEB where each byte, i.e. octet, is preceded by 0x and individually converted into hexadecimal form. The 32-bit address can also be converted into its decimal equivalent 3221226219 or into a single hexadecimal number 0xC00002EB as the concatenation of the octets from the dotted hexadecimal format. Additional detail of IPv4 address formats can be obtained by referring to http://en.wikipedia.org/wiki/IPv4 or other similar references. The 4B long "option" field, active only when the IHL field is set to 6 to 15, is seldom used because of security risks it creates.

Internet Protocol IPv6—

Because of IP address exhaustion, a new set of IP addresses was instigated referred to as Internet protocol version six. Data packet construction of IPv6 datagram 453, as shown in FIG. 24, like its version four predecessor, comprises two elements, an IP header 434 and IP payload 435 except that the header is significantly simpler and the IP addresses are significantly longer. Specifically IPv6 preamble 444 comprises only 8 bytes in length while the IPv6 addresses 445 and 446 are 16 bytes long.

Table 454 provides a brief summary of the information contained in the IPv6 datagram fields. As mentioned previously, the four-bit long (4b) version field sets the Internet protocol to binary 0110 for version 6. The 1B long "traffic class" field includes a 6b subfield specifying differentiated services and 2b for ECN congestion management similar to version 4. The 20b "flow label" field minimizes fragmentation by maintaining data path to avoid reordering in real-time applications. The 2B long "payload length" specifies the length of payload 435 in bytes (octets). Field 460, the 1B long "next header", specifies the type of content in payload 435. Like the "protocol" field in IPv4, the "next header" field in IPv6 essentially provides information regarding content of IP payload 435. In some instances this content comprises an action, e.g. to check network delays, and comprises Layer 3 data. In other cases, the content comprises Layer 4 transport protocol used to manage packet delivery and confirmation, including ICMP, IGMP, TCP, UDP standard transport protocols or other proprietary formats. Like "time-to-live" in IPv4, the 1B "hop limit" in an IPv6 packet specifies the maximum number of routers a packet may traverse before being discarded as an immortal. Each time the packet traverses a router the count is decremented by one.

The following two fields, each 16B long, specify the source IP address 445 and the destination IP address 446. As mentioned previously the purpose of the longer IP addresses is to overcome the IP exhaustion occurring in IPv4. This issue is illustrated in FIG. 25 for IP addresses 469 contrasting three classes of 4B long IPv4 addresses to the classless 16B long IPv6 address 458. Because the IPv6 address is capable of $2^{128}$ or $3.403\times10^{38}$ unique combinations there is no need to break the addresses into classes allocated specifically to networks and clients. By contrast, because of the limited combinations available in IPv4, the addresses were subdivided into "classes", where today Class A through Class C are still in common use.

As shown, Class A comprises a 1B long network field 456A and a 3B long client field 457A having IPv4 addresses ranging from 0.0.0.0 through 127.255.255.255 to support 128 networks and 16,777,216 (approximately $2^{24}$) clients. Class A users may comprise any large IP provider, telecommunication company, or video provider. Class B addresses comprise a 2B-long network field labeled 456B and a 2B-long client field labeled 457B having IPv4 addresses ranging from 128.0.0.0 thru 191.255.255.255 to support 16,384 (approximately $2^{14}$) networks and 65,536 (approximately $2^{16}$) clients. Class B users may comprise companies with a large number of sites. Class C addresses comprise a 3B-long network field labeled 456C and a 2B-long client field labeled 457C having IPv4 addresses ranging from 192.0.0.0 through 223.255.255.255 to support 2,097,152 (approximately $2^{21}$) networks and 256 (i.e., $2^8$) clients. Class C users typically comprise small business entities.

During routing of a packet through the network or Internet, processing of each field in IP header 434 occurs on a need-to-know basis. For example, each router needs to know the IP version, the packet length, and the packet's checksum to check for errors. Likewise the hop time or time-to-live in also necessarily processed by the intermediate routers to cull immortals. Intermediate routers, however, don't need to interpret every field of IP header 434. Specifically, field 460, the "protocol" field in IPv4 or "next header" in IPv6 has meaning only for the sending and destination IP addresses. Intermediate routers have no need to know the content of IP payload 435 and therefore do not process the information. When a packet finally reaches its destination IP address, only then will the intended recipient device or server read the value of field 460 in IP header 434 to interpret what kind of data is encapsulated within IP payload 435. As shown in FIG. 26, any valid value in field 460 may result in an action relating to a Layer-3 network layer payload or alternatively to a Layer 4 transport layer payload. In the event the code contained in field 460 is not recognized by the destination IP address, the server or recipient device will discard the packet as imperfect.

In cases where field 460 contains Layer 3 network layer payloads as executable instructions, IP payload 435 instructs the network the task to be performed. For example, when field 460 contains the equivalent of the decimal numbers 1 or 2 shown as protocol or next header fields 461 or 462, IP payload 435 will contain corresponding instructions for the network utilities ICMP or IGMP, respectively. Should field 460 instead contain the equivalent of the decimal number 6 shown as protocol or next header field 463, IP payload 435 will contain data 475 for a payload using TCP Layer 4 transport protocol. Similarly, should field 460 instead contain the equivalent of the decimal number 6 shown as protocol or next header field 464, IP payload 435 will contain data 476 for a payload using UDP Layer 4 transport protocol. Layer 4 payloads will be discussed in the subsequent section of this disclosure. Other less common and proprietary codes also exist. If the field 460 contains a protocol or next header code that is a standardized registered code, then public networks, at least theoretically, should respond appropriately to the code and properly interpret the payload. In cases where the code is proprietary, only proprietary networks and customized router can interpret the code and take appropriate action accordingly.

In the case when field 460 contains the equivalent of the decimal number 1 shown as protocol or next header fields, the IP payload 435 carries a specific network utility 435 called ICMP or "Internet control message protocol" used by network devices, like servers, routers, access points, etc. to access network propagation delays, to indicate that a requested service is not available, or identify that a router or host cannot be reached. Its assigned protocol or next header identifier, the decimal number 1, is distinct from UDP and TCP in that ICMP is generally not used to exchange information between systems or end-user applications except in the case of performing certain network diagnostics. As shown in FIG. 26 for the IP packet corresponding to data 461, the ICMP packet comprises a four-part header with type 465, code 466, checksum 467, and rest of ICMP header 468, followed by ICMP data 469.

The "type" 465 and "code" 466 fields together facilitate the delivery of various control messages. Elaborating, type=3 control messages means the IP destination is unreachable, where the code describes why it was unreachable, e.g. for code=0 the destination network was unreachable, code=1 the destination host was unreachable, code 3 the destination port was unreachable, and for code=9 the network is administratively prohibited, etc. When type=5, the packet can be redirected whereby code=0 means redirect datagram for the network, code=1 means redirect datagram for the host, etc. Type=8 "echo request" followed by type=0 "echo reply" together perform the important and well known "ping" function, analogous to a submarine sonar sounding to check the network's propagation delay. Other important functions include "traceroute" for code=30, "domain name request" code=37, domain name reply code=38, timestamp request code=13 and timestamp reply code=14. For delivery issues code=11 means delivery "time is exceeded", code=12 means "bad IP header", and code=4 or "source quench" is used in cases of congestion control. The contents of ICMP data 469 may contain messages or may be used simply to load the network with larger packets to investigate if issues specifically may be plaguing large payload delivery.

Also shown in FIG. 26, when field 460 contains the equivalent of the decimal number 2 shown as protocol or next header fields, the IP payload 435 carries a specific network utility 435 called IGMP, an acronym for "Internet group management protocol". Unlike ICMP used in network diagnostics of both IPv4 and IPv6 networks, IGMP is used only in IPv4 multicasting for one-to-many networking applications such as gaming or online streaming. The term IGMPv4 is not used however, because IGMP's heritage evolved from earlier incarnations of the Internet. Instead IGMPv2, and IGMPv3 are the only protocols supported today. Also in IPv6, multicasting is carried over ICMPv6 using multicast listener discovery and not directly through bare IGMP encapsulation. The IGMP packet contains a four-field header comprising "type" 470, "MRT" 471, "checksum" 472, and "IGMP group address" 473, followed by IGMP data 474.

In IGMP, the type 470 field describes the nature of the packet as "membership query, membership report or leave group" commands, "MRT" 471 or maximum response time sets the maximum time limit to receive a report up to 100 ms, and checksum 472, a 16-bit ones-complement sum of the entire IGMP package. For broadcasting, IGMPv2 sends the IGMP packet and its payload IGMP data 474 to IGMP group address 473 in accordance to the setting of message "type" 470 where a "general query" sends a multicast to all hosts, i.e. 224.0.0.1 and "leave group" likewise sends a message to all routers, i.e. 224.0.0.2. In IGMPv2 "group-specific query" and "membership report" only the group being queried or reported is involved in the communiqué. In IGMPv3, a more comprehensive membership query is possible defining all the connected parties.

Aside from ICMP and IGMP other datagrams comprise proprietary protocols where the source and destination IP addresses must prearrange to communicate using a unique format, otherwise the IP payload 435 will generally comprise data following TCP or UDP transport Layer 4 protocols.

OSI Layer 4—Transport Layer

The function of the OSI transport Layer 4 is illustrated in FIG. 27 where three network connected devices 480A, 480B and 480C containing computing and data storage blocks 483A, 483B, and 483C with corresponding communication stacks 482A, 482B, and 482C share a common network 481. The transport layer insures that communication 484 only occurs between communication stack 482A in device A and communication stack 482B in device B. The purpose of the transport layer is to control communication between the two connected devices, and to provide context for the type of the application data being delivered by the IP packets and the service to be performed. So in essence network 481 of OSI Layer 3 enables the connection of any combination of devices and the transport layer of OSI Layer 4 insures the communication of two specific devices.

The two predominant transport protocols used today are TCP and UDP. In the "transmission control protocol" or TCP, a communication connection between devices is guaranteed by a processing of handshaking, confirming that an IP packet has been reliably and accurately delivered across a packet-switched network before sending the next packet. Using TCP handshaking, a "connection" can be insured even in a "connectionless" packet-switched communication system comprising a local area network, an intranet, or the public Internet. TCP insures reliable, error-checked, properly ordered delivery of a series of digital bytes with high accuracy but with no guarantee of timely delivery. TCP is used to deliver time-insensitive payloads comprising a variety of computer programs, files, text, video, and voice communication including email, file transfers, web browsers, remote terminal functions, and secure shells. For time-sensitive payloads, other protocols better suited for real-time applications such as UDP are preferred.

Transmission Control Protocol (TCP)—

Operating at the OSI transport Layer 7, TCP functions at a level intermediate to the network or Internet Layer 3 and the upper application layers. In delivering IP packets TCP is able to correct for unpredictable network behavior due to network congestion, dropped packets, traffic load balancing, and out-of-order deliveries. TCP detects these and other problems, requests retransmission of lost data as needed, rearranges out-of-order data, and even mitigates moderate network congestion as possible. IP packets delivered by the TCP transport layer may be referred to as TCP/IP datagrams. During packet delivery, a timer is used to monitor the delivery time. In the event the time expires before the packet is delivered, a request to retransmit the package is made. TCP packets are encapsulated within the payloads of IP packets. Received TCP packets are buffered and reassembled for delivery to applications.

In order to identify the application or service for which a TCP packet is intended, the TCP utilizes digital identification referred to as a "port". A port is a number used to uniquely identify a transaction over a network by specifying both the host, and the service performed. Ports are employed by TCP or by UDP to differentiate between many different IP services and applications, such as web service (HTTP), mail service (SMTP), and file transfer (FTP). Communicating devices utilize a combination of both Layer 3 IP addresses and Layer 4 ports to control the exchange of information from the physical network comprising PHY Layer 1 and data link Layer 2, with the upper OSI application Layers 5 and above.

Each TCP packet 500, shown in FIG. 28A, comprises a TCP header 506 and its TCP payload 507. Details of the functions of TCP header 506 are summarized in table 508 shown in FIG. 28B, where TCP header 506 comprises source port 501, destination port 502, sequence number 503, acknowledgement number 504, as well as the "offset, reservation, flags, window size, urgent pointer and options" fields. It also includes checksum 505 to confirm packet integrity. Sequence number 503 is used to keep track of the order of multiple packets and depends on the status of the SYN flag in the "flags" field of TCP header 506. The "acknowledgement" field is used in the handshaking process. If the ACK flag in the "flags" field of TCP header 506 is set to binary one, the acknowledgement field is the next sequence number that the receiver is expecting, and thereafter acknowledging receipt of all subsequent packets.

Data "offset" specifies the size of TCP header 506, i.e. the length of the header from the start of TCP datagram 500 to the beginning of TCP payload 507 as specified in the number of 2B (32-bit) words ranging from 5 2B-long words to 15 2B-long words. Reserved bits are not used at this time. The flags field contains nine binary flags relating to in part to concealment, congestion, urgency, packet acknowledgement, push function, connection reset, sequencing, and no more data from sender. Window size specifies the maximum number of bytes the sender is willing to receive in one packet. Checksum comprises a 2B (16b) checksum for error checking of both the TCP header 506 and TCP payload 507. If the URG flag is set to binary one, the "urgent pointer" field indicates the last urgent data byte to be sent.

In packet communication based on TCP/IP, handshaking is a key feature in insuring data integrity. As shown in FIG. 29 at time t=0, notebook 510 sends a TCP/IP package to web server 531 sending TCP header 512A, TCP payload 513A, and travel time 514A together requiring duration $\Delta t_a$, followed by an acknowledgement from web server 511 to notebook 510 comprising TCP header 512B, and null field 513B requiring duration $\Delta t_b$. Together the combined interval $t_1=\Delta t_a+\Delta t_b$ represents the minimum time to send and confirm a TCP/IP packet, roughly twice the time of the initial packet delivery. Then and only then, can a $2^{nd}$-packet be delivered comprising TCP header 512C and TCP-payload 513C. In the event that a packet is corrupted or lost, the packet must be resent and confirmed, increasing the duration for the delivery from $t_1$ to $2t_1$. Should the packet require being resent "n" multiple times, the duration for just one packet comprises $nt_1$. The variable time delay using TCP transport in extremely problematic when delivering time sensitive packets such as video or VoIP.

In summary, TCP/IP packets have the following characteristics:

- Reliable—TCP/IP guarantee delivery by managing acknowledgement, error checking, retransmission requests, and timeout features
- Heavyweight—TCP/IP utilizes a large transport layer packet with a long complex header and requires at least three packets just to establish a connection "socket" between a host and client.
- Variable/slow rate—Because of handshaking, the data rate of TCP/IP is variable and significantly slower than UDP, making TCP unattractive for real-time applications such as video and VoIP.
- Ordered—TCP buffers and reorders any packets received out of order
- Congestion control—TCP provides several features to manage congestion not available in UDP.
- Error checking—TCP/IP packets are checked for integrity if they are received and retransmitted if any packets are dropped or arrive corrupted.

User Datagram Protocol (UDP)—

As an alternative to TCP, the "user datagram protocol" or UDP employs a connectionless transmission mode, one with a minimal protocol and no handshaking verification of packet delivery. Sensitive to the underlying instabilities of a network, UDP offers no delivery acknowledgements, nor any packet ordering or duplicate protection. It does, however, utilize checksums for confirming data integrity. UDP is most suitable in time-sensitive applications or for purposes where error checking and correction are either not necessary or are performed ex post facto in the application, avoiding the overhead of such processing at the network level.

The UDP 529 packet shown in FIG. 30 comprises UDP header 520 and UDP payload 524. The UDP header 520 described in table 525 comprises only four fields, a 2B-long source port address 521, a 2B-long destination port address 521, "length" field 523, and checksum 523. UDP port addresses utilize the same format as TCP/IP packets. The UDP packet length field 523 ranges from a minimum length of 8B to a maximum length of 65,535B in IPv6. For practical considerations the largest checksum length is limited to a slightly smaller 65,507B in IPv4 protocol.

The 2B checksum 523 is used for error detection of the combined length of UDP payload 524 plus data from UDP header 520, modified algorithmically into a pseudo-header to include IP addresses and other fields borrowed from the IP header. The pseudo-header never exists explicitly in the datagram, but is created, i.e. algorithmically synthesized from the data available in IP header and the UDP header, just for the purpose of error checking. The pseudo-header format and checksum values differ for IPv4 and IPv6 based UDP packets. While the checksum feature is optional in IPv4, its use is mandatory in IPv6. When not in use, the field is loaded with a 0 digital value. After UDP header 520, the UDP payload 524 follows with a variable length ranging from 0B to 65,507B in IPv4.

In summary, both UDP and TCP/IP can be used for Layer 4 transport of an IP packet traversing a switched packet communication network. UDP packets have the following characteristics:

- Unreliable—UDP does not guarantee delivery nor can it sense lost packets. UDP lacks the mechanics for identifying lost packets, for requesting retransmission or for monitoring for time-out conditions during delivery.
- Lightweight—UDP utilizes a small transport layer with a minimal sized header lacking many TCP features and associated packet overhead
- Fast—As an artifact of their small size, UDP packets can be delivered rapidly and do not require handshaking confirmation of delivery or retransmission of lost or corrupt packages. Data rates are at a minimum, twice that of TCP and four times faster than cases involving the retransmission of TCP packets. In unstable networks, the request for retransmission can completely jam any TCP packet delivery
- Unordered—the order packages are received may not be the same order as in which they were sent. The application must be smart enough to reorder out of sequence packets.
- No congestion control—other than as an artifact of its small packet overhead, UDP does not avoid congestion unless such congestion control measure are implemented in the application level.
- Error checking—UDP packets are checked for integrity only if they are received. If they are in error the packets are dropped without any request for retransmission.

Use of Layer-4 Ports—

Ports play an important role in the implementation of Layer 4, the transport layer, in packet-switched network communication. Among other benefits, ports help identify the applications or services provided by a server or device, they assist in allowing multiple users to interact with the same server without intermingling individual client's communications, they provide a means to support full duplex communications using different port pairs for host-to-client and client-to-host exchanges, and they help facilitate the operation of NATs, network address translators, to increase the number of available IP addresses for users while limiting the cost and number of required connections directly to the Internet.

An example of a host-client exchange of datagrams is illustrated in FIG. 31A, where client's device 526B, either a tablet or notebook, requests a web page from host 526A, typically a web server. In the exchange, client 526B sends a IP datagram comprising a Layer-3 IP header 529 having an IP address 527B with a numeric value "IP address B" to a host server at an IP address 527A having a numeric value "IP address A". Encapsulated within the payload of the Layer-3 datagram, the client also sends a Layer-4 transport header 530 containing its own source port number 528A with an ad hoc value of 9,999. The port request is sent to host port 80—a reserved HTTP port 528A used for web browser downloads of web pages. So although the requesting port number 9,999 is arbitrarily assigned in an ad hoc manner from the next open port number, the destination port 80 has a specific meaning for the requested service as a web page request.

A simplified version of the IP datagram used for this web page request is illustrated at the bottom of FIG. 31A comprising Layer-3 IP header 529, Layer-4 transport header 530, and IP packet payload 536. Within Layer-3 IP header 529, source IP address 531 has a numeric value "IP address B", and destination IP address 532 has a value "IP address A". Within Layer-4 transport header 530, source port 533 has a numeric value of port # "9,999", and destination port 534 has a numeric value of port # "80". IP packet payload 536 contains payload (data) field 535 comprising Layer 5 through Layer 7 application data.

FIG. 31B illustrates the reply for the client's request for services. As shown, all the directions of the arrows are reversed and all source and destination IP addresses and port #s are swapped from the prior illustration. In the exchange, an IP datagram containing an Layer-3 IP header 537 is sent from a source IP address 531 having a numeric value "IP address A" to a destination IP address 532 having a numeric value "IP address B". Encapsulated within the Layer-3 datagram, a Layer-4 transport header 538 includes source port 533 having a numeric value of port # "80" and a destination port 534 having a numeric value of port # "9,999". Embedded within IP packet payload 539, the response to the services request is payload (data) 536 which may contain HTML code for creating a web page.

So while some port #s are open and assigned as needed at the election of the server, others are reserved for use in UDP packets, for TCP packets or for both. A list of common official reserved port #s is listed in FIG. 31C including the well-known port 80 for HTTP web browsing using TCP only, port 20 for file transfers, telnet at port 23, POP3 email for TCP only at port 110, IMAP3 email on port 220, and a variety of secure versions such as HTTPS, IMAPS, FTP over TSL/SSL, etc. Recently however, it was revealed that SSL security, the intrinsic transport layer security method, is vulnerable to certain kinds of attacks, as described in one of the headlines at the beginning of this application. Port 7, used for Layer-4 echo and ping functions, has been largely superseded by the Layer-3 ICMP function.

The table in FIG. 31D illustrates ranges of port #s and their use. As shown, reserved port #s generally occur in the range of port #s 0 to 1,023 as "system ports" while for port #s above 49,152, the ports are generally open and freely available. In the intermediate range, for port #s between 1,024 and 49,151, large blocks are open and available for dynamic port allocation but some reserved ports are also present. More commonly, large corporations may report their dedicated use of select ports in their software but not register the port #s officially. Regardless, "official" and reserved port #s, while not strictly policed, receive widespread support because companies want to insure interoperability of their systems and software with the Internet and other businesses.

Ports are also used to facilitate "firewalls", preventing or at least inhibiting unauthorized access to a computer, server, or device for a particular service. For example, any server located on an intranet, i.e. on a private network located behind a NAT or protected by a dedicated network security box, can be limited to specific types of service requests initiated from the Internet. For example, the firewall may be set to block port 80 requests, disabling HTTP service requests and preventing web page downloads from the Internet. Alternatively the firewall can be set to allow only port 25 service requests from the Internet, with no other ports are enabled. In such a cases, the firewall allows simple mail transfer protocol or SMTP service requests, enabling emailing from the intranet to and from the Internet, but blocks all other types of transactions. The problem with such strict firewall measures is the added security blocks many valid transactions, preventing employees and vendors in the field from accessing important information needed to perform their job.

Another use of ports is to assist in delaying the date for port exhaustion in IPv4 IP addresses. Rather than assigning everyone multiple dedicated IP addresses for each personal device, Internet service providers or ISPs such as cable providers, public WiFi operators, cell phone carriers, and other have the ability to recycle Internet IP addresses dynamically and to employ private IP addresses to communicate between their Internet gateway and their private clients. In this manner, a single Internet IP address can serve up to 65,534 users for a Class B subnet or 254 users for a Class C subnet, provided that the upstream connection bandwidth is sufficiently fast to support the traffic.

The device that performs this one-IP-address to many-IP-address bidirectional conversion and communication is referred to as a "network address translator" or NAT. Shown in FIG. 32A, NAT 550 comprises an IP address & port # translation block 554 and two communication stacks comprising Internet connected communication stack 553A and Class C subnet communication stack 553B. Internet connected communication stack 553A connects to all other Internet connected devices such as server 22A, router 27, and web server 511 through public network 531. At the transport Layer 4, communication stack 553A manages concurrent communications with multiple devices such as 557A and 557B. In the example shown, non-public network 552 connects various home devices such as notebook 35, refrigerator 34, desktop 35, and home WiFi router 62A to Class C subnet communication stack 553B. In the private network, the Layer 4 transport protocols manage the communication between communication stack 553B and the network-connected devices, e.g. Layer 4 connections 556A and 556B. In supporting information exchange between the private and public networks, IP address and port translation block 554 dynamically constructs an ad hoc translation table 555 to map each private network packet transmission to the public network and vice versa.

Operation of a NAT is illustrated in FIG. 32B where desktop 36 and notebook 35 connected to a private network "behind the NAT" attempt to simultaneously communicate with Internet connected web server 21A and email server 27 through only a single Internet connected public IP address. In the example shown, notebook 35 has an IP address designated here as "NB" and dynamic port assignment, desktop 36 has an IP address designated here as "DT" and dynamic port assignment, web server 21A has an IP address designated here as "S1" and uses port 80 for HTTP based web page services, and email server 27 has an IP address designated here as "S2" and uses port 110 for IMAP based email services. On the Internet, NAT 550 has a public IP address "N" and uses dynamic port assignment.

In operation, notebook 35 initiates a web page request by IP packet 560A from source IP address "NB" and arbitrary port #9999 to web server 21A at destination IP address S1 and port #80. Concurrently, desktop 36 initiates an email request by IP packet 561A from source IP address "DT" and arbitrary port #10200 to email server 27 at destination IP address S2 and port #110. Upon receiving these requests, NAT 550 maps the incoming messages to an outgoing Internet connection, mapping the address translation in translation table 555. The NAT then forwards the request from notebook 35 by retaining the destination IP address S1 and port number 9999 but swapping the source information from notebook 35 to NAT 550 with a translated source IP address of "N" and a source port #20000 to create Internet IP packet 560B.

In a similar manner NAT 550 translates the request from desktop 36 to email server 27 by retaining the destination IP address S2 and port number 9999 but swapping the source information from desktop 36 to NAT 550 with a translated source IP address of "N" and a source port #20400 to create Internet IP packet 561B. In this way, web server 21A and email server 27 both think they are communicating with NAT 550 and have no idea about any request coming from notebook 35 and desktop 36. In fact the IP addresses used by devices like addresses "NB" or "DT" connected on the NAT subnet are not valid addresses on the Internet and cannot be connected directly without the intervention of NAT 550.

Once web server 21A receives requesting IP packet 560B, it replies by sending HTML code for constructing a web page, routed by IP package 560C from source IP address "S1" and port "80" to a destination IP address "N" and port #20000. By referring to translation table 555, the NAT knows that replies to port #20000 correspond the request from notebook 35, and forwards the message by swapping its destination IP address and port # to the notebook's, namely IP address "NB" and port #9999 to create response IP packet 560D.

In parallel to this transaction, upon receiving the IP packet 560B request from NAT 550, email server 27 replies sending IMAP code containing email, routed by IP package 561C from source IP address "S2" and port #110 to a destination IP address "N" and port #20400. By referring to translation table 555, the NAT knows that replies to port #20400 correspond the request from desktop 36, and forwards the message by swapping its destination IP address and port # to the desktop's, namely IP address "DT" and port #10200 to create response IP packet 561D. In this manner, multiple users can separately address multiple Internet connected devices and sites through a single IP address.

Other Layer 4 Transport Protocols—

Aside from TCP and UDP, there is a general lack of consensus as to whether other common transport protocols operate as unique and independent Layer 4 protocols, if they operate as Layer-4 supersets of TCP and UDP, or if they are simply upper layer application programs running atop of UDP and TCP.

One such protocol, "datagram congestion control protocol" or DCCP is a message-oriented transport layer protocol for managing congestion control useful for applications with timing constraints on the delivery of data such as streaming media and multiplayer online games, but lacks sequencing for out of order packets available in TCP. While it may be employed on a standalone basis, another application of DCCP is to provide congestion control features for UDP based applications. In addition to carrying data traffic, DCCP contains acknowledge traffic informing the sender when a packet has arrived and whether they were tagged by an "explicit congestion notification" or ECN.

Another attempt to manage the timely delivery of packets, specifically text, is LCM or "lightweight communication and marshaling" based on the multicast option of UDP. In contrast to UDP unicast, one advantage of UDP multicast is that multiple applications behave consistently on a single host or spread across multiple platforms. Aside from seeking to minimize network latency, other Layer 4 protocols are used for "tunneling" data to create virtual private networks or VPNs, operating on and across the Internet. One such UDP based protocol is generic routing encapsulation or GRE, point-to-point tunneling protocol or PPTP, secure socket tunneling mechanism or SSTM, secure shell or SSH, and others. Some VPN implementations meant to improve security however actually increase network latency.

Aside from the aforementioned standardized Layer 4 transport protocols of UDP and TCP, it is unclear what the adoption rate of proprietary protocols are and what tradeoffs they make in ensuring low latency at the expense of IP packet corruption, or ensuring security at the expense of increased latency.

OSI Layers 5, 6, and 7—Application Layers

While the port # identifies the type of service requested, the application must understand the nature of the data encapsulated as a Layer 4 payload. Taking action based on the contents of the delivered package is the role of the upper OSI application layers, Layers 5, 6, and 7. The interconnection of multiple devices at an application layer is illustrated graphically in the block diagram of FIG. 33 where three devices 570A, 570B and 570C each with separate computing and data storage capability 573A, 573B and 573C are connected by corresponding communication stacks 572A, 572B and 572C sharing application layer connectivity 571. In reality the devices include connections at all the OSI layers, but for simplicity's sake only the application layer connection is shown.

Aside from connection to a packet-switched network, the main rule for devices to establish communication at the application layers is the same or compatible application must exist on all the communicating devices. For example, a banking program cannot understand a video game program, a CAD program cannot interpret HD video streaming, a music player cannot perform stock market trades, and so on. While many application programs are custom or proprietary to one company or vendor, several applications and services are ubiquitous, and in some cases even governmentally mandated to operate in an open source environment. For example, when Microsoft tried to link its Outlook mail server explicitly and exclusively to Microsoft Windows, courts in the European Union ruled such actions violated anti-trust laws and forced Microsoft to release its mail application as a standalone program with well-defined connections to the operating environment in which it operates.

Soon thereafter, numerous competing mail programs emerged on multiple computing platforms using Microsoft's mail protocols and features.

The distinction between application Layers 5, 6, and 7 are subtle. As a consequence many people refer to the layers collectively in the 7-layer OSI model as "application layers", "upper layers" or even just as Layer 7. In the latter interpretation, Layer 7 is viewed as the true application, and Layers 5 and 6 are considered as layers used to service it, similar to subroutine calls in a computer program. To make matters even more confusing, an alternative five-layer description of packet-switched networks competing with the 7-layer OSI model merges all three application layers into one layer, referred to as layer 5, but closer in construction to Layer 7 in the OSI model.

Session Layer 5—

In the 7-layer OSI model, Layer 5 is called the "session layer", coordinating dialogues between and among applications, including managing full-duplex, half-duplex, or simplex communication, as well as providing checkpointing, recovery, and graceful termination of TCP sessions. It also establishes, manages and terminates the connections for remote applications explicitly in application environments that use "remote procedure calls" or RPC. Layer 5 also deals with managing cross-application sessions when one-application requests access to another application's process, e.g., importing a chart from Excel into PowerPoint. Another Layer 5 application, "socket secure" or SOCKS, is an Internet protocol used for routing IP packets between a server and client through a proxy server and to perform "authentication" to restrict server access to only authorized users. Relying on user identity to confer or deny access and privileges, SOCKS security is therefore only as robust as the authentication processes employed.

In operation, SOCKS acts as a proxy, routing TCP connections through an arbitrary IP address and providing forwarding service for UDP packets. In cases where a client is blocked from server access by a firewall, using SOCKS the client may contact the SOCKS proxy the client's network requesting the connection the client wishes to make to contact the server. Once accepted by the server, the SOCKS proxy opens a connection through the firewall and facilitates communication between the server and the client as though the firewall is nonexistent. Operating at a lower layer than HTTP based proxies, SOCKS uses a handshake method to inform the proxy software about the connection that the client is trying to make without interpreting or rewriting packet headers. Once the connection is made, SOCKS operates transparently to the network users. A newer version of SOCKS, referred to as SOCKS4, enhanced the software so clients may specify a destination domain name rather than requiring an IP address.

Being no more robust than the authentication process used to identify an authorized user, SOCKS may be converted by hackers and criminals into a means to defeat firewall security measures. To combat this exposure, SOCKS5 was developed to offer a greater number of choices for authentication, as well as to add support for UDP forwarding using DNS lookups. SOCKS5 was also updated to support both IPv4 and IPv6 IP addresses. During handshaking and session negotiation, both client and server identify by number the methods available for authentication, namely:

0x00: No authentication
0x01: GSSAPI methods
0x02: Username/password
0x03-0x7F: IANA assigned methods
0x80-0xFE: methods reserved for private use After negotiation is completed and an authentication method is selected, communication may commence. The simplest authentication procedure Username/password has been proven to be intrinsically unsecure and easy broken, especially in four character PIN type passwords. As an alternative "generic security service application program interface" or GSSAPI is not by itself a security method but an IETF standardized interface calling on a software library containing security code and authentication methods, mostly written by security security-service vendors. Using GSSAPI, users can change their security methods without the need to rewrite any application code. The procedure calls include obtaining the user's identity proof or secret cryptographic key, generating a client token or challenge to send to the server and receiving a response token, converting application data into a secure or encrypted message token and restoring it, etc. Alternatively, "Internet assigned numbers authority" or IANA, a division of the non-profit ICANN, i.e. "Internet corporation for assigned names and numbers," has assigned certain methods under its charter to ensure network stability and security.

Presentation Layer 6—

Layer 6 manages the syntactic representation of data and objects including maintaining agreement on character coding, audio, video, and graphical formats. In essence, the presentation layer, sometimes called the syntax layer, prepares or translates files and embedded objects into a form usable by a given application and "presents" the data to the application Layer 7. For example, if a graphical object is received in a format not comprehendible by a given application, presentation layer software, whenever possible converts or transforms the format to be acceptable for a given application. Conversely, Layer 6 may convert proprietary formatted objects into standard formats and encapsulate them before passing them down to the session Layer 5. In this manner, Layer 6 establishes a syntactic context between dissimilar applications for moving data up and down the communication and protocol stack. For example, a graphic created in Adobe Illustrator or AutoCAD may be imported and embedded into a PowerPoint presentation or into a HTTP based email document.

Layer 6 is also responsible for encryption, i.e. formatting and encrypting data before sending across a network, and conversely decrypting data and reformatting it before presenting it to the application layer. For example, upon receiving a tab-delineated data file sent in an encrypted format over the Internet, Layer 6, once it has decrypted the file according to negotiated decryption keys, can reformat the data for importation into a row-column based spreadsheet, e.g. Excel, or a relational data base such as Oracle. To enhance security, encryption and decryption by Layer 6 can be restricted to authorized senders and recipients whose identity is confirmed a priori via a Layer 5 authentication procedure. The security of such communiqués is no better than the encryption used to obscure the data file and the authentication process used to confirm a user's right to access the data file.

While presentation layer software can be developed on a full custom basis for a specific device or operating system, for transportability and interoperability the code may be constructed by employing basic encoding rules of "abstract syntax notation, version 1" or ASN.1, including capabilities such as converting an EBCDIC-coded text file to an ASCII-coded file, or serializing objects and other data structures from and to XML. As a Layer 5 presentation protocol, ASN.1 maps structured data to specific encoding rules, e.g. transforming an integer into a bit string to be transmitted and likewise decodes the bit string using "XML encoding rules" also known as XER. Examples of various formats covered by Layer 6 operations include:

- Text including ASCII and EBCDIC formats
- Graphics including PNG, JPG, GIF, BMP, EPS
- Sound and video including MP4, WMV, MOV, AVI, MIDI
- Documents including PDF, DOC, PPT, HTML, XML, MIME, compression (e.g. ZIP)
- Streaming including RTP, RTSP, RTMP
- Encryption including TLS/SSL, SSH Application Layer 7—

In the seven-layer OSI model, Layer 7, the "application" layer facilitates the interface between a user, client, or device with a host, server, or system. Because the applications layer is closest to the user, it facilitates the interface between the user and host. In the case where the user is human and the host is an electronic device such as a cell phone or computer, this interface is facilitated through keystrokes, touch or gestures using a keyboard or touch screen or sometimes through voice. Touchscreen interfaces, originally referred to as GUIs, or graphical user interface, has largely given way to the term UI/UX meaning user-interface/user-experience, an interface design based on studying human-machine interaction. In machine-to-machine or M2M and machine-to-infrastructure or M2X, the human interface is replaced by dissimilar hardware devices speaking different machine languages.

Regardless of these differences, the application layer must allow human and machine or multiple machines to talk to one another in a recognizable form. Since the OSI model deals with the communication and protocol stack, these interfaces fall outside the scope of the OSI model but still play an important role in negotiating a conversation including identifying communication partners, determining resource availability, and synchronizing communication. When identifying communication partners, Layer 7 must determine if another party has the right software installed, is allowed to communicate, and carries the right credentials.

In some cases, it may require Level 5 to first authenticate the other party's identity before initiating any data exchange. This confirmation can be performed at the time of the information exchange request, or negotiated a priori through a process of bonding, or using AAA validation, a three step procedure meaning authentication, authorization, and administration. In communication applications such a cell phones using VoIP, the application software must also test to confirm in the network is available and sufficiently stable to place a call, i.e. to establish a sequence of IP packets sent and received with acceptably small latency to support a conversation with acceptable QoS levels. In synchronizing communication, all communication between applications requires cooperation that is managed by the application layer.

Some examples of application-layer implementations include terminal emulation, email services, network management, web browsers, file management, backup and cloud storage services, peripheral drivers comprising:

- File management including FTP, FTAM, SFTP, NNTP, IRC, SIP, ZIP
- Web browsers including HTTP (e.g. Safari, Firefox, Chrome, Outlook, Netscape, etc.)
- Email services including SMTP, IMAP, POP3 along with Microsoft Outlook, Apple Mail, Google Gmail, Yahoo, Hotmail, etc.
- Communication and broadcast services including SIP, NNTP, IRC and "over-the-top" or OTT custom implementations
- Network management including DNS, SNMP, DHCP, SNMP, BGP, LDAP, CMIP
- Terminal emulation including Telnet
- Backup and cloud storage services including NFS and commercial versions Android, iOS, Apple Time Machine, Apple iCloud, Carbonite, Barracuda, Dropbox, Google Drive, Microsoft One Drive, Box
- Peripheral drivers including printer, scanner, camera, flashcards
- Security applications such as Symantec, Norton, AVG For computer and smartphone applications, example the most common applications as underlined, comprise file transfers, hypertext transfers for web browsing, email services, and DNS lookups for converting domain names into IP addresses. Because of their ubiquity, these generic applications have dedicated ports assigned for such services.

File Management Applications—

One common Level 7 application, the file transfer program or FTP, used for sending files or downloading data. The files, once downloaded, are "written" into a nonvolatile storage drive for later use. If the files includes executable code, the download and install program together with the device's operating system open and install the software into the apps directory on the computer or mobile device.

This process is illustrated in FIG. 34, where notebook 35 having a numeric IP address "NB" and dynamic port assignment requests a file from file server 21A by sending IP packet 580 as an FTP request using TCP transport, to port #21, the FTP control port of the file server. The resulting IP packet 580 includes destination IP address "S1", the destination port #21, along with its source IP address "NB", and its ad hoc port #9999. Since port #21 represents the control port for requesting file transfer services, file server 21A knows that notebook 35 is requesting a file and expects login information to confirm the packet's destination IP address and port number.

In an active FTP session, notebook 35 then sends the destination address and destination port # for the requested file, analogous to providing wiring instructions for a bank wire transfer comprising a SWIFT code and an account number. The resulting IP packet 581 includes the notebook's IP address "NB" and its port #9999 as the source info, and the server's IP address "S1" as the destination. The destination port # of the packet is changed to port #20 to negotiate the FTP data channel separate from the command connection.

In response, file server 21A then opens the IP packet's payload to determine the file name and optionally the file path being requested, and after locating file 583, encapsulates it into a responsive IP packet 582 and sends the packet back through the data to notebook 35 by swapping the IP addresses and ports, i.e. where the destination becomes IP address "NB" at port #9999, and the source becomes IP address "S1" and port #20. Like the previous two transactions, the IP packet uses TCP as its transport mechanism.

Once notebook 35 receives the file, it is extracted from the payload of packet 582 and possibly converted using presentation Layer 6 into the data file 583 for storage or for uploading into the notebook's operating system 585. If so, the program or another program, a utility in the operating system, uploads 583 the executable code of file 583 to create application program 586.

Two issues persist with the original implementation of an active FTP file transfer. Firstly, since FTP command port #21 is an open standard, hackers frequently use it to attempt to fake their identity and download unauthorized files, or otherwise to cause denial of service attacks which jams the device from being able to operate. The other issue with an active FTP transfer is IP packet 582 sent from the file server may become blocked by a NAT or firewall, intercepting its delivery to notebook 35. A variant of this procedure, called passive FTP can circumvent the firewall issue but now most NAT routers are FTP aware and support file transfers with proper credentials or authentication.

In addition to FTP services available on port #20, or alternatively "secure file transfer protocol" also known as SSH file transfer protocol. The transfer utilizes the secure shell or SSH port #22, the same one used for secure logins and secure-port-forwarding. Alternative file transfer applications include the less adopted "file transfer access and management" or FTAM, and data compression using ZIP and other algorithms.

Web Browsers & Web Servers—

Another broad class of Layer 7 applications comprises programs that use a specialized formatting technique called "hypertext". These applications include "web servers" that store hypertext documents; "web browsers" who read and display them; and a specialized communication transfer protocol with dedicated registered port assignments to facilitate rapid access. A key component, the web browser is a graphically oriented communication program designed to download and display hypertext documents from the Internet, intranet or other packet-switched networks. A browser's network companion, the web server, is a high-speed computer used to distribute hypertext documents to browsers requesting access to their files. Hypertext may also be used to display emails with embedded formatting not available from simple email viewers.

In operation, browsers do not establish direct connection with other browsers but instead exchange information through intermediaries comprising one or more web servers accessible by both. To publish a document, a user simply "posts" the document or image to a "web page" hosted on any server connected to the Internet or any other private or public network or cloud. The user posting the document decides who has access to the posted files and whether or not they have read-only or editing privileges. The web server hosting the documents may be owned or managed by the document's publisher, or may represent a disinterested party uninvolved in the posted content and web page design.

Hypertext-based documents utilize a specialized document format language called HTML or "hypertext markup language" to display textual, graphical and video content in manner that is dynamically adjusted to best fit the window it will be displayed in. The function of HTML is to download the material to be displayed and to dynamically format it on a page-by-page basis. Each page may contain both static and dynamically sized fields with text loaded from hard-coded software or downloaded from a file or database. Although more complicated to design and write, the advantage of using a database for HTML page content is that the database can be updated often or regularly and the web page will automatically adjust. Otherwise, every web page must be redesigned as content changes. HTML also specifies the location of objects including fixed location footers, headers, sidebars, and fields, as well as floating objects that text dynamically wraps around.

The objects themselves can represent static graphical objects or photos, animated graphics, flash videos, audio files, videos and HD movies, and more. Like text, the formatting may be hard coded or dynamically linked. Linked objects may be translated using Presentation Layer 5 functions from one format or object type into another dynamically. For example, a predefined field within a spreadsheet may be converted into a static snapshot or graphic at the time the page is drawn. Other objects may also comprise live links to other servers and webs sites and when clicked may transfer information about the web page viewer's computer, personal and contact information, or preferences and interests, with or without prior approval of the viewer. In essence, clicking a link is considered a tacit approval of the terms and conditions of the host of the linked web page. For example, clicking on a banner ad for a new car may send information to a database for people interested in buying new cars, and result in unwanted "spam" email for new car promotions being sent to the viewer's personal email. On dynamic web pages, the content of the banner advertising fields may from that time on, automatically start to display automotive advertising—all based on one single action of a viewer's clicking a link and viewing an advertisement. Internet marketing companies sell such information about users to merchants and advertisers even without knowing whether their collection of a viewer's behavior is real or unintentional.

Importantly, in hypertext-based documents, much of the text and almost all the objects used to construct a requested web page are not included in the initial HTML download of a web page but instead are loaded after the initial HTML page is. The documents and objects are not loaded using the aforementioned FTP protocol, but instead utilize a more dynamic process referred to as HTTP or "hypertext transfer protocol". HTTP represents an application and a data format operating at the presentation Layer 6 and servicing Layer 7 applications such as web browsers.

At Layer 4, the transport layer, HTTP operates on its own reserved port # for web access, specifically port #80. Because port #80 is often authorized and unblocked by firewalls or security software, like FTP port 21, port 80 is a favorite target for hackers wishing to gain unauthorized documents or access, or to launch "denial-of-service" attacks, a malicious attack on a server to prevent it from supporting normal functions by forcing it to service meaningless FTP or HTTP requests from a hacker or adversary.

The procedure for downloading a web page via HTTP is illustrated in FIG. 35A where notebook 35, having an IP address "NB" and an ad hoc port #9999, requests an HTML document from web server 21A at an IP address "S1" using IP packet 590. To request a web page, IP packet 590 specifies port #80 of the web server. In response, web server 21A then attaches an HTML payload and return IP packet 591 by swapping the addresses and port #s from that of packet 591, namely where the source is now port #80 at IP address 9999 and the destination is now port #9999 at IP address "NB". The HTML data is carried using a TCP based connection to insure high payload reliability.

After receiving the HTML code, the browser in notebook reads the HTML file and identifies one-by-one the IP calls to download content into the web page. In the example shown, the first call for graphics is to download content from the same web server 21A as the first download, so notebook 35 prepares IP packet 592 again to destination IP address "S1" and port #80. Because the notebook's port is assigned dynamically, the source of IP packet 592 changes to ad hoc port #10001 but remains from IP address "NB". As a response web server 21A encapsulates JPEGs into the payload of IP packet 593, swapping the source and destination addresses so that the source is port #80 from IP address "S1" with a destination of port 10001 at IP address "NB". Upon receiving IP packet 593, the browser in notebook unwraps the payload, converts the graphics format using presentation Layer 6 into a browser compatible format, then sizes and installs the pictures into the browser page, i.e. the Layer 7 application.

As illustrated, the next object download request in the HTML page is not from web server S1 but from a completely different server, specifically media server 511 having an IP address "S5". As such the web browser in notebook 35 prepares IP packet 594 as another HTTP request to destination port #80, this time at destination IP address "S5". While the source IP address remains "S1", with dynamic port assignment, the source port # again changes, this time to port #10020. In response, media server 511 prepares IP packet 595 from a source having its IP address"S5" and port address 80, to the notebook's most recent IP address "NB" and port #10030. The attached payload encapsulated in IP packet 595 contains MPEGs. Once received, presentation Layer 6 prepares the files, delivers them to application Layer 7, where the browser application installs them, and continues reading the HTML code and assembling the web page until it is complete.

So using HTML, the content of a web page is not constructed from a single download like a file sent using FTP, but is built using a succession of calls to different servers each delivering specific content. This concept is illustrated graphically in FIG. 35B, where HTML generated page 591, text and JPEG 593 are downloaded from port #80 of web server "S1", MPEG video 595 is downloaded from port #80 of media server 511, and PNG photo 596 and JPEG 597 come from port 80 of file server 27. In this manner a web page is built from multiple sources. Aside from the HTML code requesting the various textual, graphical and audio-video elements, there is no central command or control in charge of creating the document. If for example, one server exhibits a slow response because of its own loading of from traffic congestion, the painting of web page 591 may hang, stopping for some time before it is completed. This interruption may have nothing to do with the host of the web page, for example Yahoo, but instead may be caused from the linked servers called by the HTML web pages, e.g. from CNN or Fox news servers.

One risk of HTML web pages is the opportunity for hackers and malware to gather information about a user, specifically if a link is redirected to a pirate site phishing for personal information under the auspices of being a valid ethical business in sincere need of a user's home address, credit card number, PIN, social security number, etc.

The World Wide Web—

One extremely popular, if not universal, application of HTML is web browsing for documents available over the World Wide Web, specifically web addresses reached by typing an address into a browser starting with the letters "www". In operation, each time a user types a web address, also known as a "uniform resource locator" or URL into a browser's address bar, e.g. "http://www.yahoo.com", the browser sends out an inquiry to the router located immediately above it to determine the targeted IP address. This process, illustrated previously in FIG. 3, comprises notebook 60 sending an IP packet to router 62A with a port #53 request, the port number identifying a services request for DNS lookup. Router 62A forwards the DNS request to domain name server router 62A, which in turn supplies the numeric IP address of the targeted domain. If, for example, server 66A is the Yahoo web server with a numeric IP address "S11", then DNS server 71 will return that IP address to router 62A, and the IP packet is constructed with an IP address "S11" and a web page destination port #80.

It should be noted while many documents are accessible over the World Wide Web, not all Internet documents are posted on the web. Some web pages, for example, while accessible over public networks, do not use the www prefix, primarily to discourage hackers from searching for them. Other web servers utilize private networks or intranets hidden behind a firewall, and are accessible only from behind the firewall or through access using an encrypted pipe or tunnel known as a "virtual private network" or VPN. To understand the unique property of the World Wide Web, it is important to understand its development and evolution, responsible both for its benefits and strength as well as for its deficiencies and vulnerabilities.

Historically, prior to the invention of the World Wide Web and the browser, communication over the Internet primarily relied on email and on file transfers using the FTP protocol. Then in 1989, Tim Berners-Lee demonstrated the first successful Internet communication between a client and server using "hypertext transfer protocol" or HTTP. Thereafter, at the National Center for Supercomputing Applications at the University of Illinois Urbana-Champaign, Marc Andreesen developed the first full-featured browser named Mosaic, renowned for its pioneering intuitive interface, support of multiple Internet protocols, compatibility with Macintosh and Microsoft Windows environments, backward compatible support of earlier protocols such as FTP, NNTP, and gopher, as well as easy installation, robust stability, and good reliability. Of key significance, Mosaic was the first browser to display images and text together on one page rather than opening graphics in a separate window.

Mosaic was quickly commercialized into Netscape Navigator, and in many respects responsible for fueling the Internet revolution and the widespread use of web sites for personal and business applications. While countless browsers exist today, Firefox, a direct descendant of Mosaic and Netscape, as well as Microsoft Explorer, Apple Safari, and Google Chrome represent the most widely used browsers today. Another class of application, the web search engine, concurrently emerged to facilitate searching for documents and content on the World Wide Web. Search engines such as Google and Yahoo Search dominate the market today.

As businesses flocked to the Internet, e-commerce was born with web-based sales and purchases emerging on generic sites such as Amazon, eBay, Barnes & Noble, Best Buy, and recently Alibaba. Market fragmentation soon ensued with vendors specializing on a specific type of product or service, rather than offering a generic e-commerce web site. For example, commercial merchants based on comparative shopping for travel and transportation such as Priceline, Expedia, Orbitz, and Sabre quickly appeared along with the airlines' own dedicated e-marketplaces. For users wishing to download "content" comprising music, video, e-books, games, and software, providers such as Apple's iTunes and AppStore, Walmart, Amazon MP3, Google Play, Sony Unlimited Music, Kindle Fire, and Windows Store offer online services. Audio and video streaming services such as iTunes, Google Play, Netflix, Hulu Plus, Amazon Prime, along with iHeart radio and cable providers such as Comcast Xfinity are now becoming increasingly popular, especially with WiFi services being offered in airplanes, busses, limos and in terminals and coffee shops globally.

Despite concerns over privacy and security, children and younger generation adults today post a tremendous amount of personal information on public websites. Called "social media", the industry started with web sites supporting convenient publication, updates, and editing of documents where individuals posted their personal opinions and experiences chronologically on web logs or "blogs". YouTube then enabled aspiring artists with the ability to post and distribute homemade videos. Facebook expanded on this trend, offering blog features chronologically merged with photo and video postings in an interactive format where viewers of your "home page" post comments including when they "like" something they read or saw. Facebook also expanded on contact management, searching people's contact lists for friends to add into Facebook, and allowing the account owner to "friend" someone by requesting access to their home page or ignore them. By reaching into people's personal contact managers, the number of Facebook users grew exponentially, enabling people with out-of-date contact info to rediscover one another over social media. The same social media methods were then adapted for dating, matchmaking or obtaining sexual services (legal or illegal), and in the professional world for contact industry peers, e.g. using LinkedIn.

Based on the same open-source philosophy as the Internet and OSI packet-switched networks, the World Wide Web lacks any central command or control and as such remains unregulated, making it difficult for any government or regulating agency to control, limit, or censor its content. Moreover, by publishing personal information, it has become easier for criminals to "case" a target harvesting their public information in order to better guess their passwords, watch their activities, and even track their whereabouts using GPS and transaction information. In some instances, e.g. on an open source contact and referral service called Craig's List, sexual predators and murderers disguised their identity and intentions in order to recruit victims of their perverse crimes. Aside from criminals and hackers using the World Wide Web and social media to monitor their targets, recent news revelations have shown that governments too track and monitor citizens' emails, voice calls, web sites, blogs, and even daily movements, without probable cause or a warrant approving them to do so. One argument used to justify such intrusions is that information freely distributed on a public site or over a public network is "fair game" and that the need to preemptively prevent crime and terrorism before it happens, much like "future-crime" in the popular movie "Minority Report", is in itself justification for such aggressive surveillance and spying.

As a reaction to identity theft and to such unwanted governmental intrusions, consumers are migrating to sites like Snapchat and phone services reporting enhanced security and privacy requiring confirmation or "authentication" of the other party as someone you know and trust. Such "trust zones" as they are now referred to, still however depend on security methods available for packet-switched communication networks. As evidenced from the opening section of this application, these networks, communication protocols, web sites, and data storage are not, however, secure, otherwise there would not be so many reported cases of cybercrime in the press today.

Email Applications—

One of the most common and oldest applications over packet-switched networks is electronic mail or "email". This process is illustrated in FIG. 36, where notebook 35 having a numeric IP address "NB" and dynamic port assignment uploads email IP packet 601 to email server 600. In addition to its encapsulated SMTP email payload, TCP-based email IP packet 601 includes its destination IP address "S9", its destination port #21 or alternatively port #465, along with its source IP address "NB", and its ad hoc port #10500. While port #21 represent email services using simple mail transfer protocol or SMPT, port #465 represents its "secure" version SMTPS based on SSL technology. Recent news has reported, however, that SSL has been found to be breakable and not completely immune to hackers.

In response to receiving email IP packet 601, email server 600 acknowledges its reception by returning IP packet 602 containing SMTP confirmation sent to a destination IP address "NB" at port 10500 from email server 600 at source IP address "S9" using port #21 or using SSL port #46. Meanwhile, email server 600 concurrently pushes the email as an IMAP message in IP packet 605 from source IP address "S9" and IMAP port #220 to desktop 36 at destination IP address "DT" and ad hoc port #12000. Upon receiving the email message, desktop 36 confirms the IMAP message to email server 600 with IP packet 604 from source IP address "DT" at port #12000 to destination IP address "S9" and port 220. As such, email delivery involves a three-party transaction involving the sender from notebook 35, the email server 600, and the recipient at desktop 36. In the communication, the sender utilizes a SMTP protocol and the message recipient utilizes the IMAP protocol to confirm the message. The IMAP exchange updates the database on the server and on the desktop to insure their file records match. Because the email server acts as an intermediary, there is an opportunity to intercept the communiqué either by intercepting notebook to server IP packet 601 or server to desktop IP packet 605 or by hacking the file itself stored on email server 600. Alternatively, "plain old post-office" or POP3 applications can also be employed for mail delivery but without file server synchronization.

Other Layer-7 Applications—

Aside from file management, web browsers, DNS servers, and email functions, numerous other applications exist, including terminal emulation using Telnet, network management, peripheral drivers, backup utilities, security programs, along with communication and broadcast applications. For example backup applications include the TCP-based "network file system" or NFS, now in its fourth incarnation, as well as commercial backup software including custom versions for Android, iOS, Apple Time Machine, Apple iCloud, Carbonite, Barracuda, Dropbox, Google Drive, Microsoft One Drive, Box. In operation, cloud storage stores data on a network-connected drive in a manner similar to an email server. The data may be retrieved by the file owner, or if privileges allow, by a third party. Like email transactions, numerous opportunities exist to hack the data during transport and when stored on the server.

Communications and broadcast applications include "session initiation protocol" or SIP, a signaling protocol widely used for controlling multimedia coms sessions such as voice and VoIP, "Internet relay chat" or IRC, an application layer protocol for transferring messages in the form of text, as well as "network news transfer protocol" of NNTP, an application protocol used for transporting news articles between news servers and for posting articles. "Over-the-top" or OTT carriers such as Skype, Line, KakaoTalk, Viper, WhatsApp, and others utilize customized applications to deliver text, pictures, and voice over the Internet using VoIP.

Other applications include customized peripheral drivers for printers, scanners, cameras, etc. Network applications include "simple network management protocol" or SNMP, an Internet-standard protocol for managing devices on IP networks including routers, switches, modem arrays, and servers, "border gateway protocol" or BGP applications as standardized exterior gateways to exchange routing and reachability information between autonomous Internet systems, and "lightweight directory access protocol" or LDAP for managing directories by allowing the sharing of information about services, users, systems, networks, and applications available throughout private networks and intranets. One feature of LDAP-connected applications is that a single login provides access to multiple devices connected over a single intranet. Other network applications include CMIP, or the "common management information protocol".

Another important network application is DHCP or "dynamic host configuration protocol". DHCP is used for requesting IP addresses from a network server ranging from home networks and WiFi routers to corporate networks, campus networks, and regions ISPs, i.e. Internet service providers. DHCP is used for both IPv4 and IPv6.

Quality of Service

When considering the performance of a network, several factors are considered namely, Data rate, i.e. bandwidth Quality of service Network and data security User privacy Of the above considerations, data rates are easily quantified in millions of bits per second or Mbps. Quality of Service or QoS, on the other the other hand, includes several factors including latency, sound quality, network stability, intermittent operation or frequent service interruptions, synchronization or connection failures, low signal strength, stalled applications, and functional network redundancy during emergency conditions.

For programs, files, and security related verifications, data accuracy is a critical factor. Which factors are important depends on the nature of the payload being carried across a packet-switched network. In contrast, for voice and video comprising real-time applications, factors affecting packet delivery time are key. Quality factors and how they affect various applications such as video, voice, data, and text are illustrated in a qualitative manner in the table shown in FIG. 37. A good network condition typified by consistent high data rate IP packet waveform 610A is one where there are minimal time delays, clear strong signal strength, no signal distortion, stable operation, and no packet transmission loss. Intermittent networks represented by lower data rate packet waveform 610B with occasional intermittencies affect video functions most significantly, causing painfully slow video downloads and making video streaming unacceptable. Congested networks operating a lower effective data throughput rates with regular short duration interruptions exemplified by IP packet waveform 610C not only severely degrade video with jerky intermittent motion, fuzzy pictures, and improper coloring and brightness, but also begin to degrade sound or vocal communication with distortion, echo, and even whole sentences dropped from a conversation or soundtrack. In congested networks, however, data can still be delivered using TCP by repeated requests for rebroadcasts.

Illustrated by IP packet waveform 610D, unstable networks exhibit low data throughput rates with numerous data stoppages of unpredictable durations. Unstable networks also include corrupted IP packages as represented by the darkly shaded packets in waveform 610D, which in TCP based transport must be resent and in UDP transport are simply discarded as corrupt or improper data. At some level of network degradation even emails become intermittent and IMAP fie synchronization fails. Because of their lightweight data format, most SMS and text messages will be delivered, albeit with some delivery delay, even with severe network congestion but attachments will fail to download. In unstable networks every application will fail and can even result in freezing a computer or cellphone's normal operation waiting for an expected file to be delivered. In such cases video freezes, sound become so choppy it becomes unintelligible, VoIP connections drop repeatedly even over a dozen times within a few minute call, and in some cases fails to connect altogether. Likewise, emails stall or freeze with computer icons spinning round and round interminably. Progress bars halt altogether. Even text messages bounce and "undeliverable".

While many factors can contribute to network instability, including power failures on key servers and super POPs, overloaded call volumes, the transmission of huge data files or UHD movies, and during significant denial of service attacks on select servers or networks, the key factors used to track a network's QoS are its packet drop rate and packet latency. Dropped packets occur when an IP packet cannot be delivered and "times out" as an immortal, or where a router or server detects a checksum error in the IP packet's header. If the packet using UDP, the packet is lost and the Layer 7 application must be smart enough to know something was lost. If TCP is used for Layer 4 transport, the packet will be requested for retransmission, further adding loading to a potentially already overloaded network.

The other factor determining QoS, propagation delay, may be measured quantitatively in several ways, either as an IP packet's delay from node-to-node, or unidirectionally from source to destination, or alternatively as the round-trip delay from source to destination and back to the source. The effects of propagation delay on packet delivery using UDP and TCP transport protocols are contrasted in FIG. 38. As the intermodal network propagation delay increases, the time needed to perform round-trip communication such as in VoIP conversation increases. In the case of UDP transport 621, the round trip delay increases linearly with propagation delay. Since long propagation delays correlate to higher bit error rates, the number of lost UDP packets increases, but because UDP does request the resending of dropped packets, the round trip time remains linear with increased delay. TCP transport 620 shows a substantially longer round trip time for each packet sent than UDP because of the handshaking required to confirm packet delivery. If the bit error rate remains low and most packets do not require resending then TCP propagation delay increases linearly with intermodal propagation delay but at a higher rate, i.e. the line slope of TCP 620. If, however, the communication network becomes unstable as the propagation delay increases, then the round trip time resulting from TCP transport shown by line 622 grows exponentially because of the protocol's need for retransmission of dropped packets. As such, TCP is contraindicated for time sensitive applications such as VoIP and video streaming.

Since all packet communication is statistical, with no two packets having the same propagation time, the best way to estimate the single direction latency of a network is by measuring the round trip time of a large number of similarly sized IP packets and dividing by two to estimate the single-direction latency. Latencies under 100 ms are outstanding, up to 200 ms are considered very good, and up to 300 ms still considered acceptable. For propagation delays of 500 ms, easily encountered by OTT applications running on the Internet, the delays become uncomfortable to users and interfere which normal conversation. In voice communication, in particular such long propagation delays sound "bad" and can result in reverberation, creating a "twangy" or metallic sounding audio, interrupting normal conversation while the other party waits to get your response to their last comment, and possibly resulting in garbled or unintelligible speech.

To be clear, the single-direction latency of a communication is different than the ping test performed by the Layer 3 ICMP utility (such as the free network test at http://www.speedtest.net) in part because ICMP packets are generally lightweight compared to real IP packets, because the ping test does not employ the "request to resend" feature of TCP, and because there is no guarantee over a public network of the Internet, that the ping test's route will match the actual packet route. In essence, when the ping experiences a long delay, something is wrong with the network or some link between the device and the network, e.g. in the WiFi router, or the last mile, but a good ping result by itself cannot guarantee low propagation delay of a real packet.

In order to improve network security, encryption and verification methods are often employed to prevent hacking, sniffing or spying. But heavy encryption and multiple key encryption protocols constantly reconfirming the identity of a conversing parties, create additional delays and in so doing increase the effective network latency, degrading QoS at the expense of improving security.

Cybersecurity and Cyberprivacy

The other two major considerations in communications are that of cybersecurity cyberprivacy. While related, the two issues are somewhat different. "Cybersecurity including network security, computer security and secure communications, comprises methods employed to monitor, intercept, and prevent unauthorized access, misuse, modification, or denial of a computer or communications network, network-accessible resources, or the data contained within network connected devices. Such data may include personal information, biometric data, financial records, health records, private communications and recordings, as well as private photographic images and video recordings. Network-connected devices include cell phones, tablets, notebooks, desktops, file servers, email servers, web servers, data bases, personal data storage, cloud storage, Internet-connected appliances, connected cars, as well as publically shared devices used by an individual such as point-of-sale or POS terminals, gas pumps, ATMs, etc.

Clearly, cybercriminals and computer hackers who attempt to gain unauthorized access to secure information are committing a crime. Should illegally obtained data contain personal private information, the attack is also a violation of the victim's personal privacy. Conversely, however, privacy violations may occur without the need for cybercrime and may in fact be unstoppable. In today's network-connected world, unauthorized use of a person's private information may occur without the need of a security breach. In many cases, companies collecting data for one purpose may choose to sell their data base to other clients interested in using the data for another purpose altogether. Even when Microsoft purchased Hotmail, it was well known that the mail list was sold to advertisers interested in spamming potential clients. Whether such actions should be considered a violation of cyberprivacy remains a matter of opinion.

"Cyberprivacy" including Internet privacy, computer privacy, and private communication involves an individual's personal right or mandate to control their personal and private information and its use, including the collection, storage, displaying or sharing of information with others. Private information may involve personal identity information including height, weight, age, fingerprints, blood type, driver's license number, passport number, social-security number, or any personal information useful to identify an individual even without knowing their name. In the future, even an individual's DNA map may become a matter of legal record. Aside from personal identifying information, non-personal private information may include what brands of clothes we buy, what web sites we frequent, whether we smoke, drink, or own a gun, what kind of car we drive, what diseases we may have contracted in our life, whether our family has a history of certain diseases or ailments, and even what kind of people we are attracted to.

This private information, when combined with public records relating to personal income, taxes, property deeds, criminal records, traffic violations, and any information posted on social media sites, forms a powerful data set for interested parties. The intentional collection of large data sets capturing demographic, personal, financial, biomedical, and behavioral information and mining the data for patterns, trends and statistical correlations today is known as "big data". The healthcare industry, including insurance companies, healthcare providers, pharmaceutical companies, and even malpractice lawyers, are all intensely interested in personal information stored as big data. Automotive and consumer products companies likewise want access to such databases in order to direct their market strategy and advertising budgets. In recent elections, even politicians have begun to look to big data to better understand voters' opinions and points of political controversy to avoid.

The question of cyberprivacy is not whether big data today captures personal information (it's already standard procedure), but whether the data set retains your name or sufficient personal identity information to identify you even in the absence of knowing your name. For example, originally, the U.S. government stated that the personal information gathered by the healthcare.gov web site used for signing up to the Affordable Care Act would be destroyed once the private medical accounts were set up. Then, in a recent revelation, it was disclosed that a third-party corporation facilitating the data collection for the U.S. government had previously signed a government contract awarding it the right to retain and use the data it collected, meaning that personal private data divulged to the U.S. government is in fact not private.

As a final point, it should be mentioned that surveillance is practiced both by governments and by crime syndicates using similar technological methods. While the criminals clearly have no legal right to gather such data, the case of unauthorized government surveillance is murkier, varying dramatically from country to country. The United States NSA for example has repeatedly applied pressure on Apple, Google, Microsoft and others to provide access to their clouds and databases. Even government officials have had their conversations and communiqués wiretapped and intercepted. When asked if Skype, a division of Microsoft, monitors the content of its callers, the Skype Chief Information Officer abruptly replied "no comment."

Methods of Cybercrime & Cybersurveillance—

Focusing on the topic of cybersecurity, numerous means exist to gain unauthorized access to device, network and computer data. As an example, FIG. 39 illustrates a variety of malware and hacker technologies used to commit cybercrime and achieve unauthorized intrusions into allegedly secure networks.

For example, an individual using a tablet 33 connected to the Internet may wish to place a call to business office phone 9, send a message to TV 36, call a friend in the country still using a circuit switched POTS network with phone 6, or download files from web storage 20, or send emails through email server 21A. While all of the applications represent normal applications of the Internet and global interconnectivity, many opportunities for surveillance, cybercrime, fraud, and identity theft exist through the entire network.

For example, for tablet 33 connecting to the network through cellular radio antenna 18 and LTE base station 17 or through short-range radio antenna 26 and public WiFi base station 100, an unauthorized intruder can monitor the radio link. Likewise LTE call 28 can be monitored or "sniffed" by an intercepting radio receiver or sniffer 632. The same sniffer 632 can be adjusted to monitor WiFi communications 29 and on the receiving end on cable 105 between cable CMTS 101 and cable modem 103.

In some instances, the LTE call can also be intercepted by a pirate faux-tower 638, establishing a diverted communication path 639 between tablet 38 and cellular tower 18. Communications sent through the packet-switched network to router 27, server 21A and server 21B, and cloud storage 20 are also subject to man in the middle attacks 630. Wiretaps 637 can intercept calls on the POTS line from PSTN gateway 3 to phone 6 and also on the corporate PBX line from PBX server 8 to office phone 9.

Through a series of security breaches, spyware 631 can install itself on tablet 33, on router 27, on PSTN-bridge 3, on cloud storage 20, on cable CMTS 101, or on desktop 36. Trojan horse 634 may install itself on tablet 33 or desktop 36 to phish for passwords. Worm 636 may also be used to attack desktop 36, especially if the computer runs Microsoft operating system with active X capability enabled. Finally, to launch denial of service attacks, virus 633 can attack any number of network-connected devices including servers numbered 21A, 21B and 21C, desktop 36, and tablet 33.

In FIG. 40, the graphic is simplified and displayed as to which portion of the communication network and infrastructure each form of malware operates. In the cloud 22 shown containing server 21A, fiber link 23 and server 21B, cyber-assaults may include virus 633, man in the middle attacks 630, government surveillance 640, and denial of service attacks 641. The last mile of the communication network offers an even more extensive opportunity for malware and cyber-assaults, divided into three sections, the local telco/network, the last link, and the device. The local telco/network as shown comprises high-speed fiber 24, router 27, cable CMTS 101, cable/fiber 105, cable modem 103, WiFi antenna 26, and LTE radio tower 25. In this portion of the network radio sniffer 632, spyware 631, virus 633, and man in the middle attacks 630 are all possible.

In the last link, the local connection to the device, the network connection comprises wireline 104, WiFi 29 link, and LTE/radio 28 link subject to spyware 631, radio sniffer 632, wiretap 637, and faux tower 638. The device itself, including for example tablet 33, notebook 35, desktop 36 but may also include smartphones, smart TVs, POS terminals, etc. are subject to a number of attacks including spyware 631, Trojan horse 634, virus 633, and worm 636.

Such surveillance methods and spy devices are readily available in the commercial and online marketplace. FIG. 41A illustrates two such devices, device 650 used for monitoring traffic on Ethernet local area networks, and device 651 providing the same features for monitoring WiFi data. Two commercially available devices, 652 and 653, used for monitoring cellular communications are shown in FIG. 41B. While in the network graphic of FIG. 39, sniffing 632 of optical fiber cloud connections 23 was not identified as a threat, during research it became evident that a non-invasive data sniffer for optical communications, i.e. one where the fiber need not be cut or its normal operation impaired even temporarily, now exists. As shown in FIG. 41C, device 655 performs optical fiber communications sniffing by capturing light leakage at a sharp bend in optical fiber 656. Provided the protecting sheathing is removed beforehand, inserting optical fiber 656 into a clamp in device 655, forces fiber 656 into a small radius U-turn where light 657 leaks into photosensor 659 which is carried by electronic cabling 660 to laptop 661 for analysis.

Aside from using hacking and surveillance methods, a wide variety of commercial spyware is readily available for monitoring cell phone conversations and Internet communications. The table shown in FIG. 42 compares the feature on the top 10 rated spyware programs, advertising benefit such as the ability to beneficially spy on your employees, your kids, and your spouse. The feature set is surprisingly comprehensive including spying on calls, photos and videos, SMS/MMS texting, third party instant messaging, emails, GPS location tracking, Internet use, address book, calendar events, bugging, control apps, and even remote control features, together comprising a frighteningly convincing number of a ways to violate cyberprivacy.

In fact cyber-assaults have now become so frequent, they are tracked on a daily basis. One such tracking site, shown in FIG. 43, displays security breaches and digital attacks on a global map including the location, duration and type of attack mounted. To launch a cyber-assault generally involves several stages or combination of techniques, including:

IP packet sniffing
Port interrogation
Profiling
Imposters
Packet-hijacking
Cyber-infections
Surveillance
Pirate administration IP Packet Sniffing—

Using radio-monitoring devices, a cybercriminal can gain significant information about a user, their transactions, and their accounts. As shown in FIG. 44, the contents of an IP packet can be obtained or "sniffed" anywhere in the path between two users. For example, when user 675A sends a file, e.g. a photo or text, in IP packet 670 from their notebook 35 to cell phone 32 of their friend 675B, cyber pirate 630 can discover the IP packet in any number of places, either by intercepting the sender's last link 673A, the intercepting the sender's local network 672A, monitoring the cloud 671, intercepting the receiver's local telco 672B, or by intercepting the receiver's last link 673B. The observable data contained in intercepted IP packet 670 includes the Layer 2 MAC addresses of the devices used in the communication, the Layer 3 addresses of the sender of the receiving party, i.e. the packet's destination, including the transport protocol, e.g. UDP, TCP, etc. being used. The IP packet also contains, the Layer 4 port number of the sending and receiving devices potentially defining the type of service being requested, and the data file itself. If the file is unencrypted, the data contained in the file can also be read directly by cyber pirate 630.

If the payload is unencrypted, textual information such as account numbers, login sequences, and passwords can be read and, if valuable, stolen and perverted for criminal purposes. If the payload contains video or pictographic information, some added work is required to determine which Layer 6 application-format the content employs, but once identified the content can be viewed, posted publically, or possibly used for blackmailing one or both of the communicating parties. Such cyber-assaults are referred to as a "man in the middle attack" because the cyber-pirate doesn't personally know either communicating party.

As described previously, since IP packet routing in the cloud is unpredictable, monitoring the cloud 671 is more difficult because cyber pirate 630 must capture and the IP packet's important information when it first encounters it, because subsequent packets may not follow the same route and the sniffed packet. Intercepting data in the last mile has a greater probability to observe a succession of related packets comprising the same conversation, because local routers normally follow a prescribed routing table, at least until packets reach a POP outside the customer's own carrier. For example, a client of Comcast will likely pass IP packets up the routing chain using an entirely Comcast-owned network till the packet moves geographically beyond Comcast's reach and customer service region.

If a succession of packets between the same two IP addresses occurs for a sufficiently long time, an entire conversation can be recreated piecemeal. For example, if SMS text messages are passed over the same network in the last mile, cyber pirate 630 can identify through the IP addresses and port #s that multiple IP packets carrying the text represent a conversation between the same two devices, i.e. cell phone 32 and notebook 35. So even if an account number and password were texted in different messages or sent incompletely spread over many packets, the consistency of the packet identifiers still makes it possible for a cyber pirate to reassemble the conversation and steal the account info. Once the account info is stolen, they can either transfer money to an offshore bank or even usurp the account authority by changing the account password and security questions, i.e. using identity theft on a temporary basis.

Even if the payload is encrypted, the rest of IP packet 670 including the IP addresses and port #s are not. After repeatedly sniffing a large number of IP packets, a cyber pirate with access to sufficient computing power can by shear brute force, systematically try every combination until they break the encryption password. Once the key is broken, the packet and all subsequent packets can be decrypted and used by cyber pirate 630. The probability of cracking a login password by "password guessing" greatly improves if the packet sniffing is combined with user and account "profiling" described below. Notice in "man in the middle attacks" the communicating devices are not normally involved because the cyber pirate does not have direct access to them.

Port Interrogation—

Another method to break into a device is to use its IP address to interrogate many Layer 4 ports and see if any requests receive a reply. As illustrated in FIG. 45, once cyber pirate 680 identifies from packet sniffing or other means than cell phone 32 with an IP address "CP" is the targeted device, cyber pirate 680 launches a sequence of interrogations to ports on cell phone 32 looking for any unsecure or open port, service and maintenance port, or application backdoor. While a hacker's interrogation program can systematically cycle through every port #, attacks generally focus on notoriously vulnerable ports such as port #7 for ping, port #21 for FTP, port #23 for telnet terminal emulation, port #25 for simple email, and so on. As shown, by successively sending packets 680A, 680B, 680C and 680D, cyber pirate 660 waits for a response from cell phone 32, which in this example occurred of request 680D. Each time a response is sent the pirate learns something more about the operating system of the targeted device.

In the port interrogation process, cyber pirate 630 doesn't want to expose their real identity so they will use a disguised pseudo-address, listed symbolically herein as "PA" to receive messages but that is not traceable to them personally. Alternatively, cybercriminals may use a stolen computer and account, so it looks like someone else is trying to hack the targeted device, and if traced, leads investigators back to an innocent person and not to them.

Profiling—

User and account profiling is the process where a cyber pirate performs research using publically available information to learn about a target, their accounts, and their personal history in order to crack passwords, identify accounts, and determine assets. Once a hacker obtains the IP address of a target using sniffing or other means, the traceroute utility can be used to find the DNS server of the device's account. Then by utilizing the "Who is" function on the Internet, the name of the account owner can be discovered. In profiling, a cybercriminal then searches on the Internet to gather all available information on the account owner. Sources of information include public records such as property deeds, car registration, marriages and divorces, tax liens, parking tickets, traffic violations, criminal records, etc. In many cases, web sites from universities and professional societies also include home address, email addresses, phone numbers and an individual's birthdate. By researching social media sites such as Facebook, Linked In, Twitter, and others, a cybercriminal can amass a significant detailed information including family and friends, pets' names, previous home addresses, classmates, major events in someone's life, as well as photographic and video files, including embarrassing events, family secrets, and personal enemies.

The cyber pirate's next step is to use this profile to "guess" a user's passwords based on their profile to hack the target device and other accounts of the same individual. Once a cybercriminal cracks one device's password, the likelihood is great they can break into other accounts because people tend to reuse their passwords for ease of memorizing. At that point, it may be possible to steal a person's identity, transfer money, make them a target of police investigations, and essentially destroy someone's life while stealing all their wealth. For example, as described in the opening section of this disclosure, amassing a long list of passwords from stolen accounts, cybercriminals used the same passwords to illegally purchase millions of dollars of premium tickets to concerts and sporting events using the same passwords and login information.

Imposters—

When a cyber pirate impersonates someone they are not or uses illegally obtained cyber-security credentials to gain access to communication and files under the false pretense of being an authorized agent or device, the cyber-pirate is acting as an "imposter". The imposter type of cyber-assault can occur when a cybercriminal has sufficient information or access to an individual's account to usurp a victim's account, sending messages on their behalf and misrepresenting them as the owner of the hacked account. Recently, for example, a personal friend of one of the inventors had her "Line" personal messenger account hacked. After taking over the account, the cybercriminal sent messages to her friends misrepresenting that "she had a car accident and needed money as an emergency loan", including providing wiring instructions for where to send the money. Not knowing the account had been hacked her friends thought the request was real and rushed to her financial rescue. To avoid suspicion, the request sent to each friend was under $1,000 USD. Fortunately just before wiring money, one of her friends called her to double check the wiring info, and the fraud was uncovered. Without calling, no one would have never known the requests were from an imposter and the Line account owner would never have known the wire had been sent or even requested.

Another form of misrepresentation occurs when a device has granted security privileges and is enabled to exchange information with a server or other network-connected device, and by some means a cyber-pirate device disguises itself as the authorized server, whereby the victim's device willingly surrenders files and information to the pirate server not realizing the server is an imposter. This method was reportedly used to lure celebrities to backup private picture files with iCloud, except that the backup cloud was an imposter.

Another form of imposter occurs when someone with physical access to a person's phone or open browser performs an imposter transaction such as sending an email, answering a phone call, sending a text message from another person's account or device. The receiving party assumes because they are connected to a known device or account, that the person operating that device or account is its owner. The imposter can be a prank such as a friend posting embarrassing comments of Facebook or can be of a more personal nature where someone's spouse answers personal calls or intercepts private text messages of a private nature. The result of the unauthorized access can lead to jealousy, divorce, and vindictive legal proceedings. Leaving a device temporarily unsupervised in an office or café, e.g. to run to the toilet, presents another risk for an imposter to quickly access personal or corporate information, send unauthorized emails, transfer files, or download some form of malware into the device, as described in the following section entitled "infections".

Imposter-based cyber-assault is also significant when a device is stolen. In such events, even though the device is logged out, the thief has plenty of time in which to break the login code. The "find my computer" feature that is supposed to locate the stolen device on the network and wipe a computer's files the first time the cyber pirate logs on to the device, no longer works because tech-savvy criminals today know to activate the device only where there is no cellular or WiFi connection. This risk is especially great in the case of cell phones where the passline security is a simple four-number personal identification number or PIN. It's only a matter of time to break a PIN since there are only 9999 possible combinations.

The key issue to secure any device is to prevent access to imposters. Preventing imposters requires a robust means to authenticate a user's identity at regular intervals and to insure they are only authorized to access the information and privileges they need. Device security is oftentimes the weakest link in the chain. Once a device's security is defeated, the need for robust network security is moot.

Packet Hijacking—

Packet hijacking comprises a cyber-assault where the normal flow of packets through the network is diverted through a hostile device. This example is shown in FIG. 46, where notebook 35 with an IP address "NB" and an ad hoc port #9999 is sending a file as IP packet 670 to a cell phone (not shown) having an IP address "CP" and a FTP data port #20. Under normal circumstances IP packet 670 would traverse a route from notebook 35 to WiFi router 26 and on to router 27 connected by high-speed wireline connection 24 to server 22A in the cloud.

If however, the integrity of router 27 has been compromised by a cyber-assault from cyber pirate 630, IP packet 670 can be rewritten into IP packet 686A, for the sake of clarity shown in abridged form where only the IP addresses and port #s are shown. To divert the IP package the destination address and port # are changed from the cell phone to that of the cyber pirate device 630, specifically to IP address "PA" and port #20000. Cyber pirate device 630 then obtains whatever information it needs from the payload of the IP packet and possibly changes the content of the IP packet's payload. The fraudulent payload may be used to commit any number of fraudulent crimes, to gather information, or to download malware into the cell phone, described subsequently herein under the topic "infections".

The hijacked packet, IP packet 686B, is then retrofitted to appear like the original IP packet 670 with source IP address "NB" from port #9999 sent to cell phone IP address "CP" at port #20, except that the packet travels over wireline connection 685B instead of wireline connection 24. Alternatively the hijacked IP packet can be returned to compromised router 27 and then sent on to the cloud via wireline connection 24. In order to maximize the criminal benefit of packet hijacking, cyber pirate 630 needs to hide their identity in the packet hijacking, and for that reason they disguise the true routing of the IP packet so even the Layer 3 ICMP function "traceroute" would have difficulty in identifying the true path of the communication. If, however, the hijacking adds noticeable delay in packet routing, the unusual latency may prompt investigation by a network operator.

Cyber-Infections—

One of the most insidious categories of cyber-assault is that of "cyber-infections", installing malware into targeted devices or the network by which to gather information, commit fraud, redirect traffic, infect other devices, impair or shut down systems, or to cause denial of service failures. Cyber infections can be spread through emails, files, web sites, system extensions, application programs, or through networks. One general class of malware, "spyware" described in the table of FIG. 42 gathers all kinds of transactional information and passes it on to a cyber pirate. In the case of "phishing", a wen page or an application shell that appears like a familiar login page asks for account login or personal information then forwards the information to a cyber pirate. Still other malware infections can take control of hardware, e.g. control a router to execute the aforementioned packet hijacking. In these cases, the cyber pirate is attempting to gain information or control beneficially for their own purposes.

Another class of cyber-infections comprising viruses, worms, and Trojan-horses is designed to overwrite critical files, or to execute meaningless functions repeatedly to prevent a device from doing its normal tasks. Basically to deny services, degrade performance, or completely kill a device. These malevolent infections are intrinsically destructive and used for vindictive purposes, to disable a competitor's business from normal operation, or simply motivated for fun by a hacker wanting to see if it's possible.

Surveillance—

Bugging and surveillance goes beyond cybercrime. In such instances a private detective or an acquaintance is hired or coerced to installing a device or program into the target's personal devices to monitor their voice conversations, data exchanges, and location. The risk of being caught is greater because the detective must gain temporary access to the target device without the subject knowing it. For example, SIM cards are commercially available that can copy a phone's network access privileges but concurrently transmit information to a cybercriminal monitoring the target's calls and data traffic.

Other forms of surveillance involve the use of clandestine video cameras to monitor a person's every action and phone call, much as those located in casinos. Through video monitoring, a device's password or PIN can be learned simply by observing a user's keystrokes during their login process. With enough cameras in place, eventually once will record the login process. To access a camera network without raising suspicion, a cyber pirate can hack an existing camera surveillance system on buildings, in stores, or on the streets, and through access to someone's else's network monitor the behavior of unsuspecting victims. Combining video surveillance with packet sniffing provides an even more comprehensive data set for subsequently launching cyber-assaults.

Pirate Administration (Infiltration)—

One other means by which cyber pirates are able to gain information is by hacking and gaining access to system administration rights of a device, server, or network. So rather than gaining unauthorized access to one user's account, by hacking the system administrator's login, significant access and privileges become available to the cyber pirate without the knowledge of those using the system. Since the system administrator acts as a system's police, there is no one to catch their criminal activity—in essence; in a system or network with corrupted administration there is no one able to police the police.

Conclusion—

The ubiquity and interoperability that the Internet, packet-switched networks, and the nearly universal adoption of the seven-layer open source initiative network model, has over the last twenty years enabled global communication to expand on an unparalleled scale, connecting a wide range of devices ranging from smartphone to tablets, computers, smart TVs, cars and even to home appliances and light bulbs. The global adoption of the Internet Protocol or IP as the basis for Ethernet, cellular, WiFi, and cable TV connectivity not only has unified communication, but has greatly simplified the challenge for hackers and cybercriminals attempting to invade as many devices and systems as possible. Given the plethora of software and hardware methods now available to attack today's communication networks, clearly no single security method is sufficient as a sole defense. Instead what is needed is a systematic approach to secure every device, last-link, local telco/network and cloud network to insure their protection against sophisticated cyber-assaults. The methods utilized should deliver intrinsic cybersecurity and cyberprivacy without sacrificing QoS, network latency, video or sound quality. While encryption should remain an important element of developing this next generation in secure communication and data storage, the network's security must not rely solely on encryption methodologies.

SUMMARY OF THE INVENTION

In accordance with this invention, data (which is defined broadly to include text, audio, video, graphical, and all other kinds of digital information or files) is transmitted over a Secure Dynamic Communications Network and Protocol (SDNP) network or "cloud." The SDNP cloud includes a plurality of "nodes," sometimes referred to as "media nodes," that are individually hosted on servers or other types of computers or digital equipment (collectively referred to herein as "servers") located anywhere in the world. It is possible for two or more nodes to be located on a single server. Typically, the data is transmitted between the media nodes by light carried over fiber optic cables, by radio waves in the radio or microwave spectrum, by electrical signals conducted on copper wires or coaxial cable, or by satellite communication, but the invention broadly includes any means by which digital data can be transmitted from one point to another. The SDNP network includes the SDNP cloud as well as the "last mile" links between the SDNP cloud and client devices such as cell phones, tablets, notebook and desktop computers, mobile consumer electronic devices, as well as Internet-of-Things devices and appliances, automobiles and other vehicles. Last mile communication also includes cell phone towers, cable or fiber into the home, and public WiFi routers.

While in transit between the media nodes in the SDNP cloud, the data is in the form of "packets," discrete strings of digital bits that may be of fixed or variable length, and the data is disguised by employing the following techniques: scrambling, encryption or splitting—or their inverse processes, unscrambling, decryption and mixing. (Note: As used herein, unless the context indicates otherwise, the word "or" is used in its conjunctive (and/or) sense.)

Scrambling entails reordering the data within a data packet; for example, data segments A, B and C which appear in that order in the packet are re-ordered into the sequence C, A and B. The reverse of the scrambling operation is referred to as "unscrambling" and entails rearranging the data within a packet to the order in which it originally appeared—A, B and C in the above example. The combined operation of unscrambling and then scrambling a data packet is referred to as "re-scrambling." In re-scrambling a packet that was previously scrambled, the packet may be scrambled in a manner that is the same as, or different from, the prior scrambling operation.

The second operation, "encryption," is the encoding of the data in a packet into a form, called ciphertext, that can be understood only by the sender and other authorized parties, and who must perform the inverse operation—"decryption"—in order to do so. The combined operation of decrypting a ciphertext data packet and then encrypting it again, typically but not necessarily using a method that is different from the method used in encrypting it previously, is referred to herein as "re-encryption."

The third operation, "splitting," as the name implies, involves splitting up the packet into two or more smaller packets. The inverse operation, "mixing," is defined as recombining the two or more split packets back into a single packet. Splitting a packet that was previously split and then mixed may be done in a manner that is the same as, or different from, the prior splitting operation. The order of operations is reversible, whereby splitting may be undone by mixing and conversely mixing of multiple inputs into one output may be undone by splitting to recover the constituent components. (Note: Since scrambling and unscrambling, encryption and decryption, and splitting and mixing are inverse processes, knowledge of the algorithm or method that was used to perform one is all that is necessary to perform the inverse. Hence, when referring to a particular scrambling, encryption, or splitting algorithm herein, it will be understood that knowledge of that algorithm allows one to perform the inverse process.)

In accordance with the invention, a data packet that passes through an SDNP cloud is scrambled or encrypted, or it is subjected to either or both of these operations in combination with splitting. In addition, "junk" (i.e., meaningless) data may be added to the packet either to make the packet more difficult to decipher or to make the packet conform to a required length. Moreover, the packet may be parsed, i.e., separated into distinct pieces. In the computing vernacular, to parse is to divide a computer language statement, computer instruction, or data file into parts that can be made useful for the computer. Parsing may also be used to obscure the purpose of an instruction or data packet, or to arrange data into data packets having specified data lengths.

Although the format of the data packets follows the Internet Protocol, within the SDNP cloud, the addresses of the media nodes are not standard Internet addresses, i.e. they cannot be identified by any Internet DNS server. Hence, although the media nodes can technically receive data packets over the Internet, the media nodes will not recognize the addresses or respond to inquiries. Moreover, even if Internet users were to contact a media node, they could not access or examine the data inside the media node because the media node can recognize them as imposters lacking the necessary identifying credentials as a SDNP media node. Specifically, unless a media node is registered as a valid SDNP node running on a qualified server in the SDNP name server or its equivalent function, data packets sent from that node to other SDNP media nodes will be ignored and discarded. In a similar manner. only clients registered on an SDNP name server may contact a SDNP media node. Like unregistered servers, data packets received from sources other than registered SDNP clients will be ignored and immediately discarded.

In a relatively simple embodiment, referred to as "single route," the data packet traverses a single path through a series of media nodes in the SDNP cloud, and it is scrambled at the media node where it enters the cloud and unscrambled at the media node where the packet exits the cloud (these two nodes being referred to as "gateway nodes" or "gateway media nodes"). In a slightly more complex embodiment, the packet is re-scrambled at each media node using a scrambling method different from the one that was used at the prior media node. In other embodiments, the packet is also encrypted at the gateway node where it enters the cloud and decrypted at the gateway node where it exits the cloud, and in addition the packet may be re-encrypted at each media node it passes through in the cloud. Since a given node uses the same algorithm each time it scrambles or encrypts a packet, this embodiment is describes as "static" scrambling and encryption.

In a case where the packet is subjected to two or more operations, e.g., it is scrambled and encrypted, the inverse operations are preferably performed in an order opposite to the operations themselves, i.e. in reverse sequence. For example, if the packet is scrambled and then encrypted prior to leaving a media node, it is first decrypted and then unscrambled when it arrives at the following media node. The packet is recreated in its original form only while it is within a media node. While the packet is in transit between media nodes, it is scrambled, split or mixed, or encrypted.

In another embodiment, referred to as "multiroute" data transport, the packet is split at the gateway node, and the resulting multiple packets traverse the cloud in a series of "parallel" paths, with none of the paths sharing a media node with another path except at the gateway nodes. The multiple packets are then mixed to recreate the original packet, normally at the exit gateway mode. Thus, even if a hacker were able to understand the meaning of a single packet, they would have only a part of the entire message. The packet may also be scrambled and encrypted at the gateway node, either before or after it is split, and the multiple packets may be re-scrambled or re-encrypted at each media node they pass through.

In yet another embodiment, the packets do not travel over only a single path or a series of parallel paths in the SDNP cloud, but rather the packets may travel over a wide variety of paths, many of which intersect with each other. Since in this embodiment a picture of the possible paths resembles a mesh, this is referred to as "meshed transport." As with the embodiments described above, the packets may be scrambled, encrypted and split or mixed as they pass through the individual media nodes in the SDNP cloud.

The routes of the packets through the SDNP network are determined by a signaling function, which can be performed either by segments of the media nodes themselves or preferably, in "dual-channel" or "tri-channel" embodiments, by separate signaling nodes running on dedicated signaling servers. The signaling function determines the route of each packet as it leaves the transmitting client device (e.g., a cell phone), based on the condition (e.g., propagation delays) of the network and the priority and urgency of the call, and informs each of the media nodes along the route that it will receive the packet and instructs the node where to send it. Each packet is identified by a tag, and the signaling function instructs each media node what tag to apply to each of the packets it sends. In one embodiment, the data tag is included in a SDNP header or sub-header, a data field attached to each data sub-packet used to identify the sub-packet. Each sub-packet may contain data segments from one or multiple sources stored in specific data "slots" in the packet. Multiple sub-packets may be present within one larger data packet during data transport between any two media nodes.

The routing function is aligned with the splitting and mixing functions, since once a packet is split, the respective routes of each of the sub-packets into which it is split must be determined and the node where the sub-packets are recombined (mixed) must be instructed to mix them. A packet may be split once and then mixed, as in multiroute embodiments, or it may be split and mixed multiple times as it proceeds through the SDNP network to the exit gateway node. The determination of at which node a packet will be split, into how many sub-packets it will be split, the respective routes of the sub-packets, and at what node the sub-packets will be mixed so as to recreate the original packet, are all under the control of the signaling function, whether or not it is performed by separate signaling servers. A splitting algorithm may specify which data segments in a communication are to be included in each of the sub-packets, and the order and positions of the data segments in the sub-packets. A mixing algorithm reverses this process at the node where the sub-packets are mixed so as to recreate the original packet. Of course, if so instructed by the signaling function, that node may also split the packet again in accordance with a different splitting algorithm corresponding to the time or state when the splitting process occurs.

When a media node is instructed by the signaling function to send a plurality of packets to a particular destination media node on the "next hop" through the network, whether these packets are split packets (sub-packets) or whether they pertain to different messages, the media node may combine the packets into a single larger packet especially when multiple sub-packets share a common destination media node for their next hop (analogous to a post office putting a group of letters intended for a single address into a box and sending the box to the address).

In "dynamic" embodiments of the invention, the individual media nodes in the SDNP cloud do not use the same scrambling, encryption or splitting algorithms or methods on successive packets that pass through them. For example, a given media node might scramble, encrypt or split one packet using a particular scrambling, encryption or splitting algorithm, and then scramble, encrypt or split the next packet using a different scrambling, encryption or splitting algorithm. "Dynamic" operation greatly increases the difficulties faced by would-be hackers because they have only a short period of time (e.g., 100 msec) in which to understand the meaning of a packet, and even if they are successful, the usefulness of their knowledge would be short-lived.

In dynamic embodiments each media node is associated with what is known as a "DMZ server," which can be viewed as a part of the node that is isolated from the data transport part, and which has a database containing lists or tables ("selectors") of possible scrambling, encryption, and splitting algorithms that the media node might apply to outgoing packets. The selector is a part of a body of information referred to as "shared secrets," since the information is not known even to the media nodes, and since all DMZ servers have the same selectors at a given point in time.

When a media node receives a packet that has been scrambled, in dynamic embodiments it also receives a "seed" that is used to indicate to the receiving node what algorithm is to be used in unscrambling the packet. The seed is a disguised numerical value that has no meaning by itself but is based on a constantly changing state, such as the time at which the packet was scrambled by the prior media node. When the prior node scrambled the packet its associated DMZ server generated the seed based on the state. Of course, that state was also used by its associated DMZ server in selecting the algorithm to be used in scrambling the packet, which was sent to the sending media node in the form of an instruction as to how to scramble the packet. Thus the sending node received both the instruction on how to scramble the packet and the seed to be transmitted to the next media node. A seed generator operating within the DMZ server generates the seed using an algorithm based on the state at the time the process is executed. Although the seed generator and its algorithms are part of the media node's shared secrets, the generated seed is not secret because without access to the algorithms the numerical seed has no meaning.

Thus the next media note on the packet's route receives the scrambled packet and the seed that is derived from the state associated with the packet (e.g., the time at which it was scrambled). The seed may be included in the packet itself or it may be sent to the receiving node prior to the packet, either along the same route as the packet or via some other route, such as through a signaling server.

Regardless of how it receives the seed, the receiving node sends the seed to its DMZ server. Since that DMZ server has a selector or table of scrambling algorithms that are part of the shared secrets and are therefore the same as the selector in the sending node's DMZ server, it can use the seed to identify the algorithm that was used in scrambling the packet and can instruct the receiving node how to unscramble the packet. The receiving node thus recreates the packet in its unscrambled form, thereby recovering the original data. Typically, the packet will be scrambled again according to a different scrambling algorithm before it is transmitted to the next node. If so, the receiving node works with its DMZ server to obtain a scrambling algorithm and seed, and the process is repeated.

Thus, as the packet makes its way through the SDNP network, it is scrambled according to a different scrambling algorithm by each node, and a new seed is created at each node that enables the next node to unscramble the packet.

In an alternative embodiment of the invention, the actual state (e.g., time) may be transmitted between nodes (i.e., the sending node need not send a seed to the receiving node). The DMZ servers associated with both the sending and receiving media nodes contain hidden number generators (again, part of the shared secrets) that contain identical algorithms at any given point in time. The DMZ server associated with the sending node uses the state to generate a hidden number and the hidden number to determine the scrambling algorithm from a selector or table of possible scrambling algorithms. The sending node transmits the state to the receiving node. Unlike seeds, hidden numbers are never transmitted across the network but remain an exclusively private communication between the media node and its DMZ server. When the receiving media node receives the state for an incoming data packet, the hidden number generator in its associated DMZ server uses the state to generate an identical hidden number, which is then used with the selector or table to identify the algorithm to be used in unscrambling the packet. The state may be included with the packet or may be transmitted from the sending node to the receiving node prior to the packet or via some other route.

The techniques used in dynamic encryption and splitting are similar to that used in dynamic scrambling, but in dynamic encryption "keys" are used in place of seeds. The shared secrets held by the DMZ servers include selectors or tables of encryption and splitting algorithms and key generators. In the case of symmetric key encryption, the sending node transmits a key to the receiving media node which can be used by the receiving node's DMZ server to identify the algorithm used in encrypting the packet and thereby decryp the file. In the case of asymmetric key encryption, the media node requesting information, i.e. the receiving node first sends an encryption key to the node containing the data packet to be sent. The sending media node then encrypts the data in accordance with that encryption key. Only the receiving media node generating the encryption key holds the corresponding decryption key and the ability to decrypt the ciphertext created using the encryption key. Importantly, in asymmetric encryption access to the encryption key used for encryption does not provide any information as to how to decrypt the data packet.

In the case of splitting, the media node where the packet was split transmits a seed to the media node where the resulting sub-packets will be mixed, and the DMZ server associated with the mixing node uses that seed to identify the splitting algorithm and hence the algorithm to be used in mixing the sub-packets.

As indicated above, in dual- or tri-channel embodiments, the signaling function is performed by a signaling node operating on separate group of servers known as signaling servers. In such embodiments the seeds and keys may be transmitted through the signaling servers instead of from the sending media node directly to the receiving media node. Thus the sending media node may send a seed or key to a signaling server, and the signaling server may forward the seed or key to the receiving media node. As noted above, the signaling servers are responsible for designing the routes of the packet, so the signaling server knows the next media node to which each packet is directed.

To make things more difficult for would-be hackers, the list or table of possible scrambling, splitting or encryption methods in a selector may be "shuffled" periodically (e.g., hourly or daily) in such a way that the methods corresponding to particular seeds or keys are changed. Thus the encryption algorithm applied by a given media node to a packet created at time $t_1$ on Day 1 might be different from the encryption algorithm it applies to a packet created at the same time $t_1$ on Day 2.

Each of the DMZ servers is typically physically associated with one or more media nodes in the same "server farm." As noted above, a media node may request instructions on what to do with a packet it has received by providing its associated DMZ server with a seed or key (based for example on the time or state that the packet was created), but the media node cannot access the shared secrets or any other data or code within the DMZ server. The DMZ server responds to such requests by using the seed or key to determine what method the media node should use in unscrambling, decrypting or mixing a packet. For example, if the packet has been scrambled and the media node wants to know how to unscramble it, the DMZ server may examine a list (or selector) of scrambling algorithms to find the particular algorithm that corresponds to the seed. The DMZ then instructs the media node to unscramble the packet in accordance with that algorithm. In short, the media transmits inquiries embodied in seeds or keys to the DMZ server, and the DMZ server responds to those inquiries with instructions.

While the media nodes are accessible through the Internet (although they do not have DNS recognized IP addresses), the DMZ servers are completely isolated from the Internet having only local network connections via wires or optical fiber to the network connected media servers.

In "single-channel" embodiments, the seeds and keys are transmitted between the sending media node and the receiving media node as a part of the data packet itself, or they may be transmitted in a separate packet before the data packet on the same route as the data packet. For example, when encrypting a packet, media node #1 may include in the packet an encryption key based on the time at which the encryption was performed. When the packet arrives at media node #2, media node #2 transmits the key to its associated DMZ server, and the DMZ server may use the key to select a decryption method in its selector and to perform the decryption. Media node #2 may then ask its DMZ server how it should encrypt the packet again, before transmitting it to media node #3. Again, the DMZ server consults the selector, informs media node #2 what method it should use in encrypting the packet, and delivers to media node #2 a key that reflects a state corresponding to the encryption method. Media node #2 performs the encryption and transmits the encrypted packet and the key (either separately or as a part of the packet) to media node #3. The key may then be used in a similar manner by media node #3 to decrypt the packet, and so on. As a result, there is no single, static decryption method that a hacker could use in deciphering the packets.

The use of time or a dynamic "state" condition in the example above as the determinant of the scrambling encryption or splitting method to be embodied in the seed or key is only illustrative. Any changing parameter, e.g., the number of nodes that the packet has passed through, can also be used as the "state" in the seed or key for selecting the particular scrambling, encryption or splitting method to be used.

In "dual-channel" embodiments, the seeds and keys can be transmitted between the media nodes via a second "command and control" channel made up of signaling servers rather than being transported directly between the media nodes. The signaling nodes may also provide the media nodes with routing information and inform the media nodes along the route of a packet how the packet is to be split or mixed with other packets, and they instruct each media node to apply an identification "tag" to each packet transmitted so that the next media node(s) will be able to recognize the packet(s). The signaling servers preferably supply a given media node with only the last and next media node of a packet traversing the network. No individual media node knows the entire route of the packet through the SDNP cloud. In some embodiments the routing function may be split up among two or more signaling servers, with one signaling server determining the route to a particular media node, a second signaling server determining the route from there to another media node, and so on to the exit gateway node. In this manner, no single signaling server knows the complete routing of a data packet either.

In "tri-channel" embodiments, a third group of servers—called "name servers"—are used to identify elements within the SDNP cloud and to store information regarding the identity of devices connected to the SDNP cloud and their corresponding IP or SDNP addresses. In addition, the name servers constantly monitor the media nodes in the SDNP cloud, maintaining, for example, a current list of active media nodes and a table of propagation delays between every combination of media nodes in the cloud. In the first step in placing the call, a client device, such as a tablet, may send an IP packet to a name server, requesting an address and other information for the destination or person to be called. Moreover, a separate dedicated name server is used to operate as a first contact whenever a device first connects, i.e. registers, on the cloud.

As an added security benefit, separate security "zones," having different selectors, seed and key generators and other shared secrets, may be established within a single SDNP cloud. Adjacent zones are connected by bridge media nodes, which hold the shared secrets of both zones and have the ability to translate data formatted in accordance with the rules for one zone into data formatted in accordance with the rules for the other zone, and vice versa.

Similarly, for communication between different SDNP clouds, hosted for example by different service providers, a full-duplex (i.e., two-way) communication link is formed between interface bridge servers in each cloud. Each interface bridge server has access to the relevant shared secrets and other security items for each cloud.

Similar security techniques may generally be applied in the "last mile" between an SDNP cloud and a client device, such as a cell phone or a tablet. The client device is normally placed in a separate security zone from the cloud, and it must first become an authorized SDNP client, a step which involves installing in the client device a software package specific to the device's security zone, typically via a download from an SDNP administration server. The client device is linked to the SDNP cloud through a gateway media node in the cloud. The gateway media node has access to the shared secrets pertaining to both the cloud and the client's device's security zone, but the client device does not have access to the shared secrets pertaining to the SDNP cloud.

As an added level of security, the client devices may exchange seeds and keys directly with each other via the signaling servers. Thus a transmitting client device may send a seed and/or key directly to the receiving client device. In such embodiments the packet received by the receiving client device will be in the same scrambled or encrypted form as the packet leaving the sending client device. The receiving client device can therefore use the seed or key that it receives from the sending client device to unscramble or decrypt the packet. The exchange of seeds and keys directly between client devices is in addition to the SDNP network's own dynamic scrambling and encrypting, and it thus represents an added level of security called nested security.

In addition, a client device or the gateway node with which it communicates may mix packets that represent the same kind of data—e.g. voice packets, text message files, documents, pieces of software, or that represent dissimilar types of information, e.g. one voice packet and one text file, one text packet, and one video or photo image—before the packets reach the SDNP network, and the exit gateway node or destination client device may split the mixed packet to recover the original packets. This is in addition to any scrambling, encryption or splitting that occurs in the SDNP network. In such cases, the sending client device may send the receiving client device a seed instructing it how to split the packet so as to recreate the original packets that were mixed in the sending client device or gateway media node. Performing successive mixing and splitting may comprise a linear sequence of operations or alternatively utilize a nested architecture where the clients execute their own security measures and so does the SDNP cloud.

An important advantage of the disclosed invention is that there is no single point of control in the SDNP network and that no node or server in the network has a complete picture as to how a given communication is occurring or how it may be dynamically changing.

For example, signaling nodes running on signaling servers know the route (or in some cases only only part of a route) by which a communication is occurring, but they do not have access to the data content being communicated and do not know who the real callers or clients are. Moreover, the signaling nodes do not have access to the shared secrets in a media node's DMZ servers, so they do not know how the data packets in transit are encrypted, scrambled, split or mixed, The SDNP name servers know the true phone numbers or IP addresses of the callers but do not have access to the data being communicated or the routing of the various packets and sub-packets. Like the signaling nodes, the name servers do not have access to the shared secrets in a media node's DMZ servers, so they do not know how the data packets in transit are encrypted, scrambled, split or mixed.

The SDNP media nodes actually transporting the media content have no idea who the callers communicating are nor do they know the route the various fragmented sub-packets are taking through the SDNP cloud. In fact each media node knows only what data packets to expect to arrive (identified by their tags or headers), and where to send them next, i.e. the "next hop," but the media nodes do not know how the data is encrypted, scrambled, mixed or split, nor do they know how to select an algorithm or decrypt a file using a state, a numeric seed, or a key. The knowhow required to correctly process incoming data packets' data segments is known only by the DMZ server, using its shared secrets, algorithms not accessible over the network or by the media node itself.

Another inventive aspect of the disclosed invention is its ability to reduce network latency and minimize propagation delay to provide superior quality of service (QoS) and eliminate echo or dropped calls by controlling the size of the data packets, i.e. sending more smaller data packets in parallel through the cloud rather than relying on one high bandwidth connection. The SDNP network's dynamic routing uses its knowledge of the network's node-to-node propagation delays to dynamically select the best route for any communication at that moment. In another embodiment, for high-priority clients the network can facilitate race routing, sending duplicate messages in fragmented form across the SDNP cloud selecting only the fastest data to recover the original sound or data content.

Among the many advantages of an SDNP system according to the invention, in parallel and "meshed transport" embodiments the packets may be fragmented as they transit the SDNP cloud, preventing potential hackers from understanding a message even if they are able to decipher an individual sub-packet or group of sub-packets, and in "dynamic" embodiments the scrambling, encryption and splitting methods applied to the packets are constantly changing, denying to a potential hacker any significant benefit from successfully deciphering a packet at a given point in time. Numerous additional advantages of embodiments of the invention will be readily evident to those of skill in the art from a review of the following description.

BRIEF DESCRIPTION OF THE DRAWINGS

In the drawings listed below, components that are generally similar are given like reference numerals. It is noted, however, that not every component to which a given reference number is assigned is necessarily identical to another component having the same reference number. For example, an encryption operation having a particular reference number is not necessarily identical to another encryption operation with the same reference number. Furthermore, groups of components, e.g., servers in a network that are identified collectively by a single reference number are not necessarily identical to each other.

FIG. 4 is a graphical representation of the construction of an IP packet for communication over a packet-switched network.

FIG. 11 is a graphical representation of the data link Layer 2 construct of a IP packet using WiFi protocol.

FIG. 23 is a graphical representation of an IP packet in accordance with IPv4 protocol.

FIG. 24 is a graphical representation of an IP packet in accordance with IPv6 protocol.

FIG. 28B is a table describing the fields of the TCP protocol.

FIG. 30 is a graphical representation of a transport Layer 4 construct of a IP packet using UDP protocol.

FIG. 31C is a table describing common UDP and TCP port allocations.

FIG. 31D is a table describing allocated blocks for reserved and ad hoc port addresses used by UDP and TCP.

FIG. 50 is a schematic diagram showing conventional packet transport across a network.

FIG. 66A is a schematic diagram showing dynamic encrypted scrambled mixing in a linear network.

FIG. 66B is a schematic diagram showing static scrambled mixing with dynamic encryption in a linear network.

FIG. 66C is a schematic diagram showing dynamic mixing scrambling and encryption in a linear network using the "return to normal" method.

FIG. 66D is a schematic detailing the DUS-MSE return-to-normal method.

FIG. 70 is a schematic diagram showing static multi-route scrambling.

FIG. 73 is a schematic diagram showing static scrambled multiroute transport with dynamic encryption.

FIG. 74 is a schematic diagram depicting various combinations of split, scramble, and encrypt methods.

FIG. 75 is a schematic diagram showing variable-length static meshed routing.

FIG. 76 is a schematic diagram showing variable-length static scrambled meshed routing.

FIG. 77A is a schematic diagram showing variable-length mix and split operation for meshed transport.

FIG. 77B is a schematic diagram showing a fixed-length mix and split operation for meshed transport.

FIG. 77C is a schematic diagram showing various combinations of communication node connectivity in a meshed network.

FIG. 77D is a schematic diagram depicting non-planar meshed network node connectivity.

FIG. 78A is a schematic diagram showing re-scrambled mixing and splitting.

FIG. 78B is a schematic diagram showing an unscrambled mix of meshed inputs.

FIG. 78C is a schematic diagram showing a split-and-scramble operation for meshed outputs.

FIG. 78D is a schematic diagram showing re-scramble and remix for meshed transport.

Figure 79A:
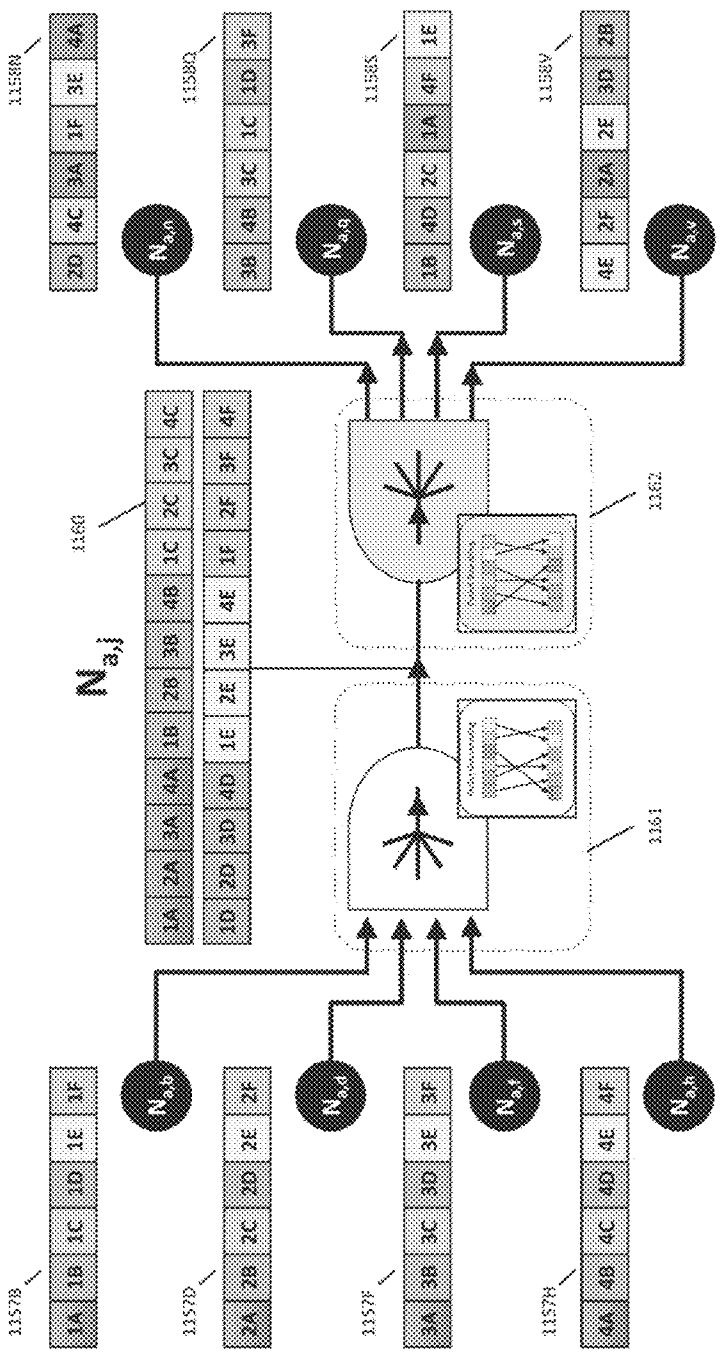

FIG. 79A is a schematic diagram showing fixed-length scrambled mix and split for meshed transport.

Figure 79B:
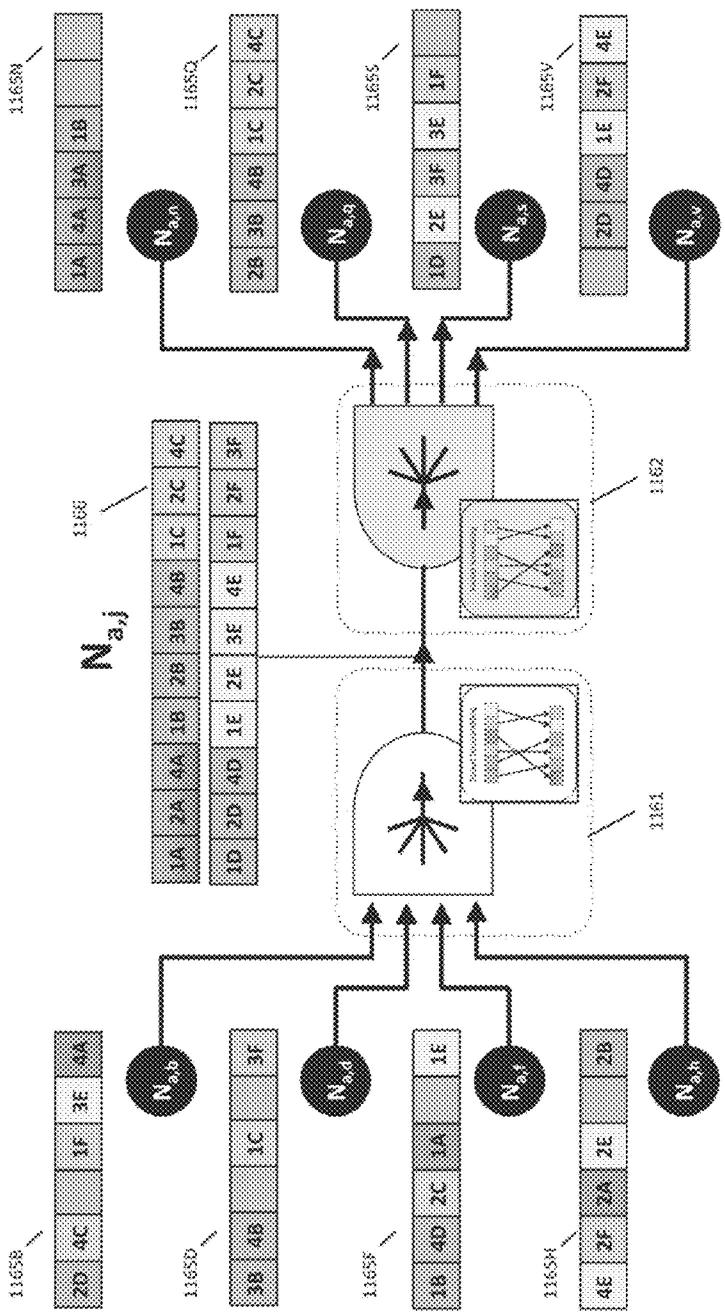
Figure 8D:
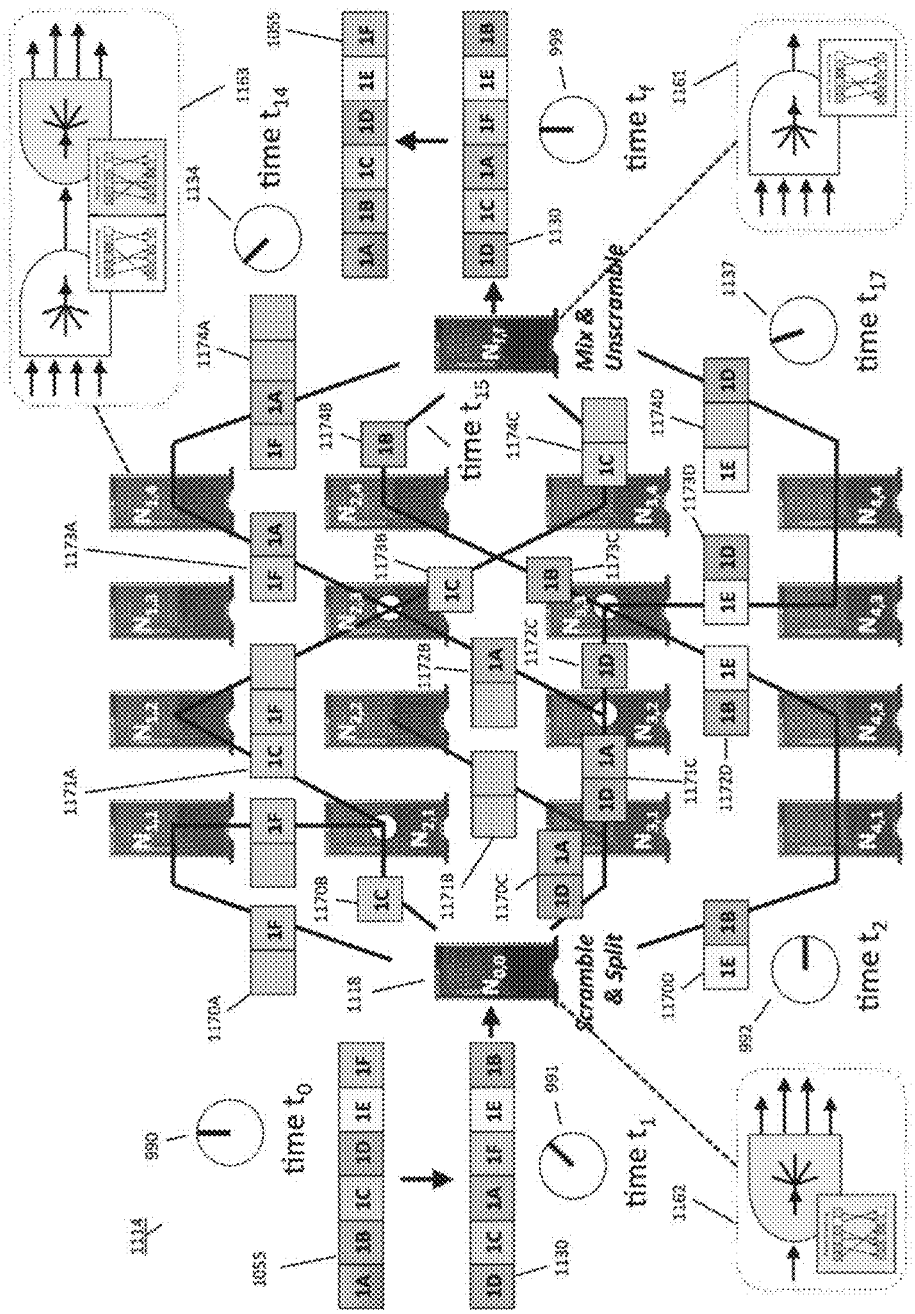
FIG. 8B is a simplified schematic representation of network switch.

FIG. 79B is a schematic diagram showing an alternate embodiment of fixed-length scrambled mix and split for meshed transport FIG. 80 is a schematic diagram showing variable-length static scrambled meshed routing.

Figure 81A:
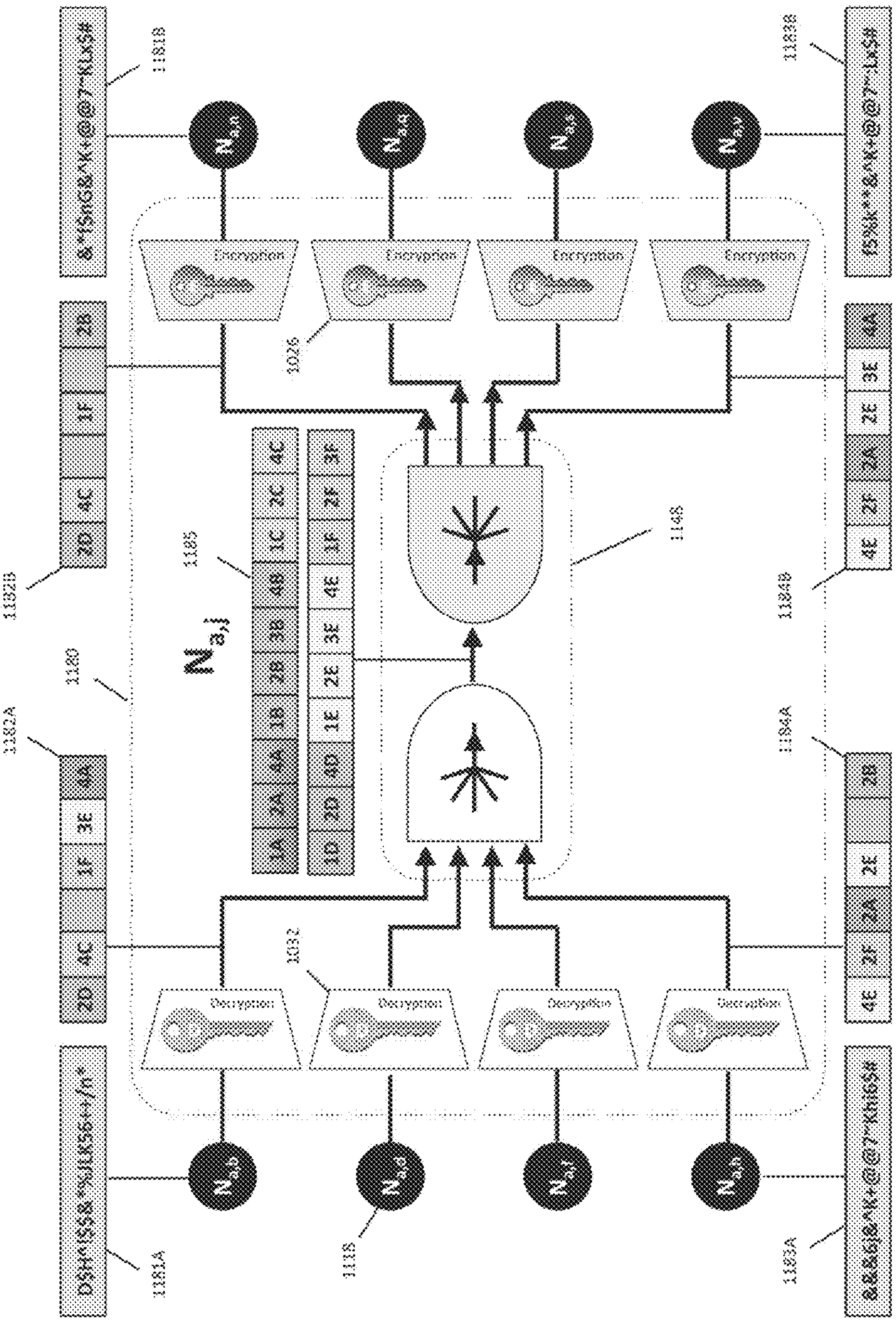

FIG. 81A is a schematic diagram showing encrypted mixing and splitting.

Figure 81B:
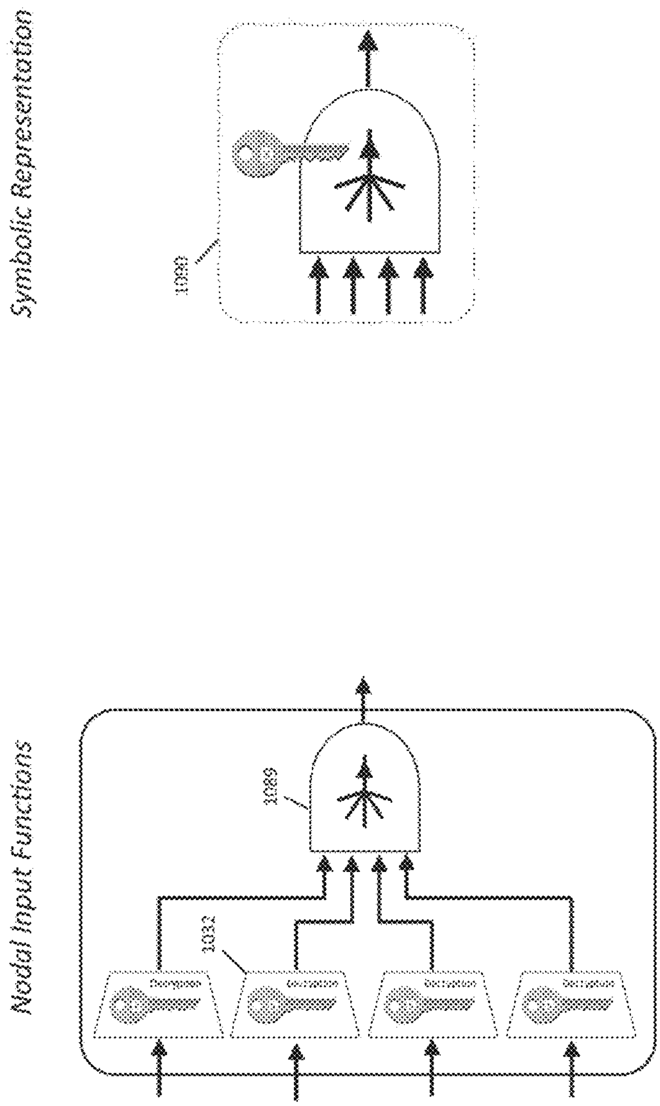

FIG. 81B is a schematic diagram showing decrypted mixing of meshed inputs.

Figure 81C:
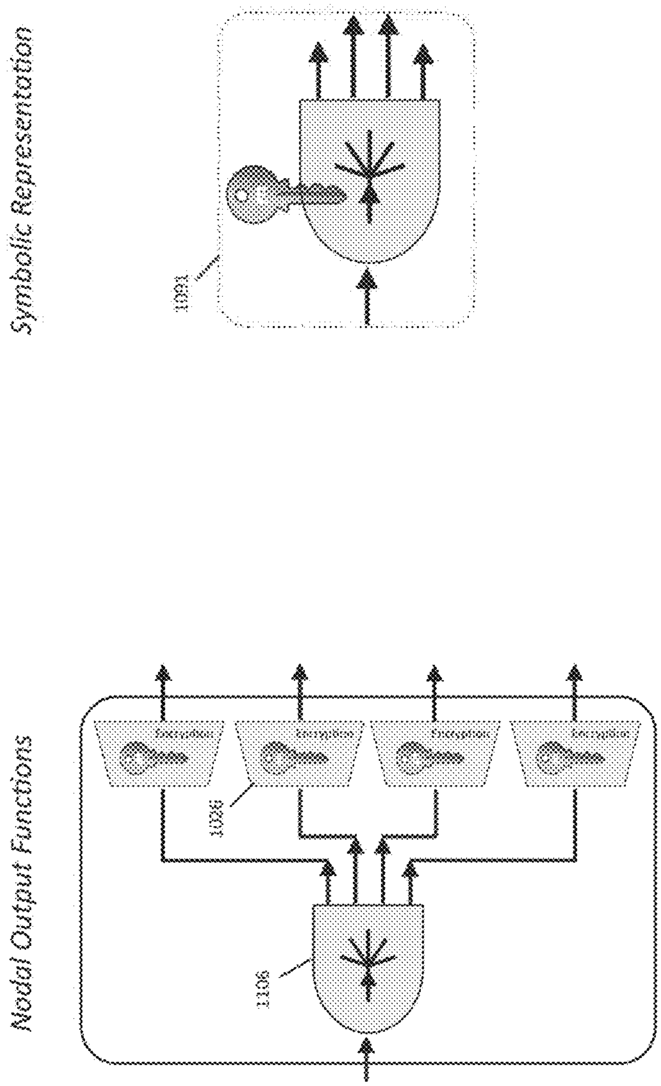

FIG. 81C is a schematic diagram showing split and encrypt for meshed outputs.

Figure 82A:
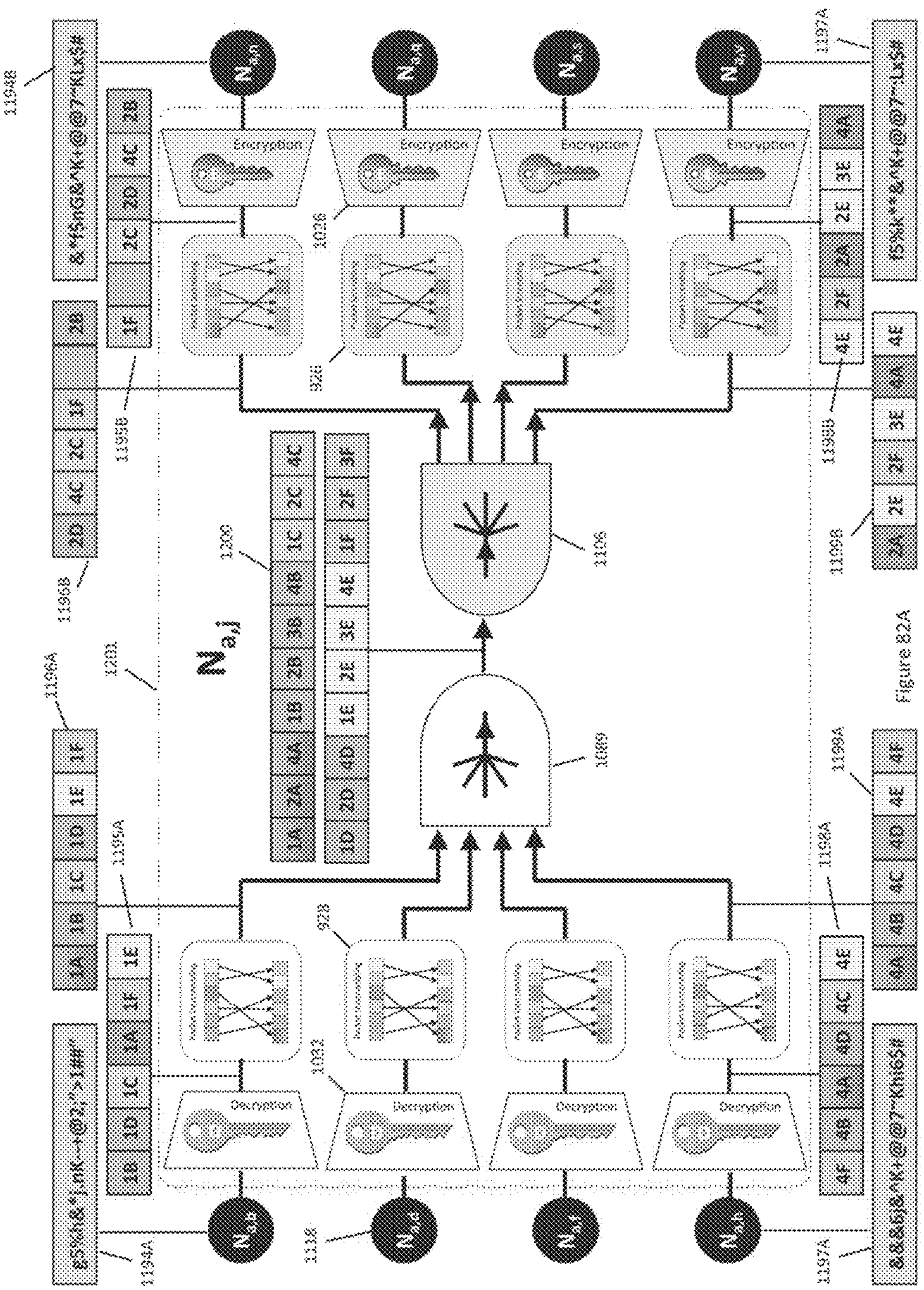

FIG. 82A is a schematic diagram showing a re-scrambling encrypted packet for meshed transport.

Figure 82B:
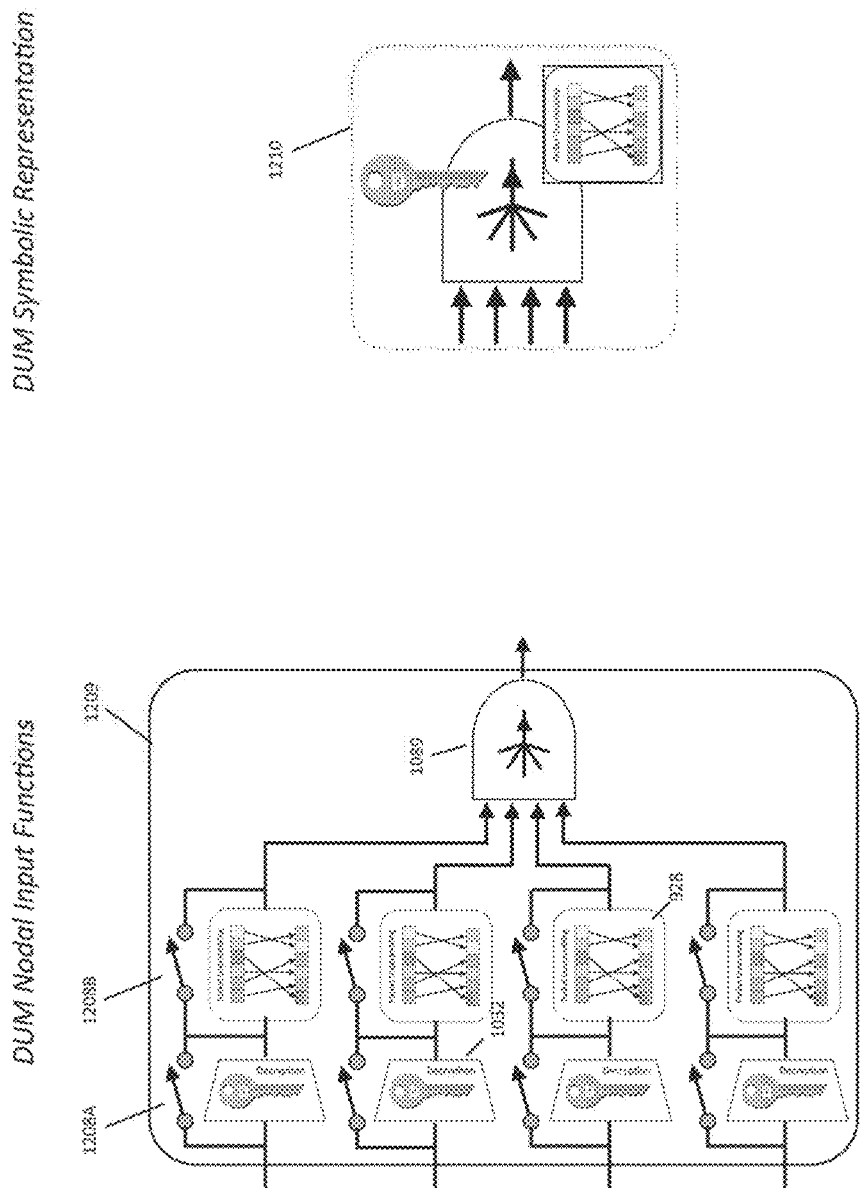

FIG. 82B is a schematic diagram showing a decrypt, unscramble and mix (DUM) operation for meshed inputs.

Figure 82C:
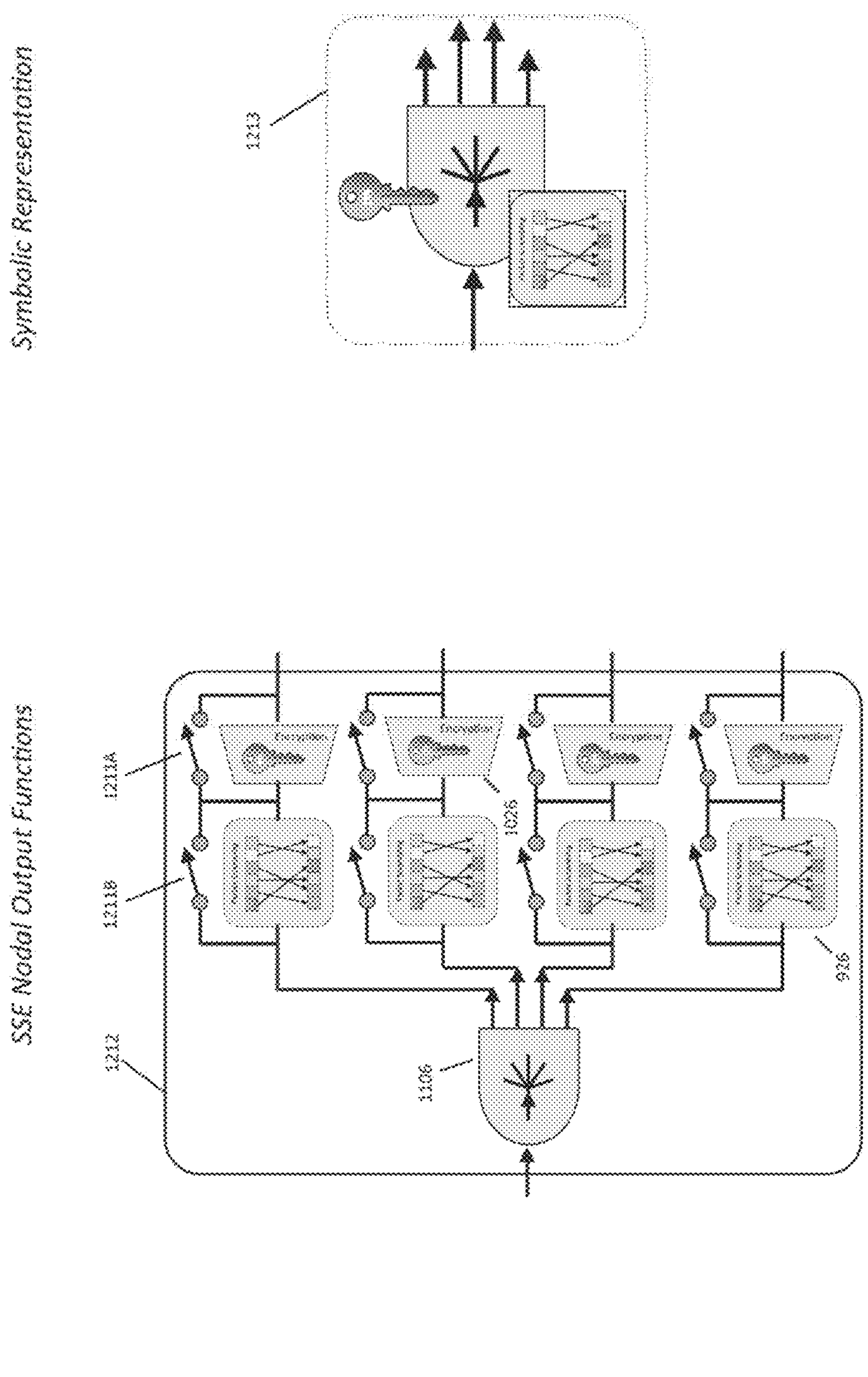

FIG. 82C is a schematic diagram showing a split, scramble, and encrypt (SSE) operation for meshed outputs.

Figure 83A:
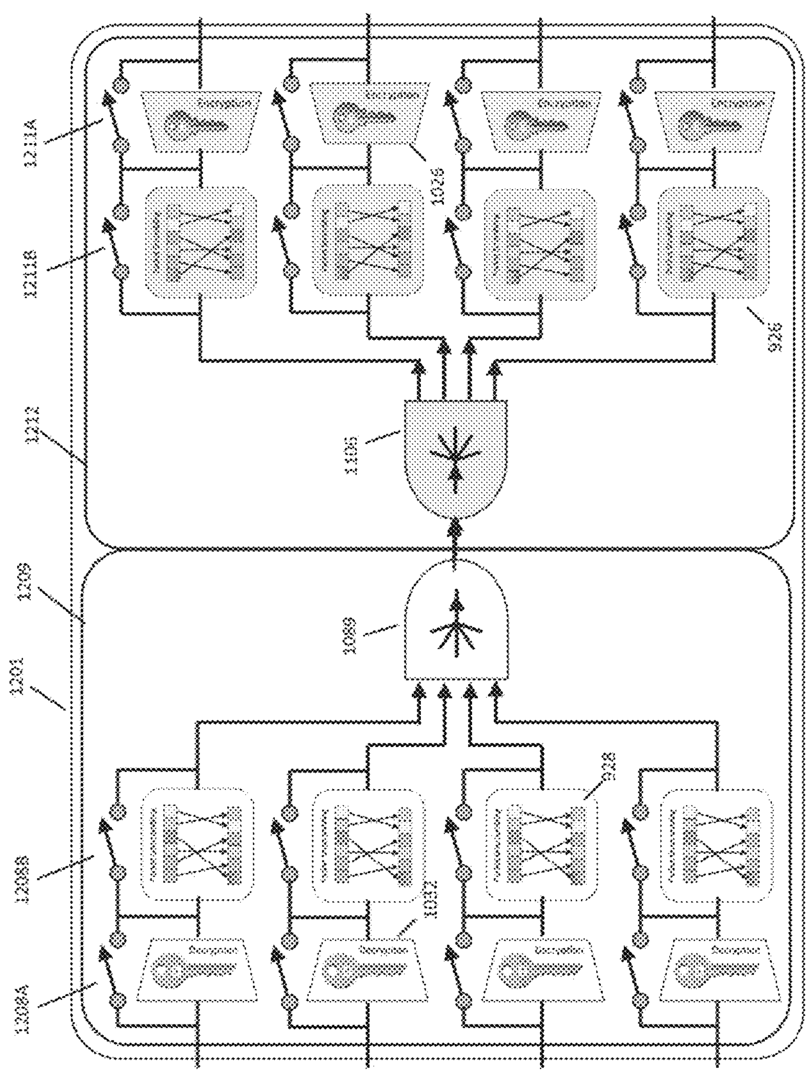

FIG. 83A is a schematic diagram showing a SDNP media node for meshed transport.

Figure 83B:
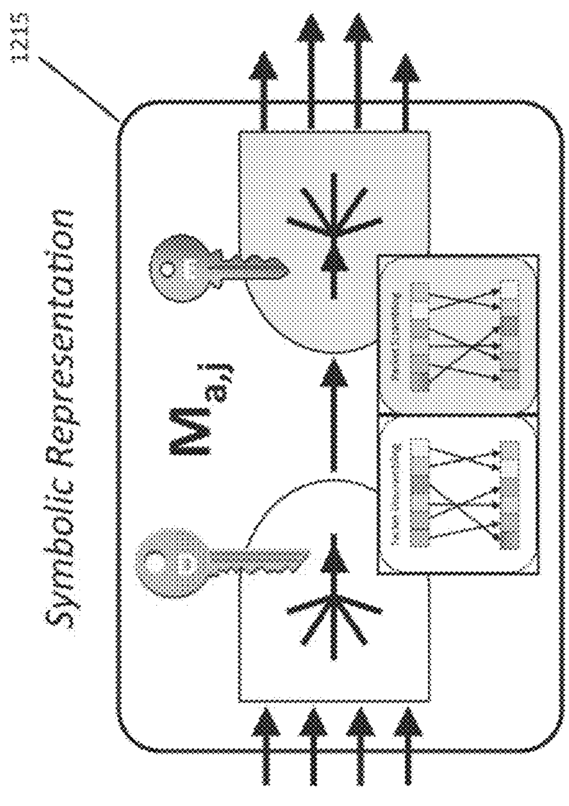

FIG. 83B is a schematic diagram showing a single-route SDNP media node.

Figure 83C:
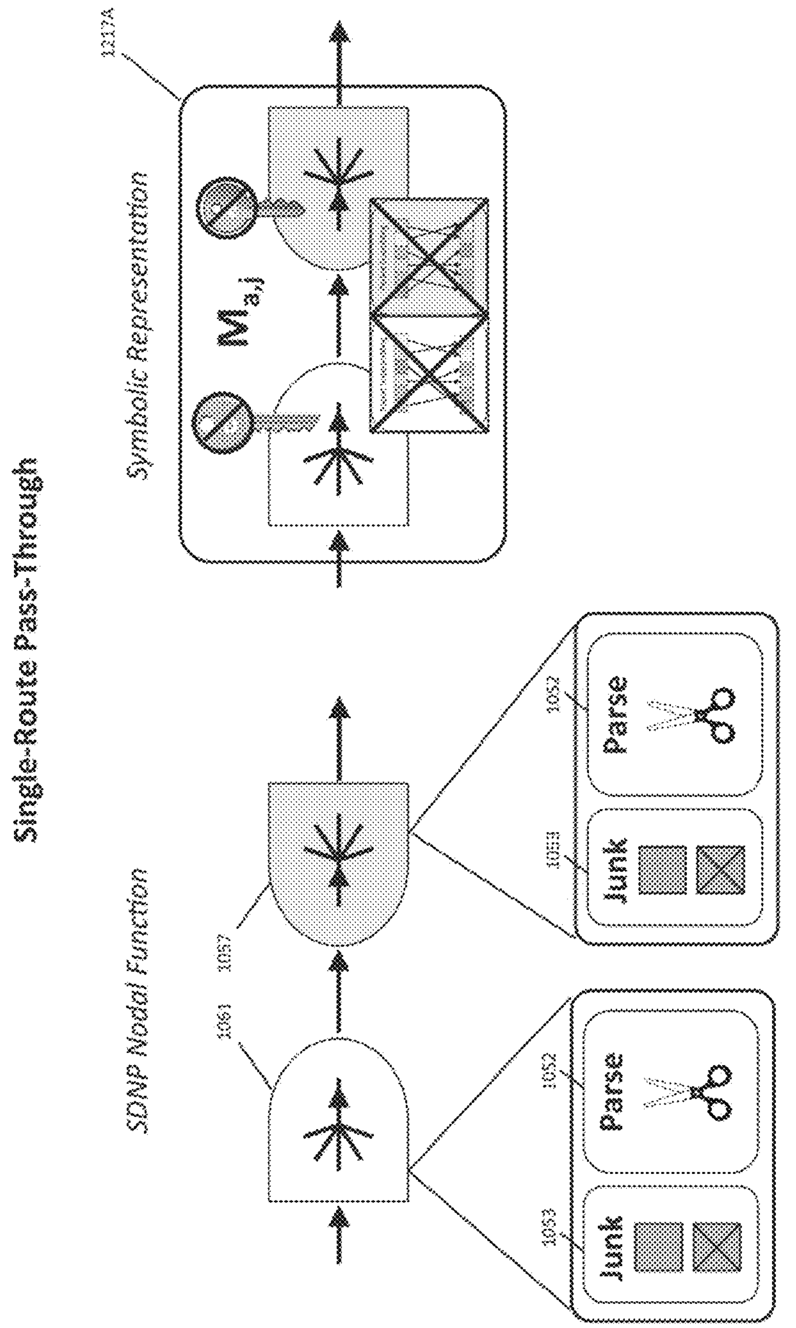

FIG. 83C is a schematic diagram showing a single-route pass-through SDNP media node.

Figure 83D:
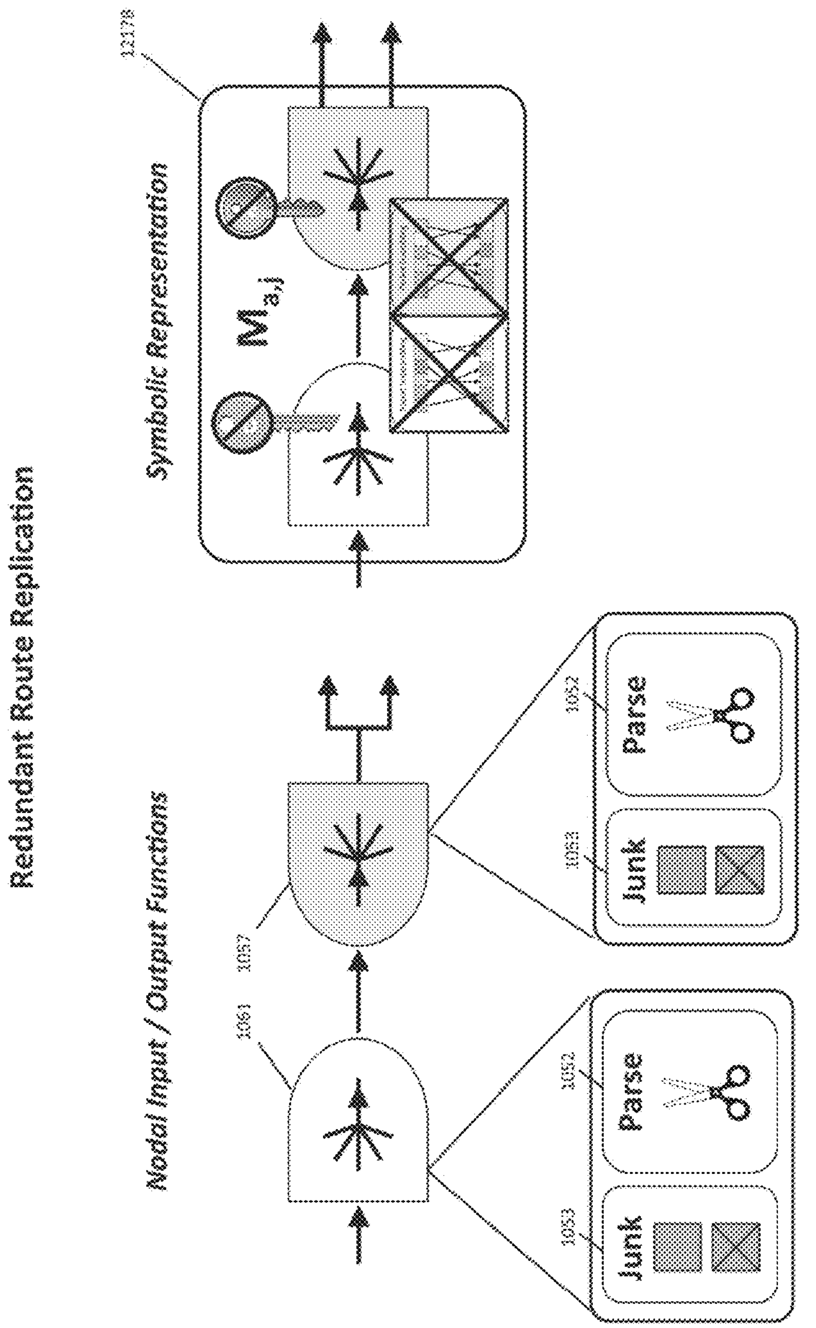

FIG. 83D is a schematic diagram showing a SDNP media node for redundant route replication.

Figure 83E:
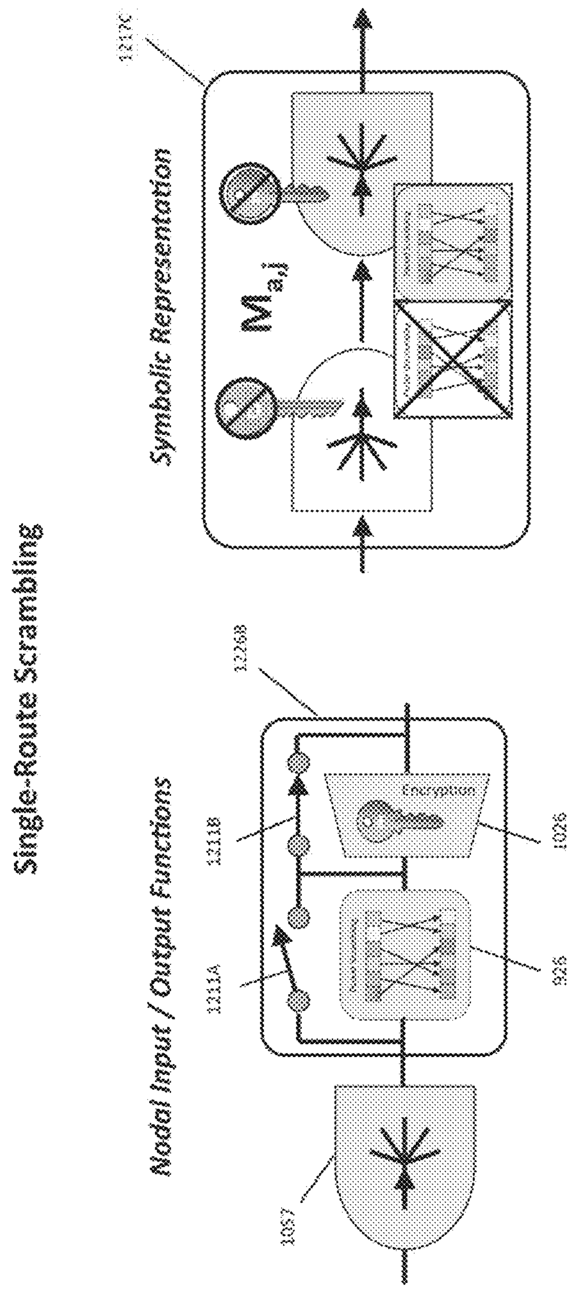

FIG. 83E is a schematic diagram showing a SDNP media node performing single-route scrambling.

Figure 83F:
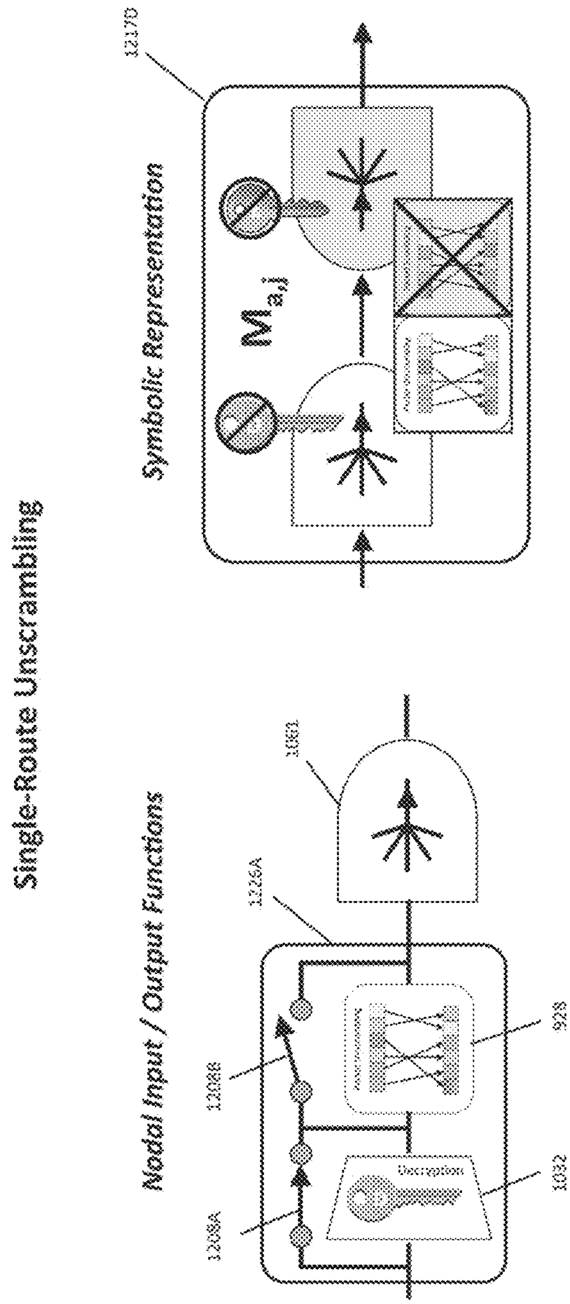

FIG. 83F is a schematic diagram showing a SDNP media node performing single-route unscrambling.

Figure 83G:
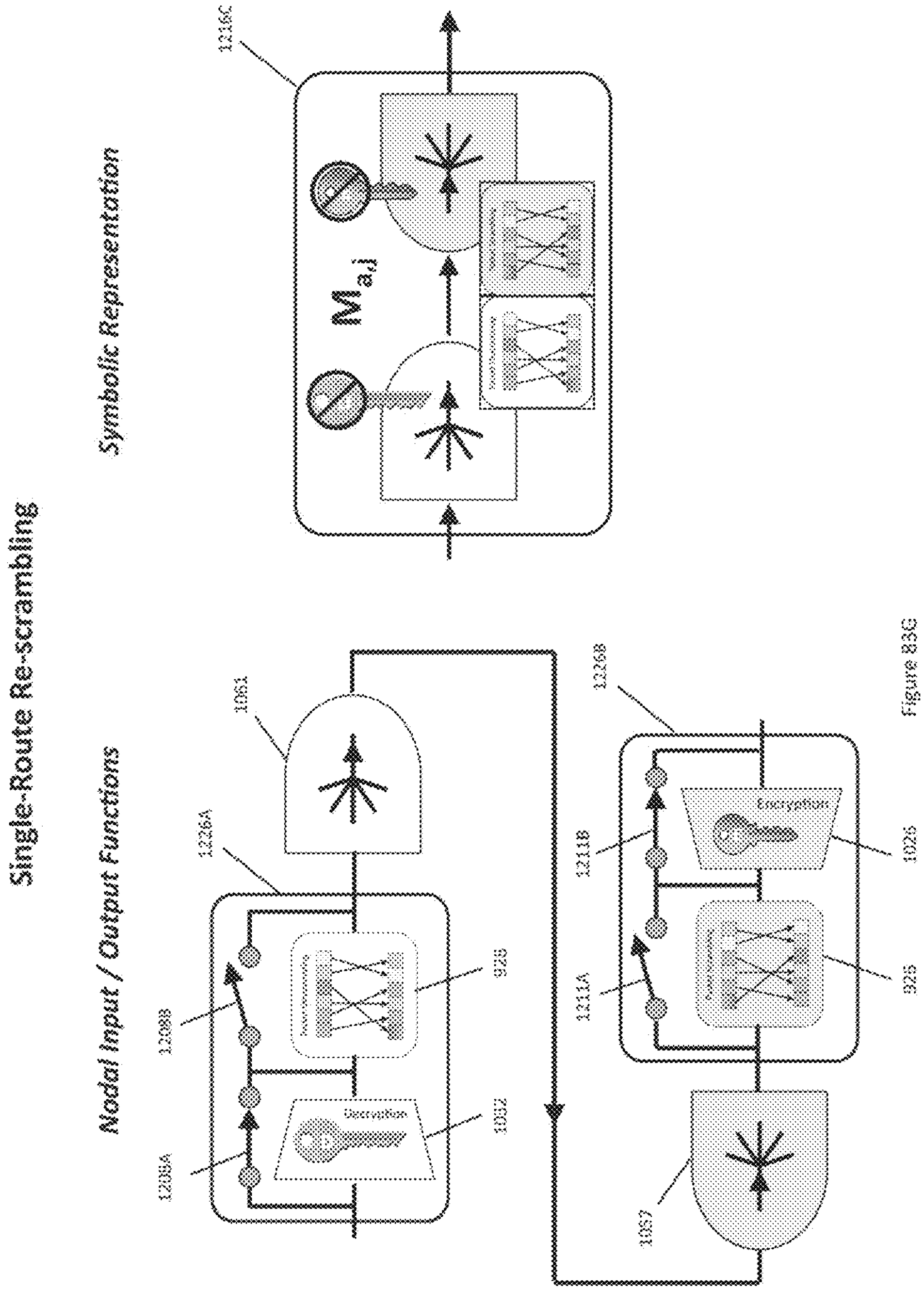

FIG. 83G is a schematic diagram showing a SDNP media node performing single-route re-scrambling.

Figure 83H:
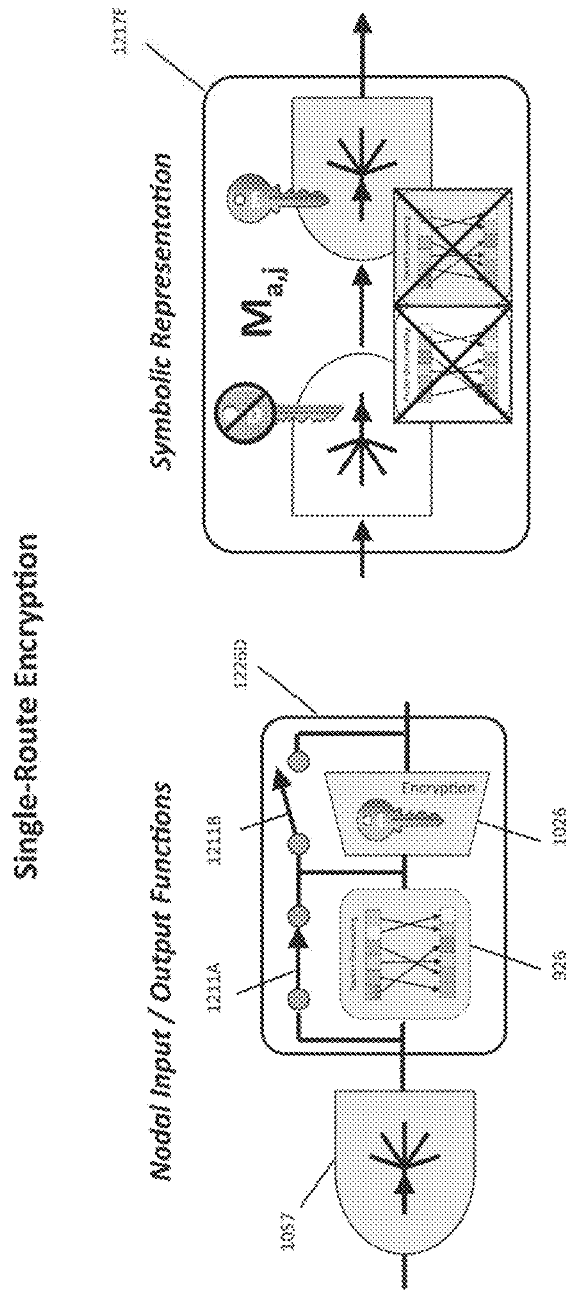

FIG. 83H is a schematic diagram showing a SDNP media node performing single-route encryption.

Figure 83I:
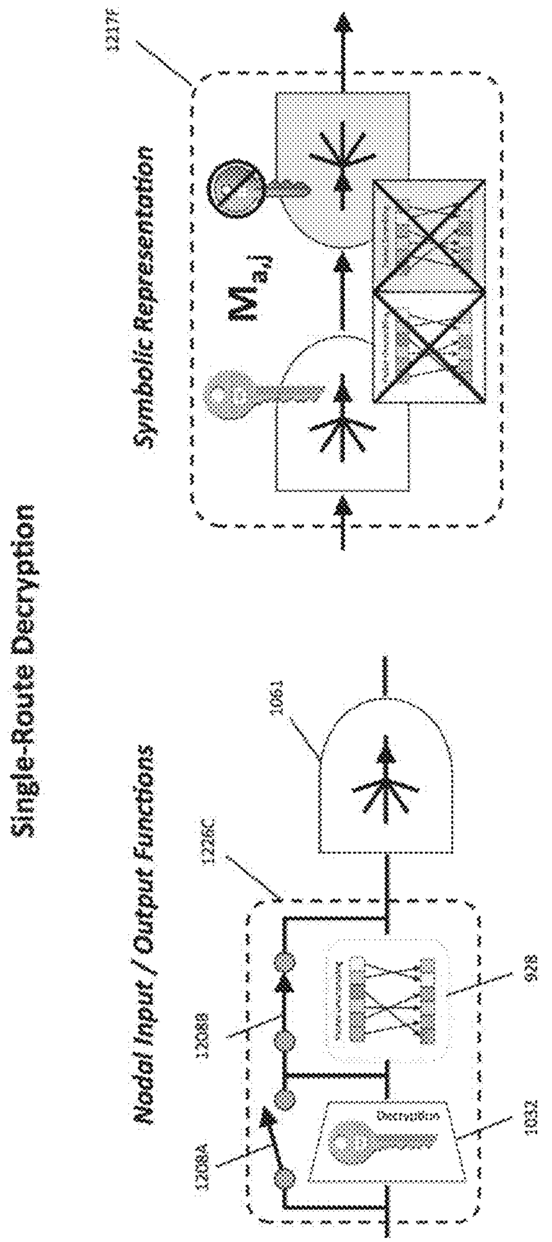

FIG. 83I is a schematic diagram showing a SDNP media node performing single-route decryption.

Figure 83J:
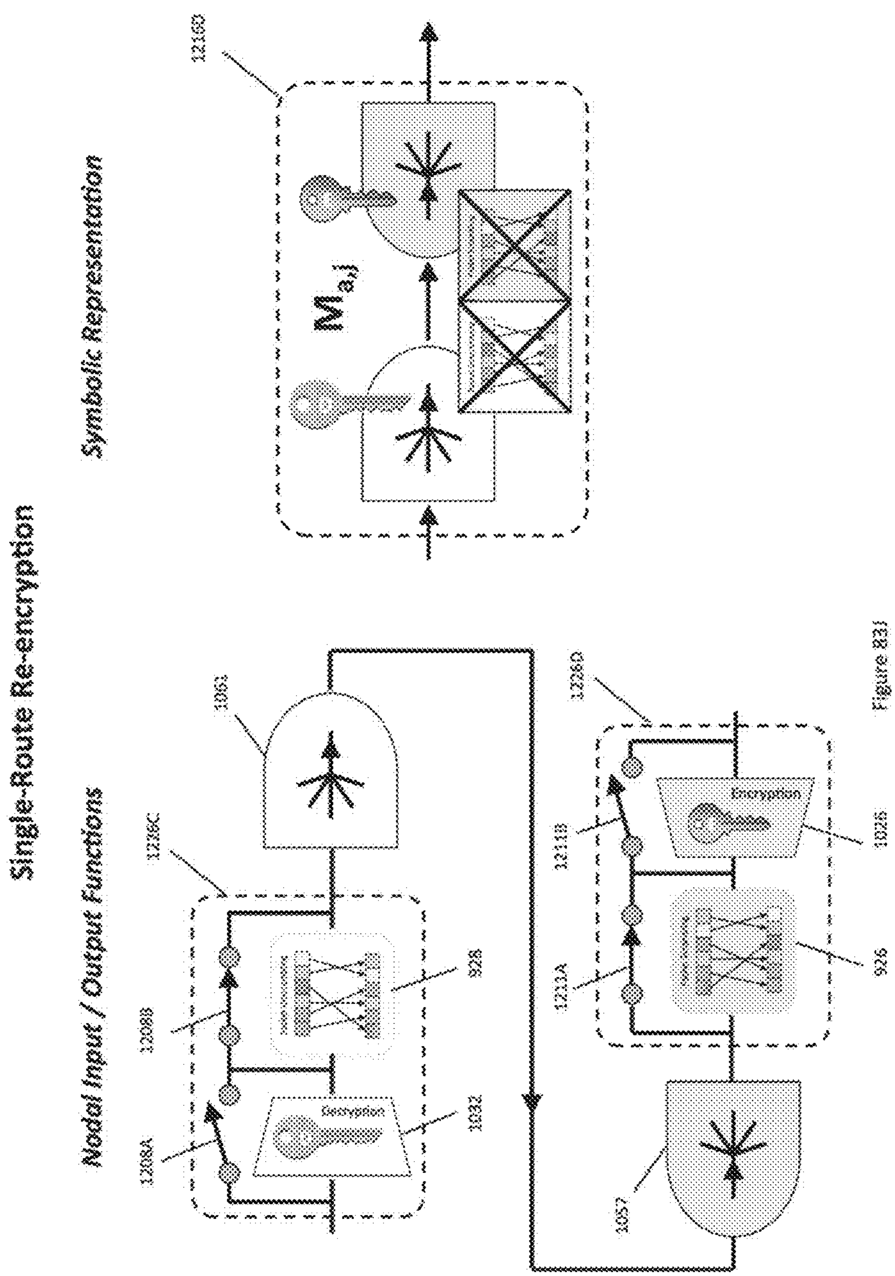

FIG. 83J is a schematic diagram showing a SDNP media node performing single-route re-encryption.

Figure 83K:
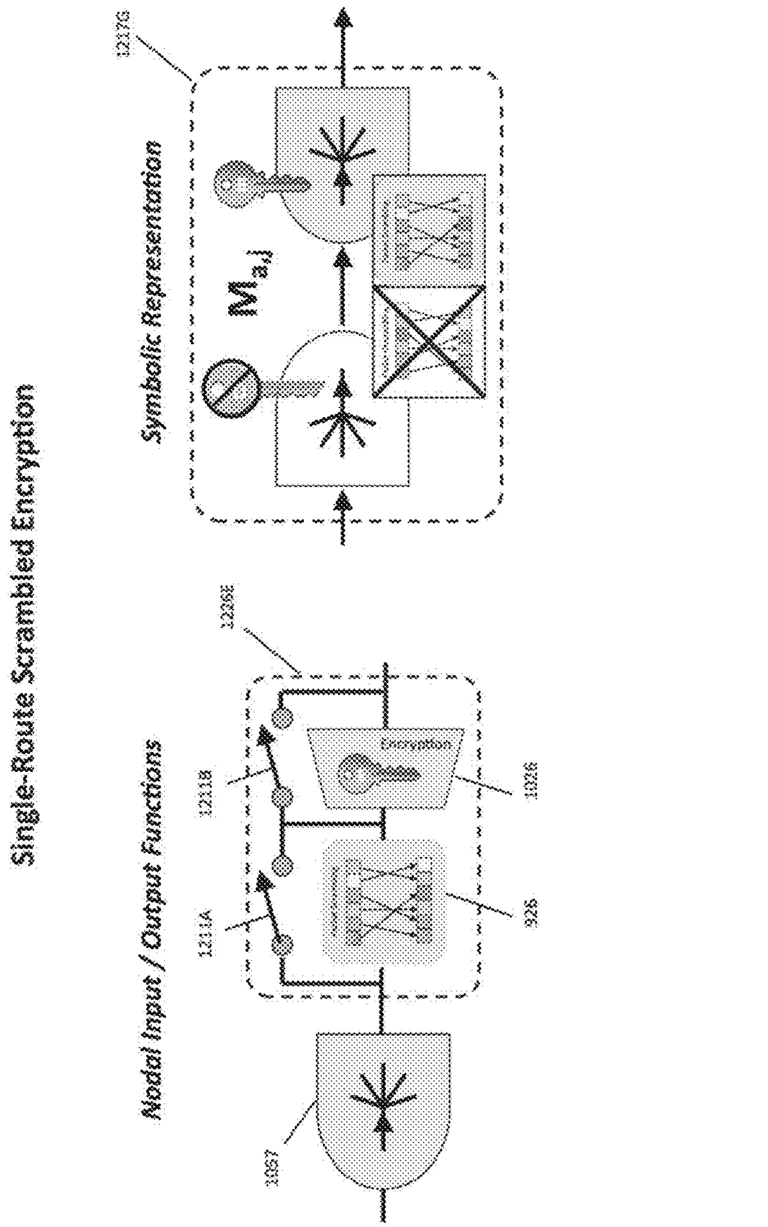

FIG. 83K is a schematic diagram showing a SDNP media node performing single-route scrambled encryption.

Figure 83L:
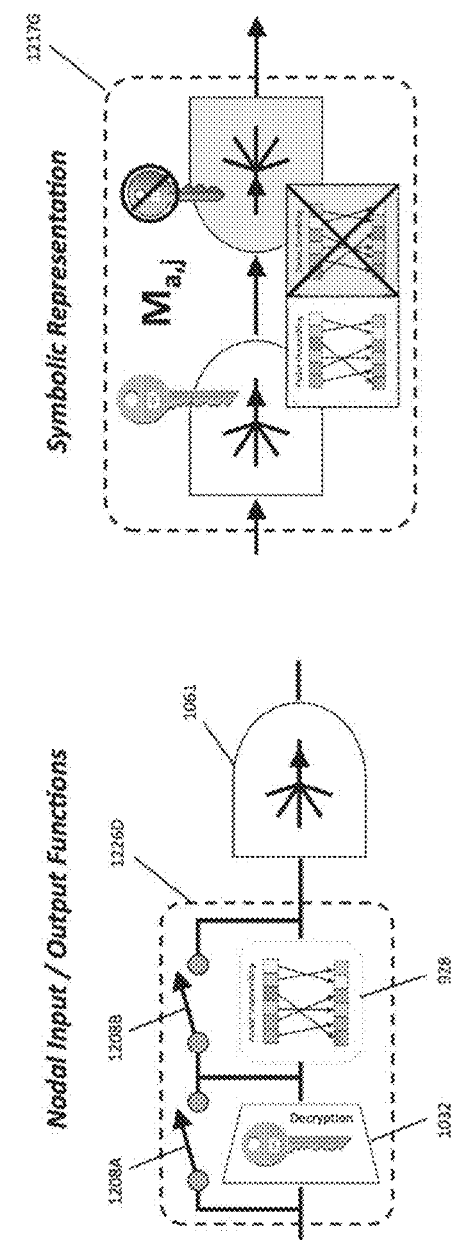

FIG. 83L is a schematic diagram showing a SDNP media node performing single-route unscrambled decryption.

Figure 83M:
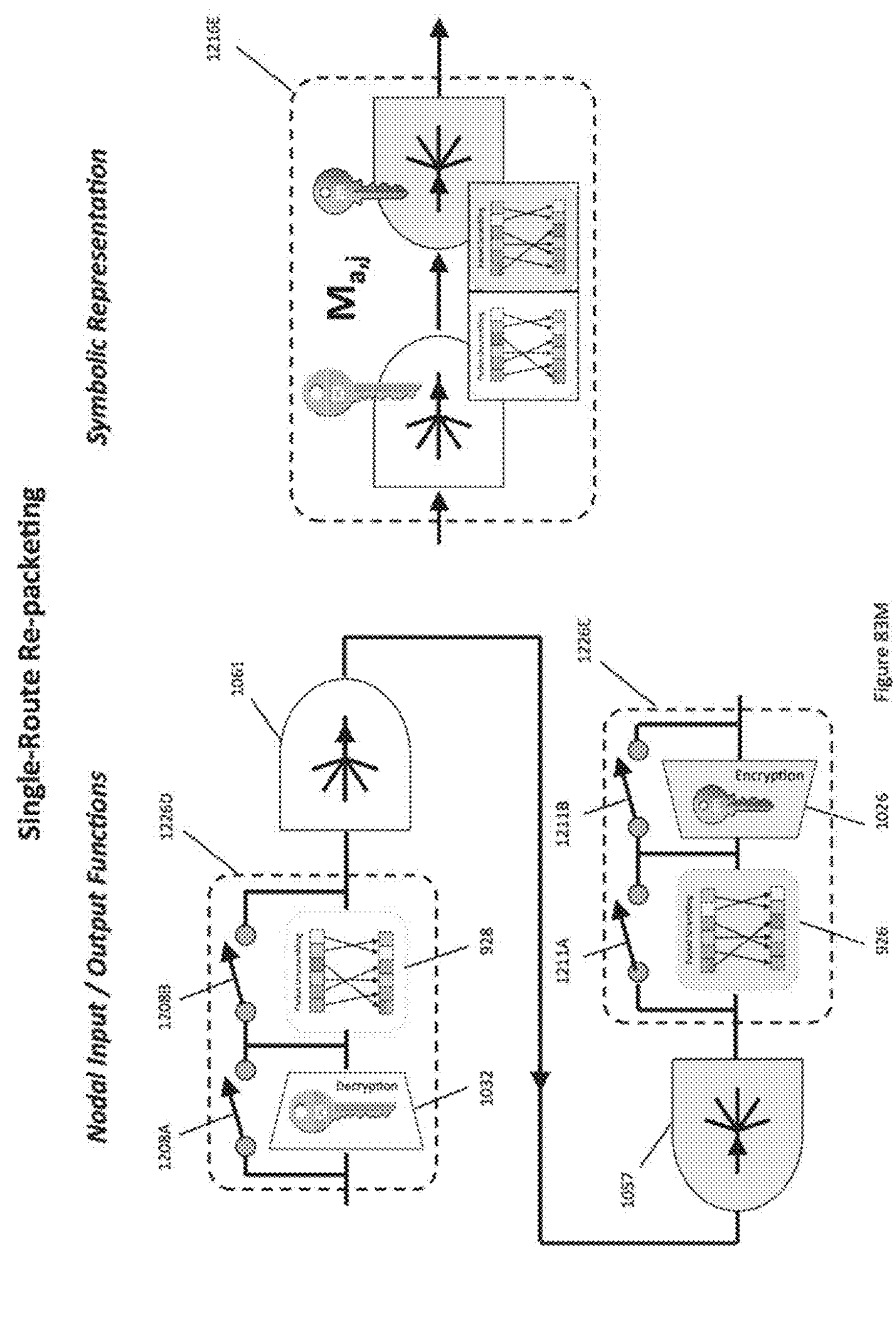
Figure 63N:
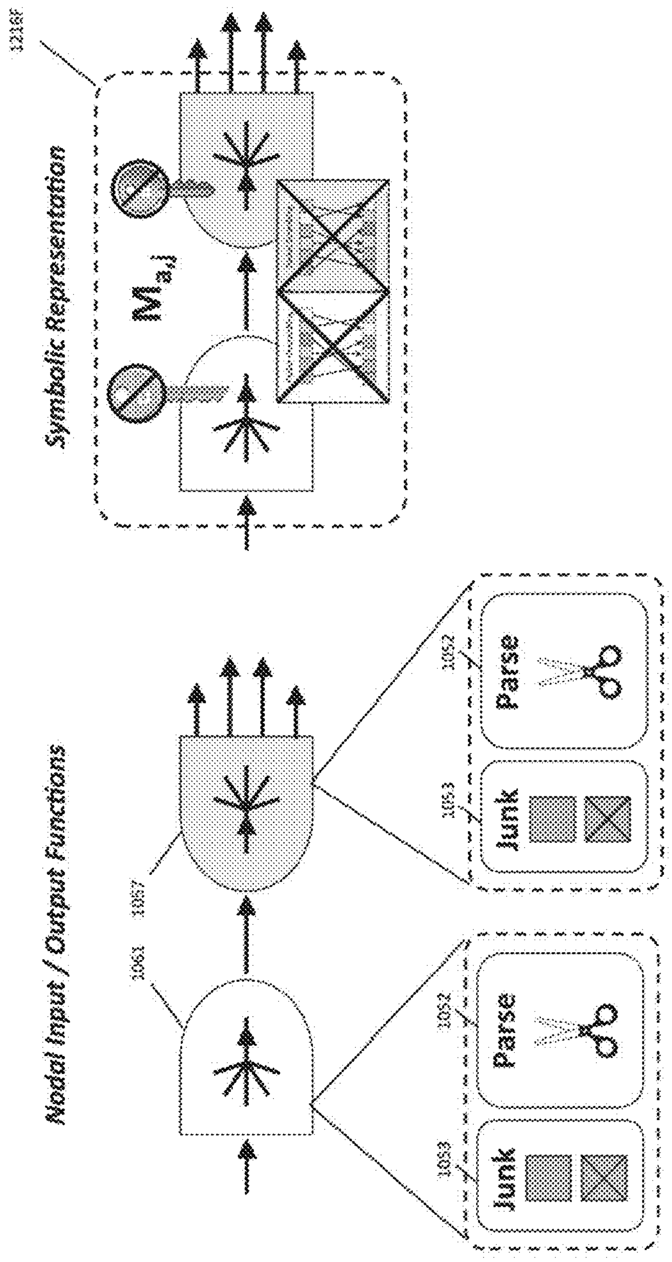

FIG. 83M is a schematic diagram showing a SDNP media node performing single-route re-packeting.

FIG. 83N is a schematic diagram showing a meshed SDNP gateway input.

Figure 83O:
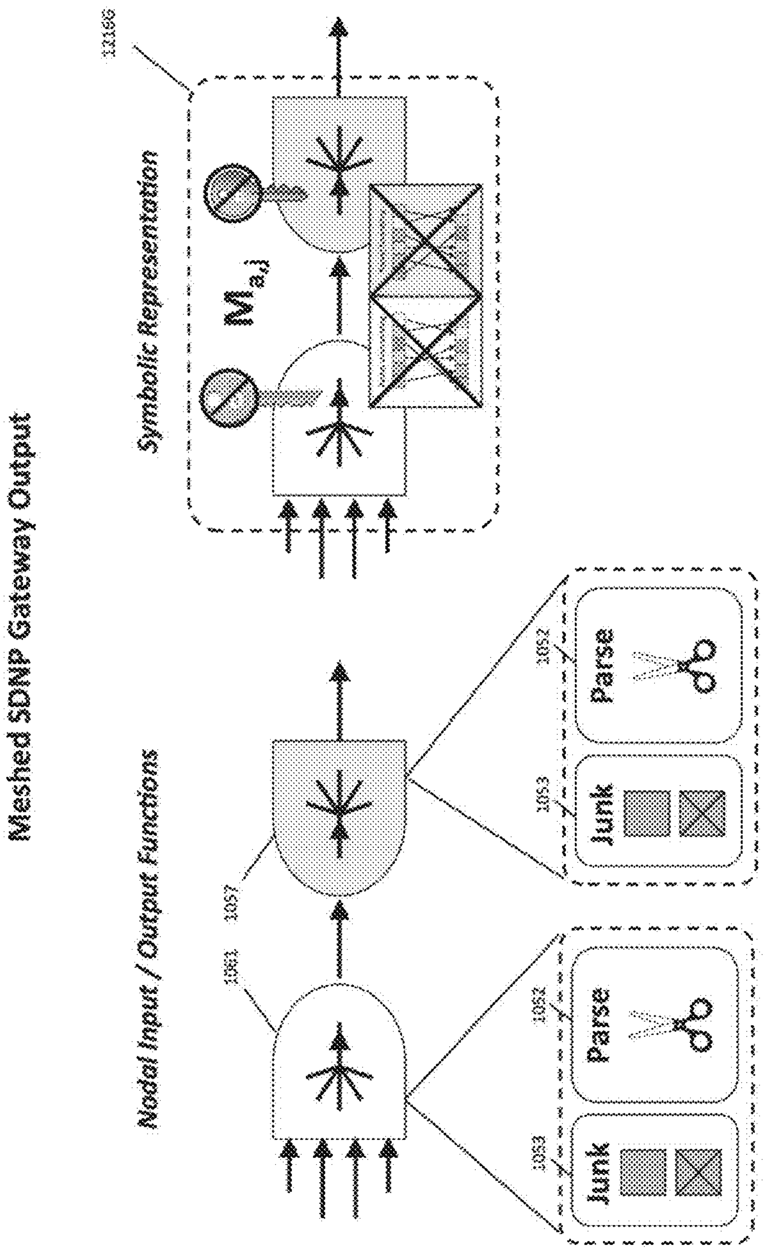

FIG. 83O is a schematic diagram showing a meshed SDNP gateway output.

Figure 83P:
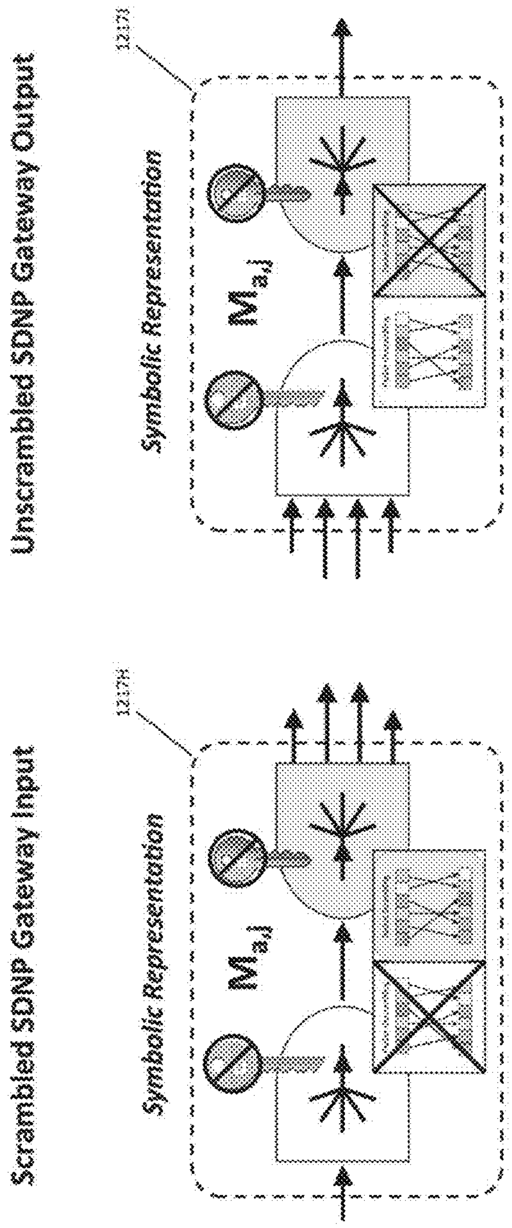

FIG. 83P is a schematic diagram showing a scrambled SDNP gateway input and an unscrambled SDNP gateway output.

Figure 83Q:
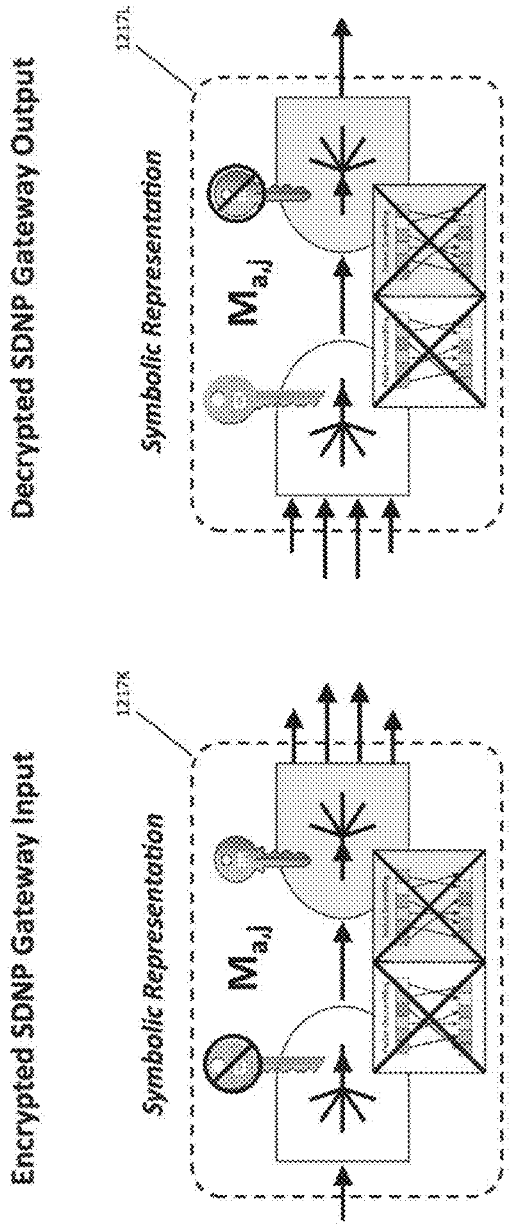

FIG. 83Q is a schematic diagram showing an encrypted SDNP gateway input and a decrypted SDNP gateway output.

Figure 83R:
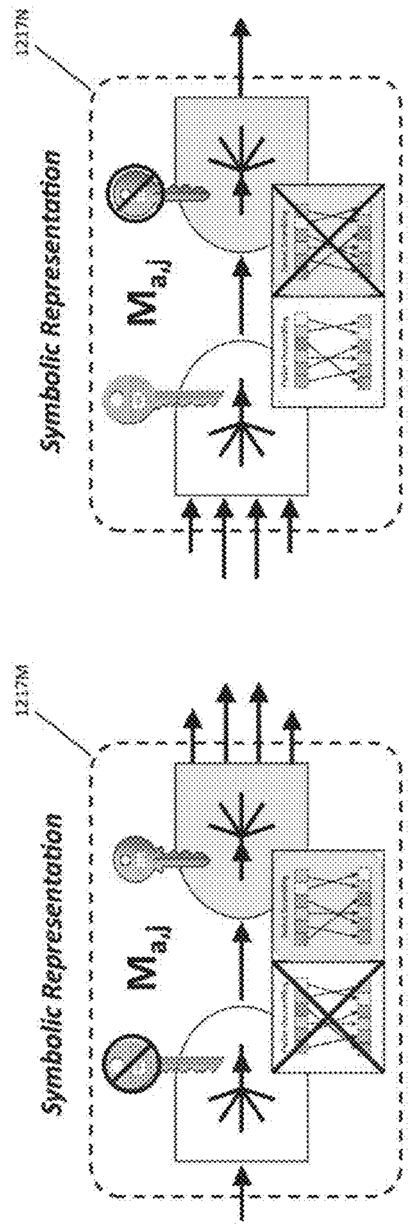

FIG. 83R is a schematic diagram showing a scrambled encrypted SDNP gateway input and an unscrambled decrypted SDNP gateway output.

Figure 83S:
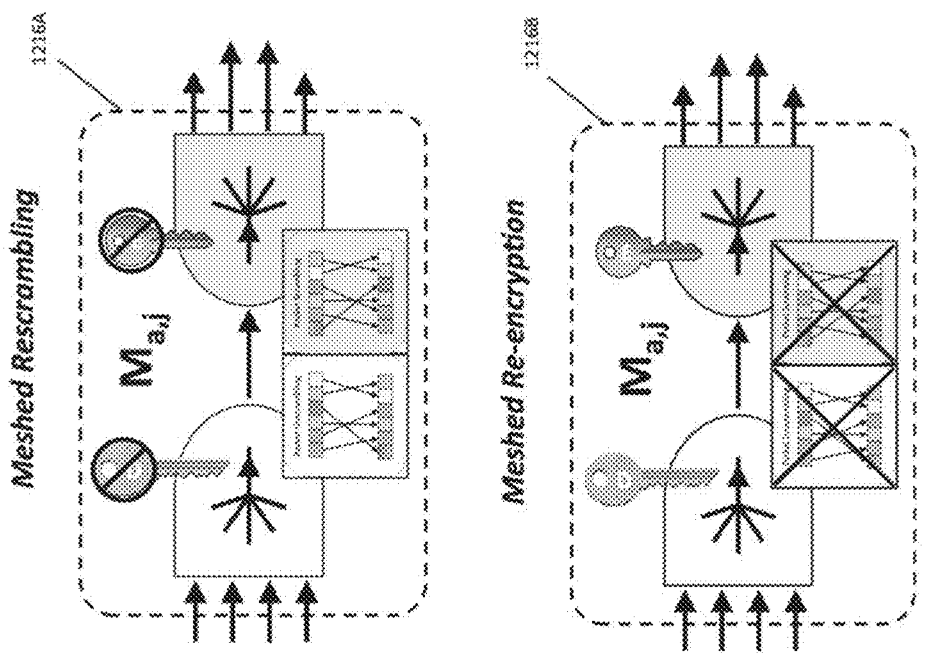
Figure 84A:
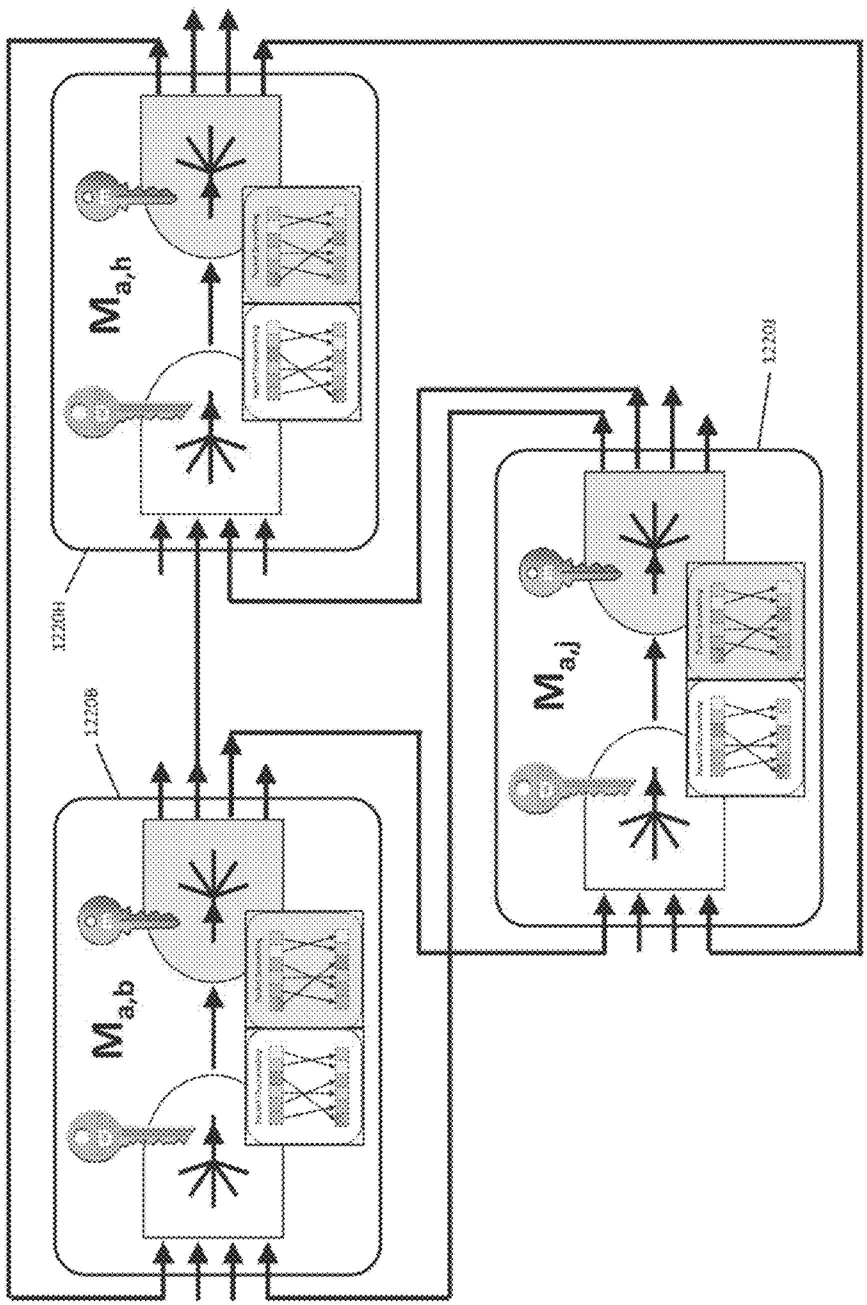

FIG. 83S is a schematic diagram showing SDNP gateways performing meshed re-scrambling and meshed re-encryption FIG. 84A is a schematic diagram showing SDNP media node interconnections.

Figure 84B:
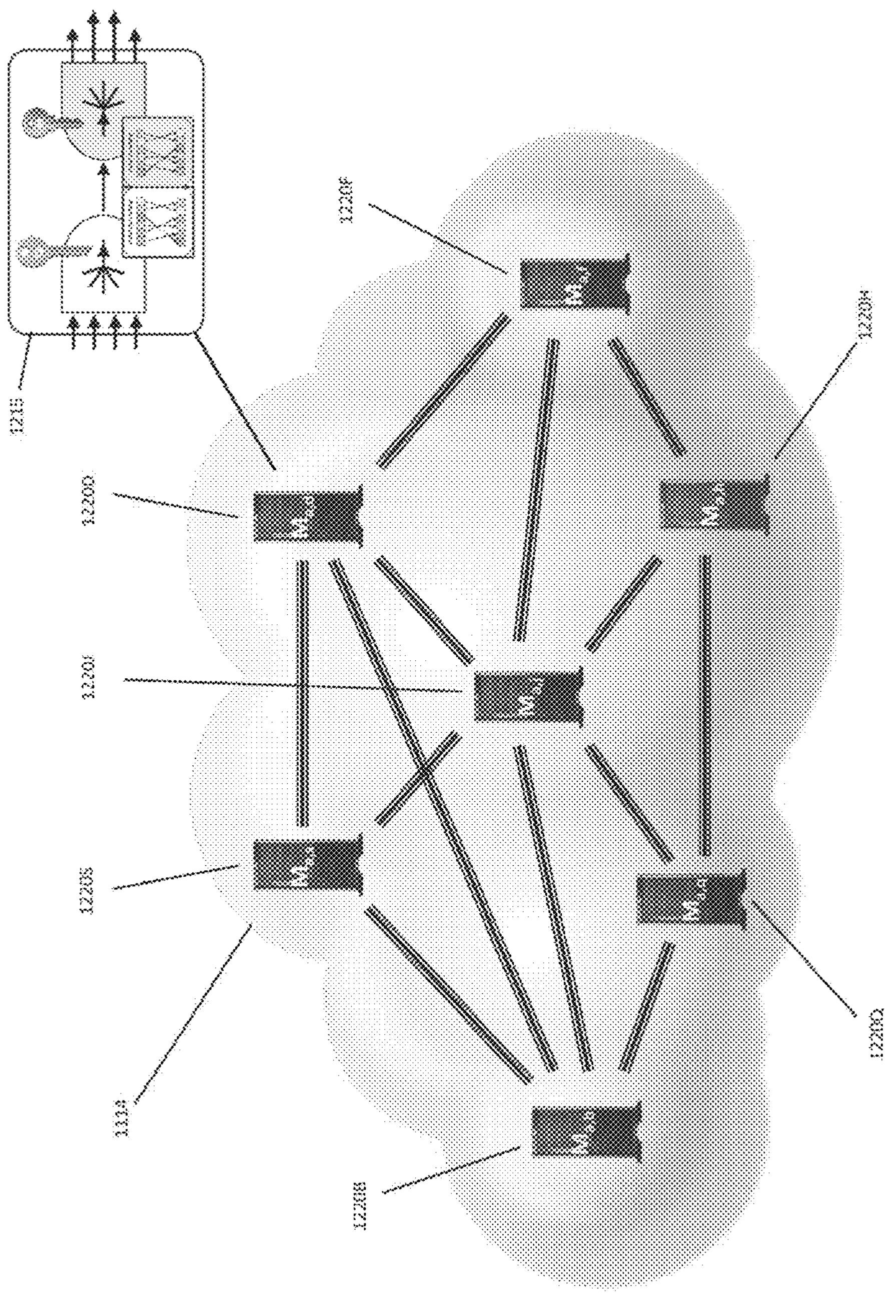

FIG. 84B is a schematic diagram showing an SDNP cloud.

Figure 84C:
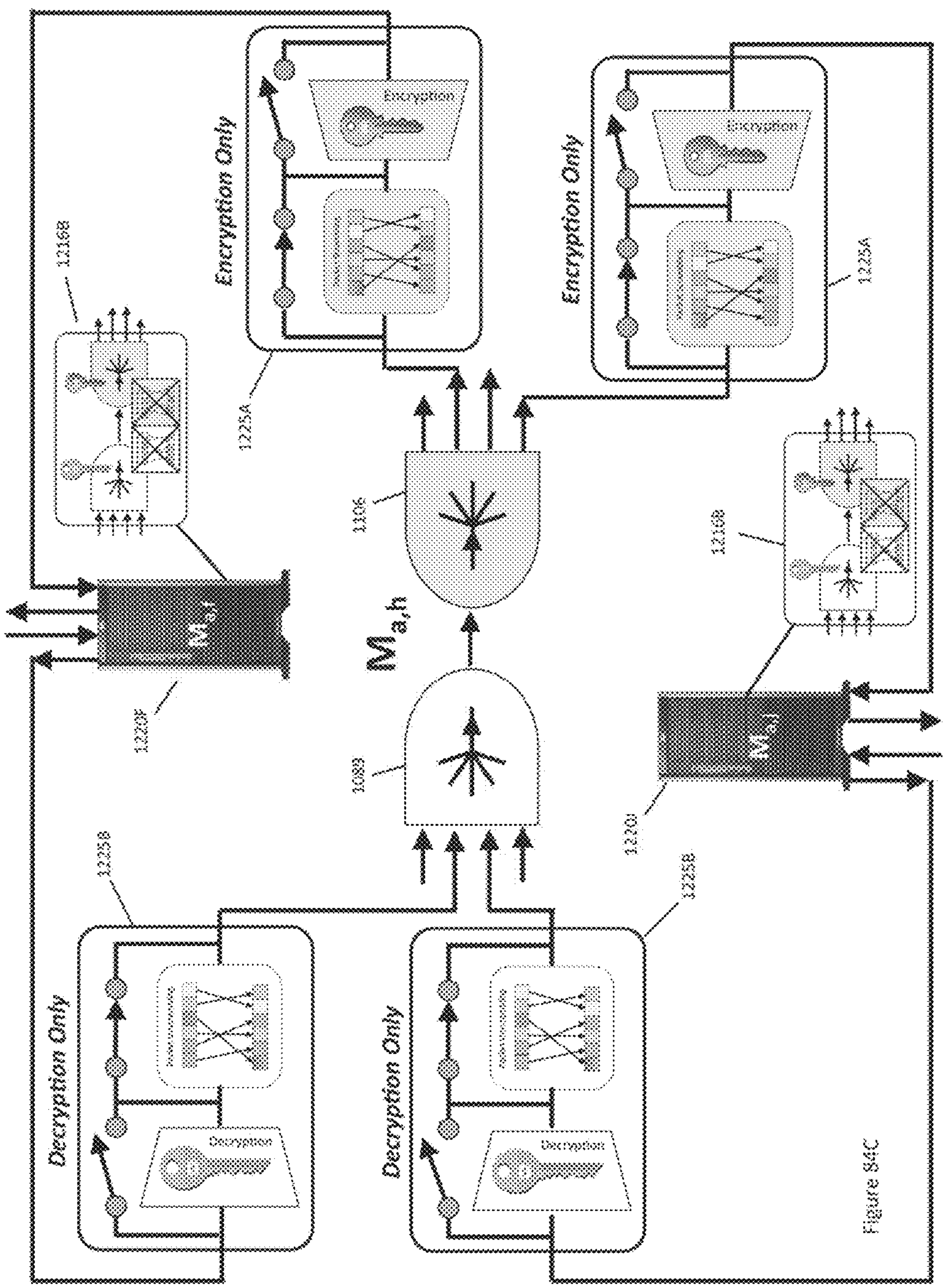

FIG. 84C is a schematic diagram showing an encrypted communication between SDNP media nodes.

Figure 84D:
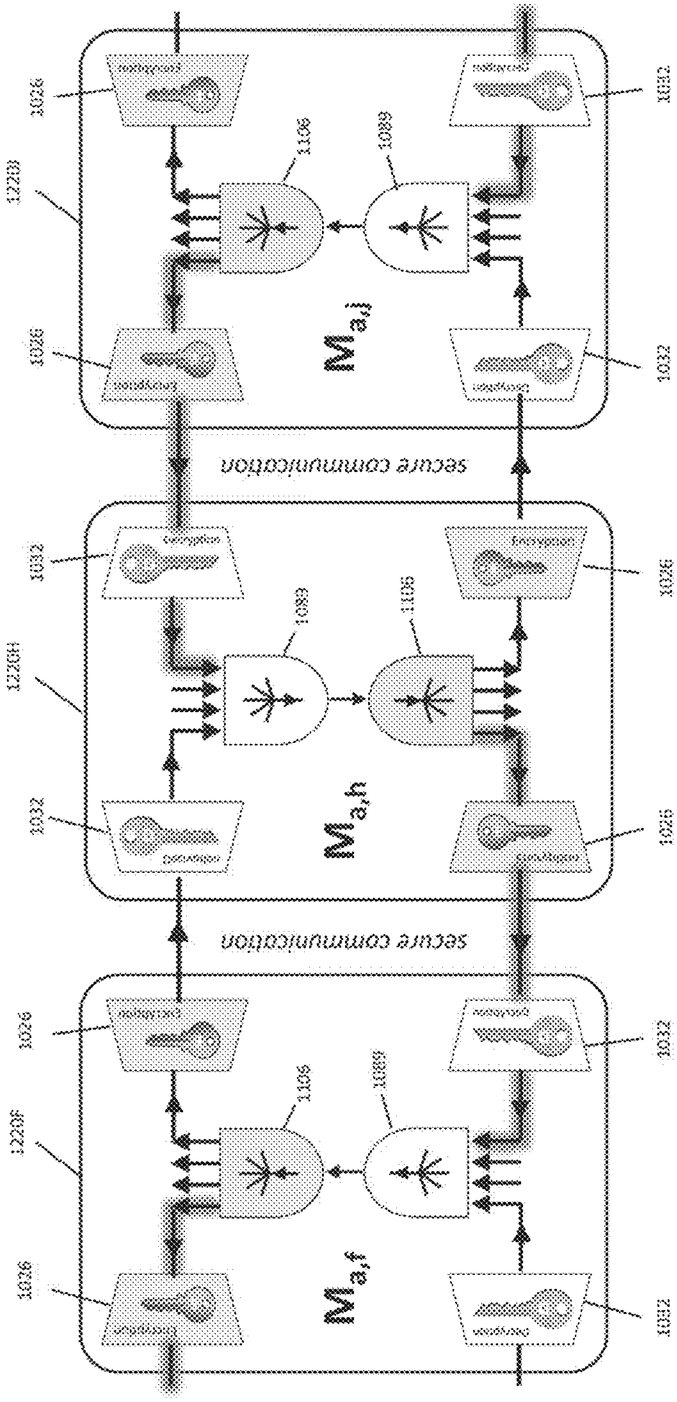

FIG. 84D is a schematic diagram showing SDNP inter-node encrypted communication.

Figure 85A:
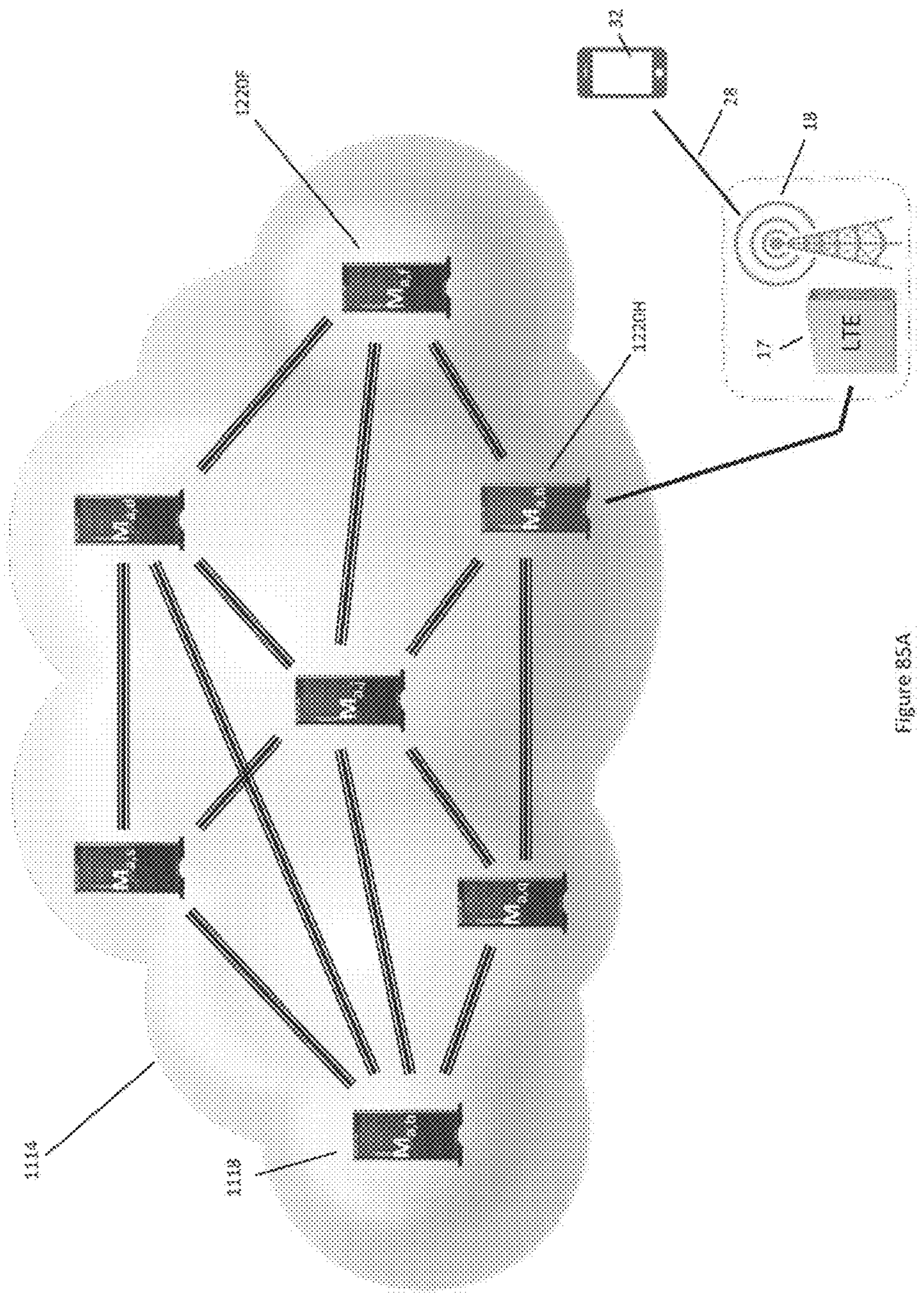

FIG. 85A is a schematic diagram showing a SDNP cloud with last-mile connectivity to a cell phone client.

Figure 85B:
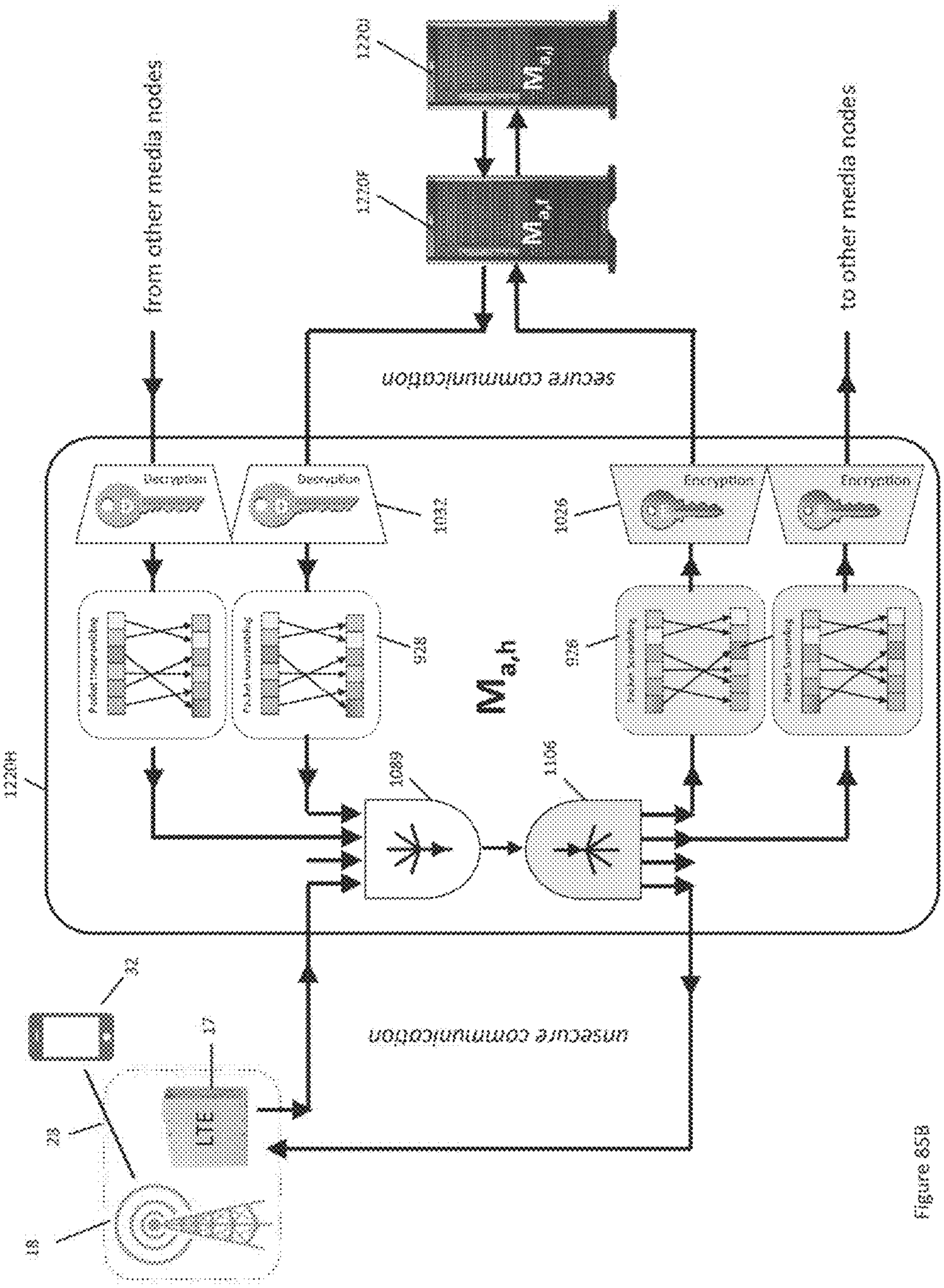

FIG. 85B is a schematic diagram showing a SDNP gateway with an unsecured last-mile connection.

Figure 85C:
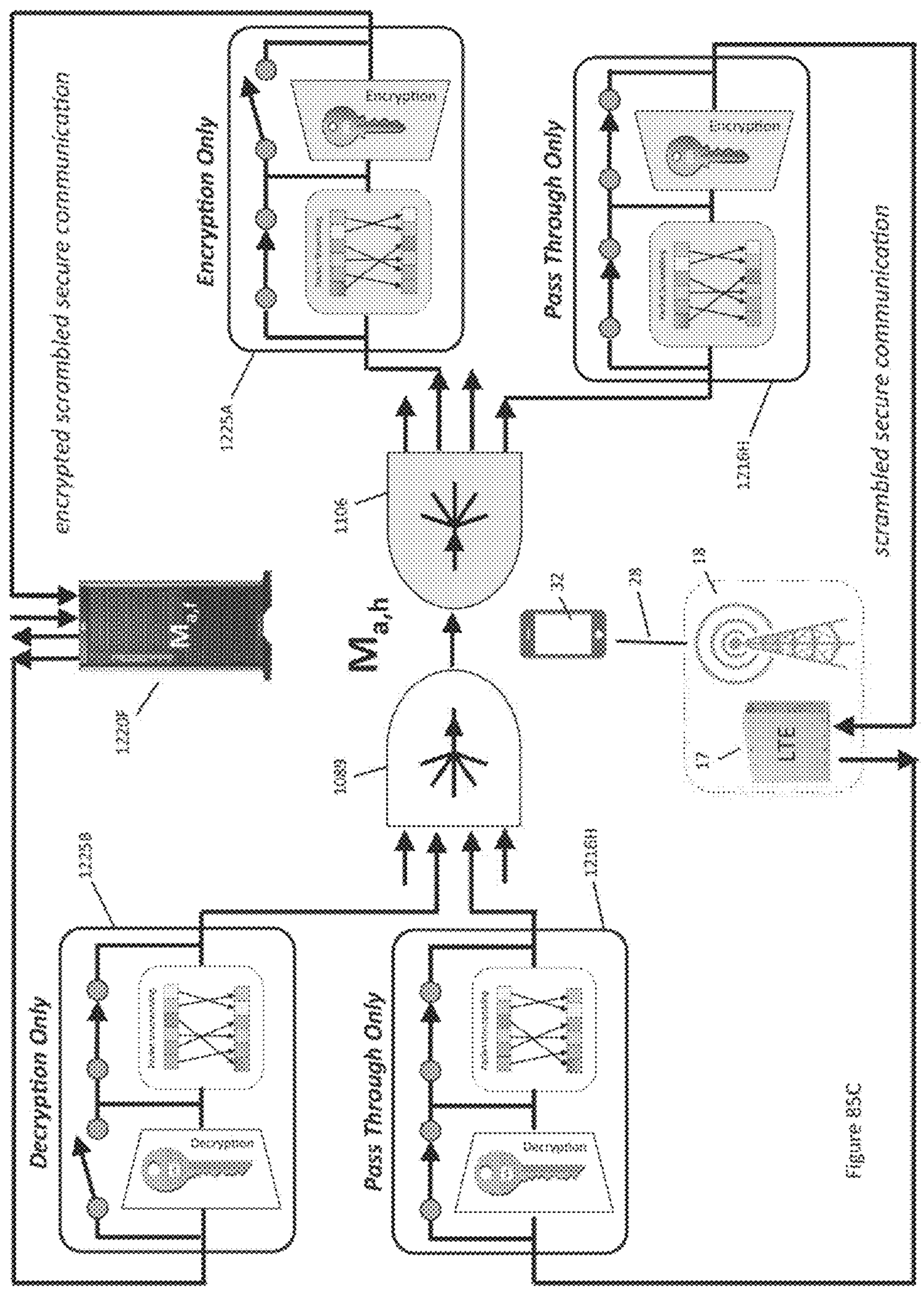

FIG. 85C is a schematic diagram showing a SDNP gateway with a secure last-mile connection.

Figure 85D:
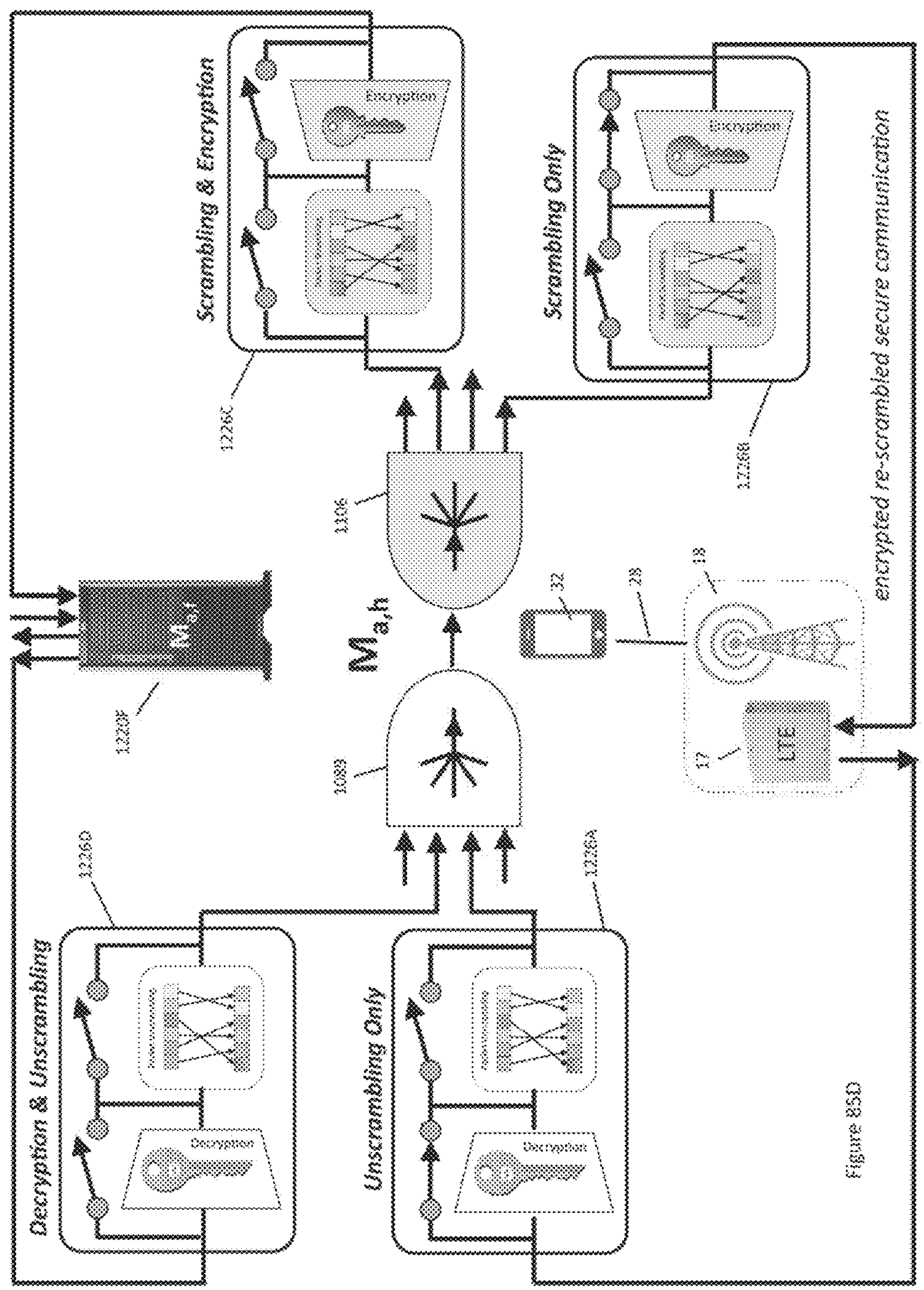

FIG. 85D is a schematic diagram showing an alternate embodiment of an SDNP gateway with a secure last-mile connection.

Figure 86:
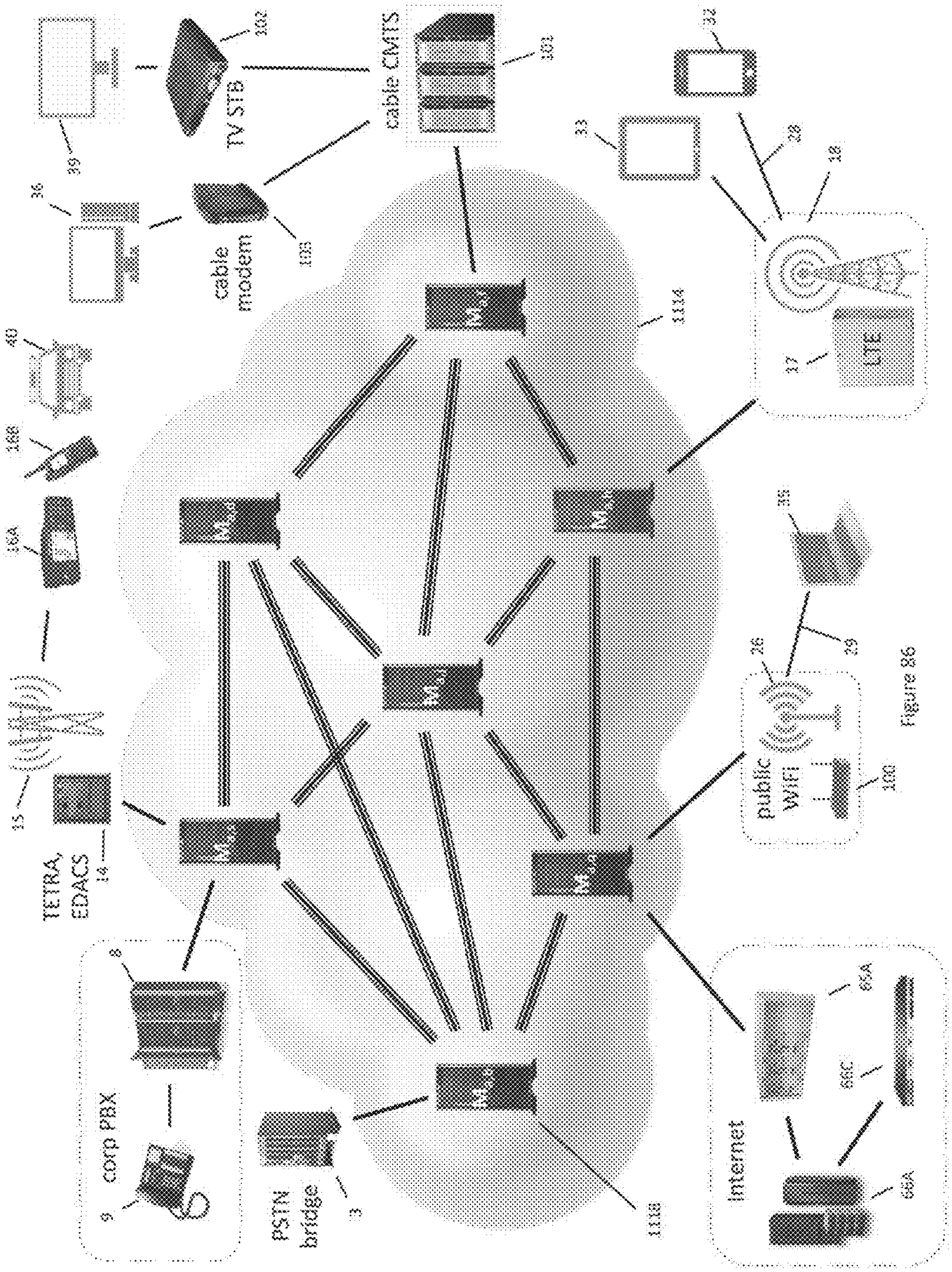
Figure 67:
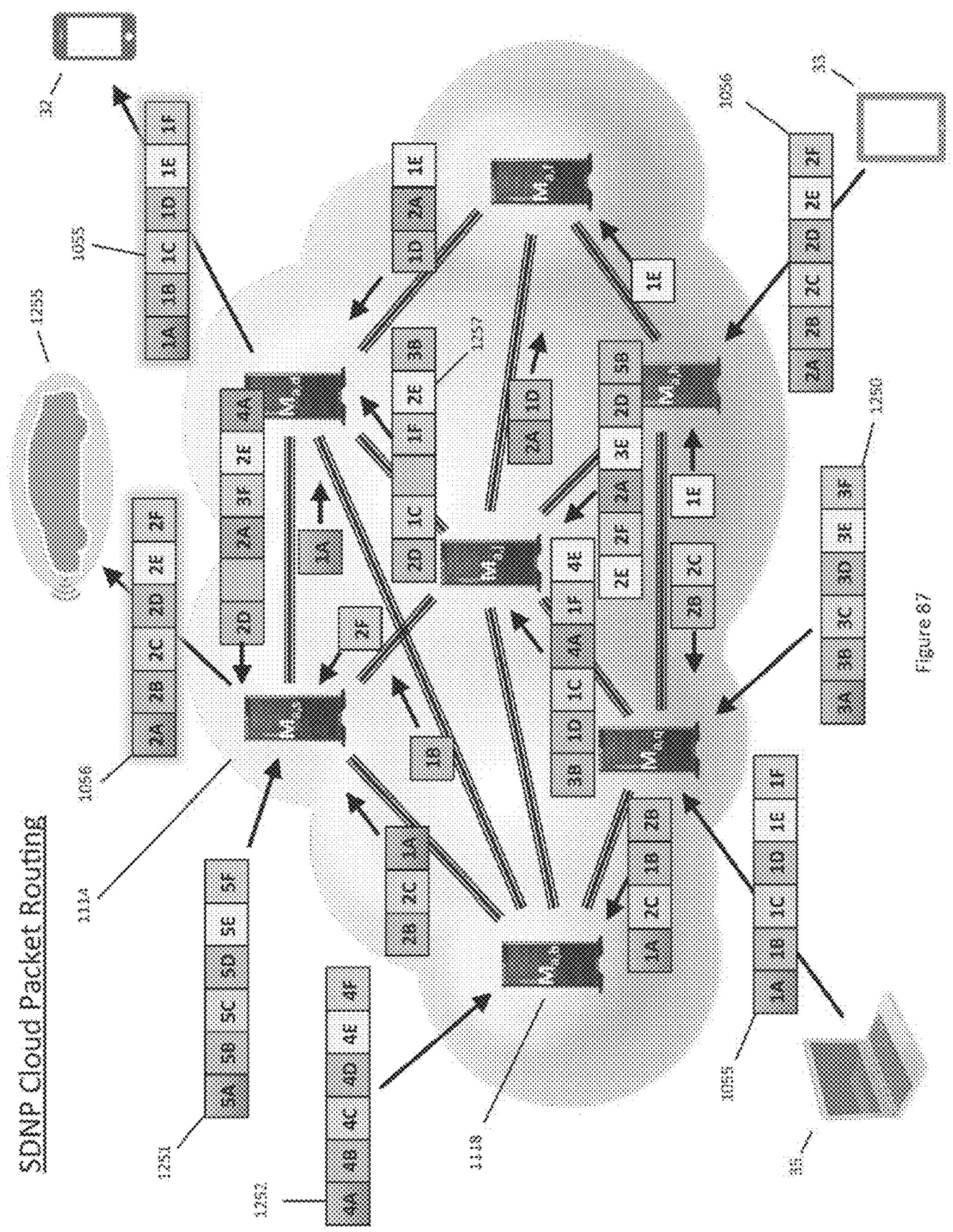
FIG. 67H is a flow chart illustrating a hybrid mixing/scrambling algorithm.

FIG. 86 is a schematic diagram depicting various clients connected to a SDNP cloud.

FIG. 87 is a schematic diagram packet routing in an SDNP cloud.

Figure 1:
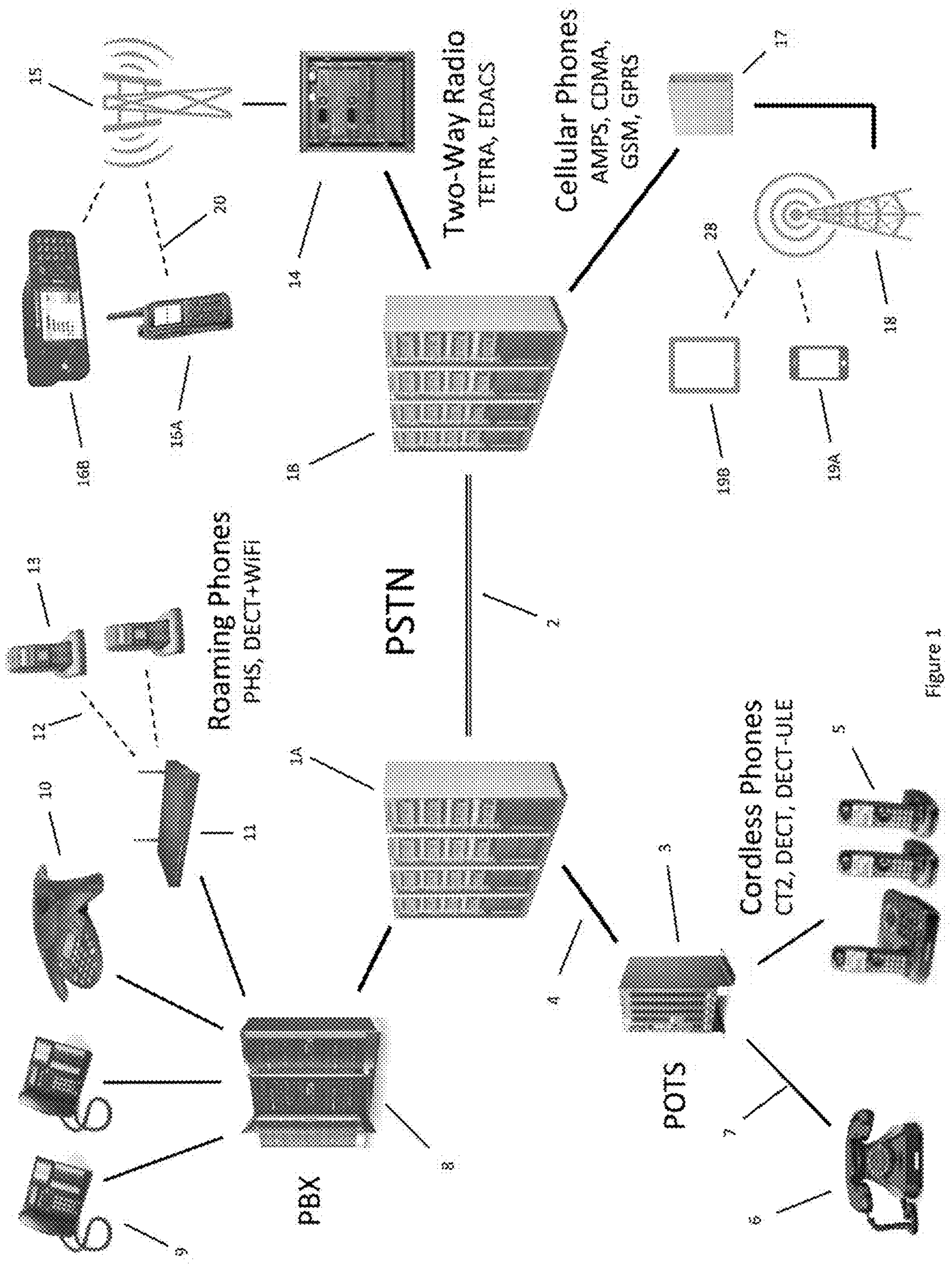
FIG. 1 is a schematic representation of a circuit-based telephonic network.
Figure 2:
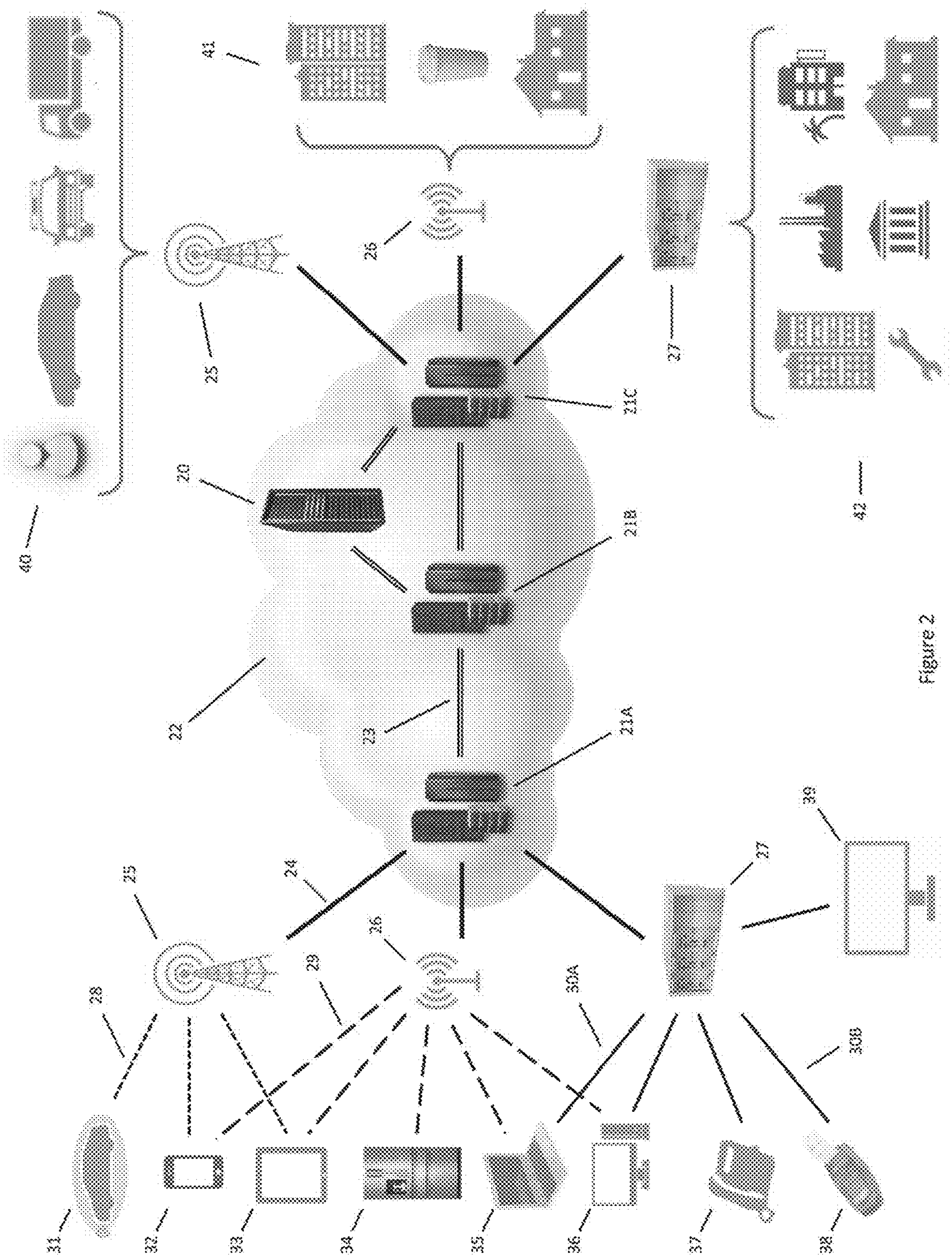
FIG. 2 is a schematic representation of a packet-based communication network.
Figure 3:
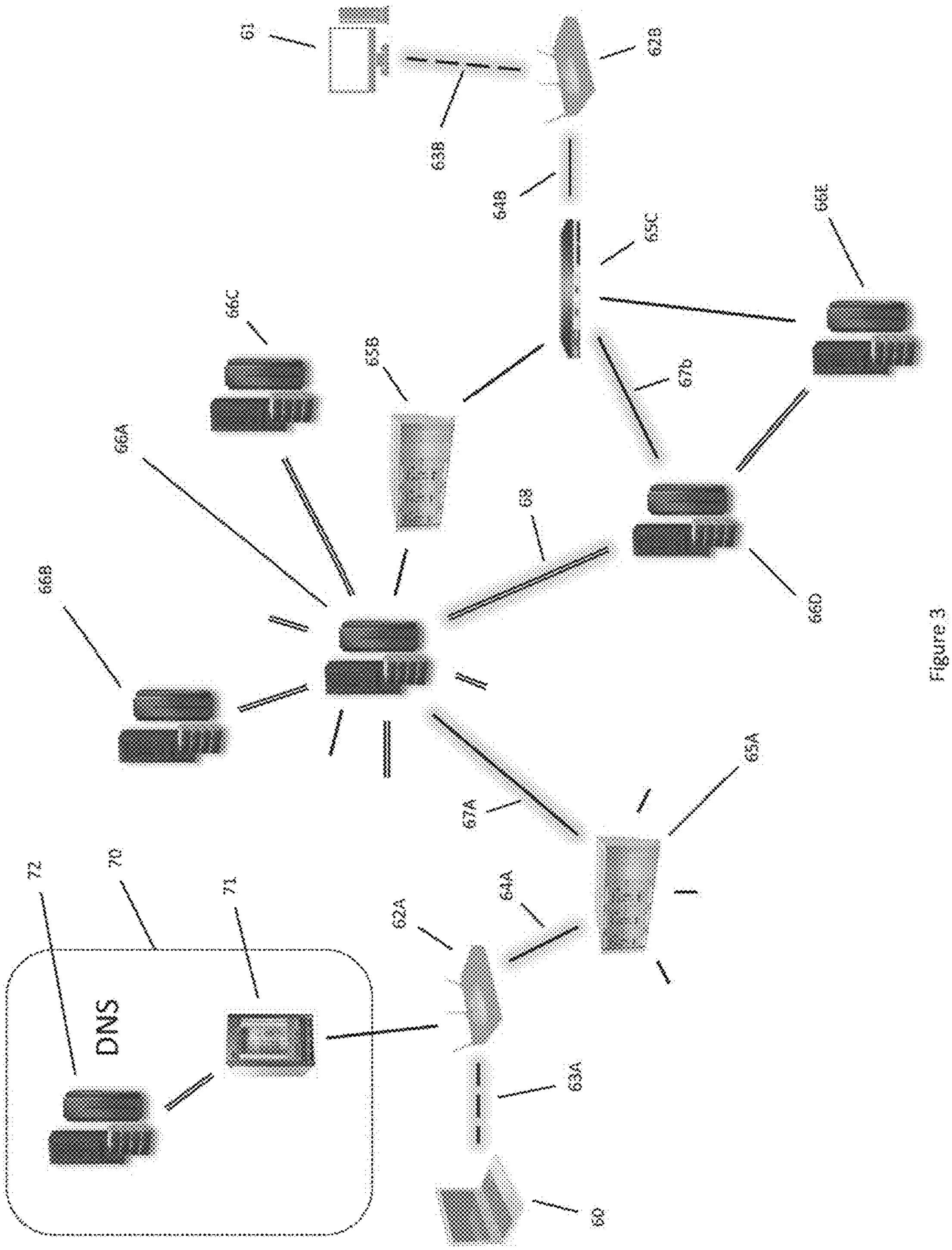
FIG. 3 is a schematic representation of packet routing in a packet-based communication network.
Figure 5A:
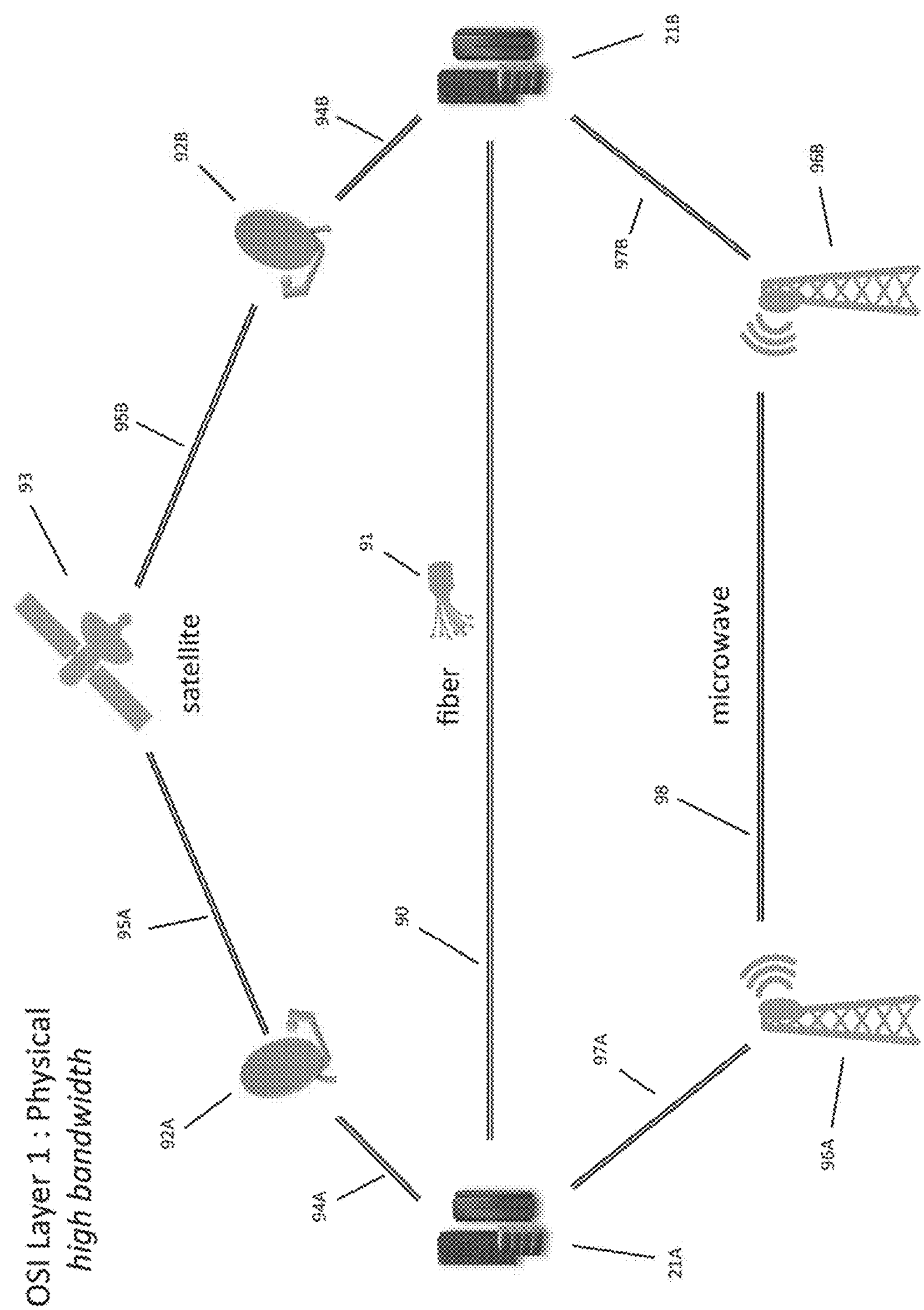
FIG. 5A is a schematic representation of a communication network illustrating high-bandwidth connectivity examples of physical Layer 1.
Figure 5B:
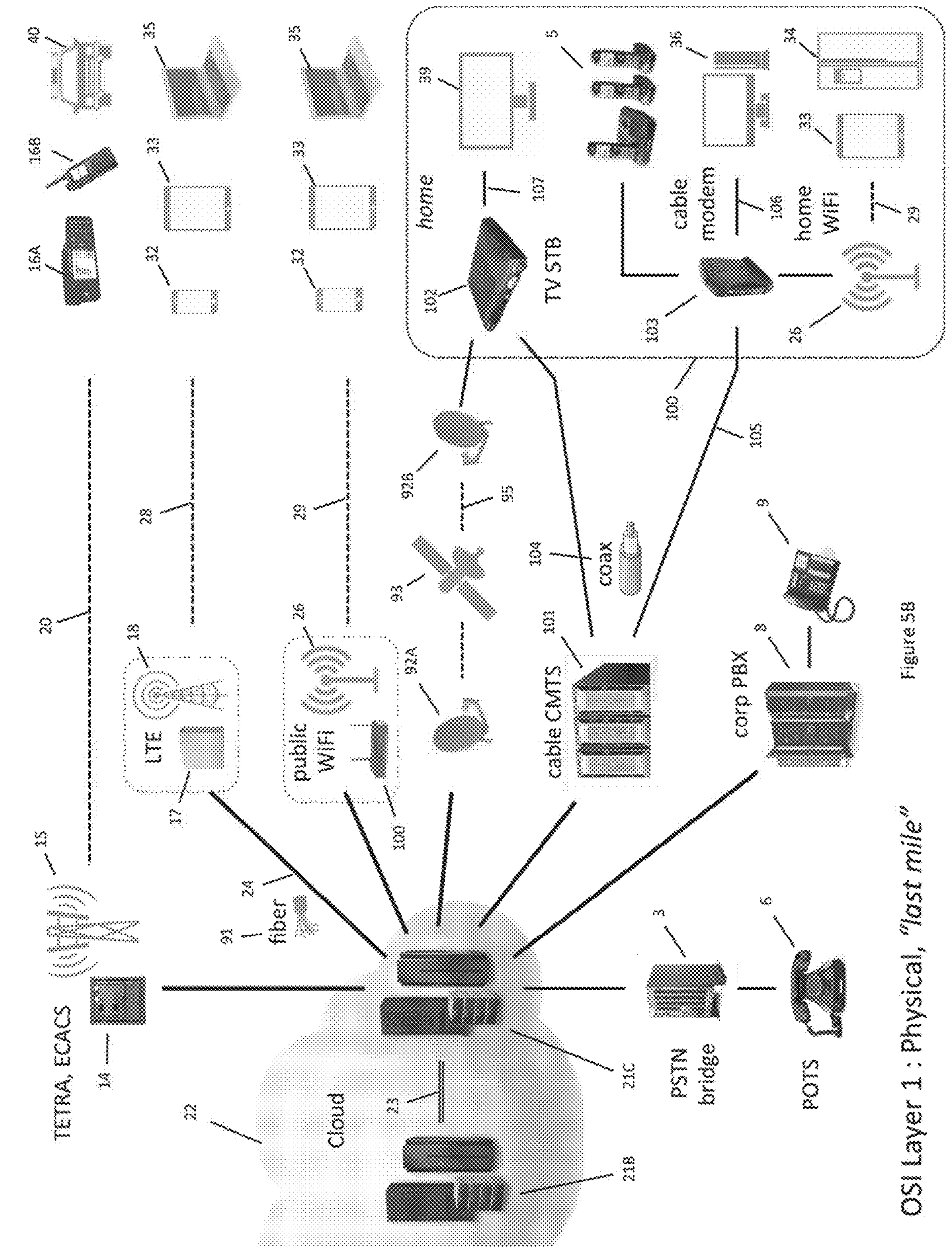
FIG. 5B is a schematic representation of a communication network illustrating last-mile connectivity examples of physical Layer 1.
Figure 6A:
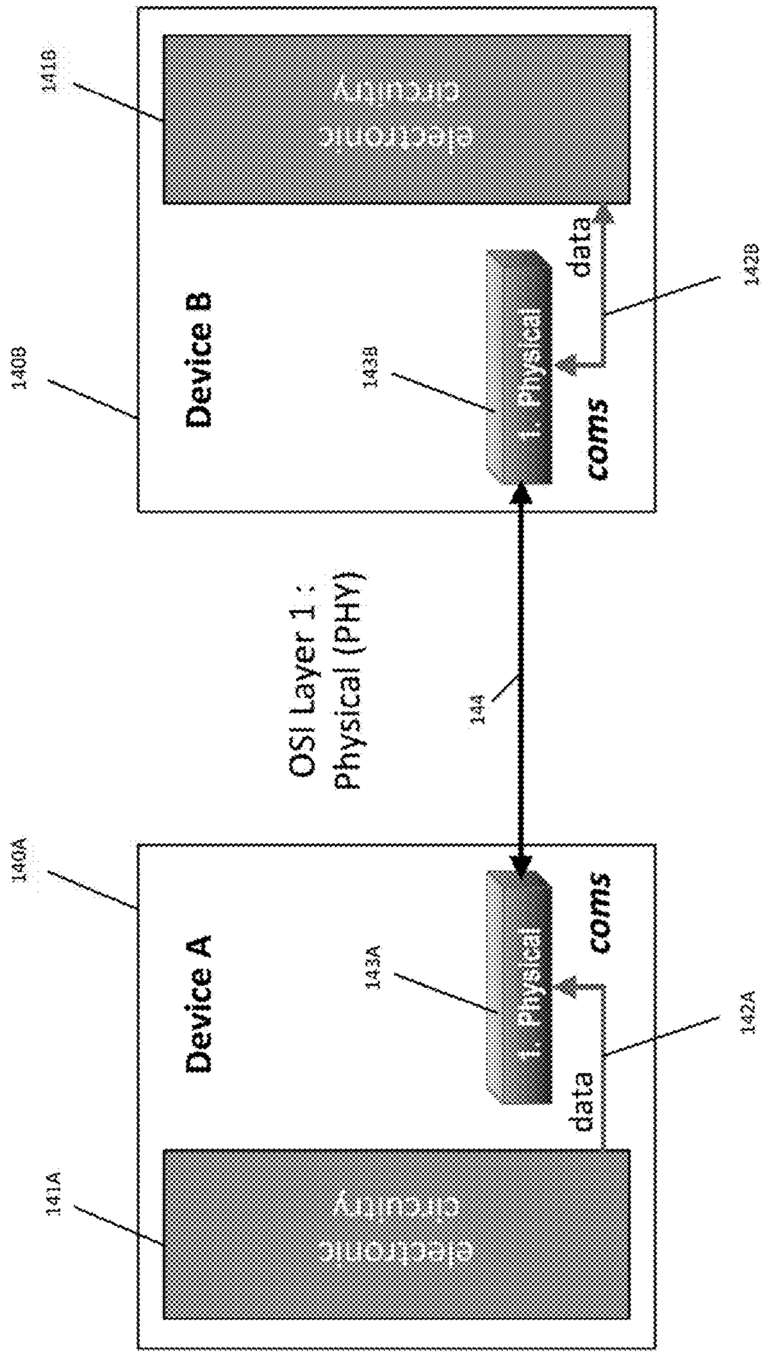
FIG. 6A is a schematic representation of a physical Layer 1 connection between two devices.
Figure 6B:
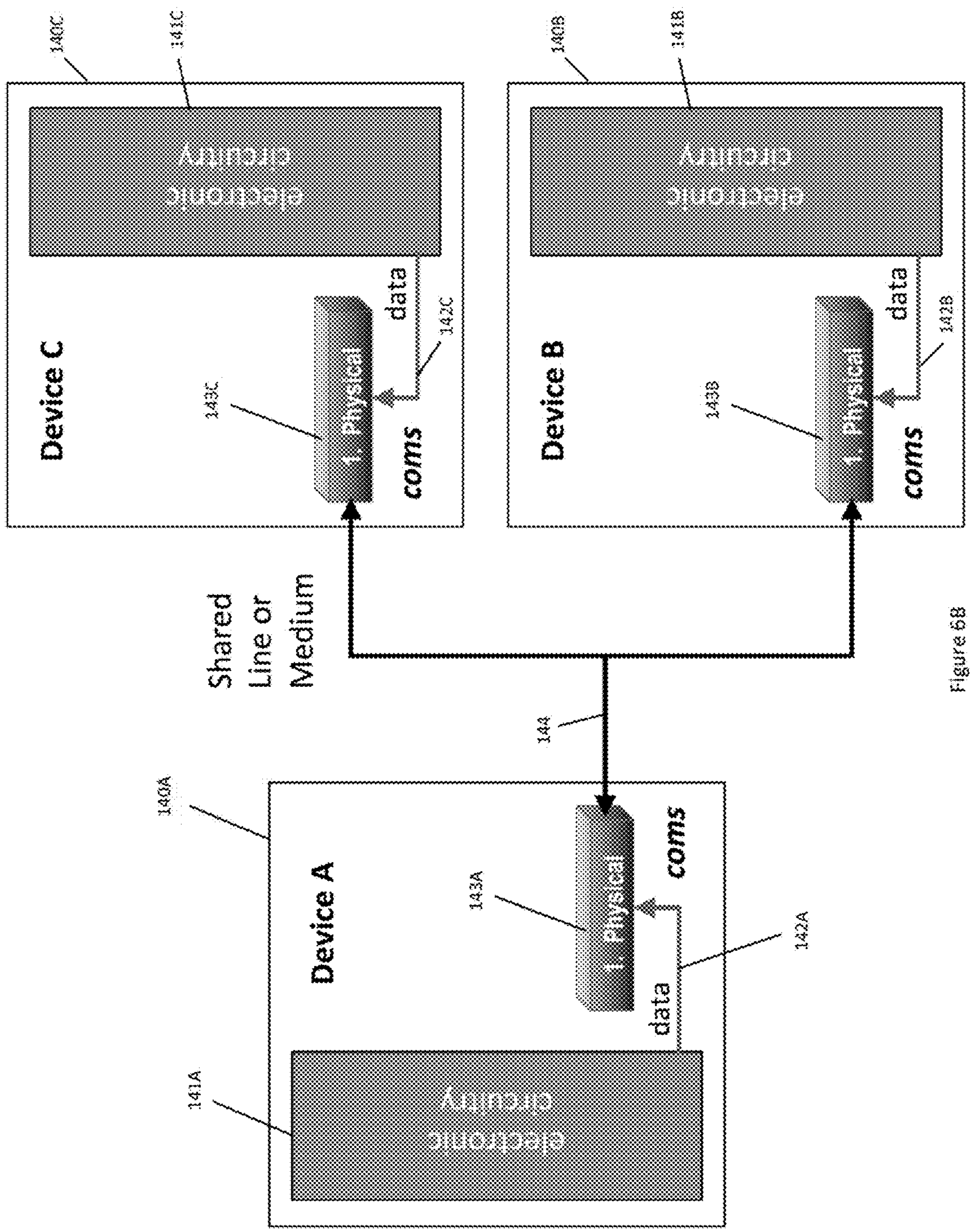
FIG. 6B is a schematic representation of a shared physical Layer 1 connection among three devices.
Figure 7A:
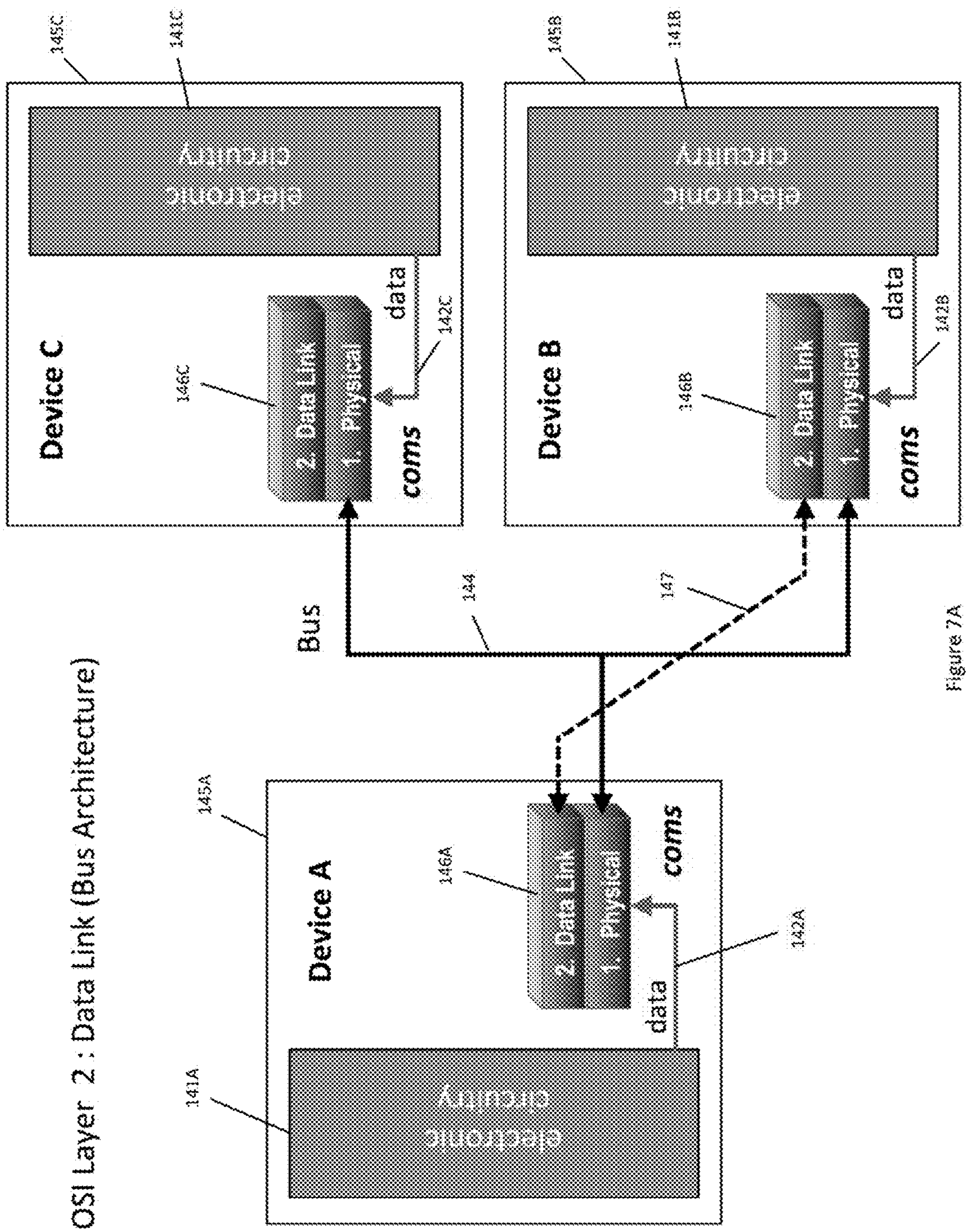
FIG. 7A is a schematic representation of a data link Layer 2 connection among three devices using a bus architecture.
Figure 7B:
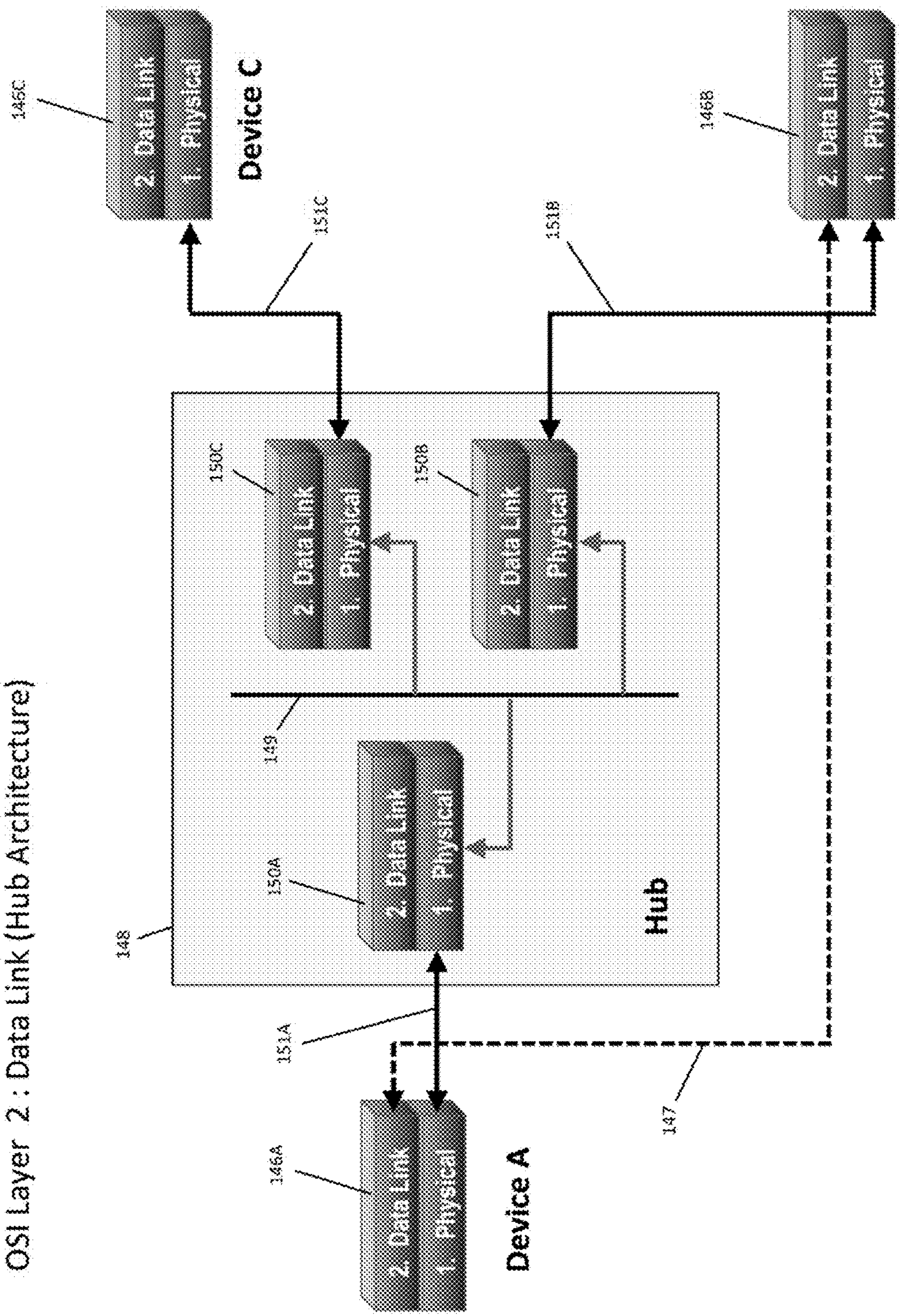
FIG. 7B is a schematic representation of a data link Layer 2 connection among three devices using a hub architecture.
Figure 7C:
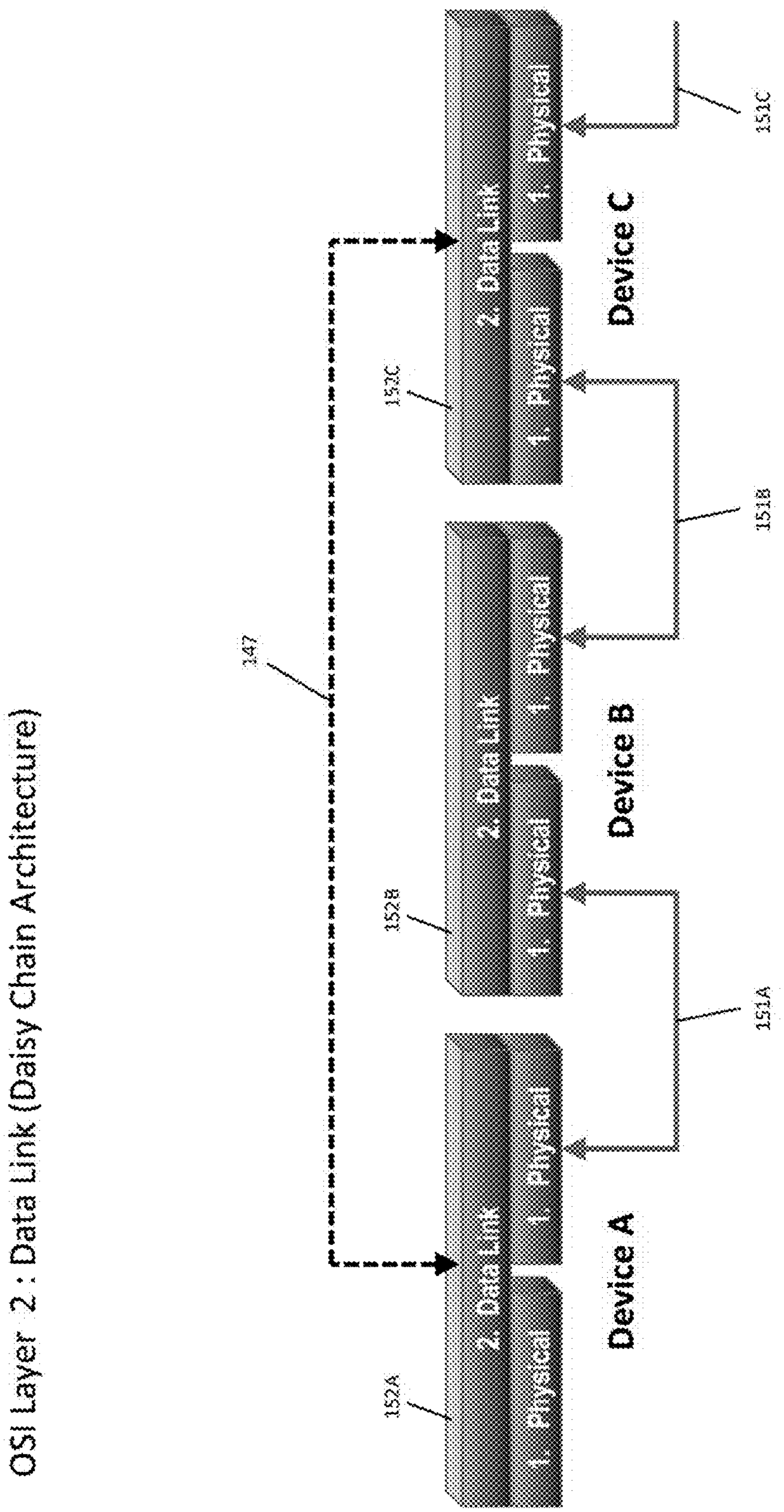
FIG. 7C is a schematic representation of a data link Layer 2 connection among three devices using a daisy chain architecture.
Figure 8A:
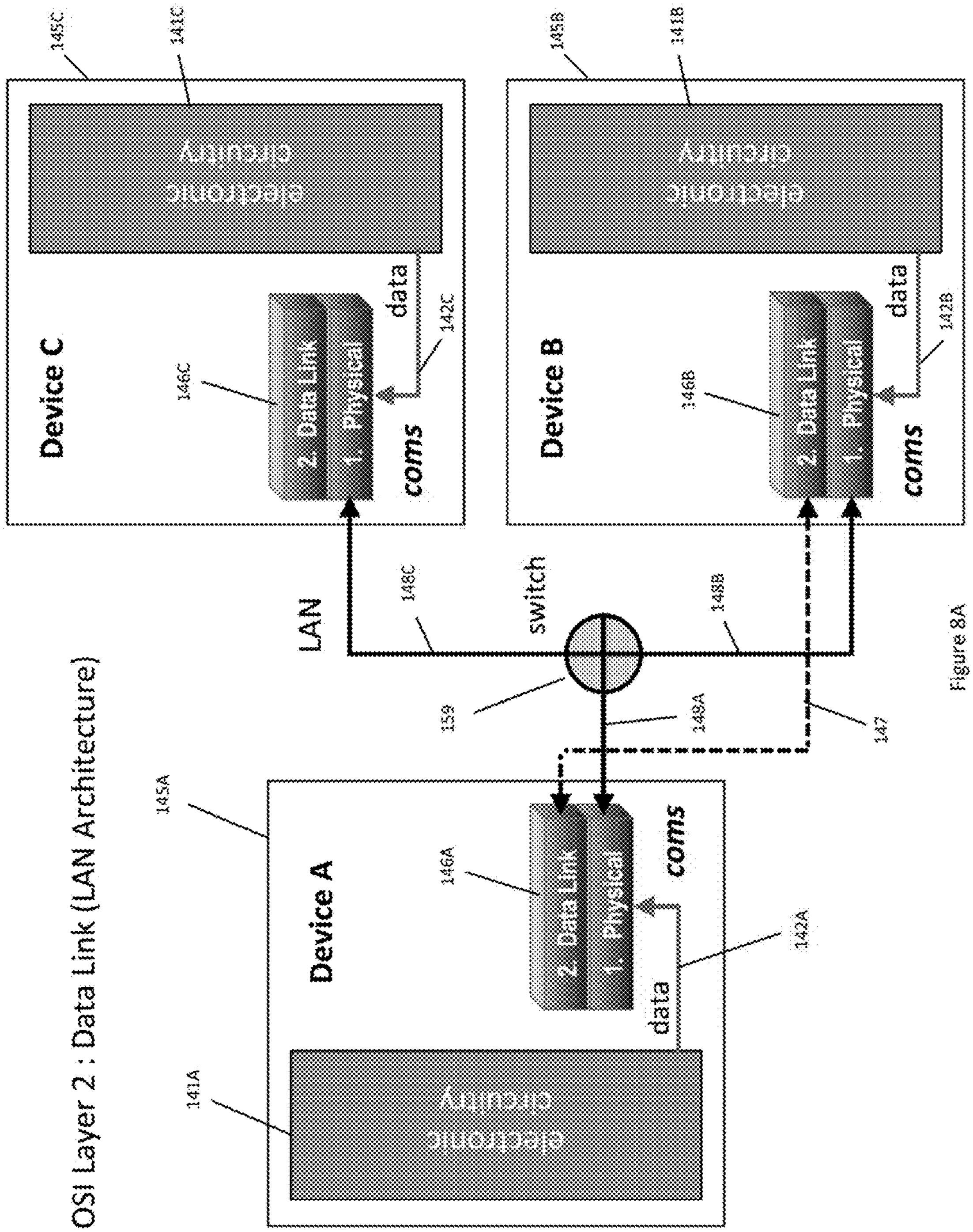
FIG. 8A is a schematic representation of a data link Layer 2 connection among three devices including a network switch.
Figure 88:
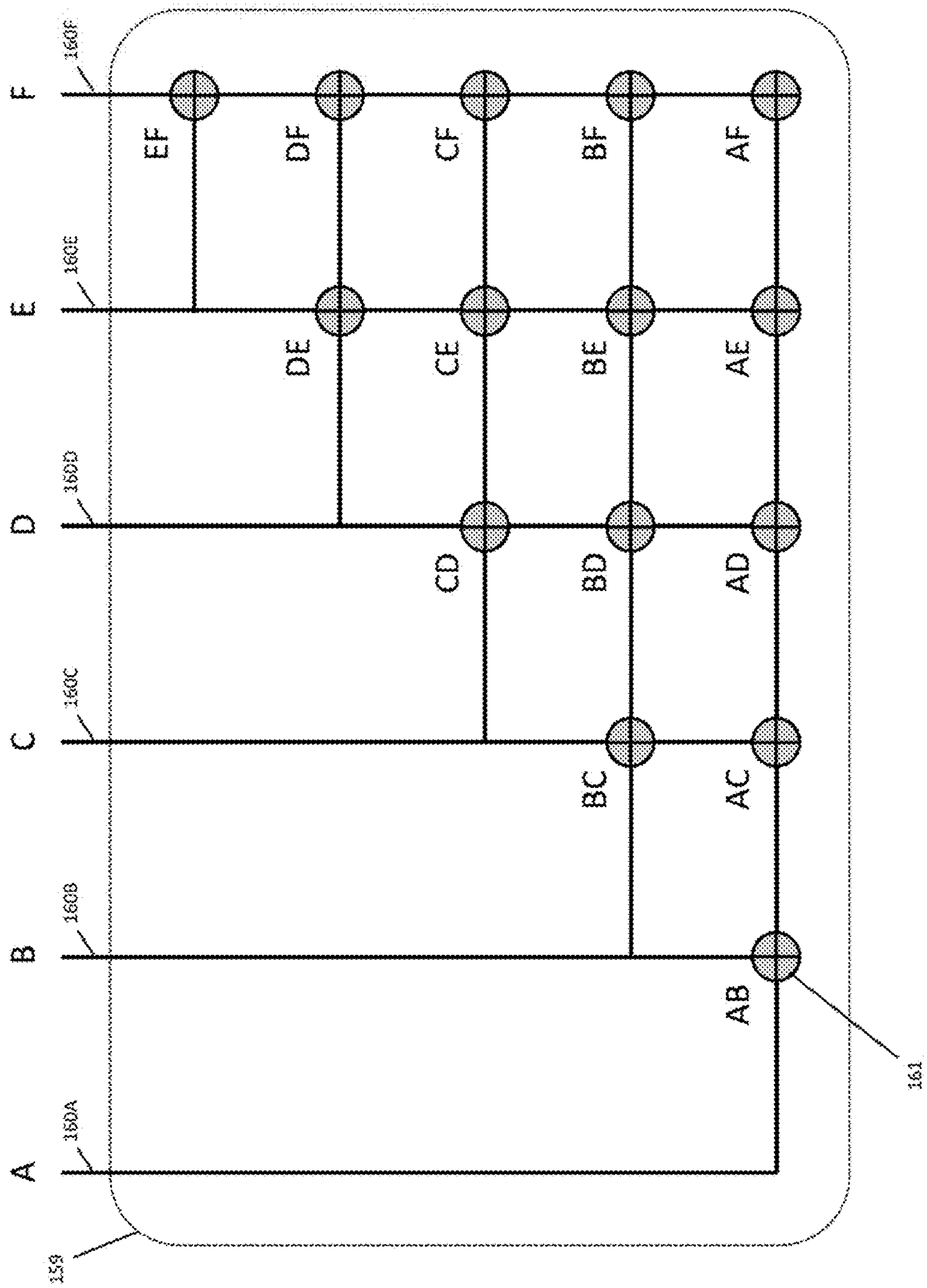
Figure 8C:
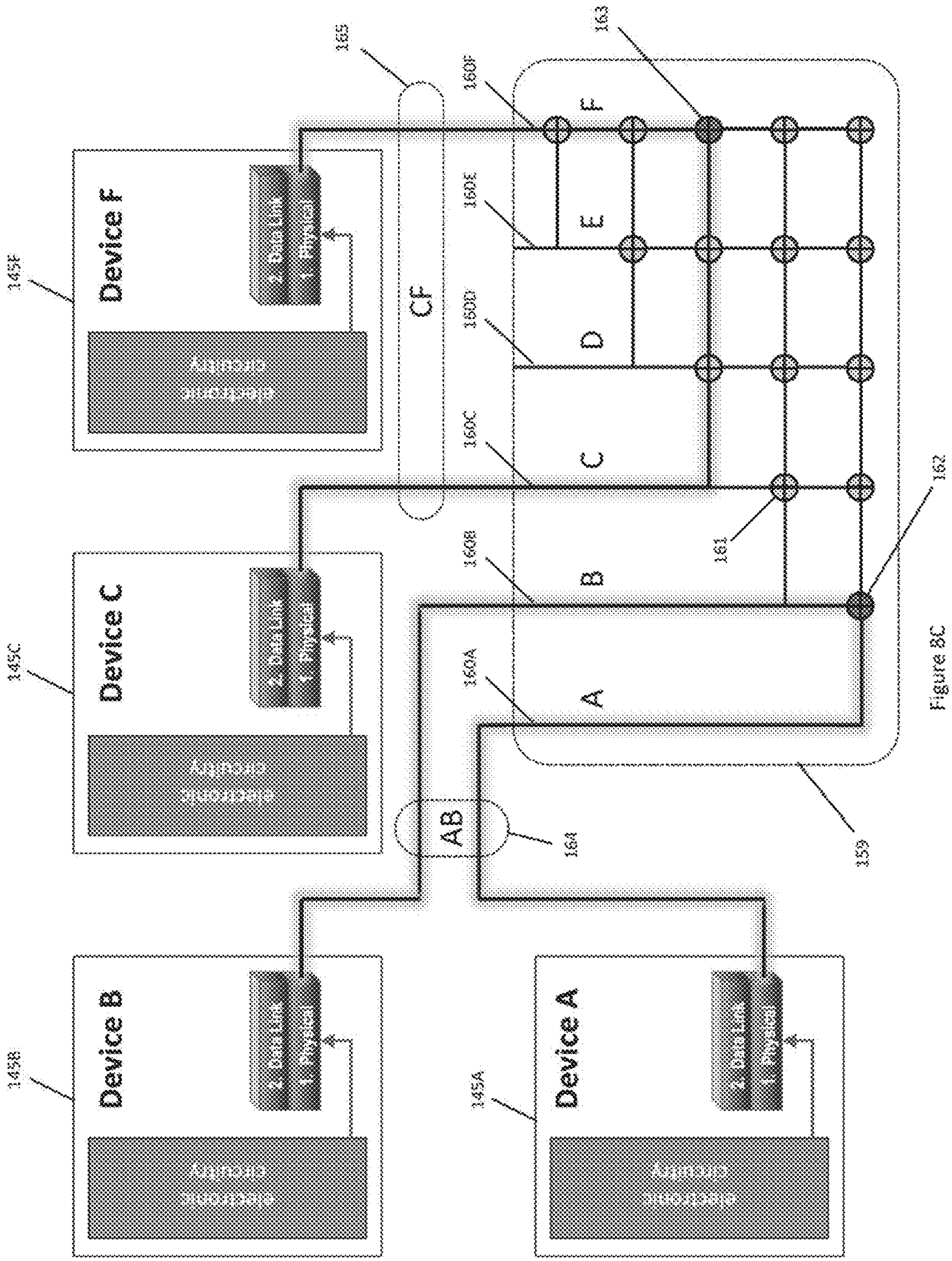
FIG. 8C is a schematic representation of the operation of a network switch.
Figure 10:
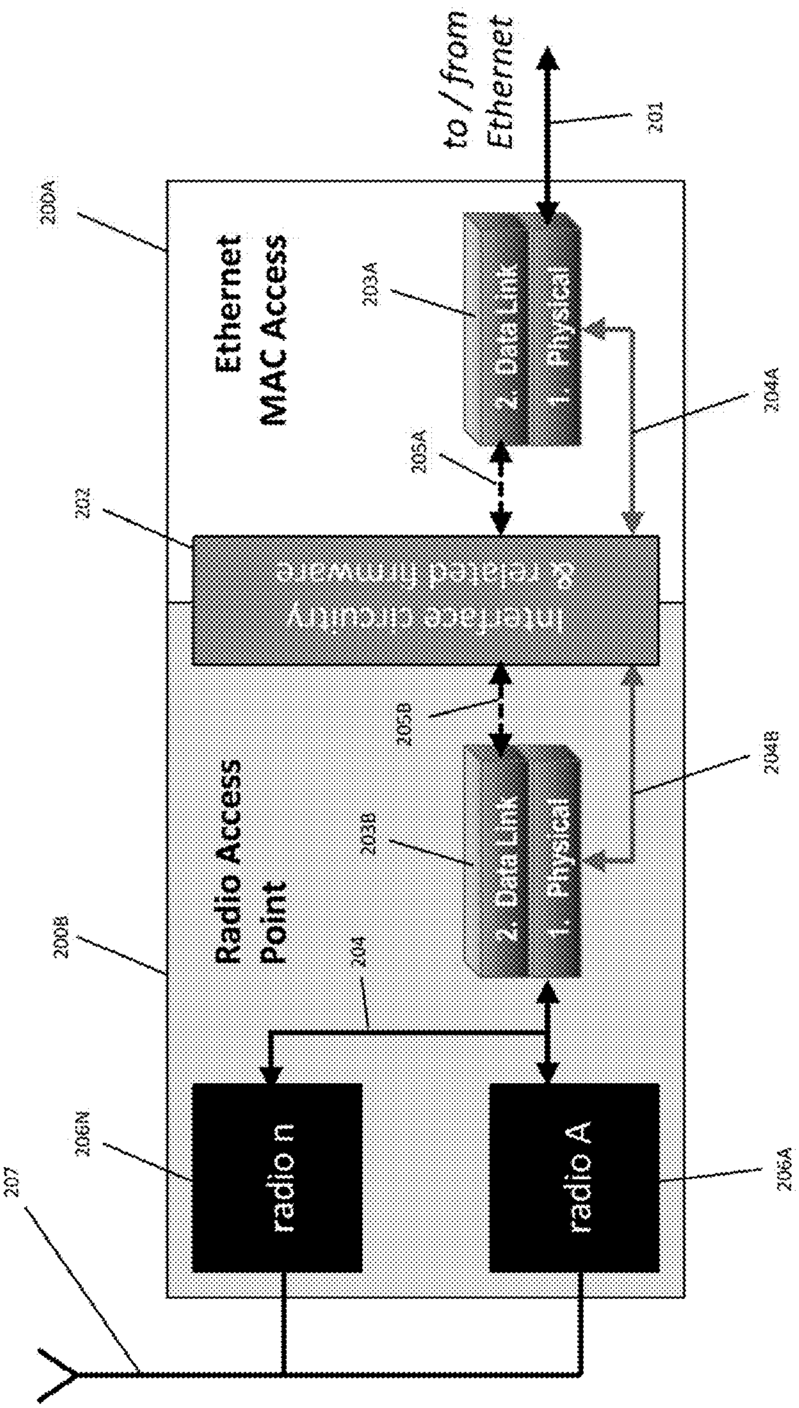
FIG. 10 is a simplified schematic representation of Ethernet-to-radio network-bridge.
Figure 12A:
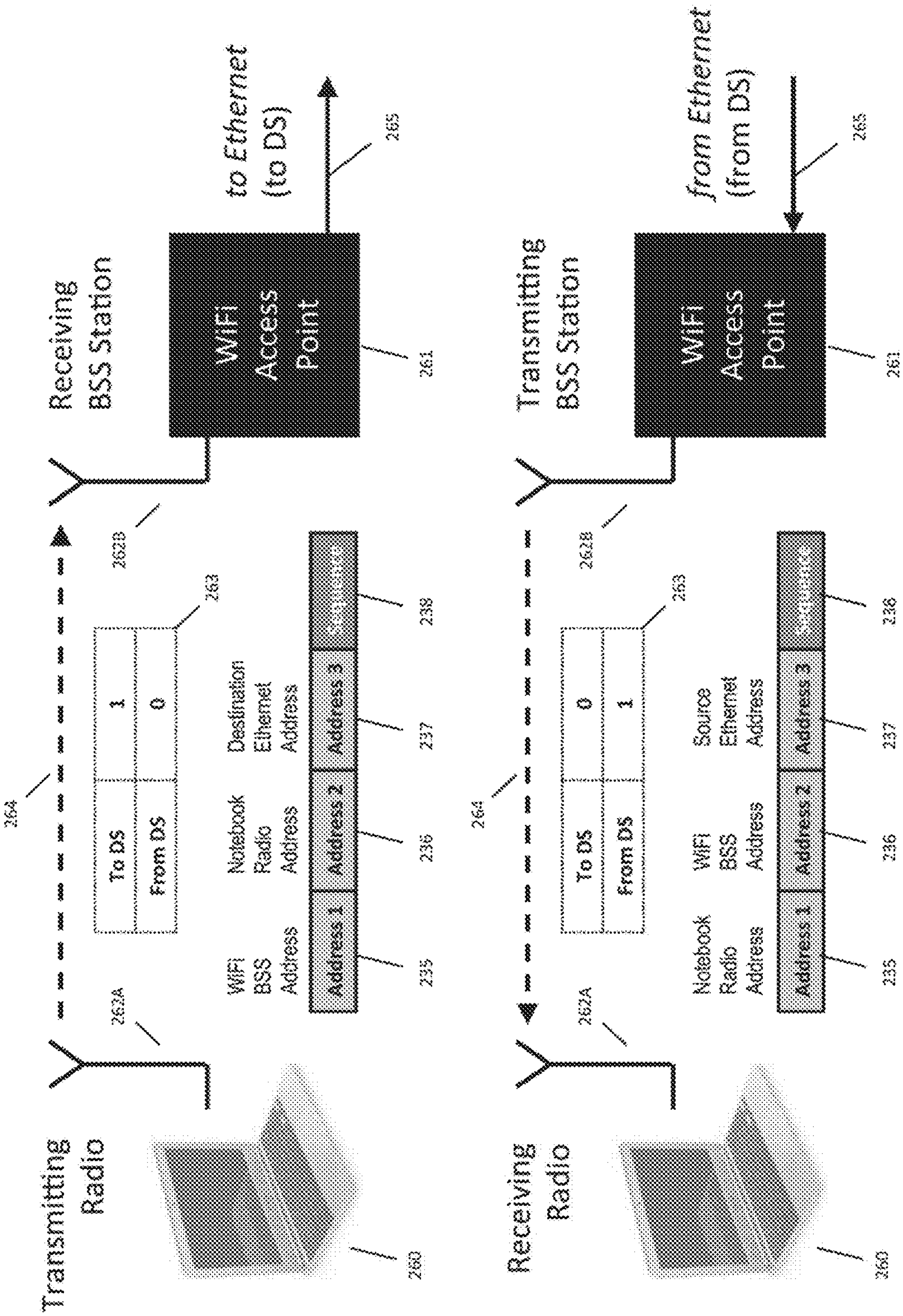
FIG. 12A is a schematic representation of the bidirectional operation of a WiFi network access point.
Figure 12B:
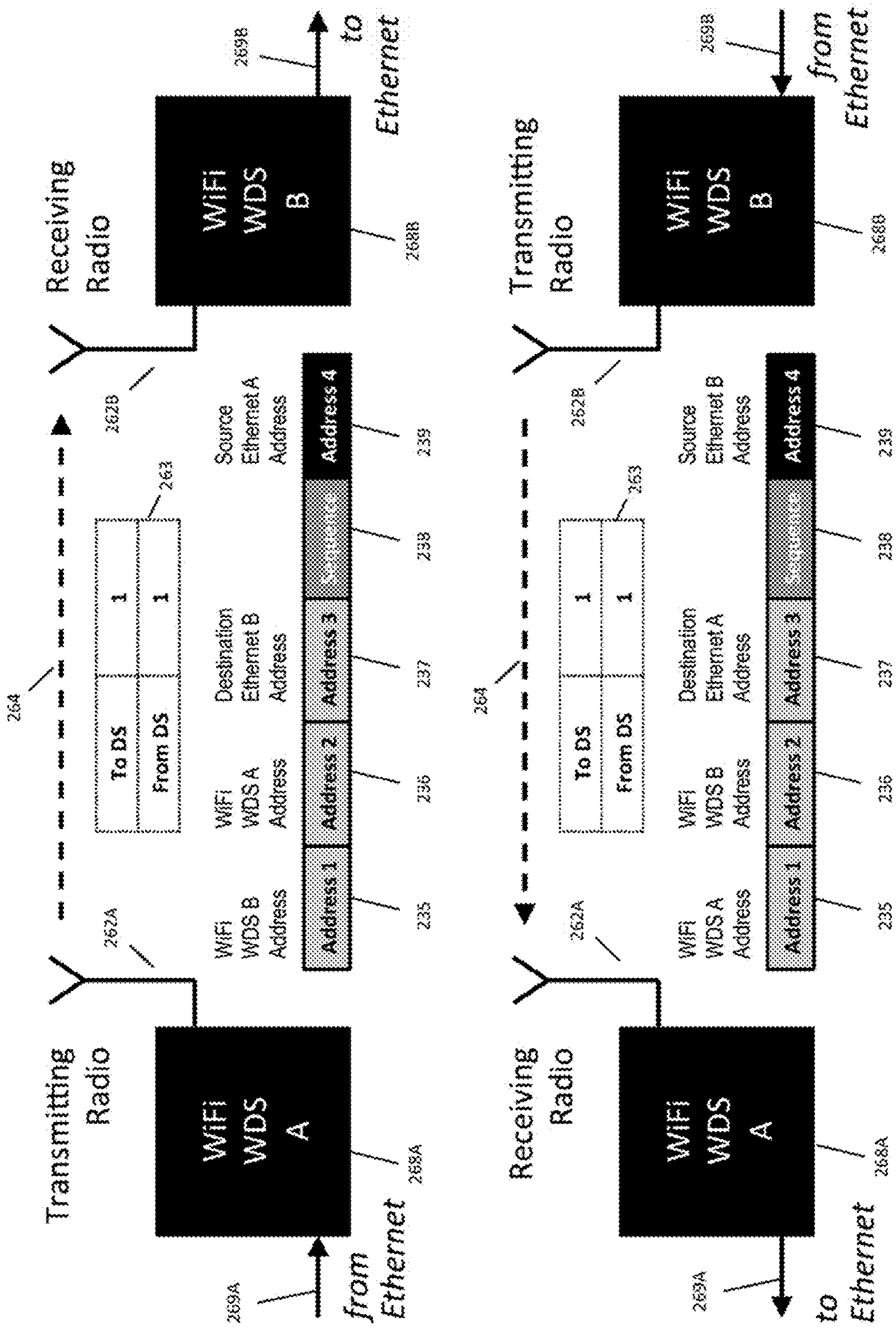
FIG. 12B is a schematic representation of the bidirectional operation of a WiFi repeater.
Figure 13:
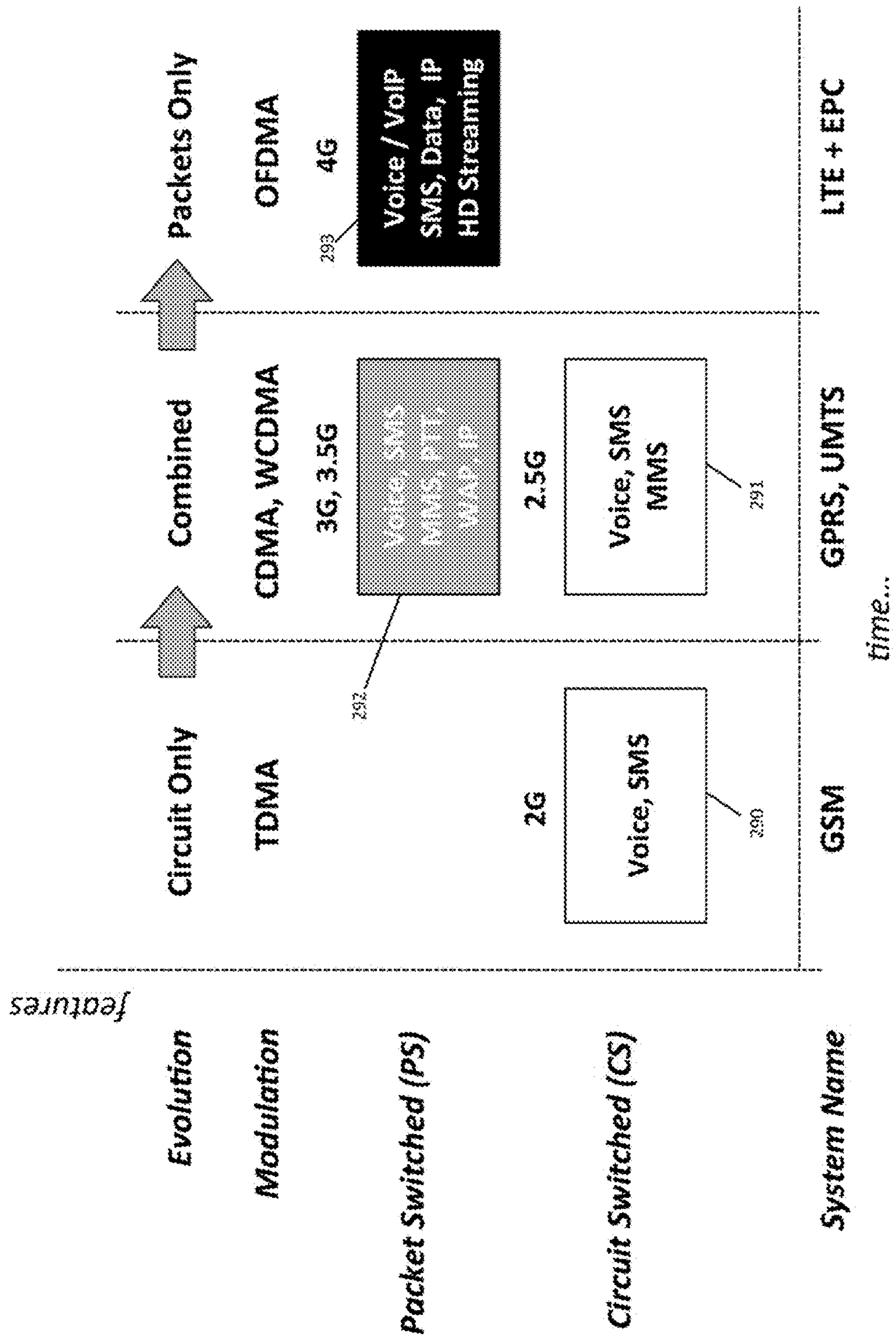
FIG. 13 is a graphical representation of the evolution of telephonic, text, and data communication over cellular networks.
Figure 14A:
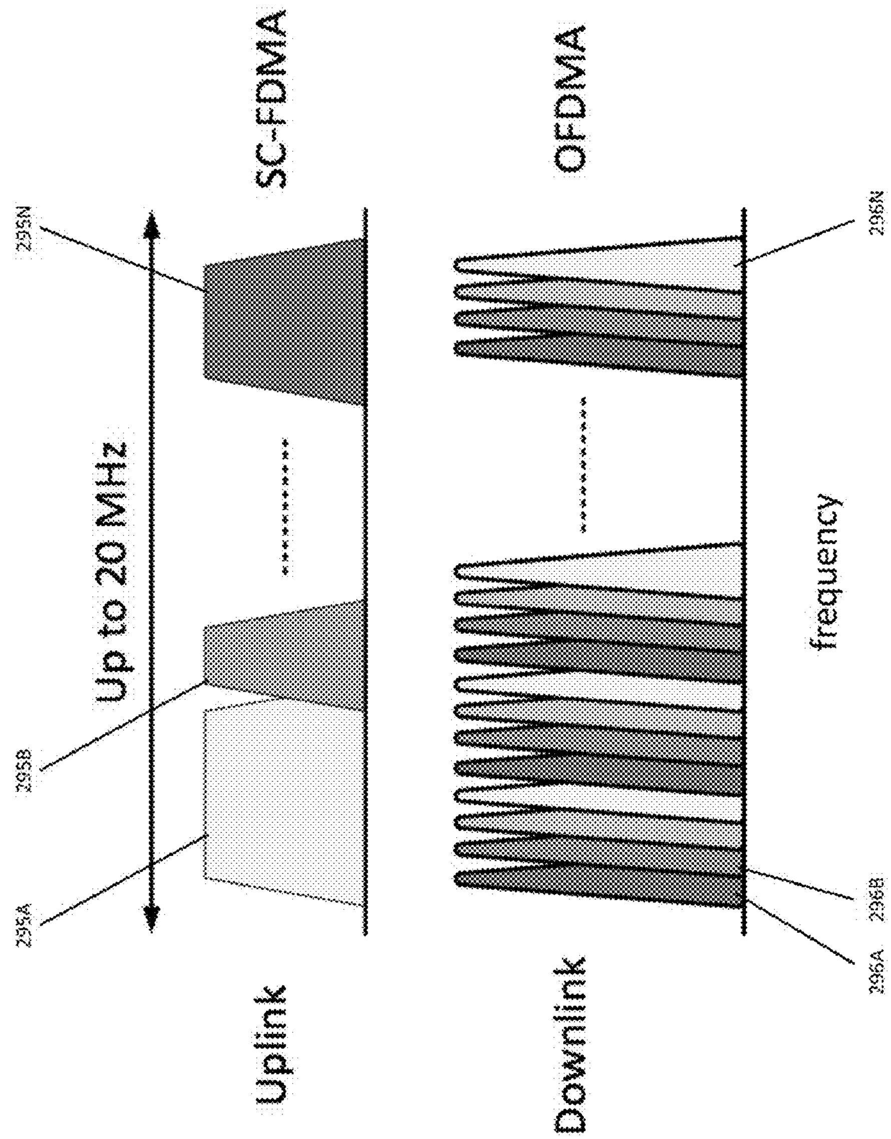
FIG. 14A is a graphical representation of frequency partitioning in 4G/LTE communication networks.
Figure 14B:
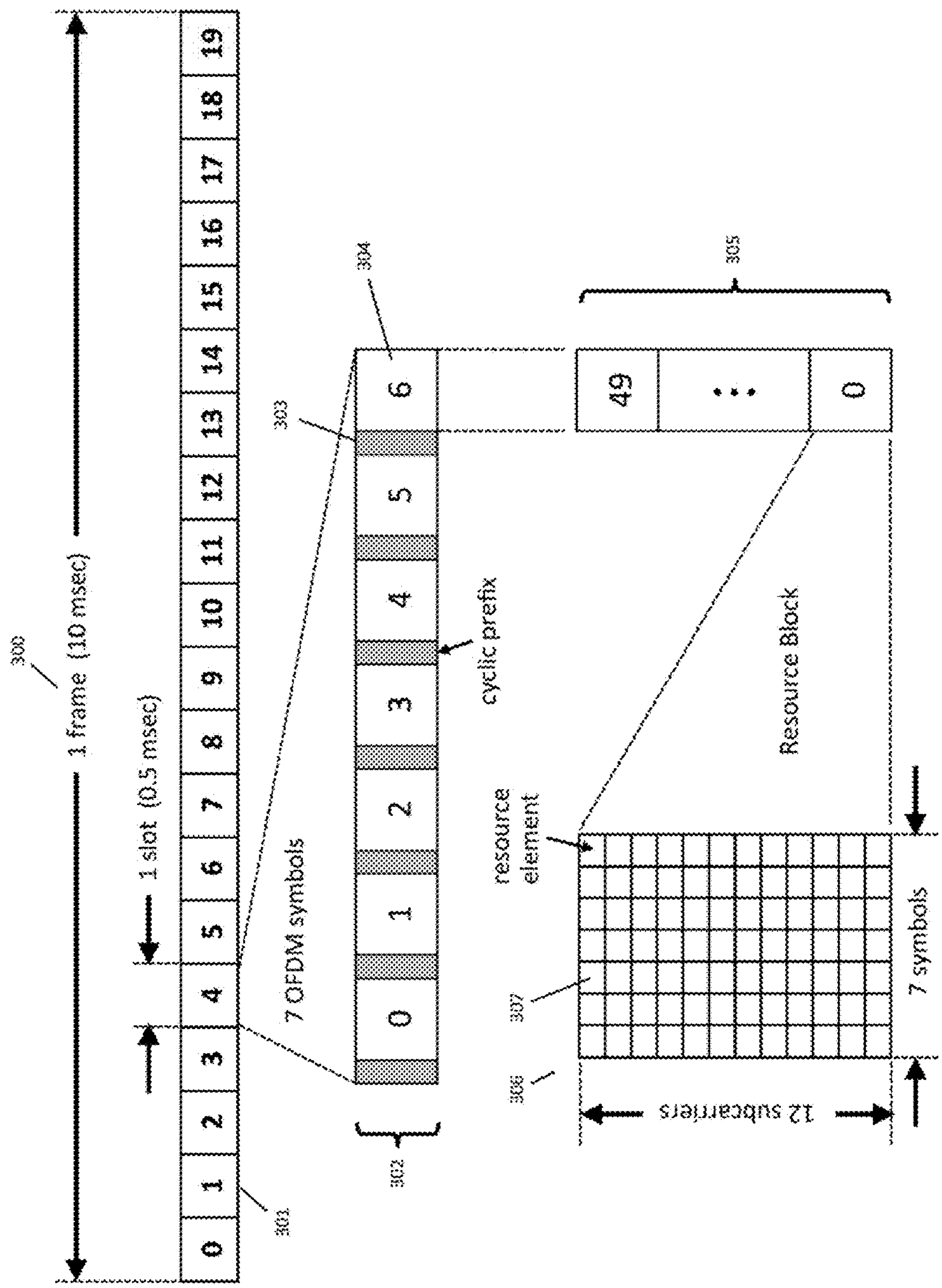
FIG. 14B is a graphical representation of OFDM encoding used in 4G/LTE radio communication.
Figure 15:
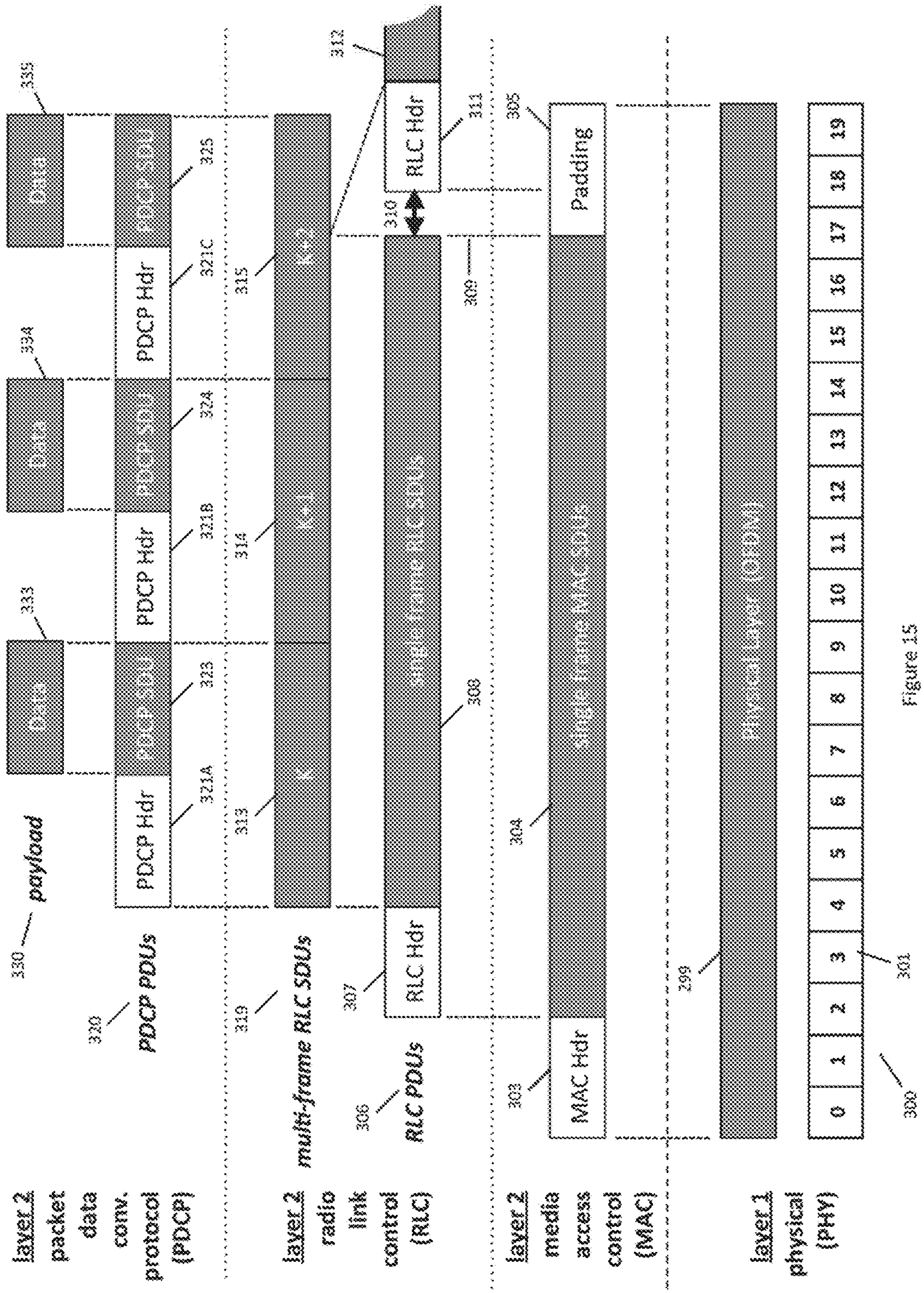
FIG. 15 is a graphical representation of the Layer 2 data link construct of an IP packet using 4G/LTE protocol.
Figure 16:
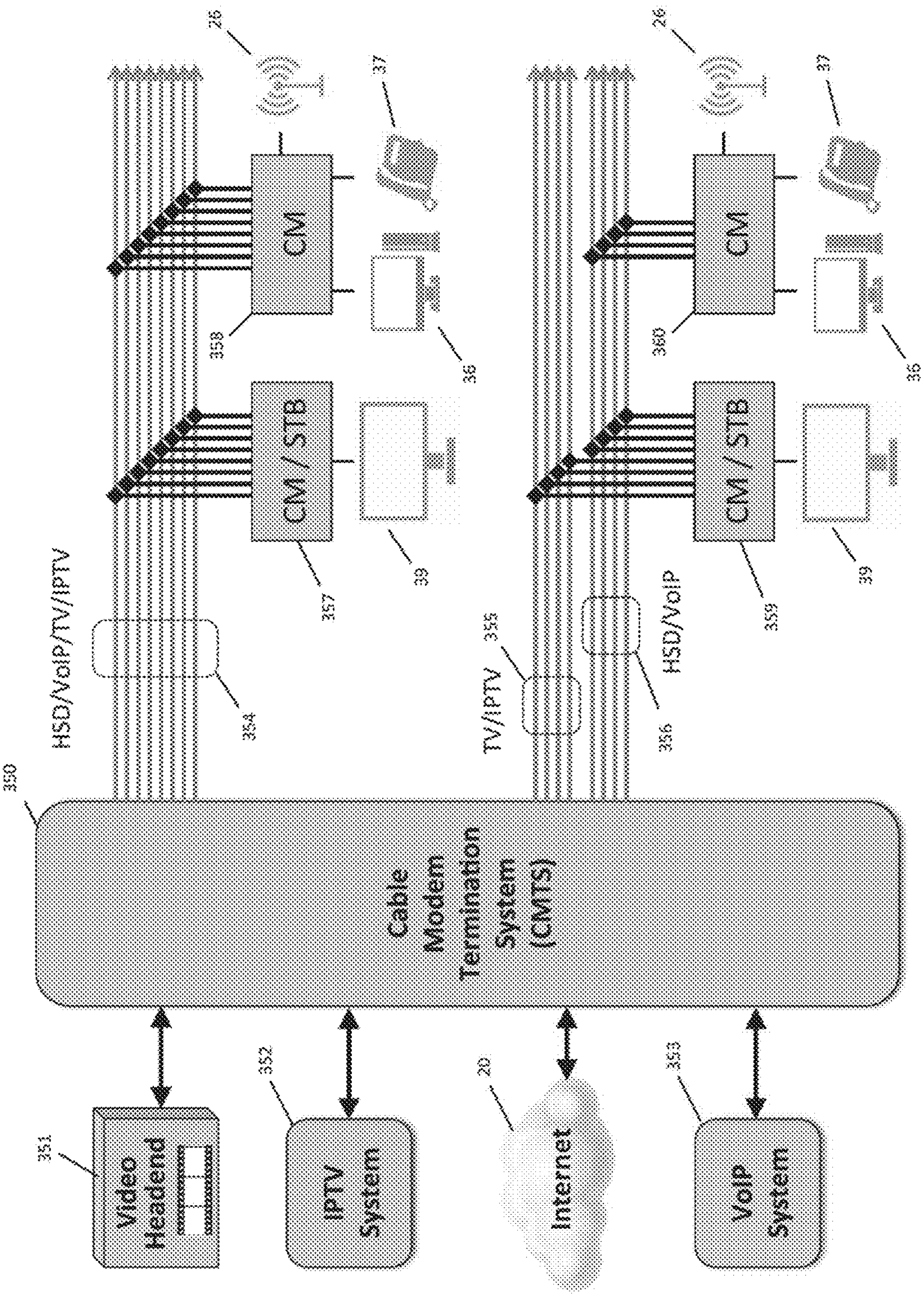
FIG. 16 is a schematic representation of cable modem communication network.
Figure 17:
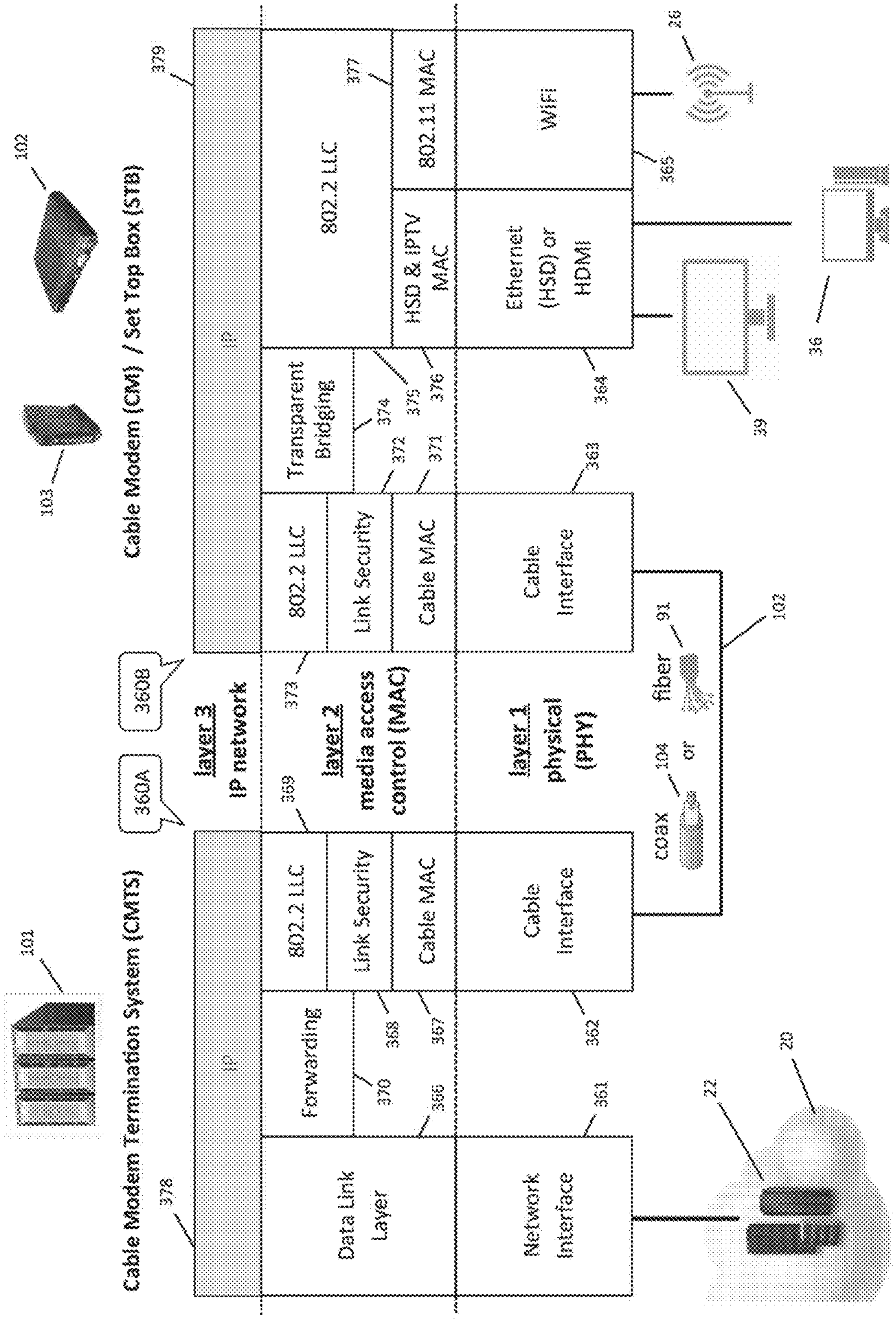
FIG. 17 is a schematic representation of the data link Layer 2 construct of a cable modem communication network.
Figure 18:
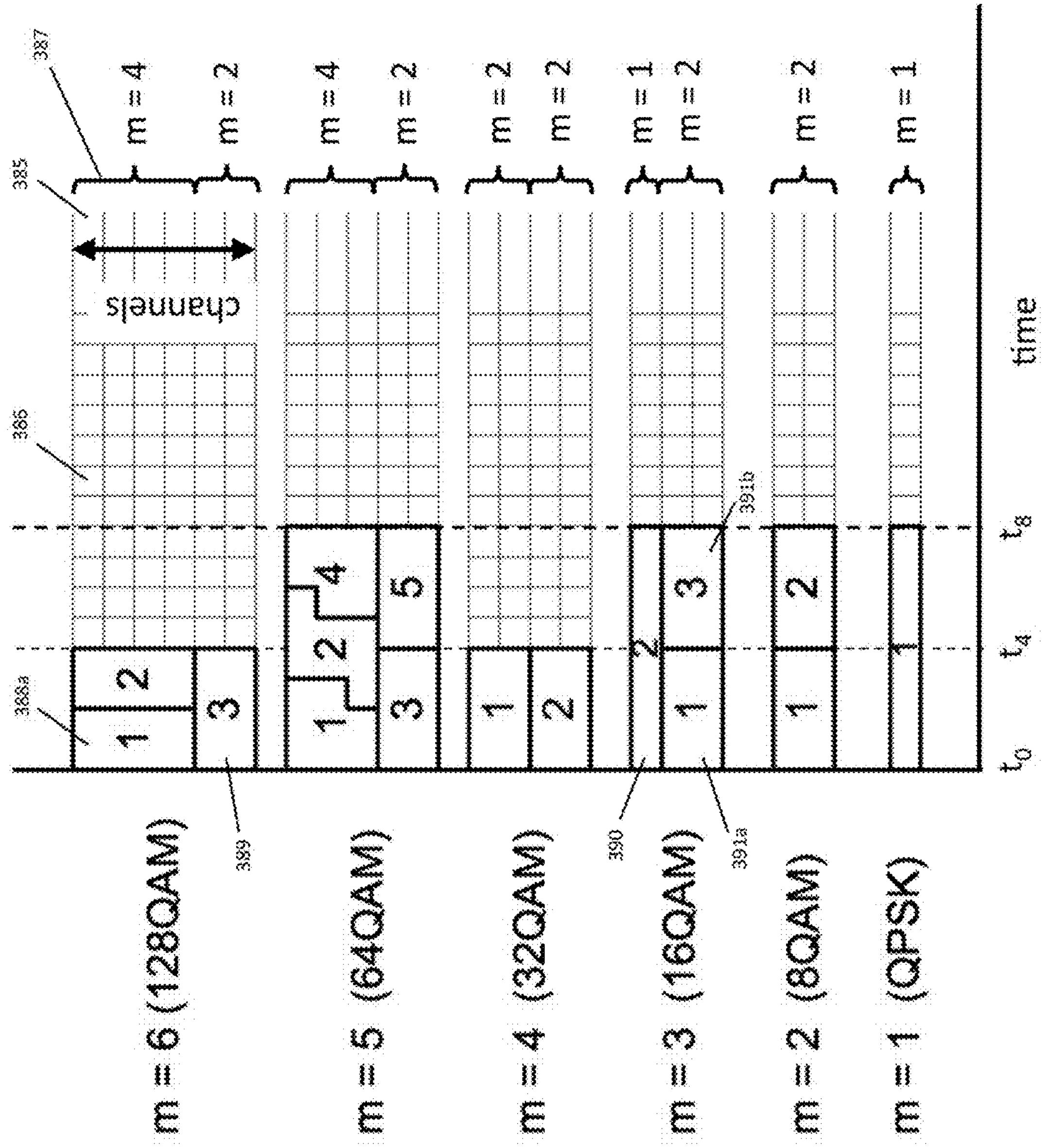
FIG. 18 is a graphical representation of trellis encoding used in DOCSIS based cable modems.
Figure 19:
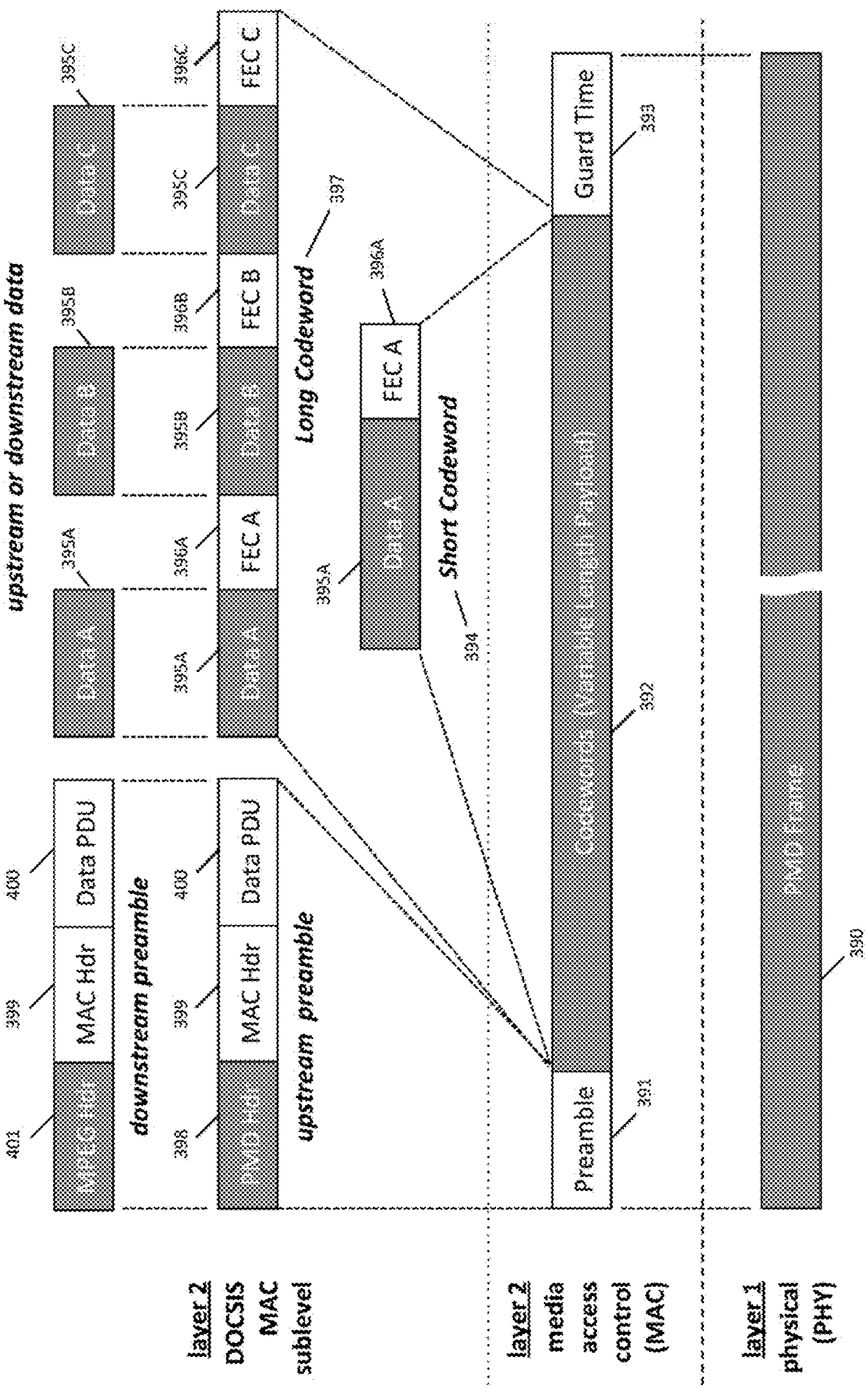
FIG. 19 is a graphical representation of the data link Layer 2 construct of a communication packet using DOCSIS protocol.
Figure 20:
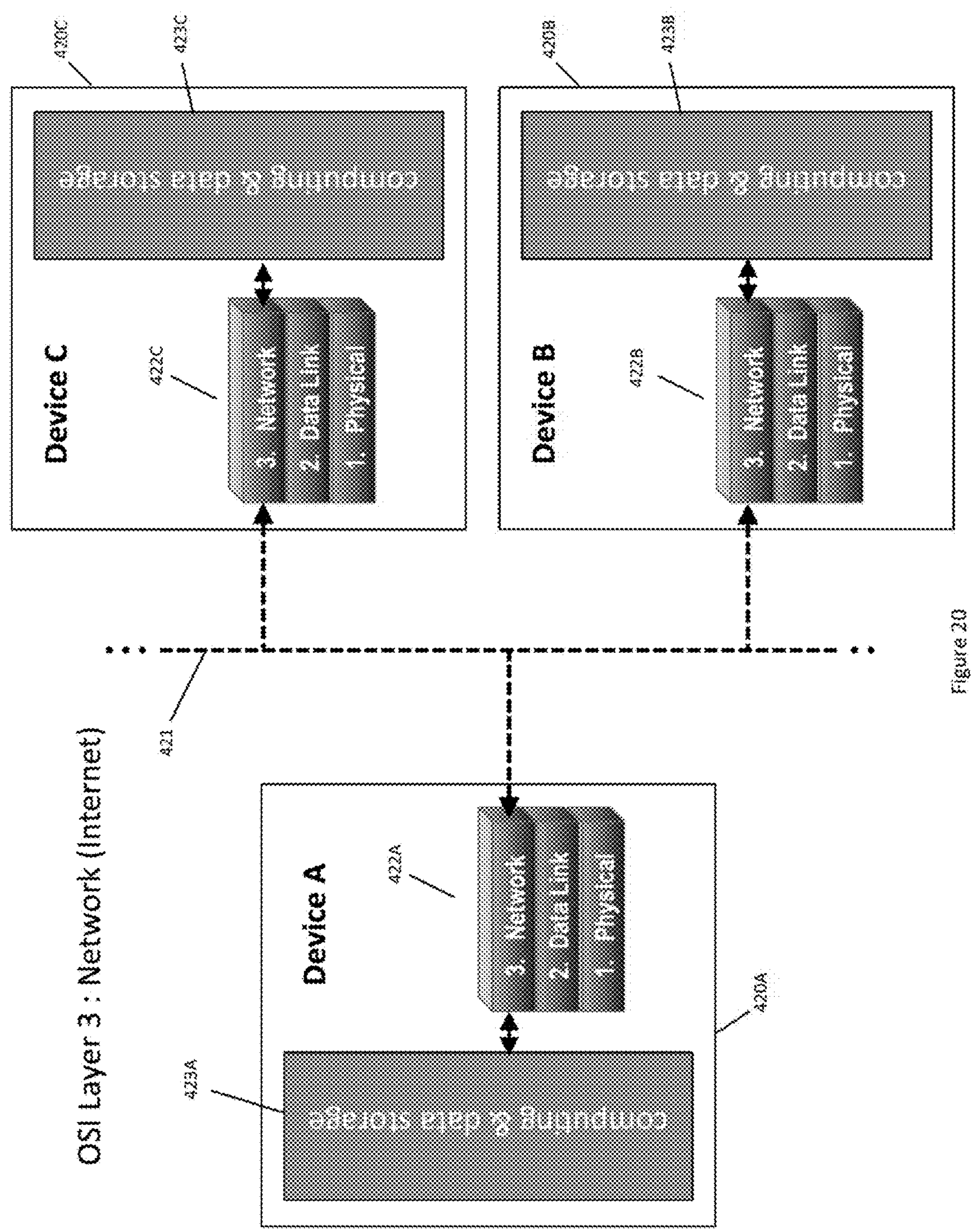
FIG. 20 is a schematic representation of a network Layer-3 connection among three devices.
Figure 21:
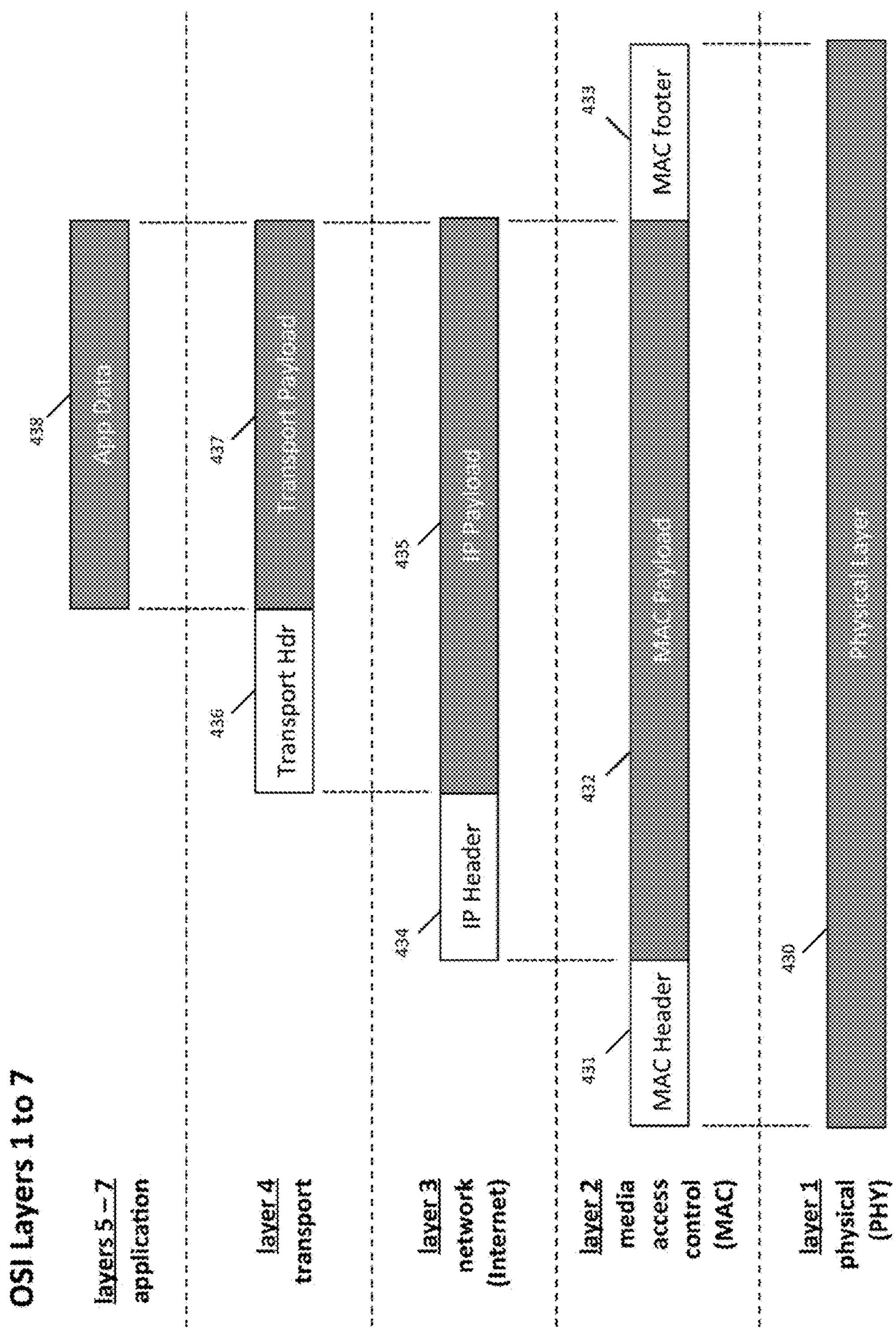
FIG. 21 is a graphical representation of communication packets encapsulated in accordance with the 7-layer OSI model.
Figure 22:
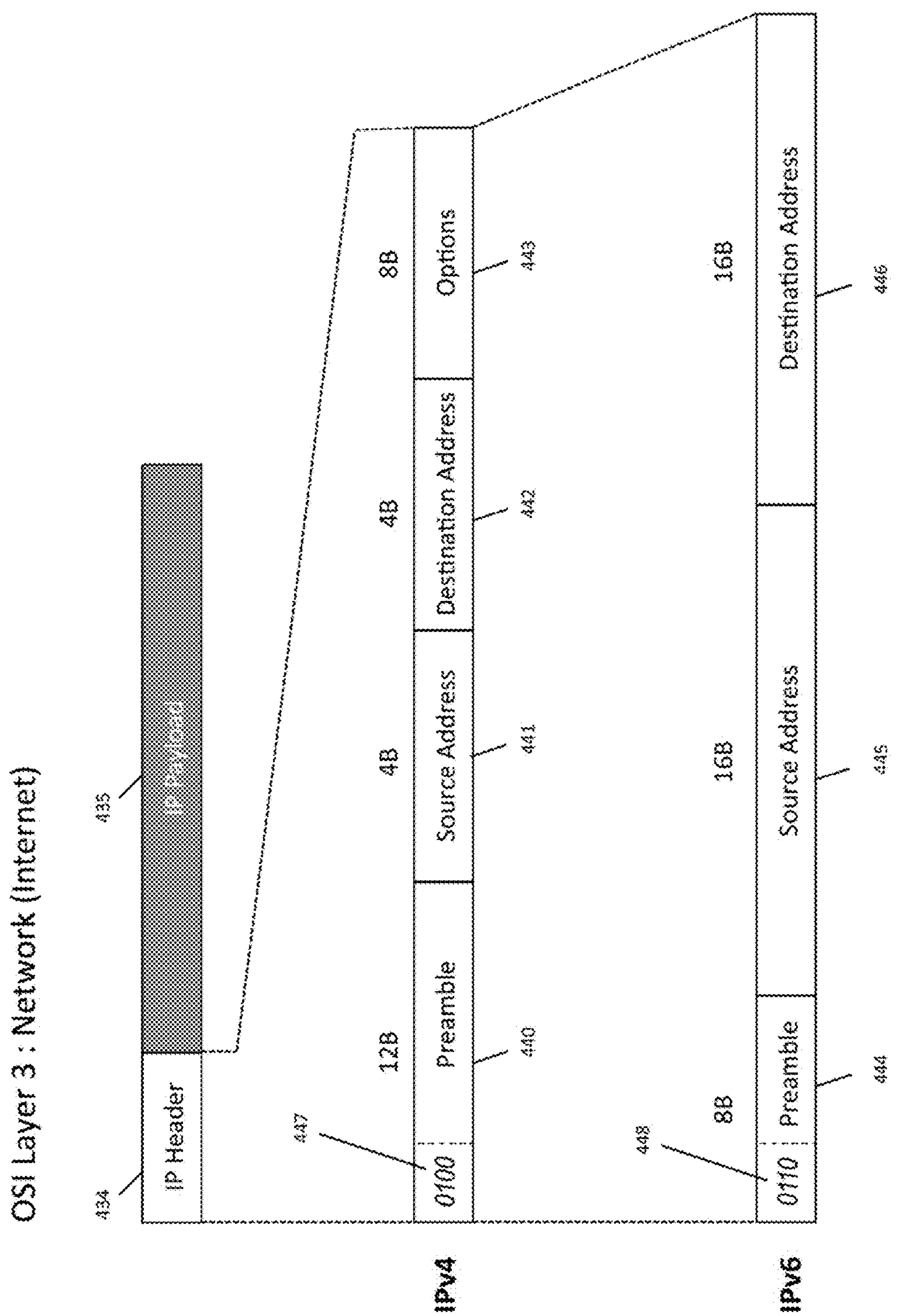
FIG. 22 is a graphical representation of the network Layer-3 construct comparing communication packets for IPv4 and IPv6.
Figure 25:
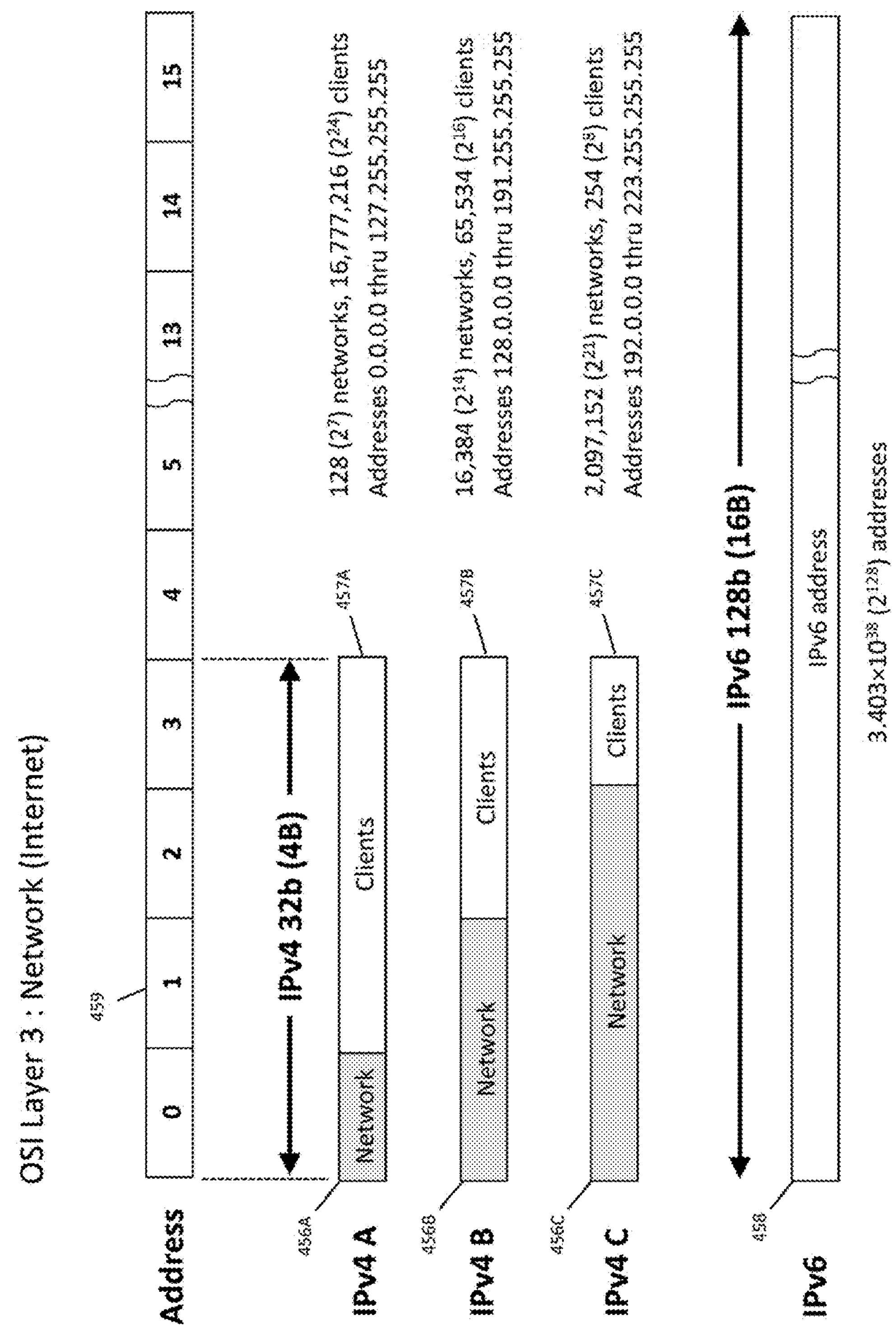
FIG. 25 is a graphical representation of the address fields constructed in accordance with IPv4 and IPv6 protocols.
Figure 26:
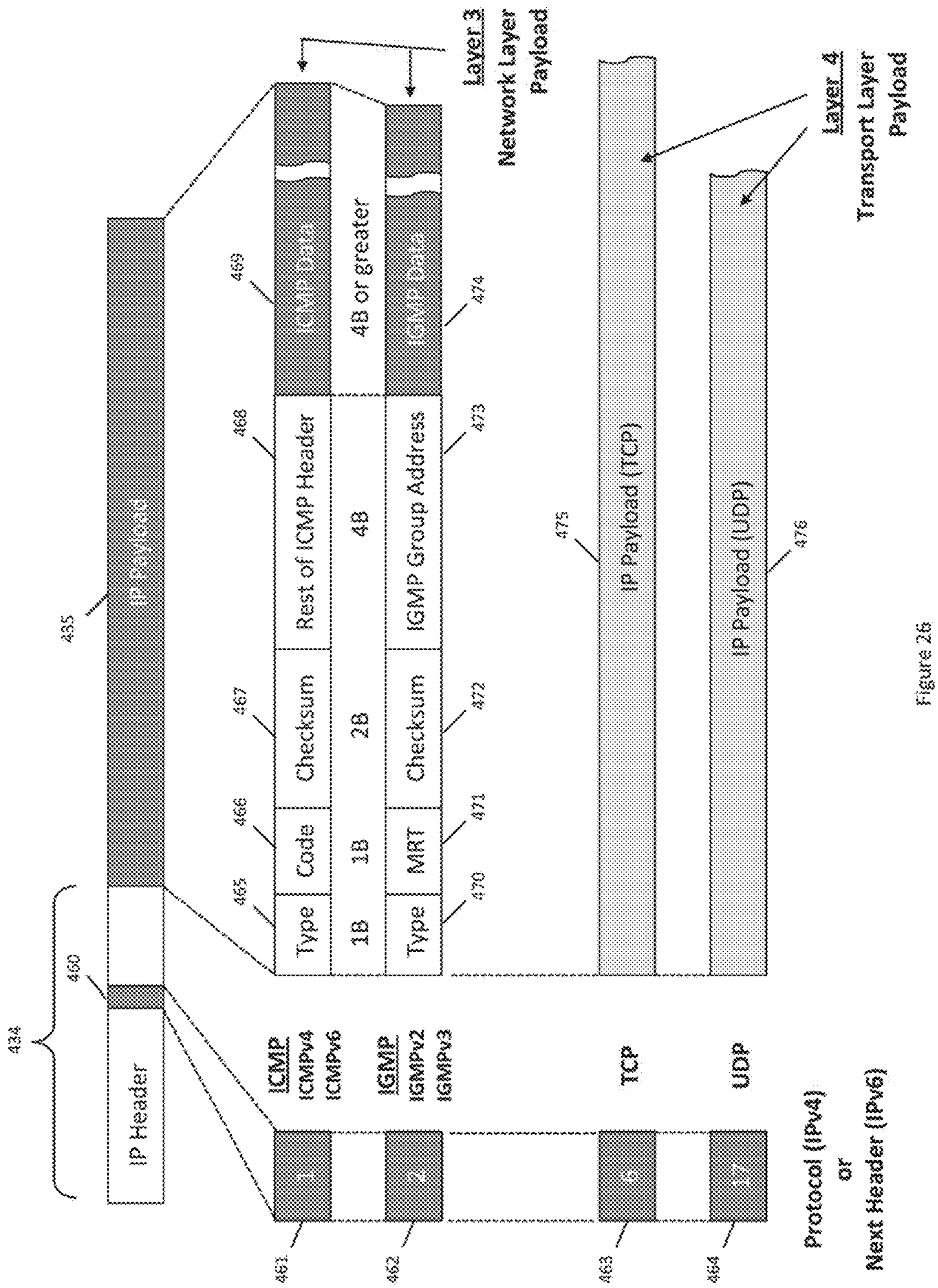
FIG. 26 is a graphical representation of the protocol/next header field in an IP packet and its corresponding payload.
Figure 27:
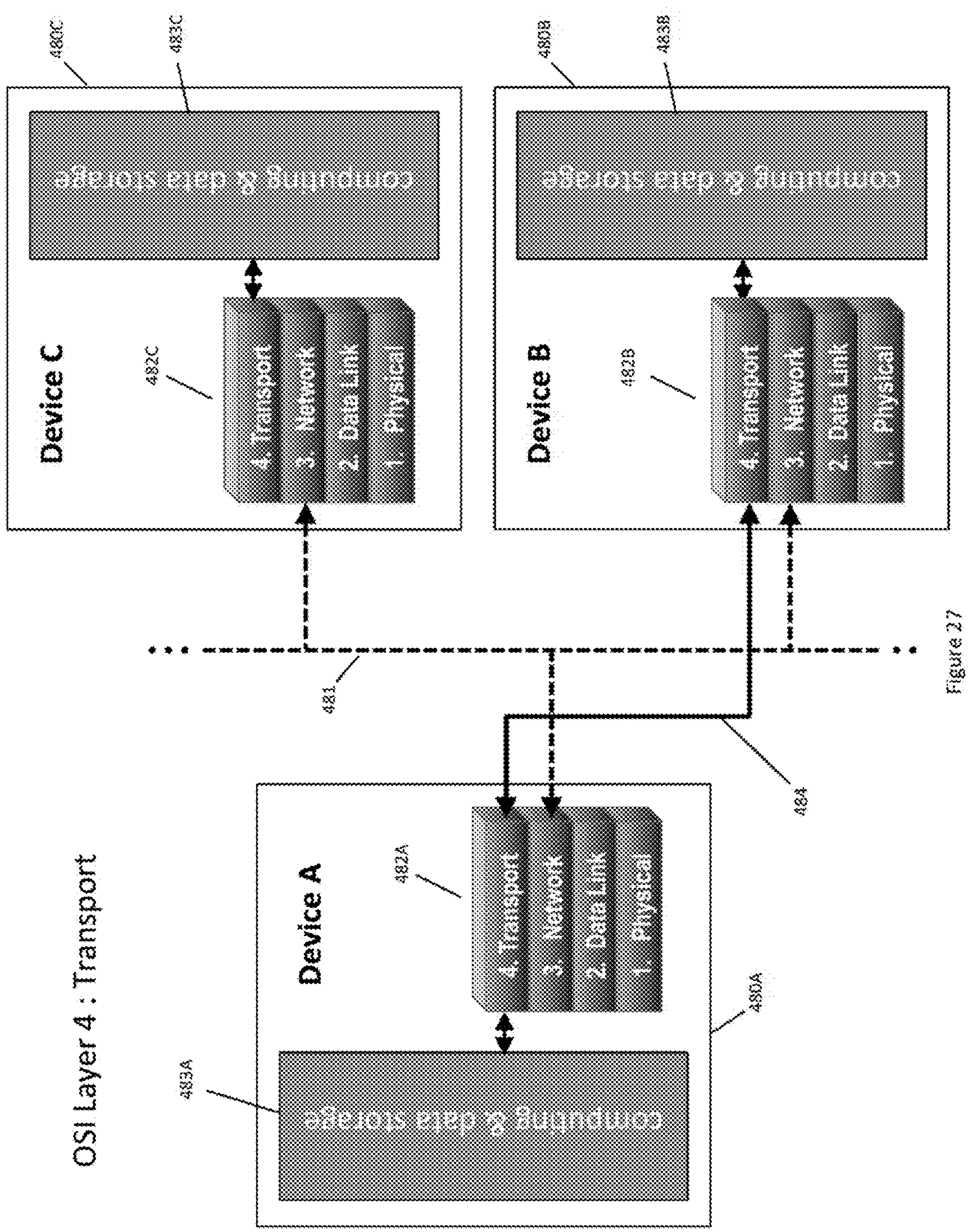
FIG. 27 is a schematic representation of a transport Layer-4 connection among three devices.
Figure 28A:
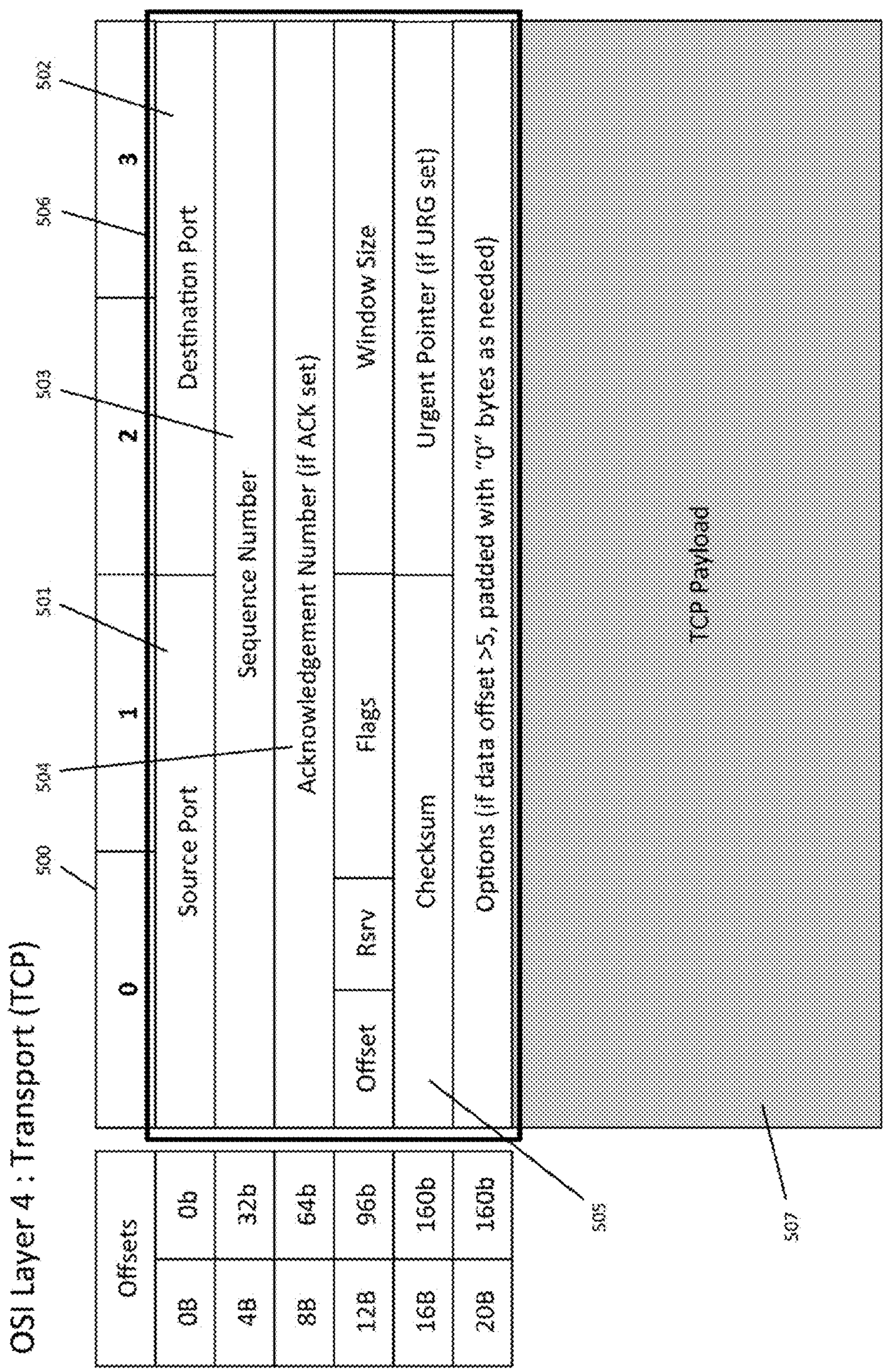
FIG. 28A is a graphical representation of a transport Layer 4 construct of a IP packet using TCP protocol.
Figure 29:
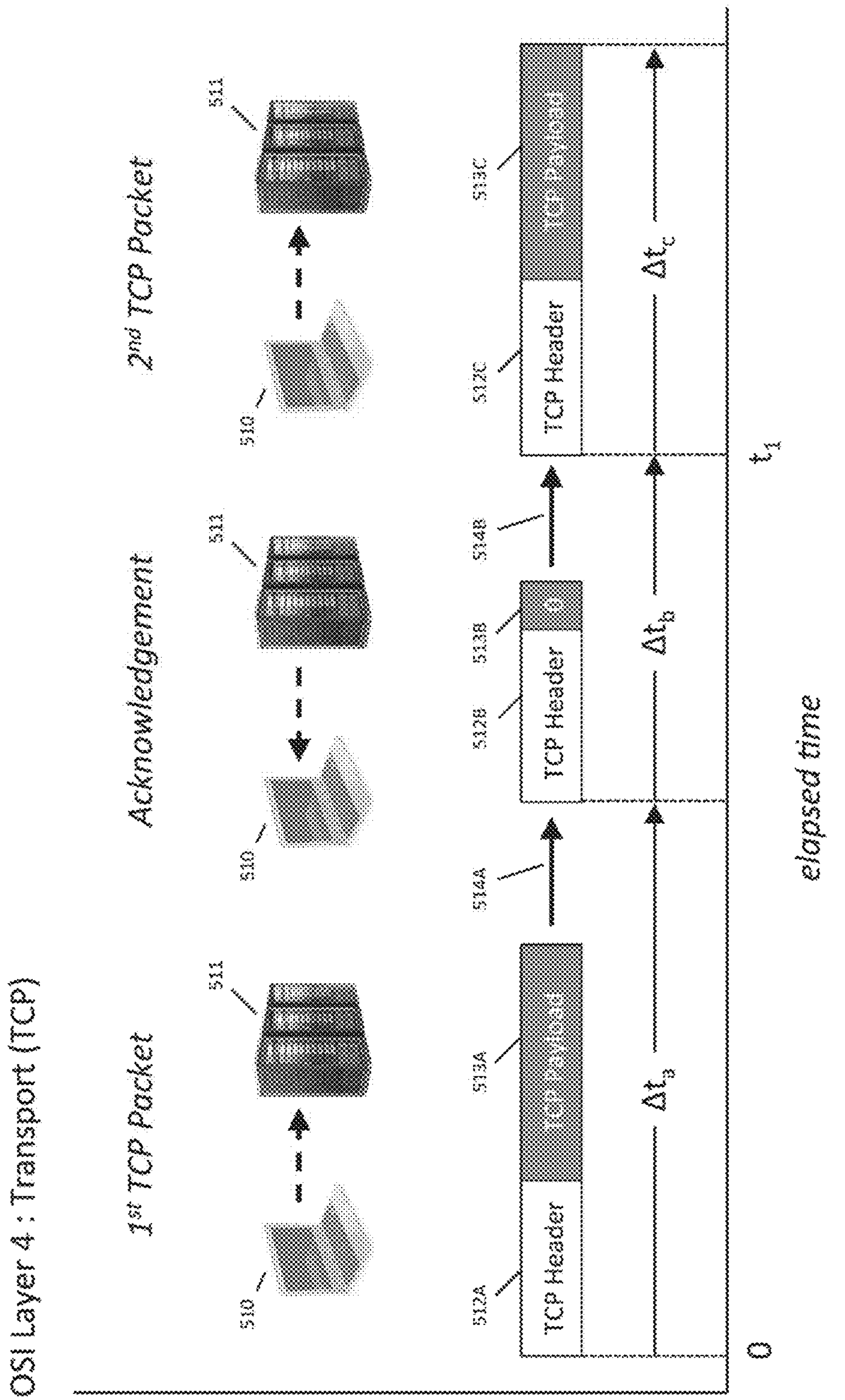
FIG. 29 is a graphical representation of a TCP packet transfer sequence.
Figure 31A:
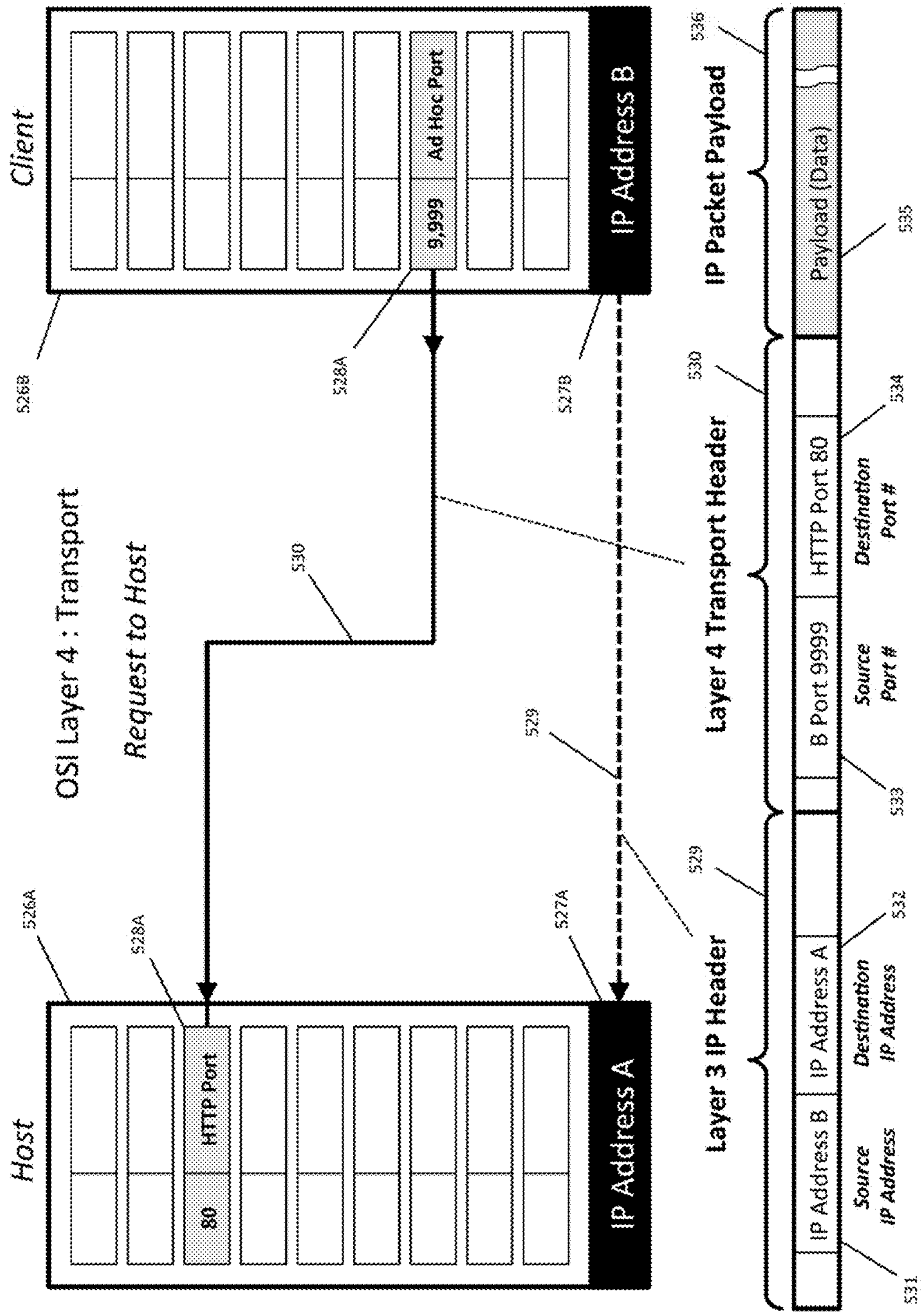
FIG. 31A is a schematic representation of transport Layer 4 communication from client to host.
Figure 31B:
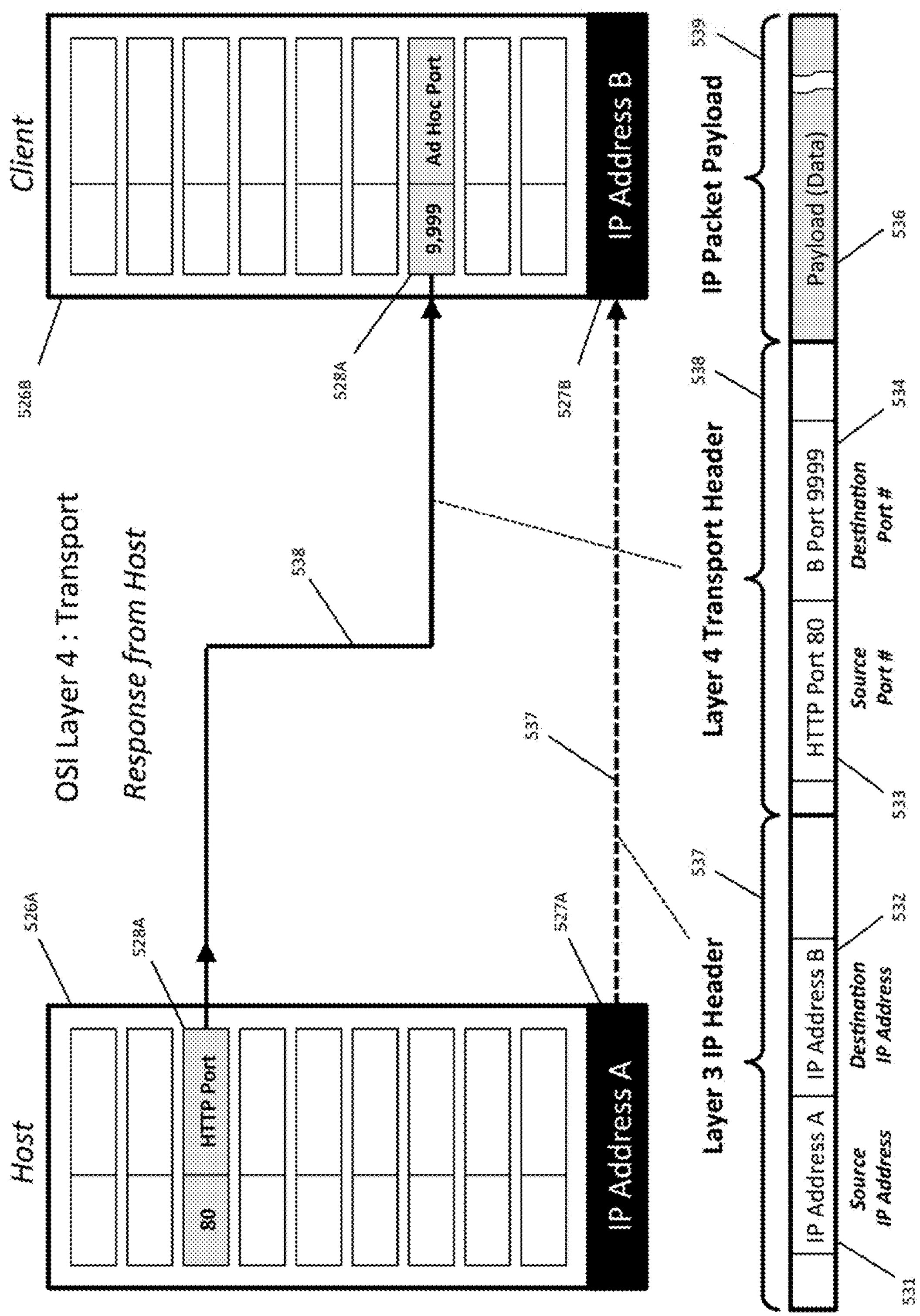
FIG. 31B is a schematic representation of transport Layer 4 communication from host to client.
Figure 32A:
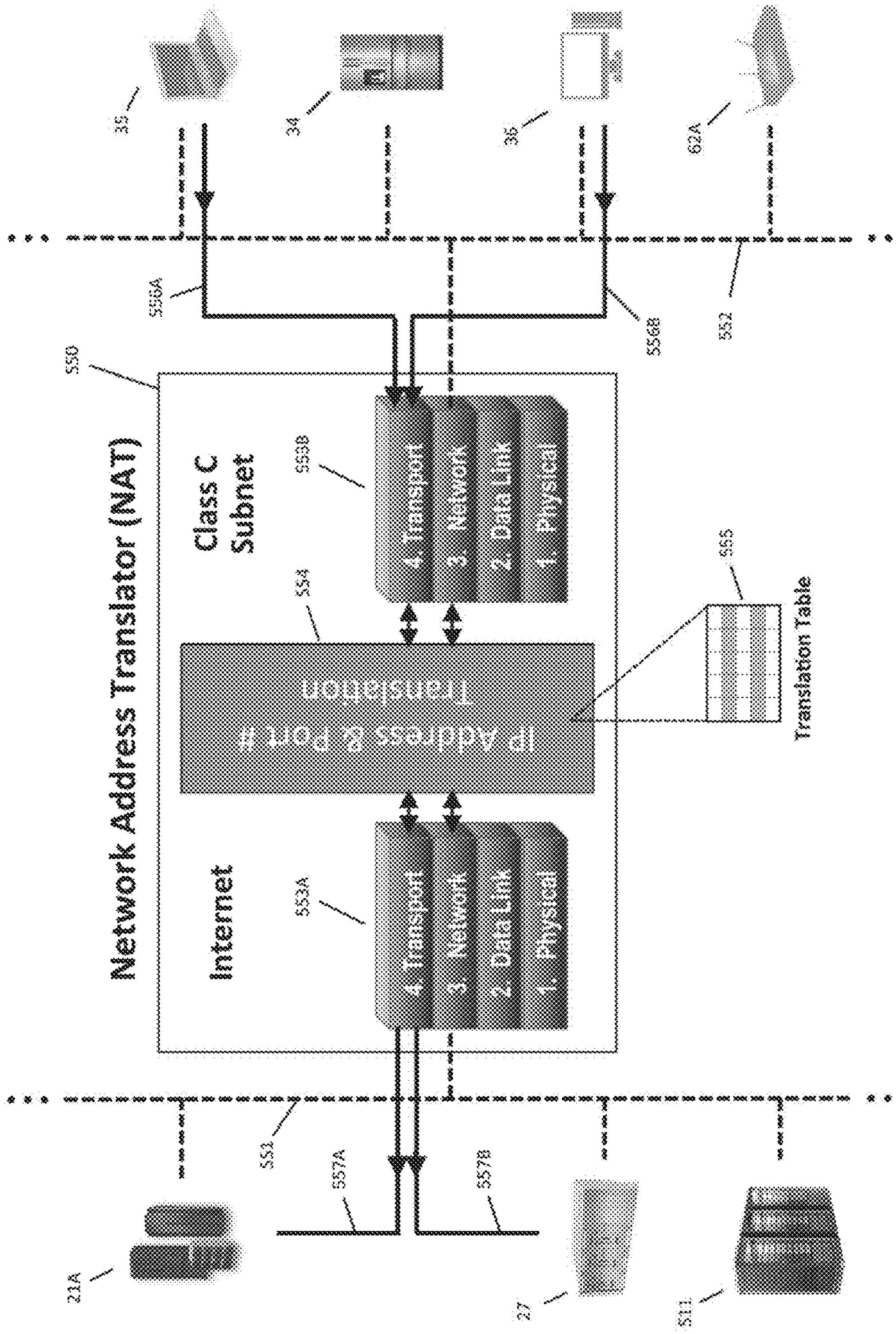
FIG. 32A is a schematic representation of a network application translator (NAT).
Figure 32B:
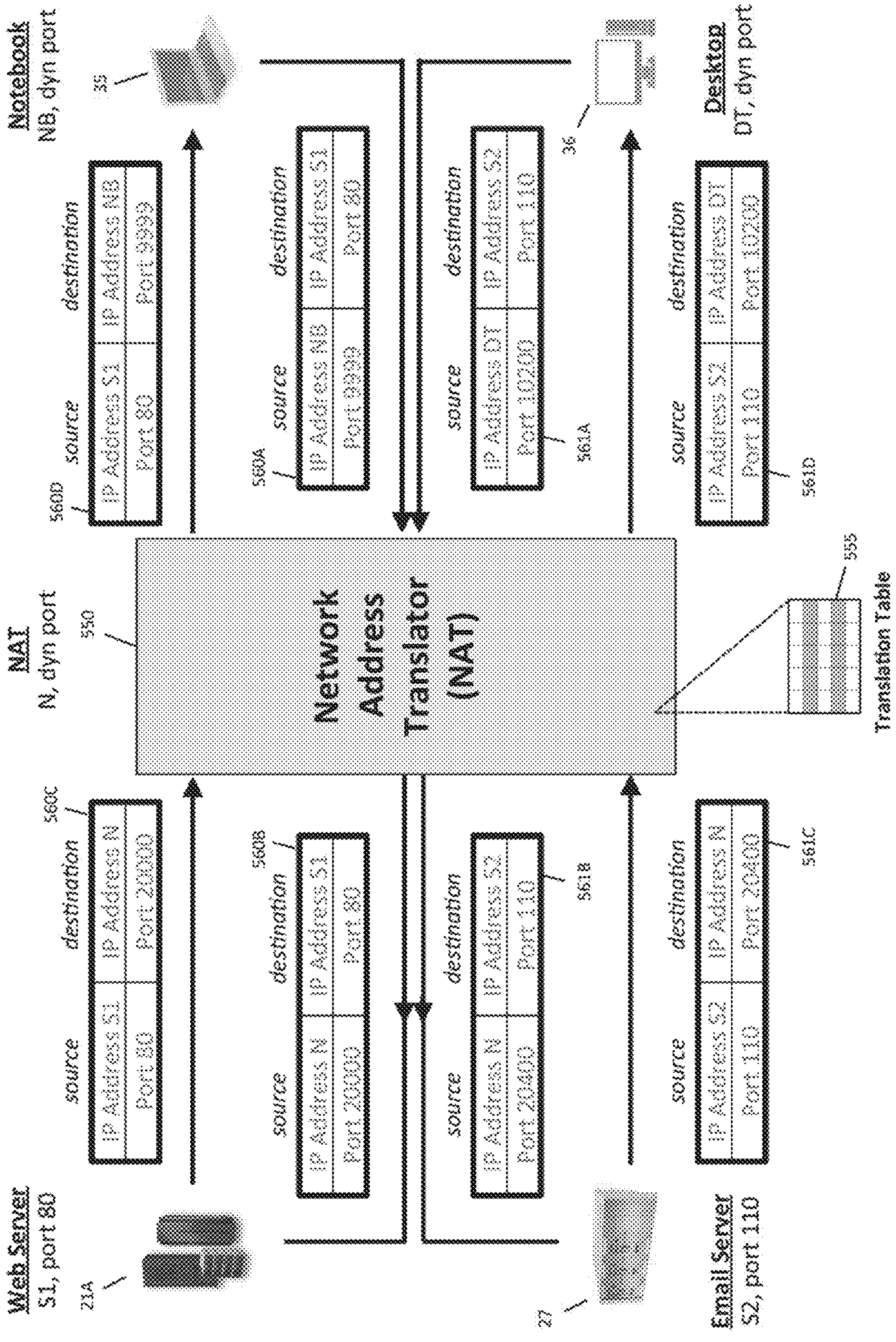
FIG. 32B is a schematic representation of the operation of a network application translator.
Figure 33:
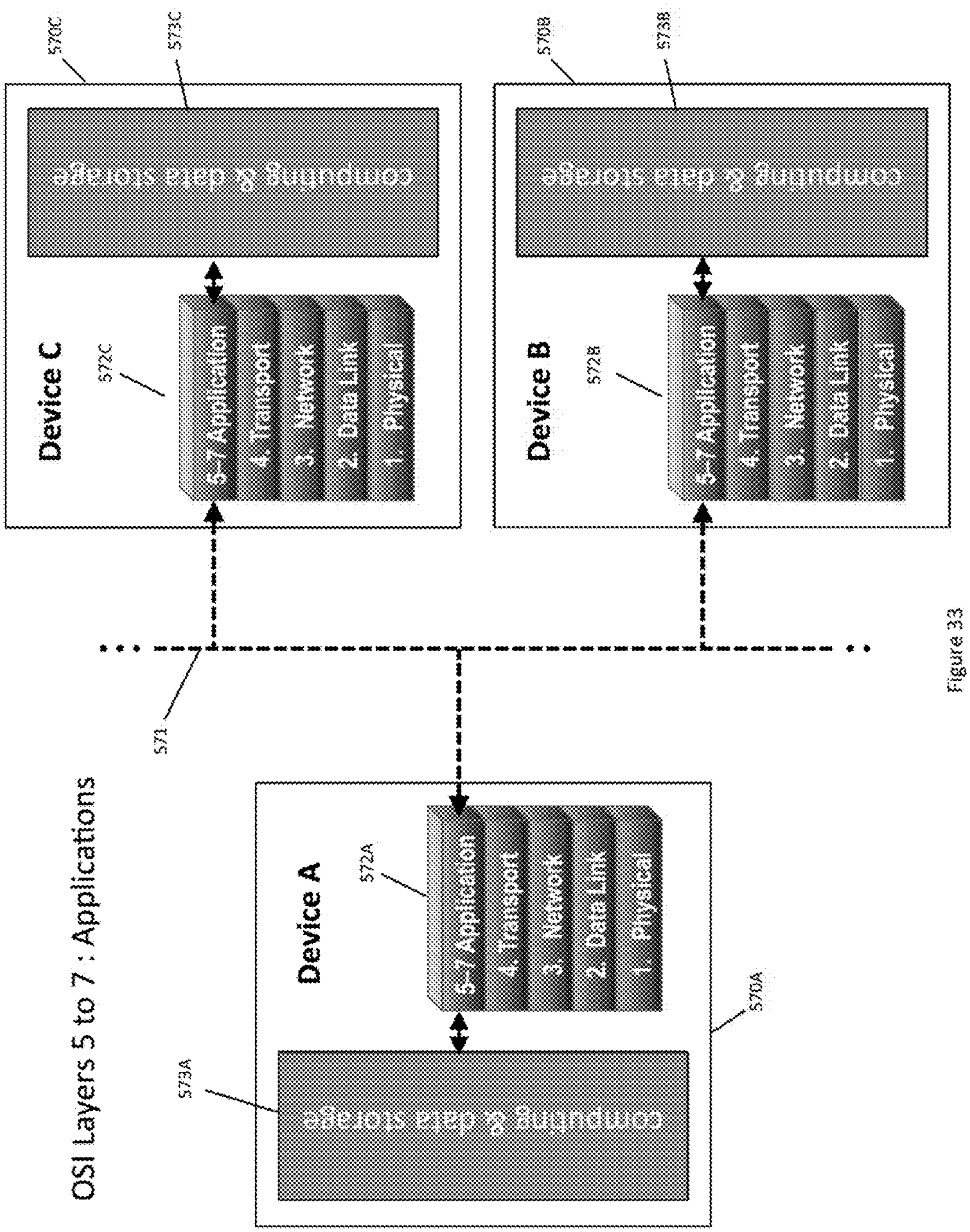
FIG. 33 is a schematic representation of three devices connected with application Layer 5, Layer 6, and Layer 7.
Figure 34:
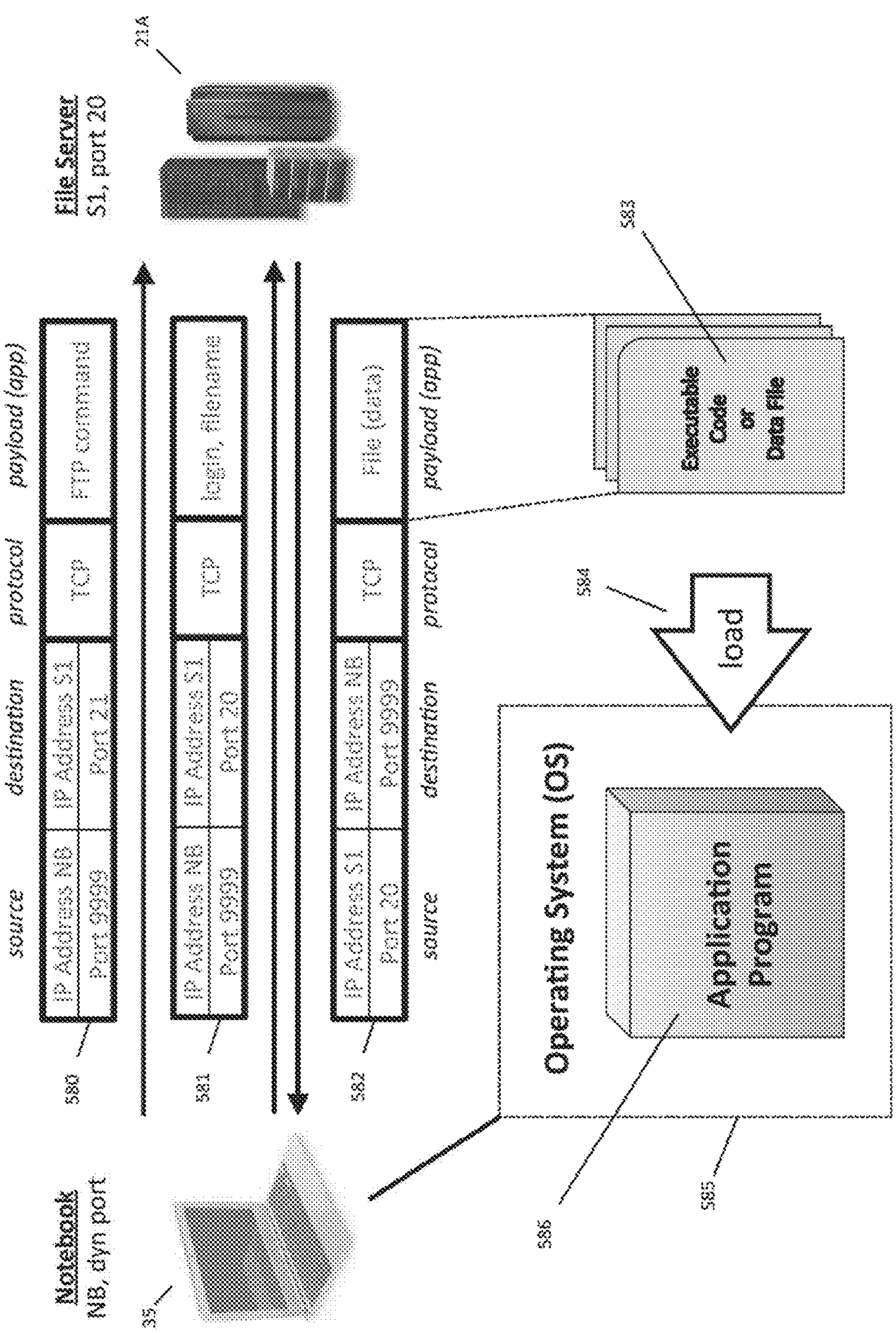
FIG. 34 is a schematic representation of content download using the Layer 7 application for file transfer protocol (HTTP).
Figure 35A:
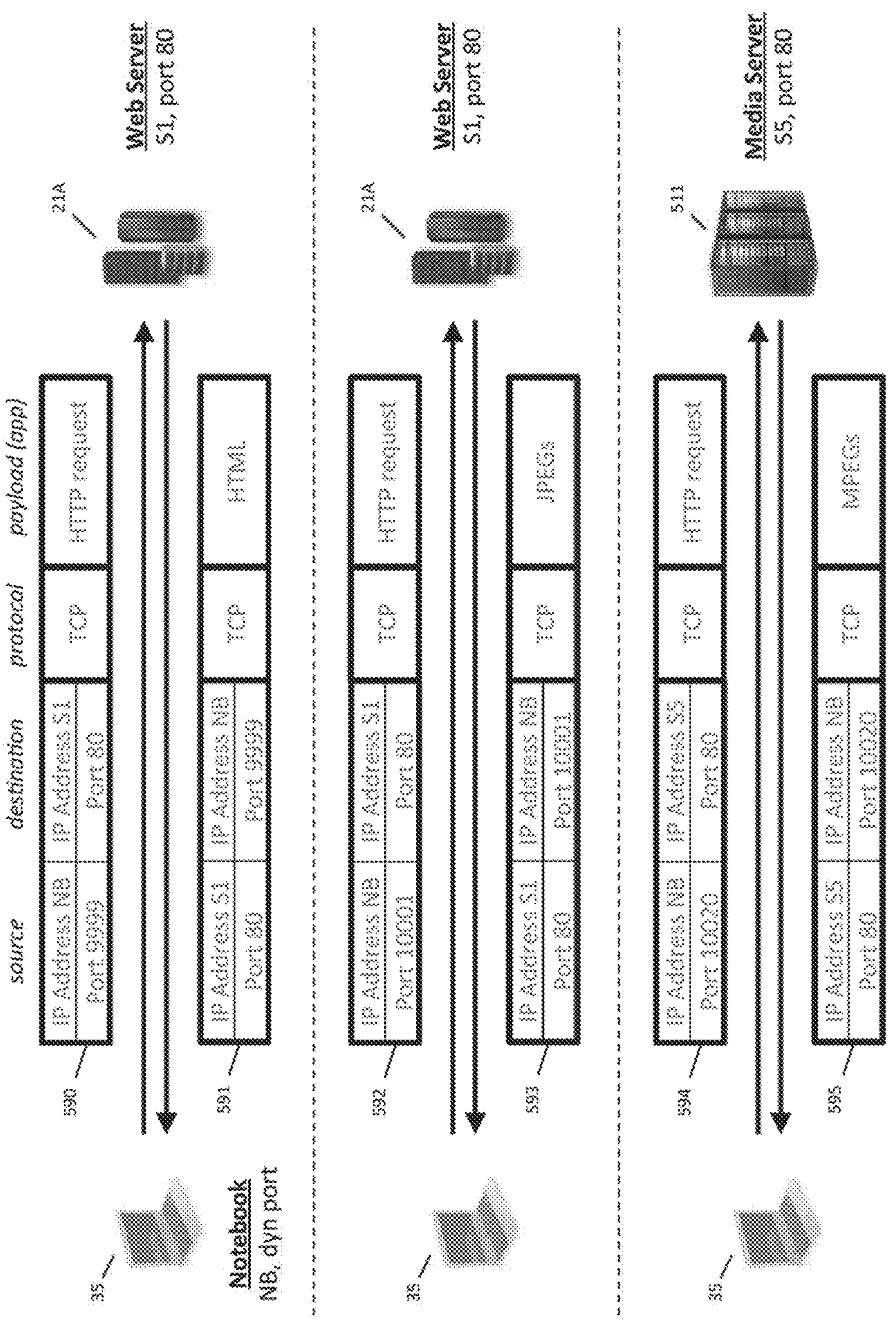
FIG. 35A is a schematic representation of web page downloads using the Layer 7 application for using hypertext transfer protocol or HTTP.
Figure 35B:
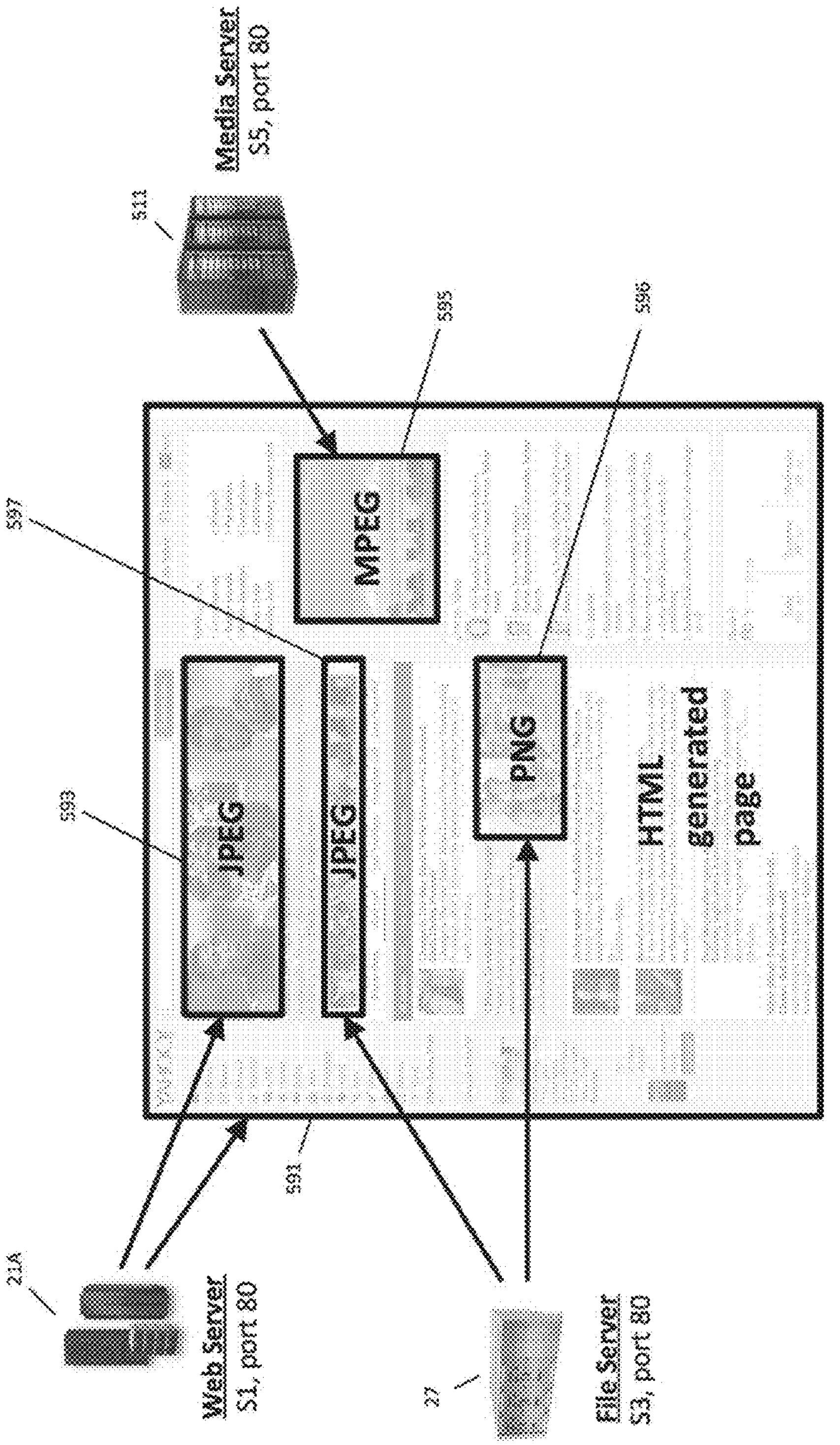
FIG. 35B is a graphical representation of a HTML web page constructed from downloads from various servers.
Figure 36:
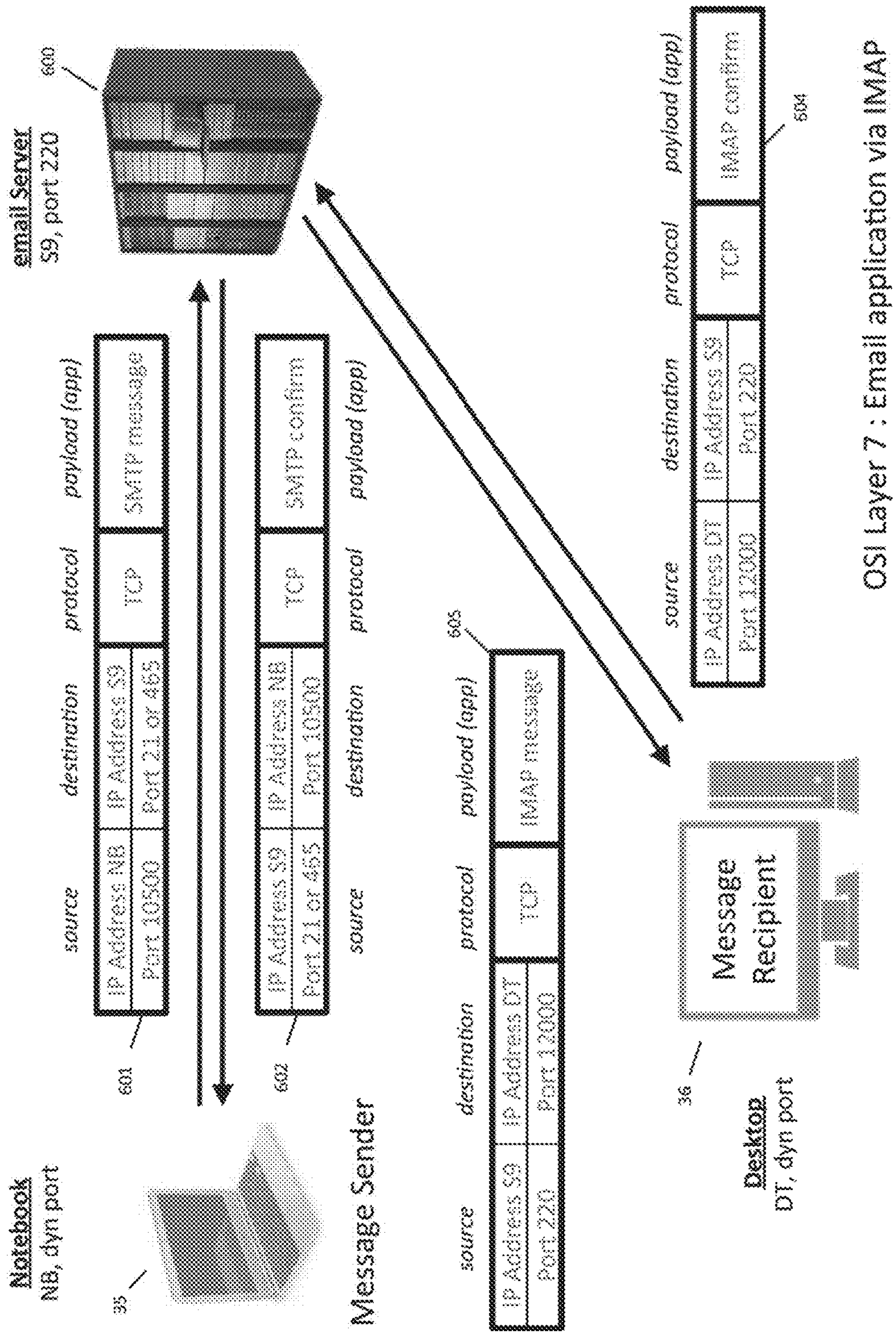
FIG. 36 is a schematic representation of Layer 7 application for IMAP-based email.
Figure 37:
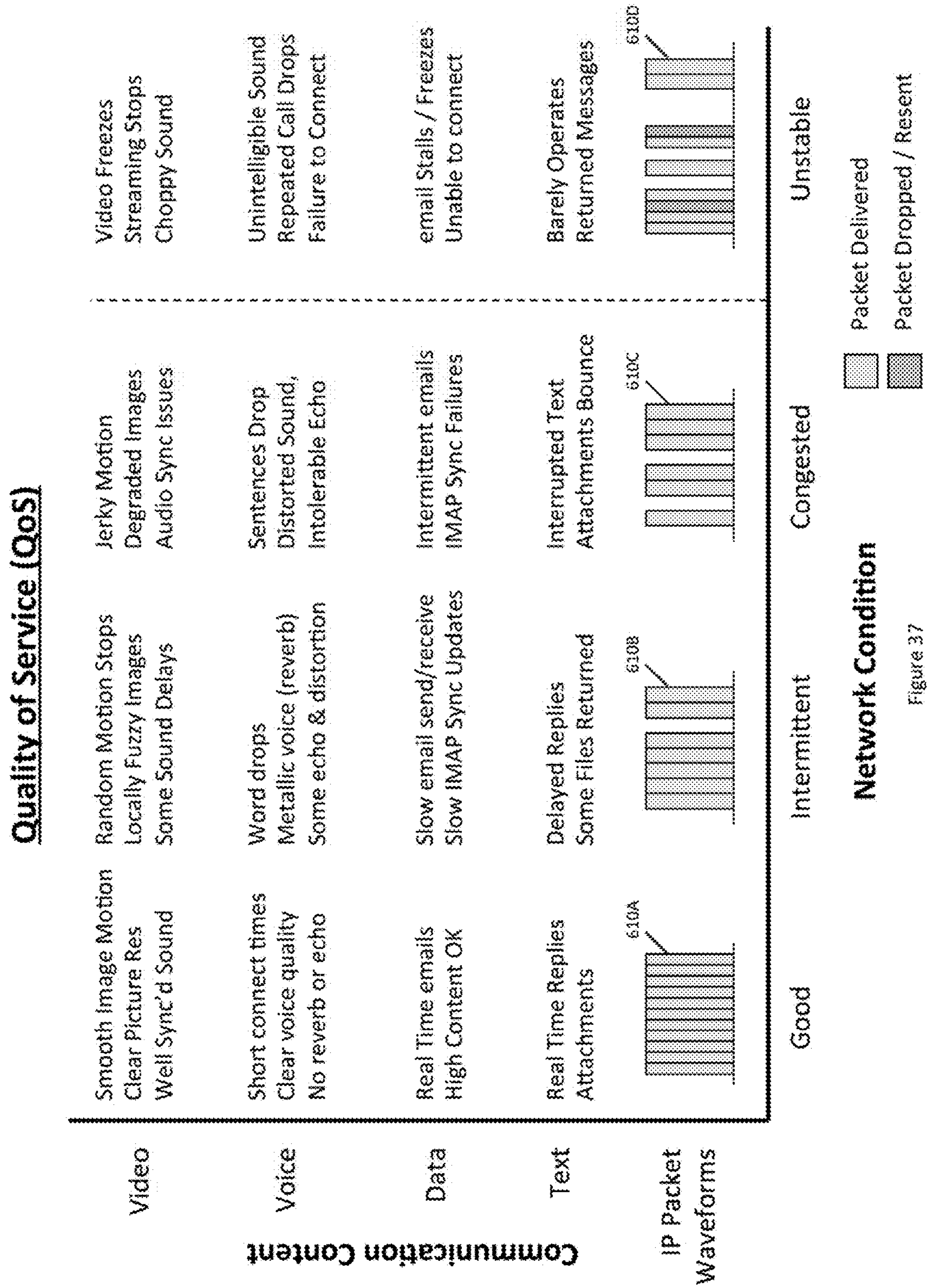
FIG. 37 is a table comparing quality of service (QoS) for varying network conditions.
Figure 38:
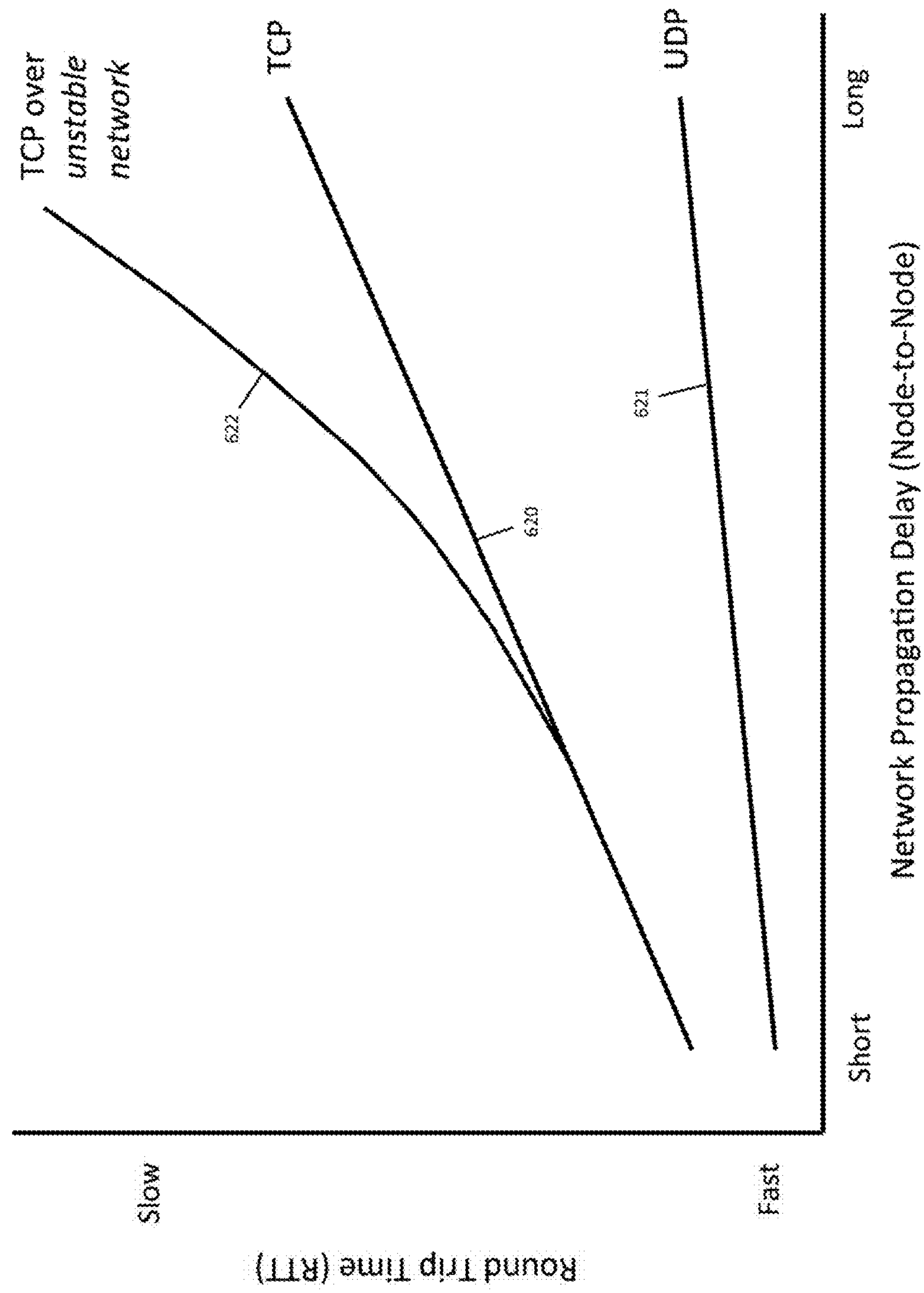
FIG. 38 is a graph of the round-trip time (RTT) as a function of network's intra-node propagation delay.
Figure 39:
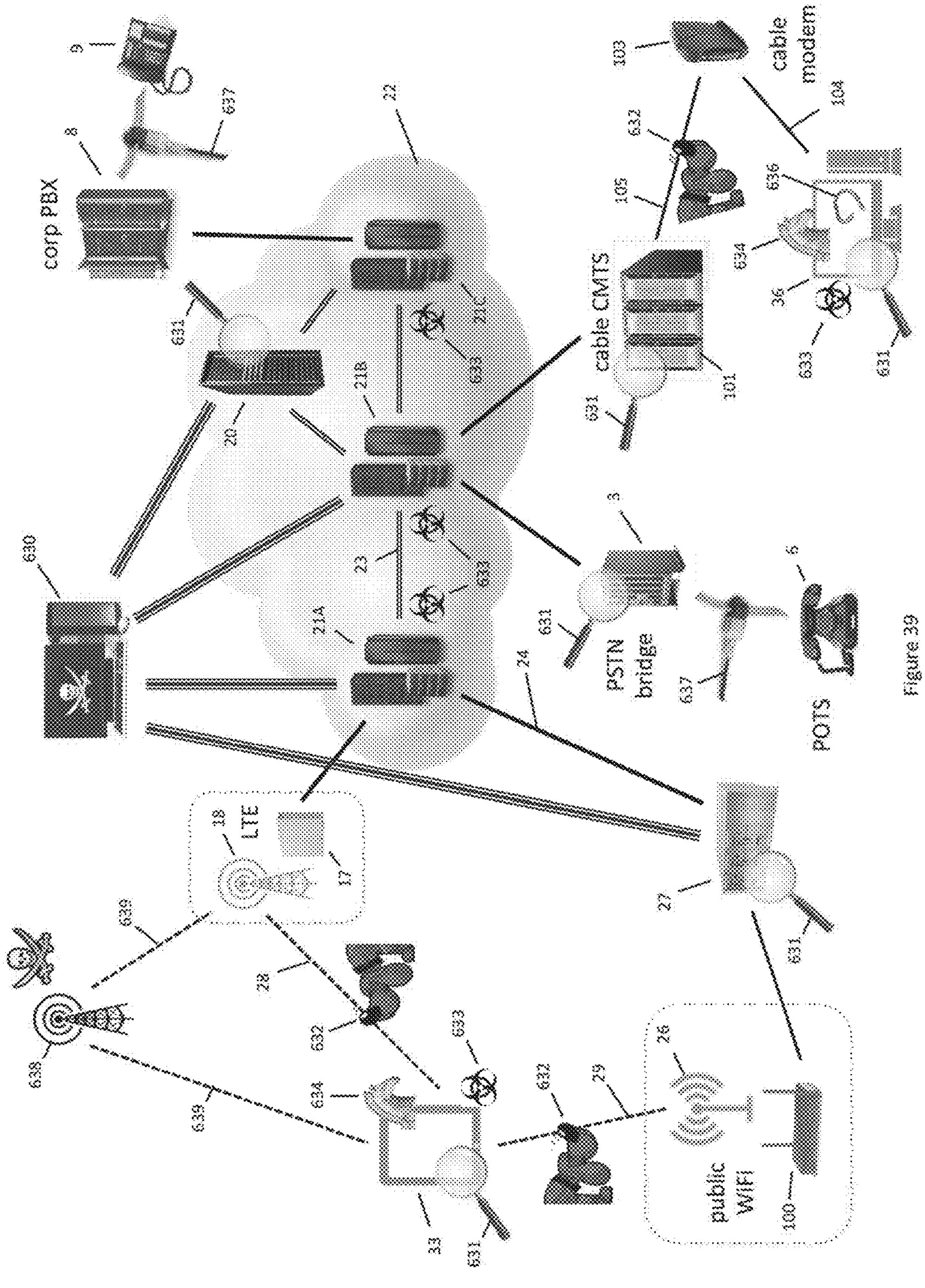
FIG. 39 is a schematic diagram of various examples of malware in a communication network.
Figure 88A:
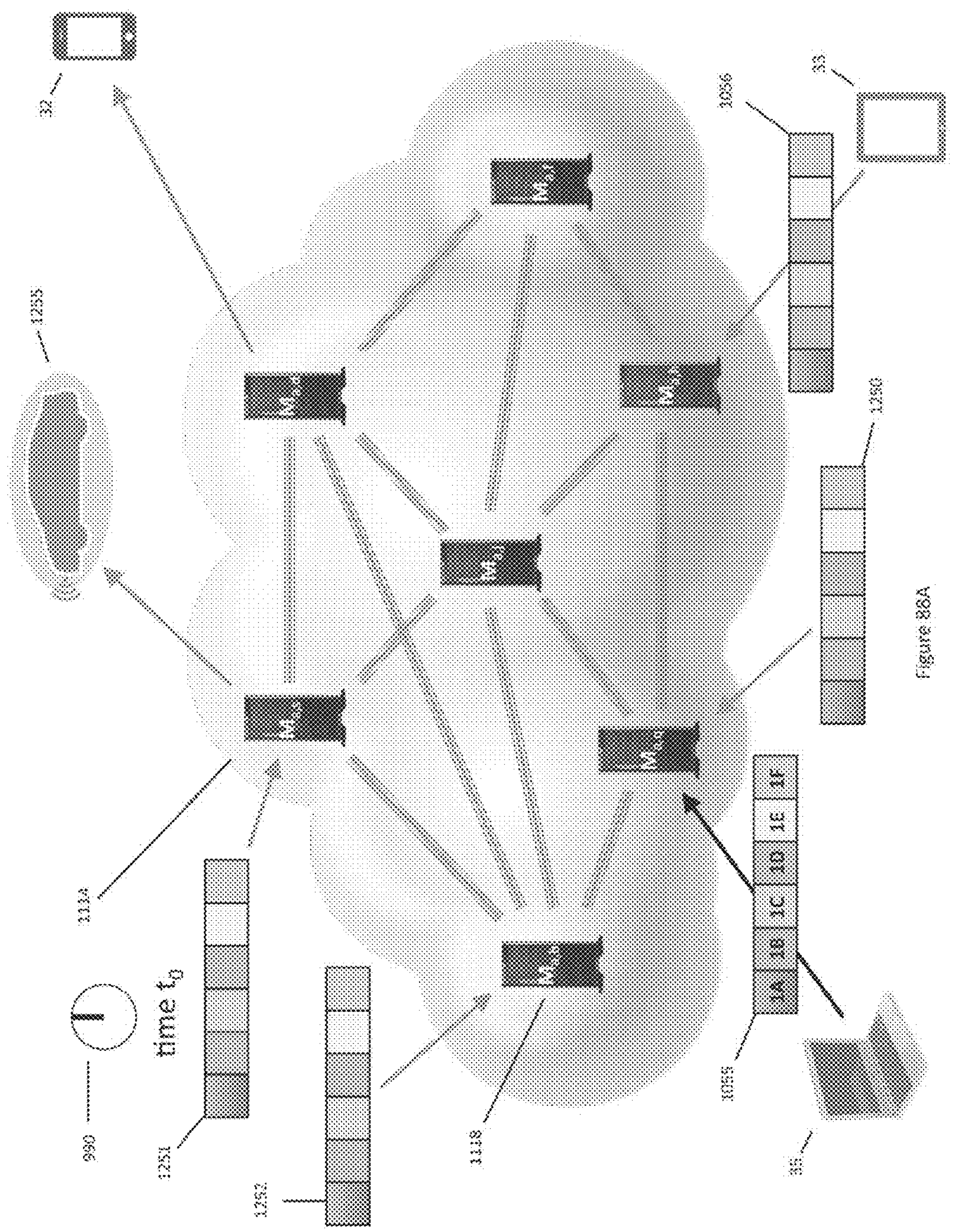

FIG. 88A is a schematic diagram showing packet routing commencing in an SDNP cloud.

Figure 88B:
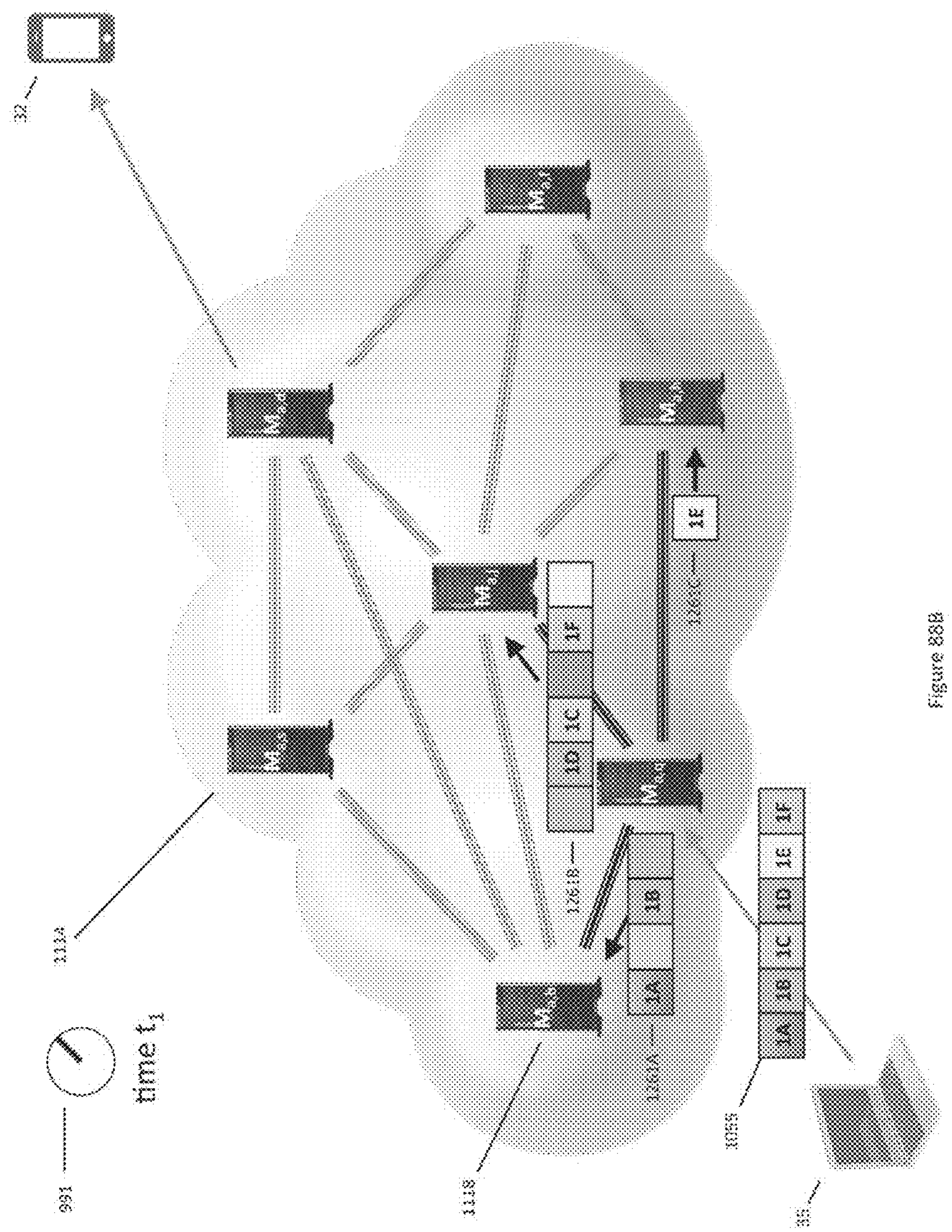

FIG. 88B is a schematic diagram showing first cloud hop packet routing in an SDNP cloud.

Figure 88C:
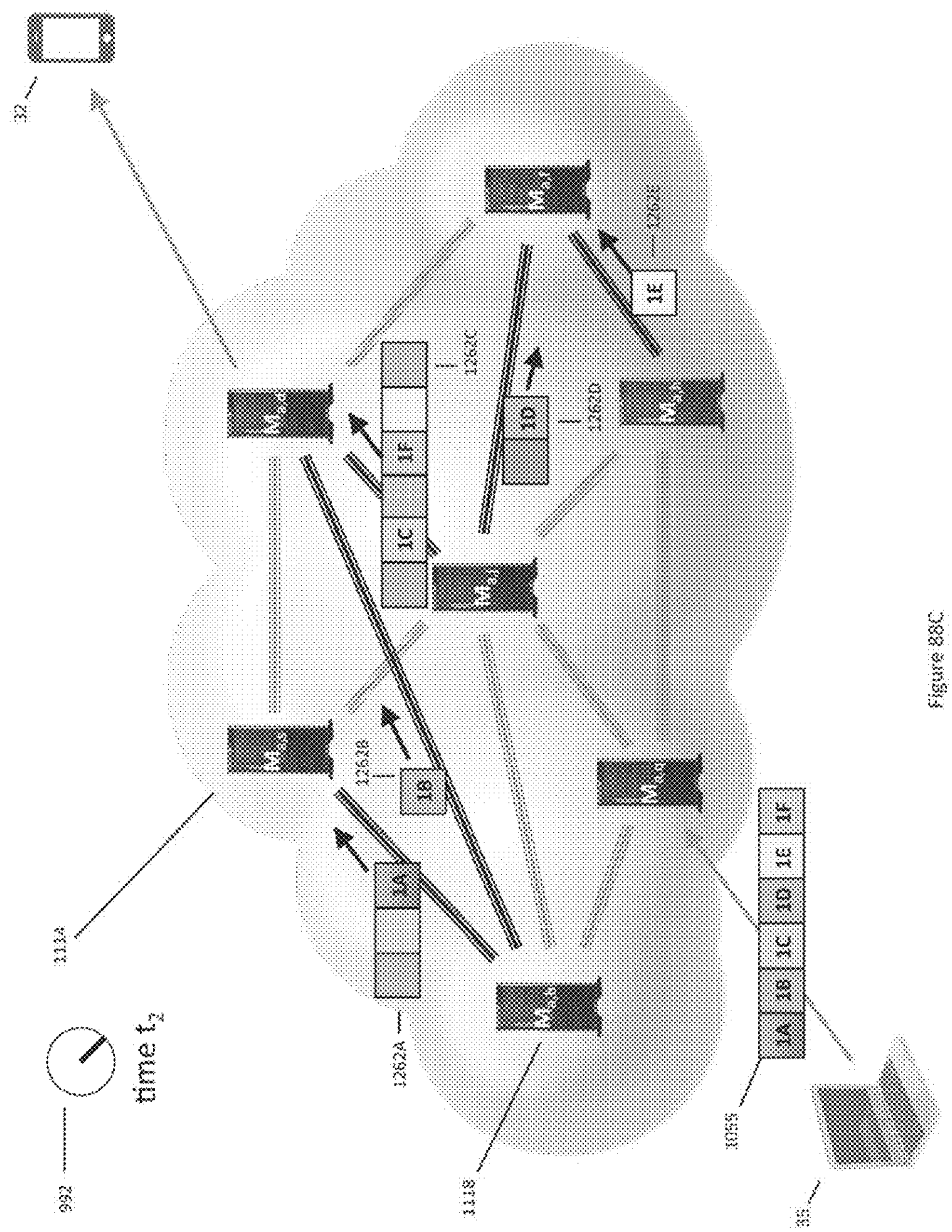
Figure 88D:
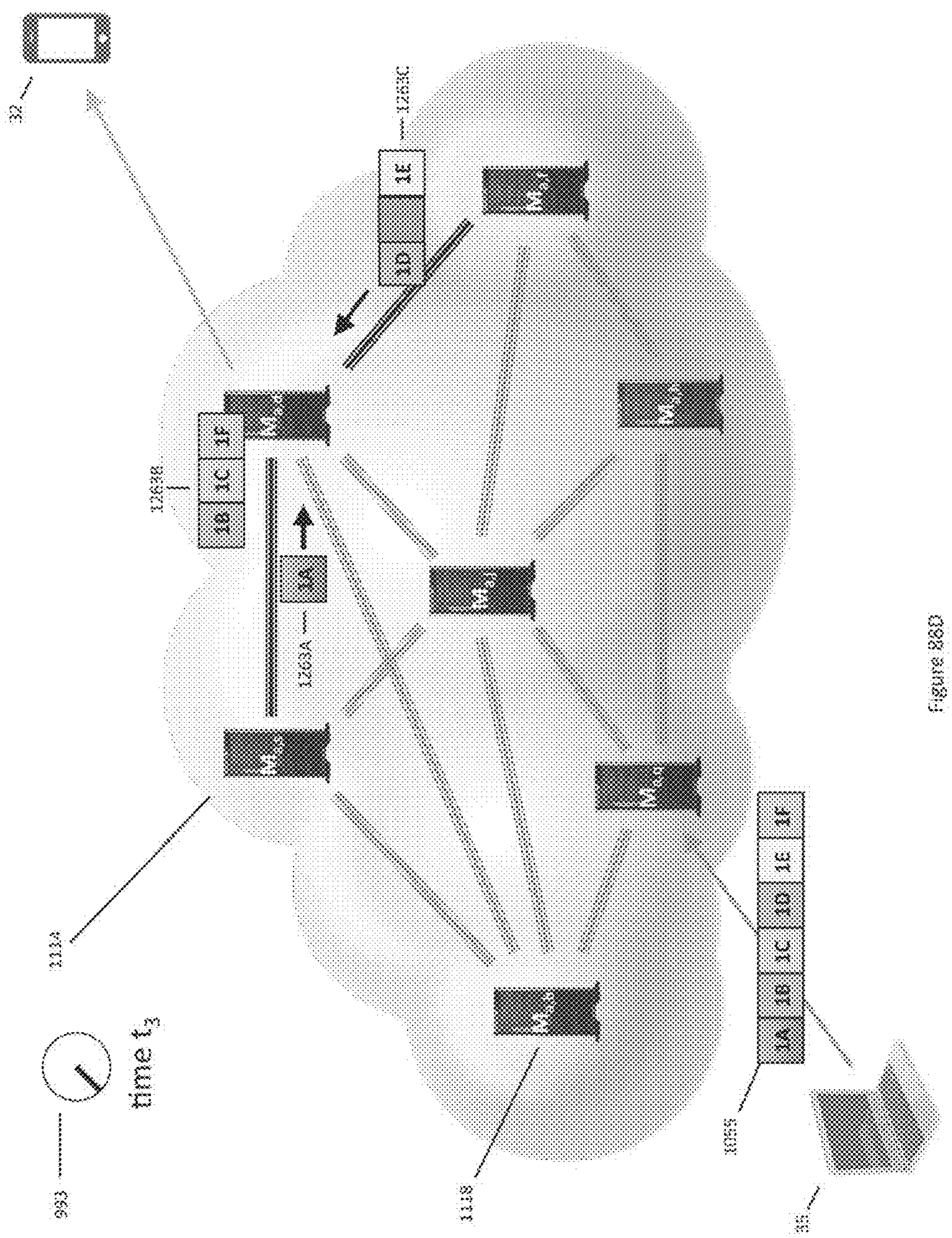
Figure 85E:
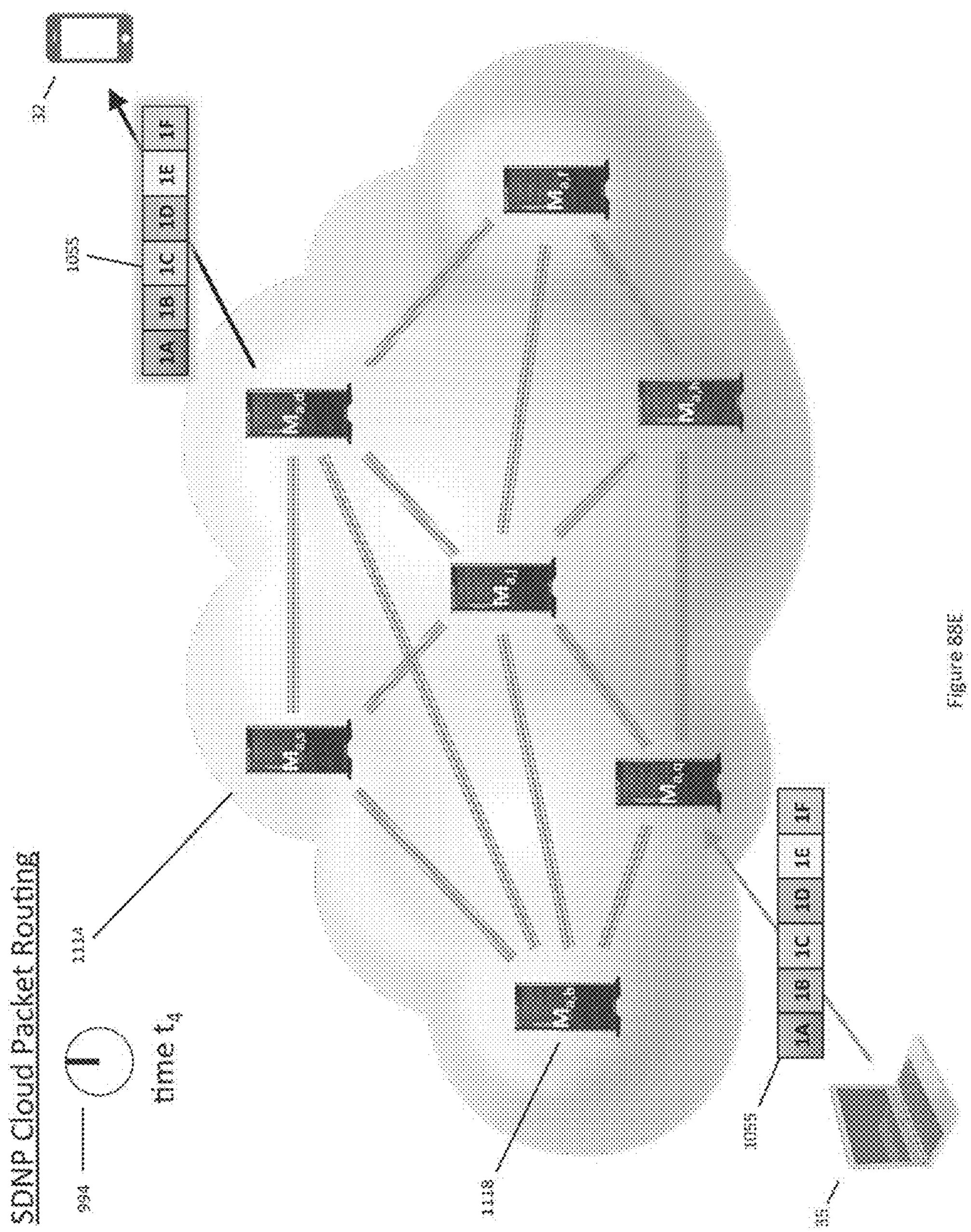
Figure 85F:
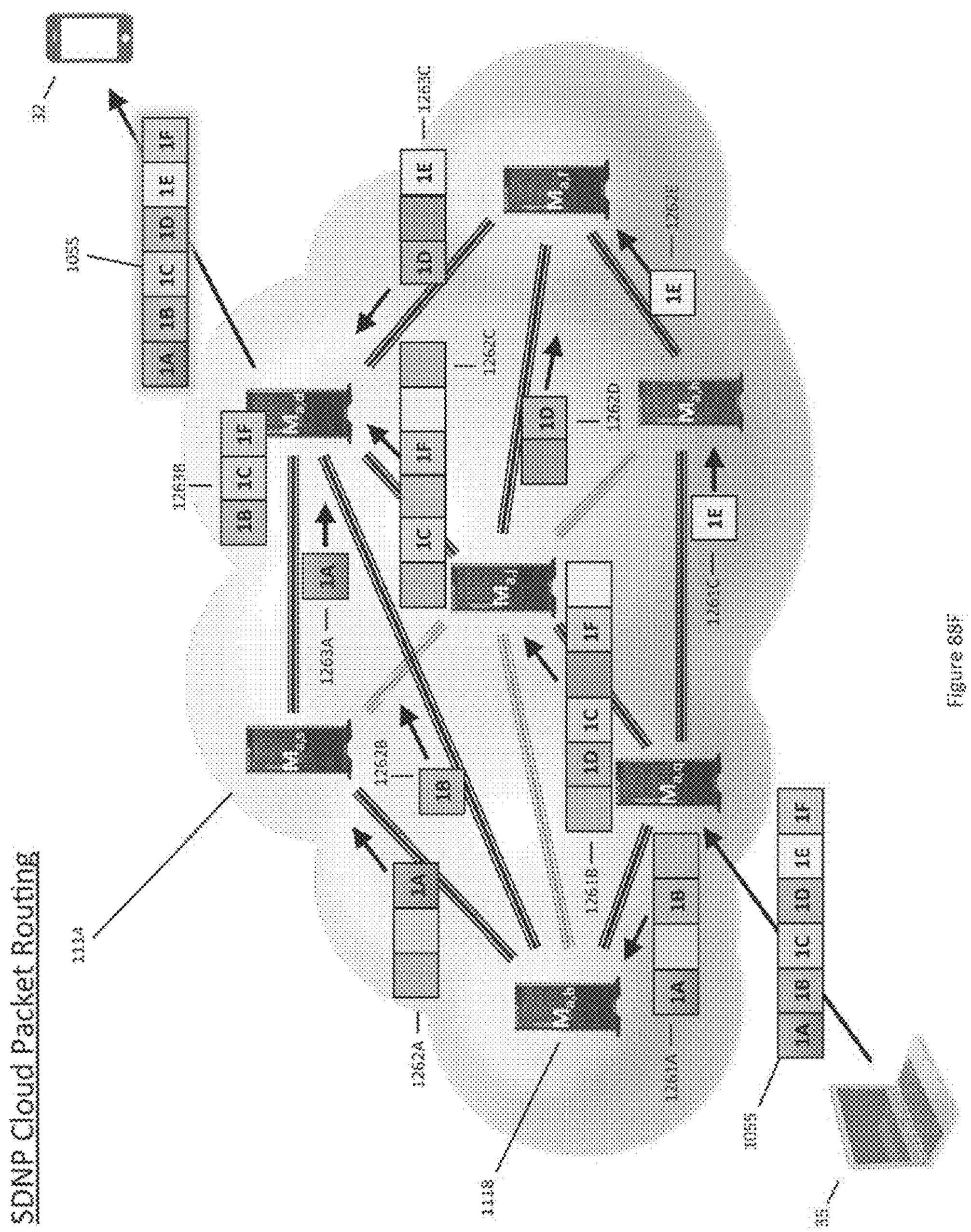

FIG. 88C is a schematic diagram showing second cloud hop packet routing in an SDNP cloud FIG. 88D is a schematic diagram showing third cloud hop packet routing in an SDNP cloud.

FIG. 88E is a schematic diagram showing packet routing from an SDNP cloud gateway.

FIG. 88F is a schematic diagram summarizing packet routing in an SDNP cloud for a specific session.

Figure 89A:
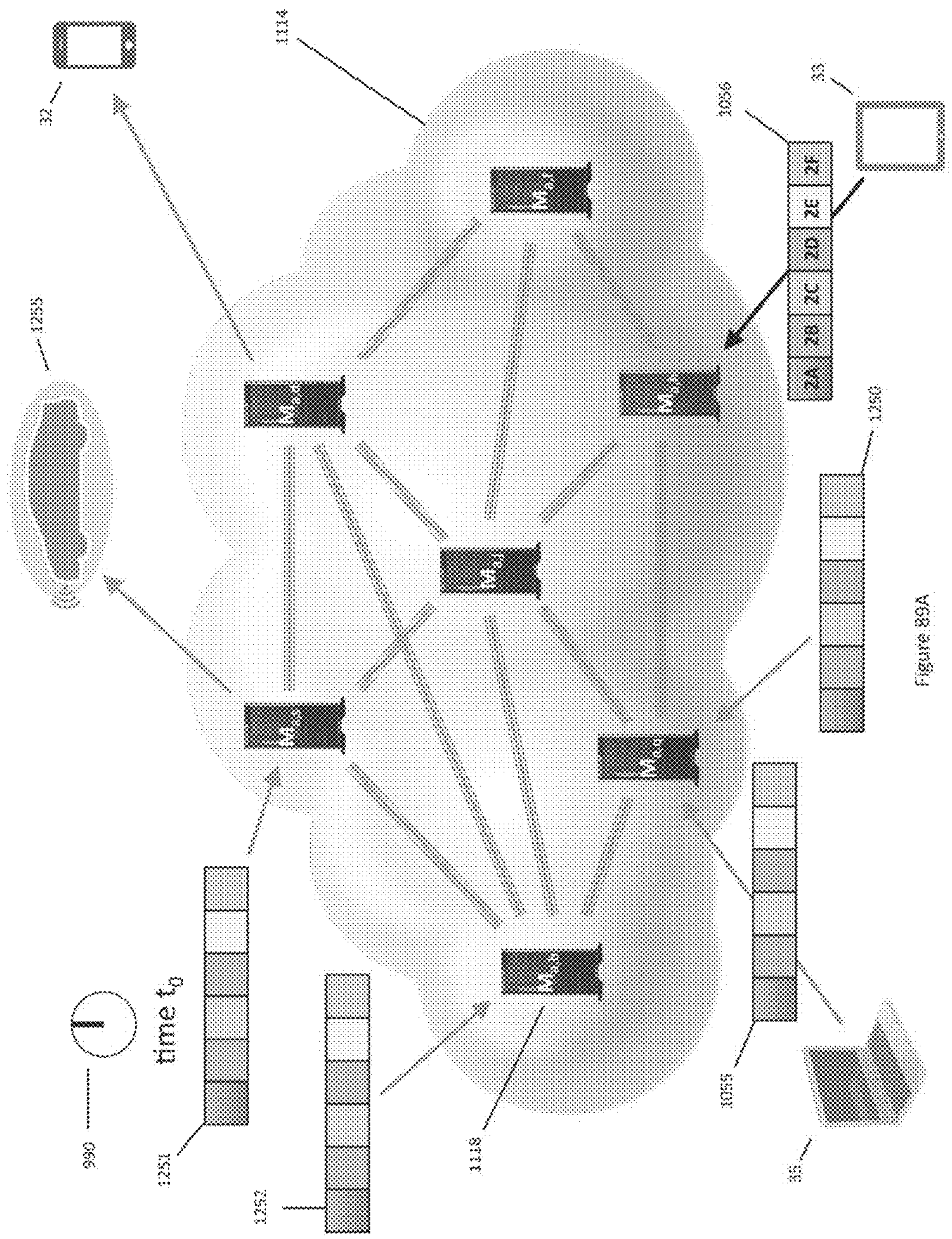

FIG. 89A is a schematic diagram showing packet routing of an alternate session commencing in an SDNP cloud.

Figure 89B:
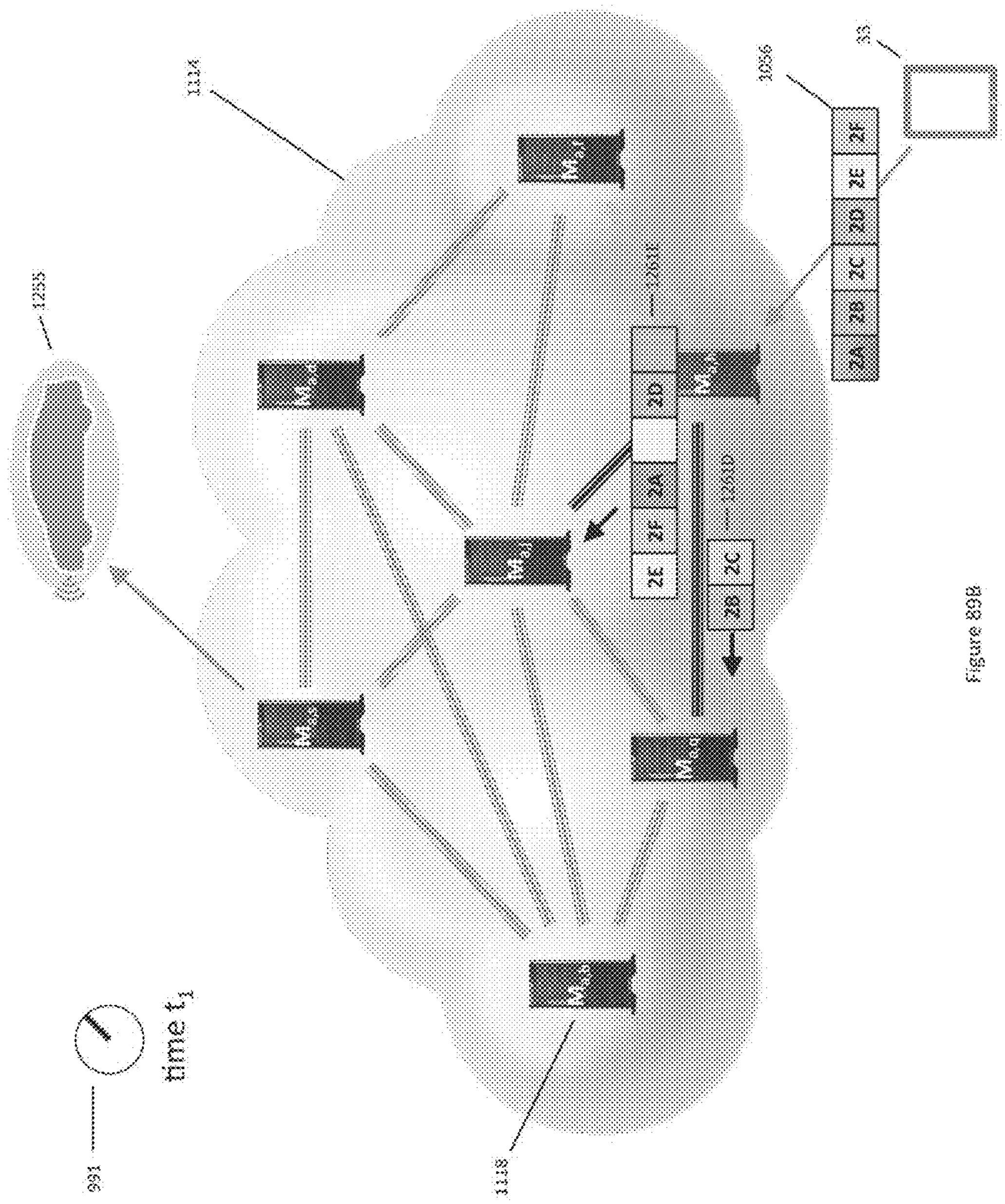

FIG. 89B is a schematic diagram showing first cloud hop of an alternate session packet routing in an SDNP cloud.

Figure 89C:
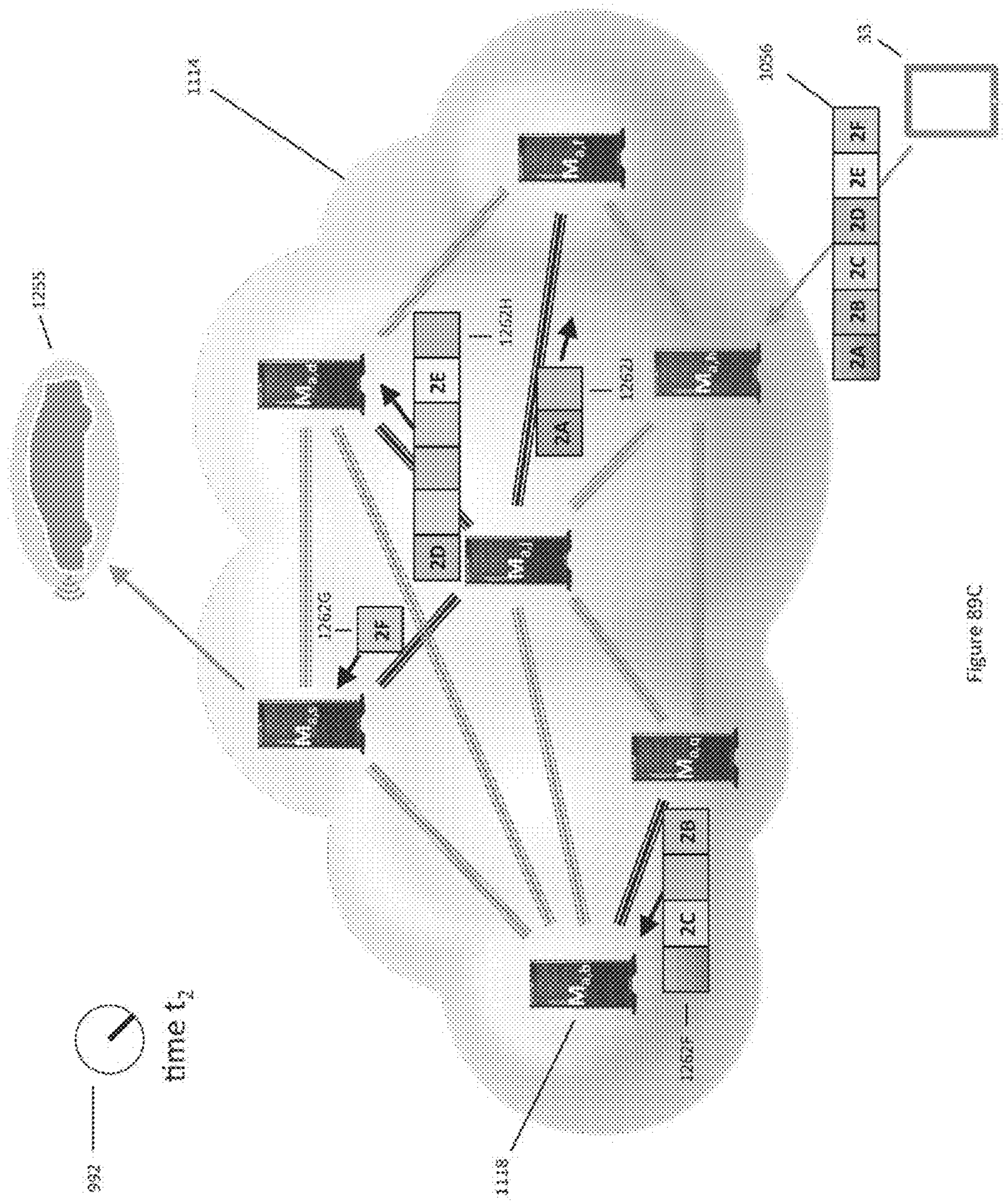

FIG. 89C is a schematic diagram showing second cloud hop of an alternate session packet routing in an SDNP cloud.

Figure 89D:
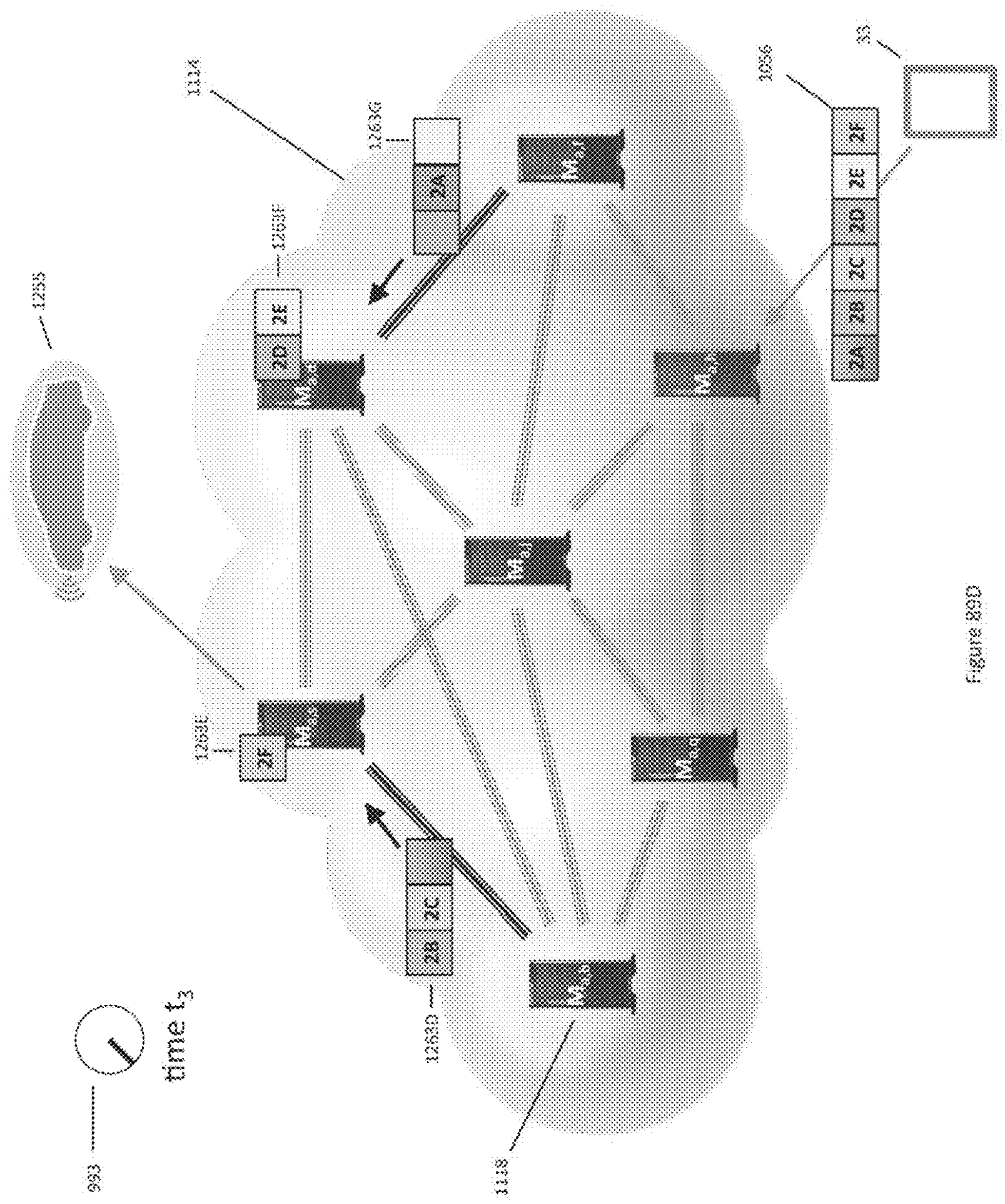

FIG. 89D is a schematic diagram showing third cloud hop of an alternate session packet routing in an SDNP cloud.

Figure 89E:
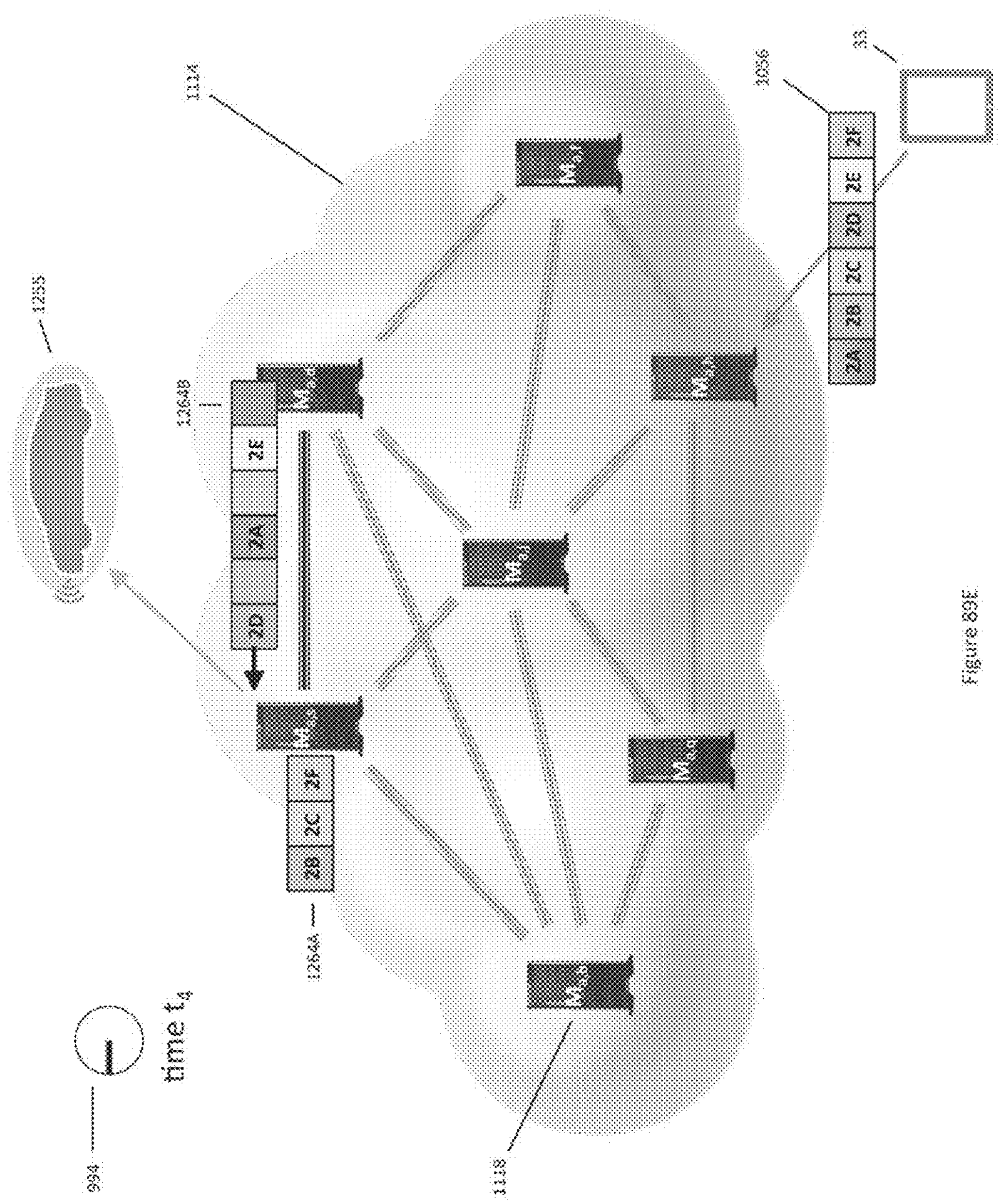

FIG. 89E is a schematic diagram showing fourth cloud hop of an alternate session packet routing in an SDNP cloud.

Figure 89F:
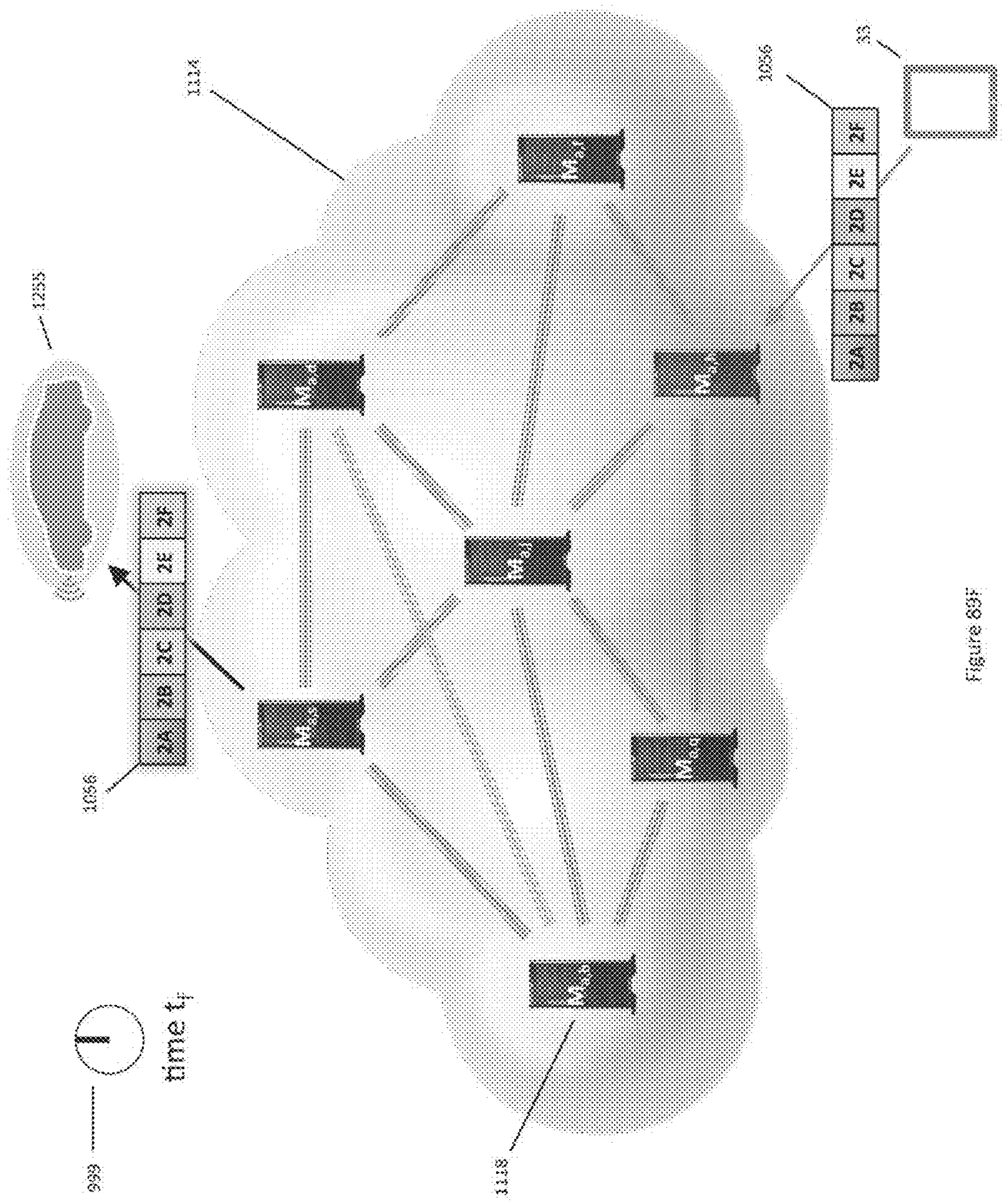

FIG. 89F is a schematic diagram showing of an alternate session packet routing from an SDNP cloud gateway.

Figure 89G:
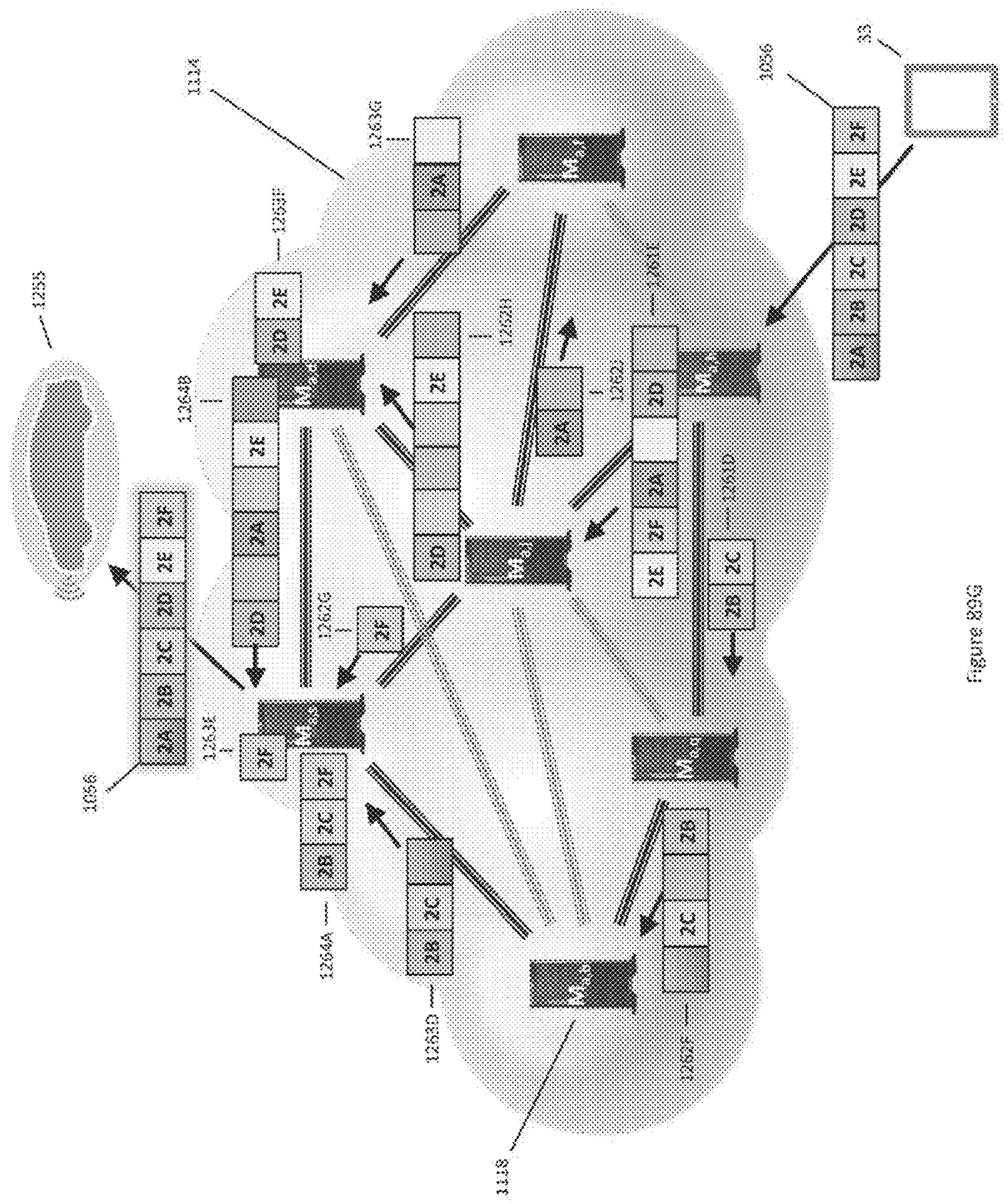
Figure 9D:
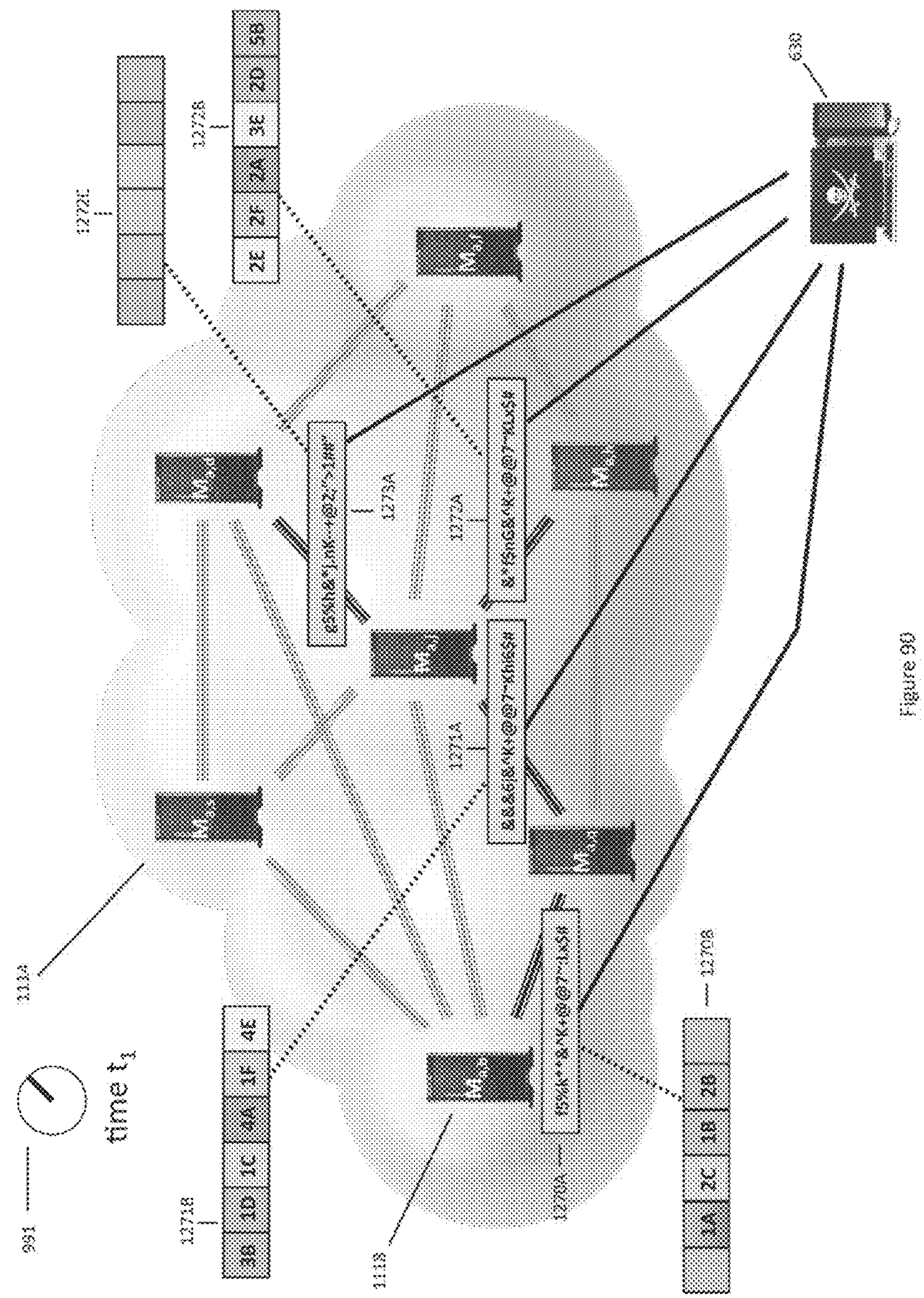
FIG. 9 is a graphical representation of a data link Layer 2 construct of an IP packet using an Ethernet protocol.

FIG. 89G is a schematic diagram summarizing alternate session packet routing in an SDNP cloud.

FIG. 90 is a schematic diagram showing SDNP packet content available to man-in-the-middle attacks and packet sniffing.

Figure 91A:
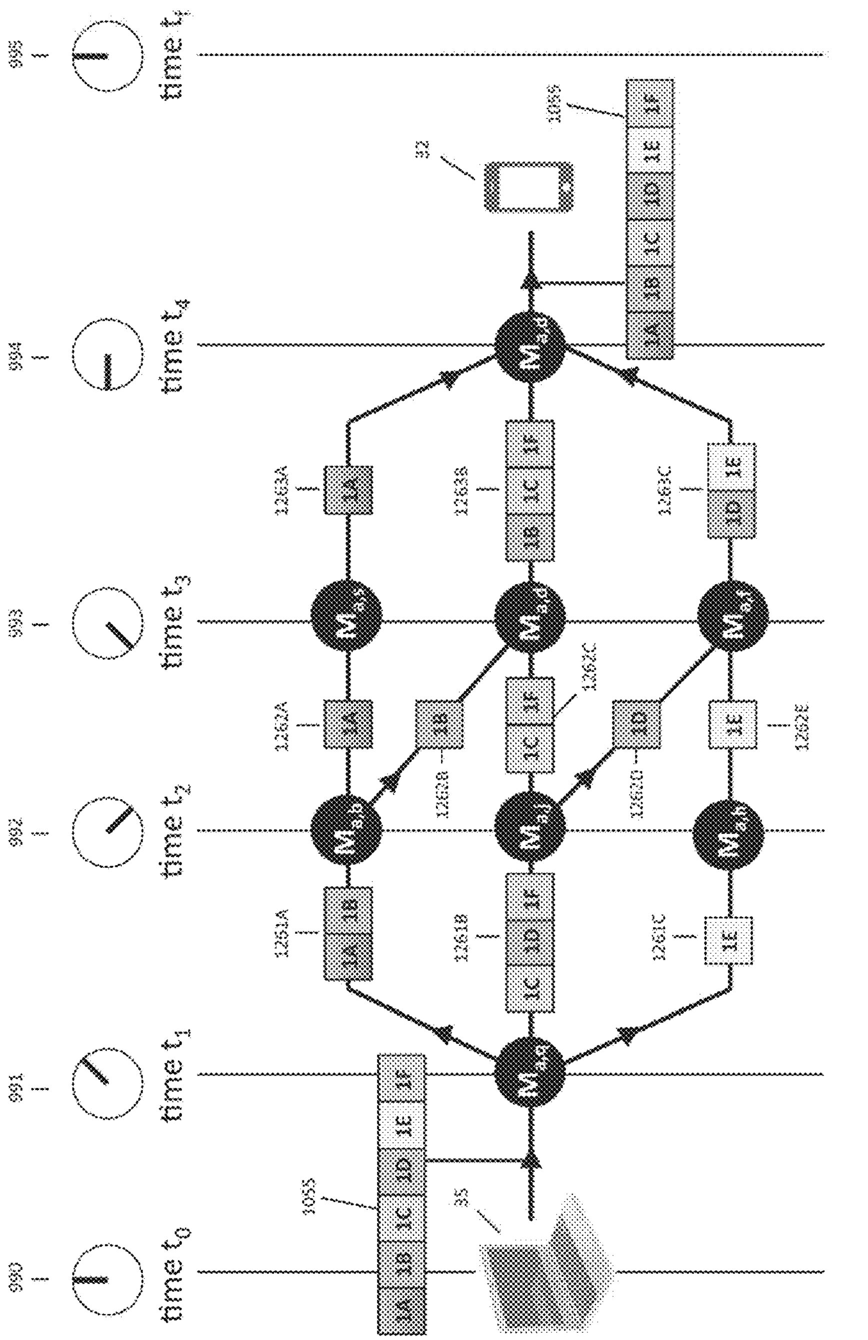

FIG. 91A is a schematic diagram graphically representing SDNP packet transport over time.

Figure 91C:
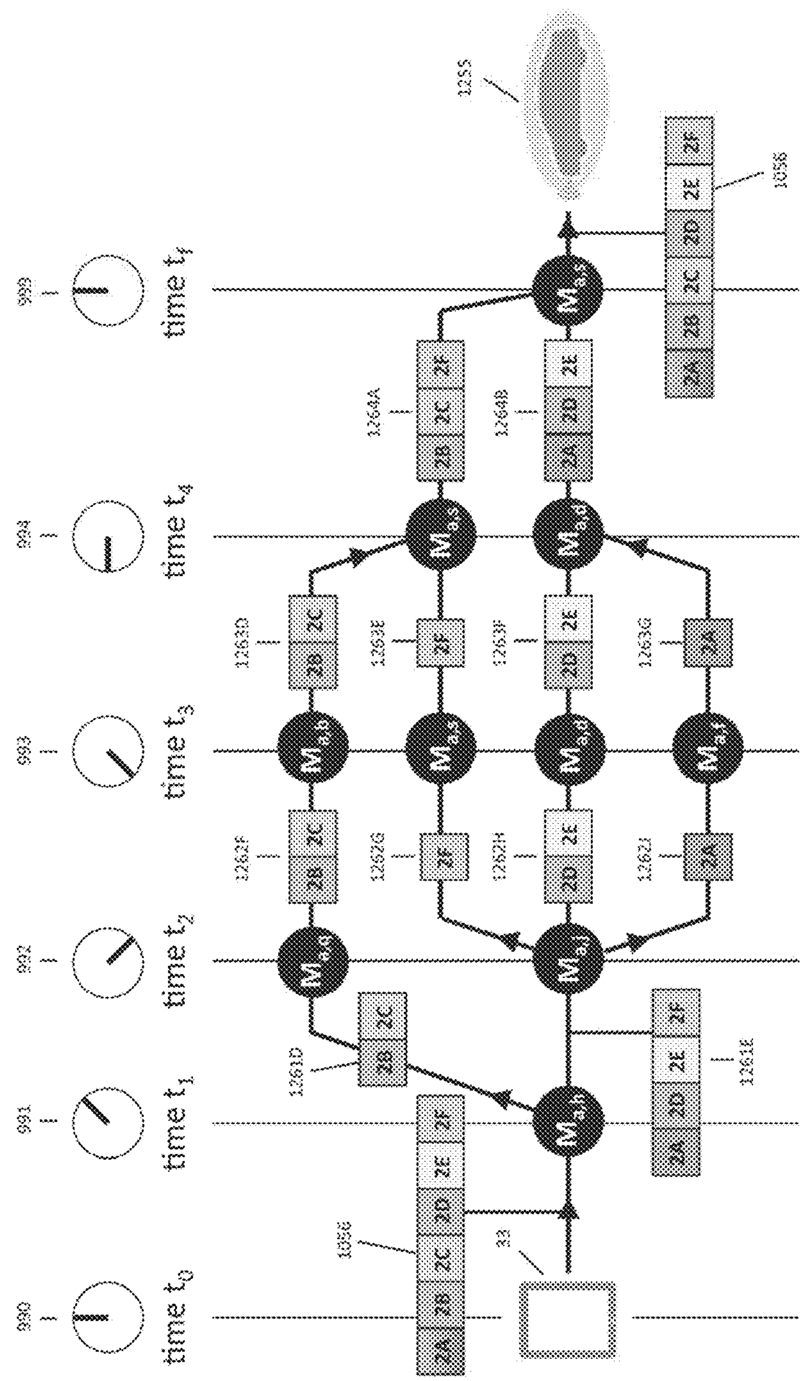

FIG. 91B is a schematic diagram representing SDNP packet transport over time in tabular form FIG. 91C is a schematic diagram graphically representing an SDNP packet of an alternate session packet transported over time.

Figure 92A:
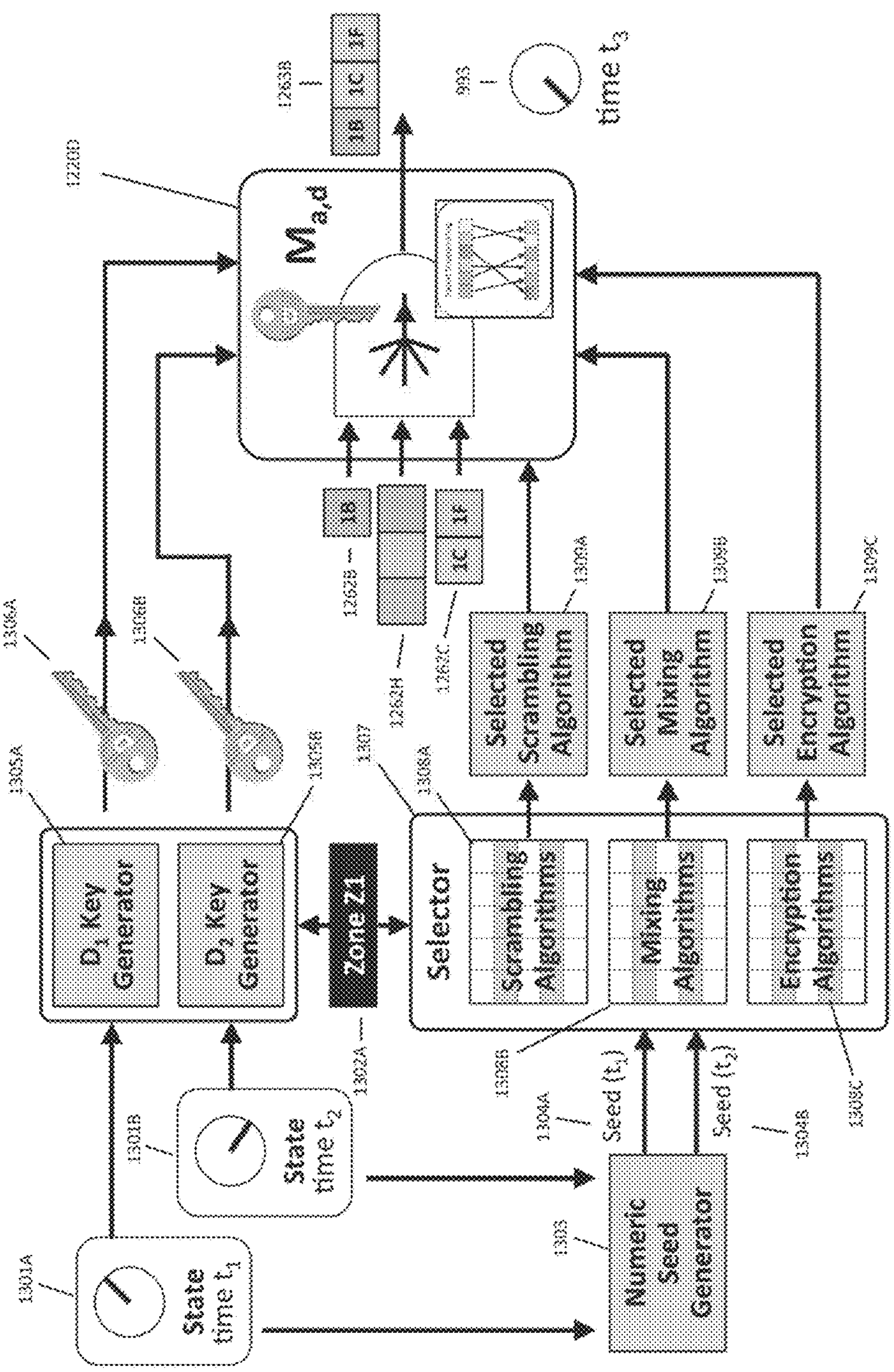

FIG. 92A is a schematic diagram showing control of incoming SDNP packets to SDNP media node.

Figure 92B:
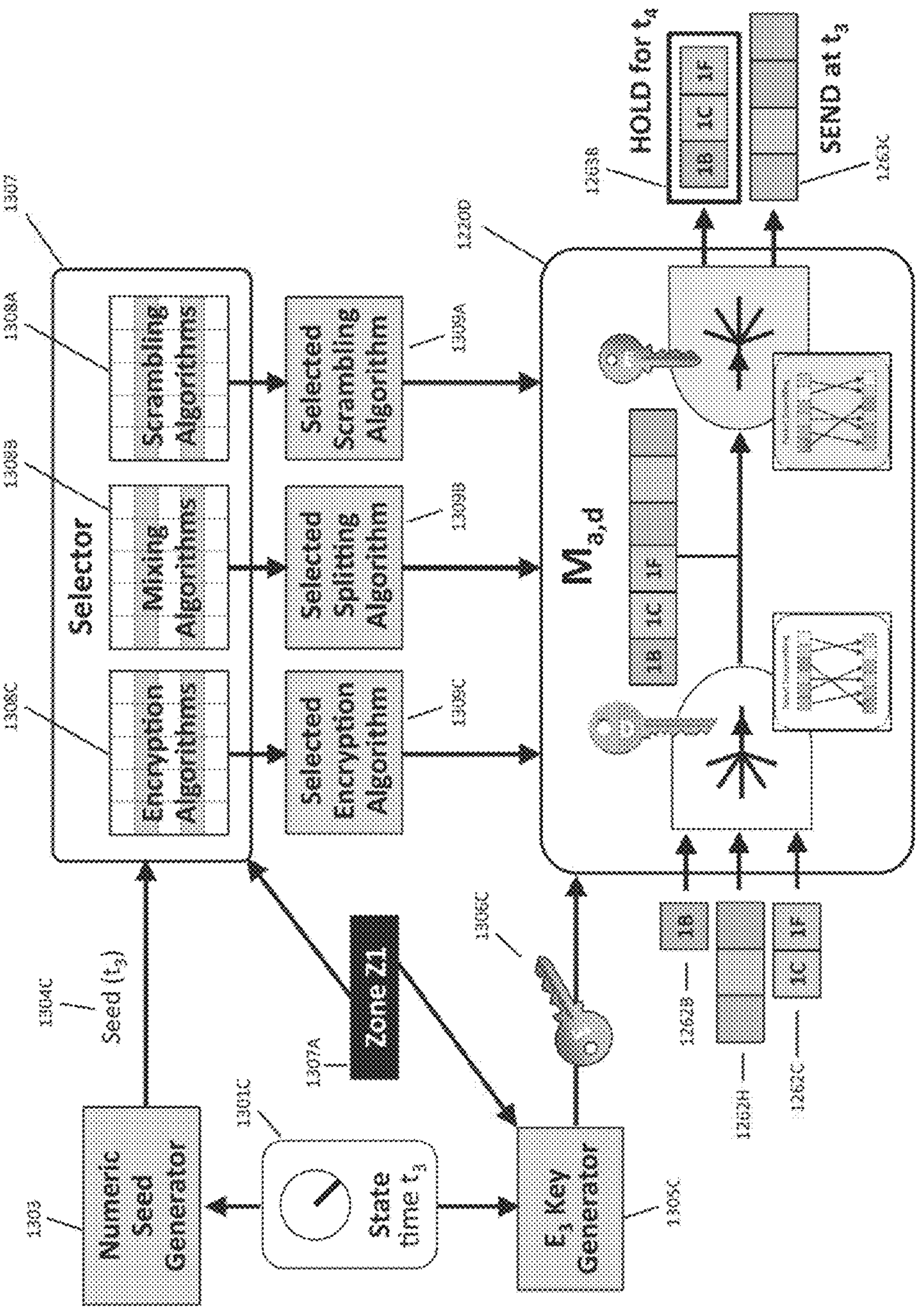

FIG. 92B is a schematic diagram showing control of outgoing SDNP packets from SDNP media node.

Figure 93:
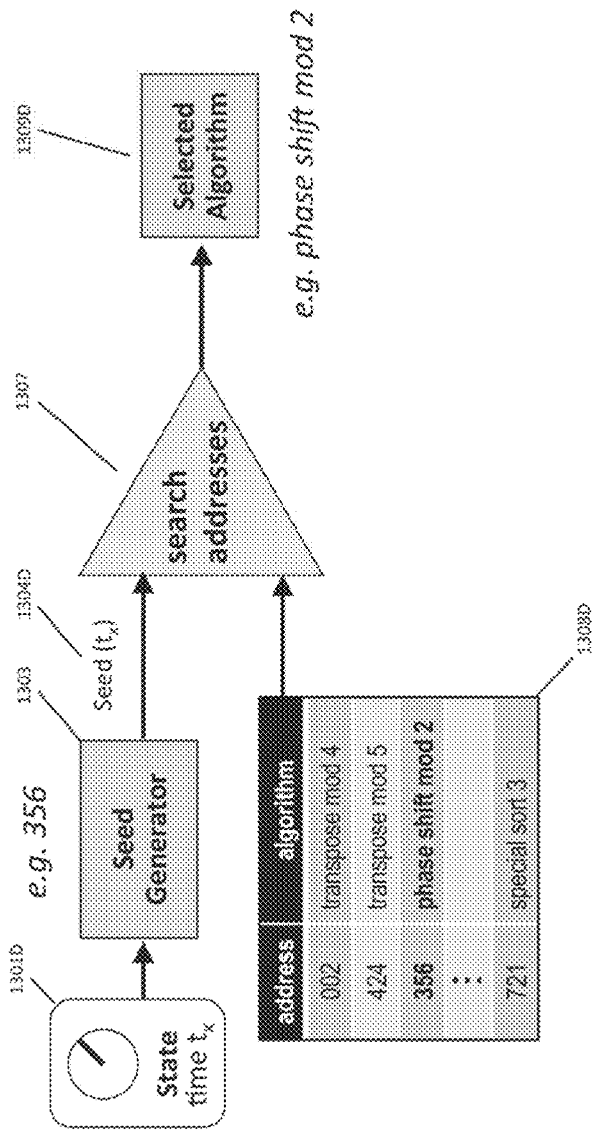

FIG. 93 is a schematic diagram showing SDNP algorithm selection.

Figure 94:
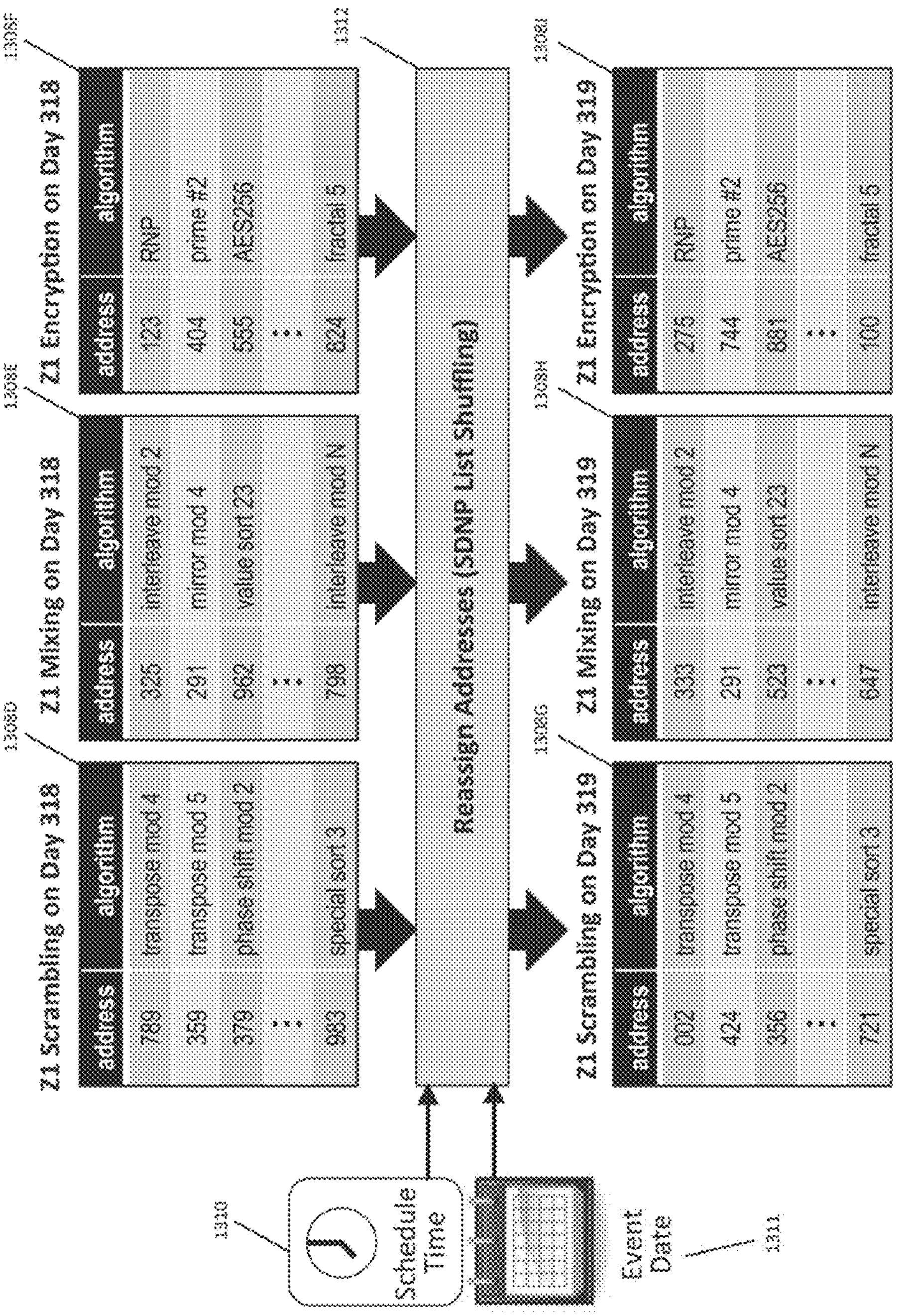

FIG. 94 is a schematic diagram showing regular SDNP algorithm shuffling.

Figure 95A:
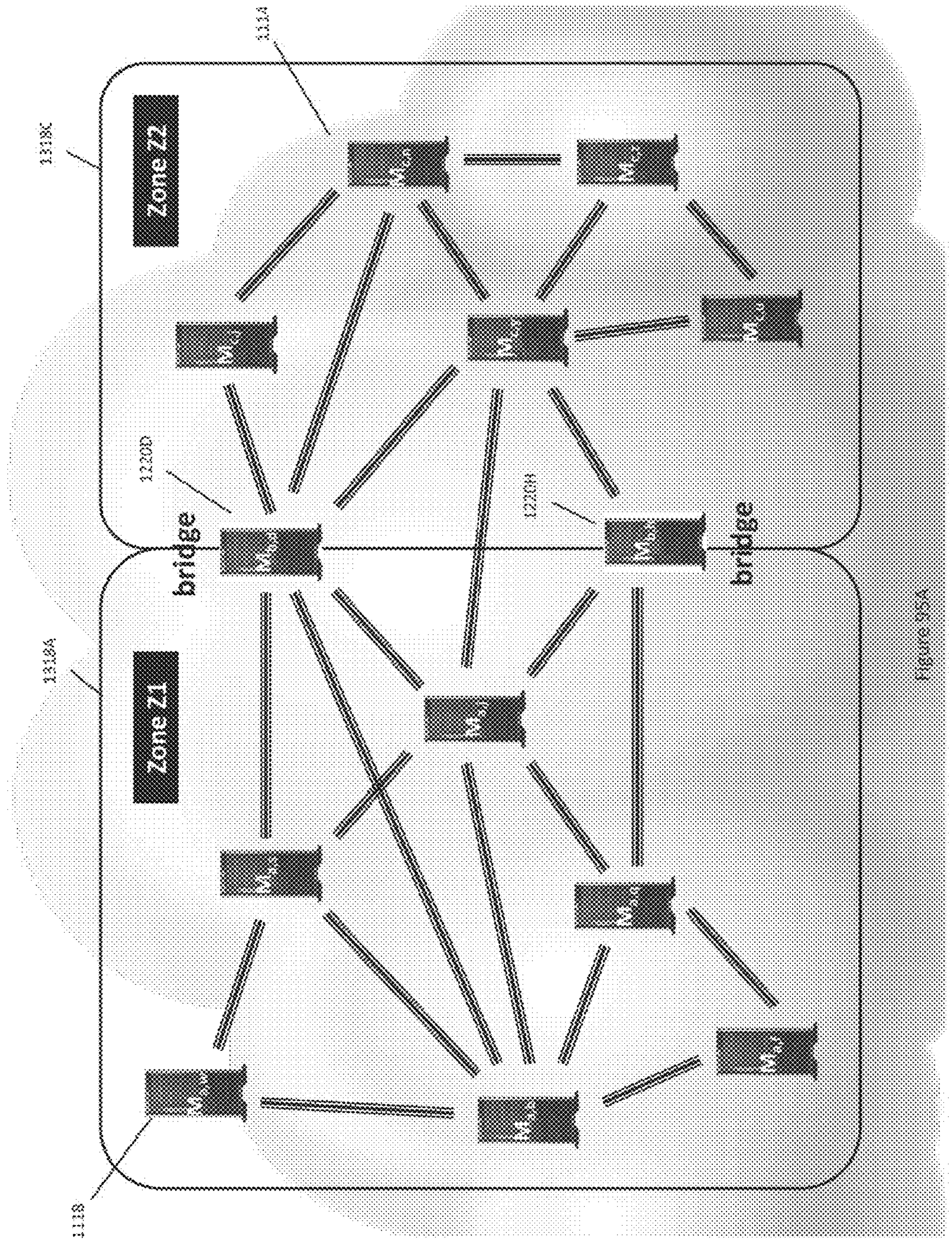

FIG. 95A is a schematic diagram showing a multi-zone SDNP cloud.

Figure 95B:
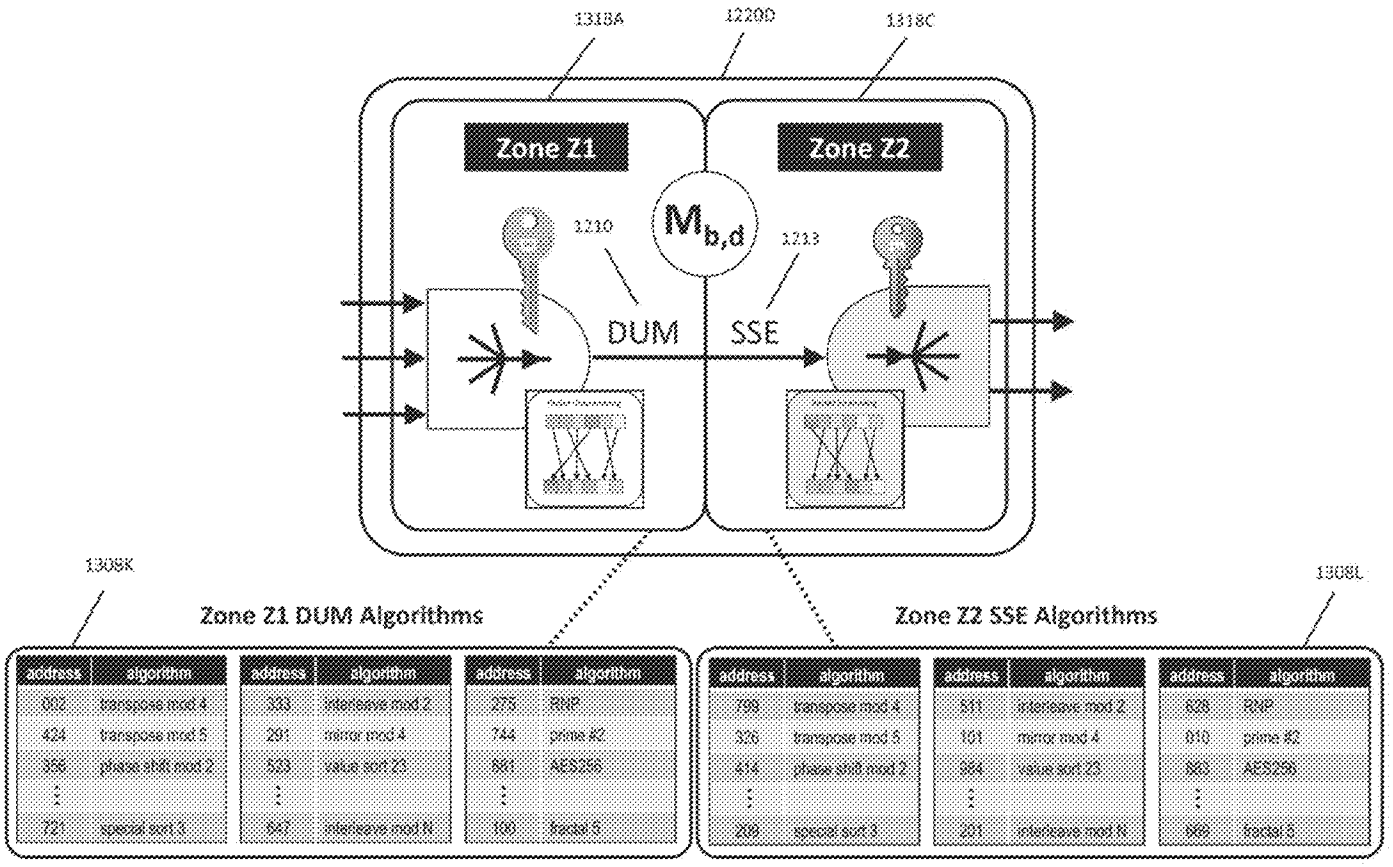

FIG. 95B is a schematic diagram showing SDNP multi-zone security management.

Figure 95C:
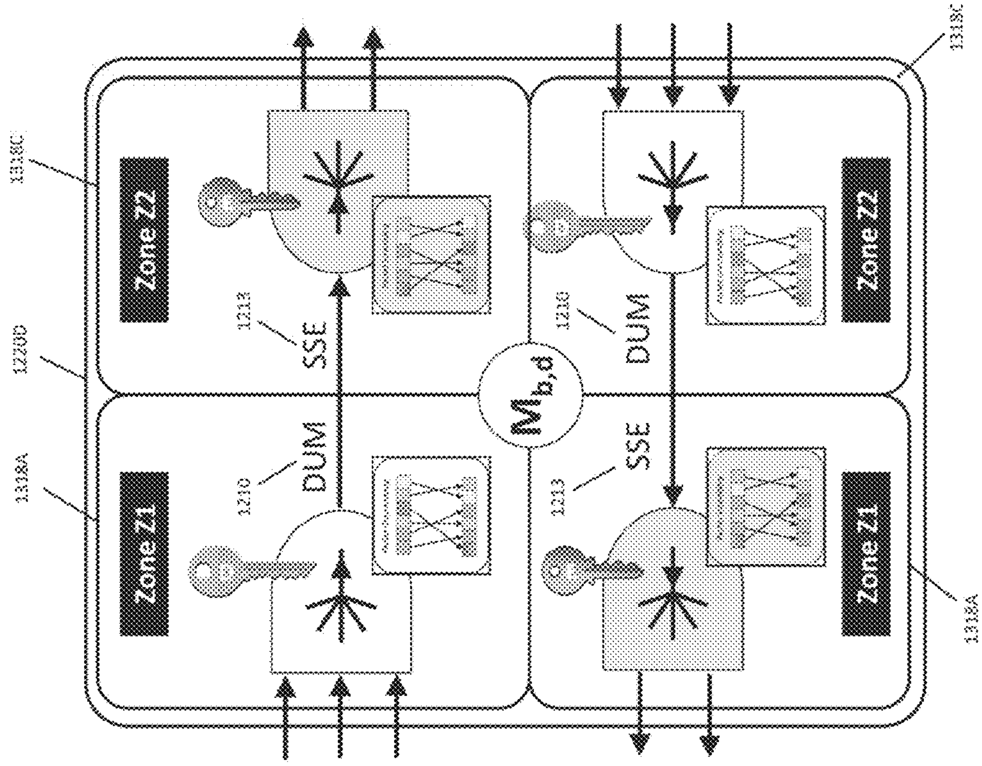

FIG. 95C is a schematic diagram showing multi-zone full-duplex SDNP bridge.

Figure 95D:
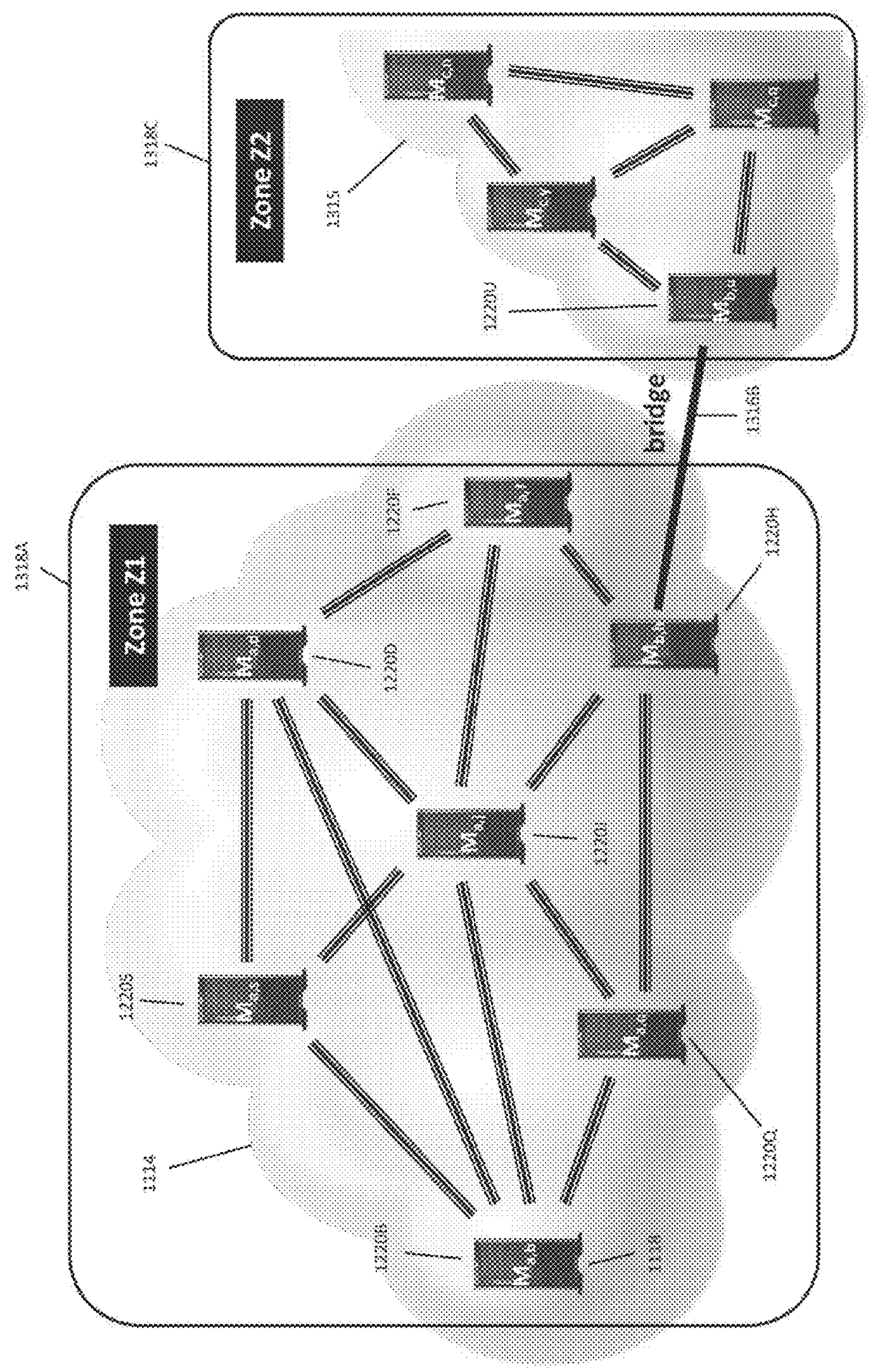

FIG. 95D is a schematic diagram showing a multi-zone SDNP network comprising multiple clouds.

Figure 95E:
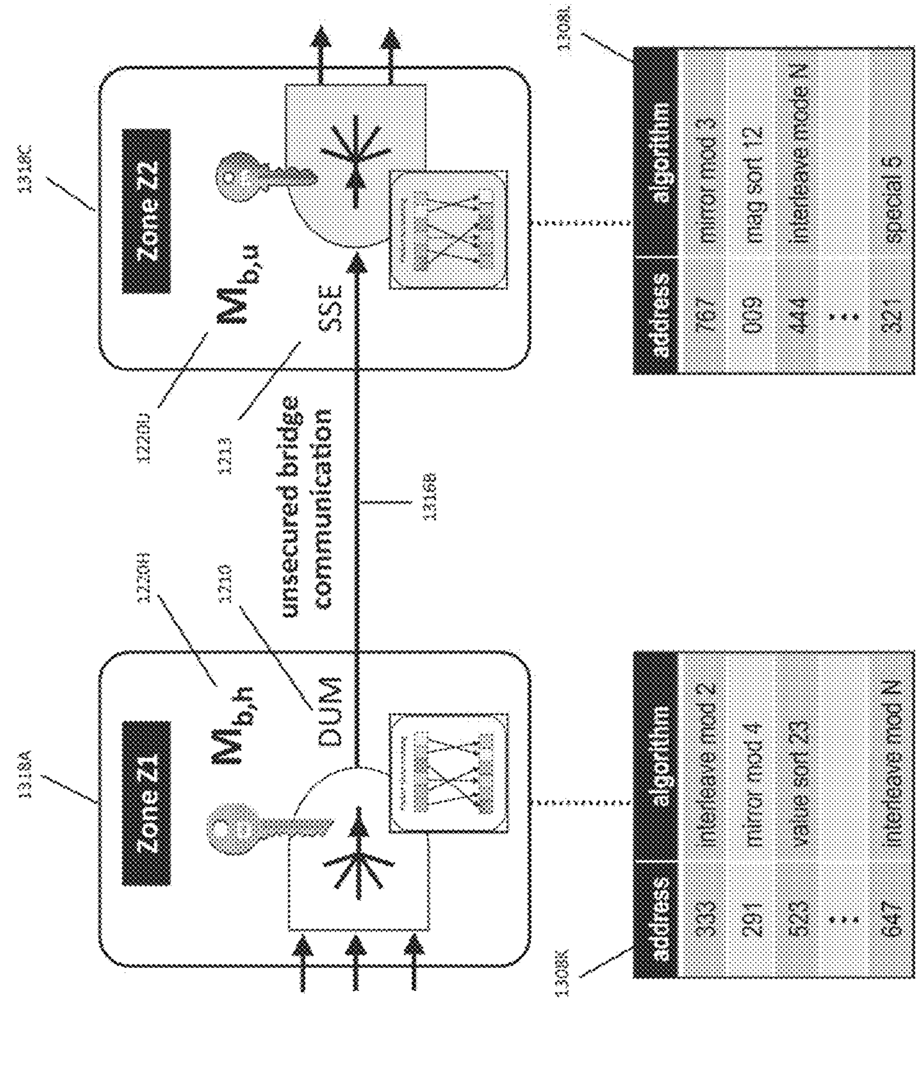

FIG. 95E is a schematic diagram depicting an unsecured link between SDNP clouds.

Figure 95F:
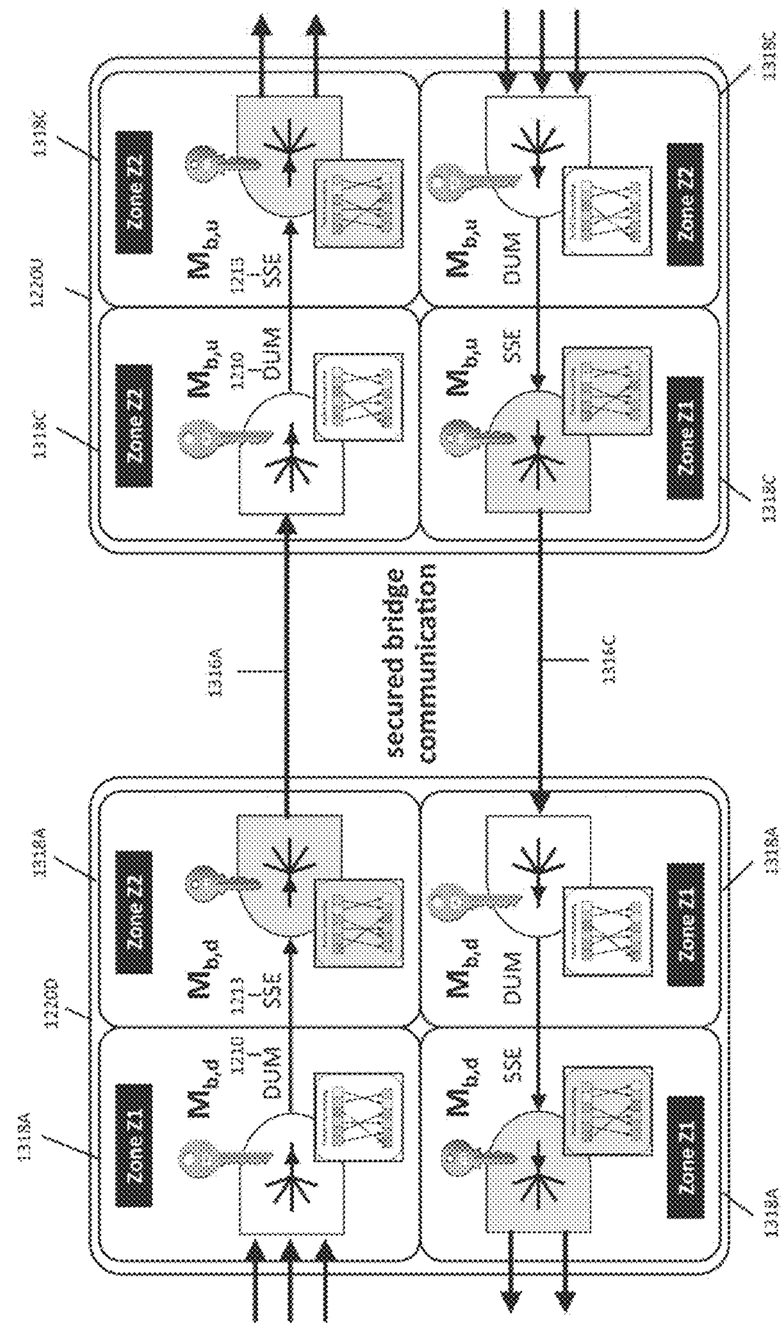
Figure 95A:
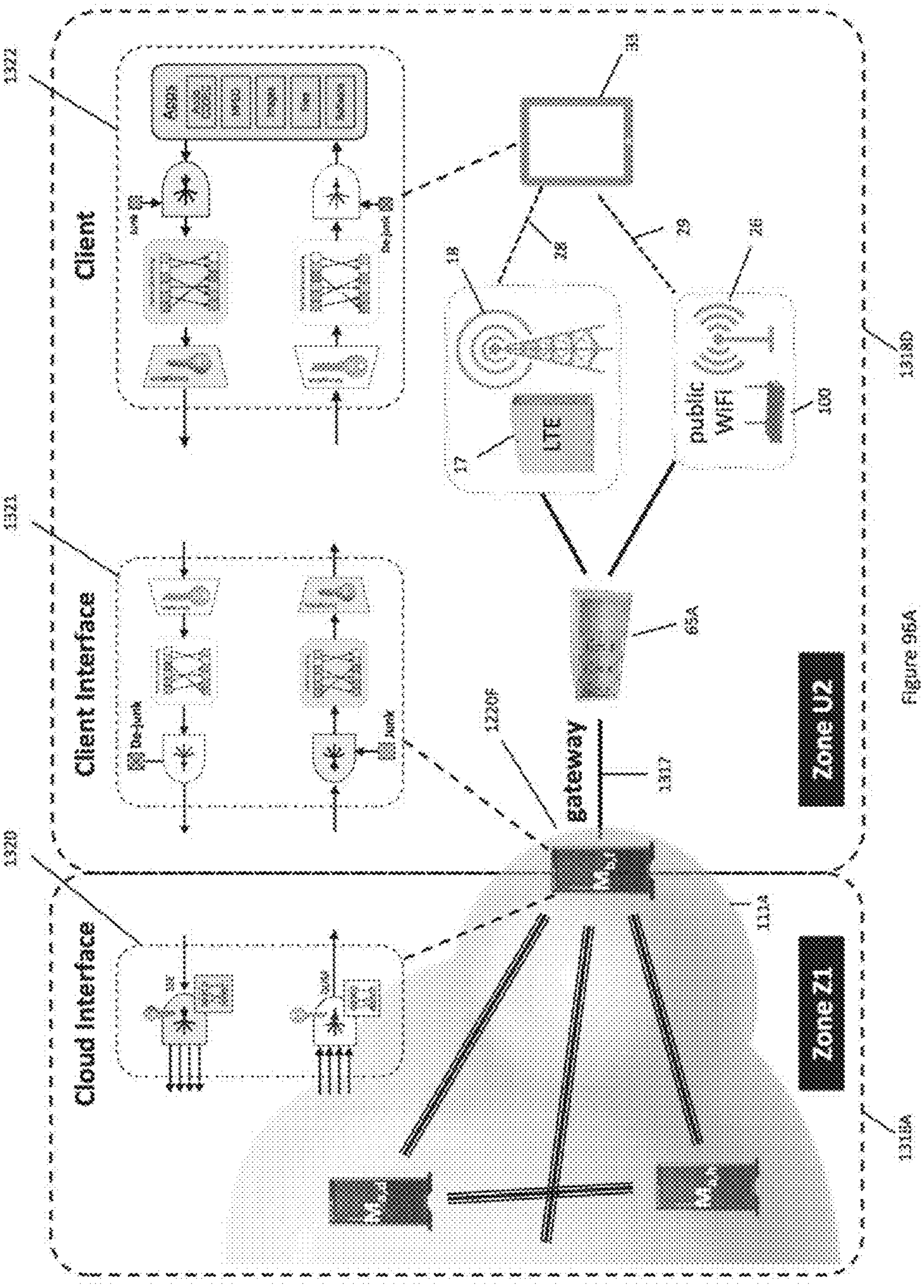
Figure 95B:
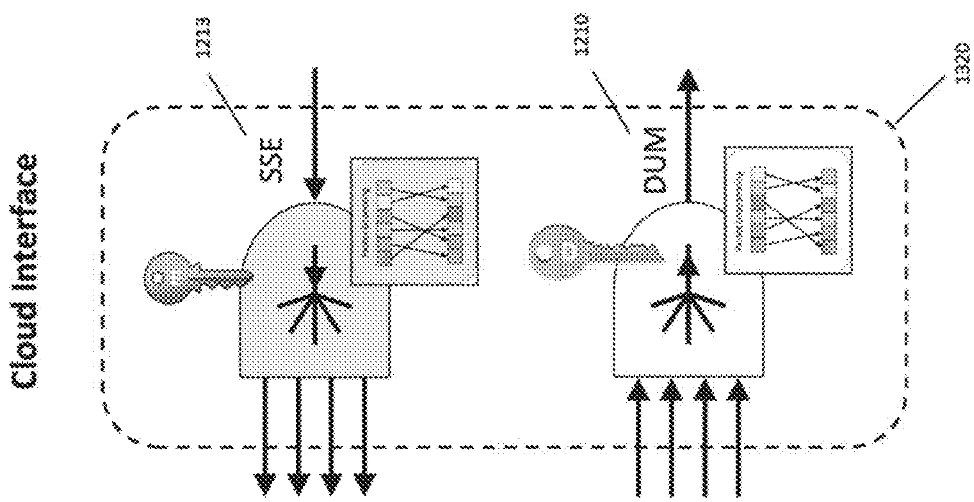

FIG. 95F is a schematic diagram showing the use of multi-zone full-duplex SDNP bridges for secure cloud-to-cloud links.

FIG. 96A is a schematic diagram showing a secure SDNP gateway and last-mile link to tablet client.

FIG. 96B is a schematic diagram showing the cloud interface functions.

Figure 96C:
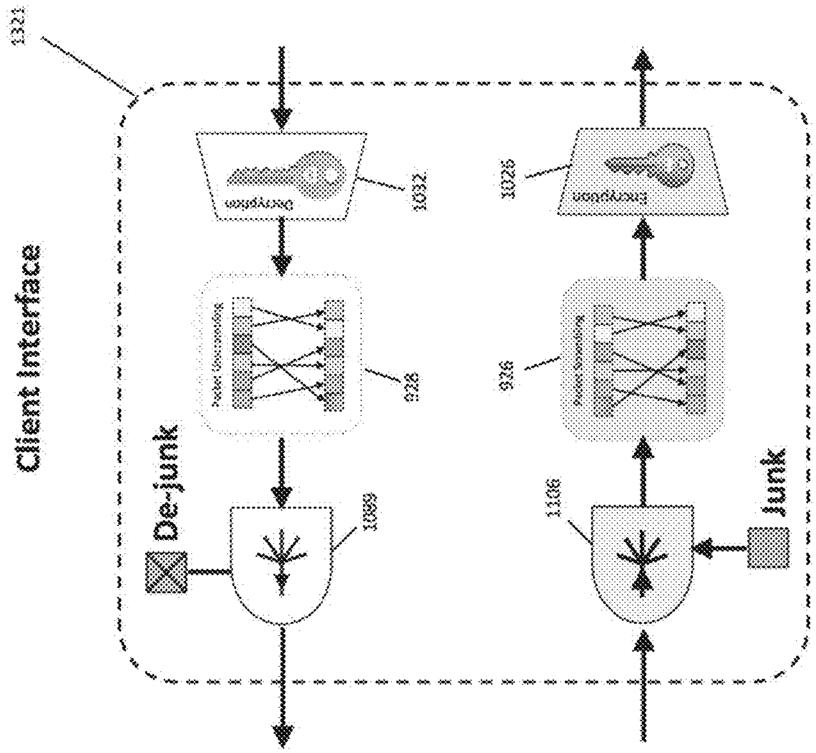

FIG. 96C is a schematic diagram showing the client interface functions.

Figure 96D:
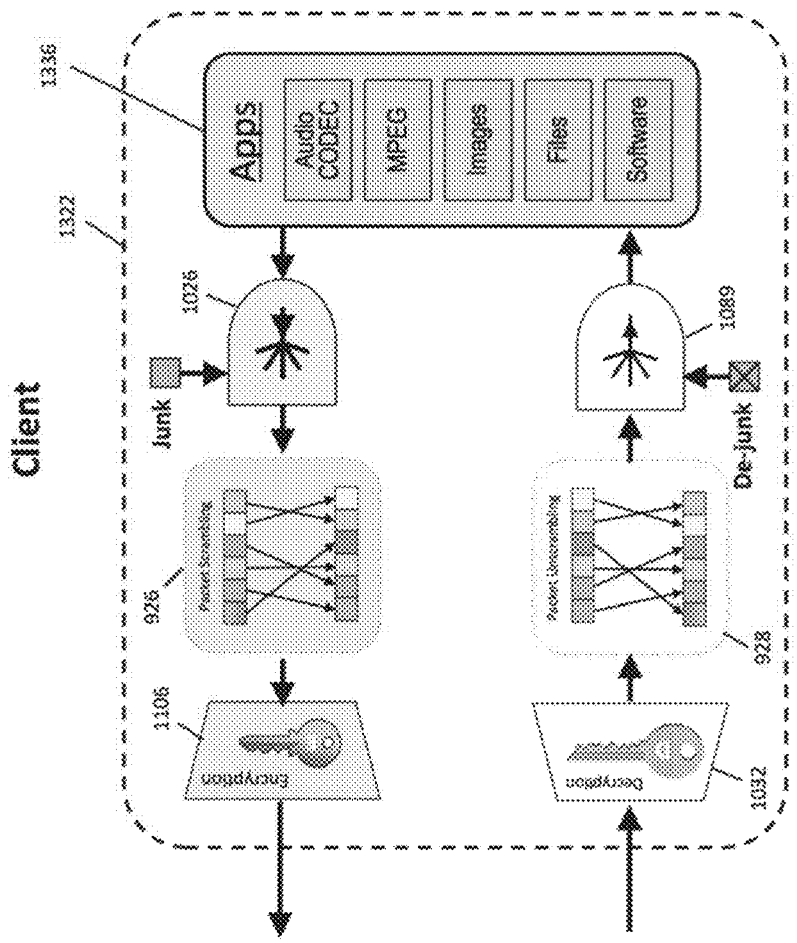

FIG. 96D is a schematic diagram showing the client functions.

Figure 97A:
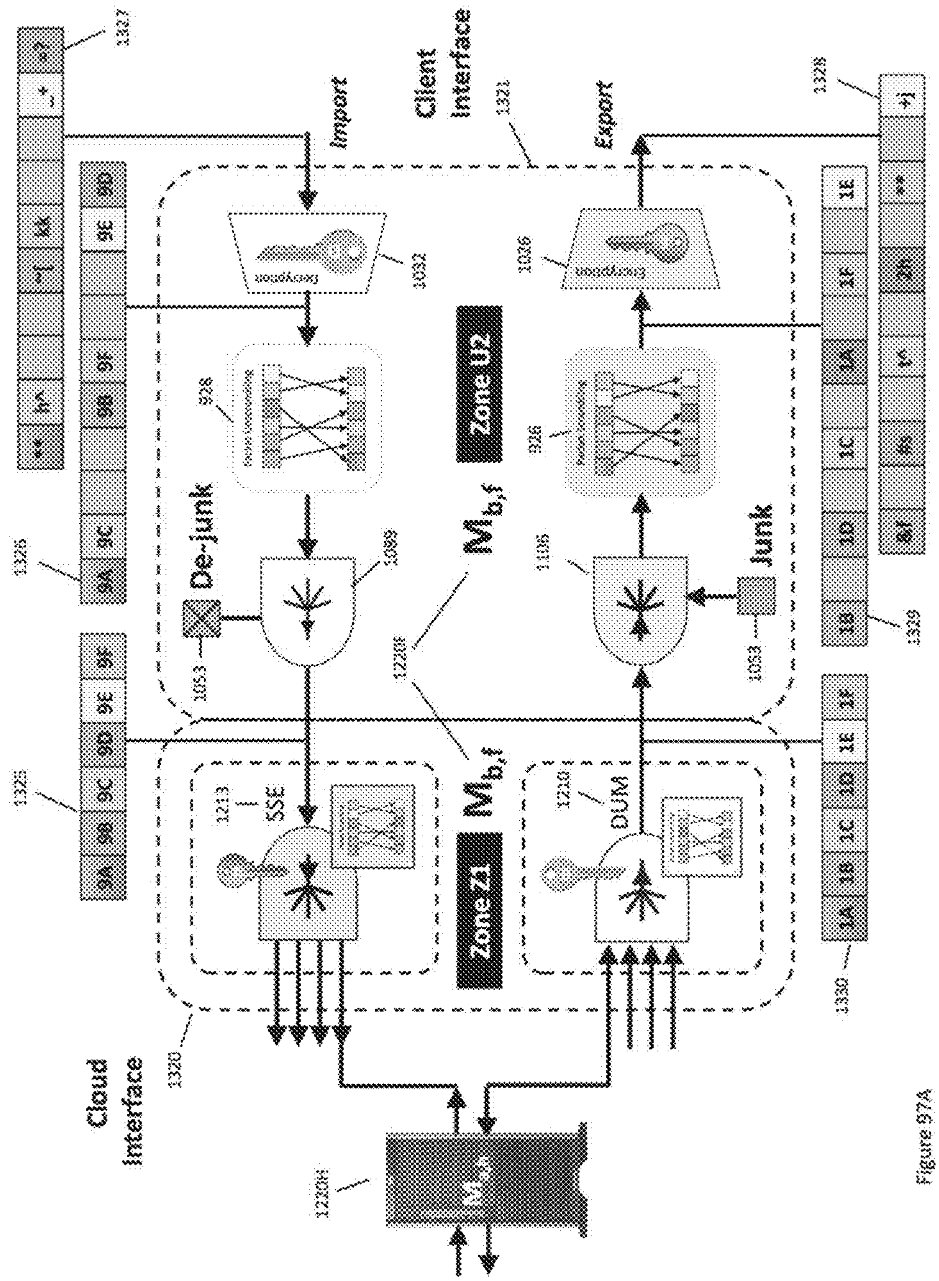

FIG. 97A is a schematic diagram showing functional elements of a secure SDNP cloud gateway.

Figure 97B:
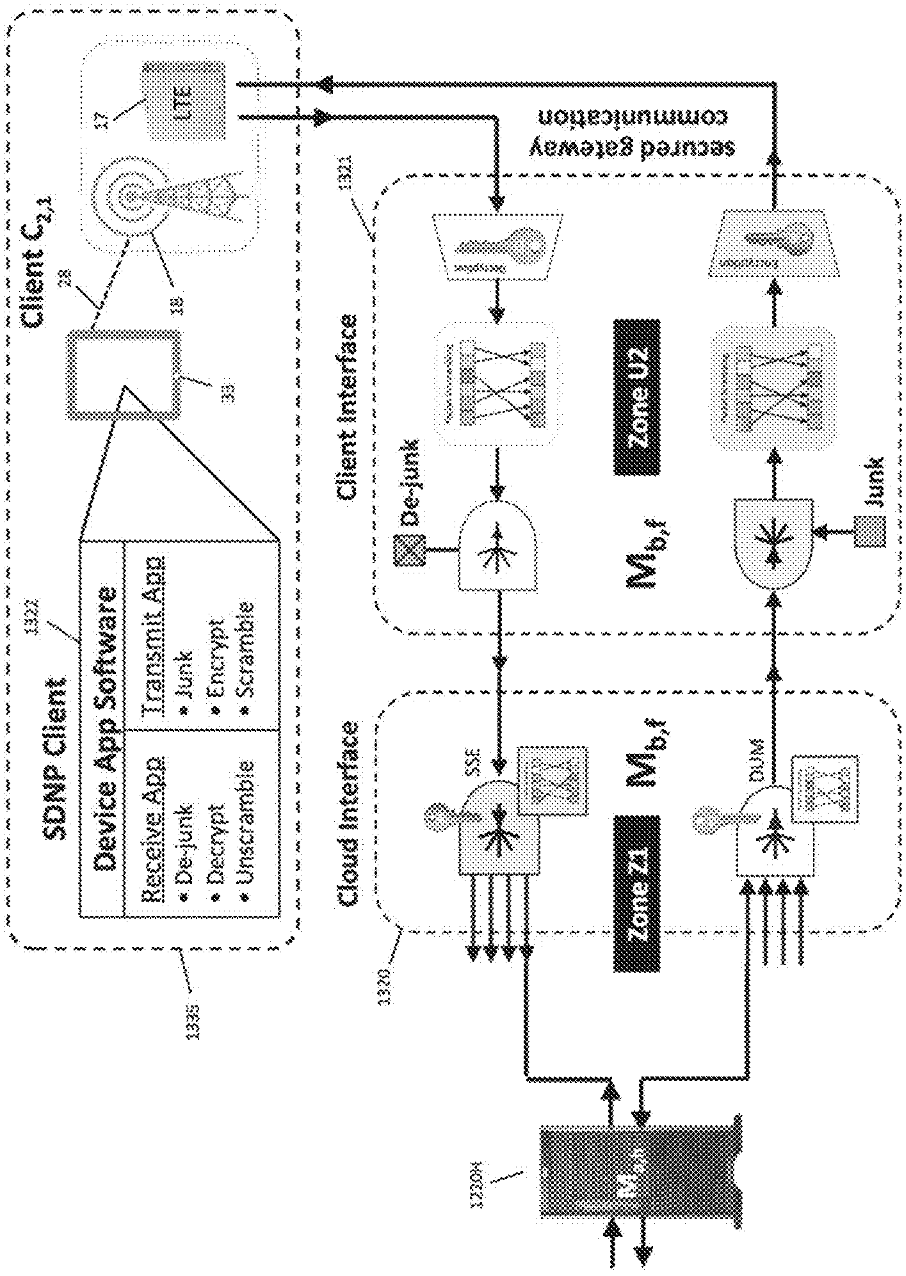

FIG. 97B is a schematic diagram showing interconnection of functional elements in a secure SDNP cloud gateway.

Figure 98:
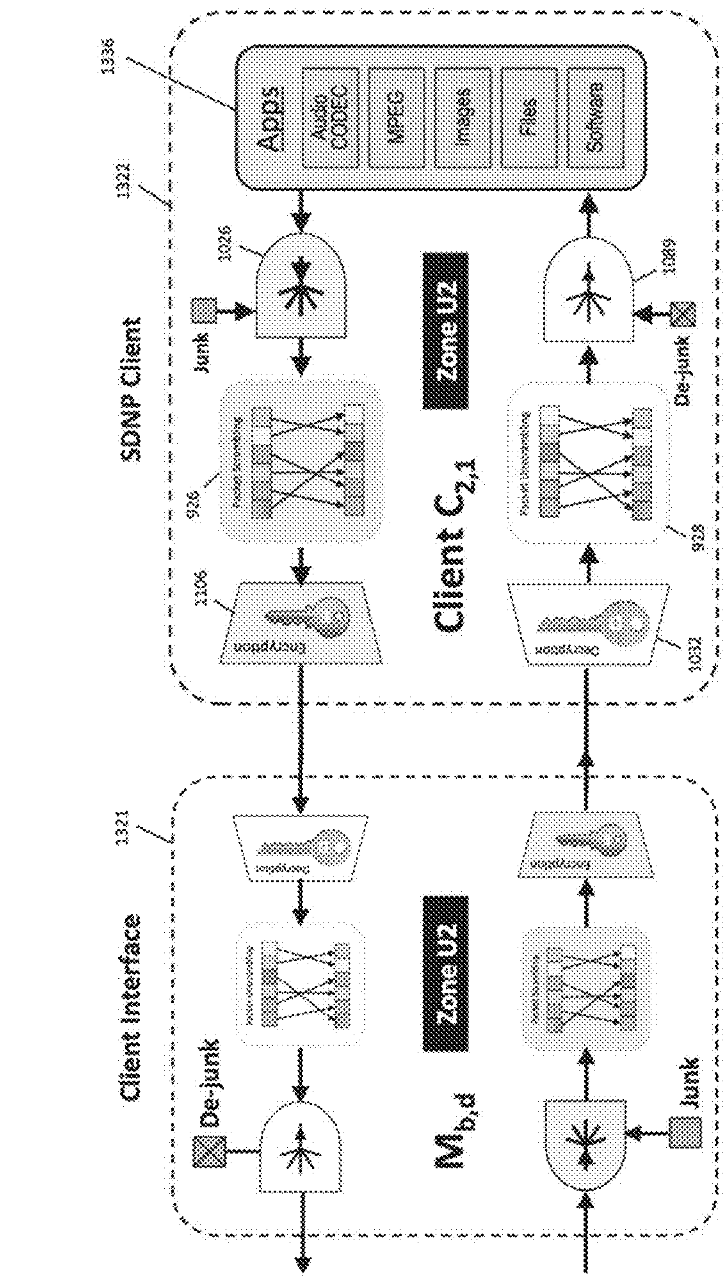

FIG. 98 is a schematic diagram showing the client interface in a secure SDNP cloud gateway.

Figure 99A:
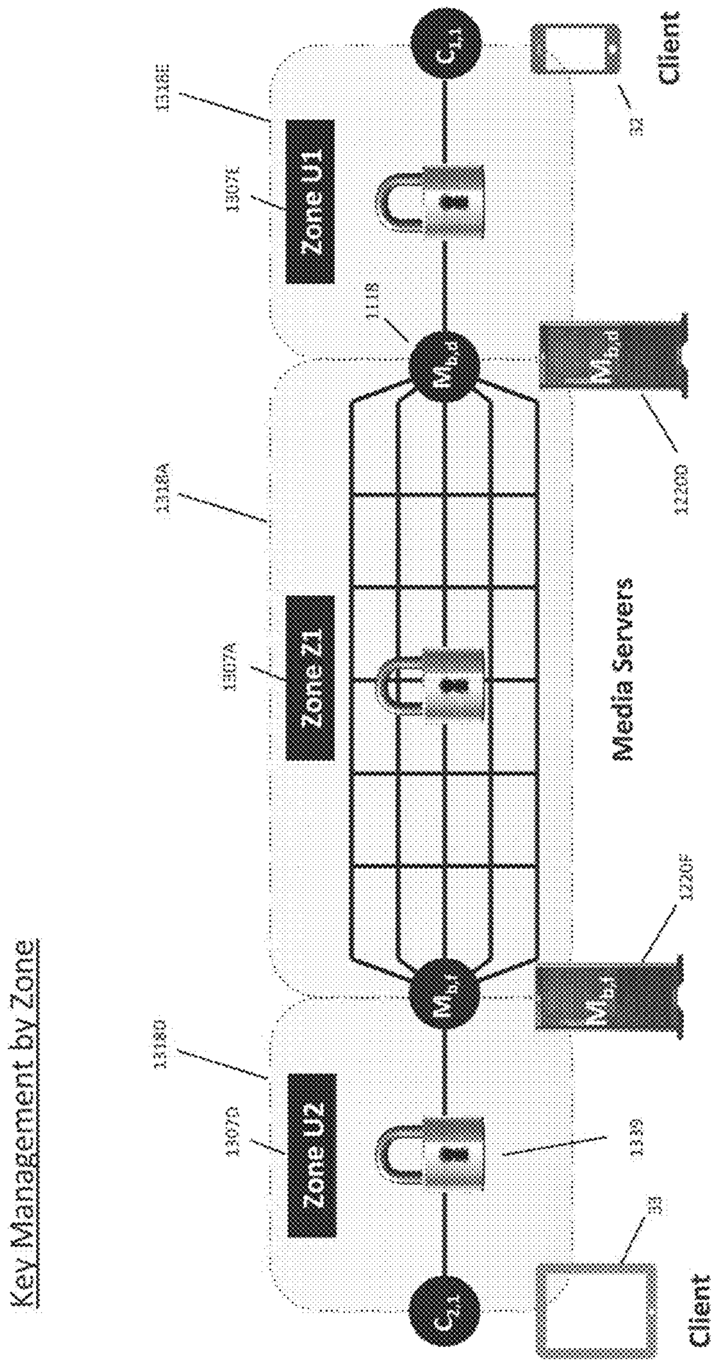

FIG. 99A is a schematic diagram showing key management in multi-zone transport.

Figure 99B:
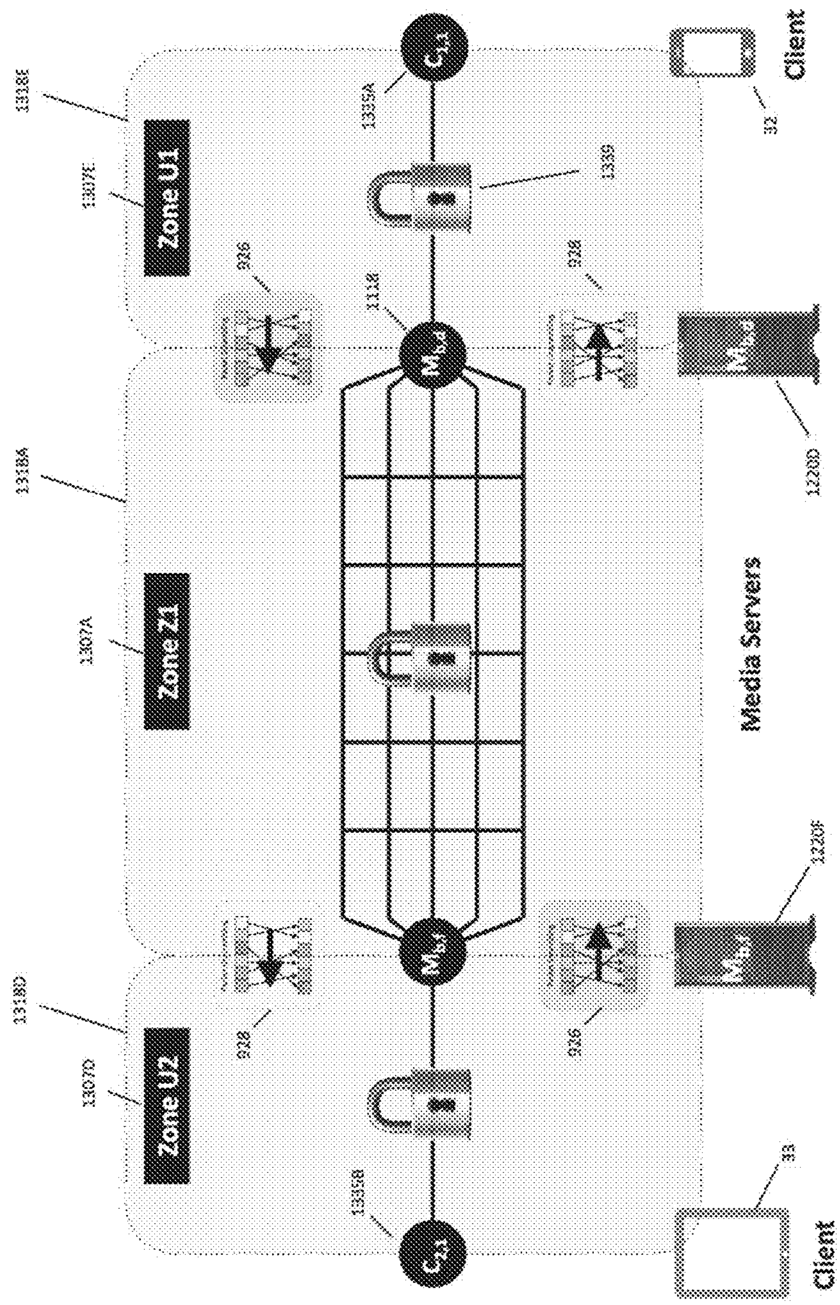

FIG. 99B is a schematic diagram showing key management in multi-zone transport with scrambled SDNP cloud transport.

Figure 99C:
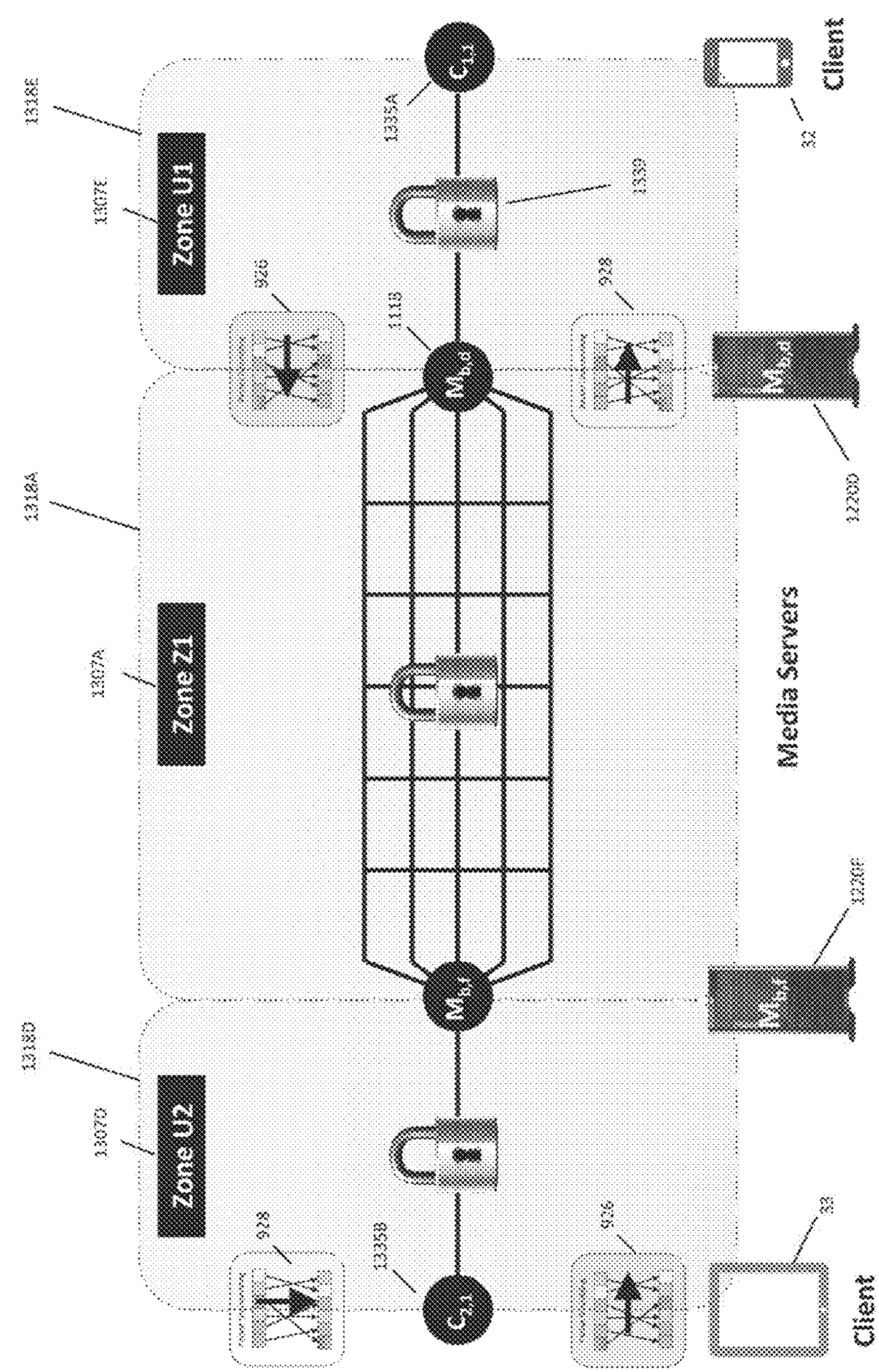

FIG. 99C is a schematic diagram showing key management in multi-zone transport with scrambled transport for SDNP and single last-mile route.

Figure 99D:
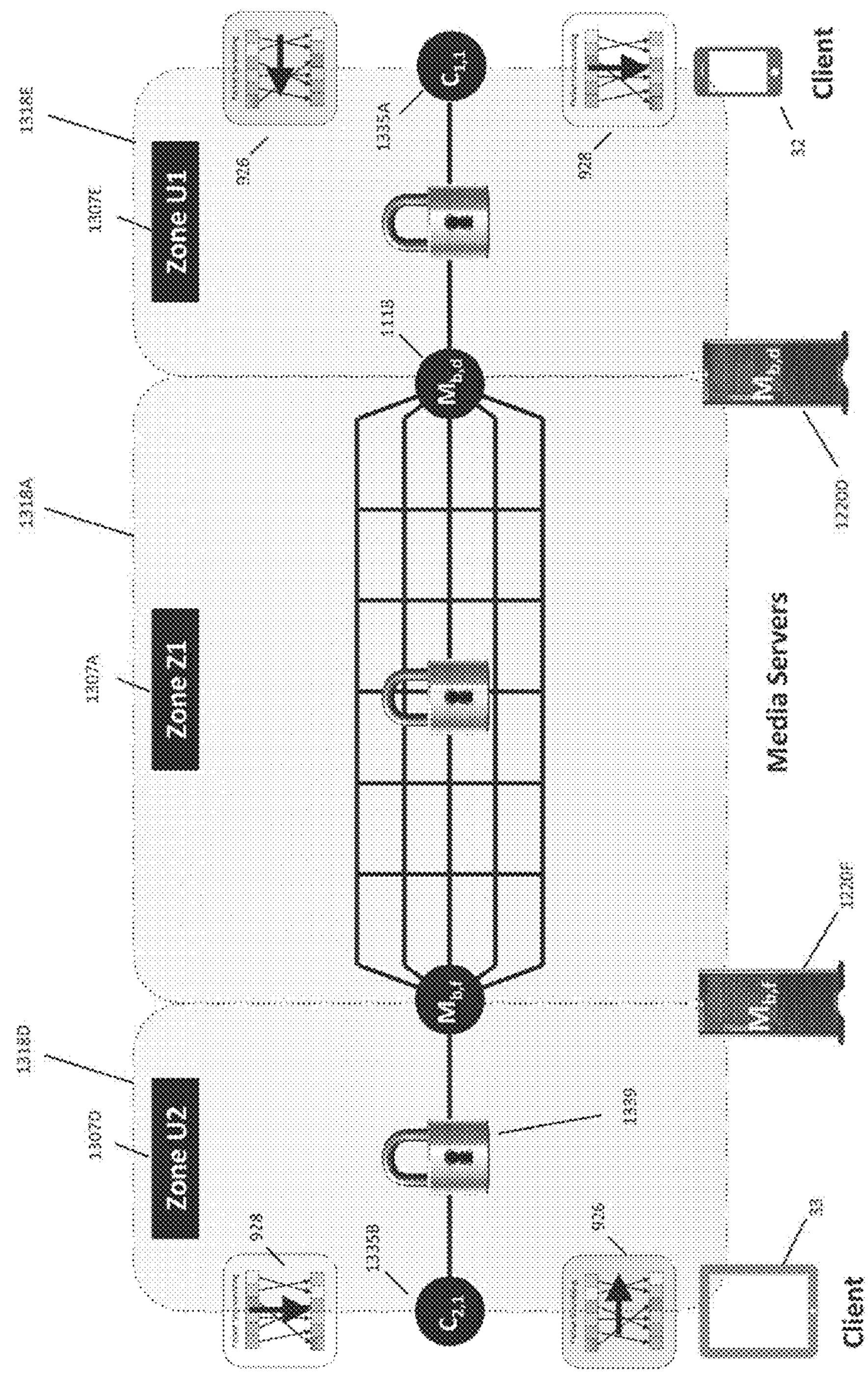

FIG. 99D is a schematic diagram showing key management in multi-zone transport with end-to-end scrambling.

Figure 99E:
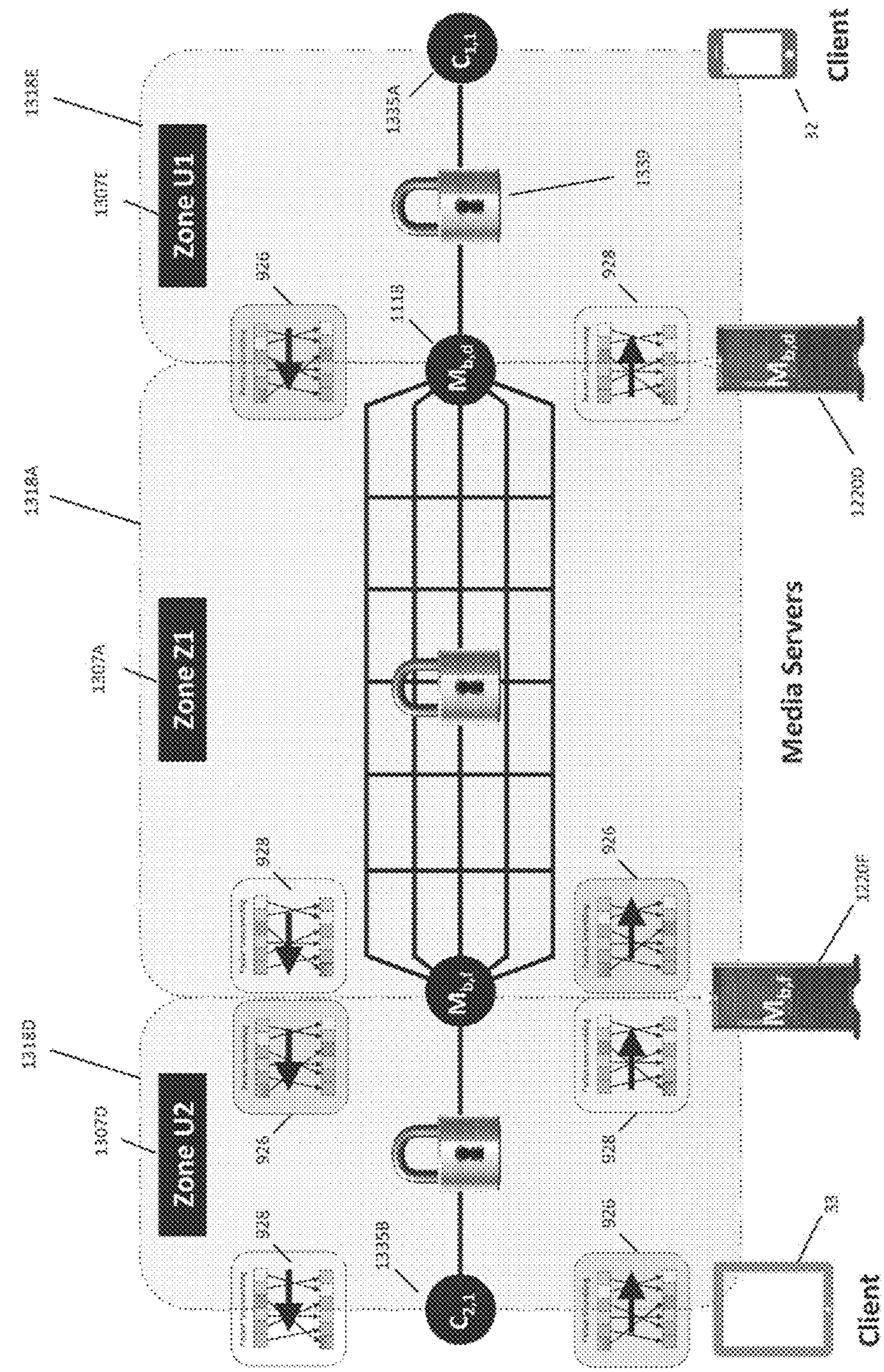

FIG. 99E is a schematic diagram showing key management in multi-zone transport with scrambled transport for SDNP and single re-scrambled last-mile route.

Figure 99F:
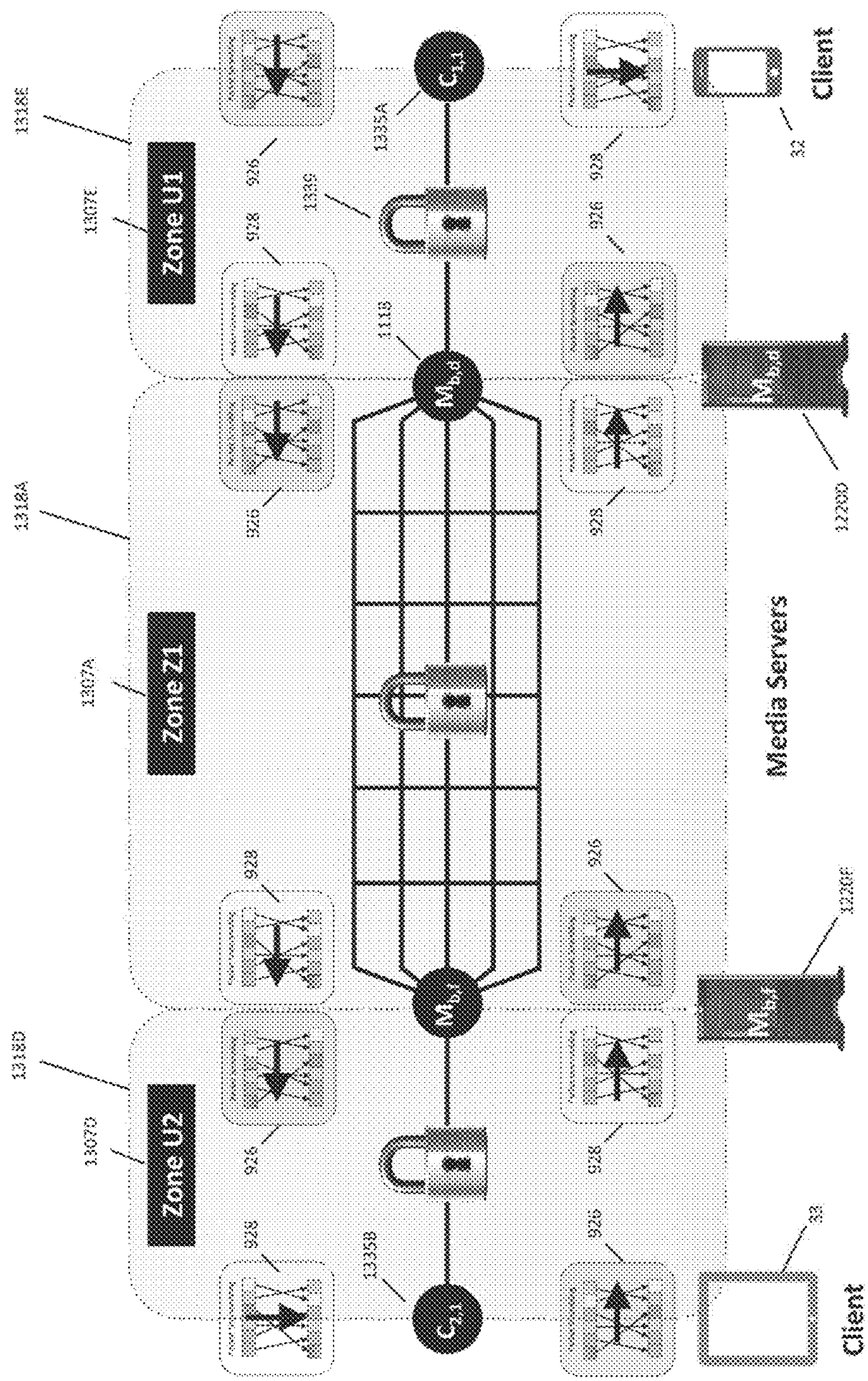

FIG. 99F is a schematic diagram showing key management in multi-zone transport with zone specific re-scrambling.

Figure 100A:
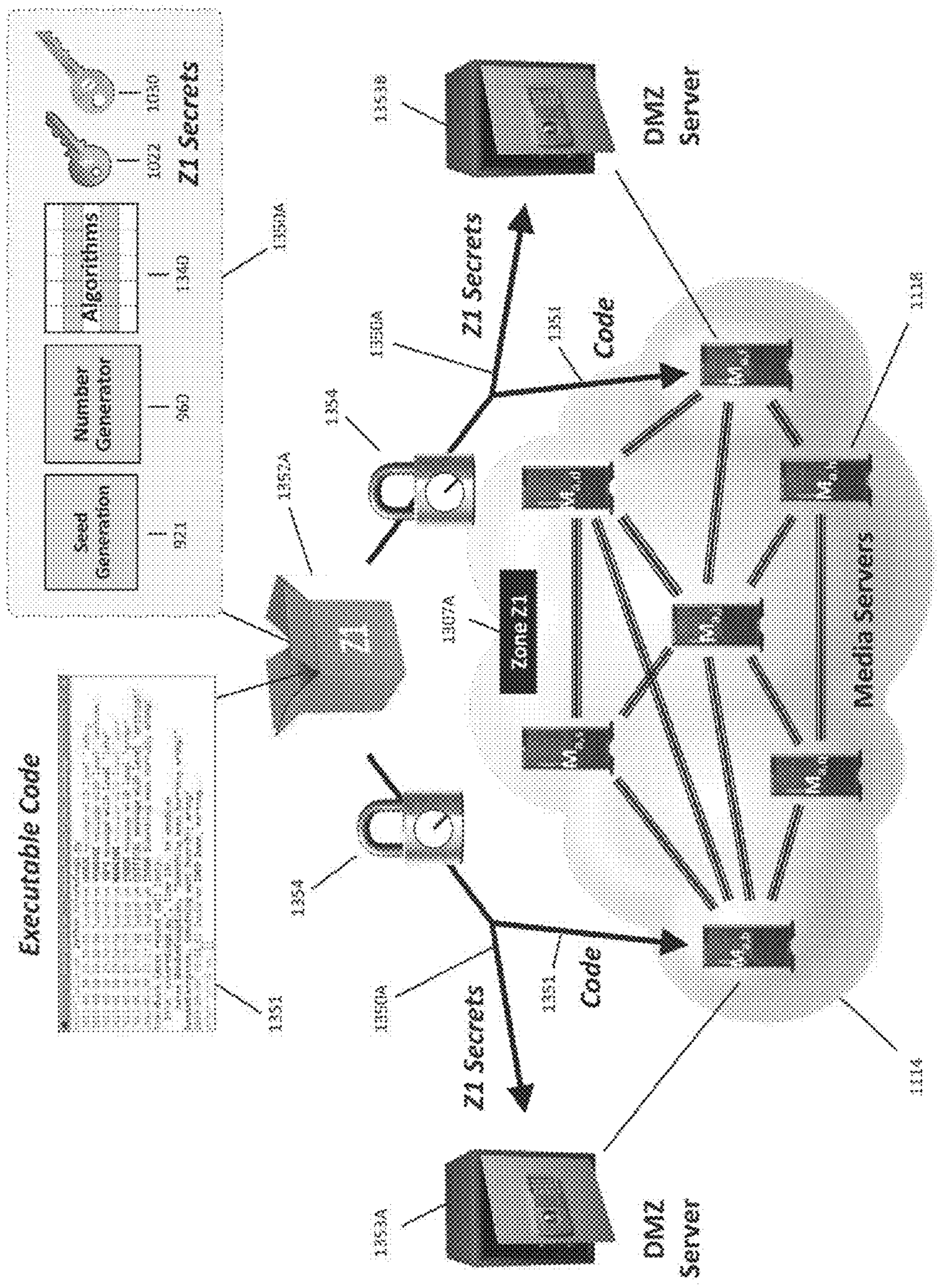

FIG. 100A is a schematic diagram showing SDNP code delivery and installation.

Figure 100B:
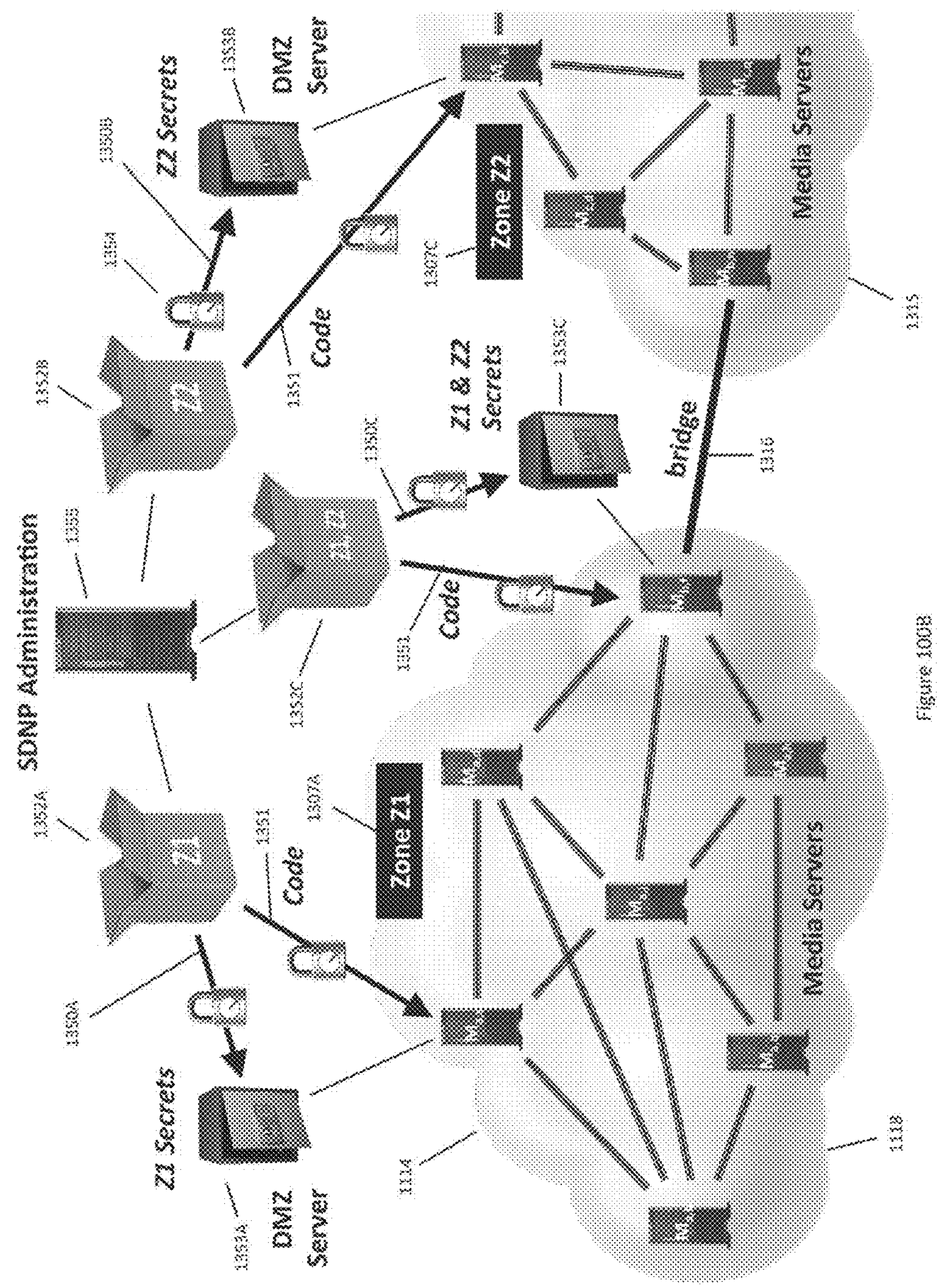

FIG. 100B is a schematic diagram showing SDNP code delivery and multi-zone installation.

Figure 101A:
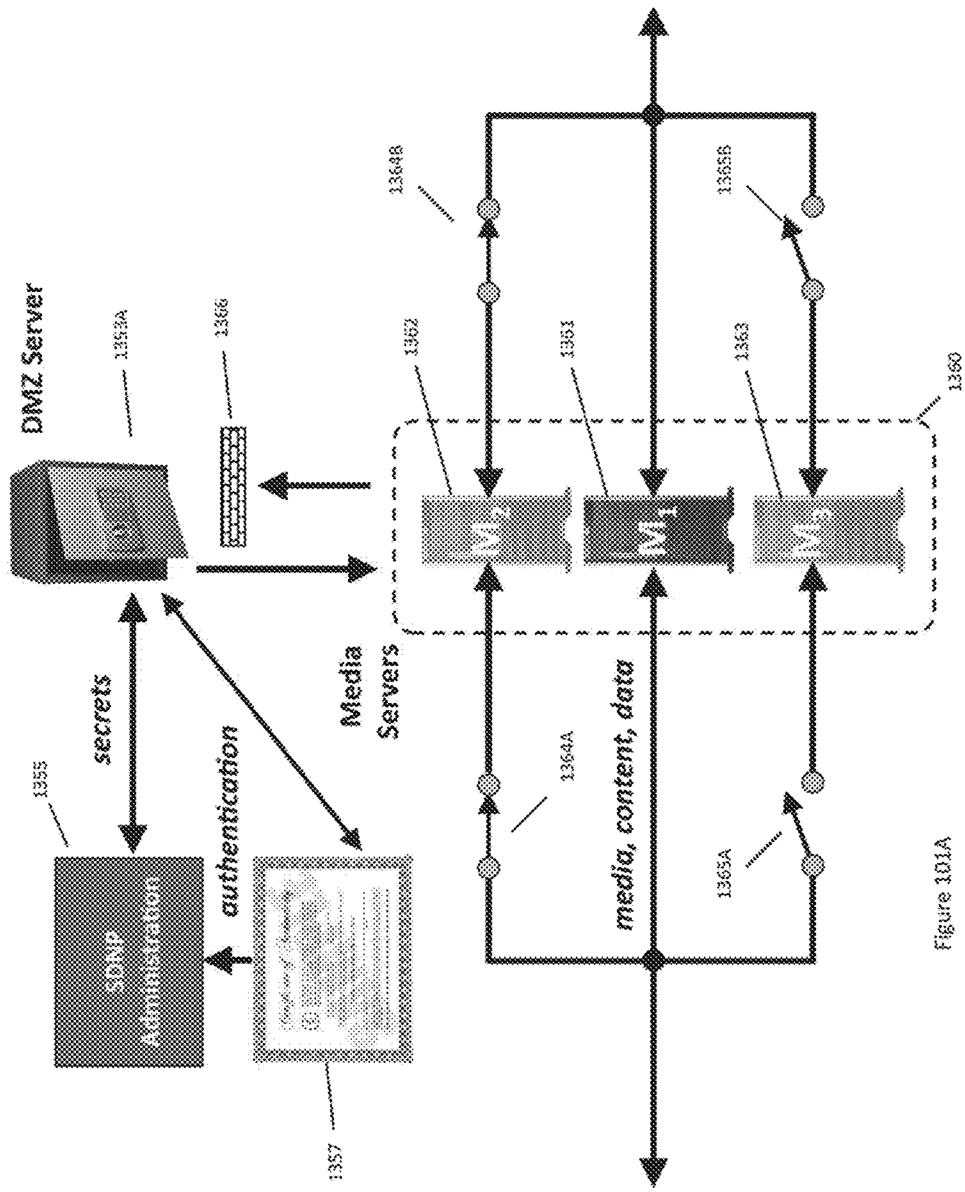

FIG. 101A is a schematic diagram showing delivery of SDNP secrets to a DMZ server.

Figure 101B:
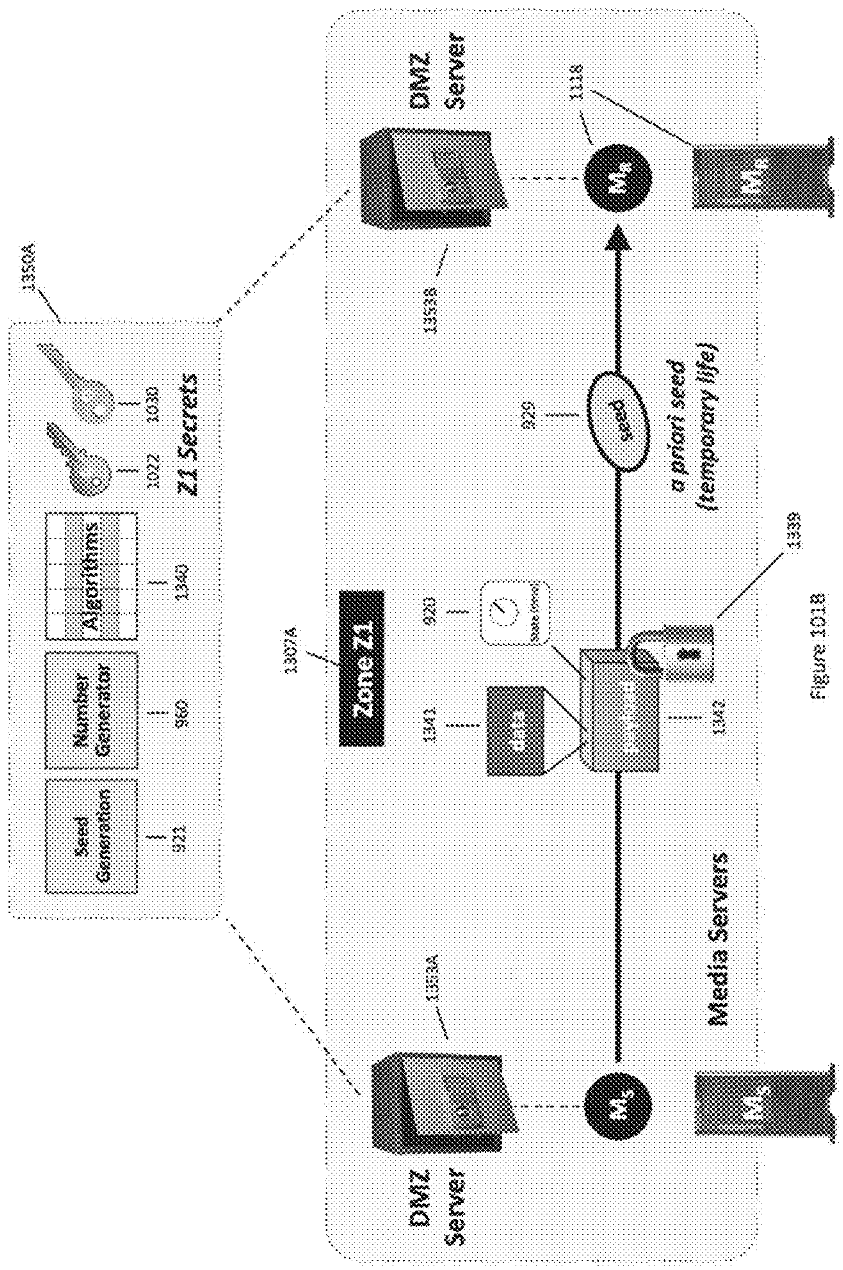

FIG. 101B is a schematic diagram showing secret-based media channel communication.

Figure 101C:
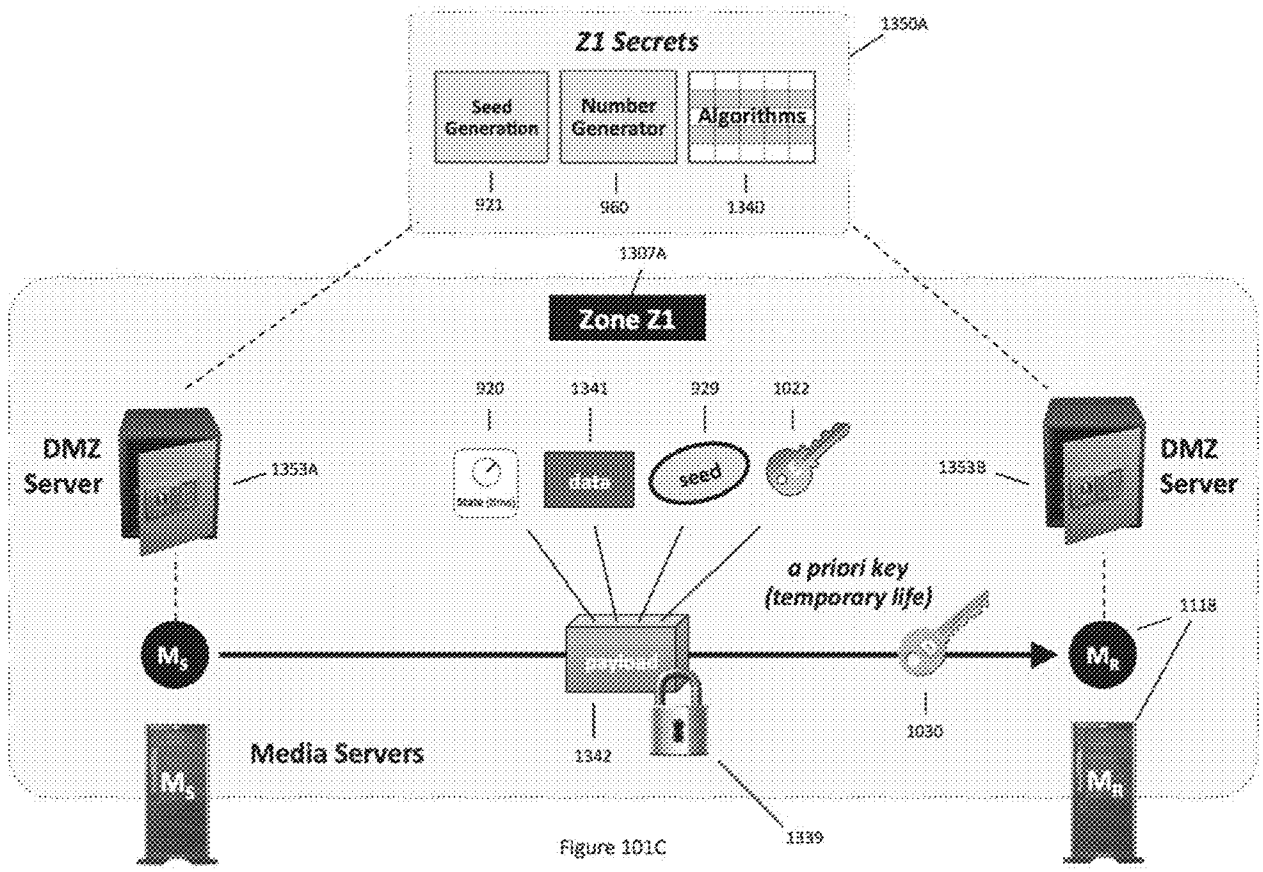

FIG. 101C is a schematic diagram showing secret and key delivery by SDNP media channel.

Figure 102:
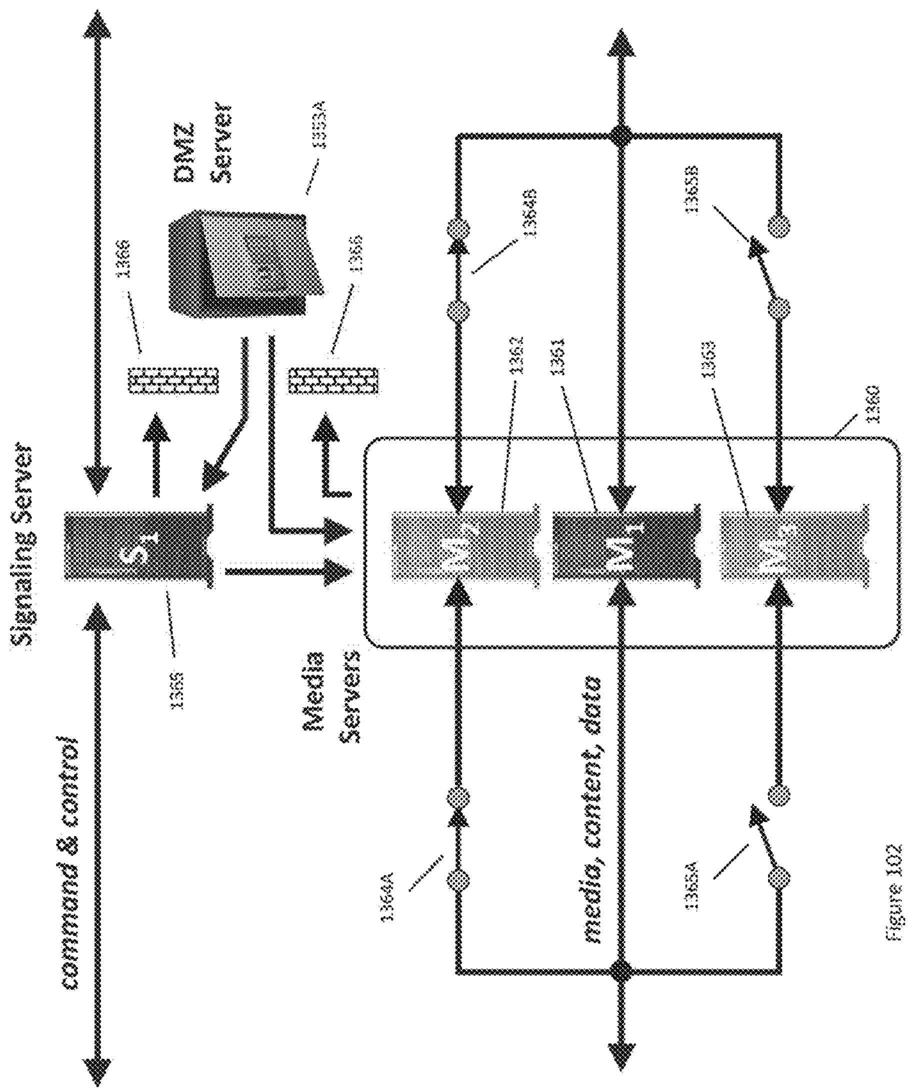

FIG. 102 is a schematic diagram showing dynamic SDNP control through an SDNP signaling server.

Figure 103A:
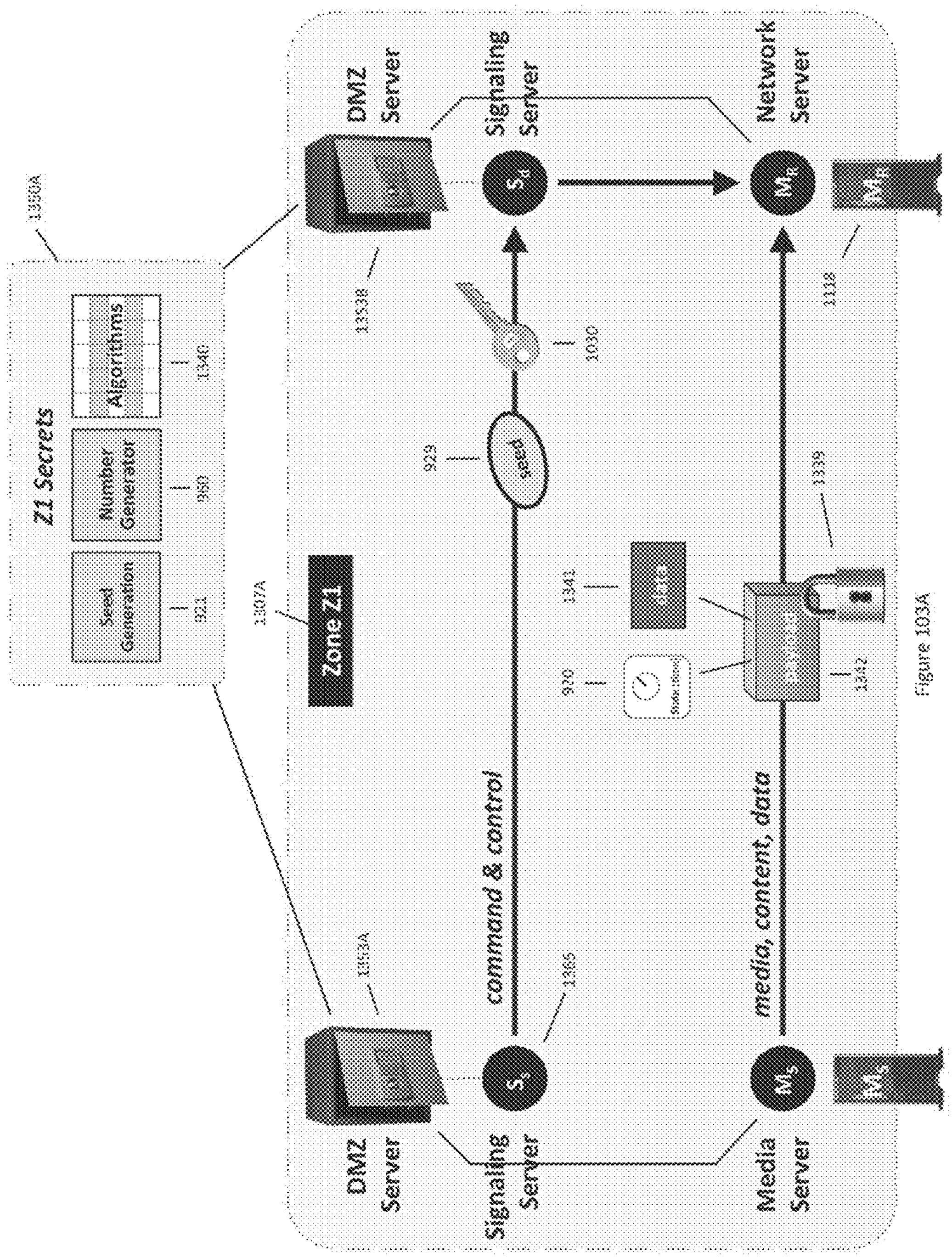

FIG. 103A is a schematic diagram showing SDNP key and seed delivery through an SDNP signaling server.

Figure 103B:
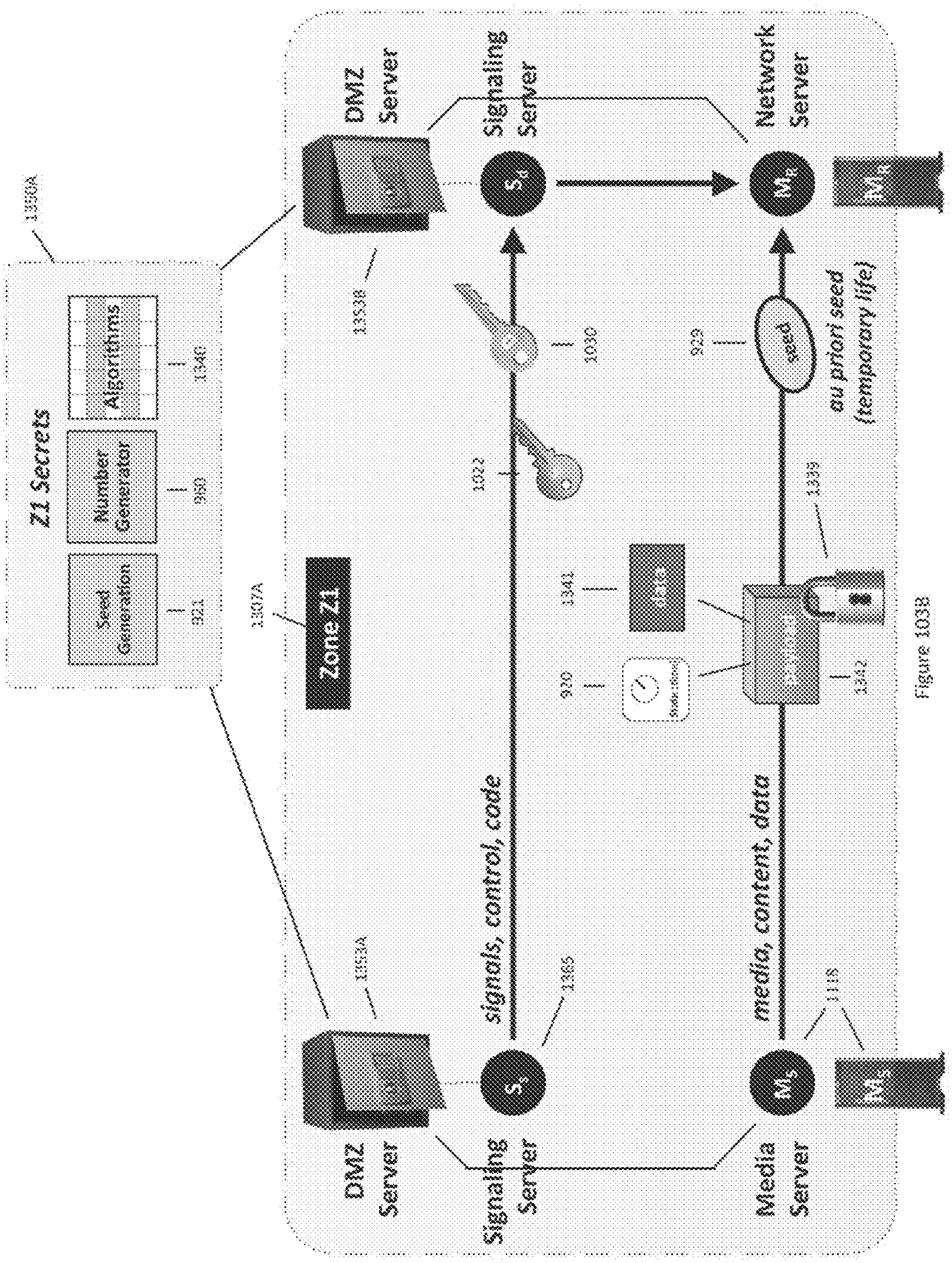

FIG. 103B is a schematic diagram showing an alternate embodiment of SDNP key and seed delivery through an SDNP signaling server.

Figure 104:
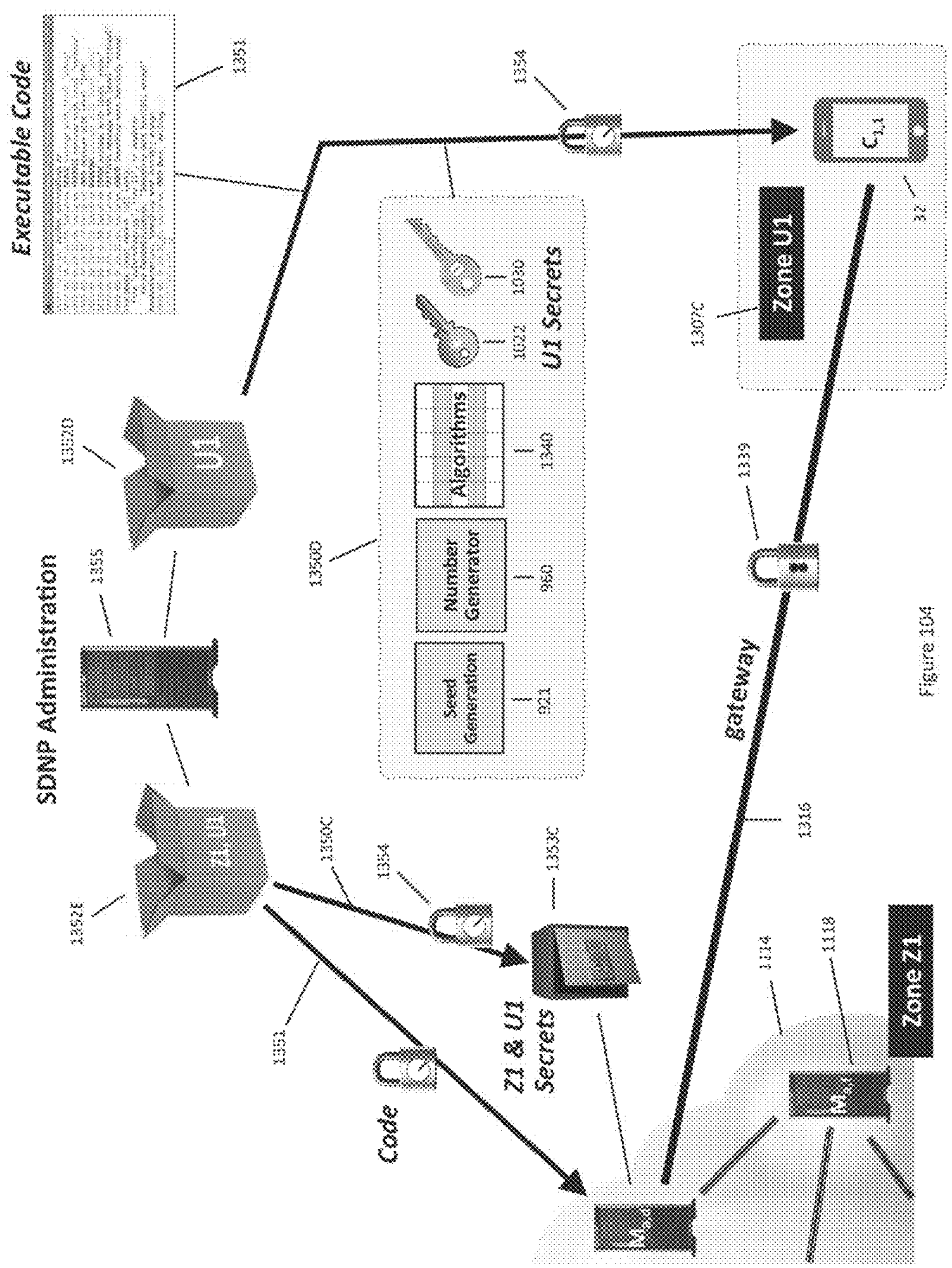

FIG. 104 is a schematic diagram showing SDNP delivery to a client.

Figure 105A:
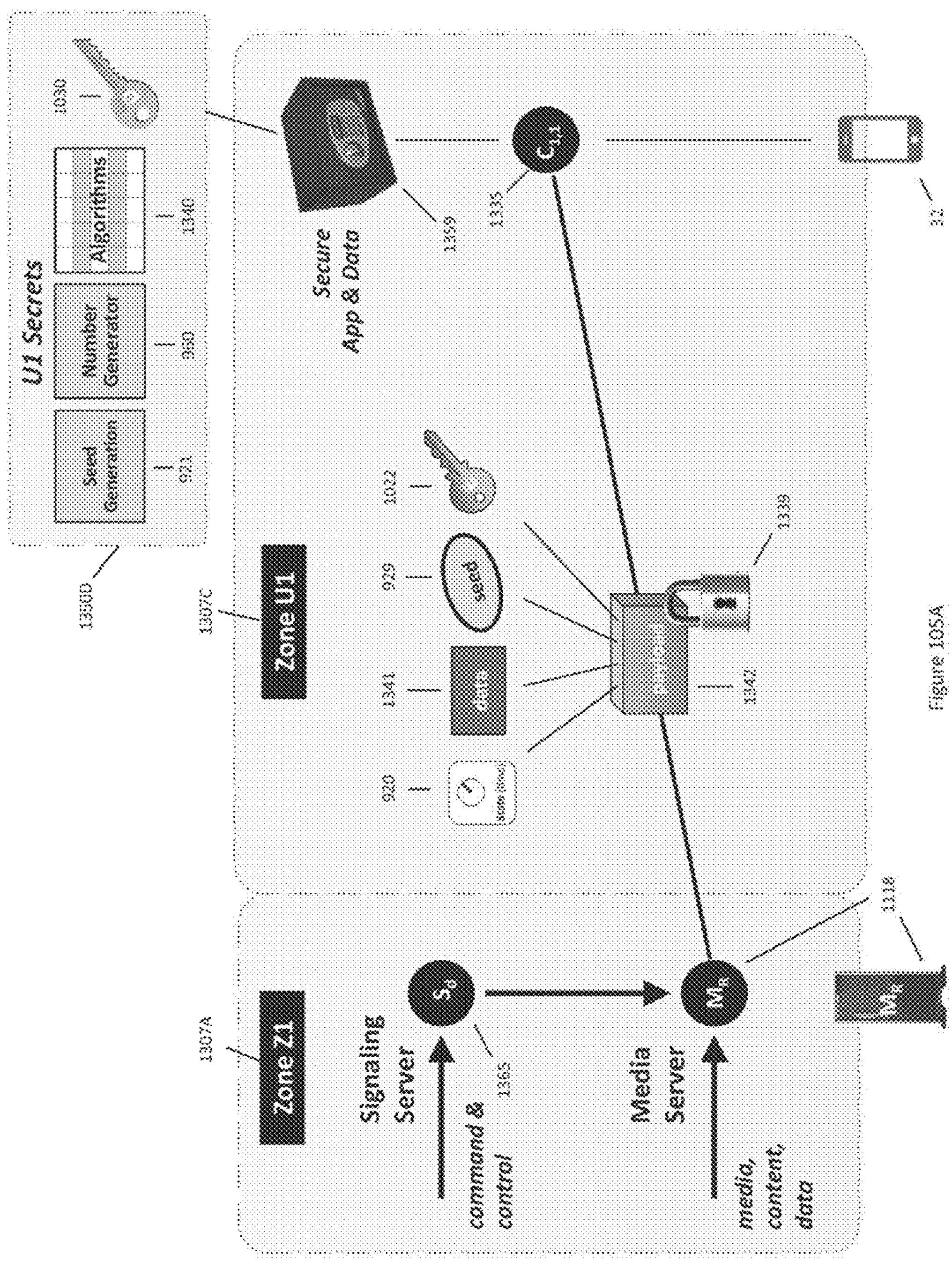

FIG. 105A is a schematic diagram showing single-channel SDNP key and seed delivery to a client.

Figure 105B:
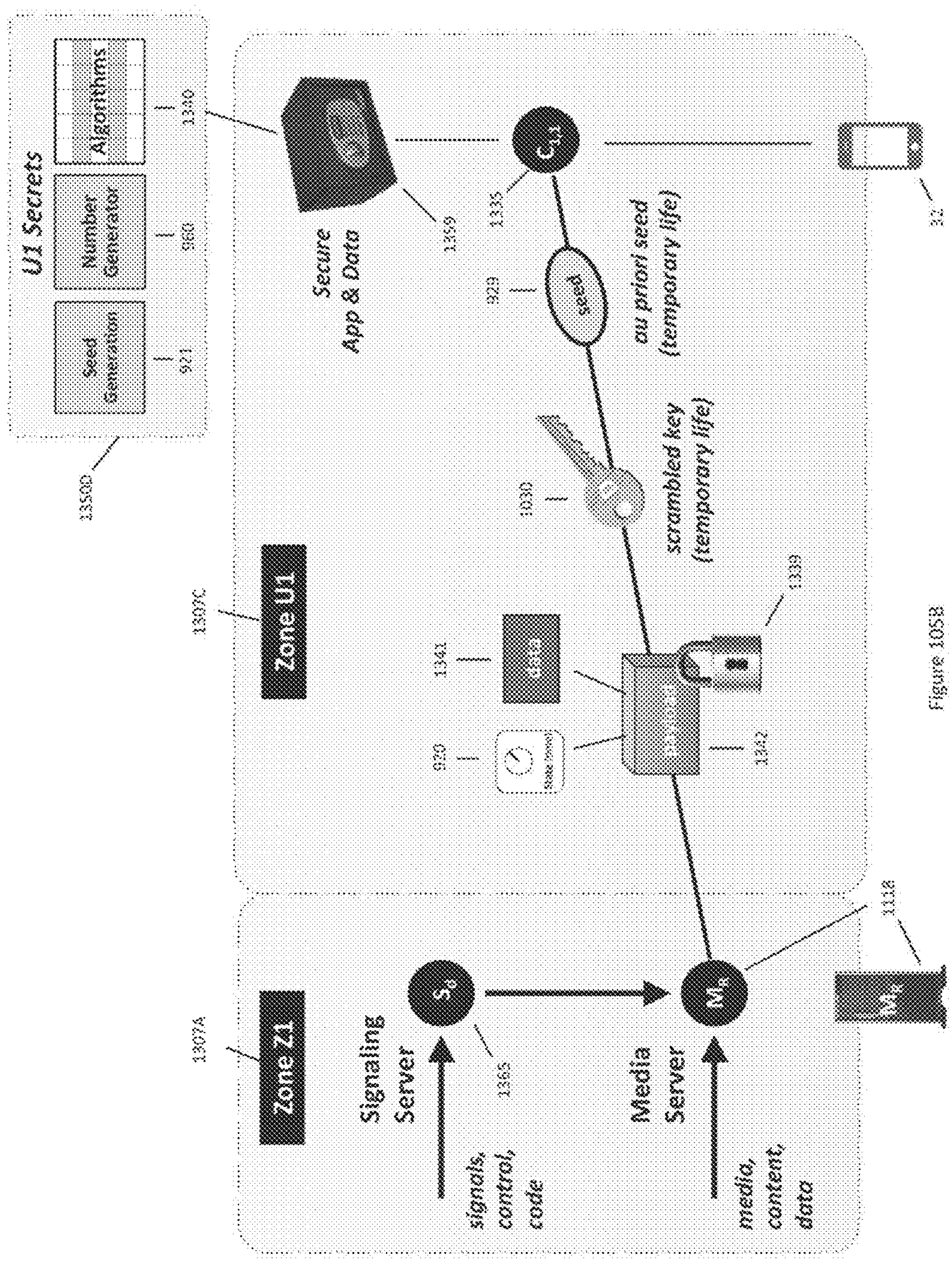

FIG. 105B is a schematic diagram showing an alternate embodiment of single-channel SDNP key and seed delivery to a client.

Figure 106:
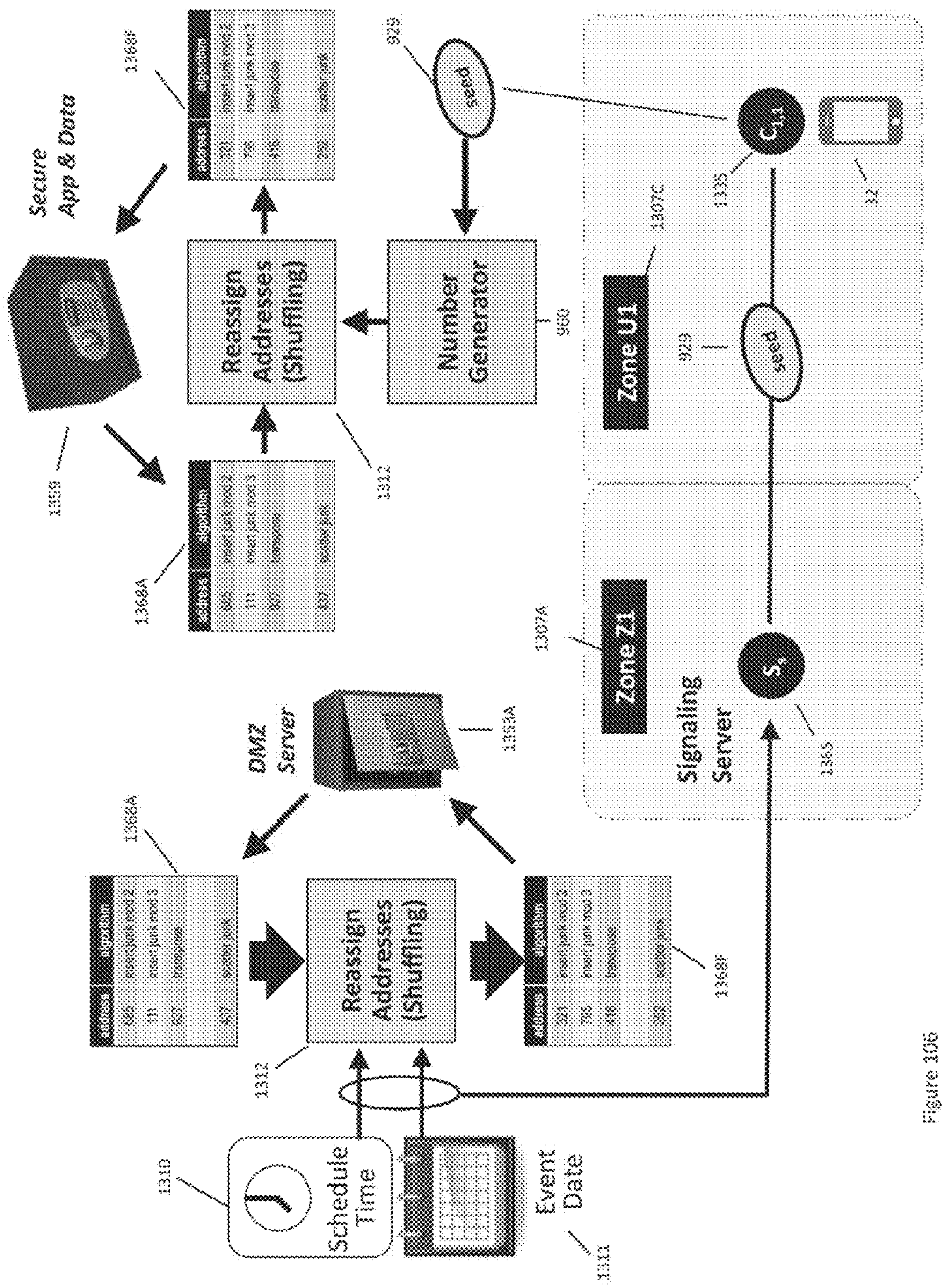

FIG. 106 is a schematic diagram showing client SDNP algorithm shuffling.

Figure 107:
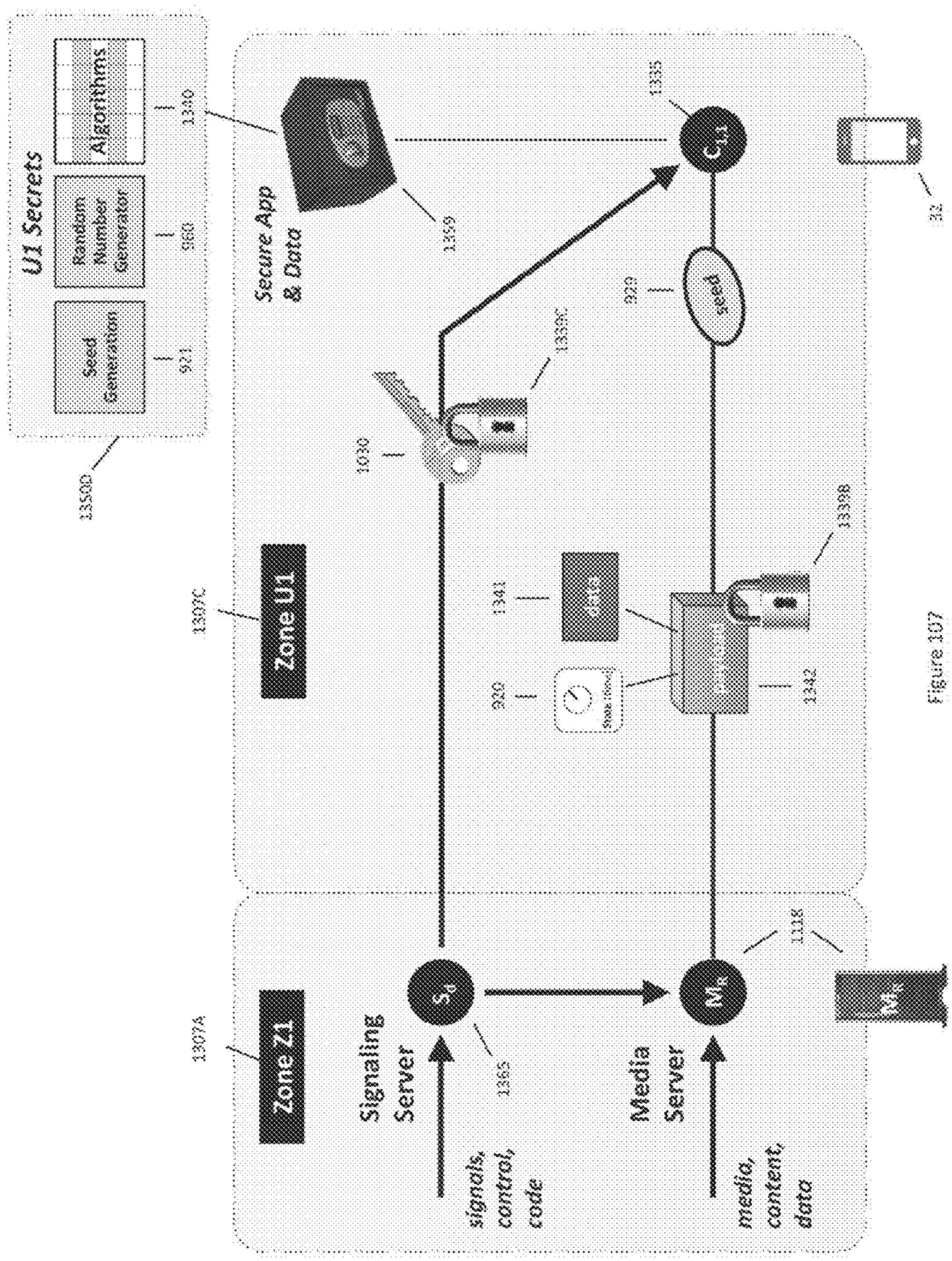

FIG. 107 is a schematic diagram showing dual-channel SDNP key and seed delivery to client.

Figure 108:
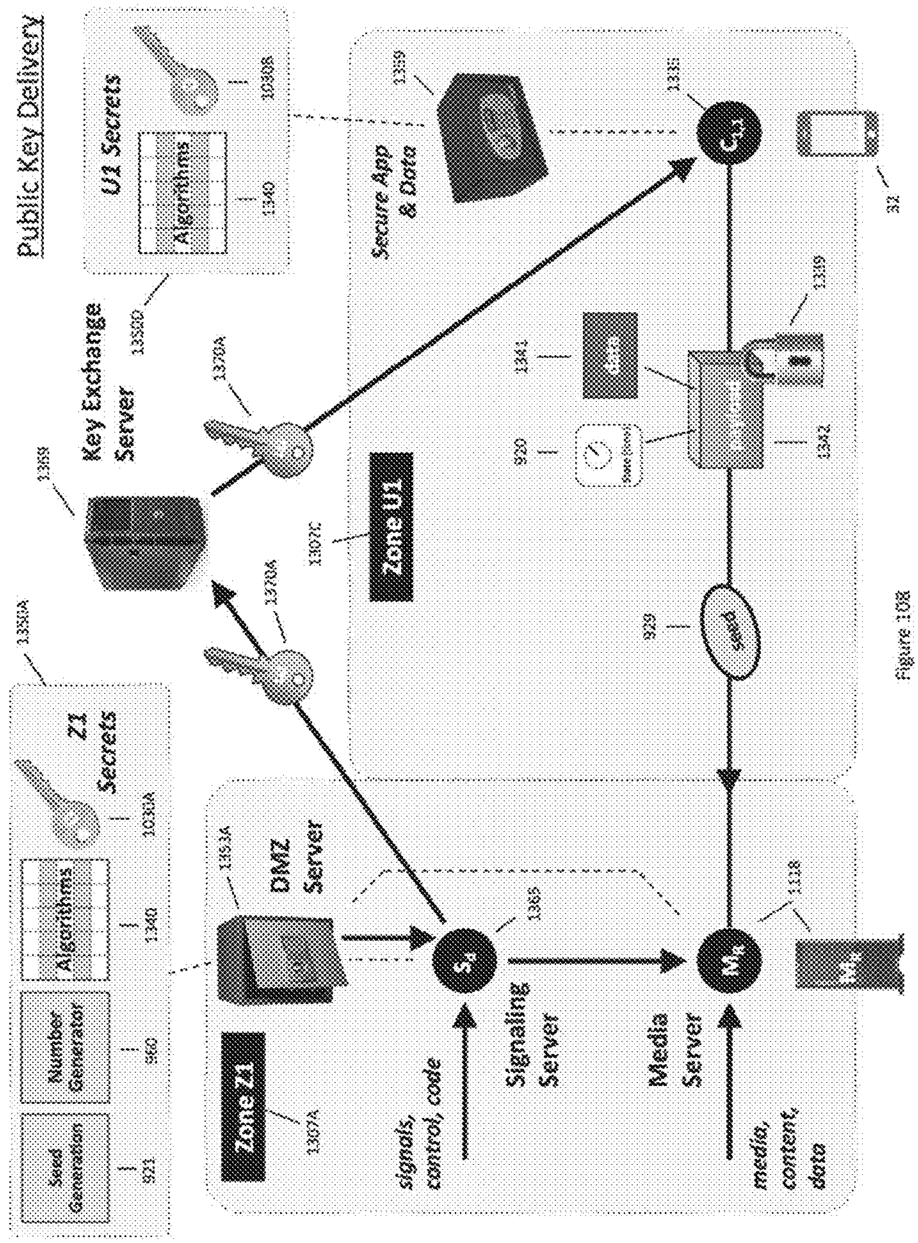

FIG. 108 is a schematic diagram showing public key delivery to an SDNP client.

Figure 109:
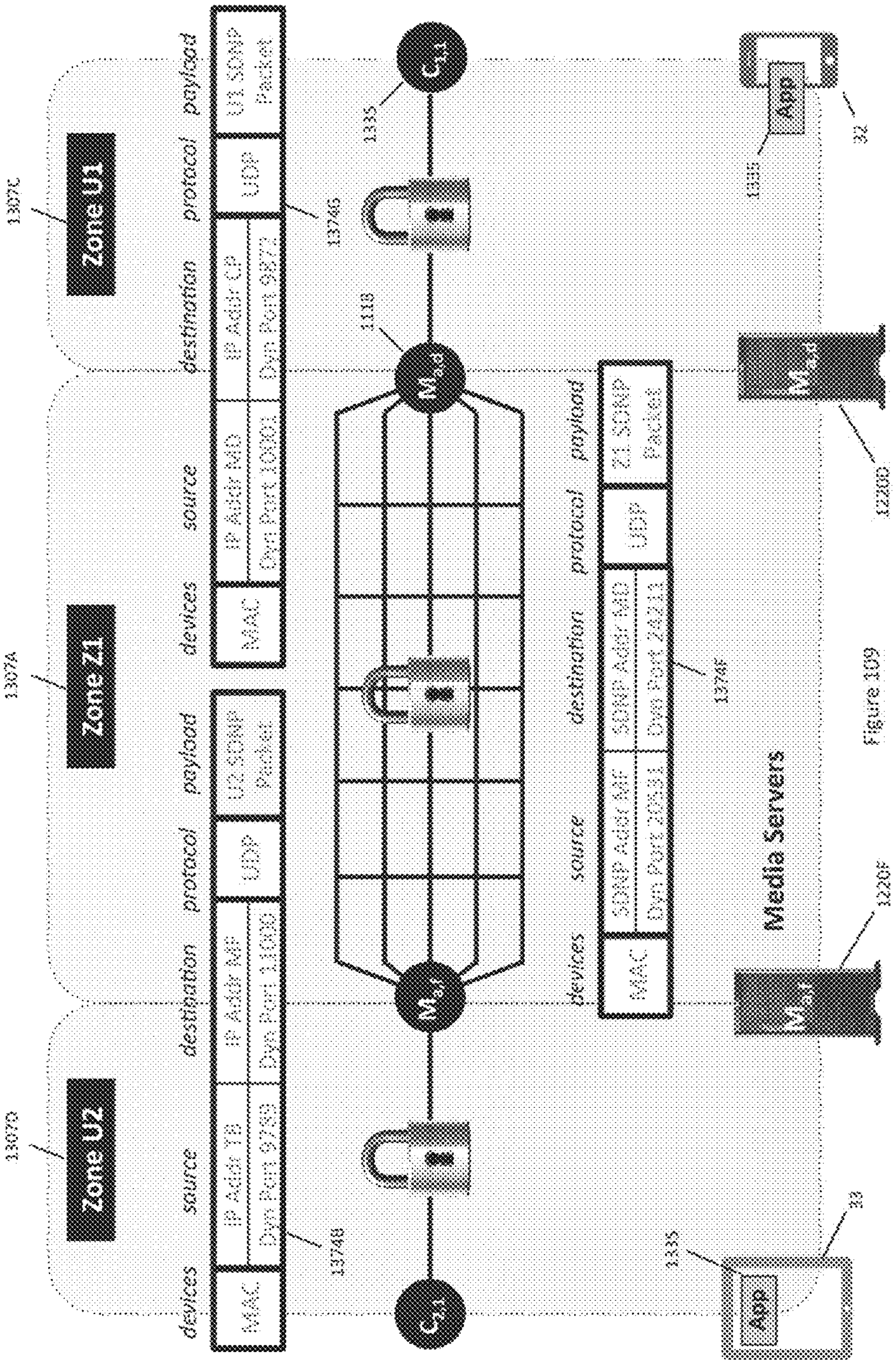

FIG. 109 is a schematic diagram showing single-channel SDNP meshed transport.

Figure 110A:
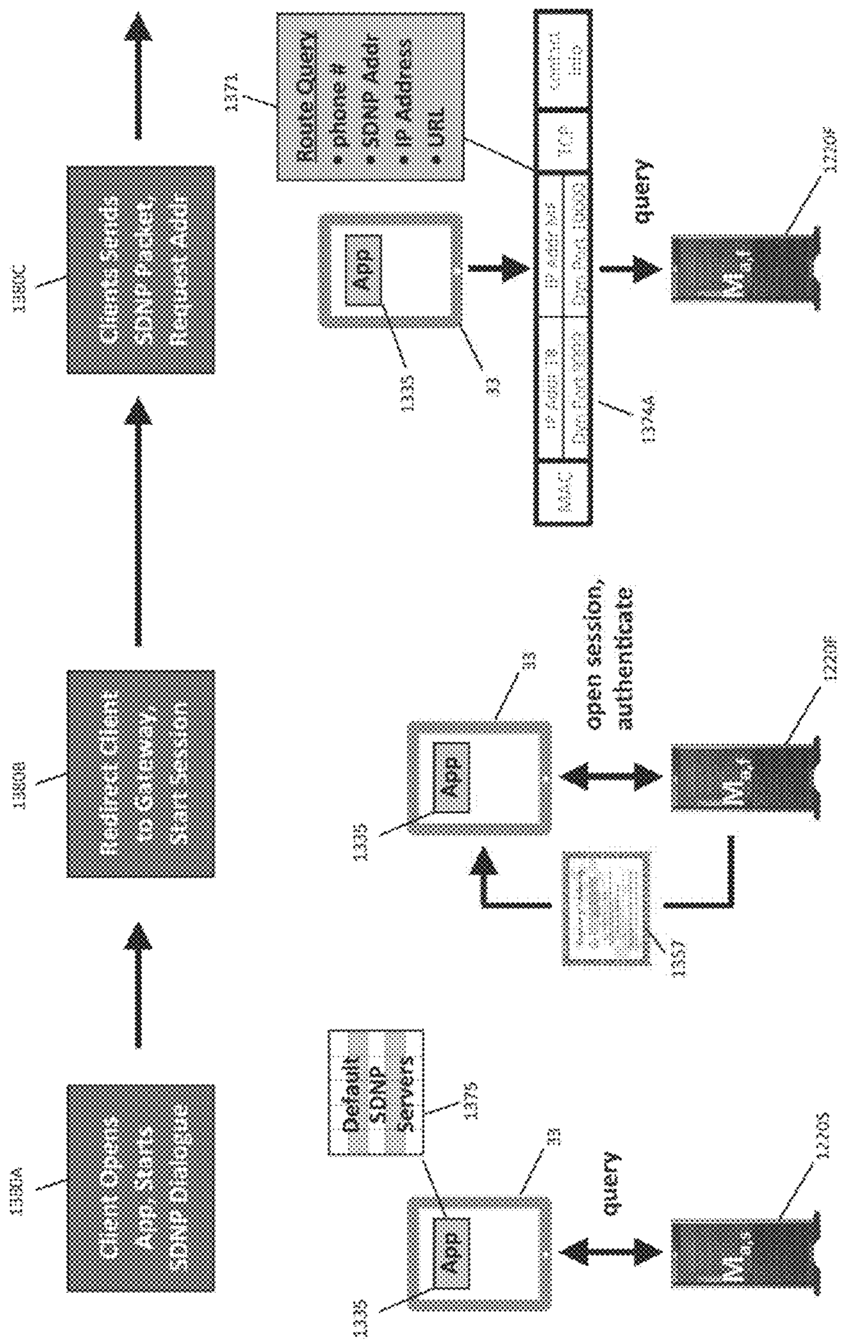

FIG. 110A is a flow chart showing media-channel SDNP ad hoc communication, part 1.

Figure 110B:
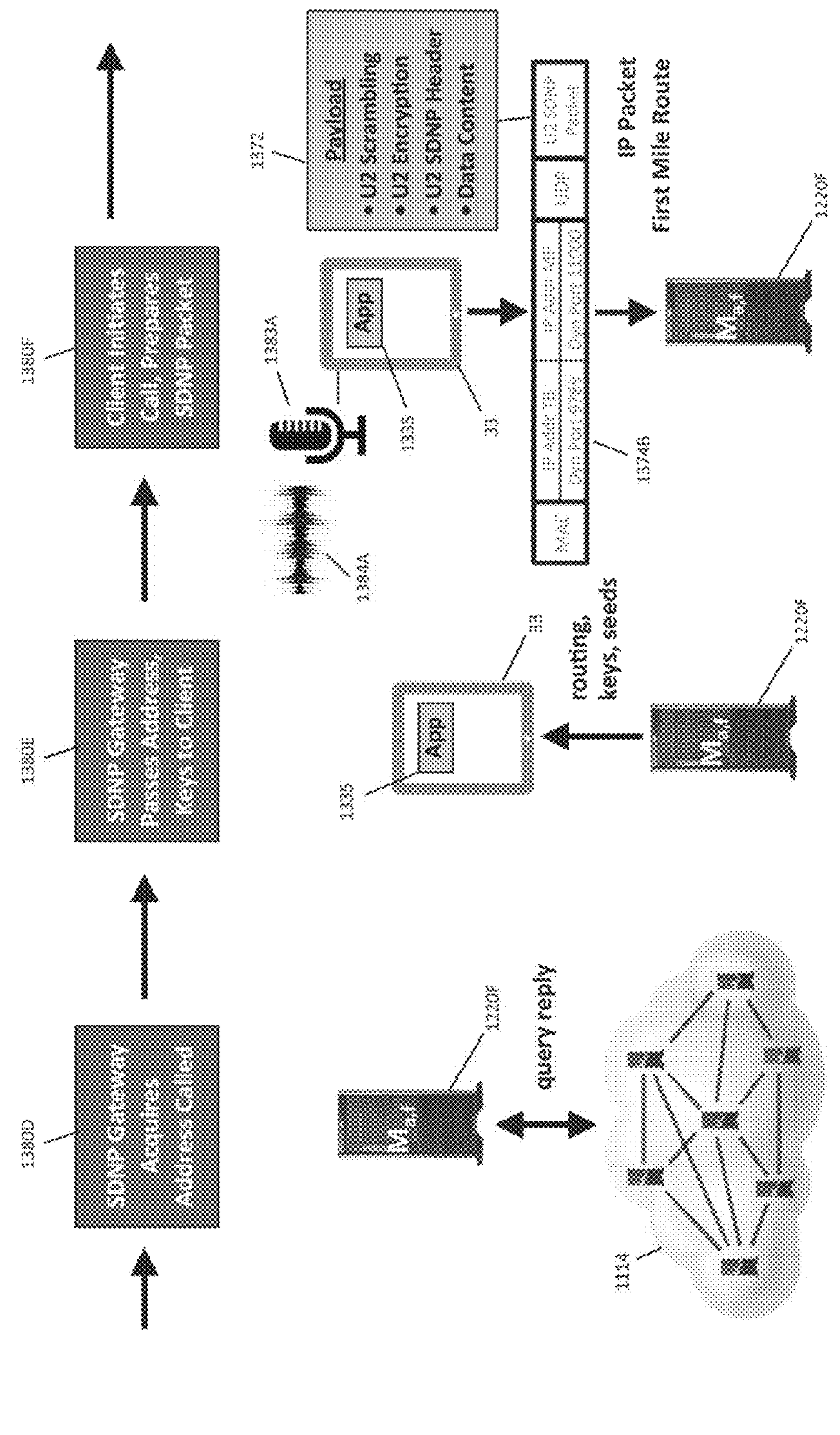

FIG. 110B is a flow chart showing media-channel SDNP ad hoc communication, part 2.

Figure 110C:
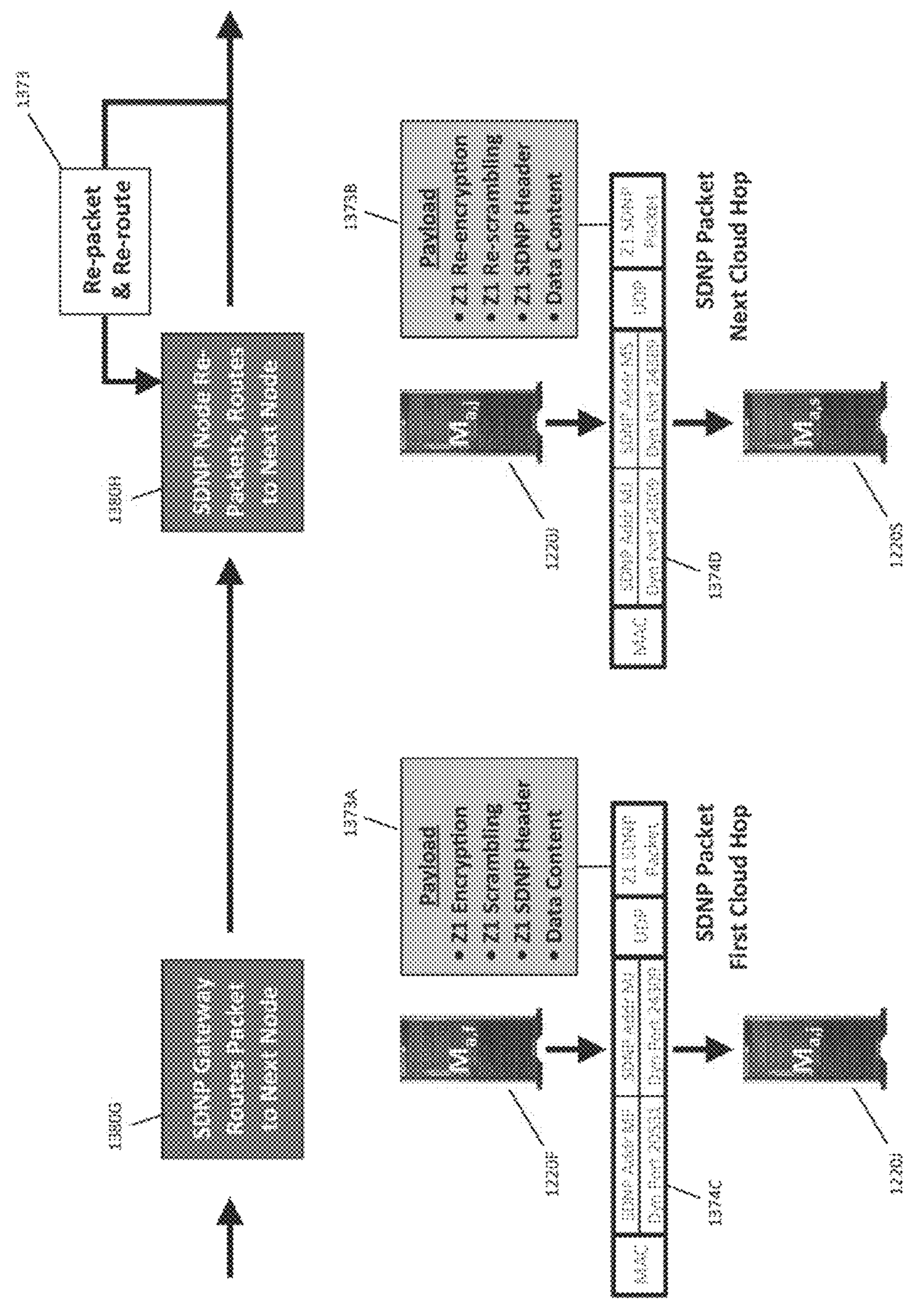

FIG. 110C is a flow chart showing media-channel SDNP ad hoc communication, part 3.

Figure 110D:
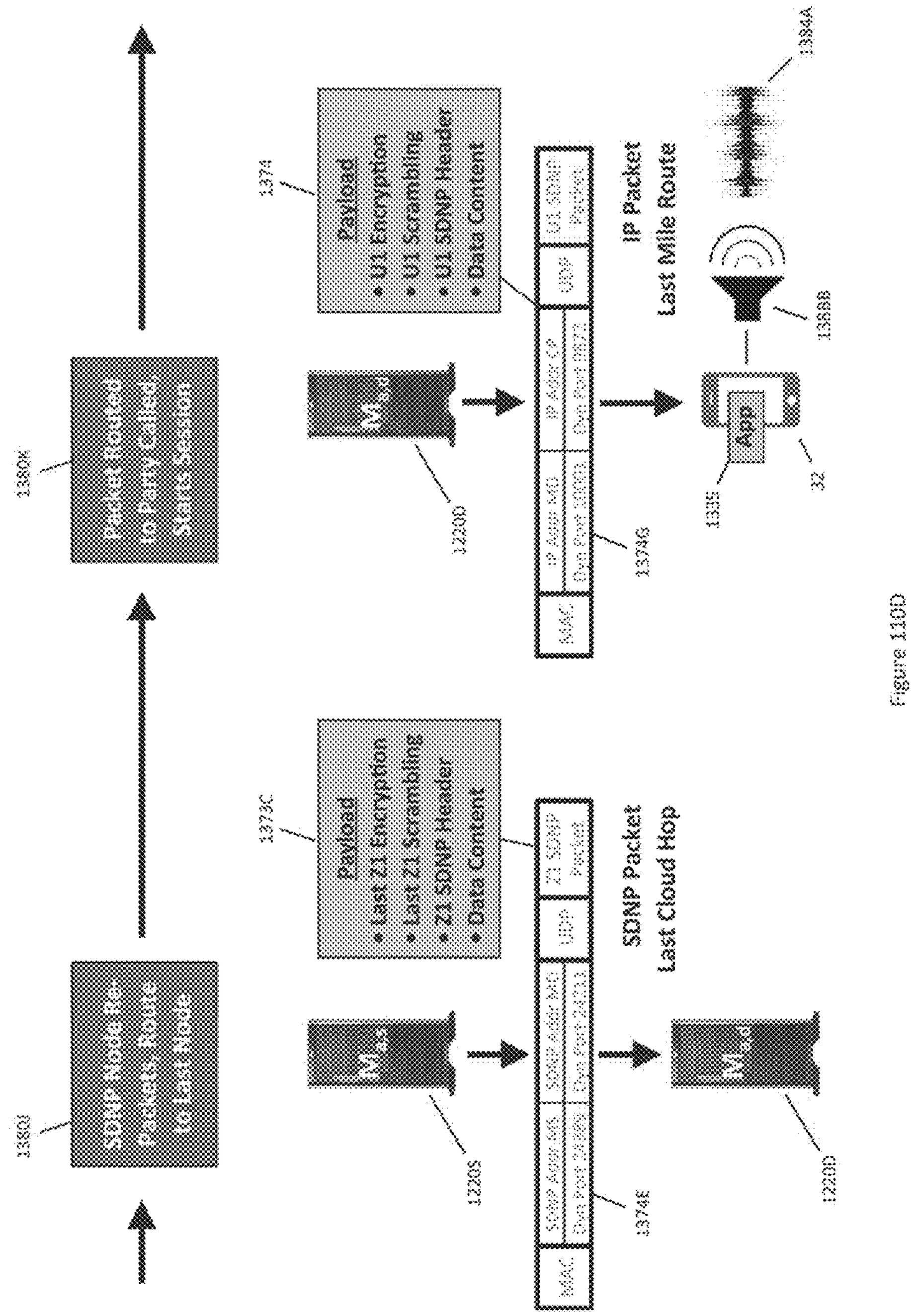

FIG. 110D is a flow chart showing media-channel SDNP ad hoc communication, part 4.

Figure 110E:
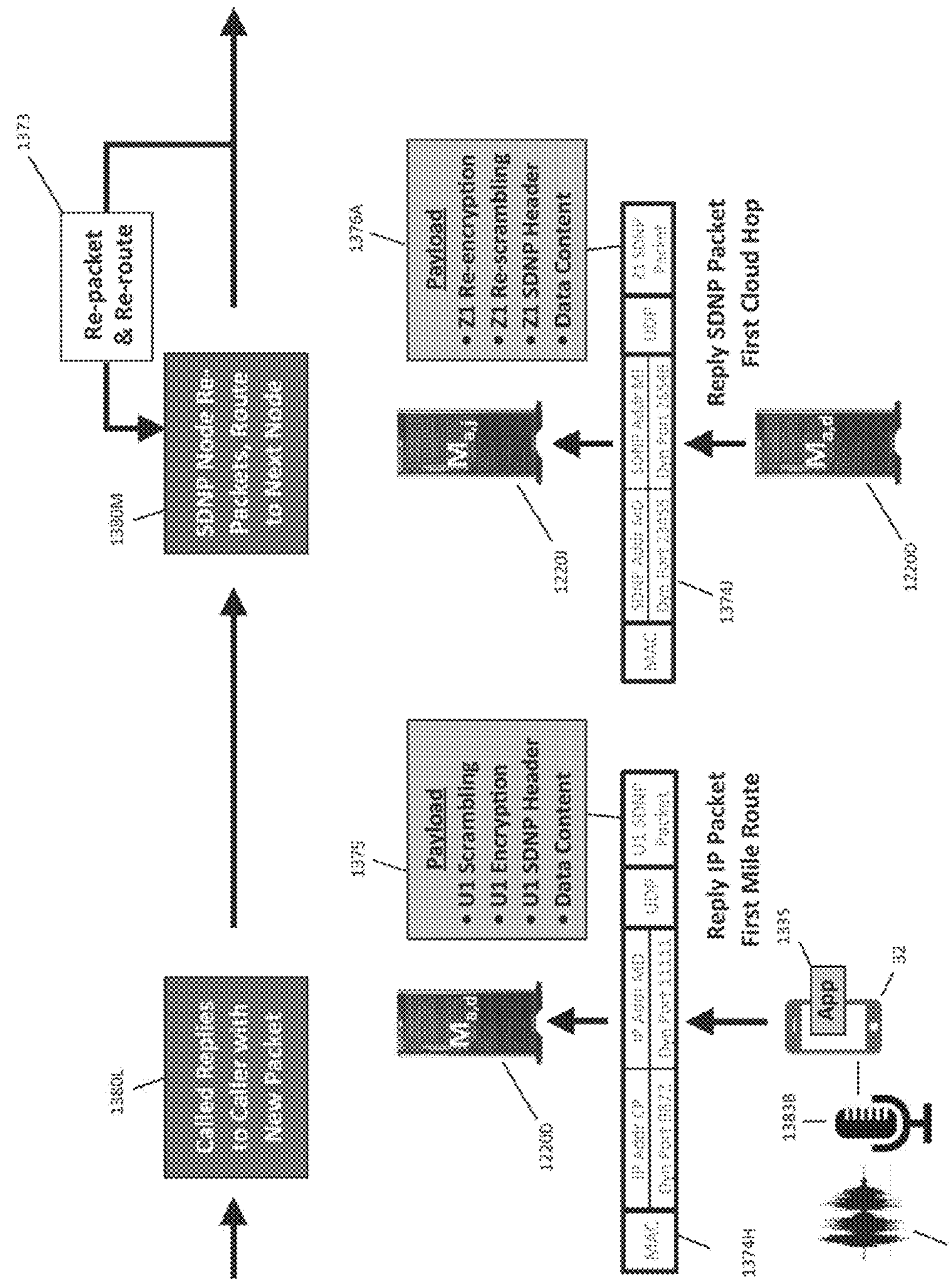
Figure 130F:
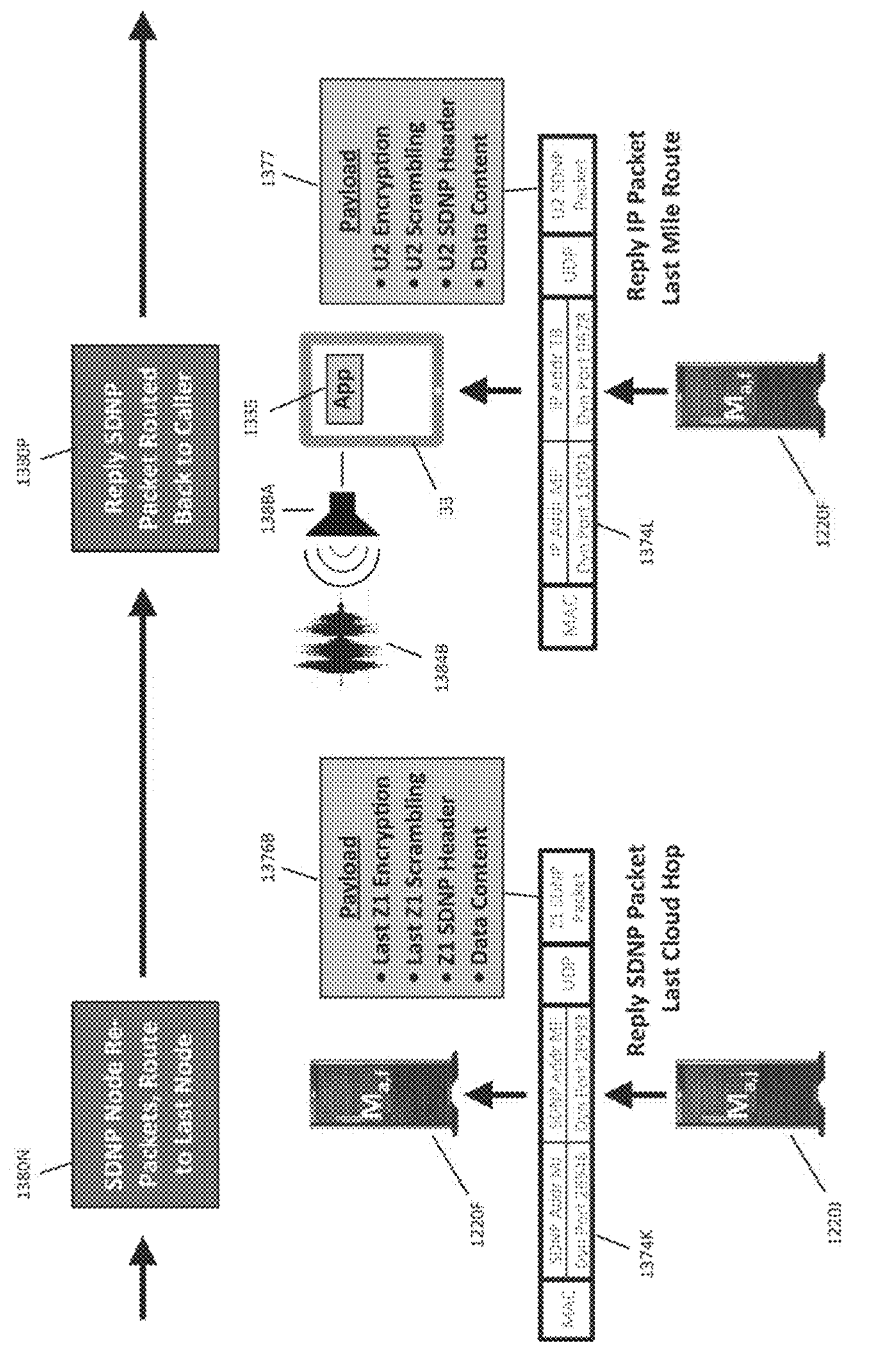

FIG. 110E is a flow chart showing media-channel SDNP ad hoc communication, part 5.

FIG. 110F is a flow chart showing media-channel SDNP ad hoc communication, part 6.

Figure 111A:
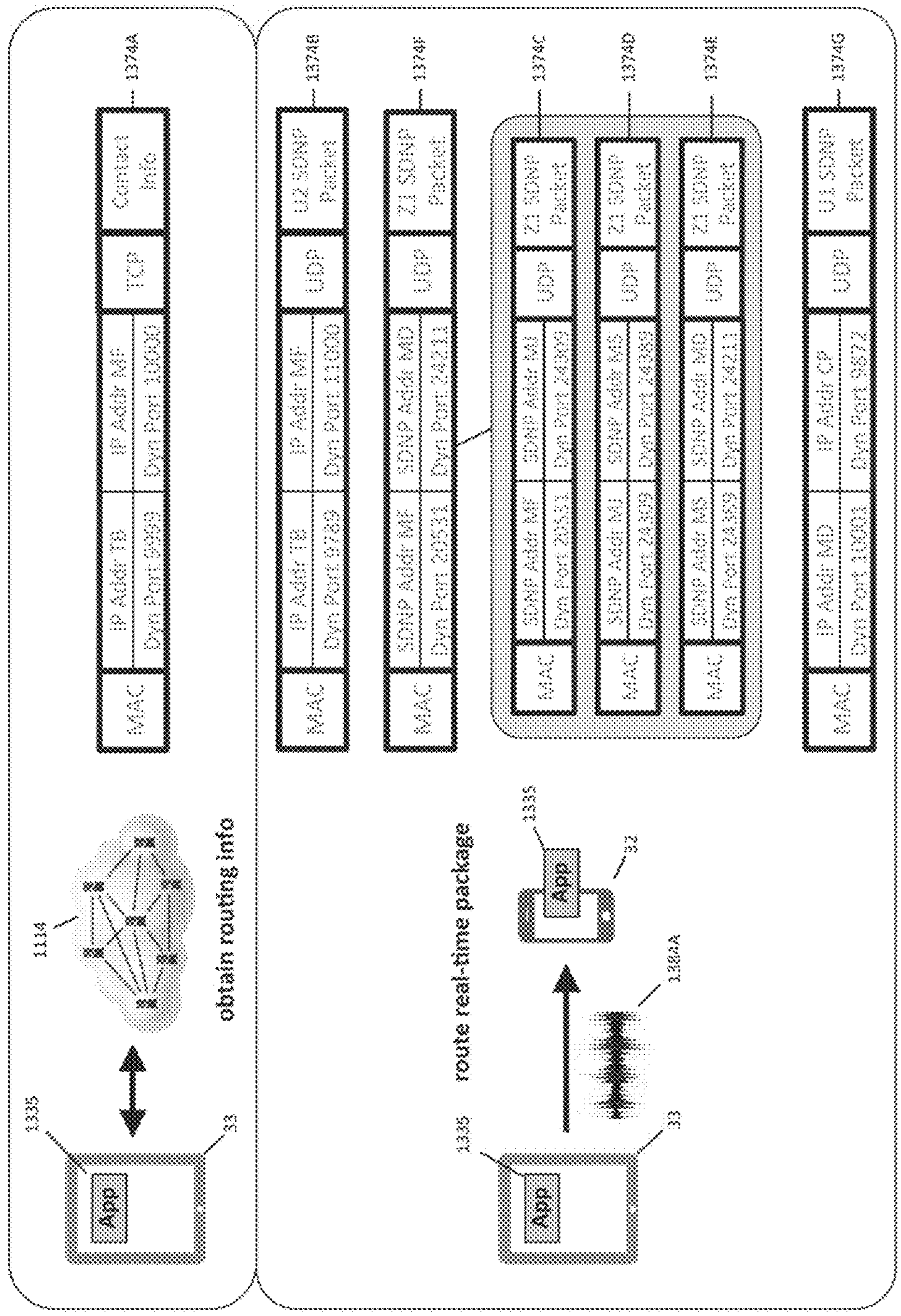

FIG. 111A is a flow chart summarizing SDNP ad hoc packet sending sequence.

Figure 111B:
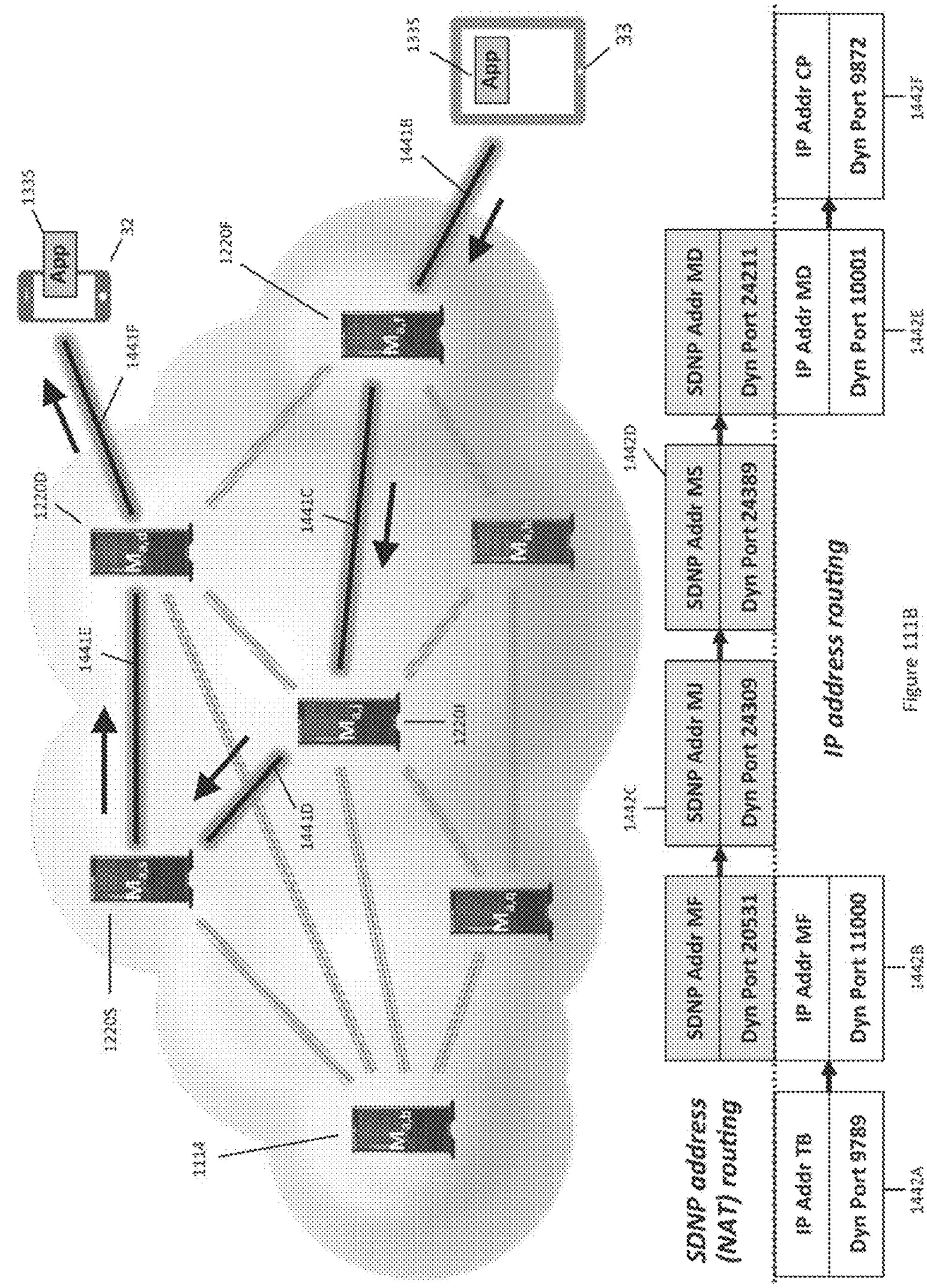

FIG. 111B is a network map summarizing SDNP sending routing.

Figure 112A:
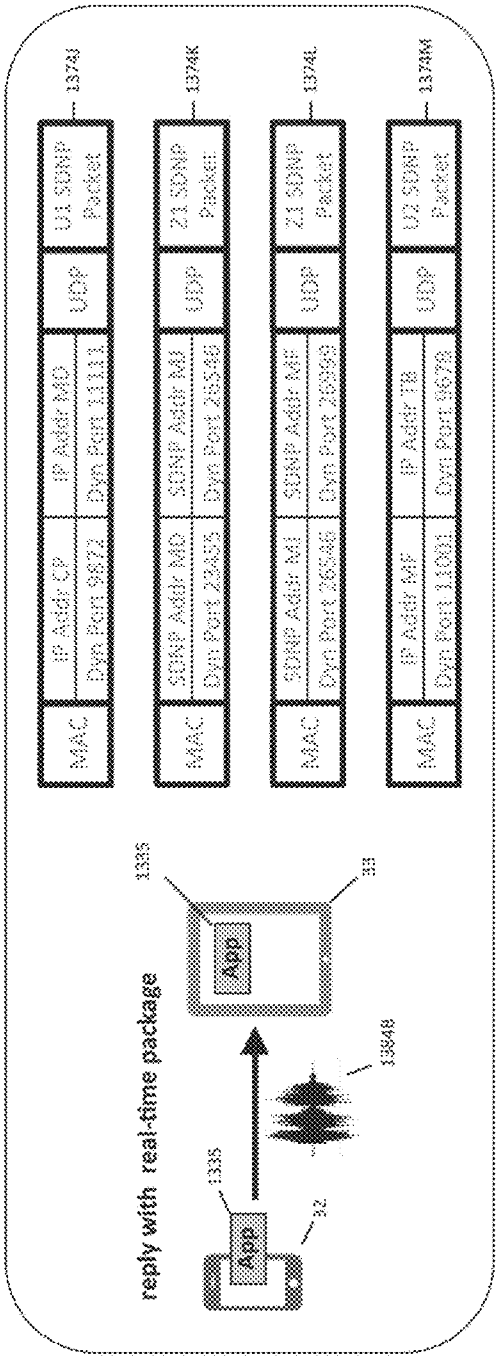

FIG. 112A is a flow chart summarizing SDNP ad hoc packet reply sequence.

Figure 112B:
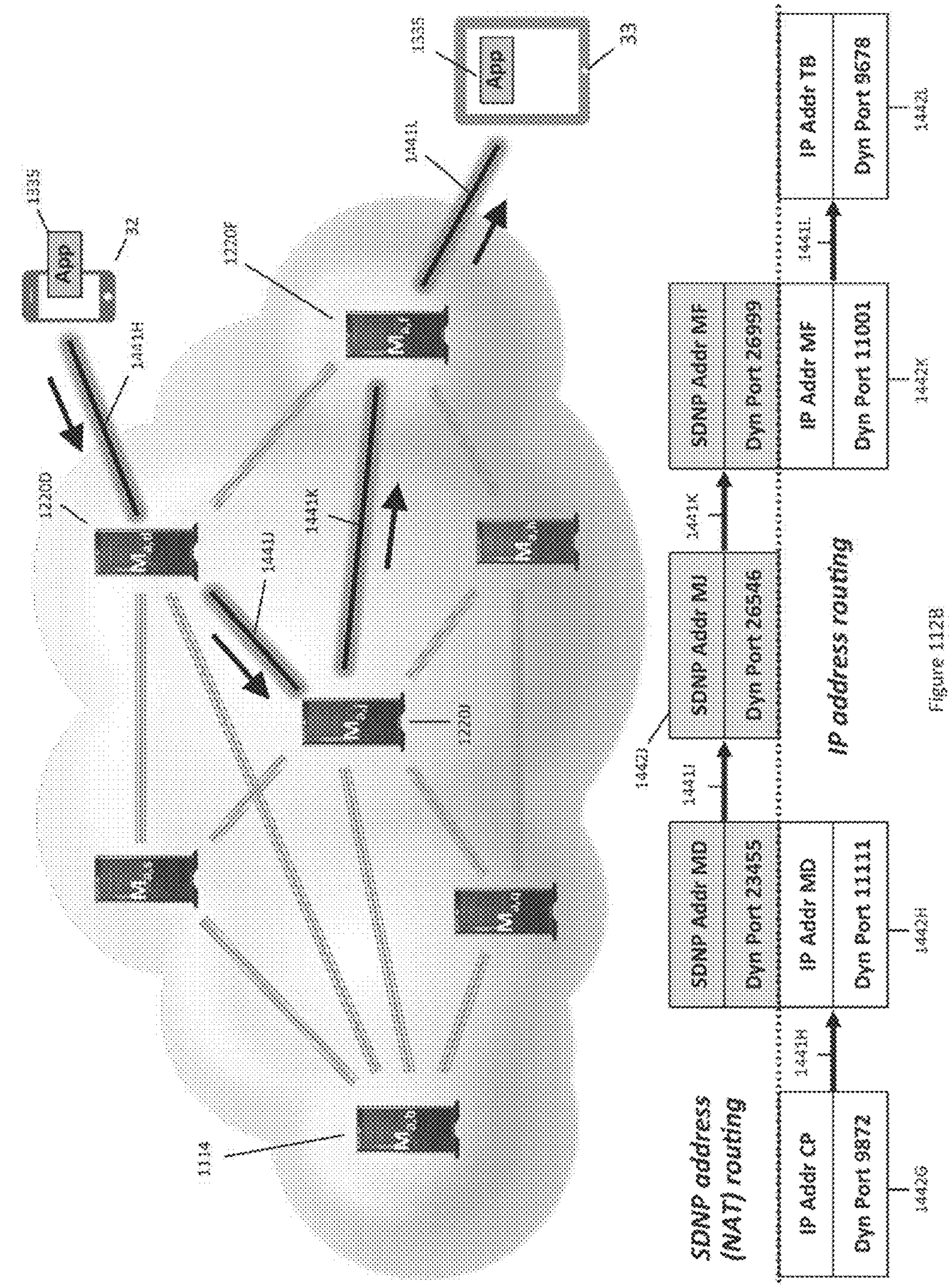

FIG. 112B is a network map summarizing SDNP reply routing.

Figure 113A:
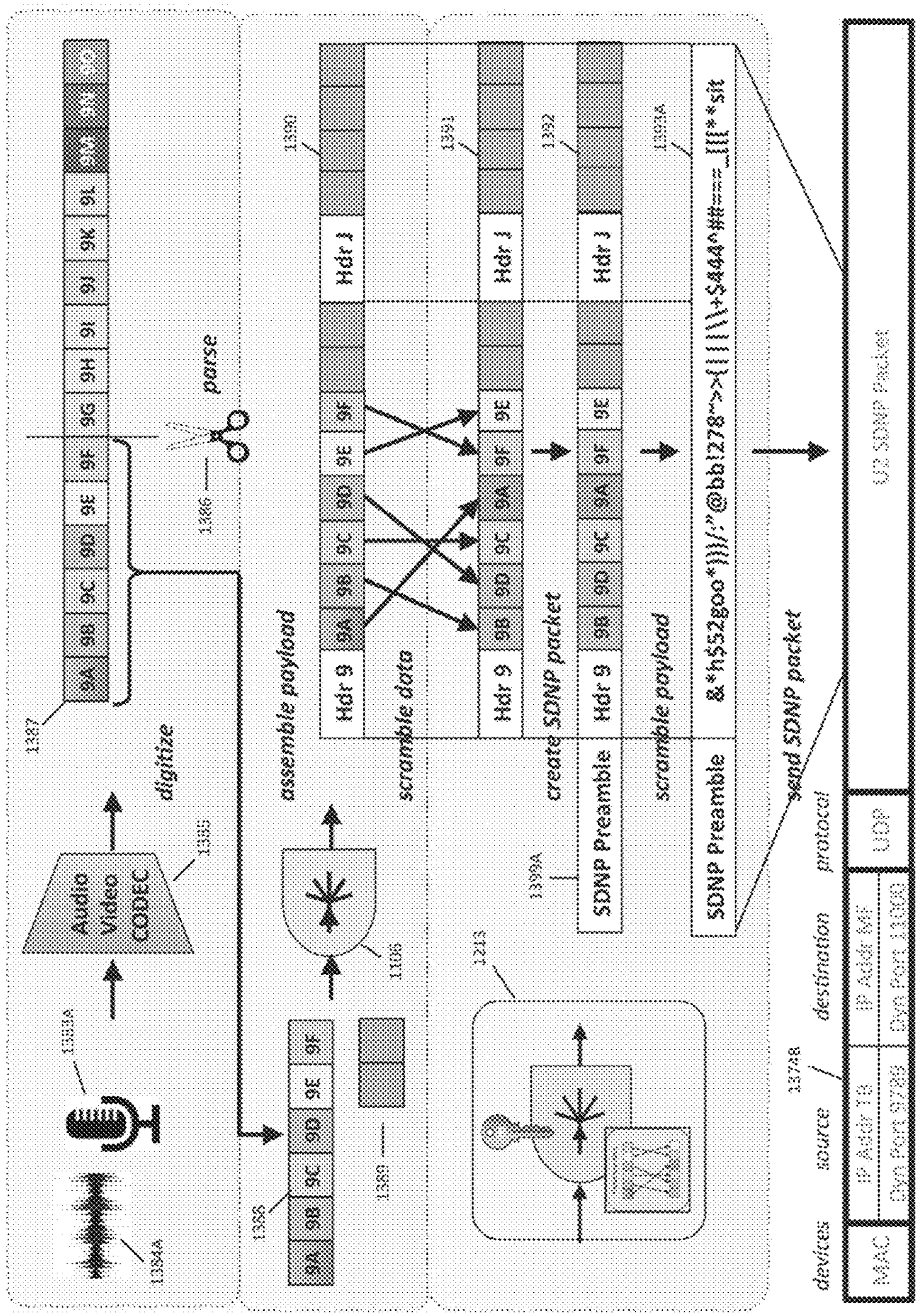

FIG. 113A is a schematic diagram showing SDNP packet preparation.

Figure 113B:
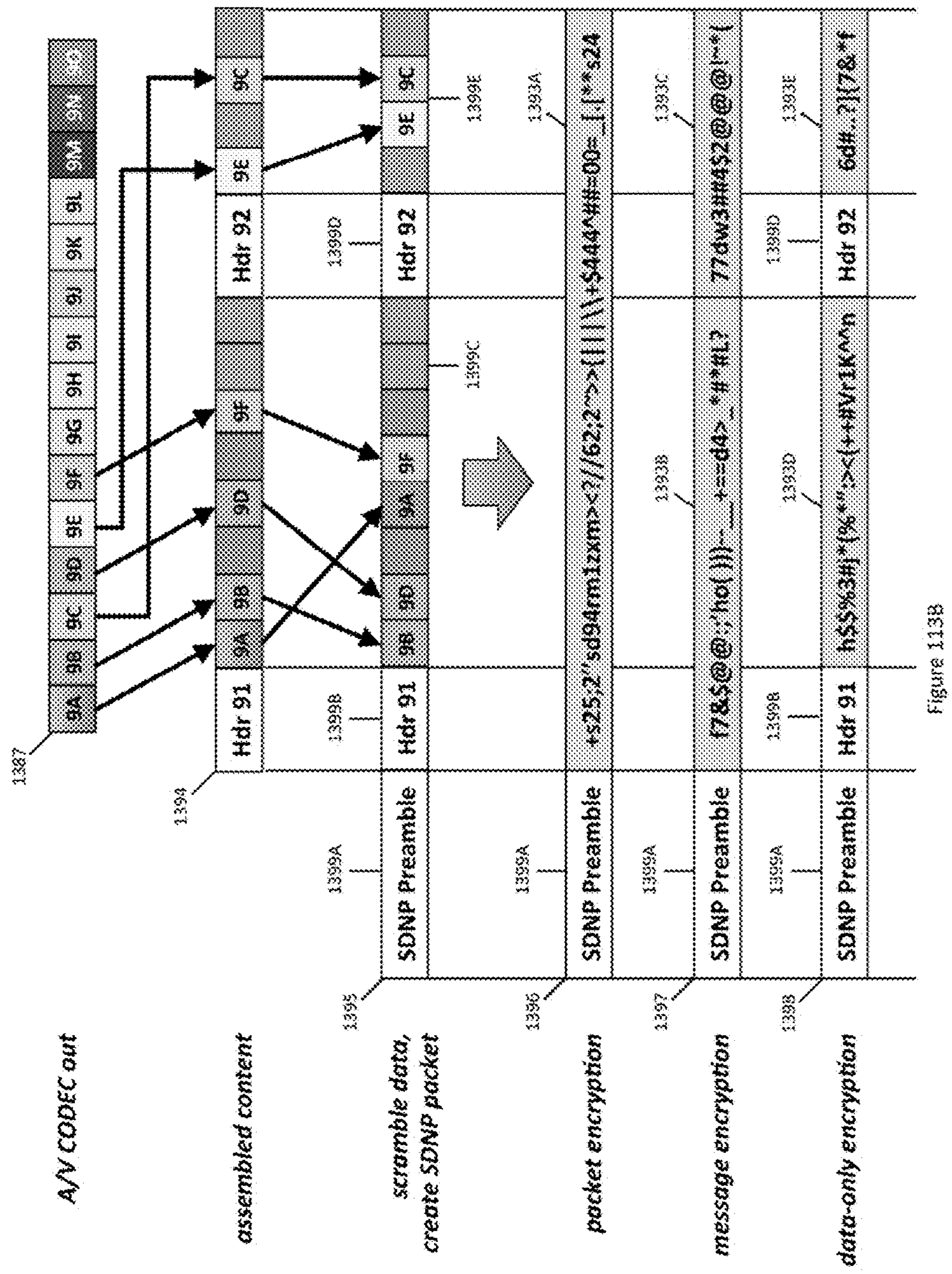

FIG. 113B is a schematic diagram showing an alternate embodiment of SDNP packet preparation.

FIG. 114 is a table summarizing one embodiment of the SDNP packet architecture.

Figure 115:
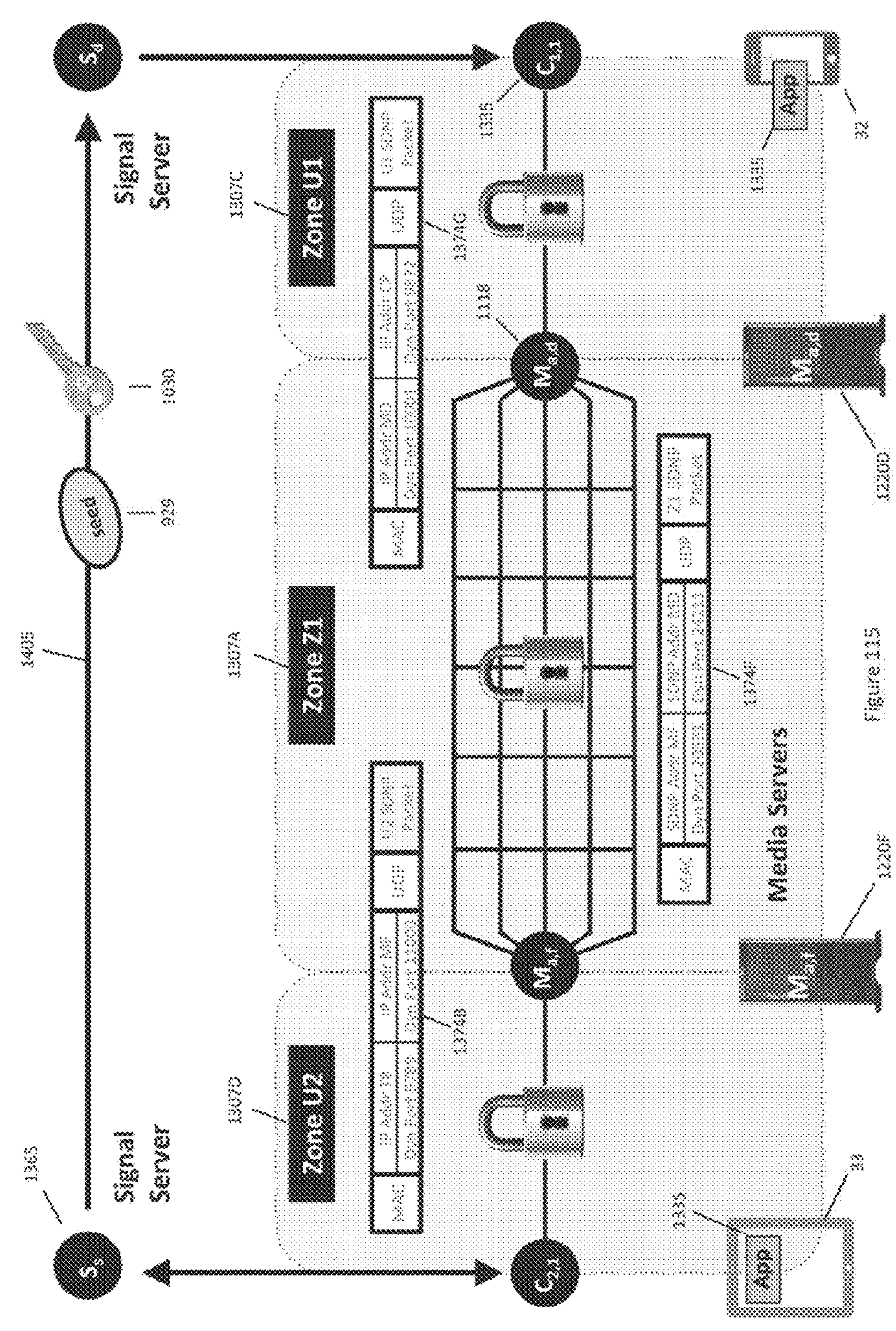

FIG. 115 is a schematic diagram showing an embodiment of dual-channel SDNP meshed transport wherein the signaling function within the cloud is performed by the same servers that act as media nodes and the signaling function in the first and last miles is performed by separate signaling servers.

Figure 116:
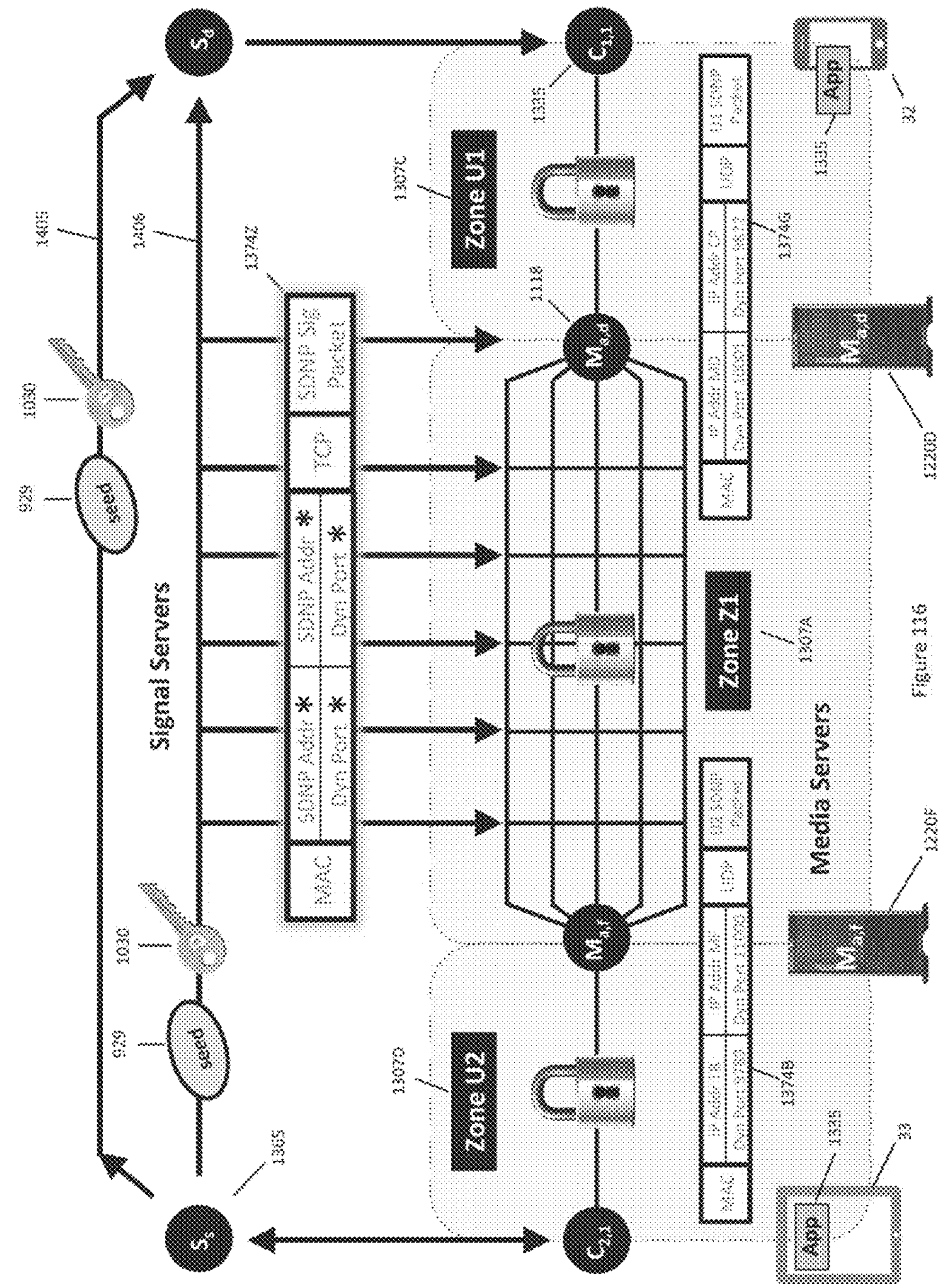

FIG. 116 is a schematic diagram showing an alternate embodiment of dual-channel SDNP meshed transport wherein the signaling function both in the cloud and in the first and last miles is performed by separate signaling servers.

Figure 117:
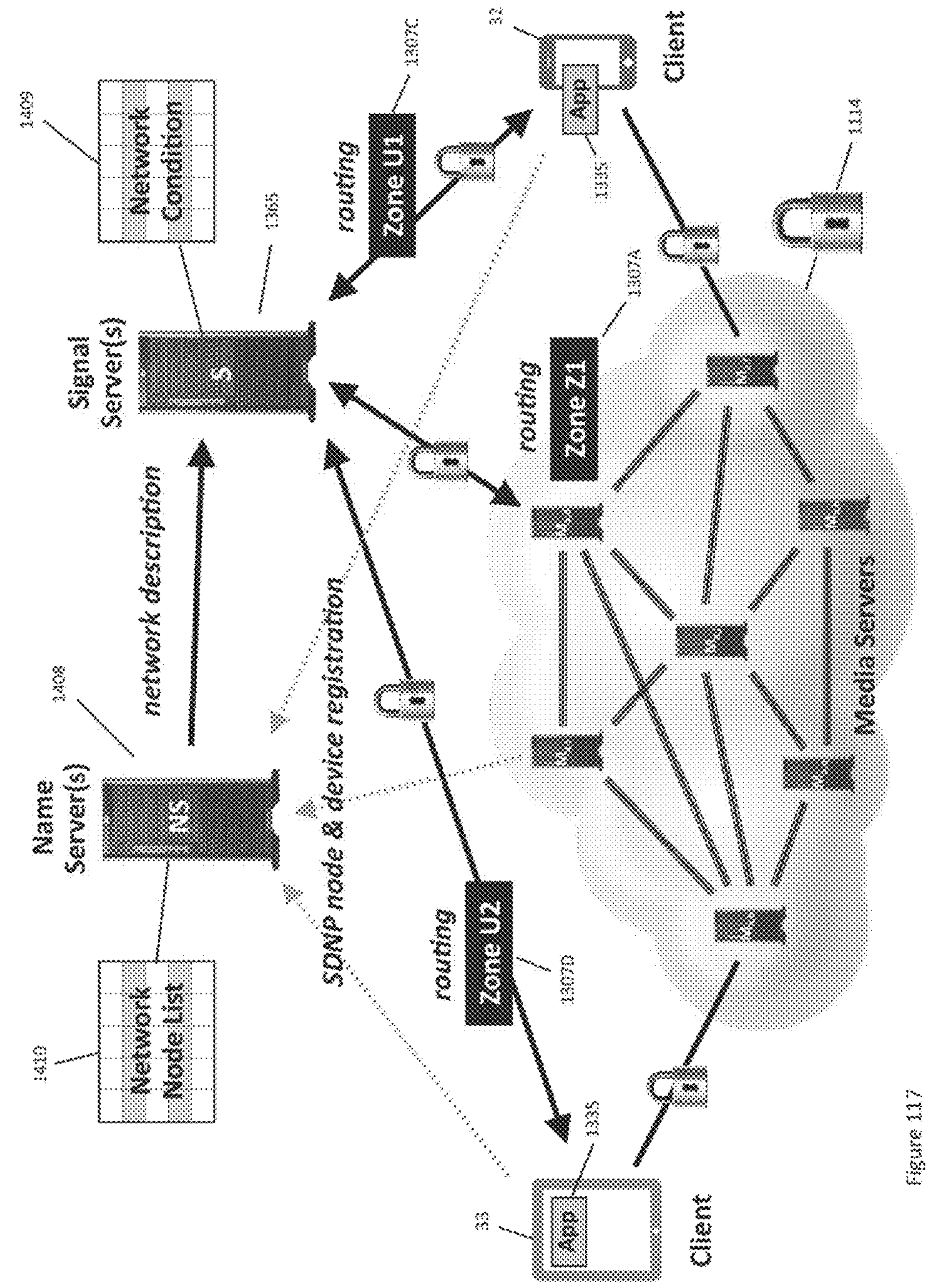

FIG. 117 is a schematic diagram showing tri-channel SDNP meshed transport.

Figure 118:
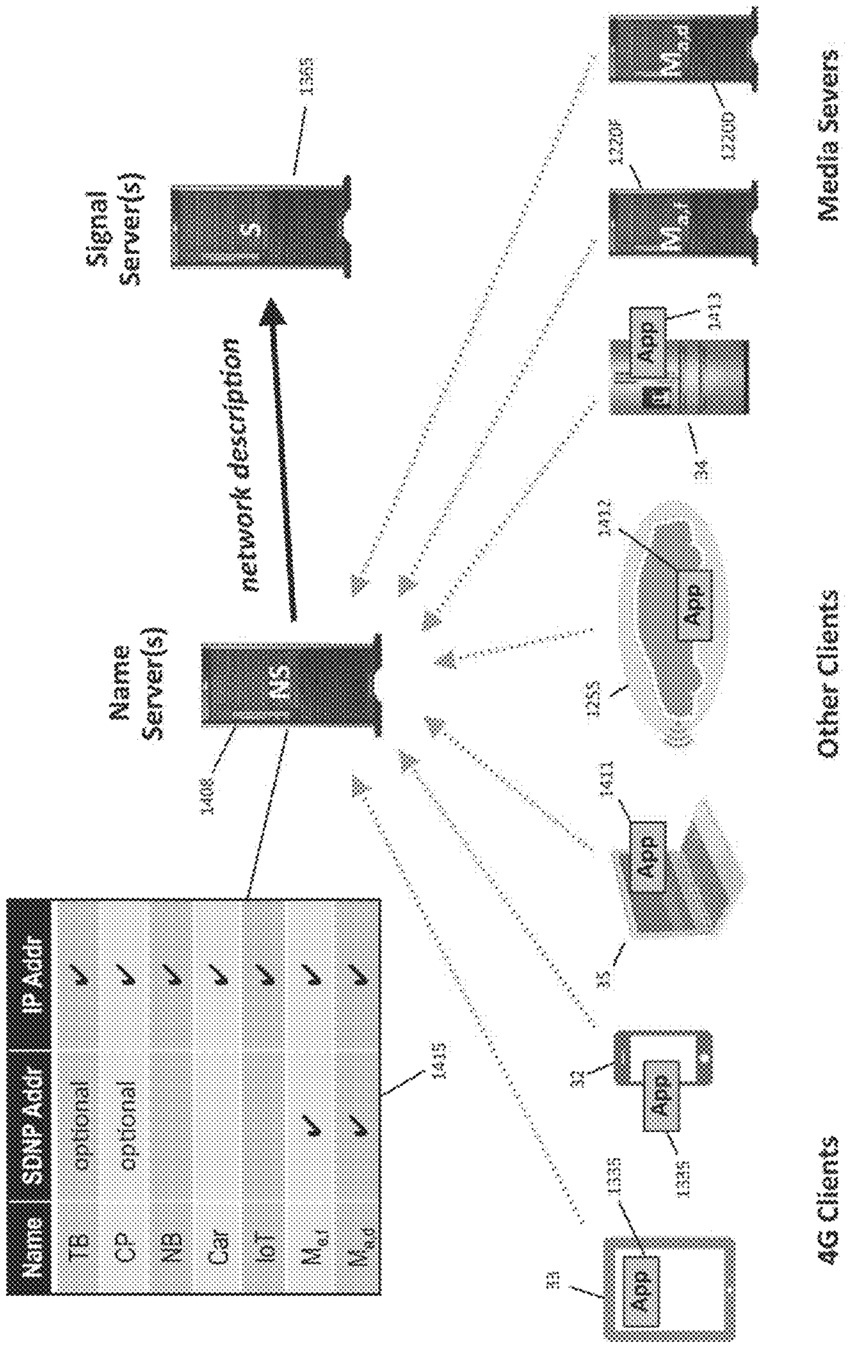

FIG. 118 is a schematic diagram showing SDNP node and device registration.

Figure 119:
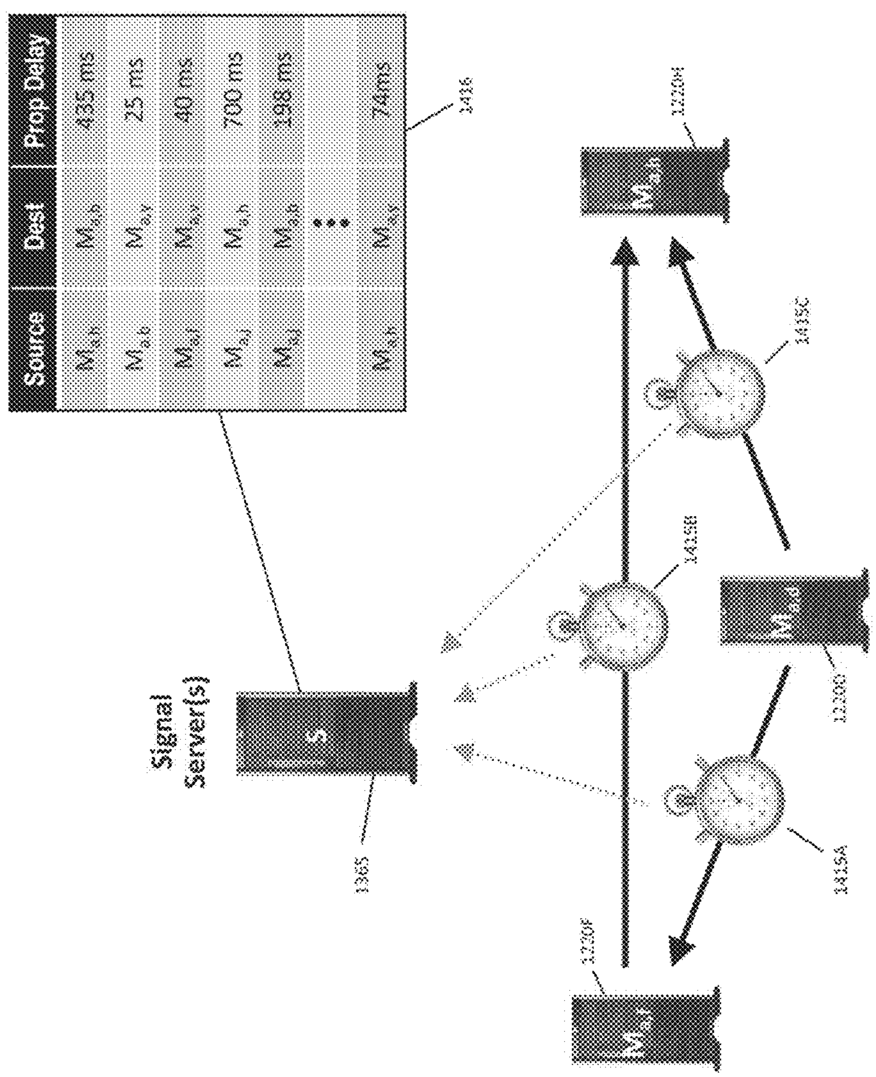

FIG. 119 is a schematic diagram showing SDNP real-time propagation delay monitoring.

Figure 120:
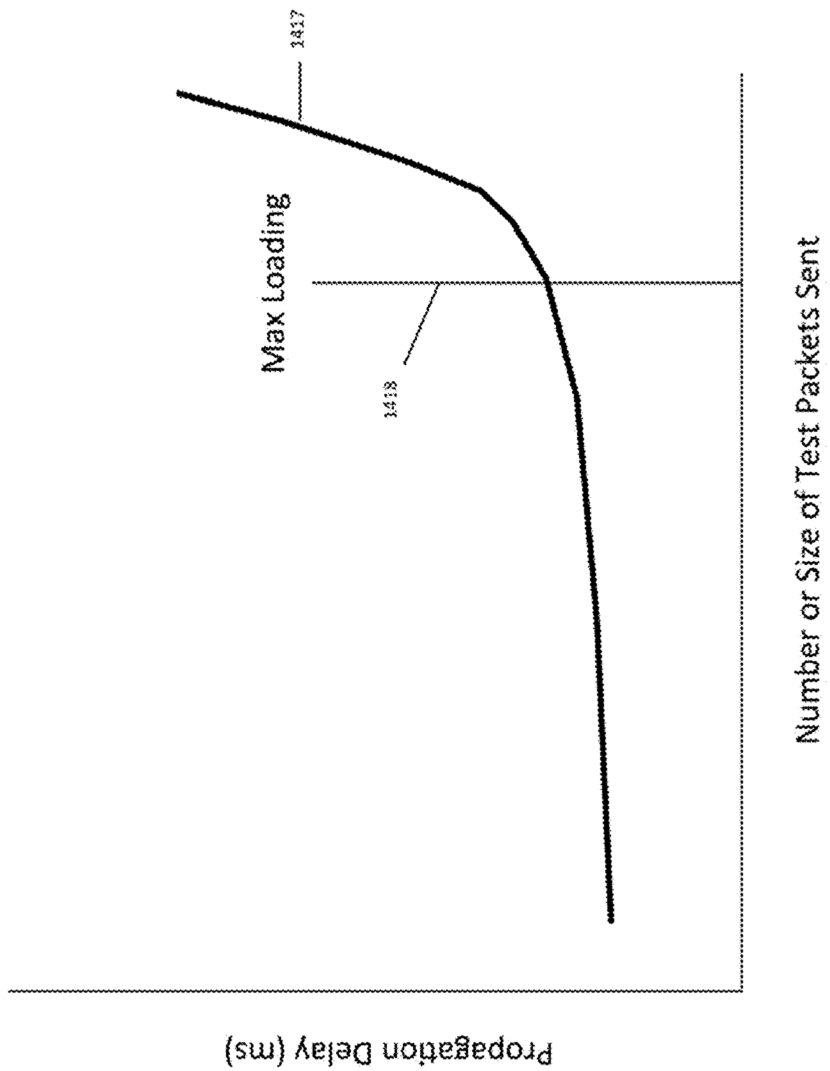

FIG. 120 is a graph illustrating test-packet propagation delay monitoring.

Figure 121:
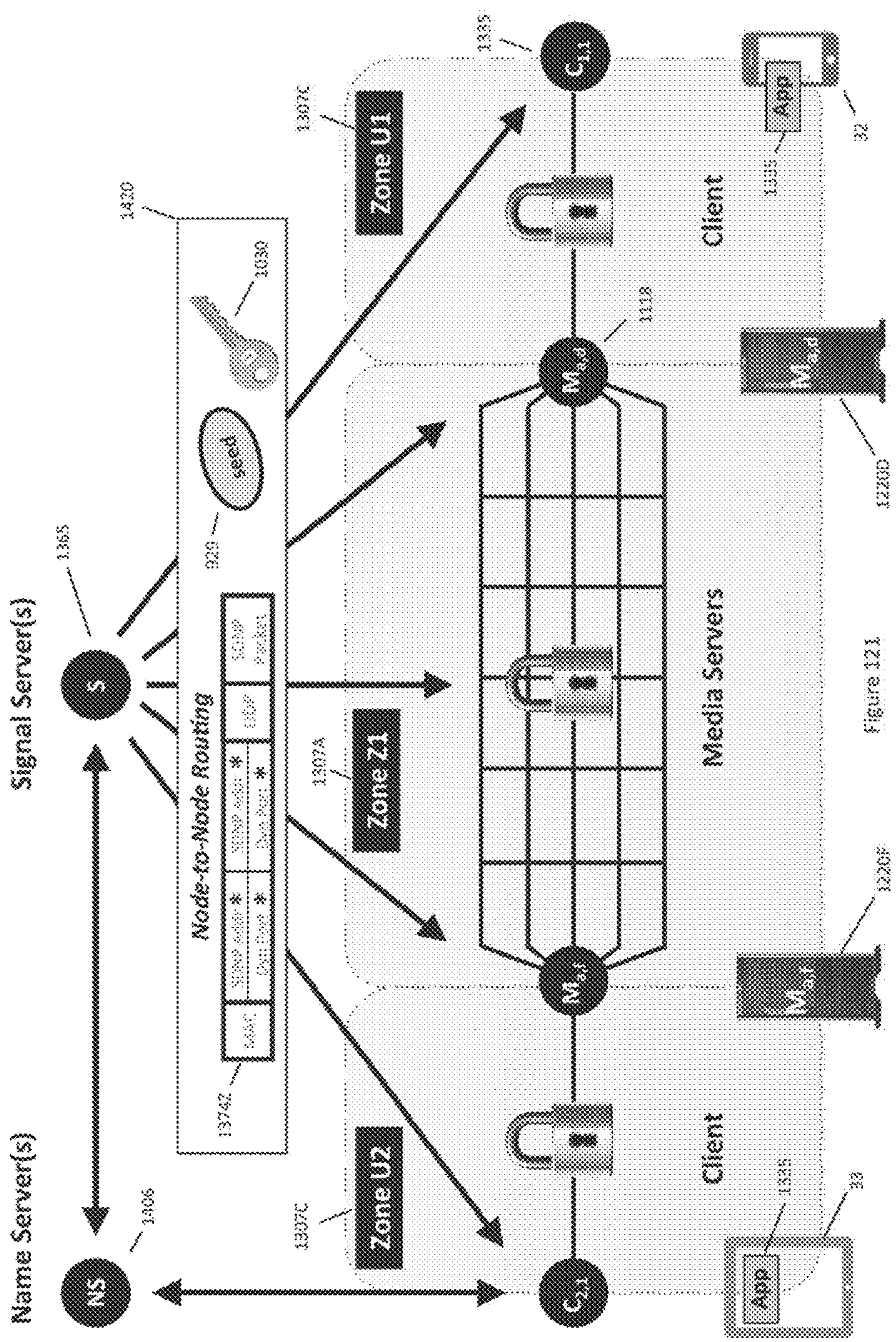

FIG. 121 is a schematic diagram showing tri-channel SDNP meshed transport.

Figure 122:
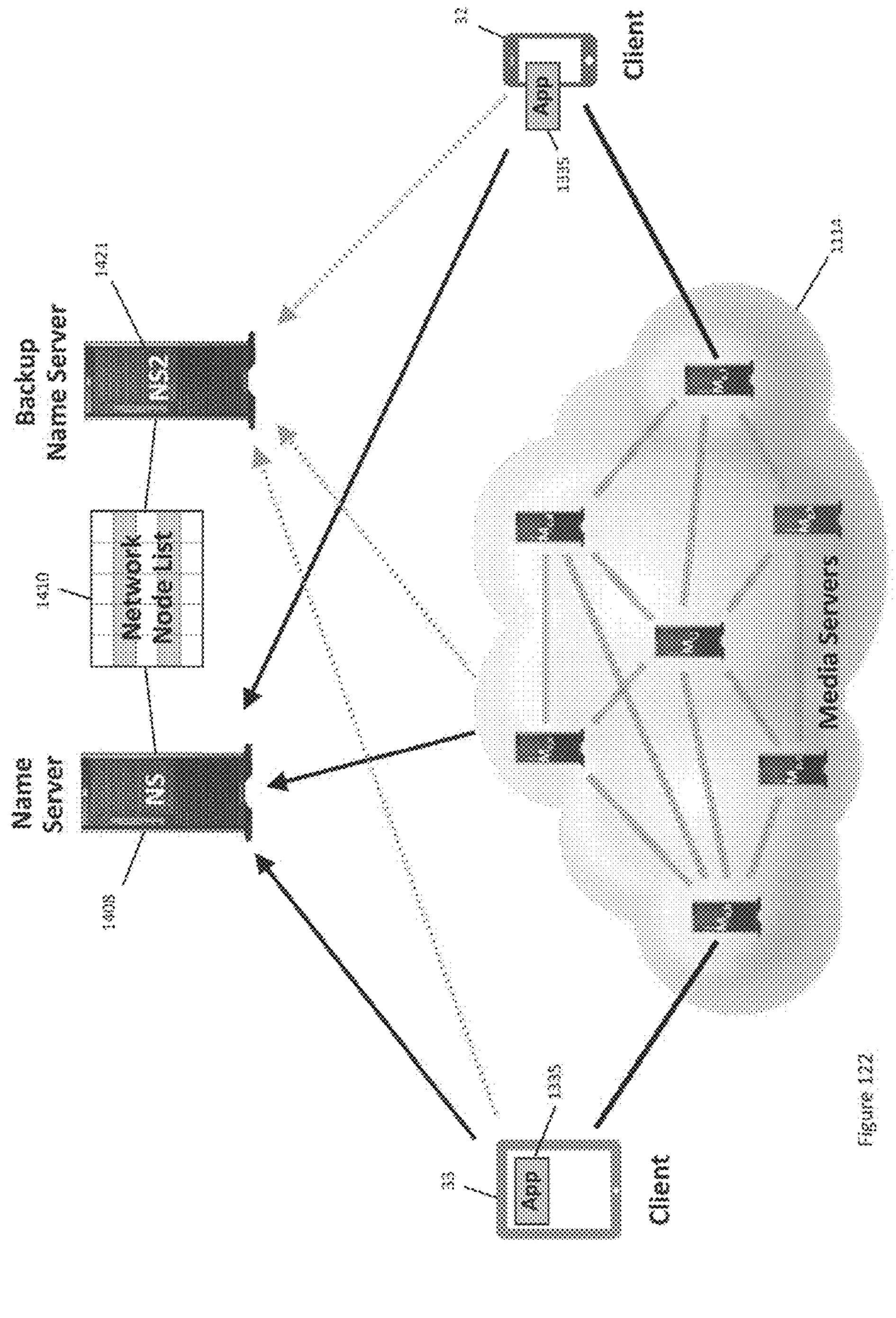

FIG. 122 is a schematic diagram showing SDNP redundant name servers.

Figure 123:
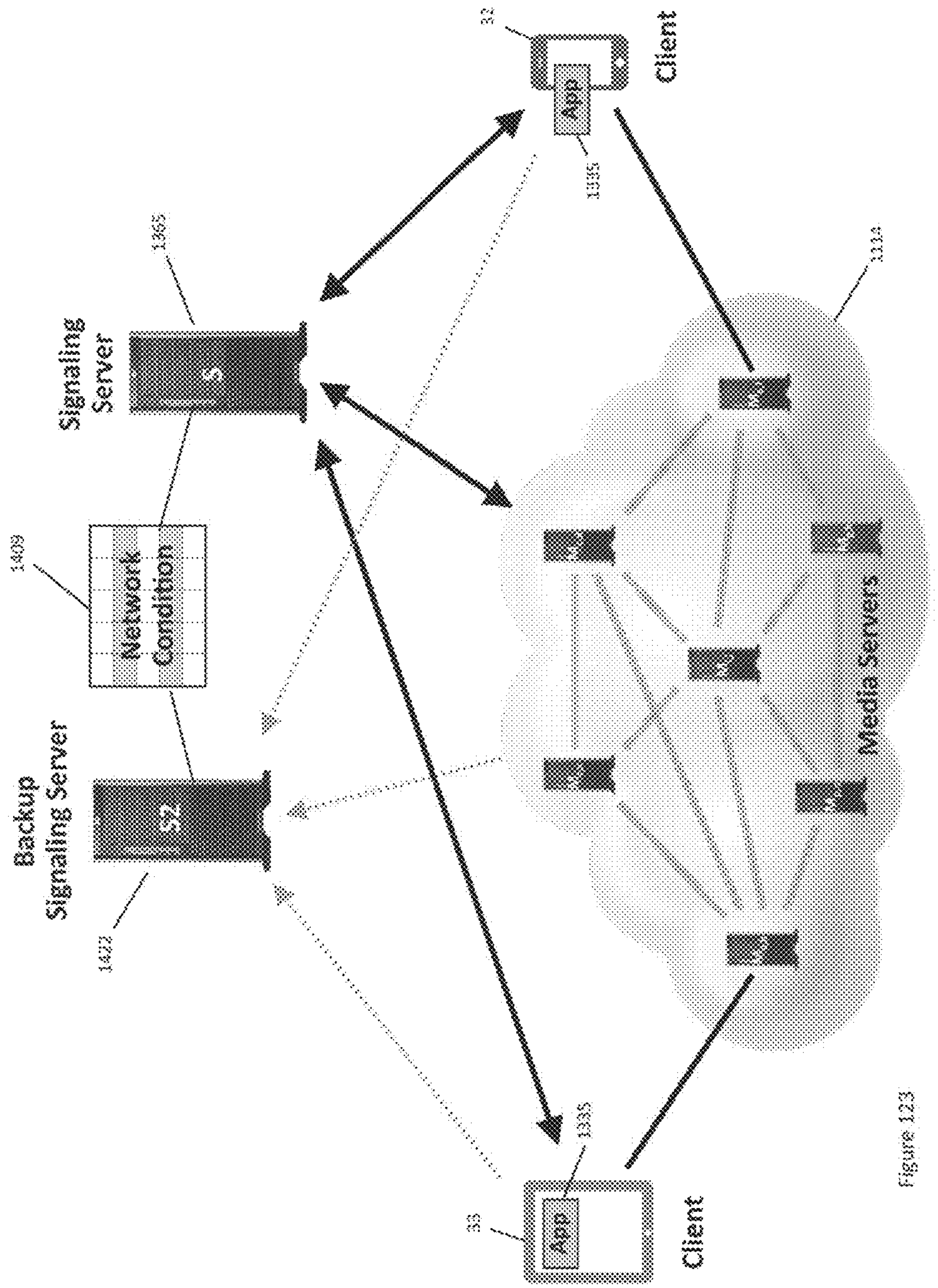

FIG. 123 is a schematic diagram showing SDNP redundant signaling servers.

Figure 124A:
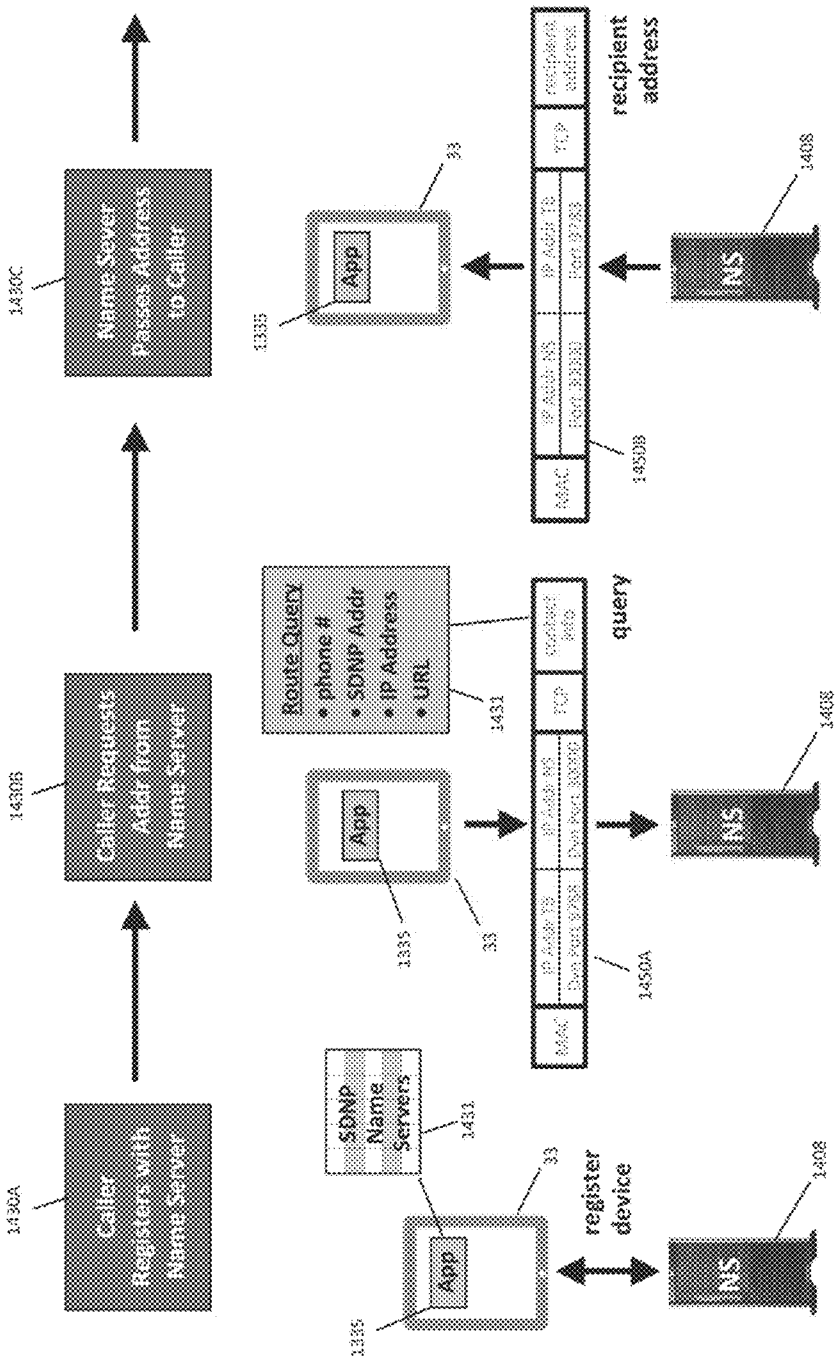

FIG. 124A is a flow chart showing tri-channel SDNP communication, part 1.

Figure 124B:
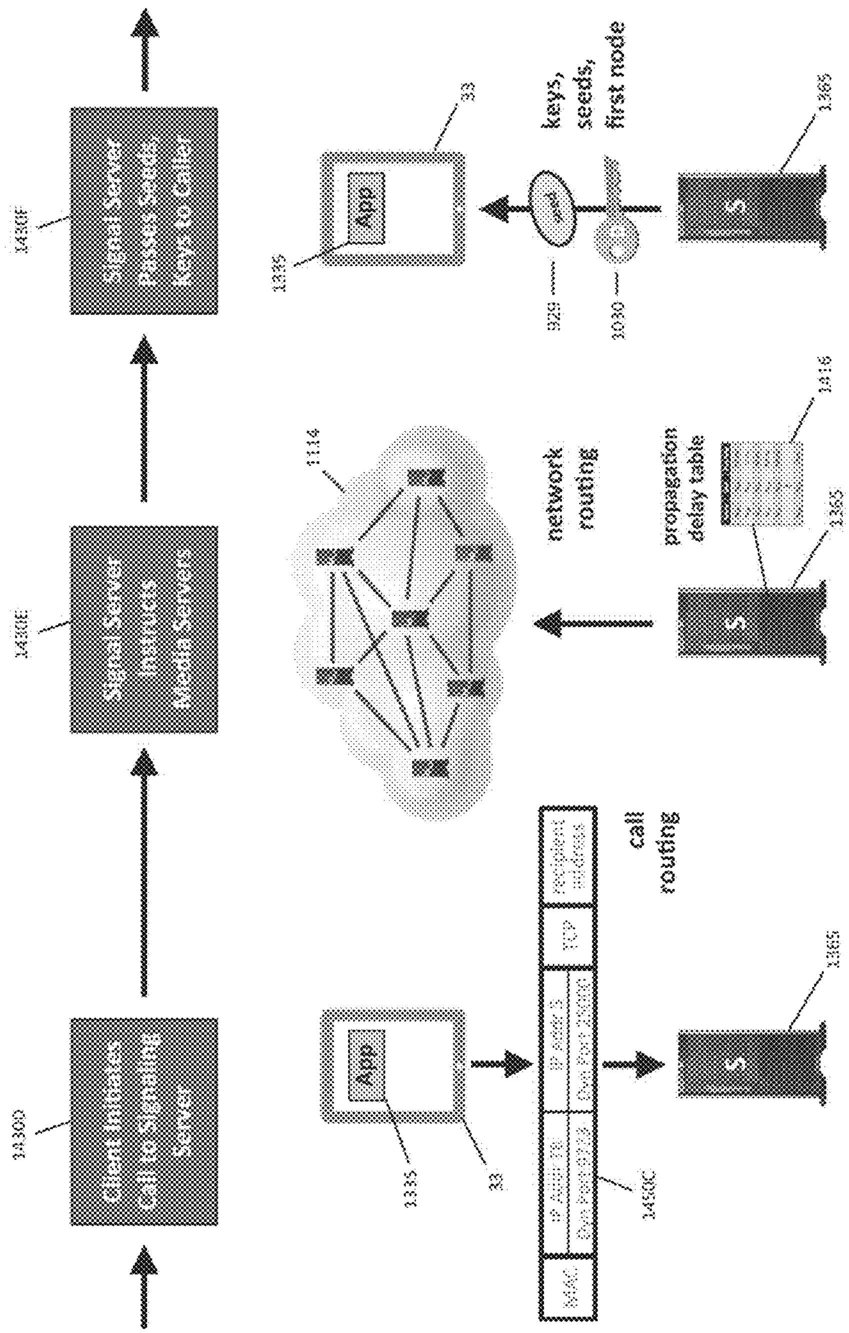

FIG. 124B is a flow chart showing tri-channel SDNP communication, part 2.

Figure 124C:
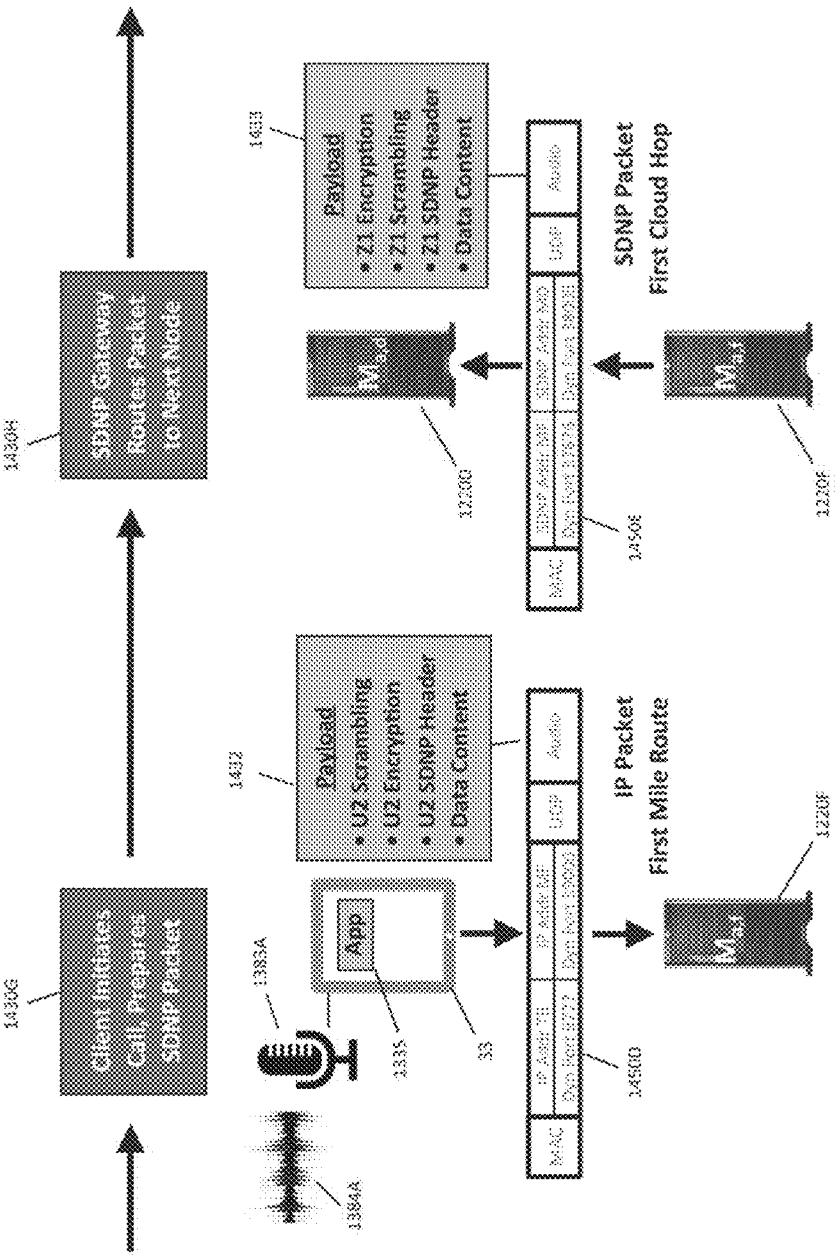

FIG. 124C is a flow chart showing tri-channel SDNP communication, part 3.

Figure 124D:
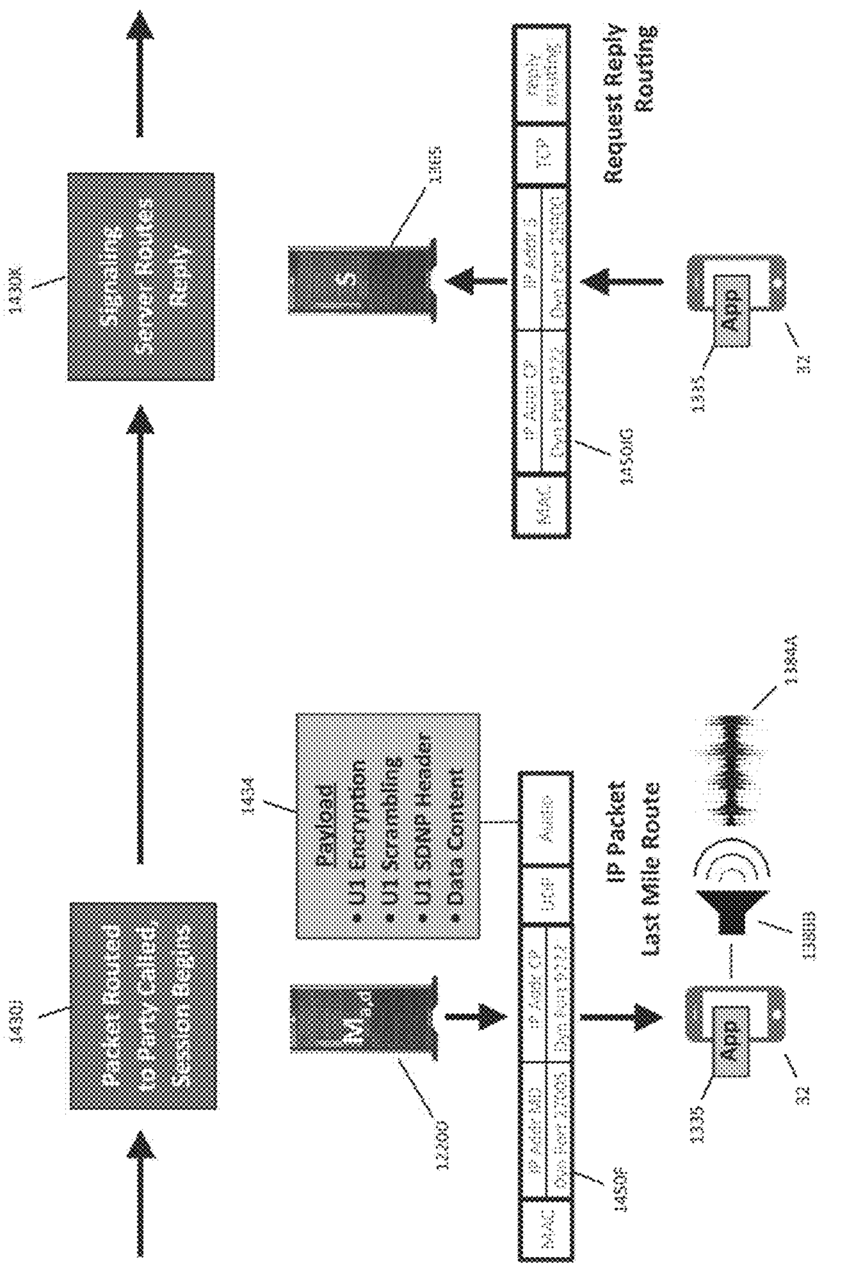

FIG. 124D is a flow chart showing tri-channel SDNP communication, part 4.

Figure 124E:
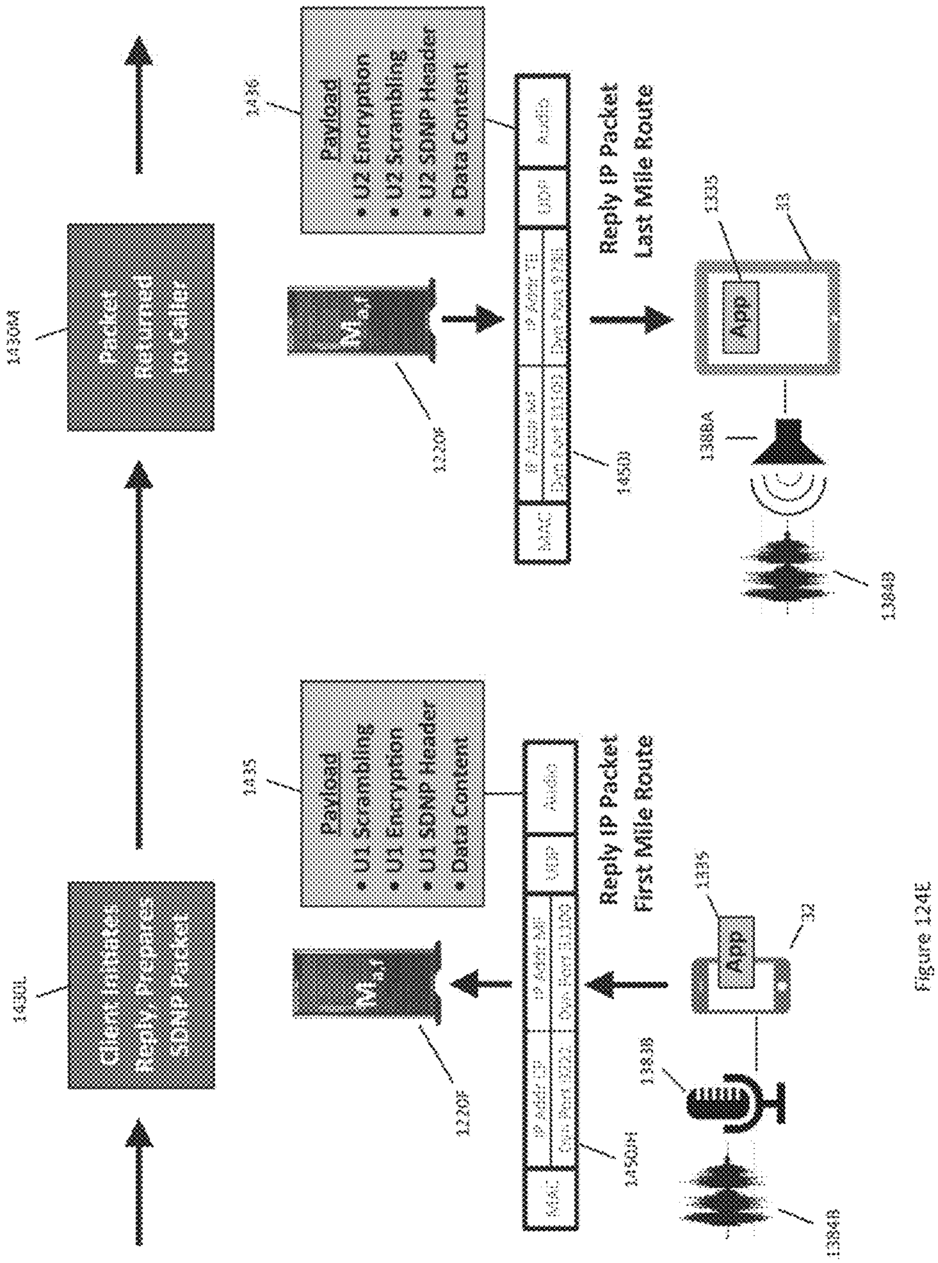

FIG. 124E is a flow chart showing tri-channel SDNP communication, part 5.

Figure 125A:
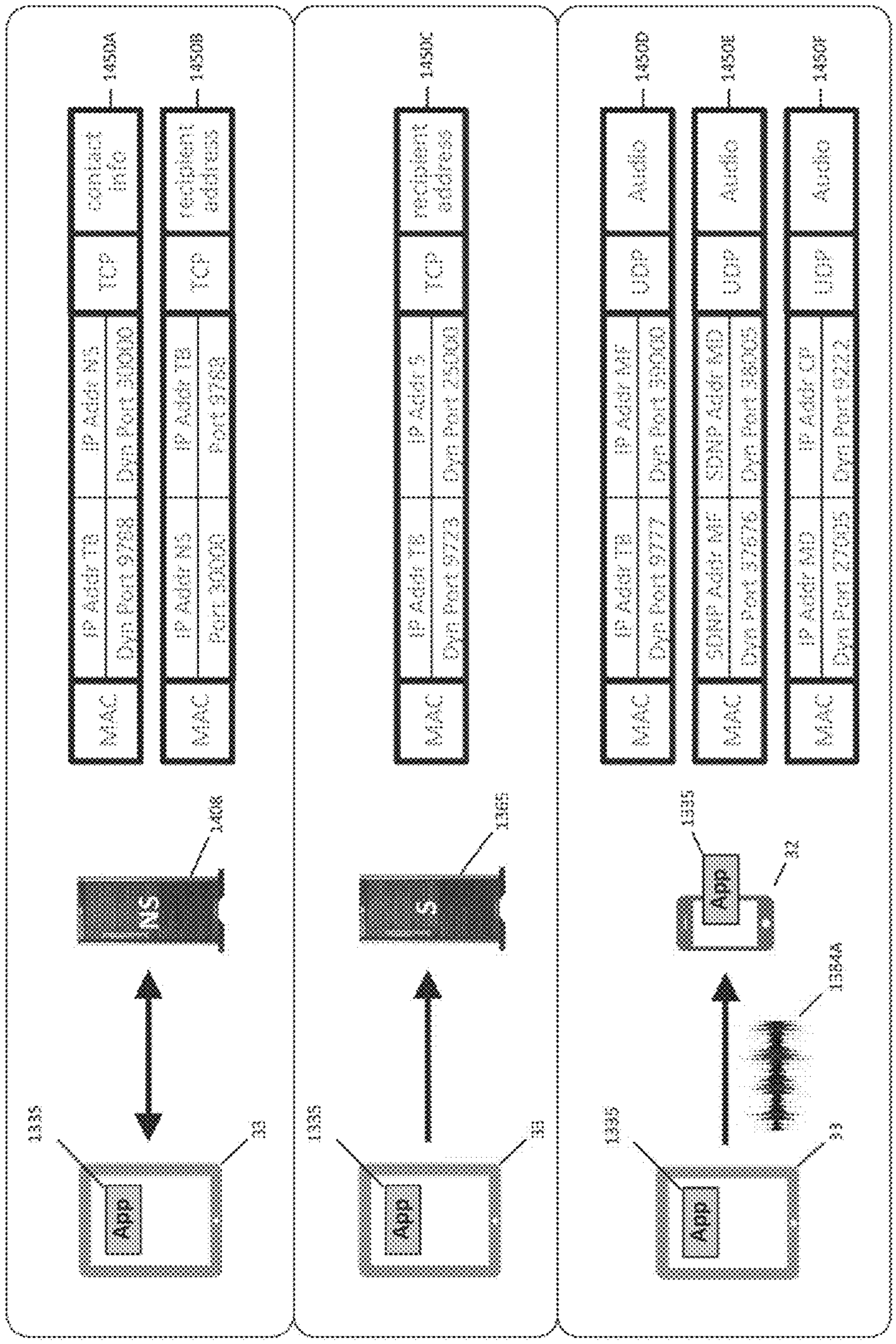

FIG. 125A is a flow chart summarizing an SDNP tri-channel packet sending sequence.

Figure 125B:
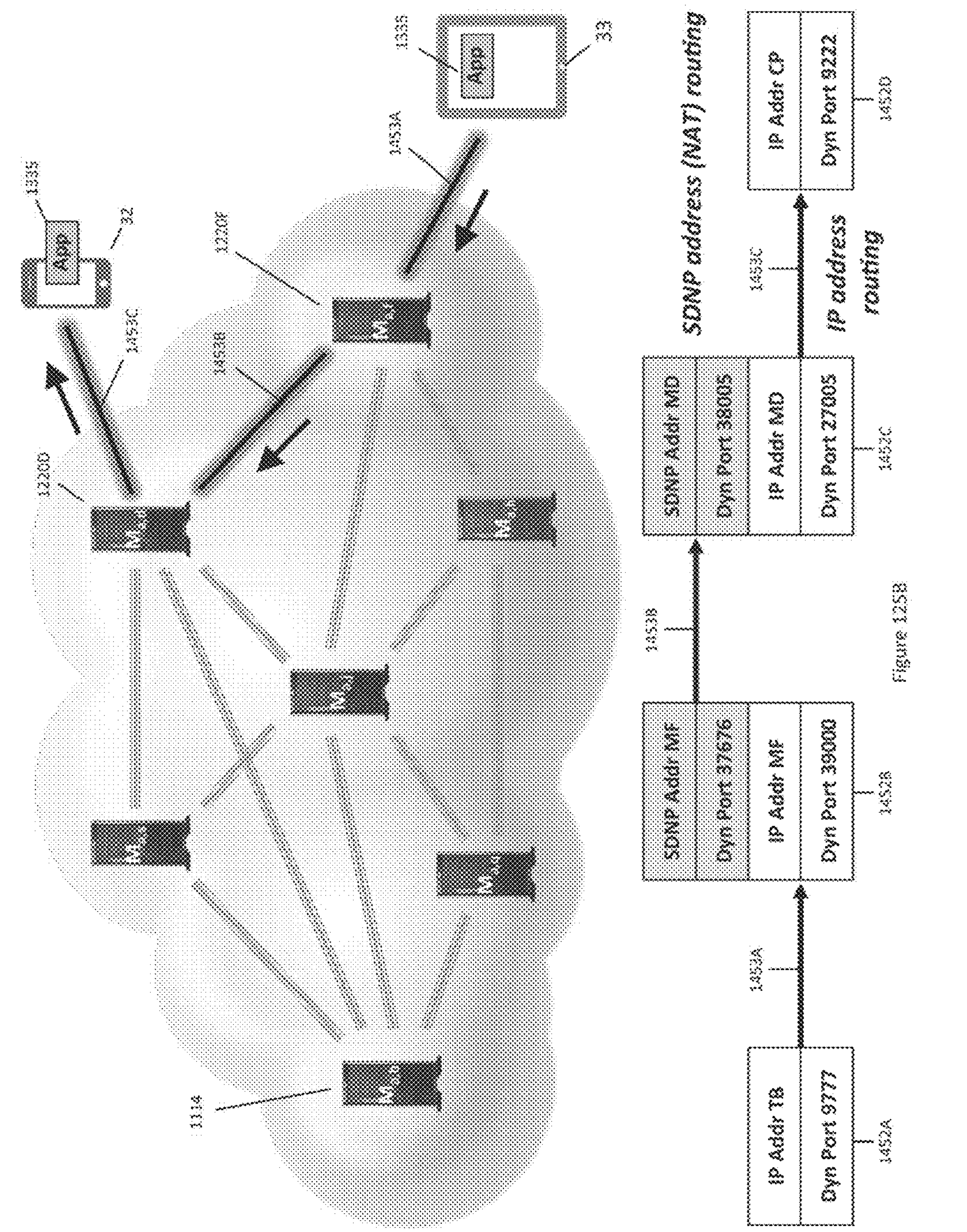

FIG. 125B is a network map summarizing an SDNP tri-channel packet sending routing.

Figure 126A:
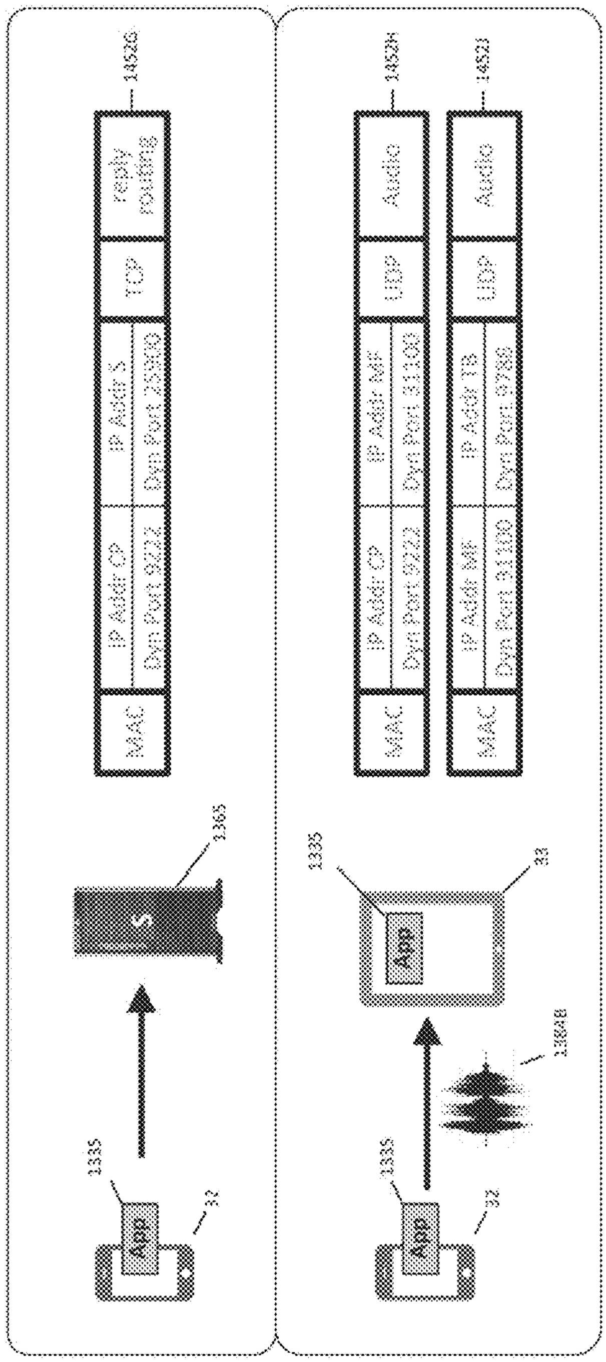

FIG. 126A is a flow chart summarizing an SDNP tri-channel packet reply sequence.

Figure 126B:
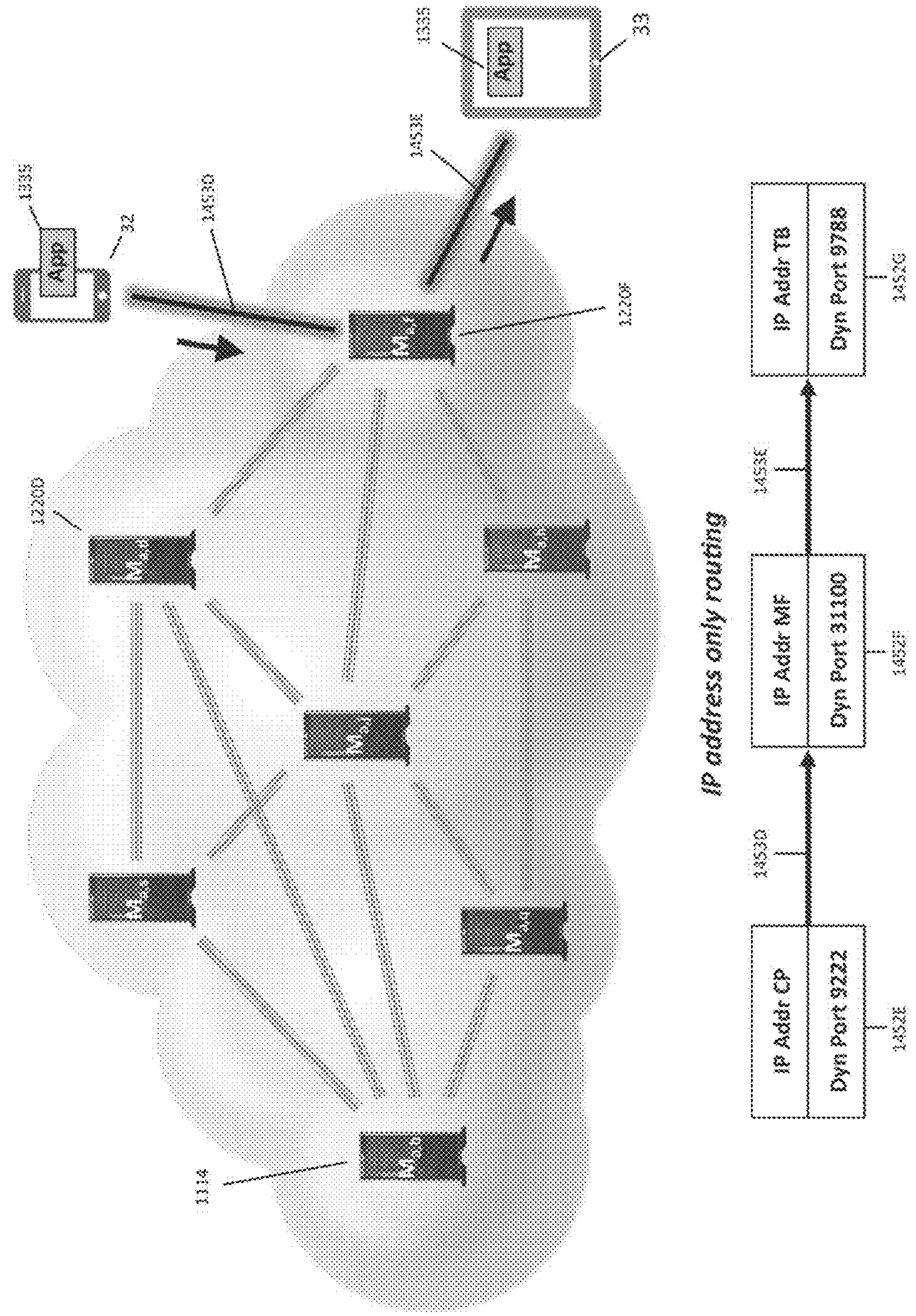

FIG. 126B is a network map summarizing an SDNP tri-channel packet reply routing.

Figure 126C:
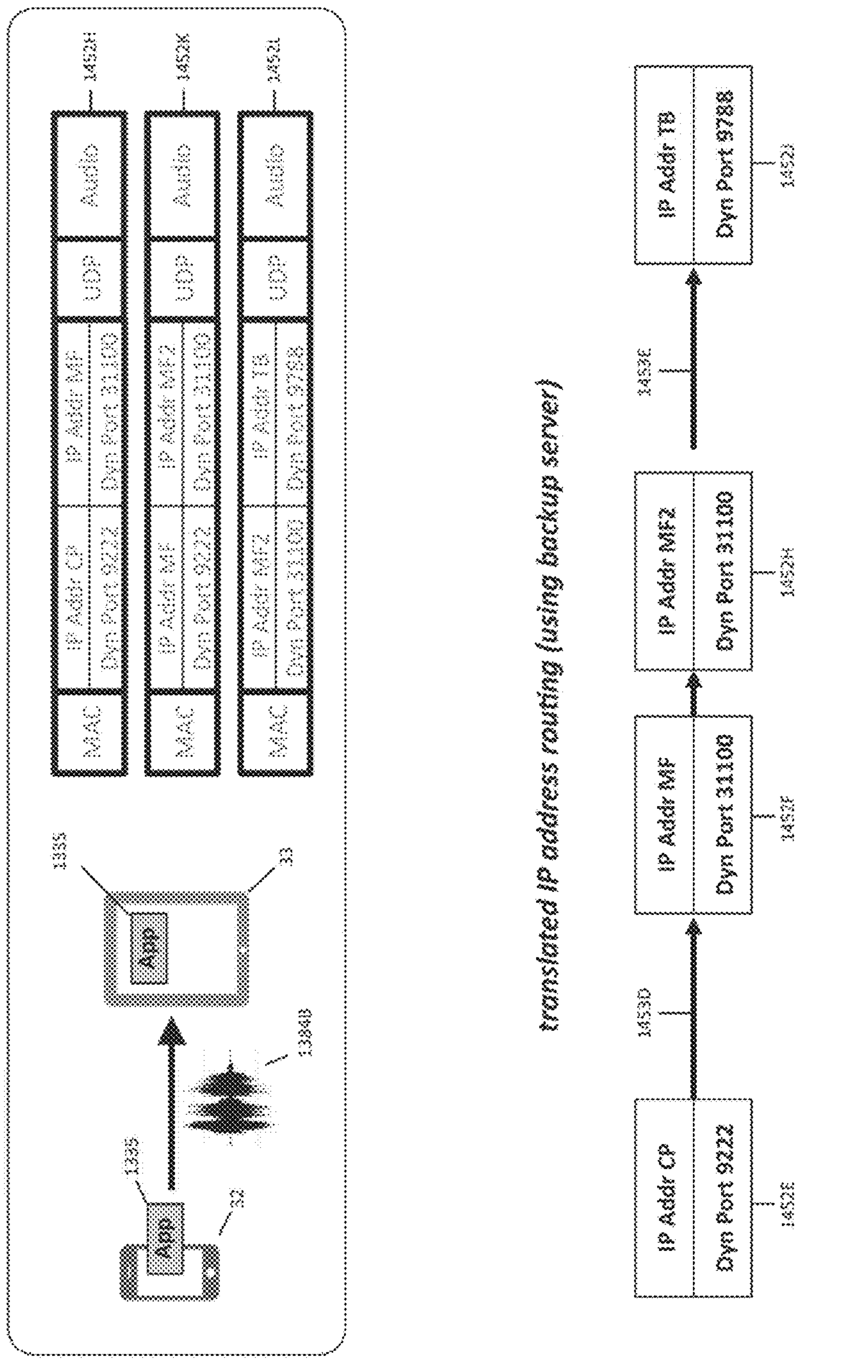

FIG. 126C is a flow chart summarizing an alternate embodiment of the SDNP tri-channel packet reply sequence.

Figure 127:
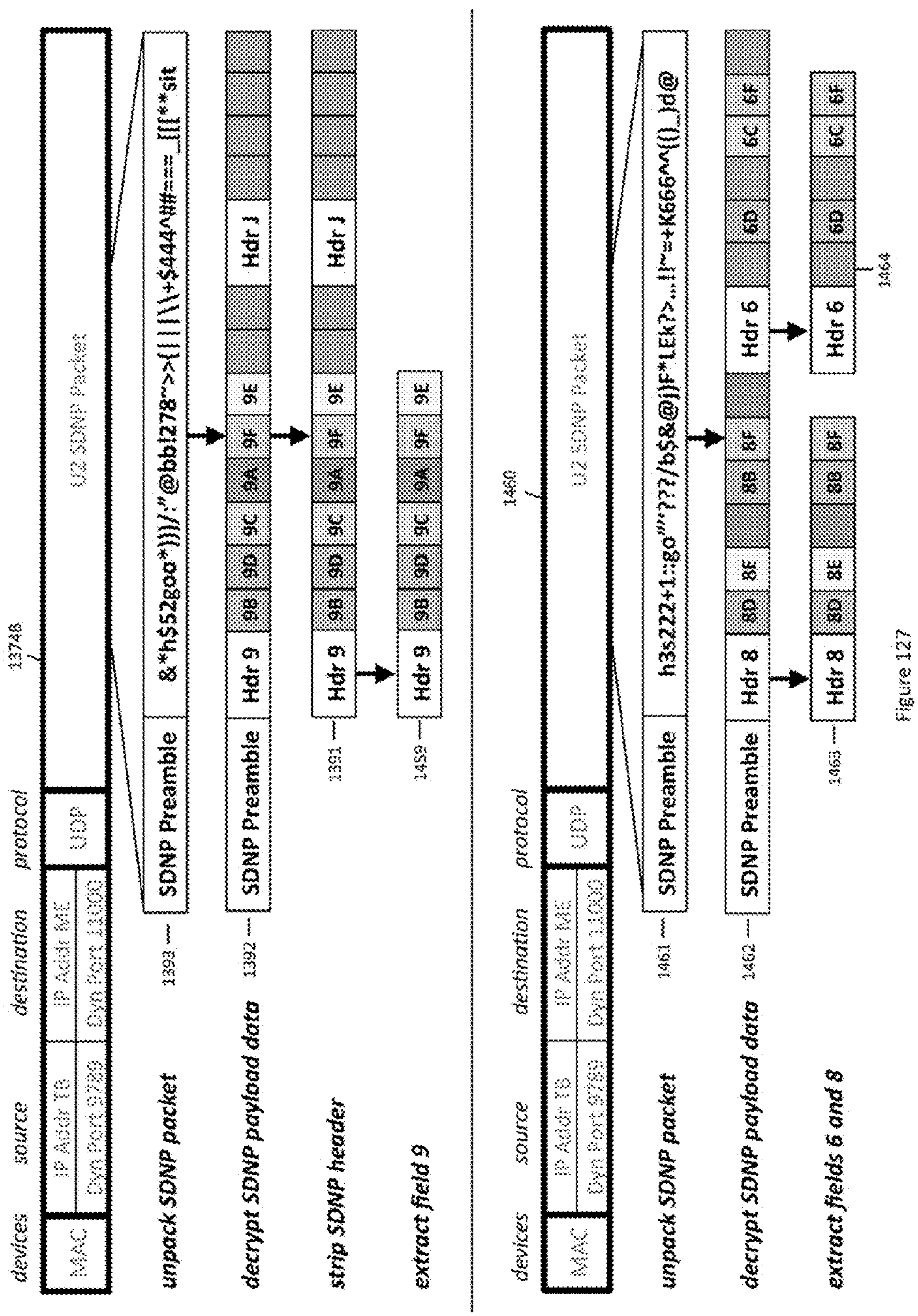

FIG. 127 is a schematic diagram showing SDNP node packet pre-processing.

Figure 128:
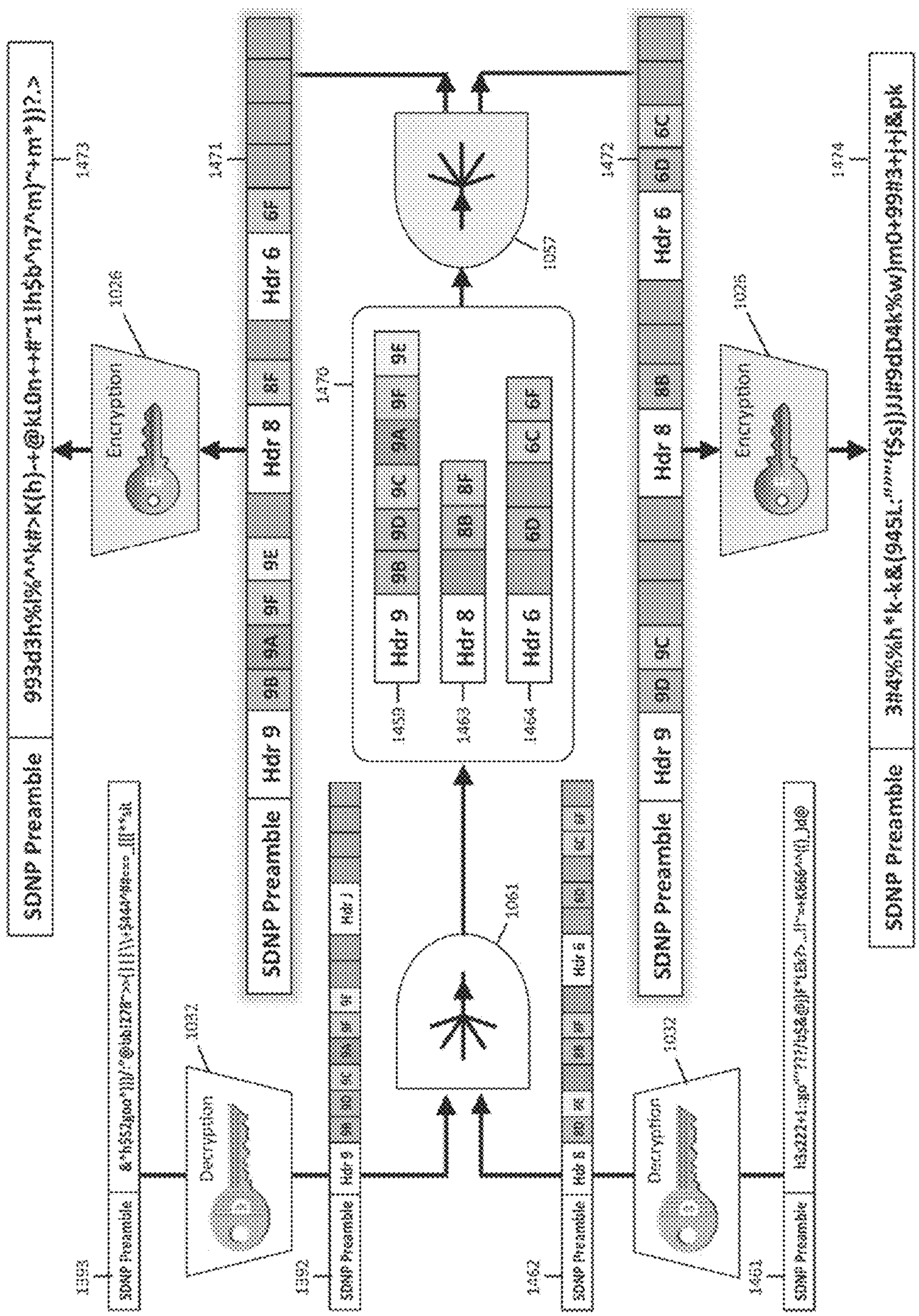

FIG. 128 is a schematic diagram showing SDNP re-packeting.

Figure 129A:
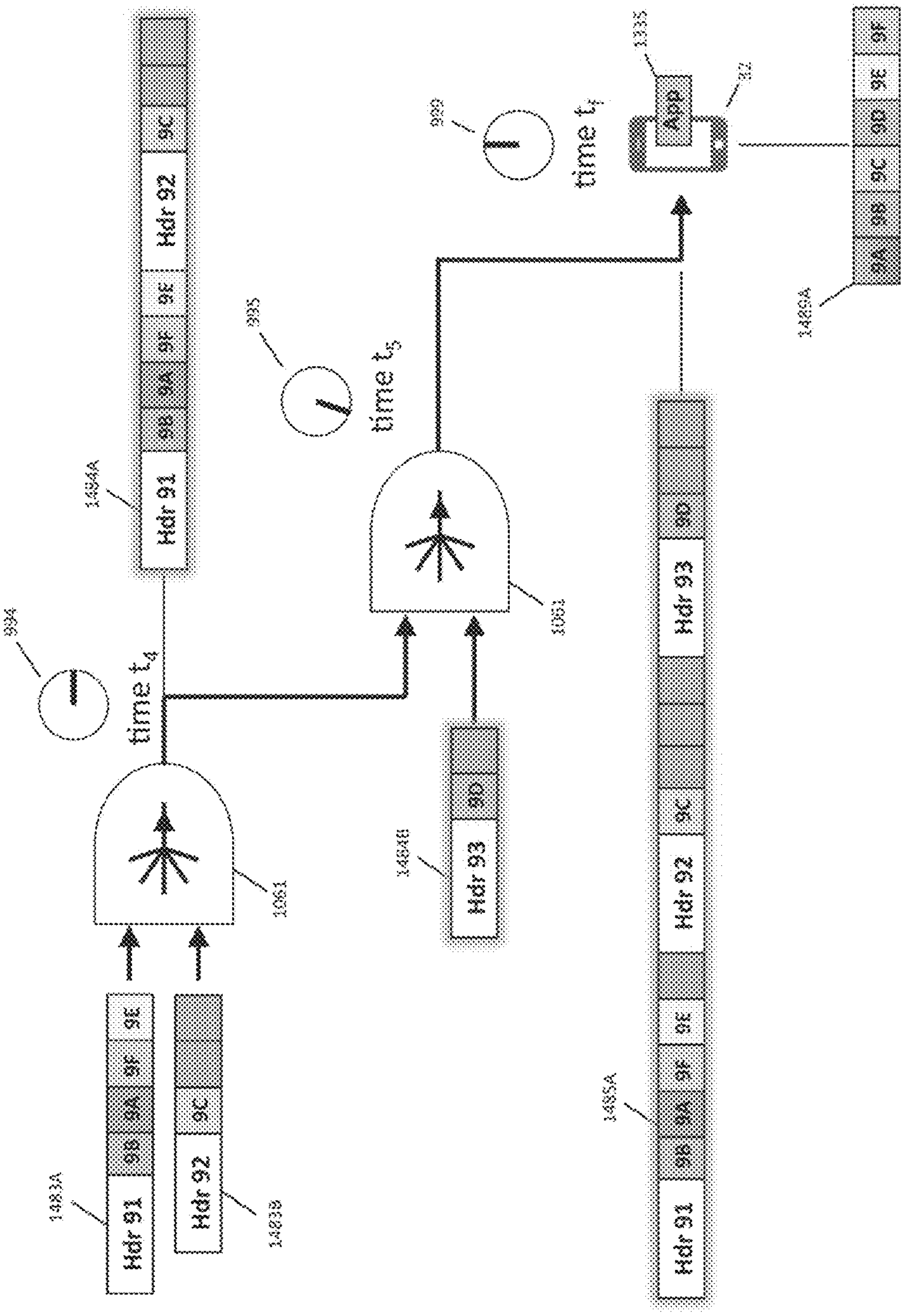

FIG. 129A is a schematic diagram showing last-node real-time packet reconstruction.

Figure 129B:
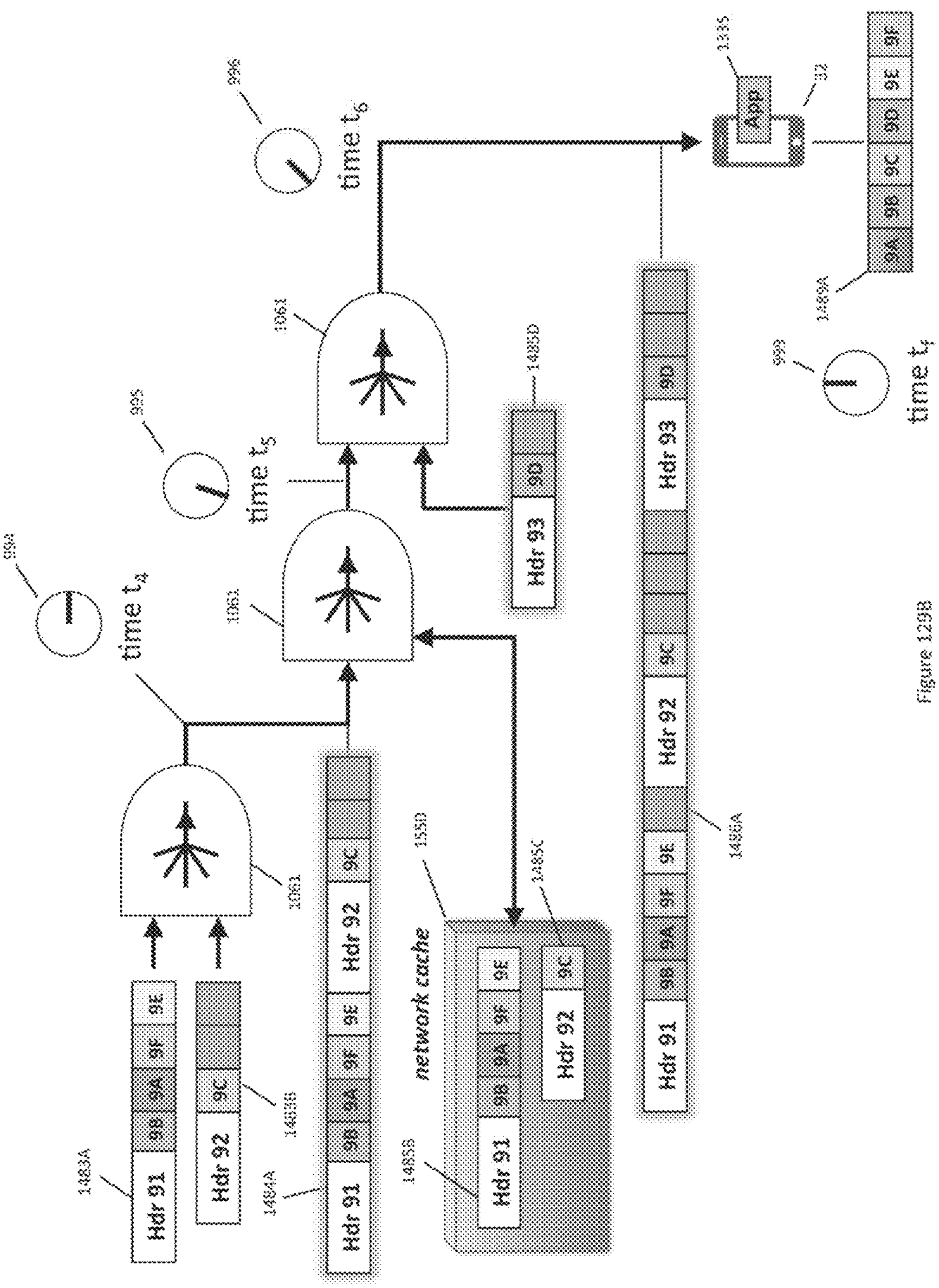

FIG. 129B is a schematic diagram showing buffered last node packet reconstruction.

Figure 129C:
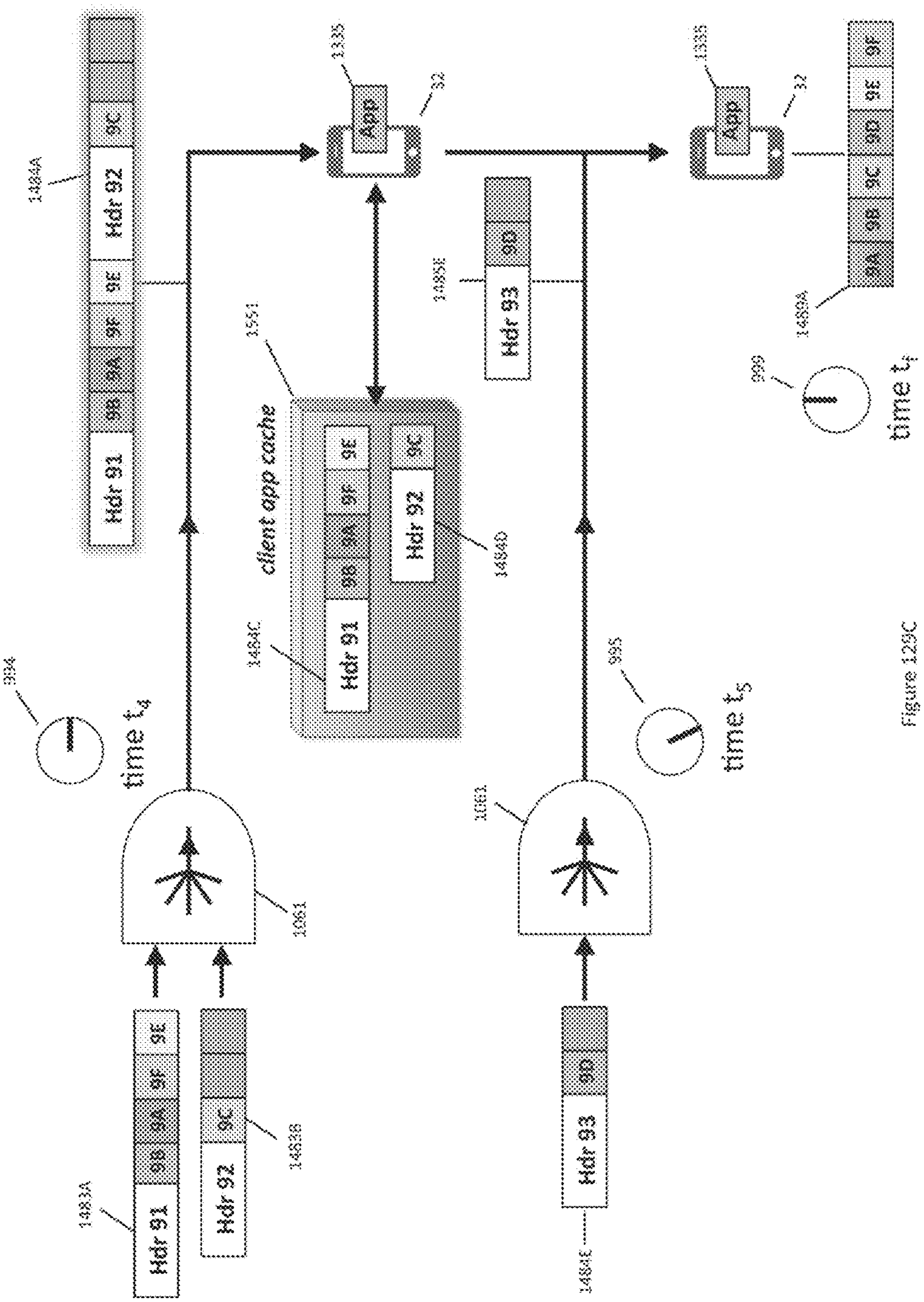

FIG. 129C is a schematic diagram showing buffered client packet reconstruction.

Figure 129D:
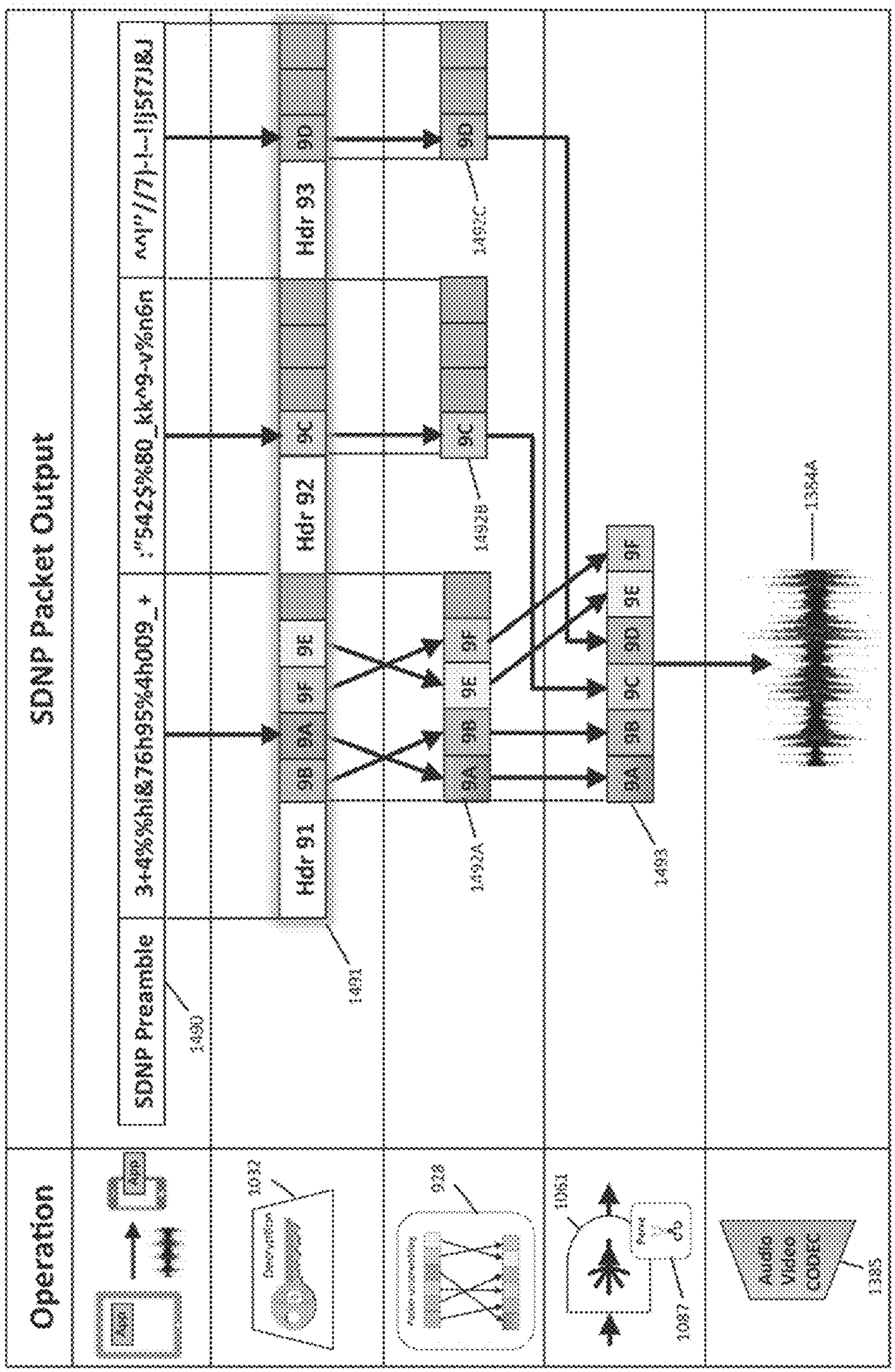

FIG. 129D is a flow chart summarizing client packet construction.

Figure 130:
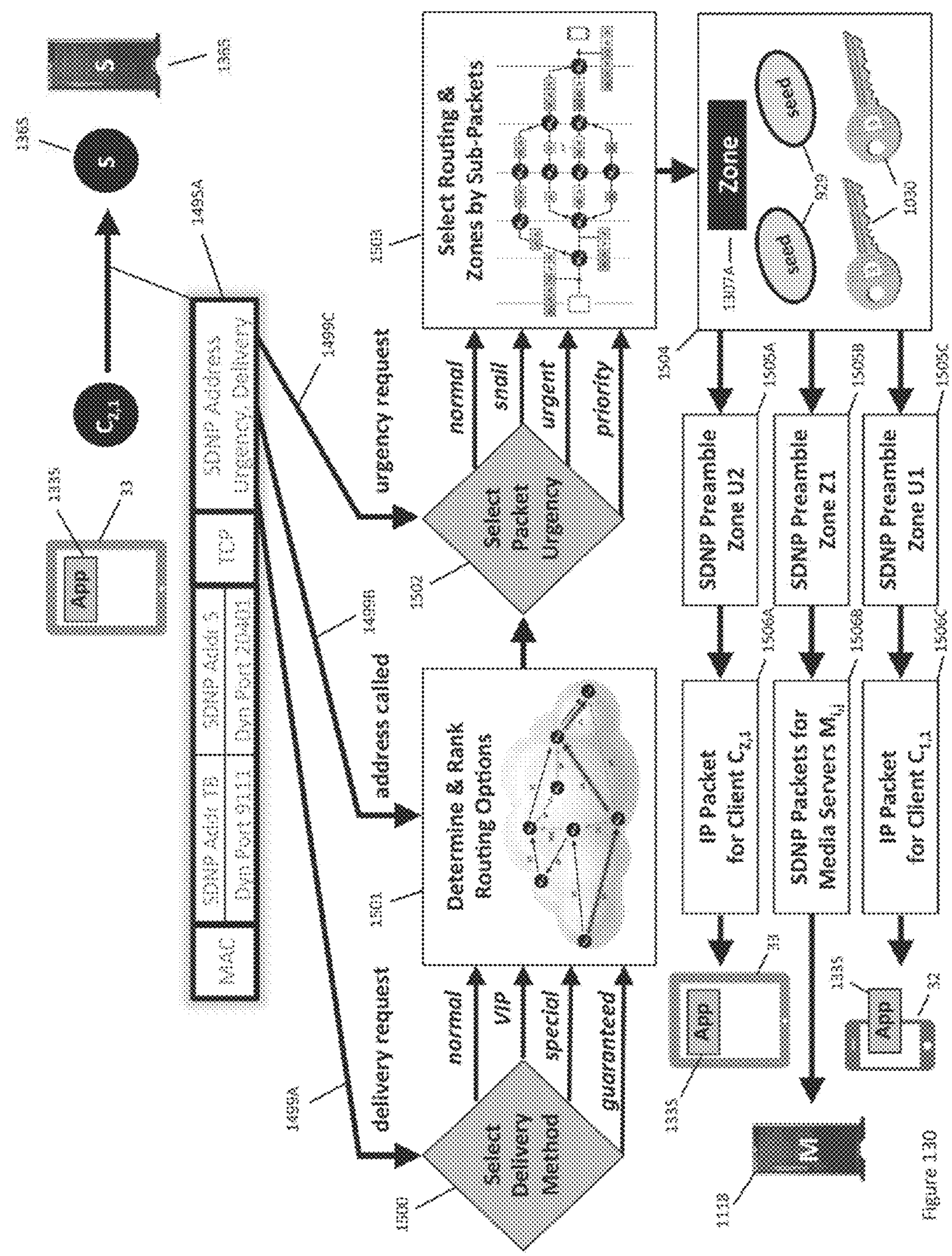

FIG. 130 is a schematic diagram showing SDNP command and control signal packets.

Figure 131:
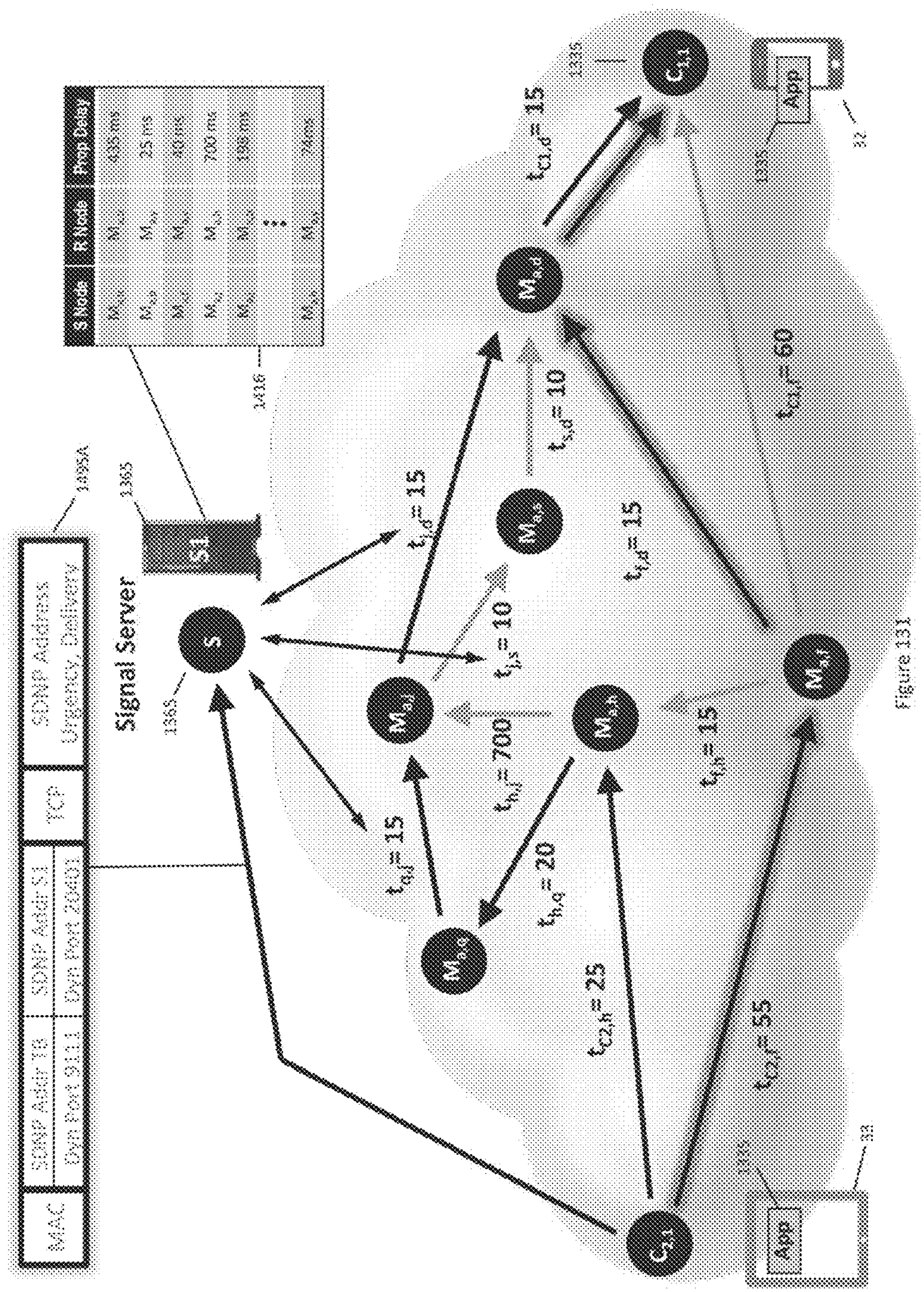

FIG. 131 is a schematic diagram showing SDNP dynamic route discovery.

Figure 132A:
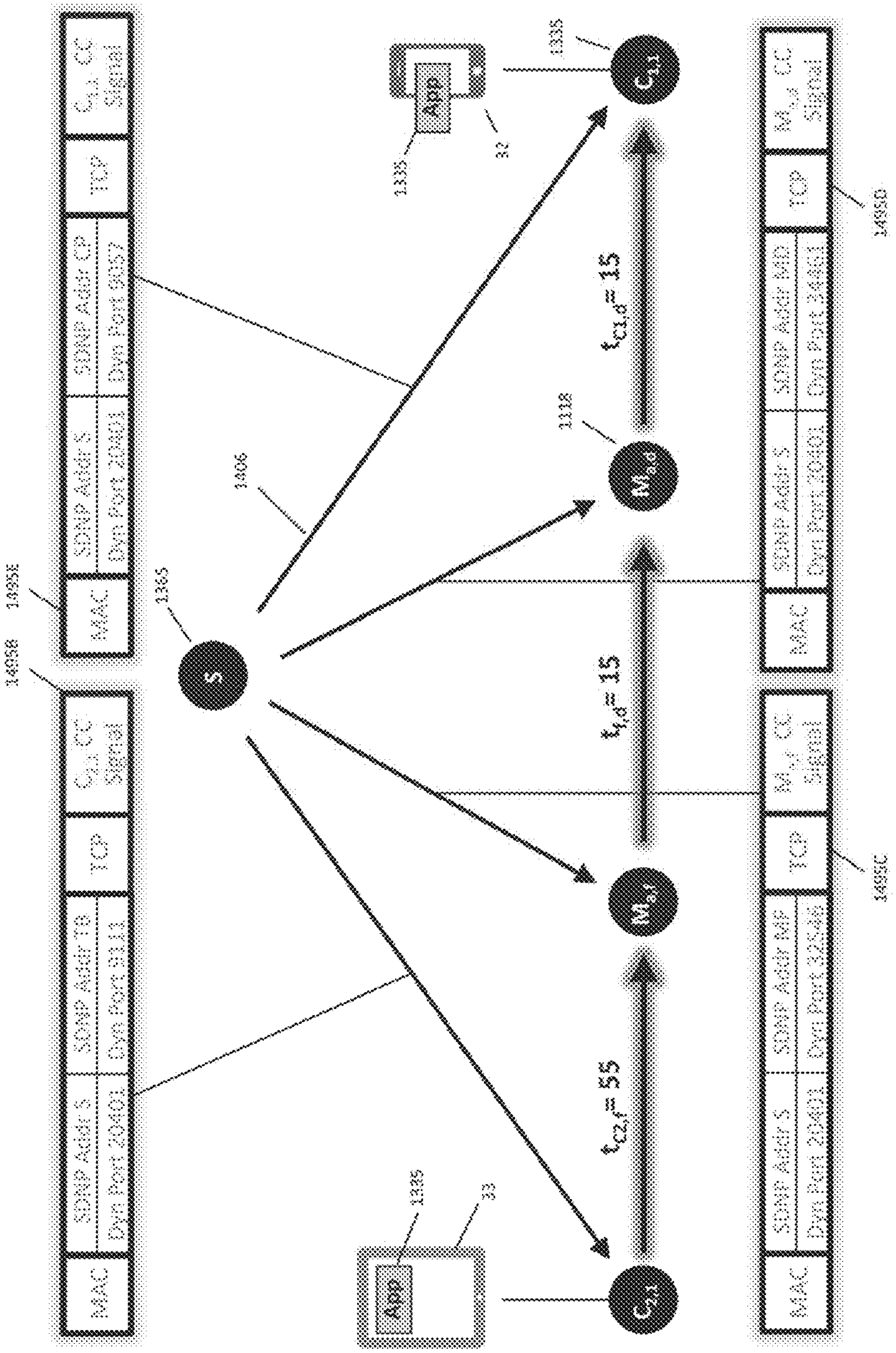

FIG. 132A is a flow chart showing command and control signal packets, path 1-1.

Figure 132B:
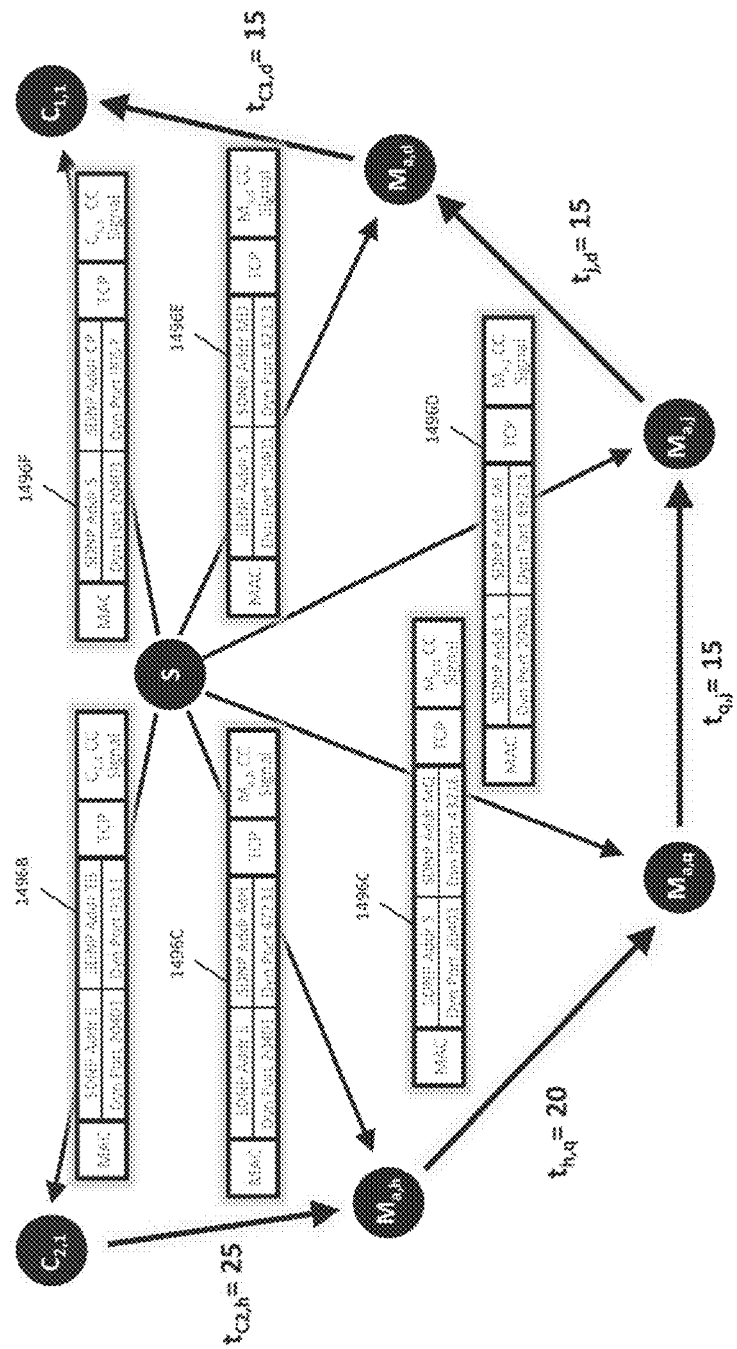

FIG. 132B is a flow chart showing command and control signal packets, path 1-2.

Figure 132C:
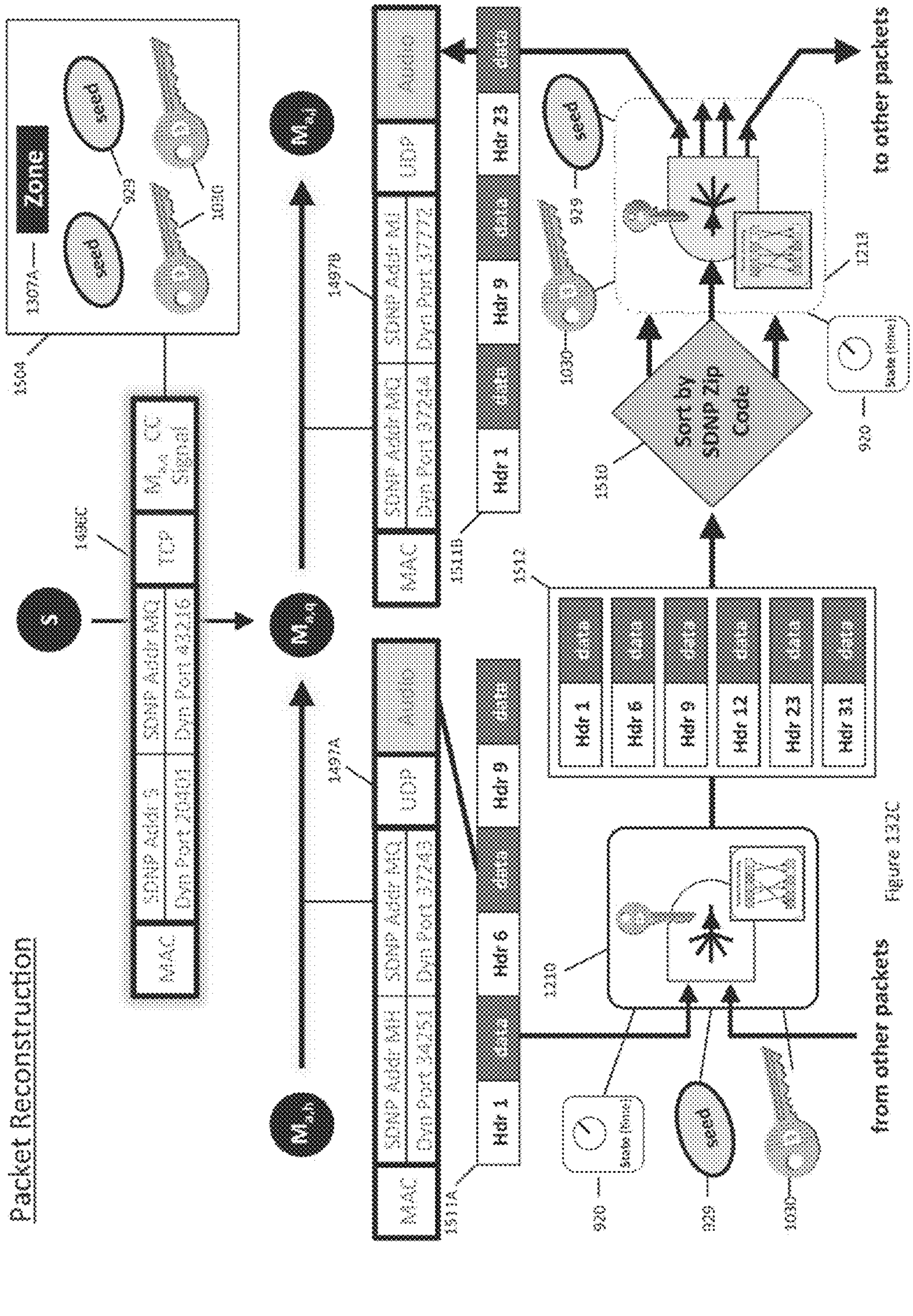

FIG. 132C is a schematic diagram showing SDNP packet reconstruction.

Figure 133A:
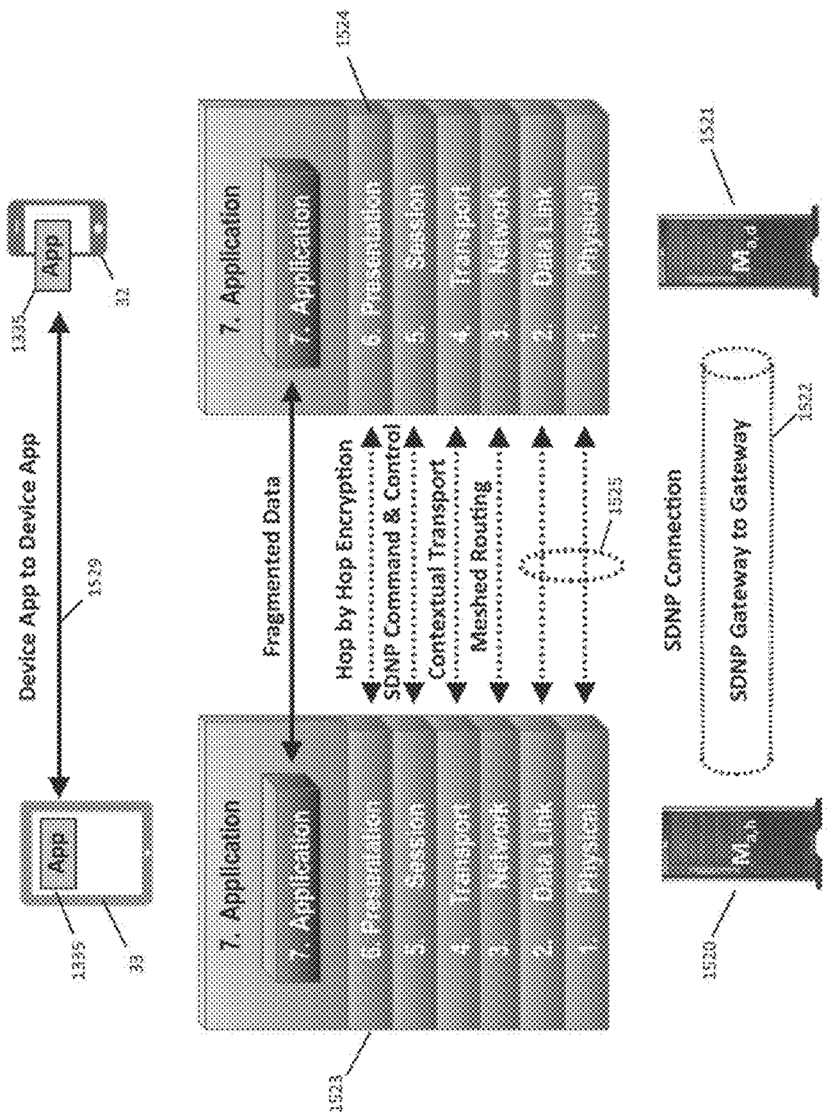

FIG. 133A is a schematic diagram showing an OSI-layer representation of SDNP fragmented transport.

Figure 133B:
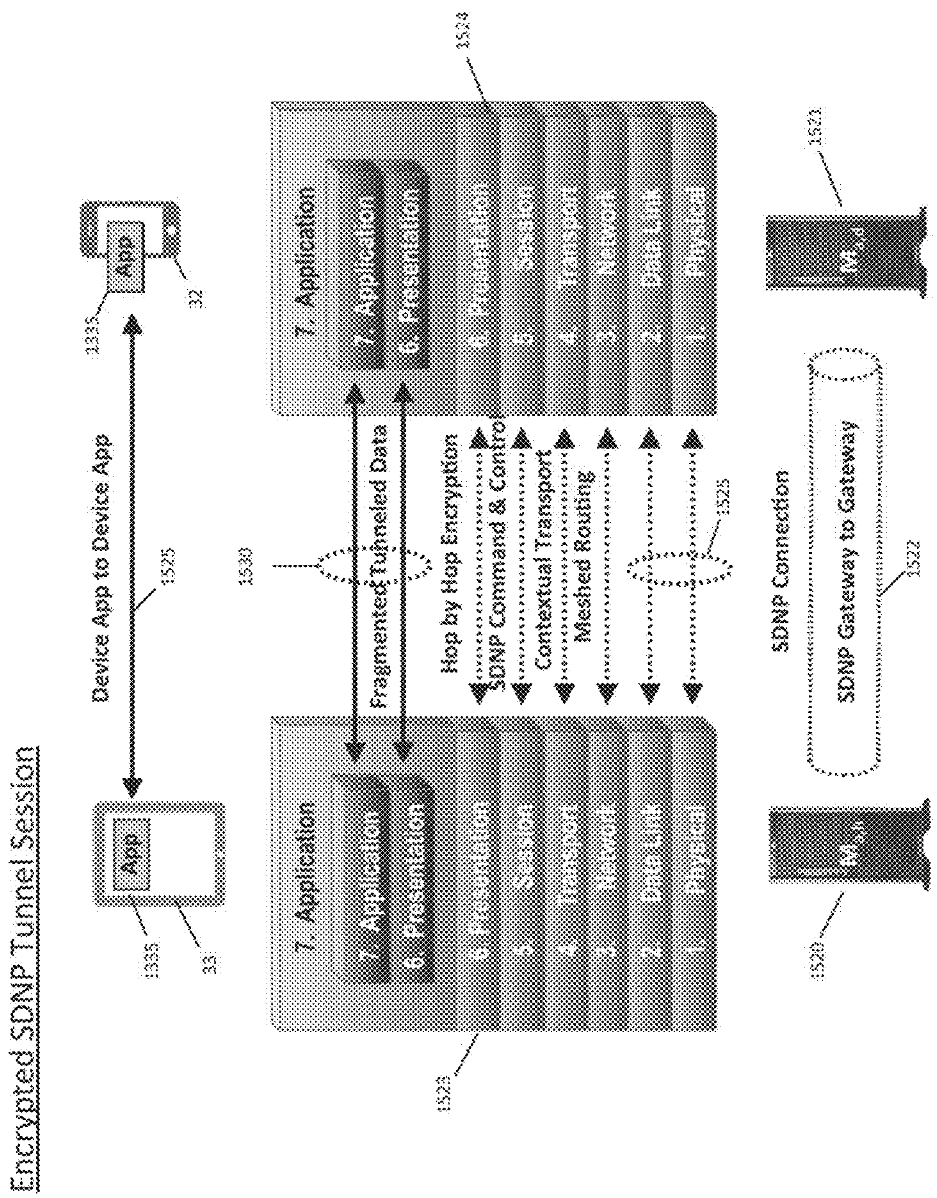

FIG. 133B is a schematic diagram showing an OSI-layer representation of tunneled SDNP fragmented transport.

Figure 134:
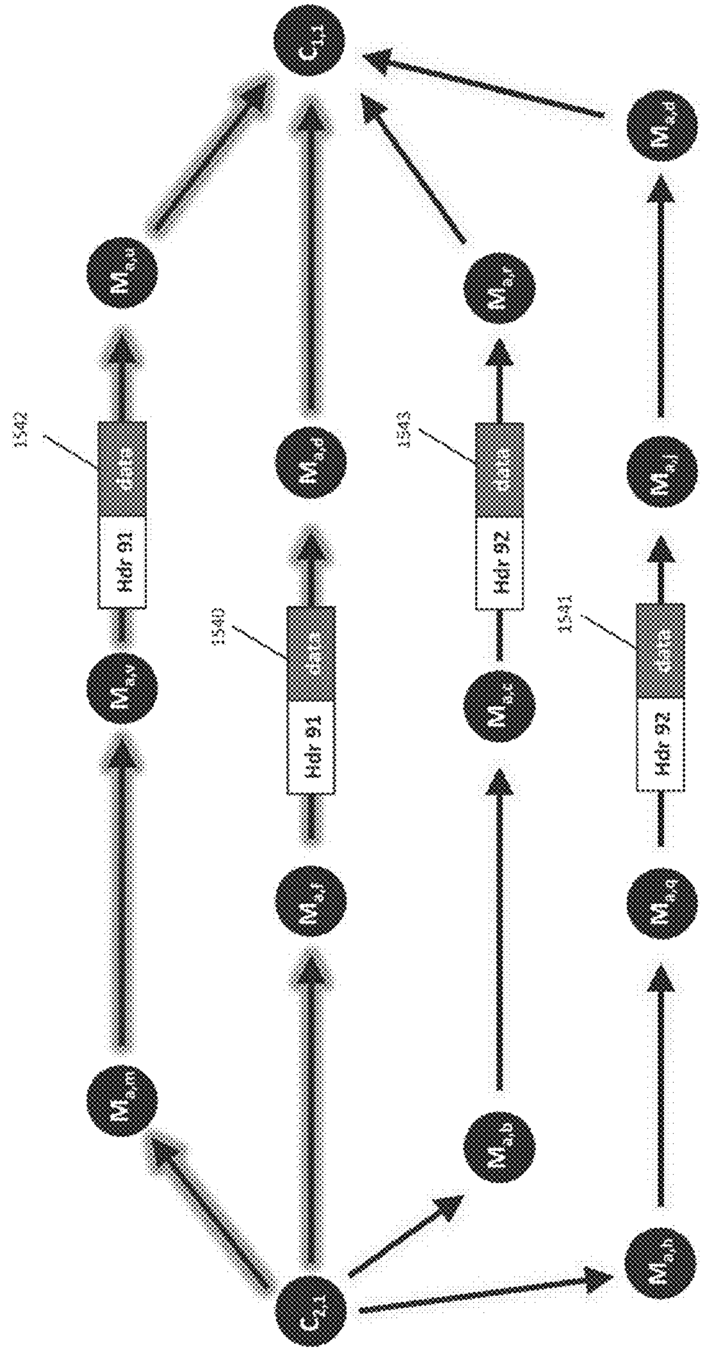

FIG. 134 is a schematic diagram showing SDNP packet race routing.

FIG. 135 is a table comparing SDNP communication to other packet-switched network communication.

DESCRIPTION OF THE INVENTION

After nearly one-and-a-half centuries of circuit-switched telephony, today's communication systems and networks have within only a decade all migrated to packet-switched communication using the Internet Protocol carried by Ethernet, WiFi, 4G/LTE, and DOCSIS3 data over cable and optical fiber. The benefits of comingling voice, text, pictures, video, and data are many, including the use of redundant paths to insure reliable IP packet delivery, i.e. the reason the Internet was created in the first place, along with an unparalleled level of system interoperability and connectivity across the globe. With any innovation, however, the magnitude of challenges new technology creates often match the benefits derived.

Disadvantages of Existing Communication Providers

As detailed throughout the background section of this disclosure, present-day communication suffers from many disadvantages. The highest performance communication systems today, comprising custom digital hardware owned by the world's major long-distance carriers such as AT&T, Verizon, NTT, Vodaphone, etc., generally offer superior voice quality but at a high cost including expensive monthly subscription fees, connection fees, long-distance fees, complex data rate plans, long-distance roaming charges, and numerous service fees. Because these networks are private, the actual data security is not publically known, and security infractions, hacks, and break-ins are generally not reported to the public. Given the number of wire taps and privacy invasions reported in the press today, private carrier communication security remains suspect, if not in their private cloud, in the very least in their last-mile connections.

"Internet service providers" or ISPs form another link in the global chain of communications. As described in the background of this invention, voice carried over the Internet using VoIP, or "voice over Internet protocol" suffers from numerous quality-of-service or QoS problems, including

- The Internet, a packet-switched network, is not designed to deliver IP packets in a timely manner or to support real-time applications with low latency and high QoS
- The routing of an IP packet takes an unpredictable path resulting in constantly changing delays, bursts of high data-error rates, and unexpected dropped calls
- IP packet routing is made at the discretion of the Internet service provider, which controls the network within which the packet is routed and may adjust routing for balancing its own network's loading or to better serve its VIP clients at the expense at degrading connection quality of general traffic traversing its network.
- Over-the-top or OTT providers such as Line, KakaoTalk, Viber, etc. catching a free ride on the Internet act as Internet hitchhikers and have no control over the network or factors affecting QoS.
- Using heavyweight audio CODECs that fail to provide comprehendible voice quality audio even at moderate data rates
- VoIP based on the TCP transport protocol suffers from high latency and degraded audio caused by delays induced during handshaking and IP packet rebroadcasting.

Unaided UDP transport provides no guarantee of payload integrity.

Figure 40:
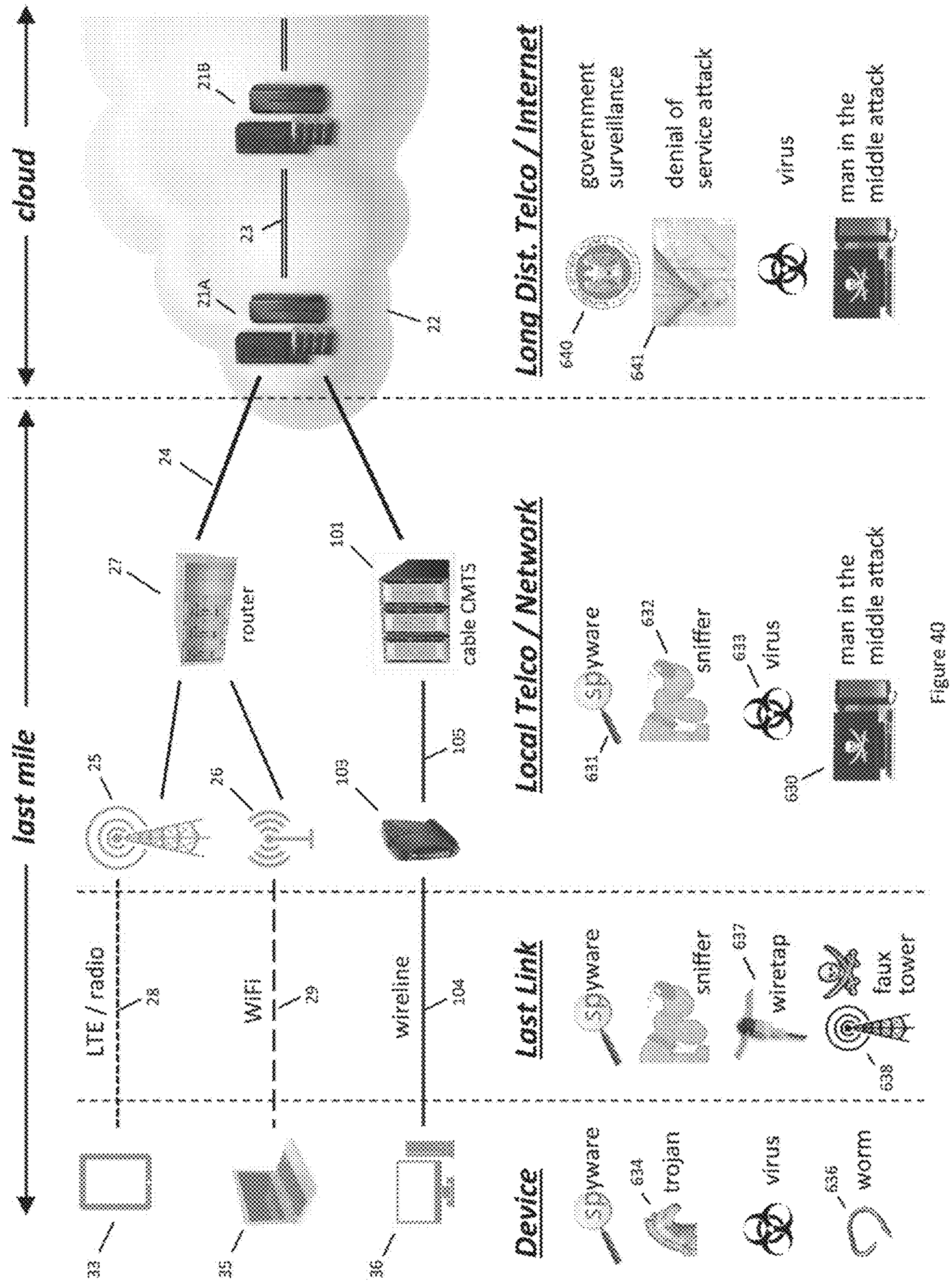
FIG. 40 is simplified representation of cloud and last-mile network connectivity and malware used in cyber-assaults.
Figure 41A:
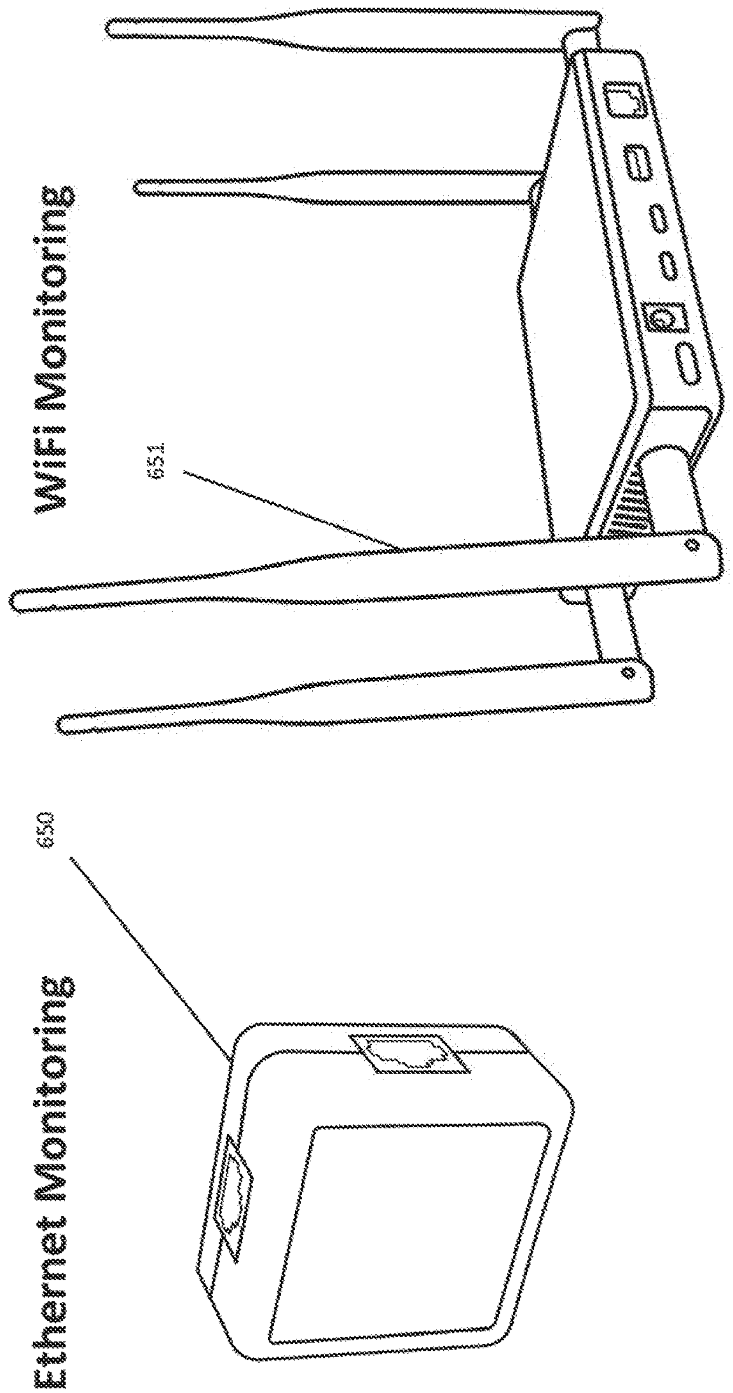
FIG. 41A illustrates electronic devices capable of monitoring Ethernet and WiFi communication.
Figure 41B:
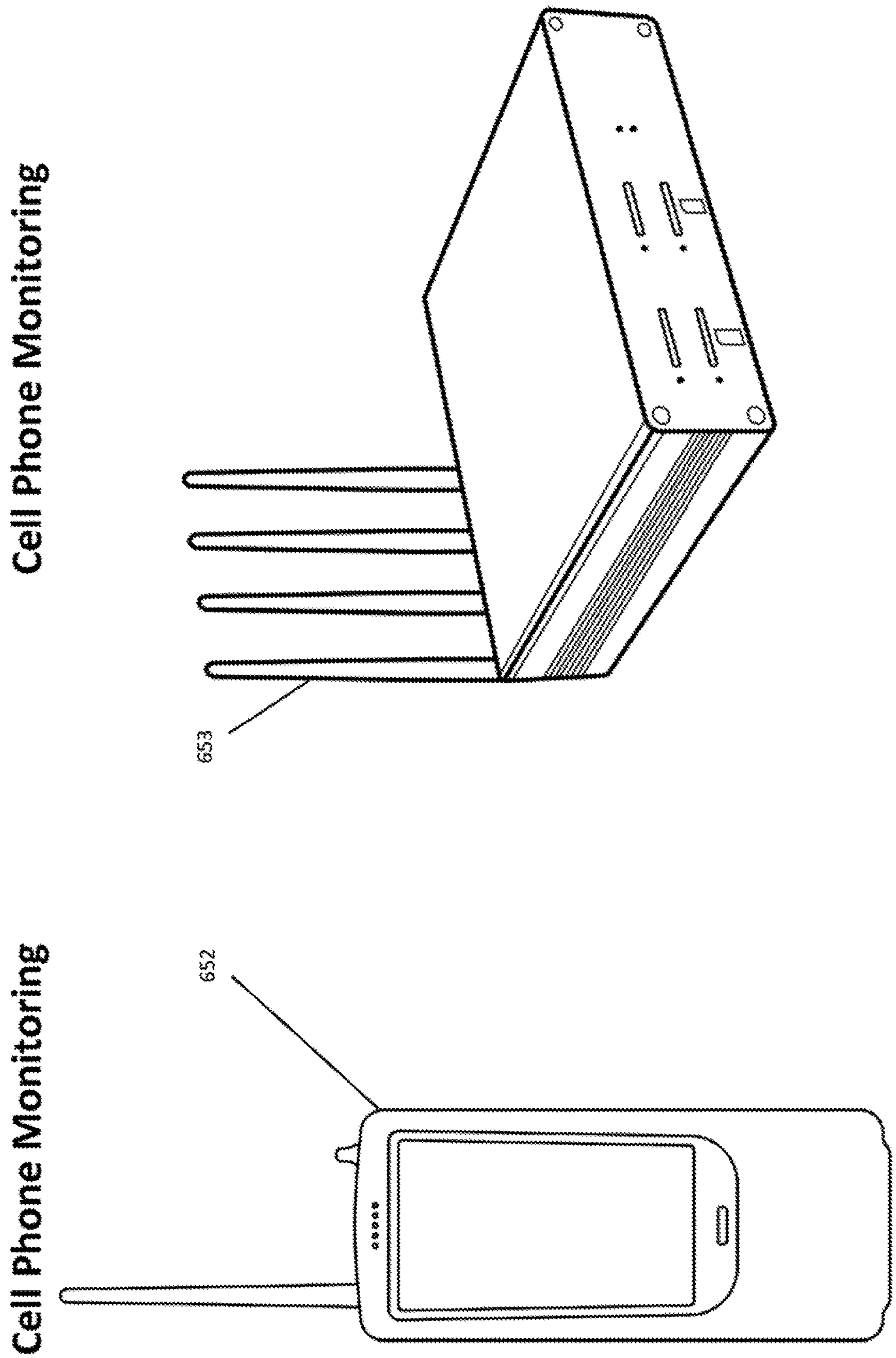
FIG. 41B illustrates electronic devices capable of monitoring cell phone communication.
Figure 41C:
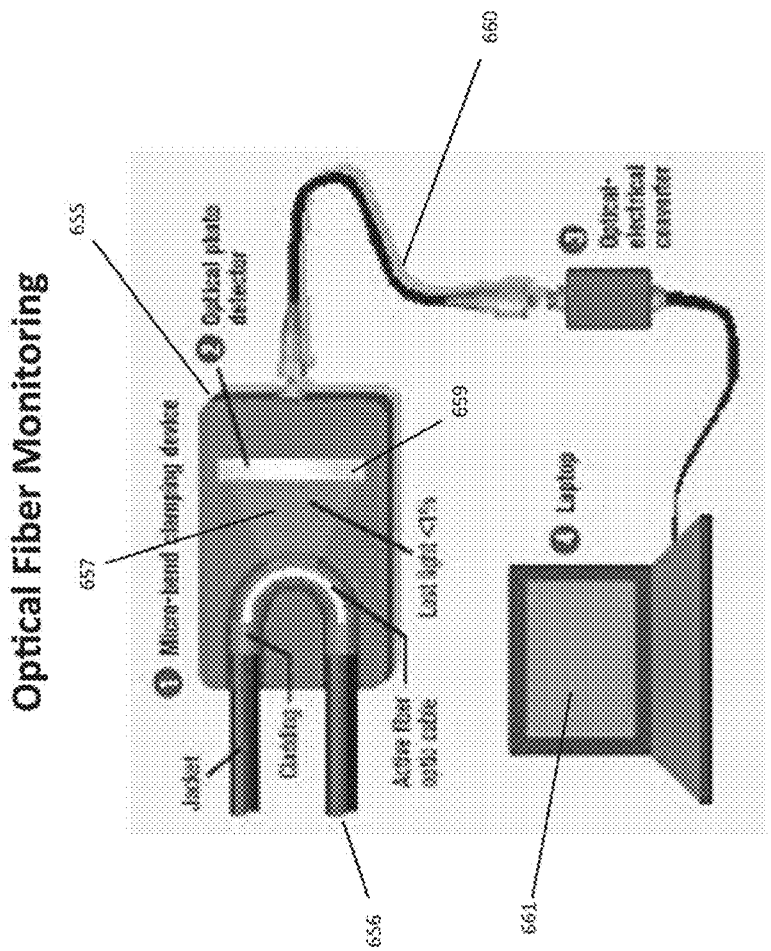
FIG. 41C illustrates an electronic device capable of monitoring optical fiber communication.
Figure 42:
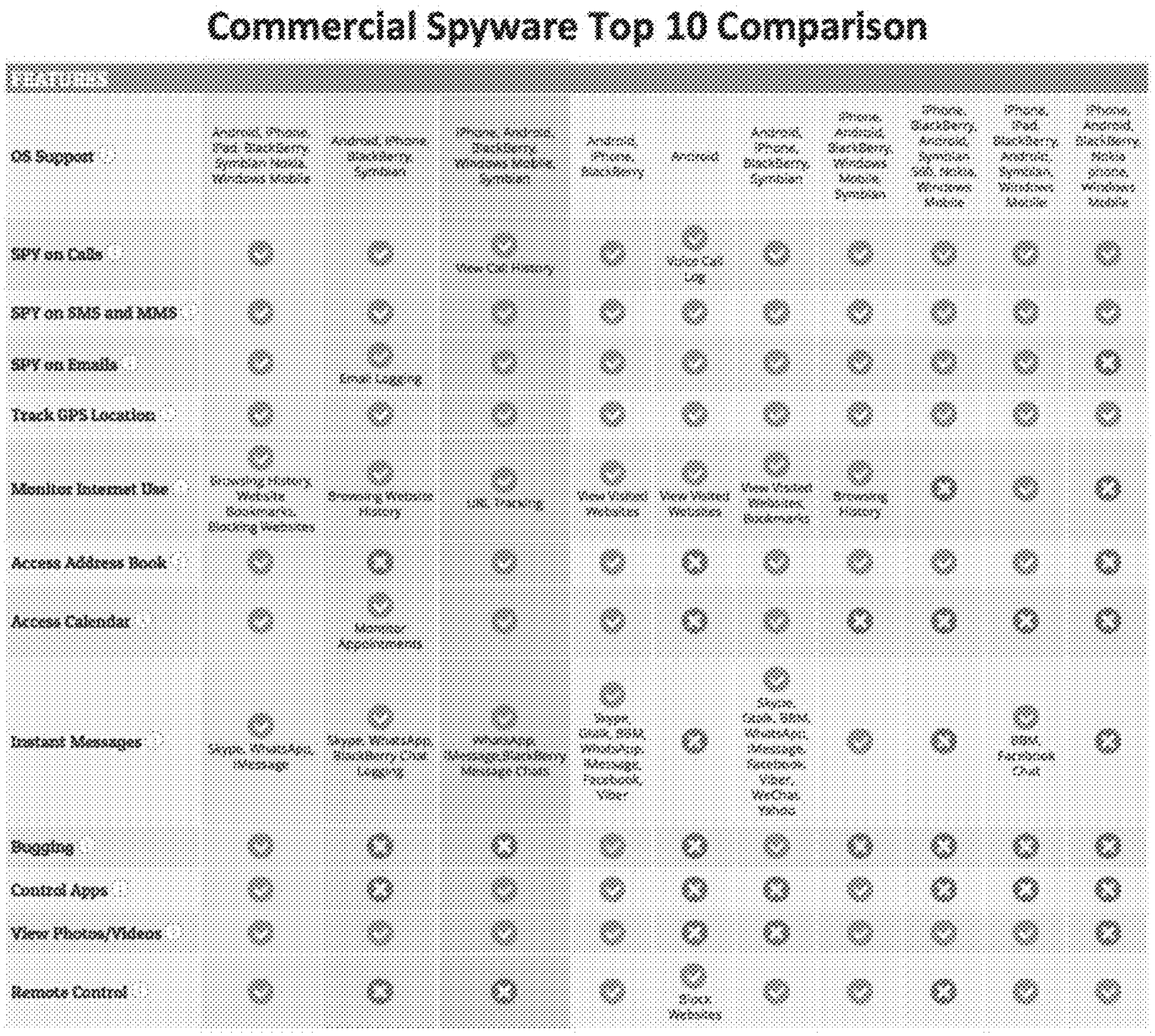
FIG. 42 is a table comparing ten commercially available spyware program features.
Figure 43:
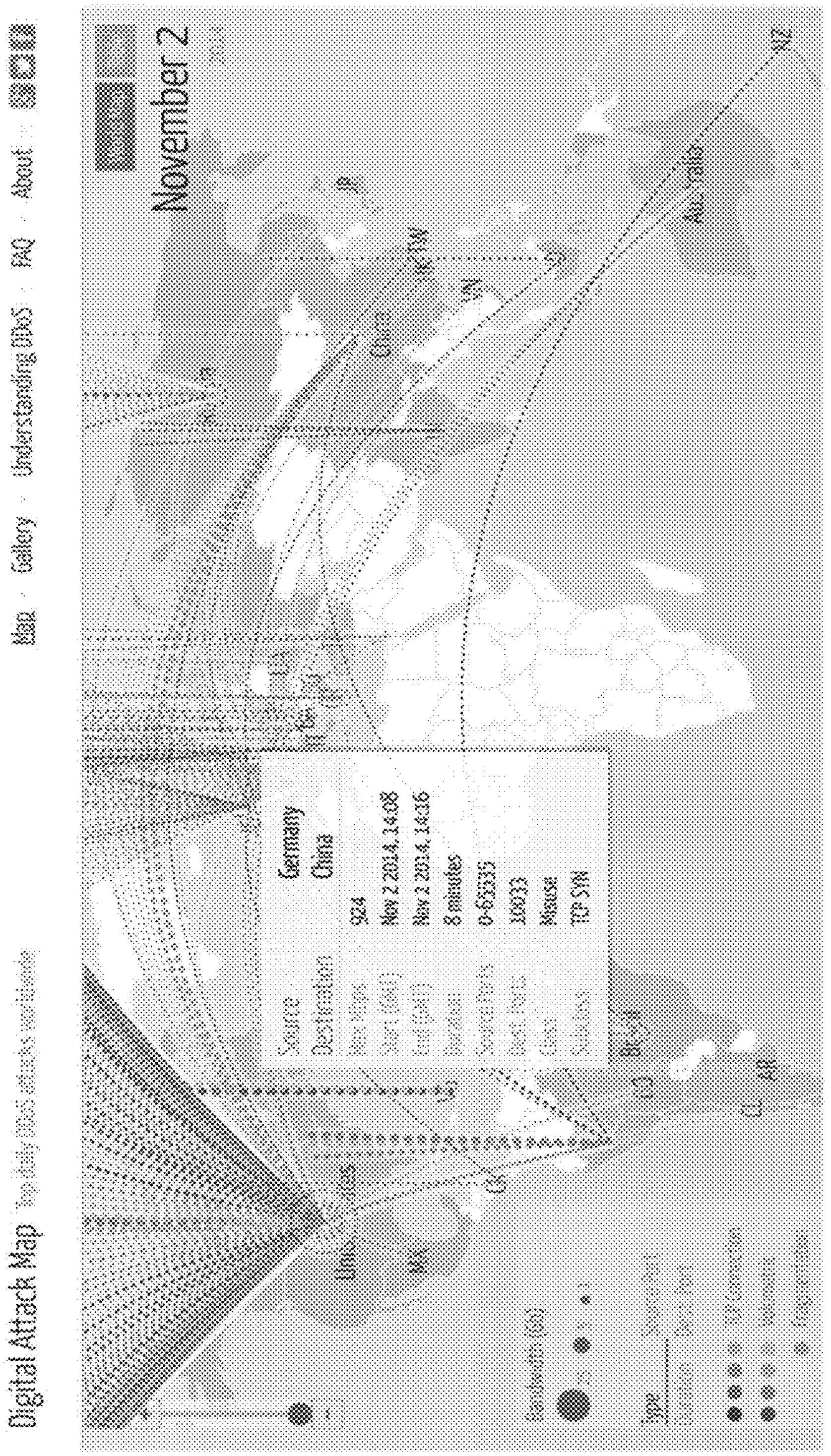
FIG. 43 is a world map showing cyber-assault incidents in one single day.
Figure 44:
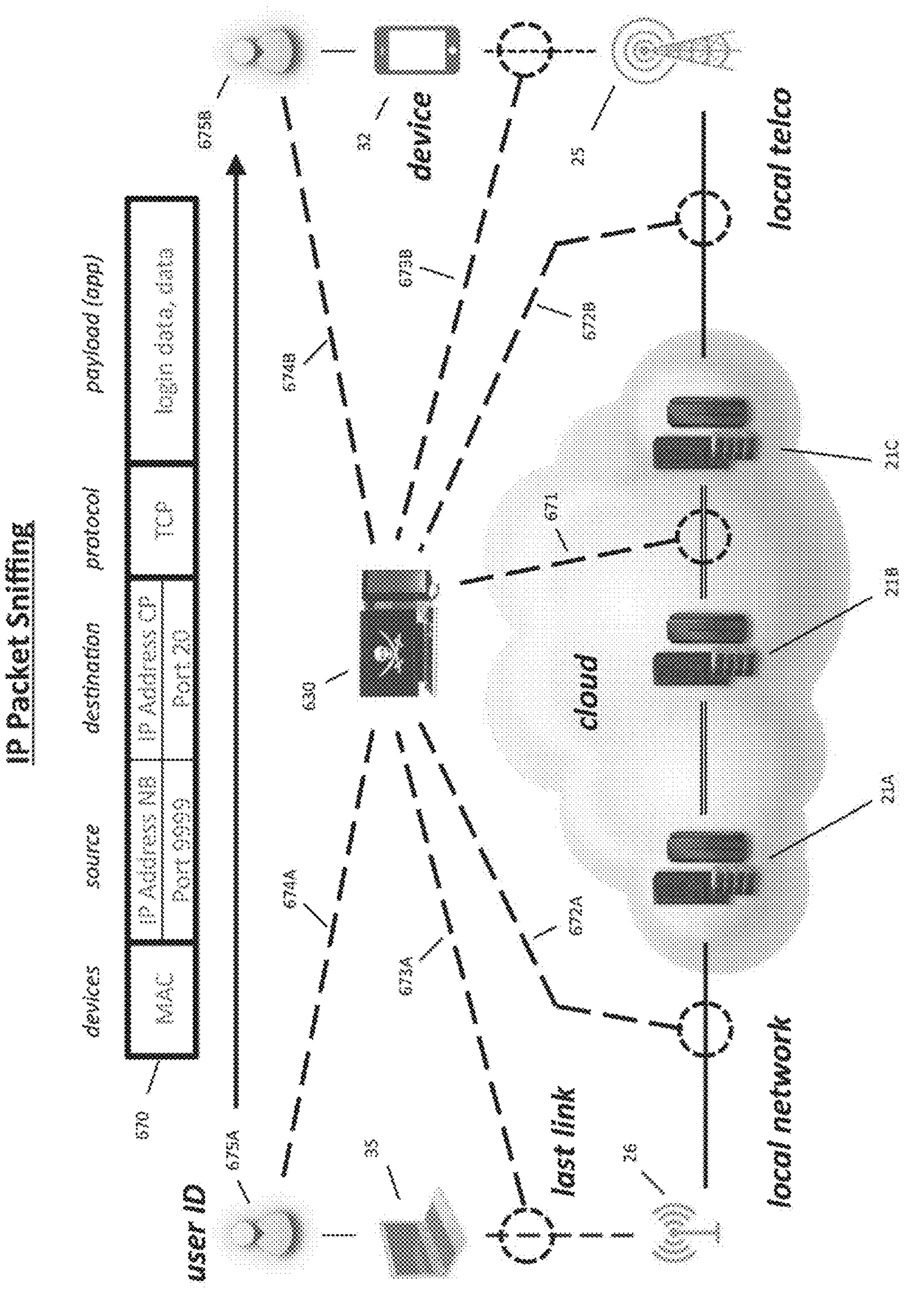
FIG. 44 illustrates possible IP packet sniffing and man-in-middle-attacks on a packet-switched network.
Figure 45:
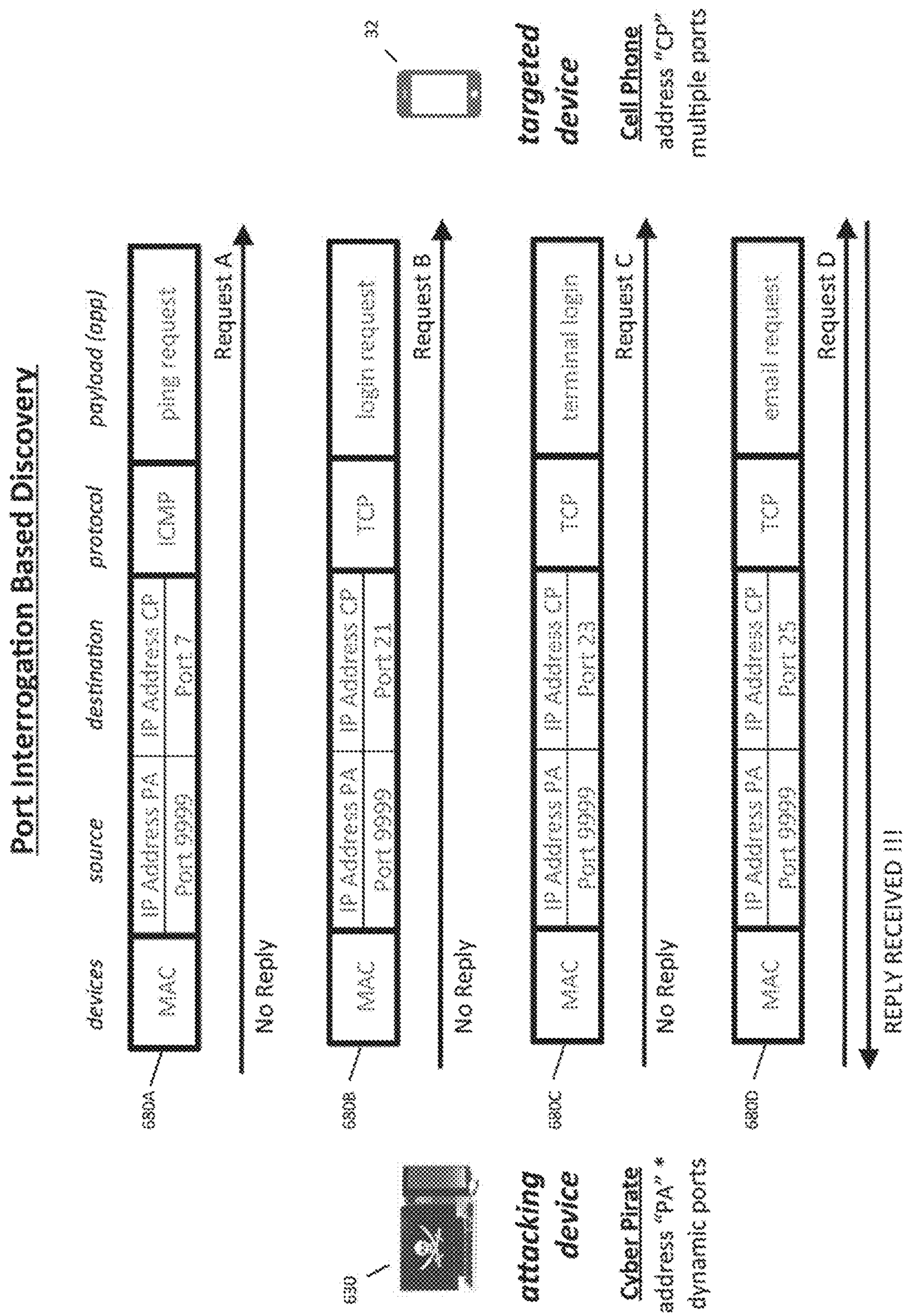
FIG. 45 illustrates a cyber-assault using port interrogation based discovery.
Figure 46:
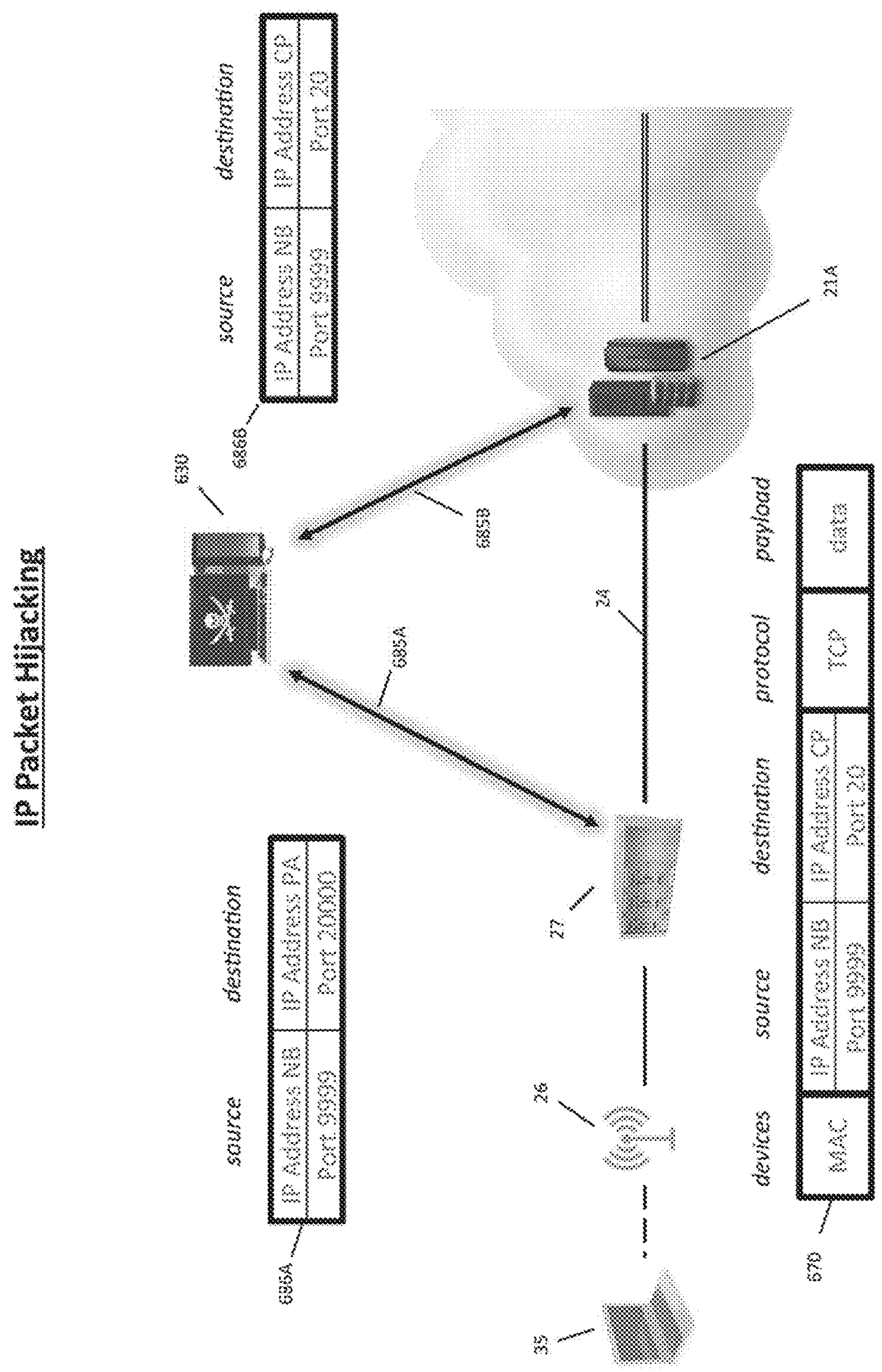
FIG. 46 illustrates a cyber-assault employing IP packet hijacking.

Aside from QoS issues, the security of today's devices and networks is abysmal, representing a level totally unacceptable to support the future needs of global communication. As detailed in the background and shown previously in FIG. 40, network security is prone to a large array of cyber-assaults on communicating devices, including spyware, Trojan horses, infections, and phishing; on the last link, including spyware, IP packet sniffing, wiretaps, and call interception of cyber pirate "faux" cellphone towers; and in the local network or telco portion of last-mile connectivity, involving spyware, IP packet sniffing, infections such as viruses, and cyber pirate "man in the middle attacks". The cloud itself is subject to unauthorized access by breaking security at any cloud gateway, by infections such as viruses, from cyber pirates launching man-in-the-middle attacks, from denial-of-service attacks, and from unauthorized government surveillance. In summary, today's communication security is compromised by numerous vulnerabilities easily exploited by cyber pirates and useful for committing cybercrime and violations of cyberprivacy, including:

- Revealing the destination of an IP packet, including the destination IP address, the destination port #, and the destination MAC address.
- Revealing the source of an IP packet, including the source IP address, the source port #, and the source MAC address.
- Revealing the type of Layer 4 transport employed and by the port # the type of service requested and application data encapsulated in the IP packet's payload
- In unencrypted files, all application and file data encapsulated in the IP packet's payload, including personal and confidential information, login information, application passwords, financial records, videos, and photographs.
- A dialog of communications, enabling a cyber party the repeated opportunity to break encrypted files
- Numerous opportunities to install malware, including spyware and phishing programs and Trojan horses into communicating devices and routers using FTP, email, and web page based infections Reiterating a key point, the fundamentally intrinsic weakness of packet-switched communication networks using Internet Protocol shown in FIG. 44, is that any hostile party or cyber pirate intercepting IP packet 670 can see what devices were involved in creating the data contained with the IP packet, where the IP packet came from, where the IP packet is being sent to, how the data is being transported, i.e. UDP or TCP, and what kind of service is being requested, i.e. what kind of application data is contained within the payload. In this regard, a cyber pirate is able to determine the "context" of a conversation, improving their opportunity to crack encryption, break password security, and gain unauthorized access to files, data, and payload content.

Encryption—

To defend against the diverse range of cyber-assaults as described, present day network managers, IT professionals, and application programs primarily rely on a single defense—encryption. Encryption is a means by which to convert recognizable content also known as "plaintext", whether readable text, executable programs, viewable videos and pictures, or intelligible audio, into an alternate file type known as "ciphertext", that appears as a string of meaningless textual characters.

The encryption process, converting an unprotected file into an encrypted file, involves using a logical or mathematical algorithm, called a cypher, to change the data into equivalent textual elements without revealing any apparent pattern of the encryption's conversion process. The encrypted file is then sent across the communication network or medium until received by the destination device. Upon receiving the file, the receiving device, using a process known as "decryption, subsequently decodes the encoded message to reveal to original content. The study of encryption and decryption, known broadly as "cryptography", blends elements of mathematics, including number theory, set theory and algorithm design, with computer science and electrical engineering.

In simple "single key" or "symmetric key" encryption technologies, a single key word or phrase known a priori by both parties can be used to unlock the process for encrypting and decrypting a file. In World War II, for example, submarines and ocean ships communicated on open radio channels used encrypted messages. Initially, the encryptions were single-key-based. By analyzing the code pattern, Allied cryptologists were sometimes able to reveal the encryption key word or pattern and thereafter were able to read encrypted files without discovery. As encryption methods became more complex, breaking the code manually became more difficult.

Code evolved into mechanical machine-based ciphers, an early form of computing. At the time, the only way to break the code was stealing a cypher machine and using the same tools to decipher a message as those encrypting the files. The challenge was how to steal a cypher machine without the theft being detected. If it were known that a code machine had been compromised, the enemy would simply change their code and update their cypher machines already in operation. This principle is practiced still today—the most effective cyber-assault is one that goes undetected.

With the advent of computing and the Cold War, encryption became more complex but the speed of computers used to crack encryption codes also improved. At each step in the development of secure communications, the technology and knowhow for encrypting information and the ability to crack the encryption code developed nearly at pace. The major next evolutionary step in encryption came in the 1970s with the innovation of dual-key encryption, a principle still in use today. One of the best-known dual key encryption methods is the RSA public key cryptosystem, named after its developers Rivest, Shamir, and Adleman. Despite published recognition for RSA, contemporaneous developers independently conceived of the same principle. RSA employs two cryptographic keys based on two large prime numbers kept secret from the public. One algorithm is used to convert these two prime numbers into an encryption key, herein referred to as an E-key, and a different mathematical algorithm is used to convert the same two secret prime numbers into a secret decryption key, herein referred to also as a D-key. The RSA-user who selected the secret prime numbers, herein referred to as the "key publisher', distributes or "publishes" this algorithmically generated E-key comprising typically between 1024b to 4096b in size, to anyone wishing to encrypt a file. Because this key is possibly distributed to many parties in an unencrypted form, the E-key is known as a "public key".

Parties wishing to communicate with the key publisher then use this public E-key in conjunction with a publically available algorithm, typically offered in the form of commercial software, to encrypt any file to be sent to the particular key publisher. Upon receiving an encrypted file, the key publisher then uses their secret D-key to decrypt the file, returning it to plaintext. The unique feature of the dual-key method in general and RSA algorithm in particular is that the public E-key used to encrypt a file cannot be used for decryption. Only the secret D-key possessed by the key publisher has the capability of file decryption.

Figure 47:
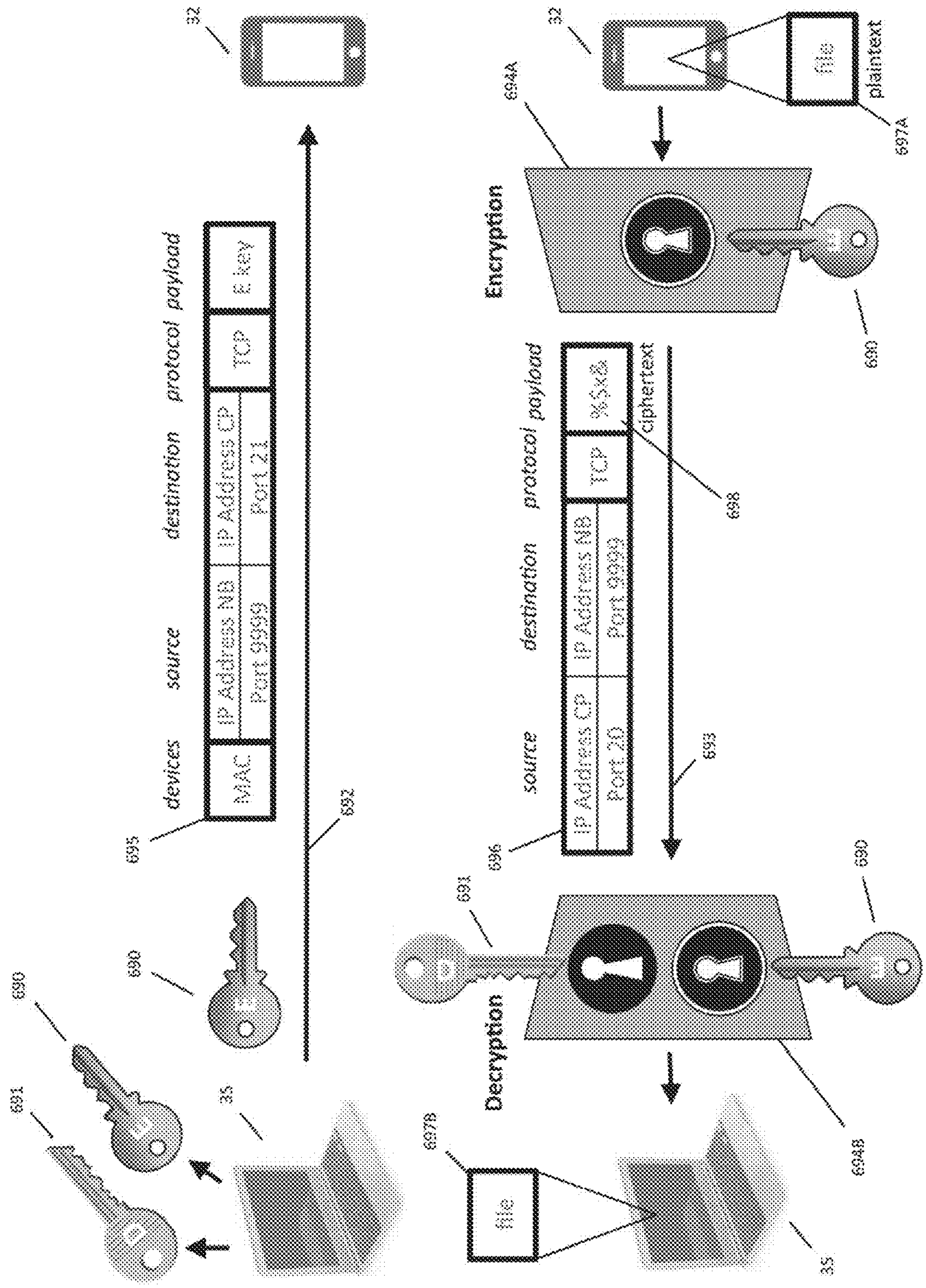
FIG. 47 is a schematic representation of dual key encryption.

The concept of a dual-key, split-key, or multi-key exchange in file encryption and decryption is not limited specifically to RSA or any one algorithmic method, but methodologically specifies a communication method as a sequence of steps. FIG. 47, for example, illustrates a dual-key exchange in realizing communication over a switch packet communication network. As shown, notebook 35 wishing to receive a secure file from cell phone 32 first generates two keys, E-key 690 for encryption and D-key 691 for decryption using some algorithm. Notebook 35 then sends E-key 690 to cell phone 32 using public network communication 692 carrying IP packet 695. IP packet 695 clearly illustrates in unencrypted form, the MAC address, IP source address "NB" and port address #9999 of notebook 35 along with the destination IP address "CP", port #21 of cell phone 32 as well as the transport protocol TCP and an encrypted copy of E-key 690 as its payload.

Using an agreed upon encryption algorithm or software package, cell phone 32 then processes plaintext file 697A using encryption algorithm 694A and encryption E-key 690 to produce an encrypted file, i.e. ciphertext 698, carried as the payload of IP packet 696 in secure communication 693 from cell phone 32 to notebook 35. Upon receiving IP packet 696, algorithm 694B decrypts the file using secret decryption key, i.e. D-key 691. Since D-key 691 is made consistent with E-key 690, in essence algorithm 694B employs knowledge of both keys to decrypt ciphertext 698 back into unencrypted plaintext 697B. While the payload of IP packet 696 is secured in the form of an encrypted file, i.e. ciphertext 698, the rest of the IP packet is still unencrypted, sniffable, and readable by any cyber pirate including the source IP address "CP" and port #20, and the destination IP address "NB" and associated port #9999. So even if the payload itself can't be opened, the communication can be monitored.

Virtual Private Networks—

Another security method, also relying on encryption, is that of a "virtual private network" or VPN. In a VPN, a tunnel or secure pipe is formed in a network using encrypted IP packets. Rather than only encrypting the payload, in a VPN the entire IP packet is encrypted and then encapsulated into another unencrypted IP packet acting as a mule or carrier transmitting the encapsulated packet from one VPN gateway to another. Originally, VPNs were used to connect disparate local area networks together over a long distance, e.g. when companies operating private networks in New York, Los Angeles, and Tokyo wished to interconnect their various LANs with the same functionality as if they shared one global private network.

Figure 48A:
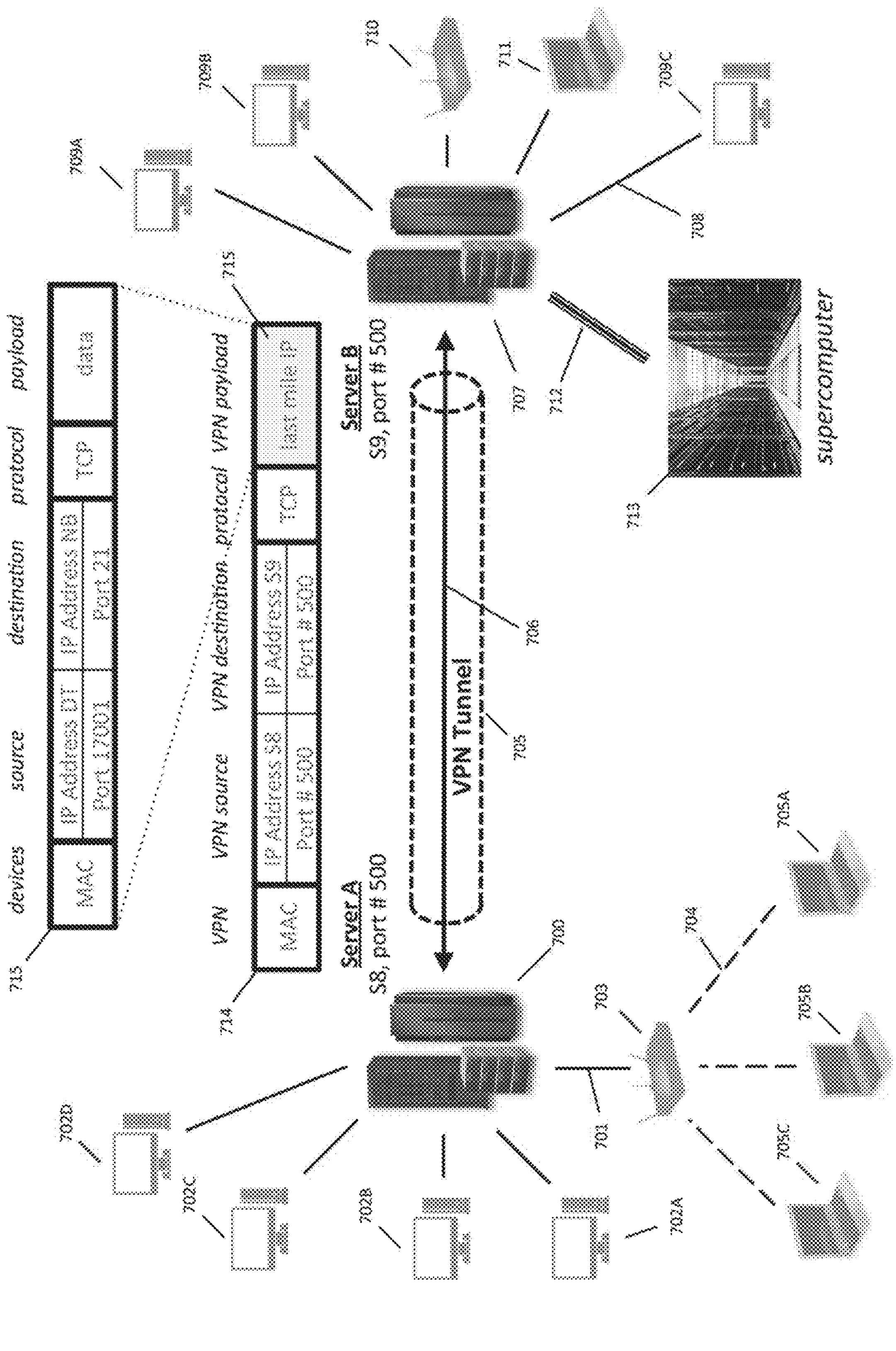
FIG. 48A is a schematic representation of a virtual private network.

The basic VPN concept is illustrated in FIG. 48A where server 700, as part of one LAN supporting a number of devices wirelessly through RF connections 704 and wireline connections 701 is connected by a "virtual private network" or VPN comprising content 706 and VPN tunnel 705 to a second server 707 having wireline connections 708 to desktops 709A thru 709C, to notebook 711, and to WiFi base station 710. In addition to these relatively low bandwidth links, server 707 also connects to supercomputer 713 via high bandwidth connection 712. In operation, outer IP packet 714 from server A, specifying a source IP address "S8" and port #500 is sent to server B at destination IP address "S9" and port #500. This outer IP packet 714 describes how servers 700 and 707 form an encrypted tunnel to one another for data to pass within. The VPN payload of outer packet 714 contains last-mile IP packet 715, providing direct communication between desktop 702B with source IP address "DT" and corresponding ad hoc port #17001, and notebook 711 with source IP address "NB" and corresponding ad hoc port #21, a request for a file transfer.

To establish this transfer securely using a virtual private network, VPN tunnel 705 was created and the session initiated before the actual communication was sent. In corporate applications, the VPN tunnel 705 is not carried over the Internet on an ad hoc basis, but is generally carried by a dedicated ISP or carrier owning their own fiber and hardware network. This carrier oftentimes enters into an annual or long-term contractual agreement with the company requiring VPN services to guarantee a specific amount of bandwidth for a given cost. Ideally, the high-speed dedicated link connects directly to both server 700 and server 707 with no intermediate or "last-mile" connections to disturb the VPN's performance, QoS, or security.

Figure 48B:
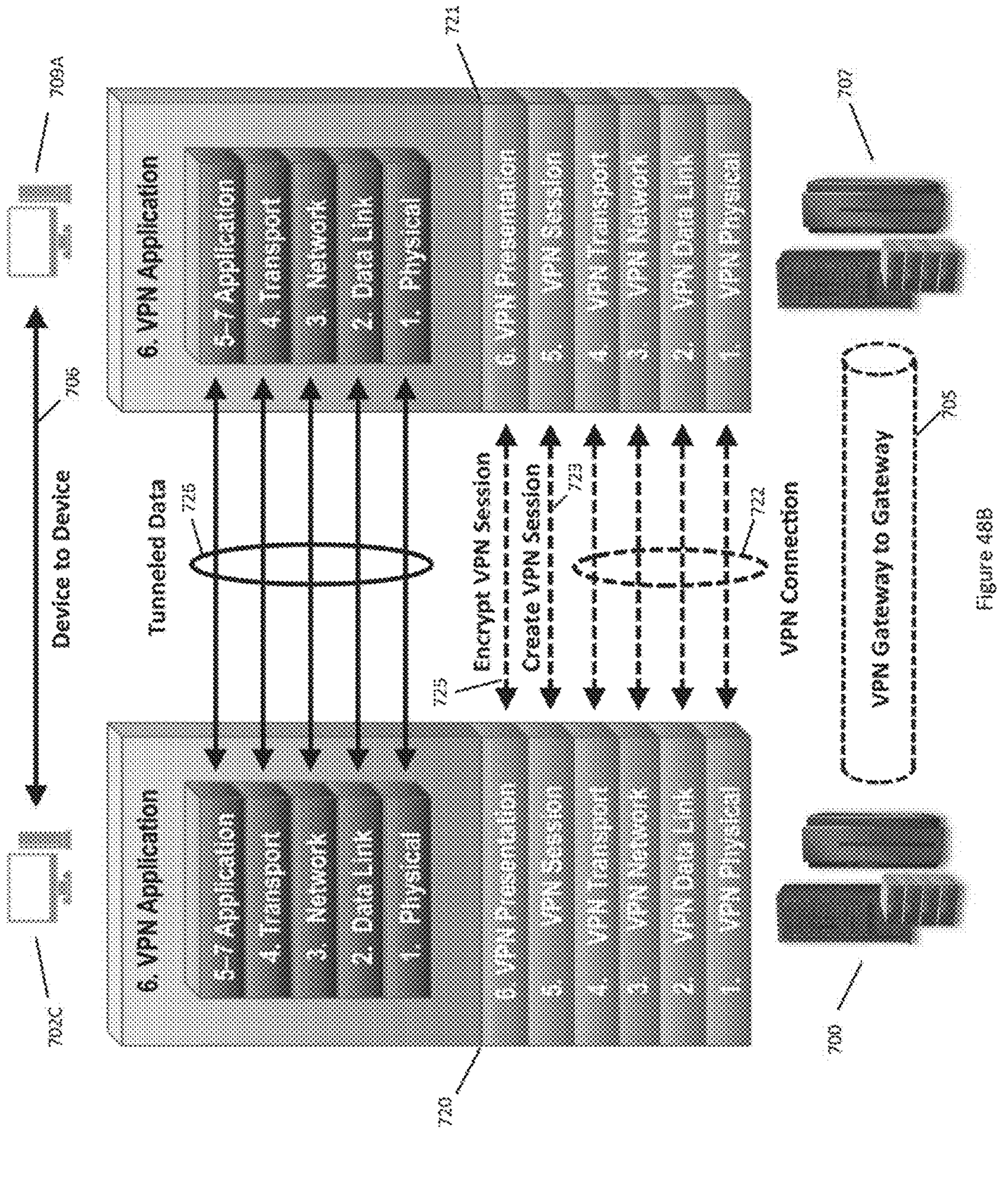
FIG. 48B illustrates the communication stack of a virtual private network.

In operation, traditional VPNs require a two-step process—one to create or "login" to the VPN, and a second step to transfer data within the secure pipe or tunnel. The concept of tunneling is illustrated hierarchically in FIG. 48B where outer IP packets carried by communication stacks 720 and 721 form a VPN connection 722 on Layers 1 through Layers 4, utilize Layer 5 to create a virtual VP session 723, and utilize Layer 6, the presentation layer, to facilitate encryption 725 to achieve VPN gateway to gateway pipe 705 between server 700 and 707. While VPN connection 722 uses Internet Protocol to send the IP packets, the VPN's PHY Layer 1 and VPN data link Layer 2 are generally supported by a dedicated carrier and not using unpredictable routing over the Internet. Application Layer 6 data transferred as device-to-device communication 706 between desktop 702C and 709A for example, is supplied as tunneled data 726 including all seven OSI layers needed to establish communication as if the VPN were not present.

In operation, outer IP packet from communication stack 720 once passed to server 707 is opened to reveal encapsulated data 726, the true message of the packet. In this way, the end-to-end communication occurs ignorant of the details used to create the VPN tunnel, except that the VPN tunnel must be formed in advance of any attempt to communicate and closed after the conversation is terminated. Failure to open the VPN tunnel first will result in the unencrypted transmission of IP packet 715 susceptible to IP packet sniffing, hijacking, infection and more. Failure to close the VPN after a conversation is complete, may provide a cybercriminal the opportunity to hide their illegal activity within someone else's VPN tunnel, and if intercepted, may result in possible criminal charges levied against an innocent person.

Figure 48C:
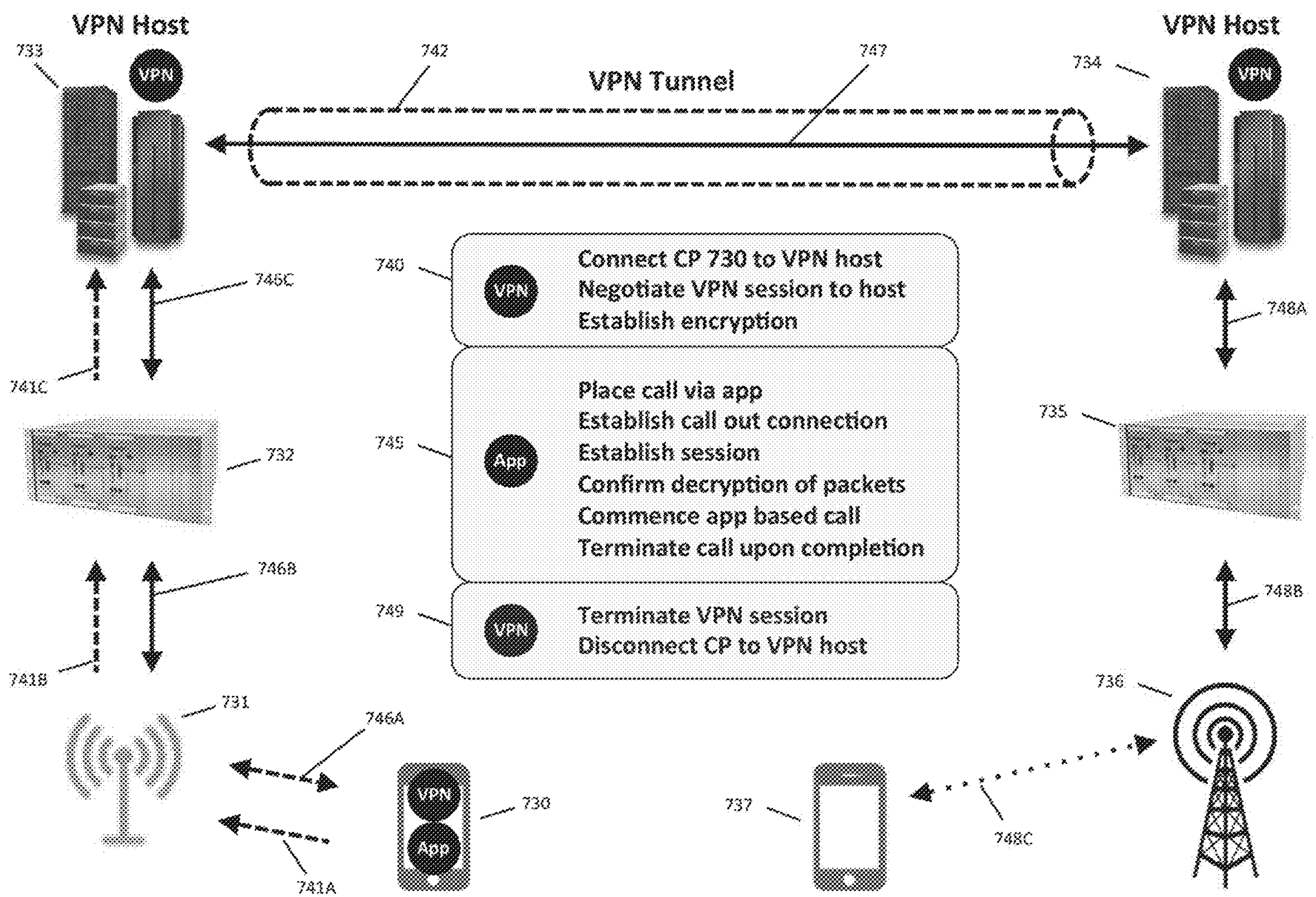
FIG. 48C is a schematic diagram showing a VoIP call placed over an ad hoc VPN.

While VPNs are common ways for multiple private local area networks to interconnect to one another using private connections with dedicated capacity and bandwidth, the use of VPNs over public Networks and the Internet is problematic for two party communications. One issue with VPNs is the VPN connection must be established a priori, before it can be used, not on a packet-by-packet basis. For example, as shown in exemplary FIG. 48C of a VoIP call connected over a packet-switched network, before cell phone 730 contacts the intended call recipient at cell phone 737, it must first establish a VPN session following steps 740 in the simplified algorithm as shown. In so doing cell phone 730 with a VPN connection application sends IP packets to VPN host 733 through any available last-mile routing, in this case radio communication 741A to WiFi base station 731, followed by wireline communication 741B to router 732, then by wireline communication 741C to VPN host 733. Once the session between cell phone 730 and VPN host 733 is established, cell phone 730 then instructs VPN host 733 to create a VPN tunnel 741 to VPN host 734, the Layer 5 session is negotiated with the tunnel encrypted by Layer 6.

Once the VPN connection is set up, then cell phone 730 in accordance with application related steps 745 places a call via any VoIP phone app. In this step, the application must establish a "call out" link over the last mile from VPN host 734 to cell phone 737. If the VoIP application is unable or unauthorized to do so, the call will fail and immediately terminate. Otherwise, the inner IP packet will establish an application Layer 5 session between calling cell phone 730 and destination cell phone 737 and confirm the IP test packets are properly decrypted and intelligible.

To place a call in accordance with step 745, the call necessarily comes from a Layer 7 application running on the phone and not from the phone's normal dialup functions, because the telephonic carrier's SIM card in the phone is not compatible with the VPN tunnel. Once the call is initiated, cell phone 730 transmits a succession of IP packets representing small pieces or "snippets" of sound in accordance with its communication application. In the example shown, these packets are sent from the application in caller's cell phone 730 through WiFi link 746A to WiFi base station 731 then through wireline connection 746B to router 732, and finally through wireline connection 746C to VPN host 733. The data is then sent securely by connection 747 to VPN host 735 through VPN tunnel 742. Once leaving the VPN tunnel, VPN host sends the data onward on wireline connection 748A to router 735, then by wireline connection 748B to cell phone system and tower 736 which in turn calls 737 as a normal phone call. The process of calling from a cell phone app to a phone not running the same app is called a "call out" feature.

The foregoing example highlights another problem with connecting to a VPN over a public network—the last-mile links from both the caller on cell phone 730 to VPN host 733 and the call out from VPN host 734 to the person being called on cell phone 737 are not part of the VPN, and therefore do not guarantee security, performance or call QoS. Specifically the caller's last mile comprising connections 746A, 746B, and 746C as well as the call out connections 748A, 748B, and 748C are all open to sniffing and subject to cyber-assaults.

Once the call is completed and the cell phone 737 hangs up, VPN 742 must be terminated according to step 749 where VPN Layer 5 coordinates closing the VPN session and cell phone 730 disconnects from VPN host 733.

Even following the prescribed steps, however, there is no guarantee that placing a call or sending documents through a VPN may not fail for any number of reasons including:

- The VPN may not operate with sufficient low latency to support real-time applications, VoIP or video;
- The VPN last-mile connection from the caller to the VPN gateway or from the VPN gateway to the call recipient may not operate with sufficient low latency to support real-time applications, VoIP or video;
- The nearest VPN gateway to the caller or to the intended recipient, i.e. "the last mile" may be very far away, possibly even farther than the distance to the call recipient without the VPN, exposing the connection to excessive latency, network instability, uncontrolled routing through unknown networks, variable QoS, and numerous opportunities for man-in-middle attacks in the unprotected portion of the connection;
- The VPN last-mile connection from the VPN gateway to the call recipient may not support "call out" connections and packet forwarding or support links to local telcos;
- Local carriers or government censors may block calls or connections into or out of known VPN gateways for reasons of national security or regulatory compliance;
- Using corporate VPNs, VoIP calls may limited to and from only company employees and specified authorized users, financial transactions and video streaming may be blocked, private email to public email servers such Yahoo, Google, etc. may be blocked, and numerous web sites such YouTube, chat programs, or Twitter may be blocked as per company policy.

In cases of unstable networks, a VPN may get stuck open and retain a permanent session connected to a caller's device until manually reset by the VPN operator. This can lead to lost bandwidth for subsequent connections or expensive connection fees.

Comparing Networks—

Figure 49A:
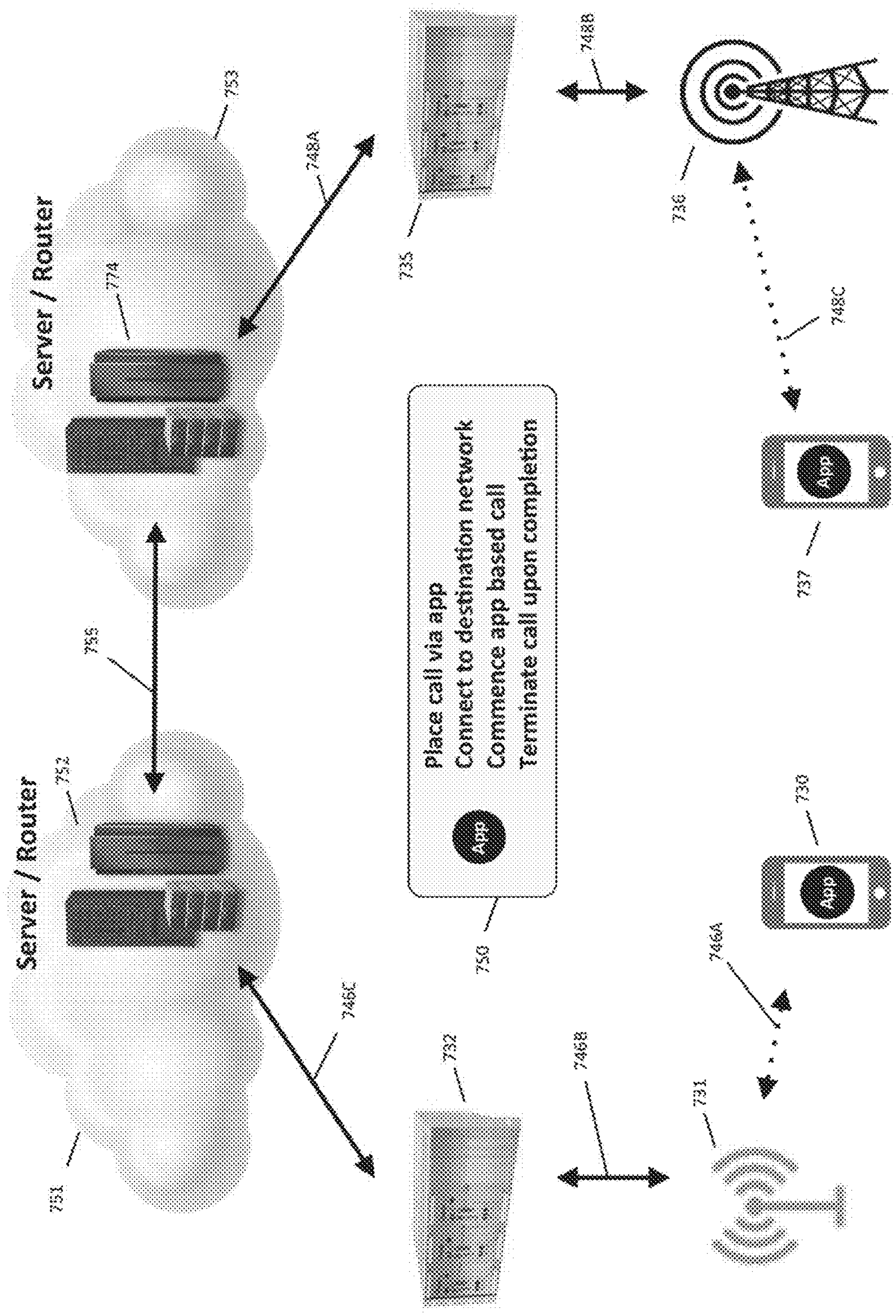
FIG. 49A is a schematic diagram showing a over-the-top VoIP call placed over the Internet.

Comparing communication offered by "over-the top" or OTT providers, shown in FIG. 49A, to that of communication systems employing public networks to connect to an ad hoc VPN, shown previously in FIG. 48C, quickly reveals that aside from the VPN link itself, the majority of both communication systems have nearly identical components and connections. Specifically, the last mile of the caller comprising cell phone 730, WiFi radio connection 746A, WiFi base station 731, wireline connections 746B and 746C, and router 732 represent the same last-mile connectivity in both implementations. Similarly, on the last mile of the other party, cell phone 737, cell phone connection 748C, cell base station and tower 736, wireline connections 748A and 748B, and router 735 are identical for both Internet and VPN versions. The main difference is that in a public network, the VPN tunnel 742 with secure communication 747 between VPN hosts 733 and 734 is replaced by server/routers 752 and 754 carrying insecure communication connection 755. Another difference is in OTT communications, the call is instantly available as described in step 750, where using a VPN extra steps 740 and 749 are required to set up the VPN and to terminate the VPN session prior to and following the call.

In both examples, the last-mile connections offer unpredictable call QoS, exposure to packet sniffing, and the risk of cyber-assaults. Because server/routers 752 and 774 are likely managed by different ISPs in different locales, one can interpret the servers as existing different clouds, i.e. clouds 751 and 753. For example the publically open networks owned and operated by Google, Yahoo, Amazon, and Microsoft may be considered as different clouds, e.g. the "Amazon cloud" even though they are all interlinked by the Internet.

Figure 49B:
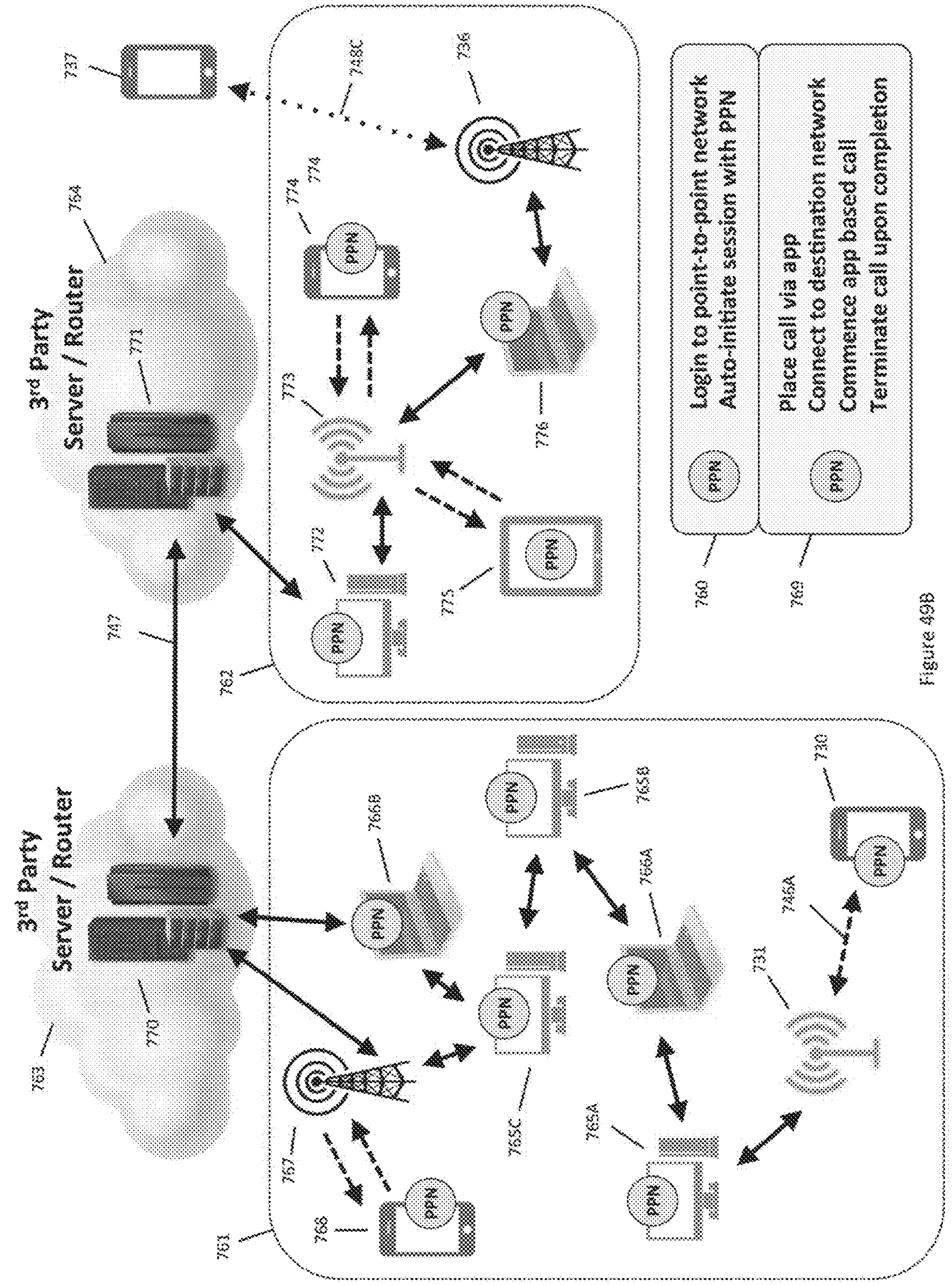
FIG. 49B is a schematic diagram showing a VoIP call placed over a peer-to-peer network.
Figure 5D:
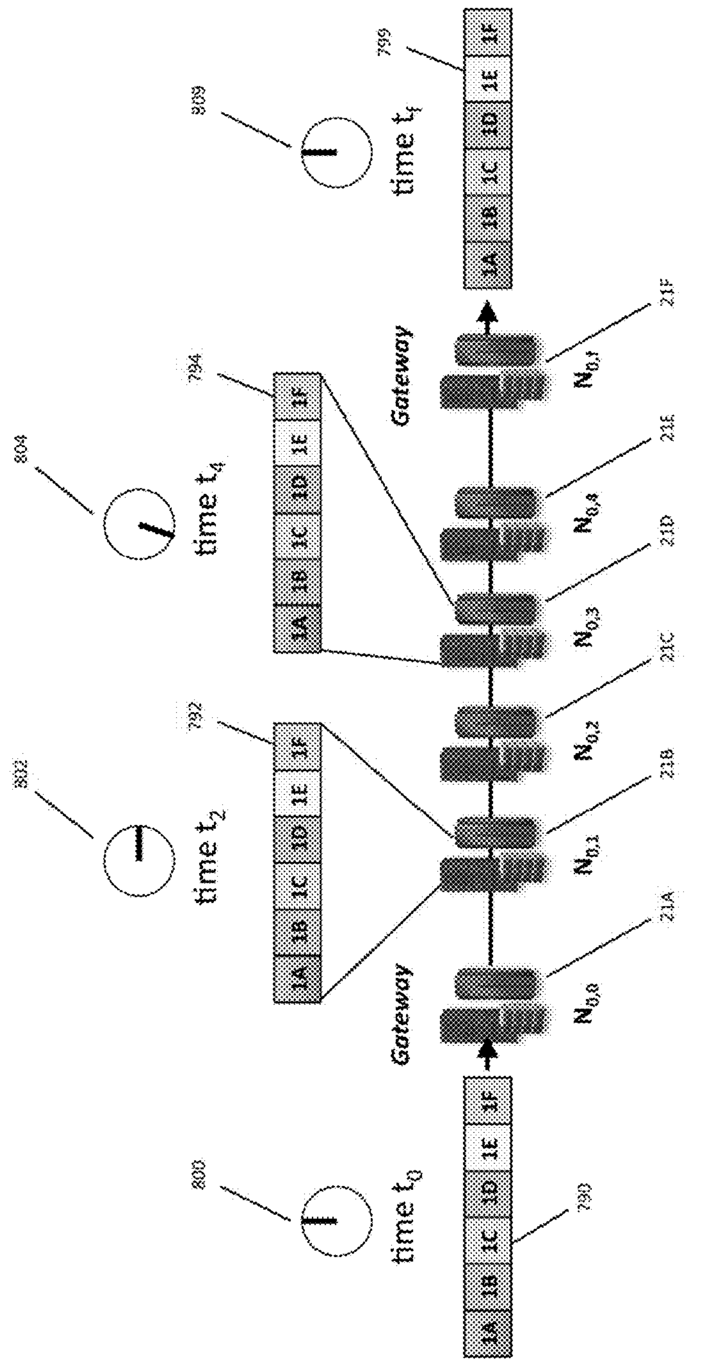

A competing network topology, the peer-to-peer network or PPN shown in FIG. 49B, comprising a network made of a large number of peers with packet routing managed by the PPN and not by the router or ISP. While peer-to-peer networks existed in hardware for decades, it was Napster who popularized the concept as a means to avoid the control, costs, and regulation of Internet service providers. When sued by the U.S. government regulators for music copyright violations, the progenitors of Napster jumped ship, invading the early OTT carrier Skype. At that time, Skype's network converted from a traditional OTT into a Napster-like PPN.

In PPN operation, every device that makes a login connection to the PPN becomes one more node in the PPN. For example if in geography 761, cell phone 730 with PPN software installed logs into the peer-to-peer network, it like all the other connected devices in the region becomes part of the network. Calls placed by any devices hops around from one device to another to reach is destination, another PPN connected device. For example, if cell phone 730 uses its PPN connection to call another PPN connected device, e.g. cell phone 768, the call follows a circuitous path through any device(s) physically located in the PPN between the two parties. As shown, the call emanating from cell phone 730 connects by WiFi 731 through WiFi base station 731 to desktop 765A, then to notebook 766A, to desktop 765B, then to desktop 765C and finally to cell phone 768 through cell phone base station and tower 767. In this manner all routing was controlled by the PPN and the Internet was not involved in managing the routing. Since both parties utilize, the PPN software used to connect to the network also acts as the application for VoIP based voice communication.

In the case where cell phone 730 attempts to call a non-PPN device cell phone 737 on the opposite side of the world, the routing may necessarily include the Internet on some links, especially to send packets across oceans or mountain ranges. The first part of the routing in geography 761, proceeds in a manner similar to the prior example, starting from cell phone 730 and routed through WiFi base station 731, desktop 765A, notebook 766A, desktops 765B and 765C. At this point, if notebook 766B is connected to the network, the call will be routed through it, otherwise the call must be routed through cell phone base station and tower 767 to cell phone 768, and then back to cell phone base station and tower 767 before sending it onwards.

If the call is transpacific, then computers and cell phones cannot carry the traffic across the ocean so the call is then necessarily routed up to the Internet to 3$^{rd}$ party server/router 770 in cloud 763 and onward through connection 747 to 3$^{rd}$ party server/router 771 in cloud 764. The call then leaves the Internet and enters the PPN in geography 762 first through desktop 772, which in turn connects to WiFi 773, to notebook 776, and to base station 736. Since WiFi 733 does not run the PPN app, the actual packet entering WiFi 773 must travel to either tablet 775 or cell phone 774 and back to WiFi 773 before being sent on to cell phone base station and tower 736 via a wireline connection. Finally, cell phone call 748C connects to cell phone 737, which is not a PPN enabled device. The connection thereby constitutes a "call out" for the PPN because it exits PPN geography 762. Using this PPN approach, like a VPN involves first registering a calling device to the PPN network according to step 760 by completing a PPN login. Thereafter, the call can be placed using the PPN app in accordance with step 769. The advantage of the PPN approach is little or no hardware is needed to carry a call over a long distance, and that since every device connected to the PPN regularly updates the PPN operator as to its status, loading and latency, the PPN operator can decide a packet's routing to best minimize delay.

The disadvantages of such an approach is that packets traverse a network comprising many unknown nodes representing a potential security threat and having an unpredictable impact on call latency and call QoS. As such, except for Skype, peer-to-peer networks operating at Layer 3 and higher are not commonly employed in packet-switched communication networks.

A comparative summary of ad hoc VPN providers, Internet OTT providers, and PPN peer networks is contrasted below.

| Network | Virtual Private VPN | Internet OTT | Peer-to-Peer PPN |
|---|---|---|---|
| Nodes | Public/Hosted Servers | Public Routers/Servers | PPN Users |
| Node Capability | Known Infrastructure | Known Infrastructure | Mixed, Unknown |
| Cloud Bandwidth | Guaranteed | Unpredictable | Unpredictable |
| Last-Mile Bandwidth | Provider Dependent | Provider Dependent | PPN Dependent |
| Latency | Unmanageable | Unmanageable | Best Effort |
| Network Stability | Unmanageable | Unmanageable, Redundant | Best Effort |
| Call Setup | Complex Login | None Required | Login |
| User Identity | User Name | Phone Number | User Name |

-continued

| Network | Virtual Private VPN | Internet OTT | Peer-to-Peer PPN |
|---|---|---|---|
| VoIP QoS | Variable to Good | Variable | Variable |
| Cloud Security | Encrypted Payload Only | Unencrypted | Unencrypted |
| Last-Mile Security | Unencrypted | Unencrypted | Unencrypted |
| Sniffable | Packet Header (Cloud) Entire Packet (Last Mile) | Entire Packet | Entire Packet |

As shown, while VPN and the Internet comprise fixed infrastructure, the nodes of a peer-to-peer network vary depending on who is logged in and what devices are connected to the PPN. The cloud bandwidth, defined in the context of this table as the networks' high-speed long-distance connections, e.g. networks crossing oceans and mountain ranges, is contractually guaranteed only in the case of VPNs, and is otherwise unpredictable. The last-mile bandwidth is local provider dependent for both Internet and VPN providers but for PPN is entirely dependent on who is logged in.

Latency, the propagation delay of successively sent IP packets is unmanageable for OTTs and VPNs because the provider does not control routing in the last mile but instead depends on local telco or network providers, while PPNs have limited ability using best efforts to direct traffic among the nodes that happen to be online at the time in a particular geography. Likewise, for network stability, PPNs have the ability to reroute traffic to keep a network up but depend entirely on who is logged in. The Internet, on the other hand, is intrinsically redundant and almost certain to guarantee delivery but not necessarily in a timely manner. Network stability for an ad hoc VPN depends on the number of nodes authorized to connect to the VPN host. If these nodes go offline, the VPN is crippled.

From a call setup point of view the Internet is always available, PPNs require the extra step of logging into the PPN prior to making a call, and VPNs can involve a complex login procedure. Moreover, most users consider OTT's use of phone numbers rather than separate login IDs used by VPNs and PPNs as a major beneficial feature in ease of use. All three networks listed suffer from variable VoIP QoS, generally lagging far behind commercial telephony carriers.

From a security point of view, all three options are bad with the last mile completely exposed to packet sniffing with readable addresses and payloads. VPNs offer encryption of the cloud connection but still expose the IP addresses of the VPN hosts. As such no network option shown is considered secure. As such, encryption is used by various applications to try to prevent hacking and cyber-assaults, either as a Layer 6 protocol or as an embedded portion of the Layer 7 application itself.

Overreliance on Encryption—

Regardless of whether used for encrypting IP packets or establishing VPNs, today's network security relies almost solely on encryption and represents one weakness in modern packet-switched based communication networks. For example, numerous studies have been performed on methods to attack RSA encryption. While limiting the prime numbers to large sizes greatly reduces the risk of breaking the decryption D-key code using brute force methods, polynomial factor methods have been successfully demonstrated to crack keys based on smaller prime number-based keys. Concerns exist that the evolution of "quantum computing" will ultimately lead to practical methods of breaking RSA-based and other encryption keys in reasonable cyber-assault times.

To combat the ever-present risk of code breaking, new algorithms and "bigger key" encryption methods such as the "advanced encryption standard" or AES cipher adopted by US NIST in 2001 have emerged. Based on the Rijndael cipher, the design principle known as a substitution-permutation network combines both character substitution and permutation using different key and block sizes. In its present incarnation, the algorithm comprises fixed block sizes of 128 bits with keys comprising varying lengths of 128 bits, 192 bits, and 256 bits, with the corresponding number of repetitions used in the input file transformation varying in rounds of 10, 12, and 14 cycles respectively. As a practical matter, AES cipher may be efficiently and rapidly executed in either software or hardware for any size of key. In cryptography vernacular, an AES based encryption using a 256b key is referred to as AES256 encryption. AES512 encryption employing a 512b key is also available.

While each new generation raises the bar in cryptography to make better encryption methods and to more quickly break them, profit-minded cybercriminals often concentrate on their targets rather than simply using computing to break an encrypted file. As described previously, using packet sniffing and port interrogation, a cyber pirate can gain valuable information about a conversation, a corporate server, or even a VPN gateway. By cyber-profiling, it may be easier to launch a cyber-assault on a company's CFO or CEO's personal computers, notebooks, and cell phones rather than attack the network itself. Sending emails to employees that automatically install malware and spyware upon opening an embedded link completely circumvent firewall security because they enter the network from "inside" where employees necessarily must connect and work.

The chance of breaking encryption also improves if data moves through a network without changing, i.e. statically. In the network of FIG. 50, for example, the underlying data in packets 790, 792, 794 and 799 remain unchanged as the packets move through the network. Each data packet shown comprises a sequence of data or sound arranged sequentially in time or pages unaltered from its original order when it was created. If the content of a data packet is textual, reading the unencrypted plaintext file in the sequence 1A-1B-1C-1D-1E-1F will result in "legible" text for communiqué number "1". If the content of a data packet is audio, converting, i.e. "playing", the unencrypted plaintext file in the sequence 1A-1B-1C-1D-1E-1F through a corresponding audio CODEC, essentially a software based D/A converter, will result in sound for audio file number "1".

In either case, throughout this disclosure, each data slot represented by fixed size boxes comprises a prescribed number of bits, e.g. two bytes (2B) long. The exact number of bits per slot is flexible just so long as every communication node in a network knows what the size of each data slot is. Contained within each data slot is audio, video, or textual data, identified in the drawings as a number followed by a letter. For example, as shown, the first slot of data packet 790 contains the content 1A where the number "1" indicates the specific communication #1 and the letter "A" represents the first piece of the data in communication #1. Similarly, the second slot of data packet 790 contains the content 1B where the number "1" indicates it is part of the same communication #1 and the letter "B" represents the second piece of the data in communication #1, sequentially following 1A.

If, for example, the same data packet hypothetically included content "2A" the data represents the first packet "A" in a different communication, specifically for communication #2, unrelated to communication #1. Data packets containing homogeneous communications, e.g. where all the data is for communication #1 are easier to analyze and read than those mixing different communications. Data arranged sequentially in proper order makes it easy for a cyber-attacker to interpret the nature of the data, whether it is audio, text, graphics, photos, video, executable code, etc. Moreover, in the example shown, since the packet's source and destination IP addresses remain constant, i.e. where the packets remain unchanged during transport through the network in the same form as the data entering or exiting gateway servers 21A and 21F, because the underlying data doesn't change, a hacker has more chances to intercept the data packets and a better chance to analyze and open the files or listen to the conversation. The simple transport and one-dimensional security, i.e. relying only on encryption for protection, increases the risk of a cyber-attack because the likelihood of success is higher in such overly simplified use of the Internet as a packet-switched network.

Securing Real-Time Networks and Connected Devices

In order to improve the quality of service (QoS) of telephonic, video, and data communication while addressing the plethora of security vulnerabilities plaguing today's packet-switched networks, a new and innovative systemic approach to controlling IP packet routing is required, one that manages a global network comprising disparate technologies and concurrently facilitates end-to-end security. The goals of such an inventive packet-switched network include the following criteria:

1. Insure the security and QoS of a global network or long-distance carrier including dynamically managing real-time voice, video, and data traffic routing throughout a network;
2. Insure the security and QoS of the "local network or telco" in the last mile of the communication network;
3. Insure the security and QoS of the "last link" of the communication network, including providing secure communication over unsecured lines;
4. Insure the security of communicating devices and authenticate users to prevent unauthorized or fraudulent access or use;
5. Facilitate a secure means to store data in a device or online in network or cloud storage to prevent unauthorized access;
6. Provide security and privacy protection of all non-public personal information including all financial, personal, medical, and biometric data and records;
7. Provide security and privacy protection of all financial transactions involving online banking and shopping, credit cards, and e-pay; and
8. Provide security, privacy, and as-required, anonymity, in transactional and information exchange involving machine-to-machine (M2M), vehicle-to-vehicle (V2V), and vehicle-to-infrastructure (V2X) communication.

Of the above stated goals, the inventive matter contained within this disclosure relates to the first topic described in item #1, i.e. to "insure the security and QoS of a global network or long-distance carrier including dynamically managing real-time voice, video, and data traffic routing throughout a network." This topic can be considered as achieving network or cloud security without sacrificing real-time communication performance.

Glossary

Unless the context requires otherwise, the terms used in the description of the Secure Dynamic Network And Protocol have the following meanings:

Anonymous Data Packets: Data packets lacking information as to their original origin or final destination.

Decryption: A mathematical operation used to convert data packets from ciphertext into plaintext.

DMZ Server: A computer server not accessible directly from the SDNP network or the Internet used for storing selectors, seed generators, key generators and other shared secrets.

Dynamic Encryption/Decryption: Encryption and decryption relying on keys that change dynamically as a data packet traverses the SDNP network.

Dynamic Mixing: The process of mixing where the mixing algorithms (the inverse of splitting algorithms) change dynamically as a function of a seed based on a state, such as the time, state, and zone when a mixed data packet is created.

Dynamic Scrambling/Unscrambling: Scrambling and unscrambling relying on algorithms that change dynamically as a function of a state, such as the time when a data packet is created or the zone in which it is created.

Dynamic Splitting: The process of splitting where the splitting algorithms change dynamically as a function of a seed based on a state, such as the time, state, and zone when a data packet is split into multiple sub-packets.

Encryption: A mathematical operation used to convert data packets from plaintext into ciphertext.

Fragmented Data Transport: The routing of split and mixed data through the SDNP network.

Junk Data Deletions (or "De-junking"): The removal of junk data from data packets in order to restore the original data or to recover the data packet's original length.

Junk Data Insertions (or "Junking"): The intentional introduction of meaningless data into a data packet, either for purposes of obfuscating the real data content or for managing the length of a data packet.

Key: A disguised digital value that is generated by inputting a state, such as time, into a key generator which uses a secret algorithm to generate the key. A key is used to select an algorithm for encrypting the data in a packet from a selector. A key can be used to safely pass information regarding a state over public or unsecure lines.

Key Exchange Server: A computer server, often third party hosted and independent of the SDNP network operator, used to distribute public encryption keys to clients, and optionally to servers using symmetric key encryption, especially for client-administered key management, i.e. client based end-to-end encryption to prevent any possibility of network operator spying.

Last Link: The network connection between a Client's device and the first device in the network with which it communicates, typically a radio tower, a WiFi router, a cable modem, a set top box, or an Ethernet connection.

Last Mile: The network connection between a SDNP Gateway and the Client, including the Last Link.

Mixing: The combining of data from different sources and data types to produce one long data packet (or a series of smaller sub-packets) having unrecognizable content. In some cases previously split data packets are mixed to recover the original data content. The mixing operation may also include junk data insertions and deletions and parsing.

Parsing: A numerical operation whereby a data packet is broken into shorter sub-packets for storage or for transmission.

Scrambling: An operation wherein the order or sequence of data segments in a data packet is changed from its natural order into an unrecognizable form.

Splitting: An operation wherein a data packet (or a sequence of serial data packets) is split into multiple sub-packets which are routed to multiple destinations. A splitting operation may also include junk data insertions and deletions.

SoftSwitch: Software comprising executable code performing the function of a telecommunication switch and router.

SDNP: An acronym for "secure dynamic network and protocol" meaning a hyper-secure communications network made in accordance with this invention.

SDNP Administration Server: A computer server used to distribute executable code and shared secrets to SDNP servers globally or in specific zones.

SDNP Bridge Node: A SDNP node connecting one SDNP Cloud to another having dissimilar Zones and security credentials.

SDNP Client or Client Device: A network connected device, typically a cell phone, tablet, notebook, desktop, or IoT device running a SDNP application in order to connect to the SDNP Cloud, generally connecting over the network's last mile.

SDNP Cloud: A network of interconnected SDNP Servers running SoftSwitch executable code to perform SDNP Communications Node operations.

SDNP Gateway Node: A SDNP node connecting the SDNP Cloud to the SDNP Last Mile and to the Client. SDNP Gateway nodes require access to at least two Zones—that of the SDNP Cloud and of the Last Mile.

SDNP Media Node: SoftSwitch executable code that processes incoming data packets with particular identifying tags in accordance with instructions from the signaling server or another computer performing the signaling function, including encryption/decryption, scrambling/unscrambling, mixing/splitting, tagging and SDNP header and sub-header generation. An SDNP Media Node is responsible for identifying incoming data packets having specific tags and for forwarding newly generated data packets to their next destination.

SDNP Media Server: A computer server hosting a SoftSwitch performing the functions of a SDNP Media Node in dual-channel and tri-channel communications and also performing the tasks of a SDNP Signaling Node and a SDNP Name-Server Node in single-channel communications.

SDNP Name Server: A computer server hosting a SoftSwitch performing the functions of a SDNP Name-Server Node in tri-channel communications.

SDNP Name Server Node: SoftSwitch executable code that manages a dynamic list of every SDNP device connected to the SDNP cloud.

SDNP Network: The entire hyper-secure communication network extending from client-to-client including last link and last mile communication, as well as the SDNP cloud.

SDNP Node: A SDNP communication node comprising a software-based "SoftSwitch" running on a computer server or alternatively a hardware device connected to the SDNP network, functioning as an SDNP node, either as Media Node, a Signaling Node, or a Name Server Node.

SDNP Server: A computer server comprising either a SDNP Media Server, a SDNP Signaling Server, or a SDNP Name Server and hosting the applicable SoftSwitch functions to operate as an SDNP node.

SDNP Signaling Node: SoftSwitch executable code that initiates a call or communication between or among parties, determines all or portions of the multiple routes for fragmented data transport based on caller criteria and a dynamic table of node-to-node propagation delays, and instructing the SDNP media how to manage the incoming and outgoing data packets.

SDNP Signaling Server: A computer server hosting a SoftSwitch performing the functions of a SDNP Signaling Node in dual-channel and tri-channel SDNP communications, and also performing the duties of the SDNP Name-Sever Node in dual-channel communications.

Security Settings: Digital values, such as seeds and keys, that are generated by seed generators or key generators using secret algorithms in conjunction with a constantly changing input state, such as network time, and that can therefore be safety transmitted over public or insecure lines.

Seed: A disguised digital value that is generated by inputting a state, such as time, into a seed generator which uses a secret algorithm to generate the seed. A seed is used to select an algorithm for scrambling or splitting the data in a packet from a selector. A seed can be used to safely pass information regarding a state over public or unsecure lines.

Selector: A list or table of possible scrambling, encryption or splitting algorithms that are part of the shared secrets and that are used in conjunction with a seed or key to select a particular algorithm for scrambling, unscrambling, encrypting, decrypting, splitting or mixing a packet or packets.

Shared Secrets: Confidential information regarding SDNP node operation, including tables or selectors of scrambling/unscrambling, encryption/decryption, and mixing/splitting algorithms, as well as the algorithms used by seed generators, key generators, zone information, and algorithm shuffling processes stored locally on DMZ servers not accessible over the SDNP network or the Internet.

State: An input, such as location, zone, or network time that is used to dynamically generate security settings such as seeds or keys or to select algorithms for specific SDNP operations such as mixing, splitting, scrambling, and encryption.

Time: The universal network time used to synchronize communication across the SDNP network Unscrambling: A process used to restore the data segments in a scrambled data packet to their original order or sequence. Unscrambling is the inverse function of scrambling.

Zone: A network of specific interconnected servers sharing common security credentials and shared secrets. Last mile connections comprise separate zones from those in the SDNP Cloud.

Secure Dynamic Network and Protocol (SDNP) Design

To prevent cyber-assaults and hacking of packet-switched communication while minimizing real-time packet latency, insuring stable call connectivity, and delivering the highest integrity of voice communication and video streaming, the disclosed secure dynamic network and protocol, or SDNP, is designed based upon a number of guiding principles including:

- Real-time communication should always occur using the lowest latency path.
- Unauthorized inspection or sniffing of a data packet should provide no context as to where the packet came from, where it is going, or what is in it.

- Data packet payloads should be dynamically re-encrypted, i.e., decrypted and then encrypted again using a different encryption algorithm, with no risk of being hacked in any reasonable time.
- Even after they have been decrypted, all data packet payloads still contain incomprehensible payloads comprising a dynamically scrambled mix of multiple conversations and unrelated data mixed with junk packet fillers.

Implementation of the above guidelines involves a variety of unique and inventive methods, functions, features and implementations including in various embodiments some or all of the following

- The SDNP employs one or more dedicated clouds comprising telco, i.e. telecommunication system, softswitch functions realized using proprietary command and control software not accessible through the Internet.
- All intra-cloud communication occurs using dedicated SDNP packet-routing within proprietary clouds based on SDNP addresses and dynamic ports (i.e. proprietary NAT addresses), not on IP addresses. SDNP addresses are not usable or routable over the Internet or outside the SDNP cloud.
- The SDNP network constantly identifies and dynamically routes all real-time communication through the lowest latency paths available.
- No secure or real-time communication is routed outside the SDNP cloud or over the Internet except in cloud-to-cloud and last-mile communication, and then generally using single-hop routing with invisible addresses.
- Routing data contained within a data packet identifies the routing for a single hop between two adjacent devices, identifying only the last and next server's SDNP or IP addresses
- The phone number or IP addresses of the caller and the call recipient, i.e. the clients' respective source and destination addresses, are not present in the IP packet headers nor is it present in the encrypted payload
- Command and control related shared secrets exist in system software installed in secure DMZ servers not accessible through the Internet.
- SDNP packet communication may occur through three independent channels—a "name server" used to identify elements within the SDNP cloud, "media servers" used for routing content and data, and "signaling servers" used for packet and call command and control.
- Routing information, along with keys and numeric seeds (as needed) are supplied to all participating media servers through an independent signaling channel prior to the call or communiqué and not with content. The signaling server supplies the media servers with only the last and next destination of a packet traversing the network.
- Media packets contain fragmented data representing only a portion of a call, document, text or file, dynamically mixed and remixed with other packets containing fragmented data from other sources and of different types.
- Special security methods are employed to protect the first- and last-mile communication, including separating signaling server-related communications from media and content-related packets.
- Packet transport is content-type dependent, with voice and real-time video or streaming based on an enhanced UDP, while signaling packets, command-and-control packets, data files, application files, systems files, and other files which are sensitive to packet loss or latency utilize TCP transport.
- Special security and authentication methods are used to confirm that a device is the real client and not a clone, and to authenticate that the person communicating is the true owner of the device and not an imposter.

To ensure secure communication with low latency and high QoS in VoIP and real-time applications, the disclosed "secure dynamic network and protocol" or SDNP, utilizes an inventive "dynamic mesh" network comprising

- Dynamic adaptive multipath and meshed routing with minimal latency
- Dynamic packet scrambling
- Dynamic fragmentation using packet splitting, mixing, parsing, and junk bit packet fillers
- Dynamic intra-node payload encryption throughout a network or cloud
- Dynamic network protocol with address disguising and need-to-know routing information
- Multichannel communication separating media and content from signaling, command and control, and network addresses
- Dynamic adaptive real-time transport protocol with data type specific features and contextual routing
- Support of client-encrypted payloads with user-key management
- Lightweight audio CODEC for high QoS in congested networks As described, SDNP communication relies on multi-route and meshed communication to dynamically route data packets. Contrasting single-path packet communication used for Internet OTT and VoIP communications, in SDNP communication in accordance with this invention, the content of data packets is not carried serially by coherent packets containing information from a common source or caller, but in fragmented form, dynamically mixing and remixing content emanating from multiple sources and callers, where said data agglomerates incomplete snippets of data, content, voice, video and files of dissimilar data types with junk data fillers. The advantage of the disclosed realization of data fragmentation and transport is that even unencrypted and unscrambled data packets are nearly impossible to interpret because they represent the combination of unrelated data and data types.

By combining fragmented packet mixing and splitting with packet scrambling and dynamic encryption, these hybridized packets of dynamically encrypted, scrambled, fragmented data comprise meaningless packets of gibberish, completely unintelligible to any party or observer lacking the shared secrets, keys, numeric seeds, and time and state variables used to create, packet, and dynamically re-packet the data.

Moreover, each packet's fragmented content, and the secrets used to create it, remain valid for only a fraction of a second before the packet is reconstituted with new fragments and new security provisions such as revised seeds, keys, algorithms, and secrets. The limited duration in which a cyber-pirate has available to break and open the state-dependent SDNP data packet further enhances SDNP security, requiring tens of thousands of compute years to be processed in one tenth of a second, a challenge twelve orders of magnitudes greater than the time available to break it.

The combination of the aforementioned methods facilitates multi-dimensional security far beyond the security obtainable from static encryption. As such, the disclosed secure dynamic network and protocol is referred to herein as a “hyper-secure” network.

Data Packet Scrambling—

Figure 51A:
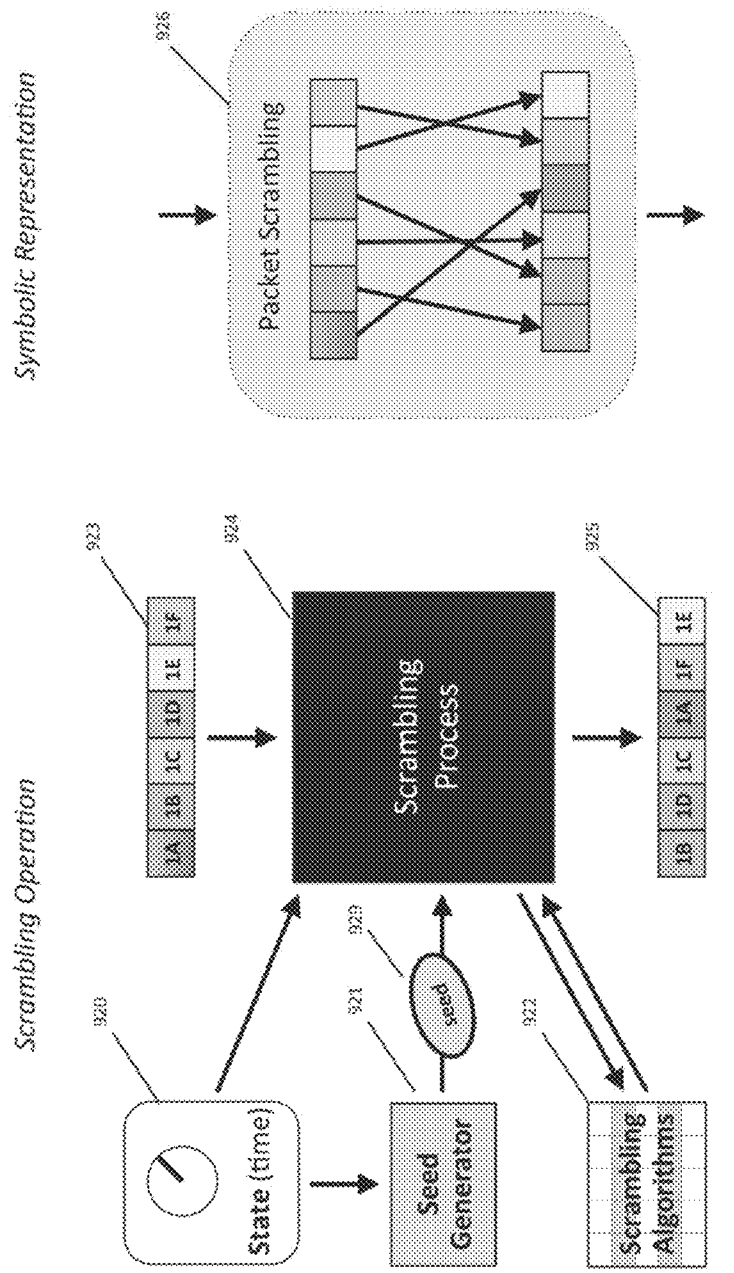
FIG. 51A is a schematic diagram showing the process of packet scrambling.

In accordance with the disclosed invention, secure communication over a packet-switched network relies on several elements to prevent hacking and ensure security, one of which involves SDNP packet scrambling. SDNP packet scrambling involves rearranging the data segments out of sequence, rendering the information incomprehensible and useless. As shown in FIG. 51A, an unscrambled data packet, data packet 923, processed through scrambling operation 924, results in scrambled data packet 925. The scrambling operation can use any algorithm, numerical method, or sequencing method. The algorithm may represent a static equation or include dynamic variables or numerical seeds based on “states,” such as time 920 when the scrambling occurred, and a numerical seed 929 generated by seed generator 921, which may generate seed 929 using an algorithm that is also dependent on a state such as time 920 at the time of the scrambling. For example, if each date is converted into a unique number ascending monotonically, then every seed 929 is unique. Time 920 and seed 929 may be used to select a specific algorithm and may also be used to select or calculate a specific scrambling operation 924, chosen from a list of available scrambling methods, i.e. from scrambling algorithms 922. In data flow diagrams, it is convenient to illustrate this packet-scrambling operation and sequence using a schematic or symbolic representation, as depicted herein by symbol 926.

Figure 51B:
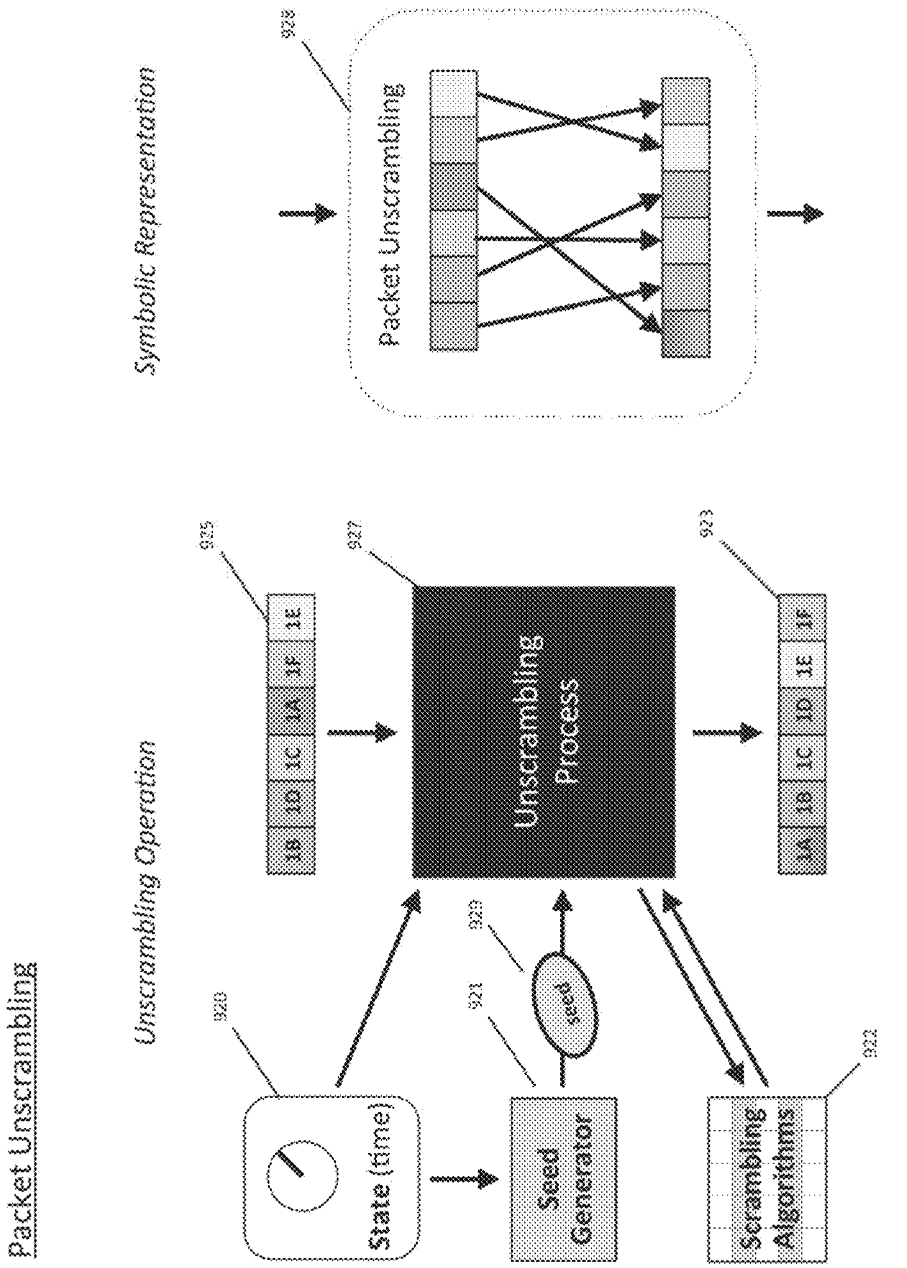
FIG. 51B is a schematic diagram showing the process of packet unscrambling.

The unscrambling operation, shown in FIG. 51B illustrates the inverse function of scrambling operation 924, specifically unscrambling operation 927, where the state or time 920 and corresponding seed 929 used to create scrambled data packet 925 are re-used for undoing the scrambling to produce unscrambled data, specifically unscrambled data packet 923. Using the same state or time 920 employed when the packet scrambling first occurred, the same scrambling method must be used again in the unscrambling operation 927 as selected from scrambling algorithm list 922. Although scrambling algorithm list 922 references the term “scrambling”, the same algorithm table is used to identify and select the inverse function needed for performing “unscrambling”, i.e. scrambling algorithm list 922 contains the information needed both for scrambling data packets and for unscrambling data packets. Because the two functions involve the same steps performed in reverse order, list 922 could also be renamed as “scrambling/unscrambling” algorithms list 922. For clarity's sake however, the table is labeled only by the function and not by its anti-function.

Should the scrambling algorithm selected for implementing unscrambling operation 927 not match the original algorithm employed in packet scrambling, or should seed 929 or state or time 920 not match the time scrambling occurred, then the unscrambling operation will fail to recover the original unscrambled data packet 923, and the packet data will be lost. In data flow diagrams, it is convenient to illustrate this packet unscrambling process and sequence using a schematic or symbolic representation, as depicted herein by symbol 928.

In accordance with the disclosed invention, numerous algorithms may be used to perform the scrambling operation so long that the process is reversible, meaning repeating the steps in the opposite order as the original process returns each data segment to its original and proper location in a given data packet. Mathematically, acceptable scrambling algorithms are those that are reversible, i.e. where a function F(A) has an anti-function $F_{-1}(A)$ or alternatively a transform has a corresponding anti-function such that $$F_{-1}[F(A)]=A$$

meaning that a data file, sequence, character string, file or vector A processed by a function F will upon subsequent processing using the anti-function $F_{-1}$ return the original input A undamaged in value or sequence.

Figure 51C:
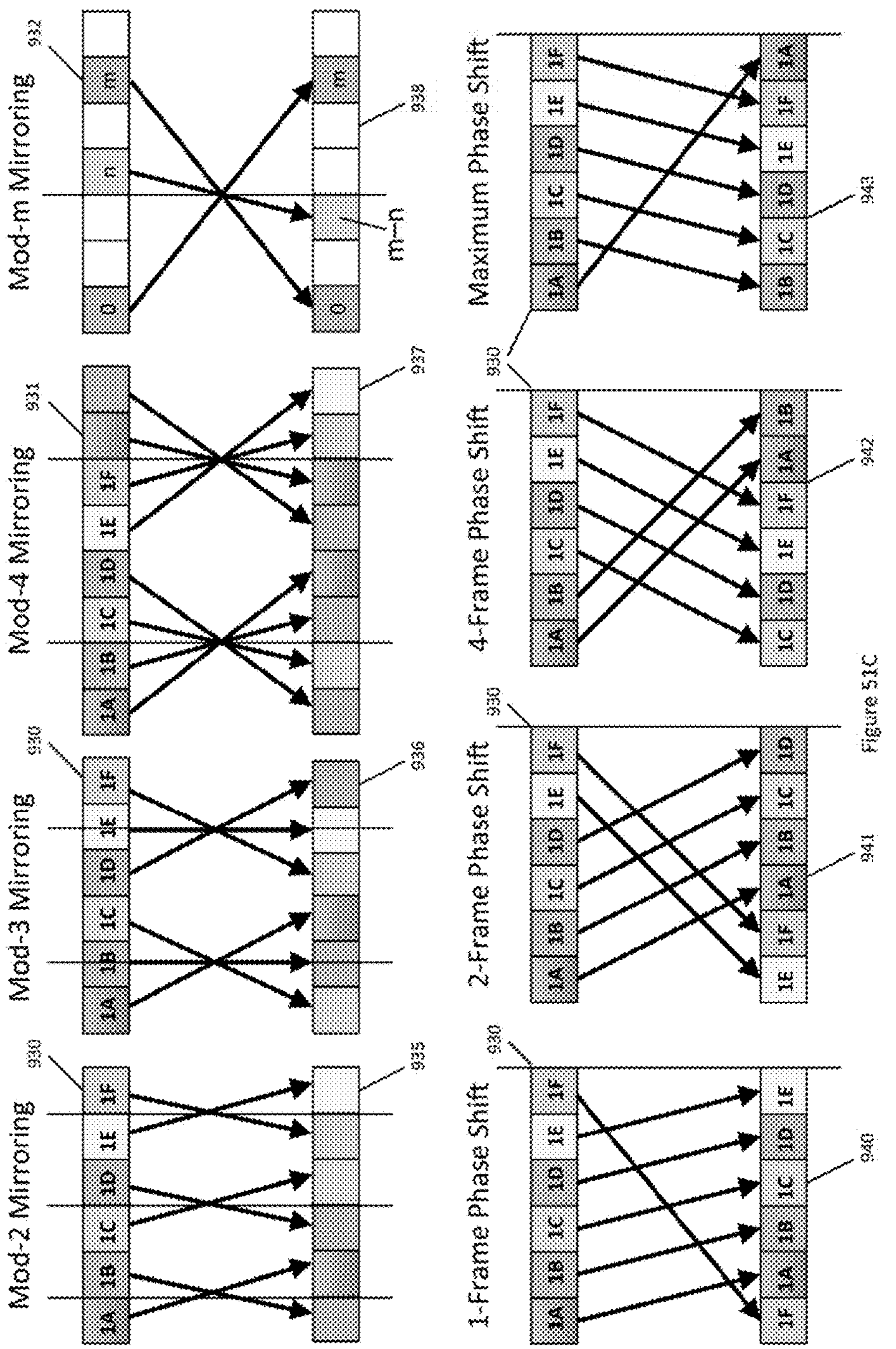
FIG. 51C is a schematic diagram showing various packet scrambling algorithms.

Examples of such reversible functions are illustrated by the static scrambling algorithms shown in FIG. 51C including mirroring and phase-shift algorithms. In mirroring algorithms the data segments are swapped with other data segments as a mirror image around a line of symmetry defined by the modulus or “mod” of the mirroring process. In mod-2 mirroring as shown, every two data segments of original input data packet 930 are swapped, i.e. where 1A and 1B are switched in position, as are 1C and 1D, 1E and 1F and so on, to produce scrambled output data packet 935, with a line of symmetry centered between the first and second data segments, between the third and fourth data segments, and so on, or mathematically as $1.5^{th}$, $3.5^{th}$, $5.5^{th}$, . . . , $(1.5+2n)^{th}$ position.

In mod-3 mirroring, the first and third data segments of every three data segments are swapped while the middle packet of each triplet remains in its original position. Accordingly, data segments 1A and 1C are swapped while 1B remains in the center of the triplet, data segments 1D and 1F are swapped while 1E remains in the center of the triplet, and so on, to produce scrambled data packet output 936. In mod-3 mirroring, the line of symmetry is centered in the $2^{nd}$, $5^{th}$, $8^{th}$, . . . , $(2+3n)^{th}$ position.

In mod-4 mirroring, the first and fourth data segments and the second and third of every four data segments are swapped, and so on to produce scrambled output data packet 937 from input data packet 931. Accordingly, data segment 1A is swapped with 1D; data segment 1B is swapped with 1C; and so on. In mod-4 mirroring, the line of symmetry is centered between the second and third data segments of every quadruplet, e.g. between the $2^{nd}$ and $3^{rd}$ data segments, the $6^{th}$ and $7^{th}$ data segments, and so on, or mathematically as $2.5^{th}$, $6.5^{th}$ . . . $+4n)^{th}$ position. In mod-m mirroring, the $m^{th}$ data segment of input data packet 932 is swapped with the first, i.e. the $0^{th}$ data segment; the $0^{th}$ data segment is swapped with the $m^{th}$ element; and similarly the $n^{th}$ element is swapped with the $(m-n)^{th}$ data segment to produce scrambled output data packet 938.

Another scrambling method also shown in FIG. 51C is a frame-shift, where every data segment is shifted left or right by one, two, or more frames. For example, in a single frame phase shift, every data segment is shifted by one frame, where the first data segment is shifted to the second position; the second data segment is shifted to the third frame, and so on to produce scrambled output data packet 940. The last frame of input data packet 930, frame 1F in the example shown, is shifted to the first frame previously occupied by data segment 1A.

In a 2-frame phase shift, the first data segment 1A of input data packet 930 is shifted by two frames into the position previously occupied by data segment 1C, the $4^{th}$ frame 1D is shifted into the last position of scrambled output data packet 941, the next to the last data segment 1E is shifted into the first position and the last position 1F is shifted into the second position. Similarly, in a 4-frame phase shift, the data segments of input data data packet 930 are shifted by four places with first frame 1A replacing the frame previously held by 1E, 1B replacing 1F, 1C replacing 1A, and so on, to produce scrambled output data packet 942. In the case of the maximum phase shift, the first frame replaces the last, the second frame originally held by 1B becomes the first frame of output data packet 943, the second element is shifted into the first position, the third position into the second place, and so on. Phase-shifting one frame beyond the maximum phase shift results in output data unchanged from the input. The examples shown comprise phase-shifts where the data was shifted to the right. The algorithm also works for phase shifts-to the left but with different results.

Figure 51D:
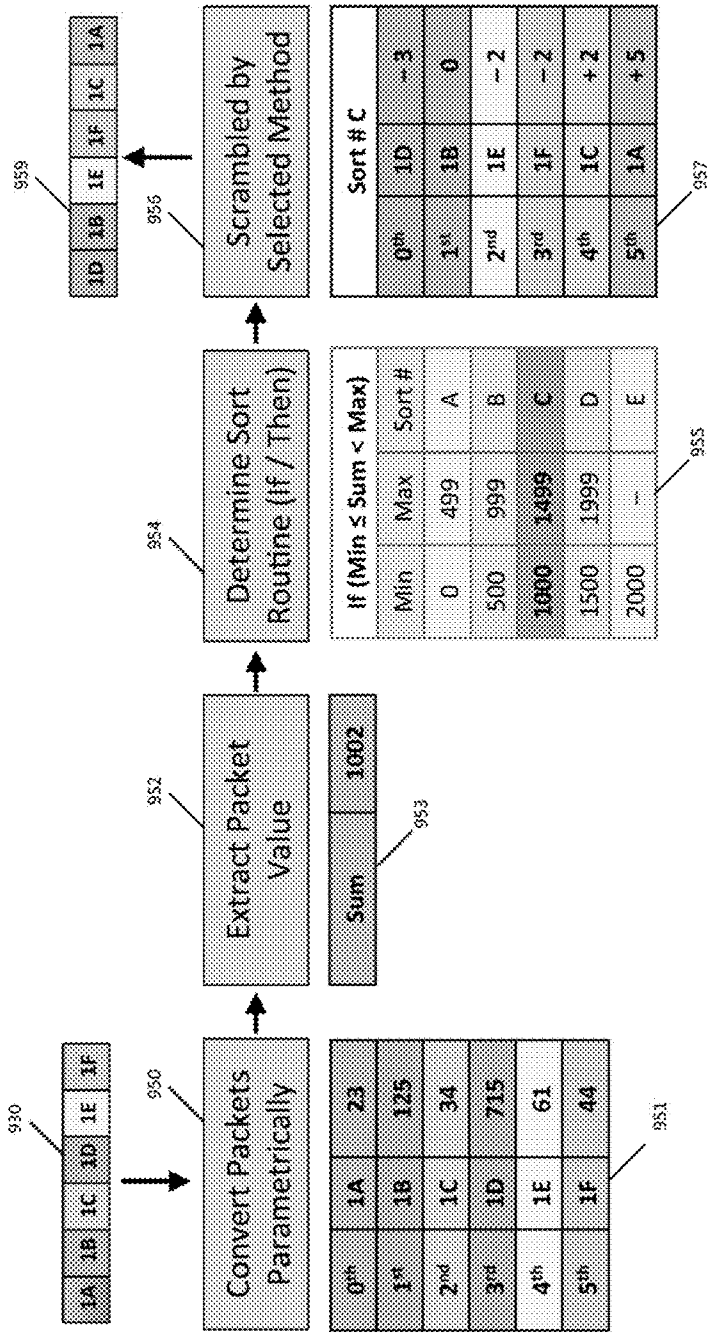
FIG. 51D is a schematic diagram showing static parametric packet scrambling.

The aforementioned algorithms and similar methods as disclosed are referred herein to as static scrambling algorithms because the scrambling operation occurs at a single time, converting an input data set to a unique output. Moreover, the algorithms shown previously do not rely of the value of a data packet to determine how the scrambling shall occur. As illustrated in FIG. 51D, in accordance with the disclosed invention, parametric scrambling means the scrambling method is chosen from a table of possible scrambling algorithms, e.g. sort # A, sort # B, etc., based on a value derived from data contained within the data packet itself. For example, assume each data segment can be converted into a numerical value based on a calculation of the data contained within the data segment. One possible approach to determine the numerical value of a data segment is to employ the decimal or hexadecimal equivalent of the bit data in the data segment. If the data segment contains multiple terms, the numeric equivalent can be found by summing the numbers in the data segment. The data segment data is then combined into a single number or "parameter" and then used to select which scrambling method is employed.

In the example shown, unscrambled data packet 930 is converted parametrically in step 950 into a data table 951, containing a numeric value for each data segment. As shown data segment 1A, the $0^{th}$ frame, has a numeric value of 23, data segment 1B, the $1^{St}$ frame, has a numeric value of 125, and so on. A single data packet value is then extracted in step 952 for the entire data packet 930. In the example shown, sum 953 represents the linear summation of all the data segment values from table 951, parametrically totaling 1002. In step 954 this parametric value, i.e. sum 953, is compared against a condition table, i.e. in software a set of predefined if-then-else statements, to compare sum 953 against a number of non-overlapping numerical ranges in table 955 to determine which sort routine should be employed. In this example, the parametric value of 1002 falls in the range of 1000 to 1499, meaning that sort # C should be employed. Once the sort routine is selected, the parametric value is then no longer required. The unscrambled data input 930 is then scrambled by the selected method in step 956 to produce the scramble data packet output 959. In the example shown, Sort # C, summarized in table 957, comprises a set of relative moves for each data segment. The first data segment of scrambled data packet 959, the $0^{th}$ frame is determined by moving the 1D data segment to the left by three moves, i.e. a 3 shift. The $1^{St}$ frame comprises data segment 1B, unchanged from its original position, i.e. a move of 0 places. The $2^{nd}$ frame comprises 1E, a data segment shifted left by two moves from its original position. The same is true for the $3^{rd}$ frame comprising data segment 1F shifted left by two moves from its original position. The $4^{th}$ frame of scrambled data packet output 959 comprises data segment 1C shifted right, i.e. +2 moves, from its original position. The $5^{th}$ frame comprises data segment 1A, shifted five moves to the right, i.e. +5, from its original position.

In this manner, summarized in table 957 for sort # C, every data segment is moved uniquely to a new position to create a parametrically determined scrambled data packet 959. To unscramble the scrambled data packet, the process is reversed, using the same sort method, sort # C. In order to insure that the same algorithm is selected to perform the unscrambling operation, the parametric value 1002 of the data packet cannot be changed as a consequence of the scrambling operation. For example, using a linear summation of the parametric value of every data segment produces the same numerical value regardless of the order of the numbers.

Figure 51E:
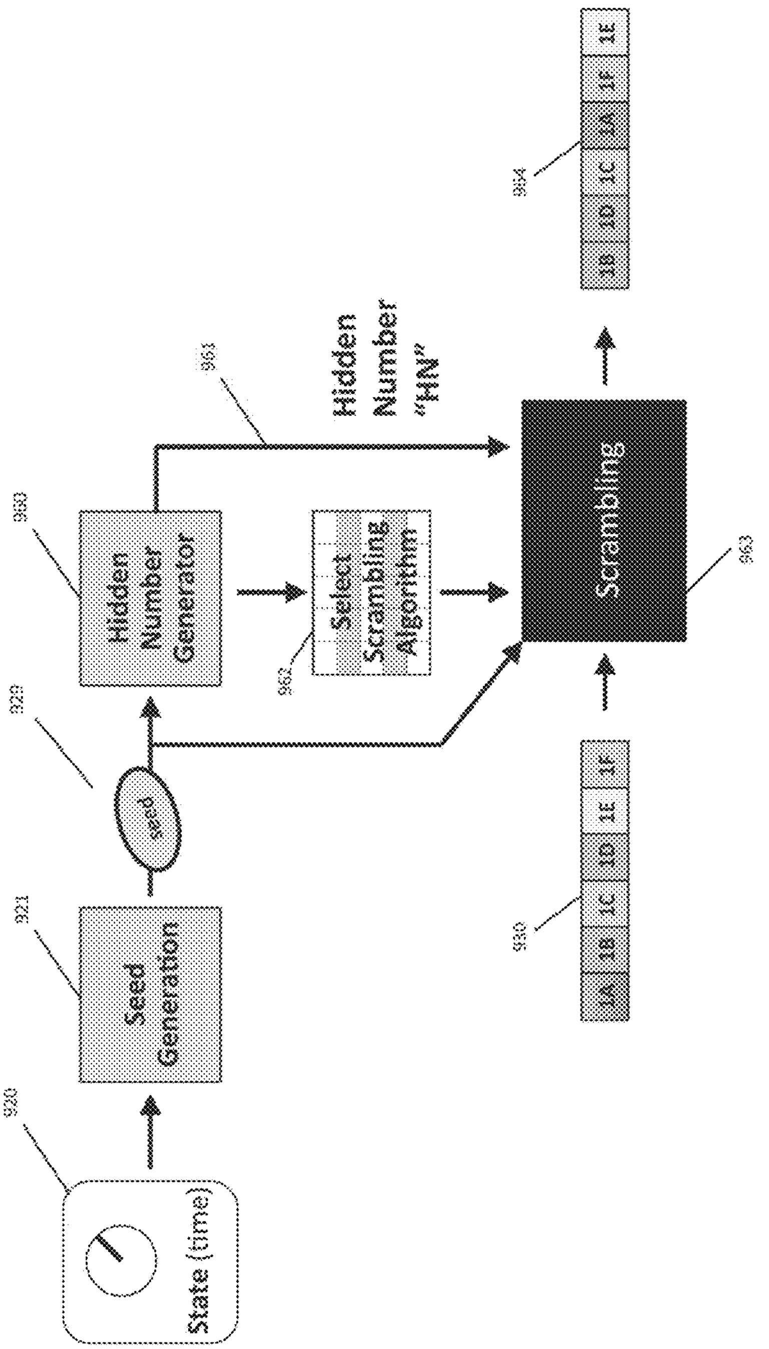
FIG. 51E is a schematic diagram showing dynamic scrambling with a hidden number.

Dynamic scrambling utilizes a system state, e.g. time, to be able to identify the conditions when a data packet was scrambled, enabling the same method to be selected to perform the unscrambling operation. In the system shown in FIG. 51B, the state is used to generate a disguised numerical seed, which is transmitted to the sender or recipient of the package, which then uses the seed to select a scrambling algorithm from a table. Alternatively, the state itself may be transmitted to the sender or recipient, and the state may be used by a hidden number generator located in the sender or recipient to generate a hidden number that is used to select a scrambling/unscrambling algorithm. Such an arrangement is shown in FIG. 51E, where a state, e.g. time 920, is used to generate a hidden number 961, using hidden number generator 960, and to select a scrambling method from scrambling algorithm list 962. Using hidden number 961 to select an algorithm from scrambling algorithm table 962, scrambling operation 963 converts unscrambled data packet 930 into scrambled data packet 964. As shown in FIG. 51E, the state 920 may be passed directly to hidden number generator 960 or state 920 may be passed to hidden number generator via seed generator 921.

The benefit of using a hidden number to select a scrambling algorithm instead of just a numeric seed, is it eliminates any possibility of a cybercriminal recreating the scrambling table by analyzing the data stream, i.e. statistically correlating repeated sets of scrambled data to corresponding numeric seeds. Although the seed may be visible in the data stream and therefore subject to spying, the hidden number generator and the hidden number HN it creates is based on a shared secret. The hidden number HN is therefore not present in the data stream or subject to spying or sniffing, meaning it is not transmitted across the network but generated locally from the numeric seed. This mathematical operation of a hidden number generator thereby confers an added layer of security in thwarting hackers because the purpose of the numeric seed is disguised.

Once the algorithm is selected, the numeric seed may also be used as an input variable in the algorithm of scrambling process 963. Dual use of the numeric seed further confounds analysis because the seed does not directly choose the algorithm but works in conjunction with it to determine the final sequence of the scrambled data segments. In a similar manner, to unscramble a dynamically scrambled data packet, seed 929 (or alternatively the state or time 920) must be passed from the communication node, device or software initially performing the scrambling to any node or device wishing to unscramble it.

In accordance with the disclosed invention, the algorithm of seed generation 921, hidden number generator 960, and the list of scrambling algorithms 962 represent "shared secrets," information stored in a DMZ server (as described below) and not known to either the sender or the recipient of a data packet. The shared secret is established in advance and is unrelated to the communication data packets being sent, possibly during installation of the code where a variety of authentication procedures are employed to insure the secret does not leak. As described below, shared secrets may be limited to "zones" so that knowledge of one set of stolen secrets still does not enable a hacker to access the entire communication network or to intercept real-time communiqués.

In addition to any shared secrets, in dynamic scrambling, where the scrambling algorithm varies during data packet transit, a seed based on a "state" is required to scramble or unscramble the data. This state on which the seed is based may comprise any physical parameter such as time, communication node number, network identity, or even GPS location, so long as there is no ambiguity as to the state used in generating the seed and so long as there is some means to inform the next node what state was used to last scramble the data packet. The algorithm used by the seed generator to produce a seed is part of the shared secrets, and hence knowledge of the seed does not allow one to determine the state on which the seed is based. The seed may be passed from one communication node to the next by embedding it within the data packet itself, by sending it through another channel or path, or some combination thereof. For example, the state used in generating a seed may comprise a counter initially comprising a random number subsequently incremented by a fixed number each time a data packet traverses a communication node, with each count representing a specific scrambling algorithm.

In one embodiment of dynamic scrambling, during the first instance of scrambling a random number is generated to select the scrambling method used. This random number is embedded in the data packet in a header or portion of the data packet reserved for command and control and not subject to scrambling. When the data packet arrives at the next node, the embedded number is read by the communication node and used by the software to select the proper algorithm to unscramble the incoming data packet. The number, i.e. the "count" is next incremented by one count or some other predetermined integer, the packet is scrambled according to the algorithm associated with this new number, and the new count is stored in the data packet output overwriting the previous number. The next communication node repeats the process.

In an alternative embodiment of the disclosed counter-based method for selecting a scrambling algorithm, a random number is generated to select the initial scrambling algorithm and this number is forwarded to every communication node used to transport the specific data packet as a "shared secret". A count, e.g. starting with 0, is also embedded in the data packet in a header or portion of the data packet reserved for command and control and not subject to scrambling. The data packet is then forwarded to the next communication node. When the packet arrives at the next communication node, the server reads the value of the count, adds the count to the initial random number, identifies the scrambling algorithm used to last scramble the data packet and unscrambles the packet accordingly. The count is then incremented by one or any predetermined integer, and the count is again stored in the data packet's header or any portion of the data packet reserved for command and control and not subject to scrambling, overwriting the prior count. The random number serving as a shared secret is not communicated in the communication data packet. When the data packet arrives at the next communication node, the server then adds the random number shared secret added to the revised counter value extracted from the data packet. This new number uniquely identifies the scrambling algorithm employed by the last communication node to scramble the incoming packet. In this method, only a meaningless count number can be intercepted from the unscrambled portion of a data packet by a cyber-pirate has no idea what the data means.

In another alternative method, a hidden number may be employed to communicate the state of the packet and what algorithm was employed to scramble it. A hidden number combines a time-varying state or a seed, with a shared secret generally comprising a numeric algorithm, together used to produce a confidential number, i.e. a "hidden number" that is never communicated between communication nodes and is therefore not sniffable or discoverable to any man-in-the middle attack or cyber-pirate. The hidden number is then used to select the scrambling algorithm employed. Since the state or seed is meaningless without knowing the algorithm used to calculate the hidden number and because the shared-secret algorithm can be stored behind a firewall inaccessible over the network or Internet, then no amount of monitoring of network traffic will reveal a pattern. To further complicate matters, the location of the seed can also represent a shared secret. In one embodiment, a number carried by an unscrambled portion of a data packet and observable to data sniffing, e.g. 27482567822552213, comprises a long number where only a portion of the number represents the seed. If for example, the third through eighth digits represent the seed, then the real seed is not the entire number but only the bolded numbers 27482567822552213, i.e. the seed is 48256. This seed is then combined with a shared secret algorithm to generate a hidden number, and the hidden number is used to select the scrambling algorithm, varying dynamically throughout a network.

Figure 51F:
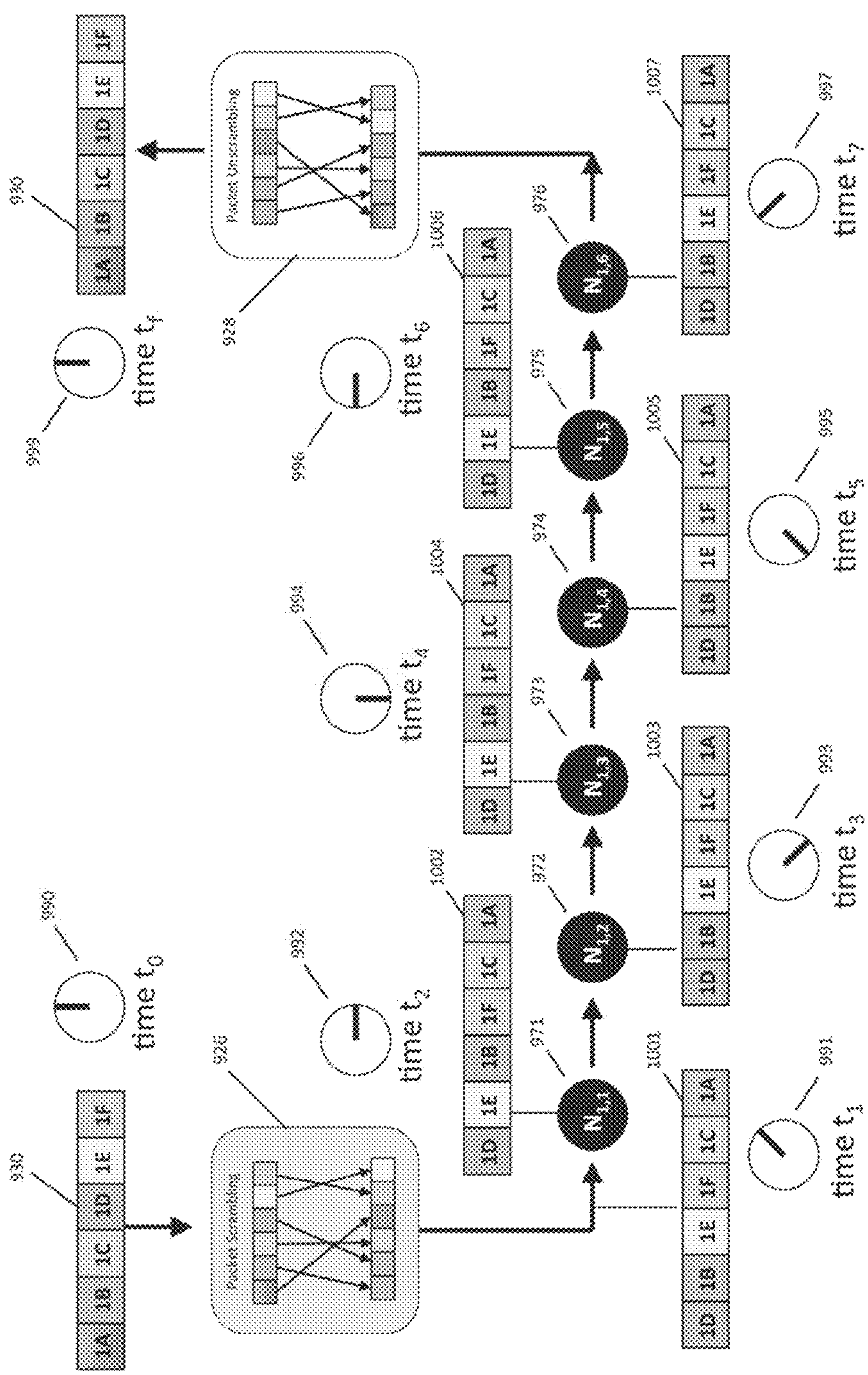
FIG. 51F is a schematic diagram showing dynamic packet scrambling using dithering.

Also in accordance with the disclosed invention, yet another possible dynamic scrambling-algorithm is the process of dithering, intentionally introducing predictable noise into the data-stream in communication. One possible method of dithering involves the repeated transposition of two adjacent data segments occurring as a packet traverses the network. As illustrated in FIG. 51F, at time $t_0$ corresponding to dynamic state 990, the unscrambled data packet 990 is scrambled by packet scrambling operation 926, resulting in scrambled data packet 1001 at time $t_1$ corresponding to dynamic state 991. Data packet 1001 entering into communication node $N_{1,1}$, hosted on server 971, comprises a series of data segments in the sequence 1D, 1B, 1E, 1F, 1C, 1A. Data packet 1001 is modified by communication node $N_{1,1}$ at time $t_2$ changing the data segment order by swapping data segments 1E and 1B. The resulting data packet 1002 comprising the data segment sequence 1D, 1E, 1B, 1F, 1C, 1A is then processed by communication node $N_{1,2}$ hosted on server 972, at time $t_3$ returning the sequence back to 1D, 1B, 1E, 1F, 1C, 1A. With each successive node, the relative positions of data segments 1B and 1E are swapped, or dithered, making no two successive packets the same. As such, the original scramble sequence comprises data packets 1001, 1003, 1005 and 1007 at corresponding times $t_1$, $t_3$, $T_5$ and $t_7$ with altered data packets 1002, 1004, and 1006 at corresponding times $t_2$, $t_4$ and $t_6$. Data packet 1007 output from communication node $N_{1,6}$ hosted on server 972, is then unscrambled by packet unscrambling operation 928 to recover the original data sequence 930 at time $t_f$.

Figure 52:
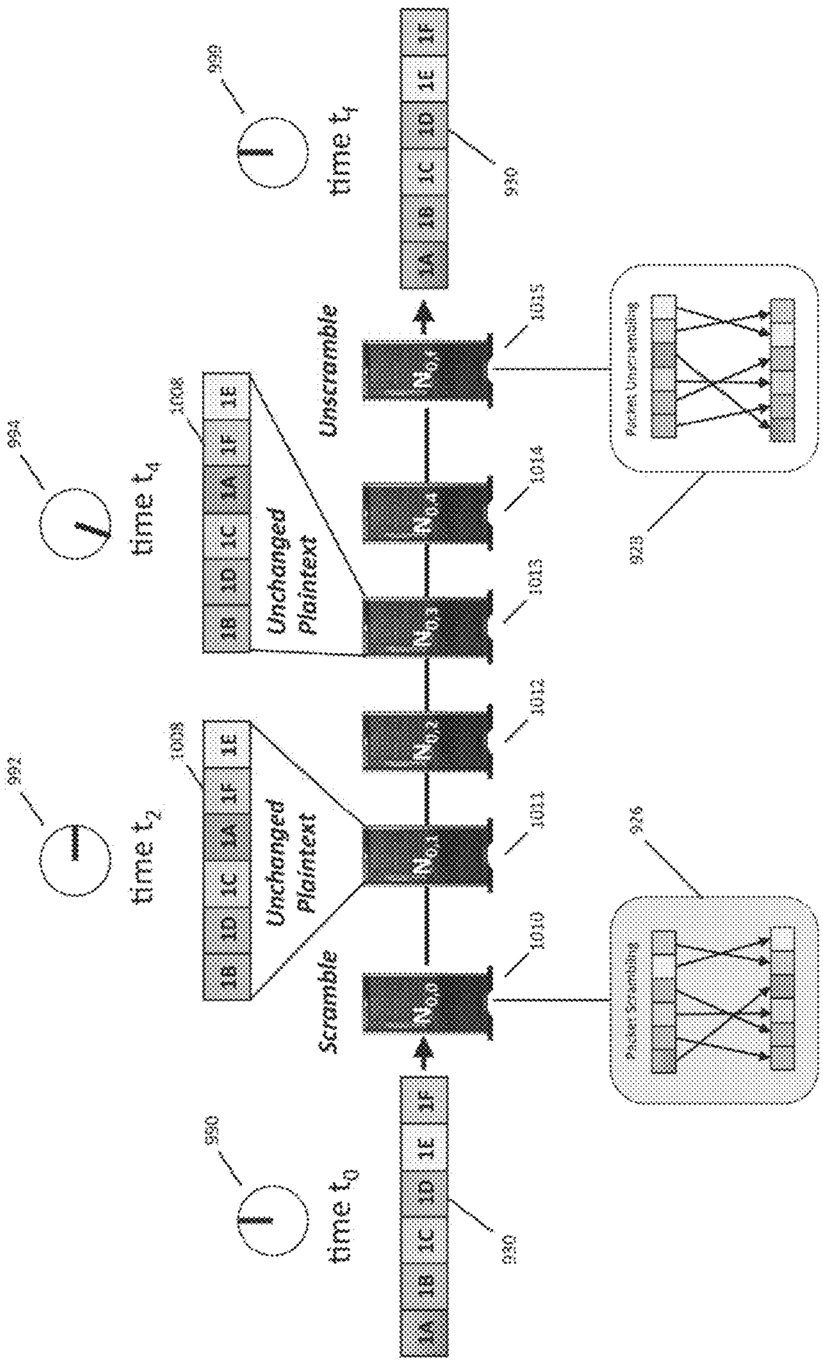
FIG. 52 is a schematic diagram showing static packet scrambling in a linear network.

One example of static scrambling in accordance with the disclosed secure dynamic network and protocol and applied to a data packet 930 traversing a string of communication servers 1010 to 1015 is illustrated in FIG. 52, where communication node $N_{0,0}$, hosted on server 1010, includes packet-scrambling operation 926, resulting in scrambled data packet 1008. Scrambled packet 1008 then traverses a packet-switched communication network without any further changes to the data segment sequence where communication node $N_{0,f}$, hosted on server 1015, finally performs packet-unscrambling operation 928 returning the data packet to its original sequence. This form of data transport represents static scrambling because the data packet, once initially scrambled, does not change traversing the network until it reaches the last server.

The data shown traversing the network, albeit scrambled, can be referred to as "plaintext" because the actual data is present in the data packets, i.e. the packets have not been encrypted into ciphertext. By contrast, in ciphertext the character string comprising the original data, whether scrambled or not, is translated into a meaningless series of nonsense characters using an encryption key, and cannot be restored to its original plaintext form without a decryption key. The role of encryption in the disclosed SDNP based communication is discussed further in the following section on "Encryption."

Figure 53:
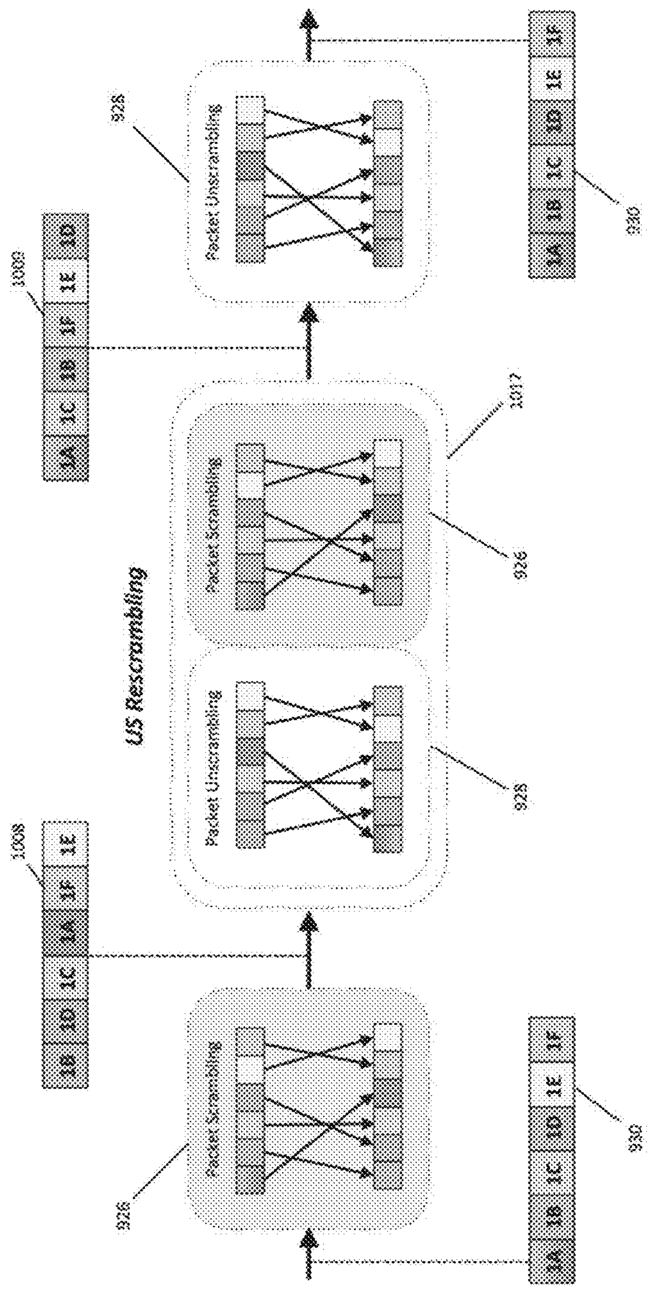
FIG. 53 is a schematic diagram showing the packet re-scrambling process.

In order to change the sequence of data packets during transport through the network, packet "re-scrambling" is required, as shown in FIG. 53. The process of packet re-scrambling returns a scrambled data packet to its unscrambled state before scrambling it again with a new scrambling algorithm. Thus, the term "re-scrambling" as used herein, means unscrambling a data packet and then scrambling it again, typically with a different scrambling algorithm or method. This approach avoids the risk of data corruption that could occur by scrambling a previously scrambled package and losing track of the sequence needed to restore the original data. As shown, once initially scrambled by packet scrambling operation 926, scrambled data packet 1008 is "re-scrambled," first by unscrambling it with unscrambling operation 928, using the inverse operation of the scrambling algorithm used to scramble the data, and then by scrambling the data packet anew with scrambling operation 926, using a different scrambling algorithm than used in the prior scrambling operation 926. The resulting re-scrambled data packet 1009 differs from the prior scrambled data packet 1008. Re-scrambling operation 1017 comprises the successive application of unscrambling followed by scrambling, referred to herein as "US re-scrambling," where "US" is an acronym for "unscrambling-scrambling." To recover the original data packet 930, the final packet unscrambling operation 928 requires using the inverse function of the same algorithm used to last re-scramble the data packet.

Figure 54:
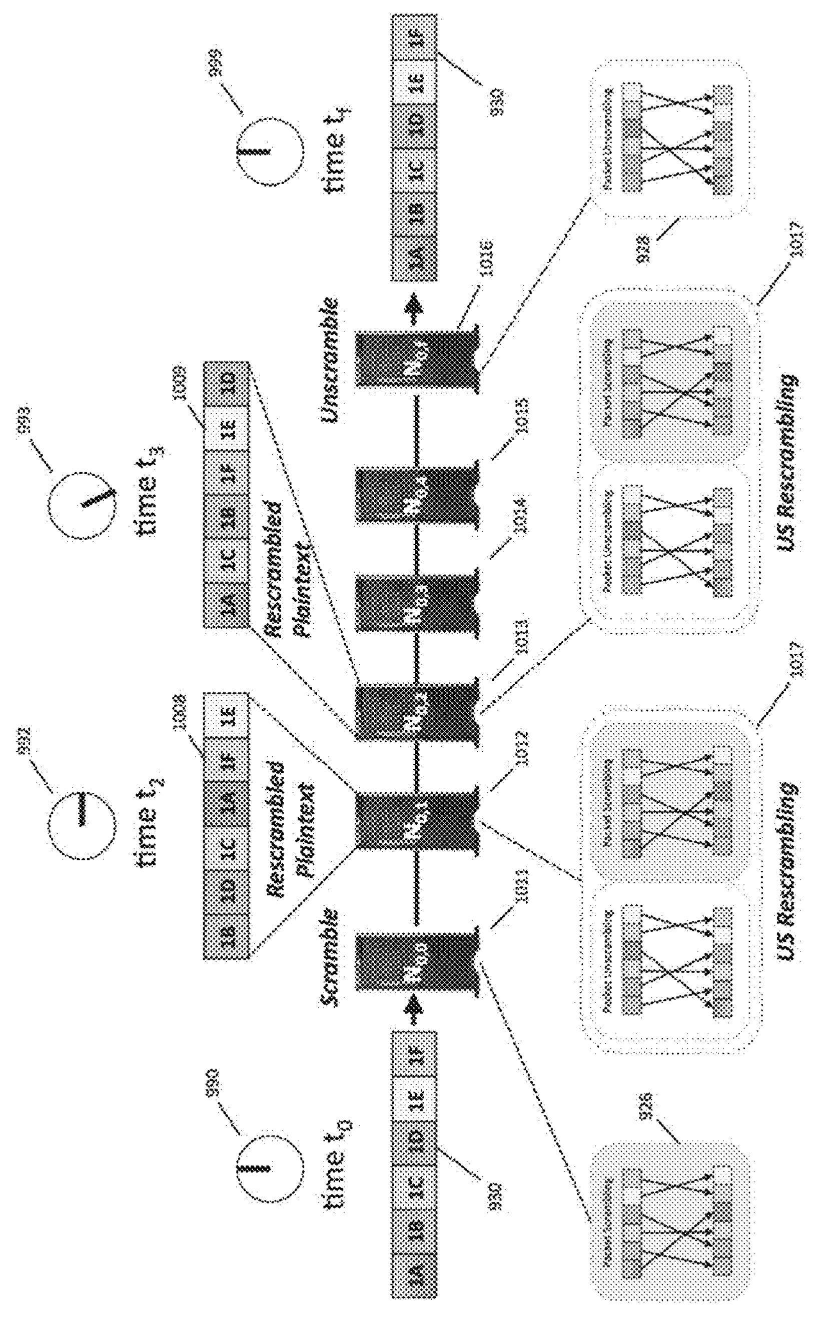
FIG. 54 is a schematic diagram showing dynamic packet scrambling in a linear network.

The application of US re-scrambling in a SDNP-based packet-switched communication network in accordance with the invention is illustrated in FIG. 54, where data packet 930 first scrambled by scrambling operation 926 in server 1011, is successively modified by US re-scrambling operation 1017 as the data packet traverses network of packet switch communication servers 1012 through 1015. The final unscrambling operation 928 occurs in server 1016, restoring data packet 930 to its original sequence. Since the re-scrambling occurs repeatedly and at different times from time $t_0$ to $t_f$, the resulting network represents a dynamically scrambled communication network. In operation, unscrambled data packet 930 is scrambled using scrambling operation 926 implemented within communication node $N_{0,0}$, hosted on server 1011. Using US re-scrambling operation 1017 implemented within communication node $N_{0,1}$, hosted on server 1012, the packet is modified into scrambled data packet 1008 at time $t_2$. The same process repeats again each time the data packet transits through the remaining communication nodes. For example, within communication node $N_{0,2}$, hosted on server 1013, US re-scrambling operation 1017 converts re-scrambled data packet 1008 into a new re-scrambled data packet 1009.

Each re-scrambling operation 1017 first undoes the prior scrambling by relying on the prior state of the packet entering the communication node, e.g. where data packet 1008 was scrambled with a state corresponding to time $t_2$, and then scrambles the packet anew with a new state corresponding to time $t_3$ to create re-scrambled data packet 1009. As described previously, the state used in determining the scrambling performed may involve a seed, a time, or a number based on any physical parameter such as time, communication node number, network identity, or even GPS location, so long that there is no ambiguity as to how the scrambling was last performed. Accordingly, unscrambling the input data packet to communication node $N_{0,1}$, hosted on server 1012, relies on the state of the prior server used to scramble the data packet, i.e. the state of communication node $N_{0,0}$, hosted on server 1011; unscrambling the data packet entering communication node $N_{0,2}$, hosted on server 1013, relies on the state of communication node $N_{0,1}$, hosted on server 1012, at the time of scrambling, unscrambling the data packet entering communication node $N_{0,3}$, hosted on server 1014, relies on the state of communication node $N_{0,2}$, hosted on server 1013, at the time of scrambling, and so on. The last communication node in the communication network, in this case communication node $N_{0,f}$, hosted on server 1016, does not perform US re-scrambling but instead only performs unscrambling operation 928 to restore data packet 93090 to its original unscrambled sequence.

In accordance with the disclosed invention, the static and dynamic scrambling of data renders interpretation of the unscrambled data meaningless, reordering sound into unrecognizable noise, reordering text into gibberish, reordering video into video snow, and scrambling code beyond repair. By itself, scrambling provides a great degree of security. In the SDNP method disclosed herein, however, scrambling is only one element utilized to provide and insure secure communication free from hacking, cyber-assaults, cyber-piracy, and man-in-the-middle attacks.

Packet Encryption—

In accordance with the disclosed invention, secure communication over a packet-switched network relies on several elements to prevent hacking and ensure security, one of which involves SDNP encryption. As described previously, encryption from the Greek meaning "to hide, to conceal, to obscure" represents a means to convert normal information or data, commonly called "plaintext", into "ciphertext" comprising an incomprehensible format rendering the data unreadable without secret knowledge. In modern communication, this secret knowledge generally involves sharing one or more "keys" used for encrypting and decrypting the data. The keys generally comprise pseudo-random numbers generated algorithmically. Numerous articles and texts are available today discussing the merits and weaknesses of various encryption techniques such as "Cryptonomicon" by Neal Stephenson © 1999, "The Code Book: The Science of Secrecy from Ancient Egypt to Quantum Cryptography" by Simon Singh © 1999, "Practical Cryptography" by Niels Ferguson © 2013, and "Cryptanalysis: A Study of Ciphers and Their Solution" first published in 1939.

While the concept of encryption or ciphers is ancient and well known to those skilled in the art, the application of cryptography in the disclosed secure dynamic network and protocol is unique, facilitating both end-to-end encryption and single-hop node-to-node dynamic encryption to the network architecture itself, independent of any client's own encryption. SDNP communication is architected with the basic precept that given sufficient time, any static encrypted file or message can eventually be broken and its information stolen, no matter how sophisticated the cipher. While this supposition may in fact be incorrect, there is no need to prove or disprove the proposition because the converse, i.e. waiting till a specific encryption method fails, may result in unacceptable and irreversible consequential damage.

Instead, SDNP communication is based on the premise that all encrypted files have a limited "shelf life", metaphorically meaning that encrypted data is good (secure) for only a finite period of time and that the confidential data must be re-encrypted dynamically at regular intervals, ideally far more frequently than the best estimates of the time required to crack its encryption with state-of-the-art computers. For example, if it is estimated by cryptologists that a large server farm of crypto-engines can break a given cipher in one year, then in SDNP communication a data packet will be re-encrypted every second or even every 100 ms, intervals many orders of magnitude shorter than the best technology's capability to crack it. As such, SDNP encryption is necessarily dynamic, i.e. time variant, and may also be spatially variant, i.e. depending on a communication node's location in a packet-switched network or geography. Thus, as used herein, the terms "re-encrypting" or "re-encryption" refer to decrypting a data packet and then encrypting it again, typically with a different encryption algorithm or method.

SDNP encryption therefore involves converting data from unencrypted plaintext into ciphertext repeatedly and frequently, rendering the information incomprehensible and useless. Even if a given packet's data encryption is miraculously broken, by employing SDNP's dynamic encryption methods, the next data packet utilizes a completely different encryption key or cipher and requires a completely new effort to crack its encryption. By limiting the total content of each uniquely encrypted data packet, the potential damage of unauthorized access is mitigated because an exposed data packet contains, by itself, a data file too small to be meaningful or useful by a cyber-pirate. Moreover, by combining dynamic encryption with the aforementioned SDNP scrambling methods, communication security is enhanced tremendously. Even in its unencrypted form, the intercepted data file contains only a small snippet of data, voice, or video scrambled into a meaningless and incomprehensible sequence of data segments.

Figure 55A:
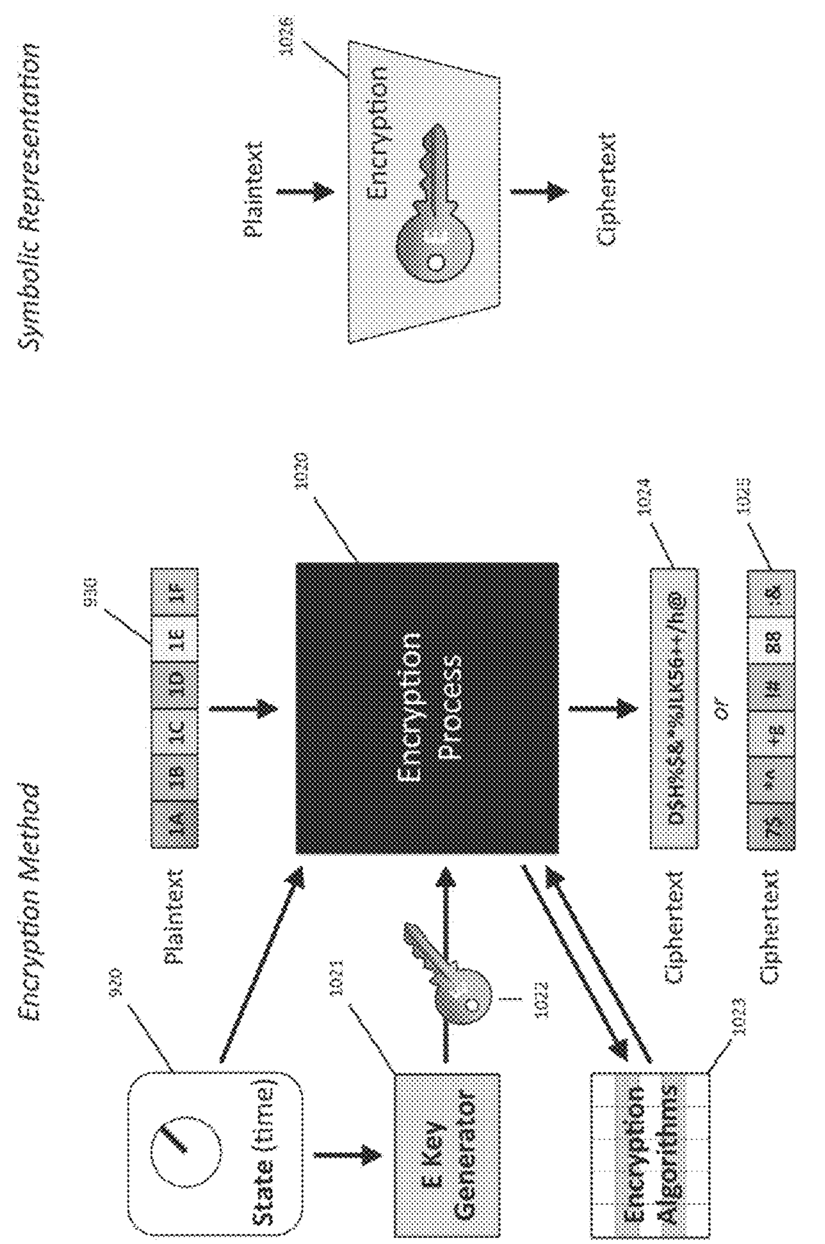
FIG. 55A is a schematic diagram showing the process of packet encryption.

In accordance with this invention, SDNP encryption is dynamic and state-dependent. As shown in FIG. 55A, an unencrypted data packet comprising plaintext 930, processed through encryption operation 1020, results in an encrypted data packet comprising ciphertext 1024 or 1025. In the case of ciphertext 1024, the entire data packet of plaintext 930 is encrypted in toto, treating data segments 1A through 1F as a single data file. In the case of ciphertext 1025, each data segment 1A through 1F of plaintext 930 is encrypted separately and distinctly, and is not merged with other data segments. First data segment 1A is encrypted into a corresponding first ciphertext data segment shown for illustration purposes by a string of characters starting with 7$ and comprising a long string of characters or digits not shown. Similarly, second plaintext data segment 1B is encrypted into second ciphertext data segment comprising a long string of characters shown for illustrative purposes starting with *^. The characters 7$ and *^ are meant to illustrate the beginning of meaningless strings of symbols, digits, and alphanumeric characters and not to limit or imply anything about the specific data in the plaintext source or the length of the character strings being encrypted.

Encryption operation 1020 can use any algorithm, cryptographic, or cipher method available. While the algorithm may represent a static equation, in a one embodiment the encryption operation uses dynamic variables or "states" such as time 920 when encryption occurs, and an encryption generator 1021 to produce "E-key" 1022, which also may be dependent on a state such as time 920 at which the encryption was performed. For example, the date and time of encryption may be used as a numeric seed for generating an encryption key that cannot be recreated even if the encryption algorithm were discovered. Time 920 or other "states" may also be used to select a specific algorithm from an encryption algorithms list 1023, which is a list of available encryption algorithms. In data flow diagrams, it is convenient to illustrate this packet encryption operation and sequence using a schematic or symbolic representation, as depicted herein by the symbol shown for encryption operation 1026. Throughout this invention disclosure, a padlock may also symbolically represent secure and encrypted data. Padlocks with a clock face located atop the padlock specifically indicate a secure delivery mechanism, e.g., encrypted files that, if not received within a specific interval or by a specific time, self-destruct and are lost forever.

Figure 55B:
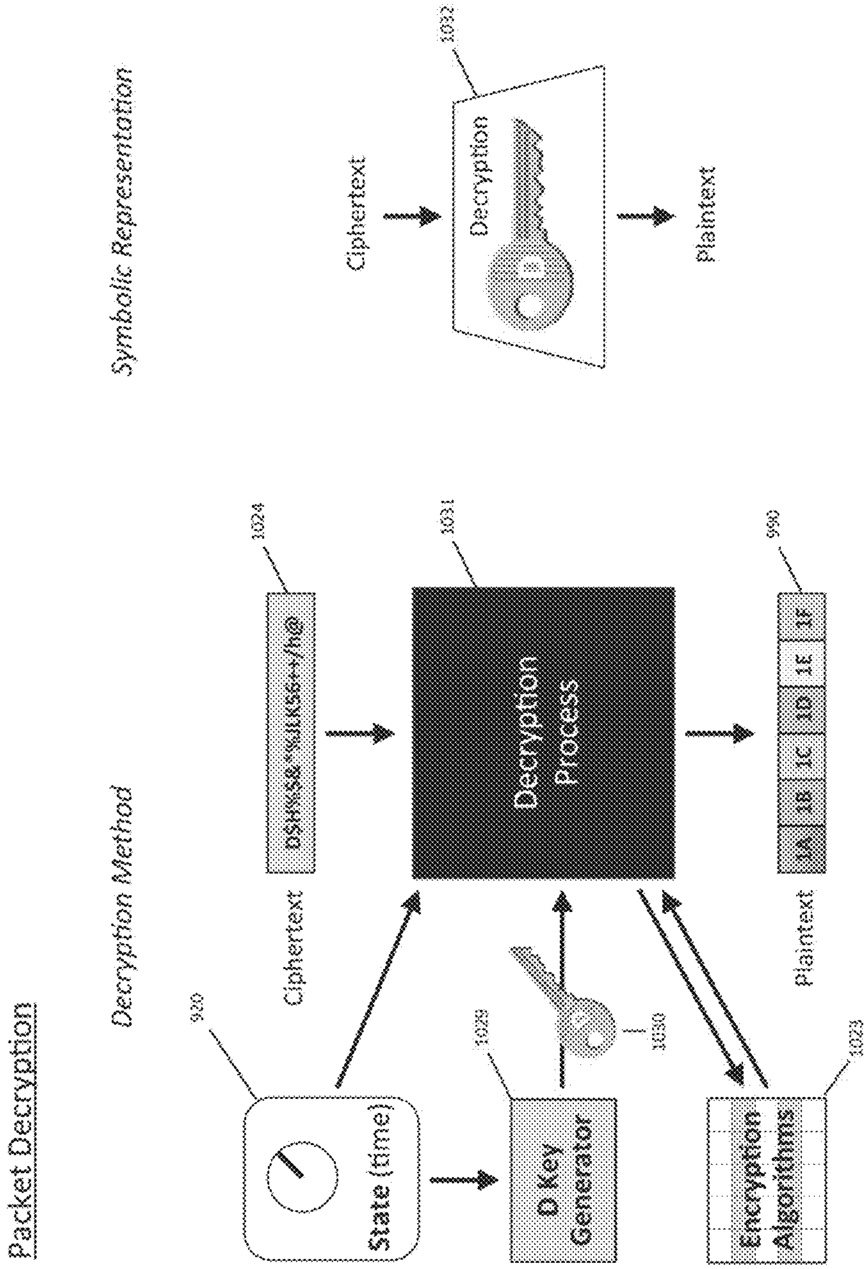
FIG. 55B is a schematic diagram showing the process of packet decryption.

The decryption operation shown in FIG. 55B illustrates the inverse function of encryption operation 1020, specifically decryption operation 1031, where the state or time 920 and other states used to create ciphertext 1024, along with a decryption key or "D-key" 1030 generated by D-key generator 1029 are re-used for undoing the encryption, i.e. decrypting the file, to produce unencrypted data comprising original plaintext data packet 990. Using the same state or time 920 employed when the packet encryption first occurred, the same encryption operation that was selected from encryption algorithm list 1023 may be used again in the decryption operation 1031. Although encryption algorithm list 1023 references the term "encryption", the same algorithm table is used to identify and select the inverse function needed for performing "decryption", i.e. encryption algorithm list 1023 contains the information needed both for encrypting and decrypting data packets. Because the two functions involve the same steps performed in reverse order, table 1023 could also be renamed as "encryption/decryption" algorithms table 1023. For clarity's sake however, the table is labeled only by the function and not by its anti-function.

Should the encryption algorithm selected for implementing decryption operation 1031 not match the inverse of the original algorithm employed in packet encryption operation 1020, should state or time 920 not match the time encryption occurred, or should D-key 1030 not have a predefined numeric relationship to E-key 1022 used during encryption, then the decryption operation 1031 will fail to recover the original unencrypted data 990 and the packet data will be lost. In data flow diagrams, it is convenient to illustrate this packet decryption operation and sequence using a schematic or symbolic representation, as depicted herein by the symbol shown for decryption operation 1032.

As described previously in this disclosure, knowledge regarding the use of encryption and decryption keys in cryptography and of common encryption algorithms, such as symmetric public key encryption, RSA encryption, and AES256 encryption among others, are commonplace and well known to those skilled in the art. The application of such well known cryptographic methods in the disclosed SDNP communication system is, however, not readily susceptible to hacking or decryption because of hidden information, shared secrets, and time-dependent dynamic variables and states unique to the disclosed SDNP communication.

So even in the unlikely case where a cyber-pirate has sufficient computer power to eventually crack a robust encryption method, they lack certain information embedded into the SDNP network as non-public or shared secrets required to perform the decryption operation, and must also crack the encryption in a fraction of a second before the encryption changes. Moreover every data packet traversing the disclosed SDNP network utilizes a different encryption method with unique keys and dynamic states. The combination of missing information, dynamic states, and limited informational content contained within any given packet, renders obtaining meaningful data theft from any given data packet both challenging and unrewarding to a cyber-pirate.

Figure 56:
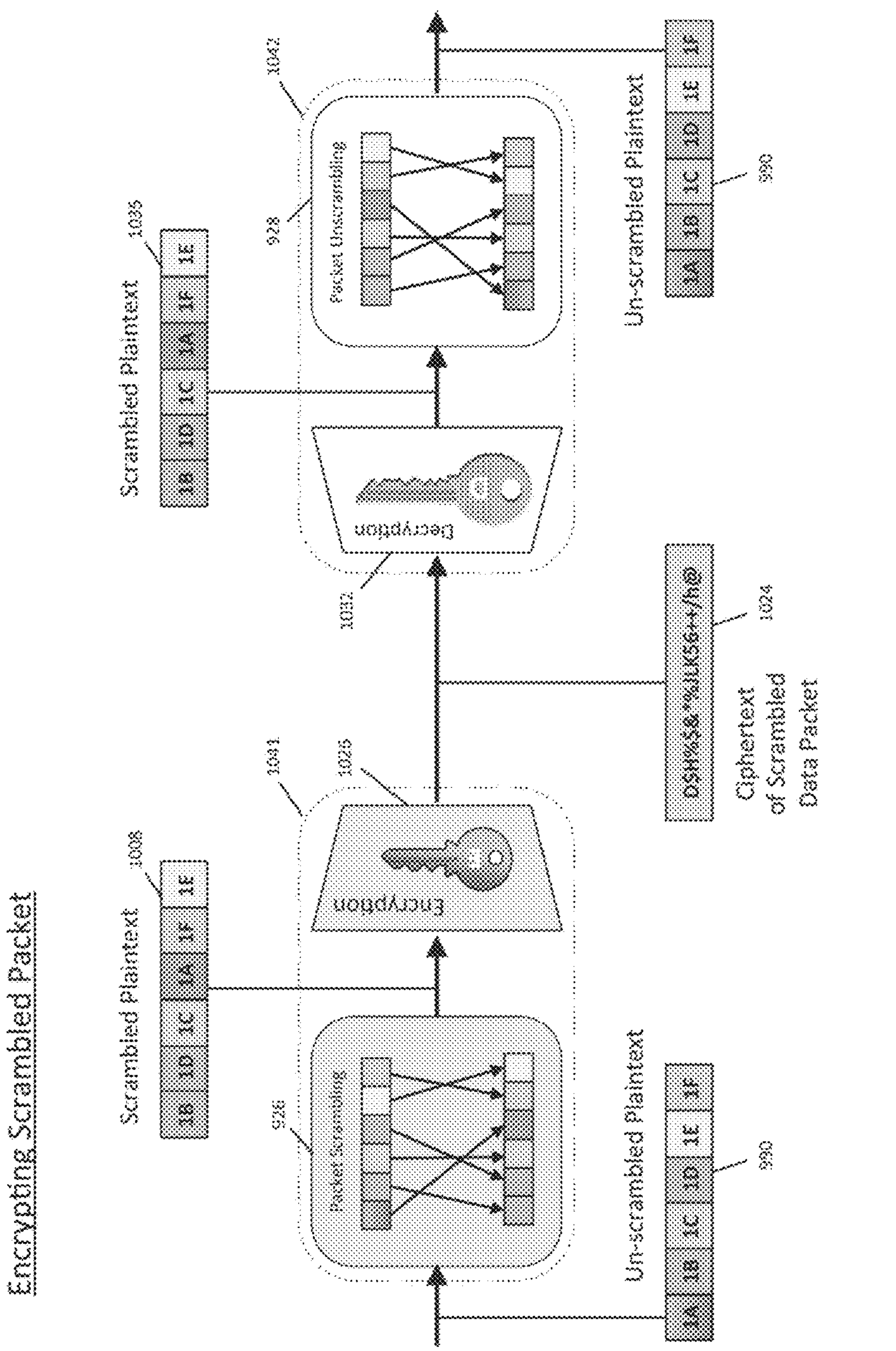
FIG. 56 is a schematic diagram showing the process of encrypted scrambling and its inverse function.

In order to intercept an entire document, video stream, or voice conversation to reconstruct a coherent data sequence, a cyber-assault must successively crack and decrypt not one but thousands of successive SDNP packets. The daunting challenge of continuously hacking a succession of SDNP packets is further exacerbated by combining dynamic encryption with the previously described methods regarding data packet scrambling. As illustrated in FIG. 56, the creation of an encrypted, scrambled data packet 1024 involves the successive combination of scrambling operation 926 and encryption operation 1026 to convert un-scrambled plaintext data packet 990 first into scrambled plaintext data packet 1008 and then into ciphertext 1024 of the scrambled data packet. To undo the encrypted scrambled package, the inverse functions must be applied in reverse sequence first by decryption operation 1032 to recover scrambled plaintext data packet 1035, then by unscrambling operation 928 to recover unscrambled plaintext data packet 990.

As shown, scrambling and encryption represent complementary techniques in achieving secure communication. Unencrypted scrambled data traversing the network, is referred to as “plaintext” because the actual data is present in the data packets, i.e. the packets have not been encrypted into ciphertext. Encrypted data packets, or ciphertext, comprise scrambled or unscrambled character strings translated into a meaningless series of nonsense characters using an encryption key, and cannot be restored to its original plaintext form without a corresponding decryption key. Depending on the algorithm employed, the encryption and decryption keys may comprise the same key or distinct keys mathematically related by a predefined mathematical relationship. As such, scrambling and encryption represent complementary techniques in achieving secure communication in accordance with the disclosed invention for SDNP communication.

The two methods, scrambling and encryption, can be considered independently even when used in combination, except that the sequence used to restore the original data packet from an encrypted scrambled data packet must occur in the inverse sequence to that used to create it. For example, if the data packet 990 was first scrambled using scrambling operation 926 and then encrypted using encryption operation 1026, then to restore the original data packet, the encrypted scrambled data packet 1024 must first be decrypted using decryption operation 1032 and then unscrambled using unscrambling operation 928. Mathematically, if a scrambling operation F scrambles a string of bits or characters into an equivalent scrambled version and an unscrambling operation F' undoes the scrambling, whereby $$F^{-1}[F(A)]=A$$

and similarly if an encryption operation G encrypts a string of plaintext into equivalent ciphertext and a decryption operation $G^{-1}$ undoes the encryption whereby $$G^{-1}[G(A)]=A$$

then in combination, the successive operation of scrambling and then encrypting followed by decrypting and then unscrambling returns the original argument A, the unscrambled plaintext data packet. Accordingly, $$F^{-1}\{G^{-1}[G(F(A))]\}=A$$

because the sequence occurs in inverse order, specifically decrypting $[G^{-1}]$ encrypted scrambled packet [G(F(A))] restores scrambled plaintext data packet F(A). Subsequent unscrambling operation $F^{-1}$ of scrambled plaintext packet F(A) restore the original data packet A.

Provided linear methods are employed, the sequence is reversible. For example, if the data packet is first encrypted and then scrambled, then to restore the original data packet the scrambled ciphertext must first be unscrambled and then decrypted. Accordingly, $$G^{-1}\{F^{-1}[F(G(A))]\}=A$$

Changing the sequence does not work. Decrypting a data packet that was previously encrypted and then scrambled without first unscrambling it will not recover the original data packet, i.e.

$$F^{-1}\{G^{-1}[F(G(A))]\}\neq A$$

Similarly unscrambling a packet that was scrambled and then encrypted will also fail to restore the original data packet, because $$G^{-1}\{F^{-1}[G(F(A))]\}\neq A$$

To summarize, if the plaintext packet is scrambled before it is encrypted, it must be decrypted before it is unscrambled; if the plaintext packet is encrypted before it is scrambled, it must be unscrambled before it is decrypted.

While it is understood that scrambling and encrypting may be performed in either sequence, in one embodiment of the SDNP methods in accordance with this invention, encryption and decryption occur more frequently during network transport than scrambling and therefore encryption should occur after scrambling and decryption should occur before unscrambling, as illustrated in FIG. 56, rather than the converse. For convenience, we define the combination of packet scrambling operation 926 followed by encryption operation 1026 as encrypting scrambled packet operation 1041, and its converse, the combination of decryption operation 1032 followed by packet unscrambling operation 928 as unscrambling decrypted packet operation 1042. These hybridized operations may be employed in static and dynamic SDNP communication in accordance with this invention.

Figure 57:
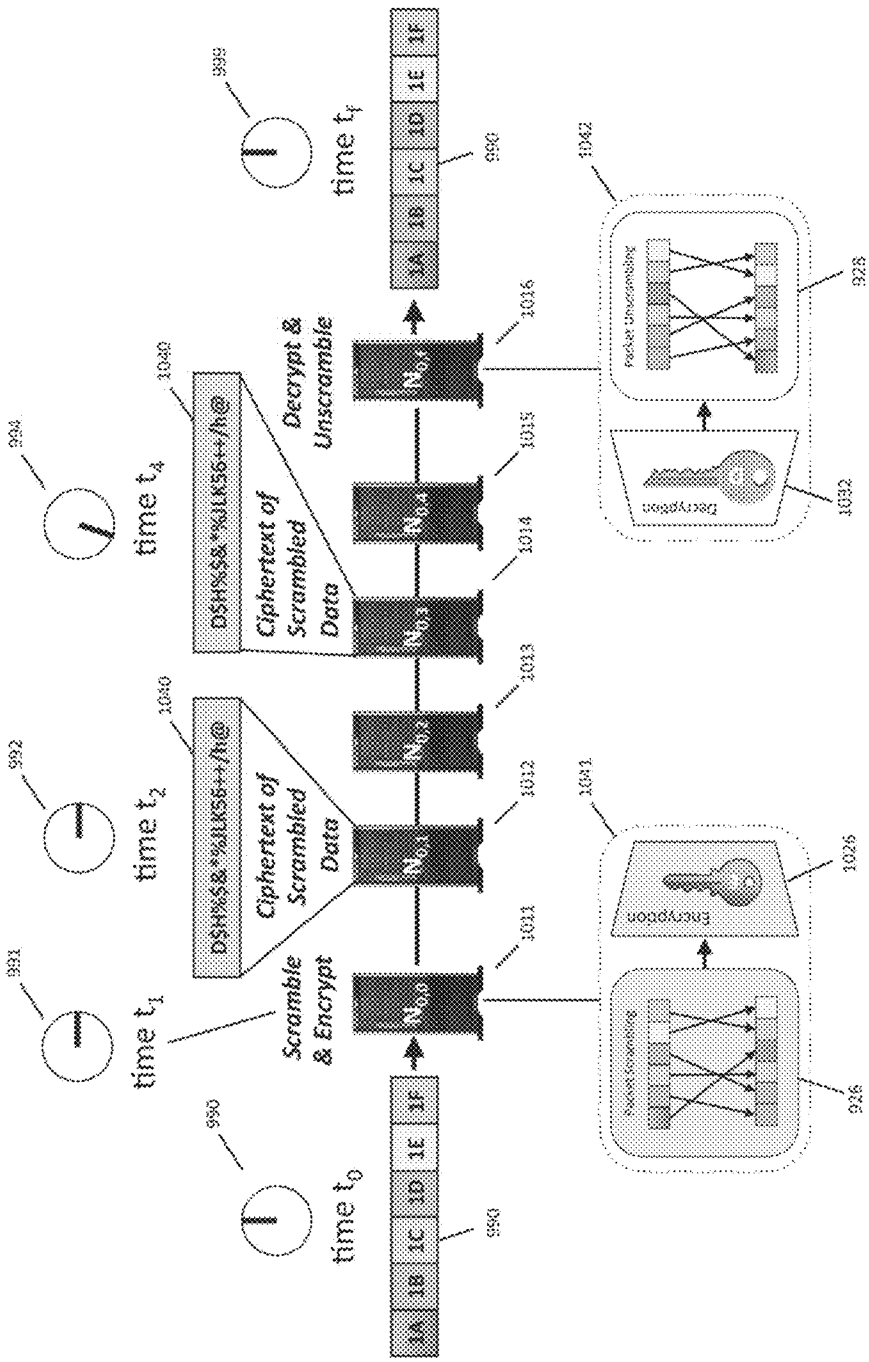
FIG. 57 is a schematic diagram showing static encrypted scrambling in a linear network.

In FIG. 57, representing SDNP communication, plaintext packet 990 traverses a series of communication nodes 1011 to 1016 of a packet-switched communication network in a statically encrypted and scrambled form, represented by ciphertext data packet 1040, which does not change from node-to-node or with time. As shown in the first server, $N_{0,0}$ communication node 1101, the scrambling encryption operation 1041 is employed to convert the original plaintext data packet 990 into ciphertext data packet 1040 of encrypted, scrambled data. Once converted at time $t_1$ and corresponding state 991, the encrypted scrambled data packet remains static and unchanged as the data packet traverses the network until finally reaching $N_{0,f}$ communication node 1016, where the data packet is returned to its original form of plaintext data packet 990 by decryption unscrambling operation 1042 at time $t_f$. While the combination of scrambling and encryption greatly enhances security, it does not represent dynamic security because the data packets remain unchanged over time and during transit.

One means to enhance to enhance security in any implementation using static scrambling encryption is to insure that each data packet sent is subjected to different scrambling and/or encryption methods, including changes in state, seeds, and/or keys at time $t_1$ when each data packet enters the communication network.

However, a more robust alternative involves dynamically changing a data packet's encryption or scrambling, or both, as the packet traverses the network in time. In order to facilitate the required data processing to realize a fully dynamic version of SDNP communication, it is necessary to combine the previously defined processes in order to "re-scramble" (i.e., unscramble and then scramble) and "re-encrypt" (i.e., unencrypt and then encrypt) each packet as it passes through each communication node in a packet-switched communication network. As used herein the term "re-packet" or "re-packeting" will sometimes be used to refer to the combination of "re-scrambling" and "re-encryption," whether the packet is initially decrypted before it is unscrambled or unscrambled before it is decrypted. In either case, the unscrambling and decryption operations at a given node should be performed in an order that is the reverse of the scrambling and encryption operations as the packet left the prior node, i.e., if the packet was scrambled and then encrypted at the prior node, it should first be decrypted and then unscrambled at the current node. Typically, the packet will then be scrambled and then encrypted as it leaves the current node.

Figure 58:
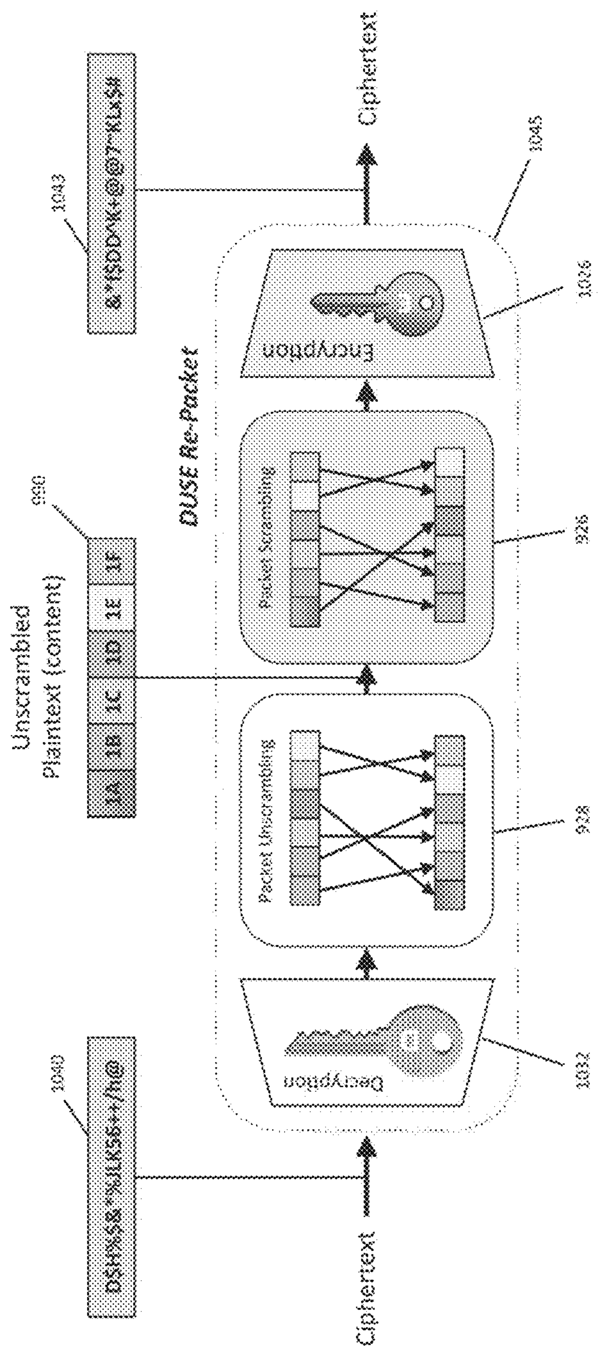
FIG. 58 is a schematic diagram showing the process of DUSE re-packeting comprising re-scrambling and re-encryption.

The "re-packet" operation at a communication node is illustrated in FIG. 58, where an incoming ciphertext data packet 1040 is first decrypted by decryption operation 1032, then unscrambled by unscrambling operation 928 to recover the unscrambled plaintext data packet 990 containing the content of the original packet. If any information within the packet must be inspected, parsed, split, or redirected, the unscrambled plaintext file is the best format in which to perform such operations. The plaintext data packet 990 is then again scrambled using scrambling operation 926 followed by a new encryption performed by encryption operation 1026 to produce a new scrambled ciphertext data packet 1043. Since the re-packet operation of incoming scrambled ciphertext data packet 1040 occurs successively by decryption, unscrambling, scrambling and encryption, the acronym DUSE re-packet operation 1045 is used herein to denote the disclosed technique in accordance with this invention. In a dynamic secure network, the state or time, the decryption key, and any seeds used for performing decryption operation 1032 and unscrambling operation 928 are preferably different than the state or time, seeds or encryption keys used for executing scrambling operation 926 and encryption operation 1026.

Figure 59:
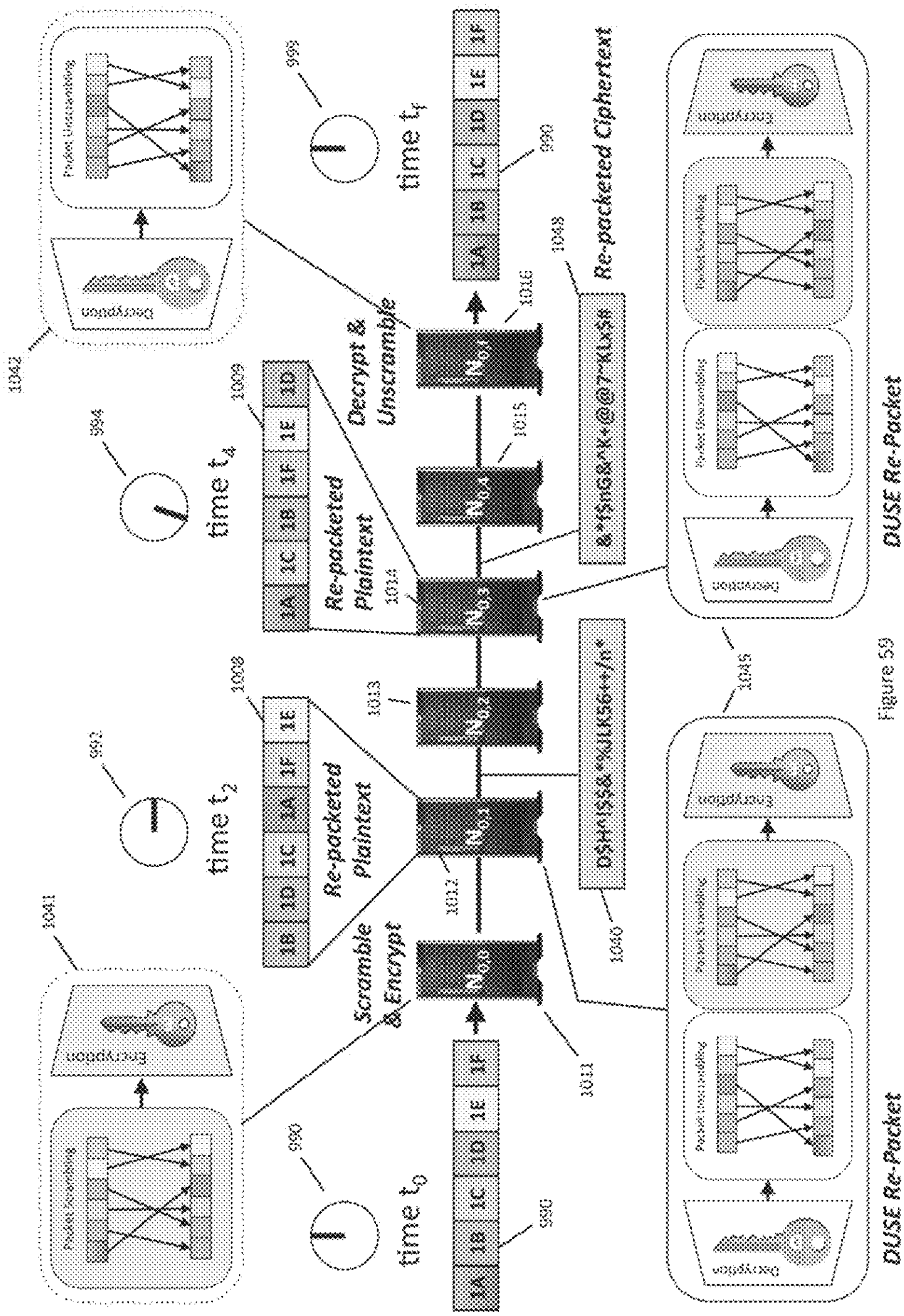
FIG. 59 is a schematic diagram showing dynamic encrypted scrambling in a linear network.

The DUSE re-packet operation 1045 as described can be implemented as software, firmware or as hardware within any communication node. In general, it is preferred to utilize software to implement such operations, since the software code can be updated or improved over time. The application of DUSE re-packet operation 1045 in a dynamic network is illustrated in FIG. 59, where communication node $N_{0,0}$, hosted on server 1011, performs encrypting scrambled packet operation 1041, communication node $N_{0,f}$, hosted on server 1016, performs decryption unscrambling operation 1042, while the intermediate communication nodes $N_{0,1}$ through $N_{0,4}$, hosted on servers 1012 through 1015, respectively, perform DUSE re-packeting operations 1045. In operation, plaintext data packet 990 is first processed by scrambling encryption operation 1041 in communication node $N_{0,0}$, then processed by DUSE re-packeting operation 1045 in communication node $N_{0,1}$ producing re-packeted scrambled plaintext 1008 representing the packet after decryption, packet unscrambling, and packet scrambling yet prior to encryption. Scrambled plaintext 1008 is then subsequently encrypted to form ciphertext 1040 at time $t_2$ and corresponding state 992. The process repeats again in communication node $N_{0,2}$ and again in communication node $N_{0,3}$, producing re-packeted scrambled plaintext 1009 subsequently encrypted to form ciphertext 1048 at time $t_4$ and corresponding state 994. Finally, communication node $N_{0,f}$ performs unscrambling decrypting operation 1042 to restore unscrambled plain text 990 at time $t_f$.

Packet Mixing and Splitting

Figure 60A:
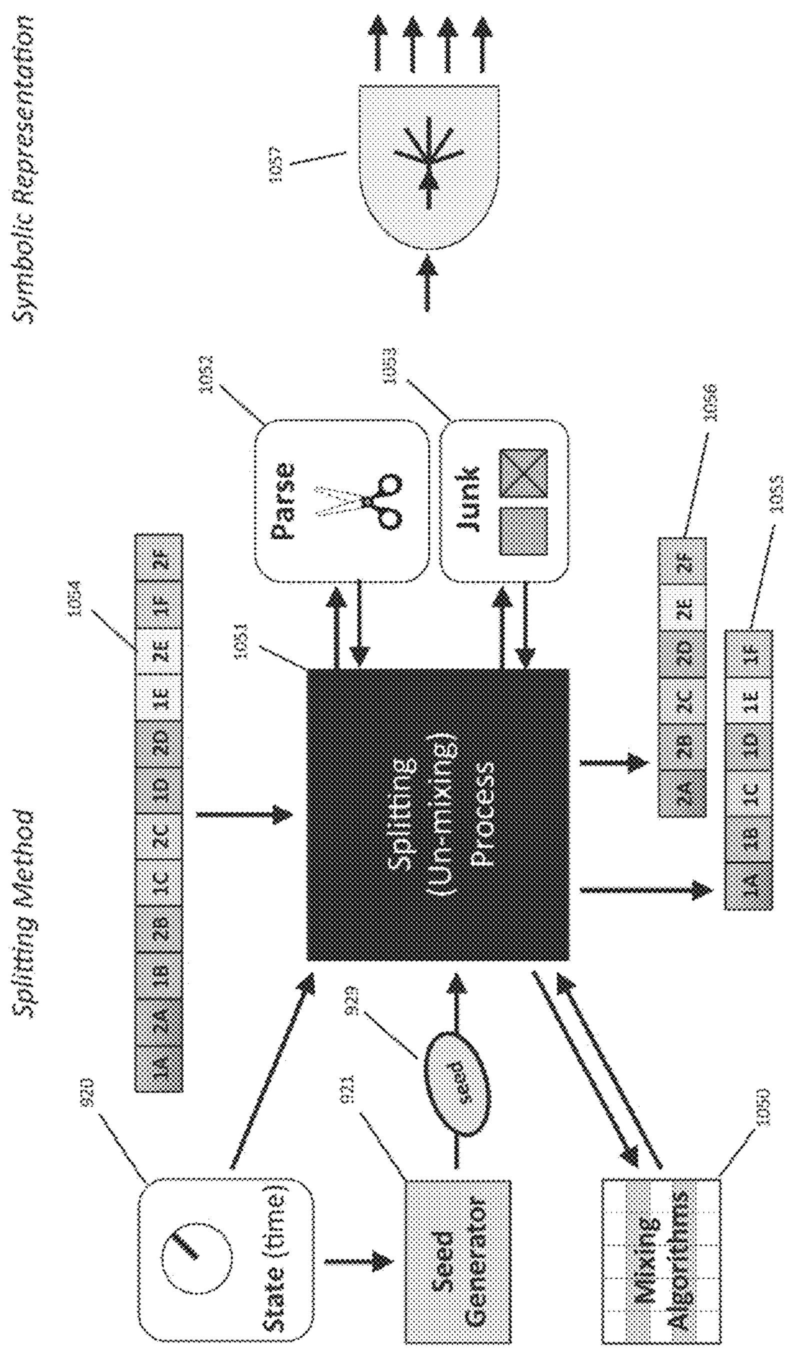
FIG. 60A is a schematic diagram showing the process of fixed-length packet splitting.

Another key element of the secure dynamic network and protocol disclosed herein is its ability to split data packets into sub-packets, to direct those sub-packets into multiple routes, and to mix and recombine the sub-packets to reconstruct a complete data packet. The process of packet splitting is illustrated in FIG. 60A, where data packet 1054 is split, using splitting operation 1051 combined with algorithmic parse operation 1052 and with junk operation 1053, which has the ability to insert or remove non-data "junk" data segments. Analogous to junk DNA present in the human genome, junk data segments are inserted by junk operation 1053, to extend or control the length of a data packet, or as needed to remove them. Junk operation 1053 is especially important when there is an inadequate amount of data to fill a packet. The presence of junk data segments inserted into a data packet also makes it difficult for cyber-pirates to distinguish real data from noise. As used herein, a "junk" packet or data segment is a packet or data segment that consists entirely of meaningless data (bits). These junk bits can be introduced into a stream of data packets obfuscating real data in a sea of meaningless bits.

The purpose of parse operation 1052 is to break data packet 1054 into smaller data packets, e.g. data sub-packets 1055 and 1056, for processing of each of the constituent components. Breaking data packet 1054 into smaller pieces offers unique advantages such as supporting multipath transport, i.e. transmitting the data packets over multiple and different paths, and facilitating unique encryption of constituent sub-packets using different encryption methods.

The splitting operation can use any algorithm, numerical method, or parsing method. The algorithm may represent a static equation or include dynamic variables or numerical seeds or "states" such as time 920 when the incoming data packet 1054 was first formed by a number of sub-packets, and a numerical seed 929 generated by seed generator 921, which also may be dependent on a state such as time 920 at the time of the data packet's creation. For example, if each date is converted into a unique number ascending monotonically, then every seed 929 is unique. Time 920 and seed 929 may be used to identify a specific algorithm chosen from a list of available methods, i.e. from algorithm 1050. Packet splitting, or un-mixing, comprises the inverse procedure of mixing, using the same algorithm executed in the precise reverse sequence used previously to create the specific packet. Ultimately everything that is done is undone but not necessarily all in one step. For example, a scrambled encrypted data packet might be decrypted but remain scrambled. Processed by splitting operation 1051, un-split incoming data packet 1054 is converted into multiple data packets, e.g. split fixed-length packets 1055 and 1056 using parse operation 1052 to algorithmically perform the operation. In data flow diagrams, it is convenient to illustrate this packet splitting operation 1051 including parsing 1052 and junk operation 1053 using a schematic or symbolic representation, as depicted herein by the symbol shown for splitting operation 1057.

Thus, as used herein, the term "splitting" may include parsing, which refers to the separation of a packet into two or more packets or sub-packets, and it may also include the insertion of junk packets or sub-packets into the resulting "parsed" packets or sub-packets or the deletion of junk packets or sub-packets from the resulting "parsed" packets or sub-packets.

Figure 60B:
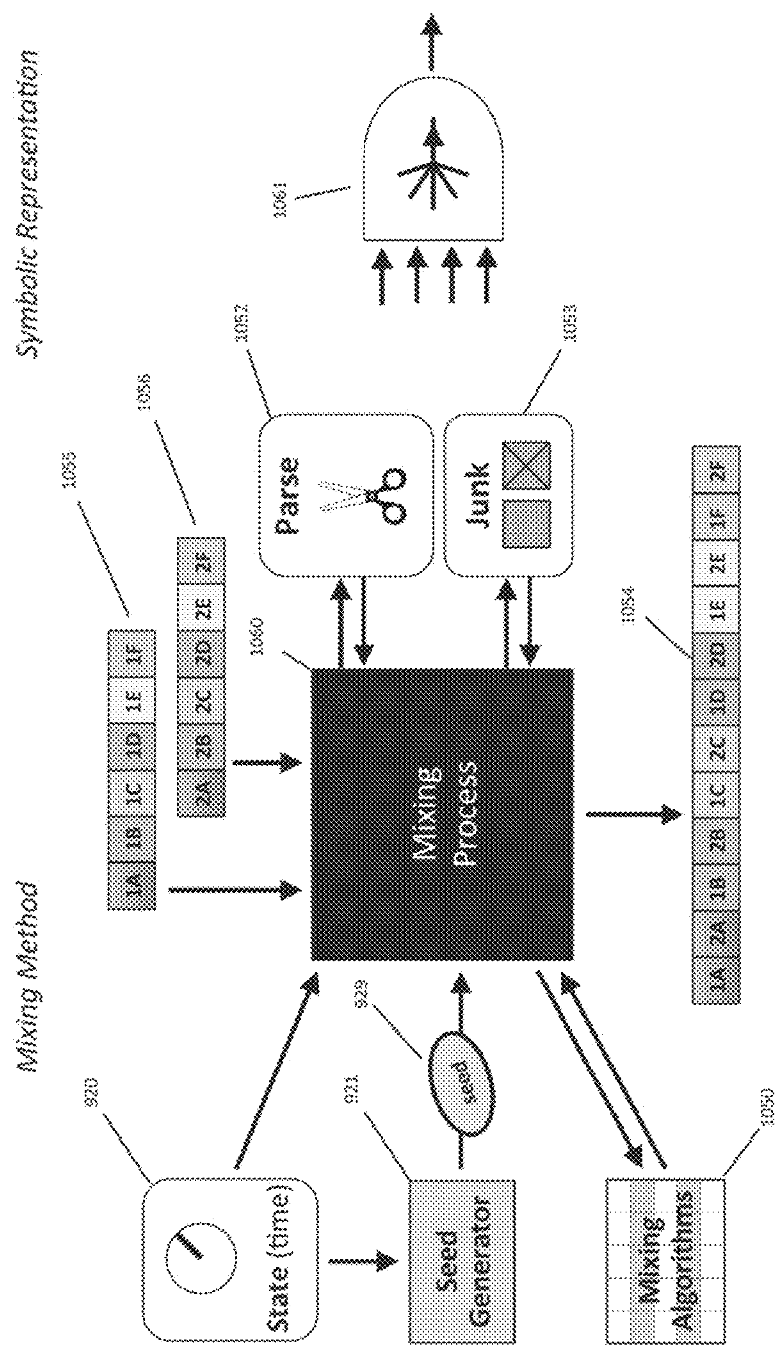
FIG. 60B is a schematic diagram showing the process of fixed-length packet mixing

The inverse function, packet-mixing operation 1060 shown in FIG. 60B, combines multiple packets 1055 and 1056 together to form mixed packet 1054. Like packet splitting, the packet mixing operation can use any algorithm, numerical method, or mixing method. The algorithm may represent a static equation or include dynamic variables or numerical seeds or "states" such as time 920 used to specify the conditions when incoming data packets 1055 and 1056 are mixed. The mixing operation used to create the data packet may utilize numerical seed 929 generated by seed generator 921, which also may be dependent on a state such as time 920. Time 920 and seed 929 may be used to identify a specific mixing algorithm chosen from a list of available mixing methods, i.e. from mixing algorithms 1050. In data flow diagrams, it is convenient to illustrate this packet mixing operation using a schematic or symbolic representation, as depicted herein by the symbol shown for mixing operation 1061.

Figure 61A:
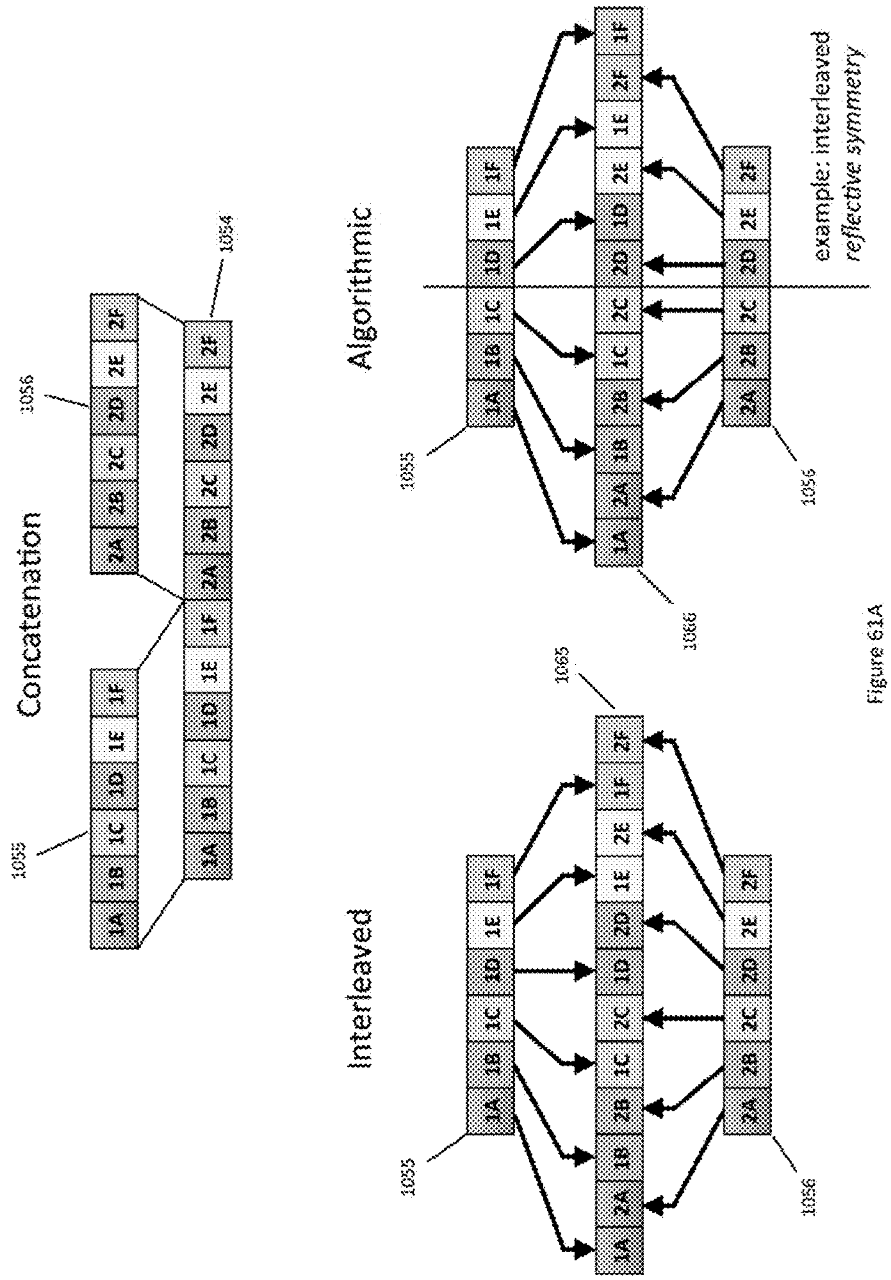
FIG. 61A is a schematic diagram showing various packet-mixing methods.

In accordance with this invention, packet mixing and splitting may utilize any of a large number of possible algorithms. FIG. 61A illustrates three of many possible mixing techniques comprising concatenation, interleaving, or algorithmic methods. In concatenation, the data segment sequence of data packet 1056 is appended onto the end of data packet 1055 to create mixed packet 1054. In interleaving, the data segments of data packets 1055 and 1056 are intermixed in alternating fashion, i.e. as 1A, 2A, 1B, 2B, etc. to form mixed data packet 1065. Other methods used for packet mixing involve an algorithm. In the example shown, an algorithm comprising interleaved reflective symmetry alternates the data segments in the order of 1A, 2A, 1B, 2B, 1C, 2C in the first half of the mixed packet 1066, and in the opposite order for the second half, i.e. 2D, 1D, 2E, 1E, 2F, 1F.

Figure 61B:
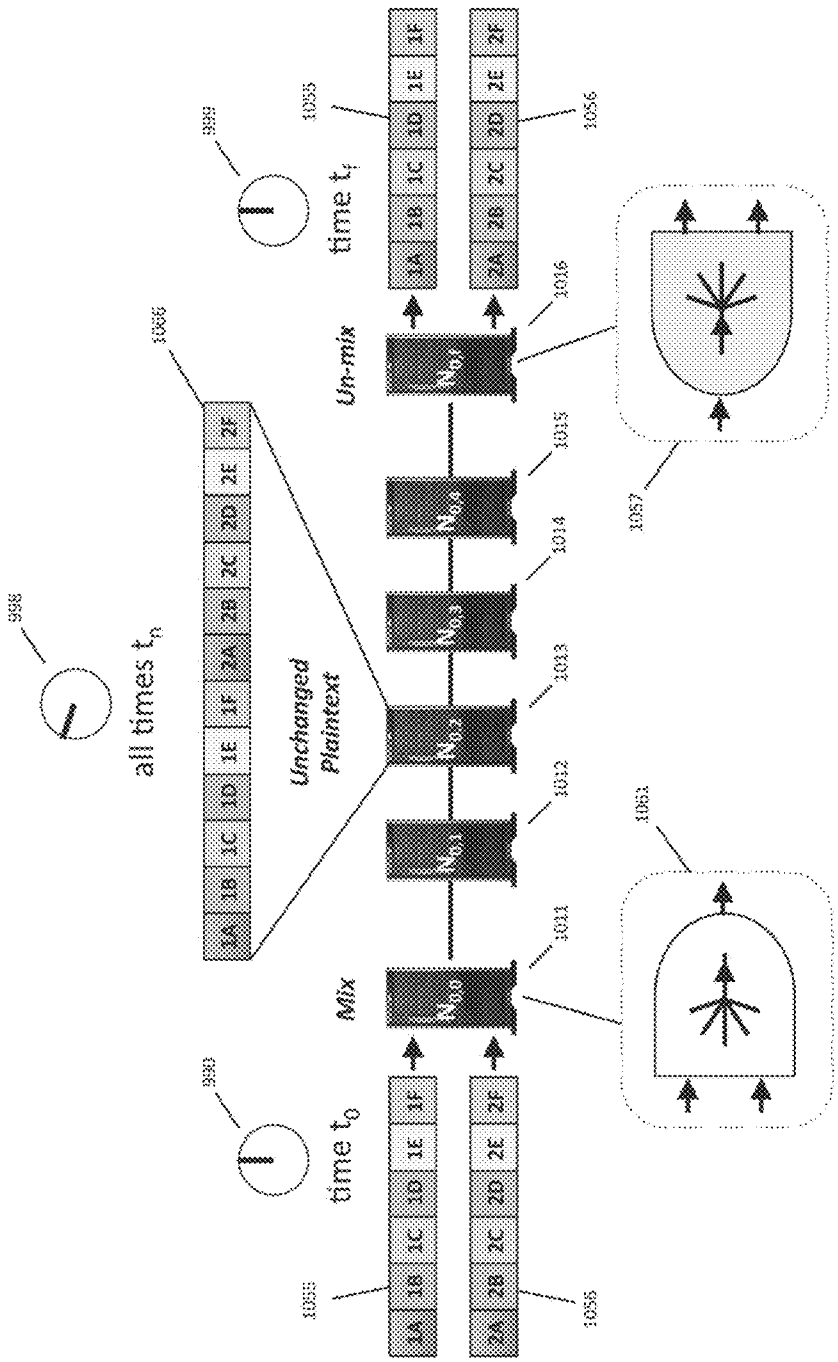
FIG. 61B is a schematic diagram showing concatenated packet mixing.

An example of the application of packet mixing using concatenation in accordance with this invention is illustrated in FIG. 61B. As shown, at time to unmixed data packets 1055 and 1056 are mixed in communication node $N_{0,0}$, hosted on server 1011, using mixing operation 1061. The resulting merged data packet 1066 comprising the sequence 1A through 1F followed by 2A through 2F is then transported through a network of servers 1011 to 1016 comprising unchanged plaintext, static in its composition over all times 998, until in communication node $N_{0,f}$, hosted on server 1016, the packet splitting operation 1057 separates the components of mixed data packet 1066 into the original data packets 1055 and 1056

Figure 61C:
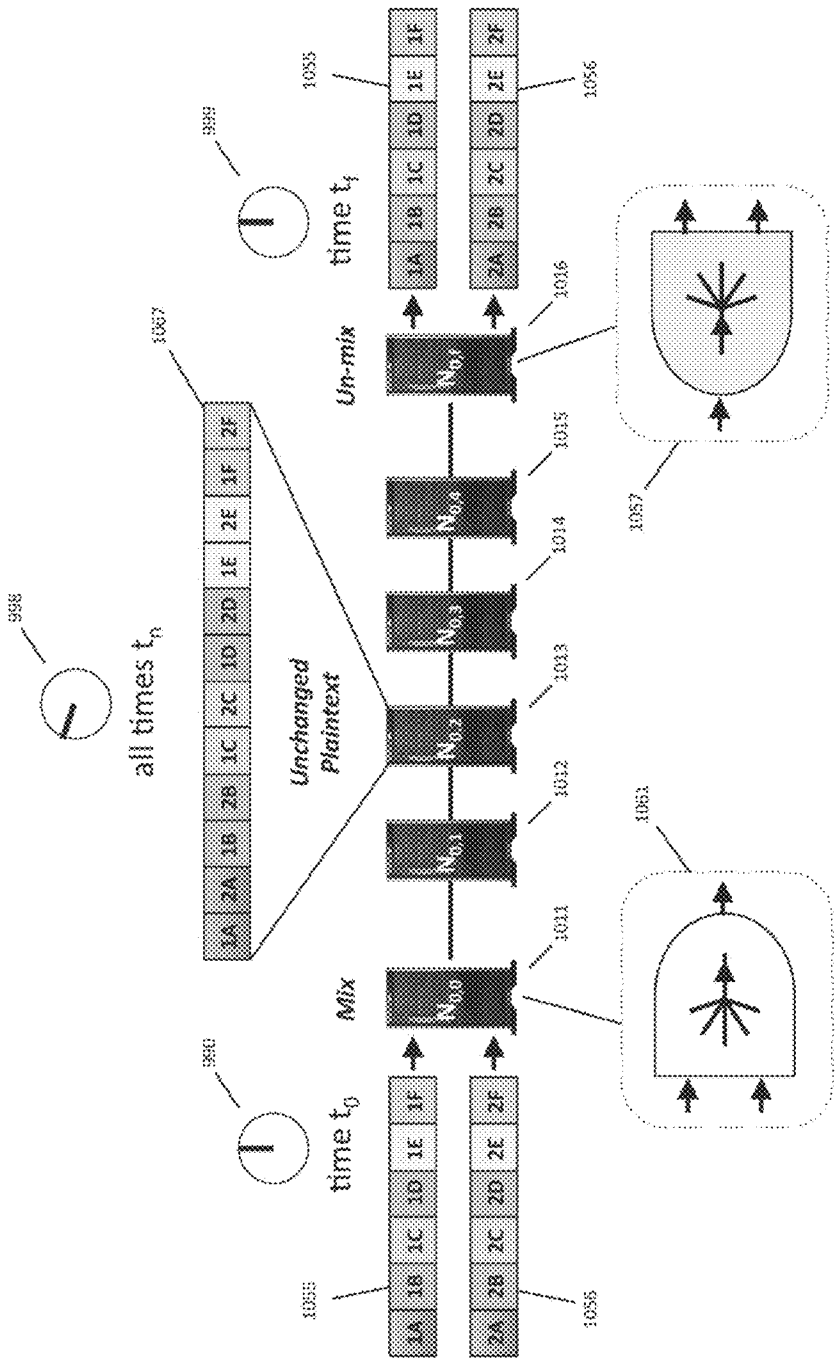
FIG. 61C is a schematic diagram showing interleaved packet mixing.

Similarly, an example of the application of interleaved mixing in accordance with this invention is illustrated in FIG. 61C. Identical in sequence to the previous example, the resulting mixed packet 1066 has a sequence 1A, 1B, 2A, 2B, 3A, 3B . . . . Although the mixed packet is different that the concatenated example, packet data splitting operation 1057 is able to restore the original unmixed data packets 1055 and 1056 because the knowledge of the mixing algorithm and the time, state, or seeds used in the mixing operation is passed to communication node $N_{0,f}$, hosted on server 1016, either as part of data packet 1066 or prior to packet communication at time $t_0$.

Scrambled Mixing

Figure 62A:
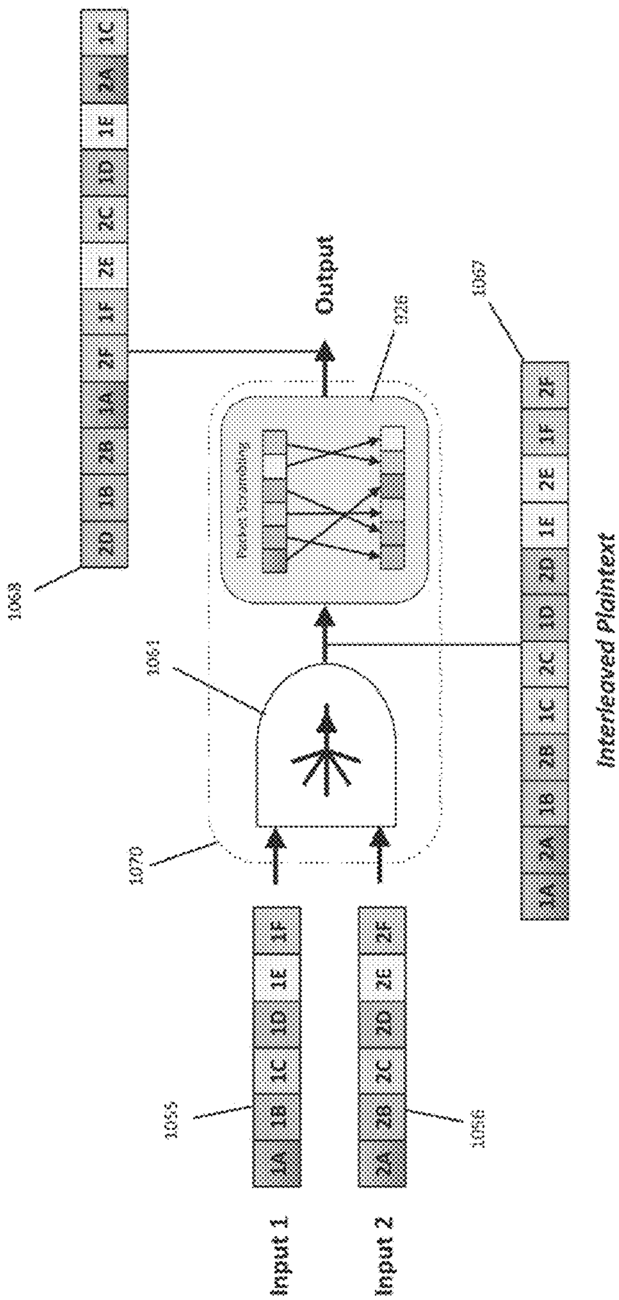
FIG. 62A is a schematic diagram showing a mix then scramble method.

The disclosed methods of packet communication using the splitting and mixing of data packets into various combinations of data segments can in accordance with the disclosed invention be combined with packet scrambling in numerous ways. In FIG. 62A unscrambled plaintext datapackets 1055 and 1056 are mixed using mixing operation 1061 resulting in mixed data packet 1067, in the example shown formed using interleaved plaintext. After mixing, data packet 1067 is scrambled by scrambling operation 926 to produce scrambled plaintext data packet 1068. The combined sequence of packet mixing operation 1061 and packet scrambling 926 together comprises mixing and scrambling operation 1070, comprising mixing followed by scrambling.

Figure 62B:
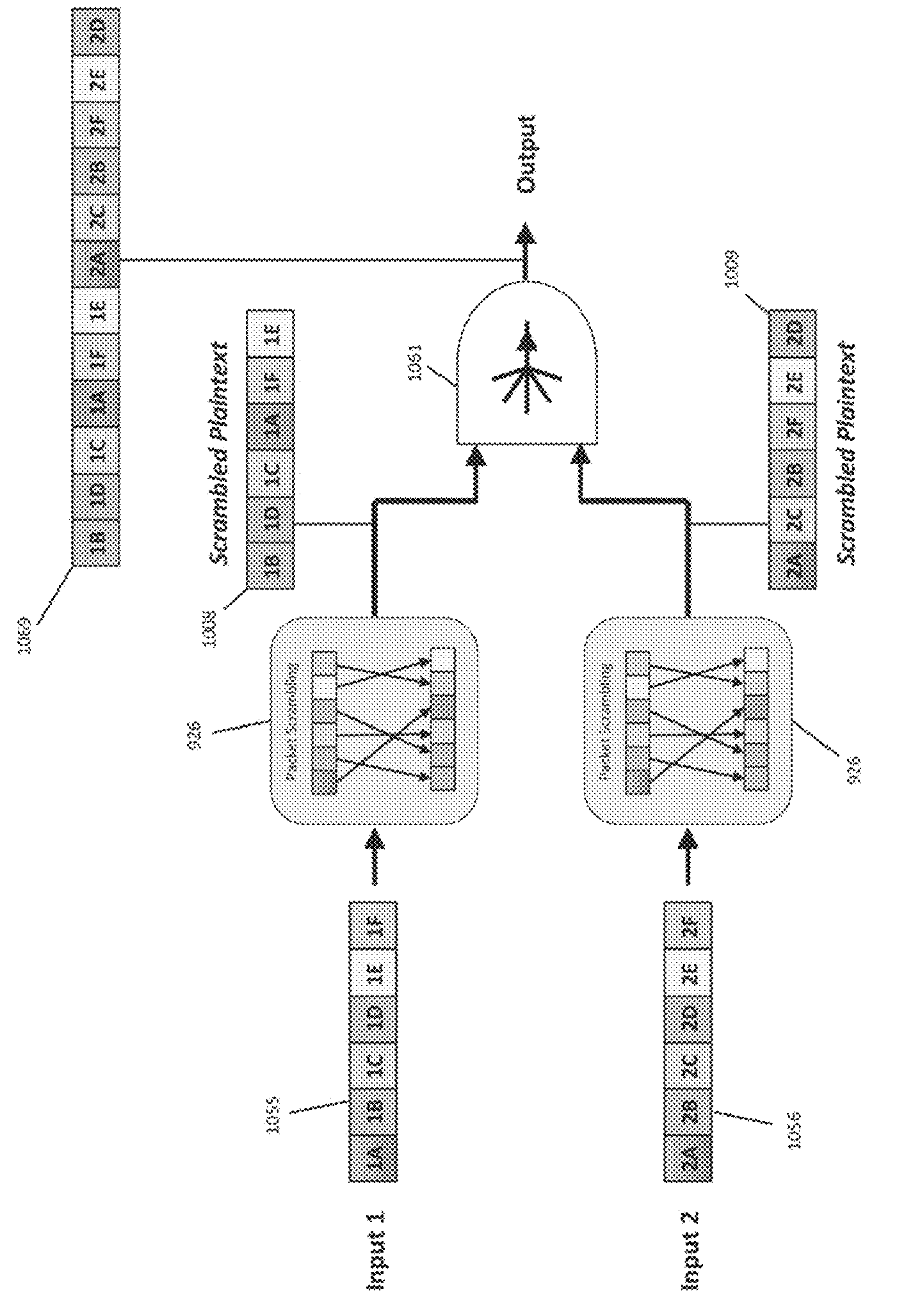
FIG. 62B is a schematic diagram showing a scramble then mix method.

In an alternative implementation in accordance with this invention, individual data packets are first scrambled then mixed as shown in FIG. 62B. In this implementation, unscrambled plaintext data packets 1055 and 1056 are first scrambled by separate and independent scrambling operations 926, thereby resulting in corresponding scrambled plaintext data packets 1008 and 1009. These scrambled packets are then mixed together by mixing operation 1061 resulting in mixed scrambled data packet 1069.

Figure 63:
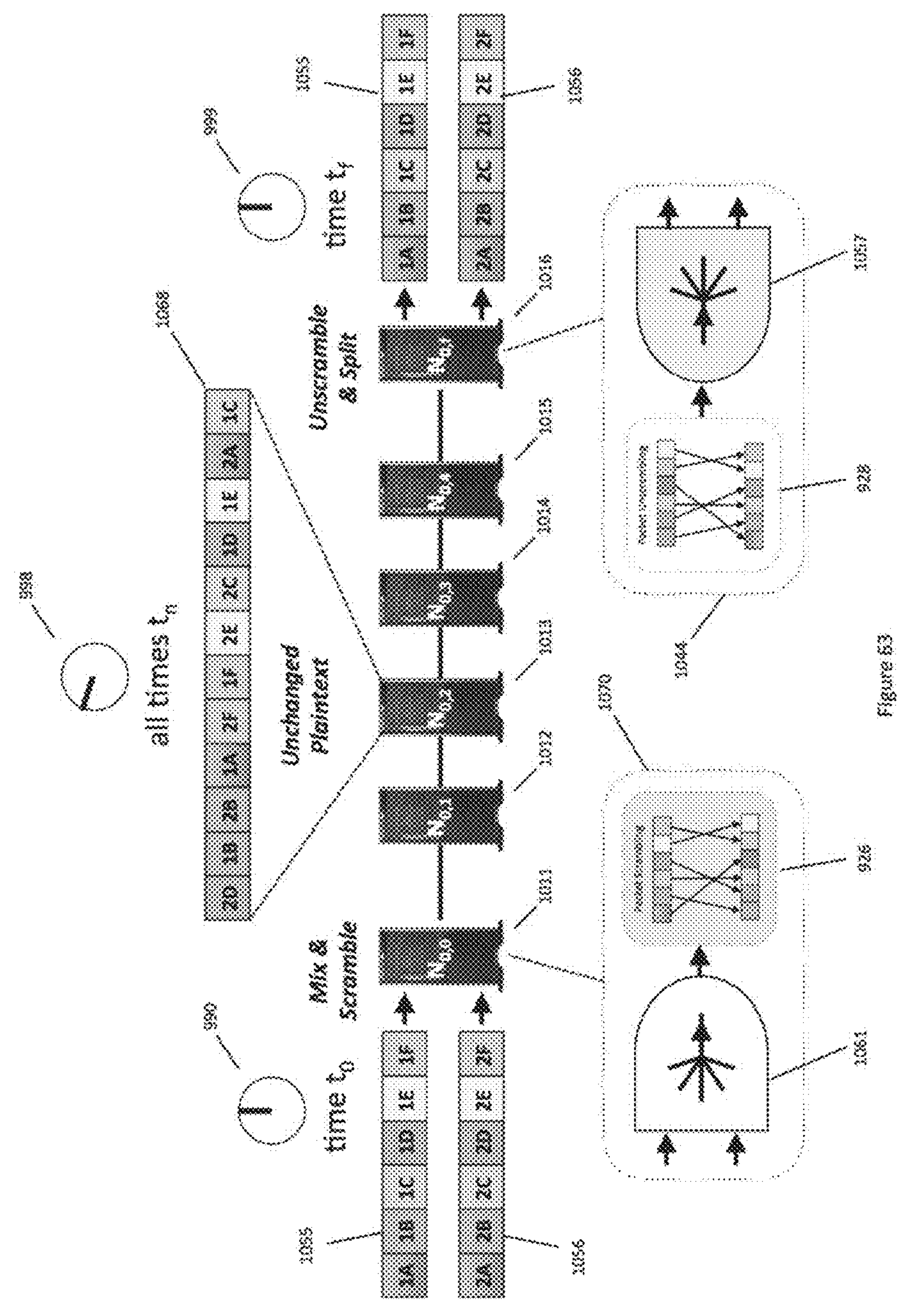
FIG. 63 is a schematic diagram showing static scrambled mixing in a linear network.

The combined use of mixing and scrambling as disclosed may be integrated into either static or dynamic SDNP communication networks. In FIG. 63, plaintext data packets 1055 and 1056 are input into communication node $N_{0,0}$, hosted on server 1011, which performs mixing and scrambling operation 1070, comprising mixing operation 1061 followed by scrambling operation 926, to form mixed scrambled packet 1068. The packet content remains constant at all times to as the mixed scrambled packet 1068 traverses servers 1011 to 1016. Final communication node $N_{0,f}$, hosted on server 1016, then performs unscrambling operation 928 followed by splitting operation 1057, represented as unscrambling and splitting operation 1044.

Figure 64:
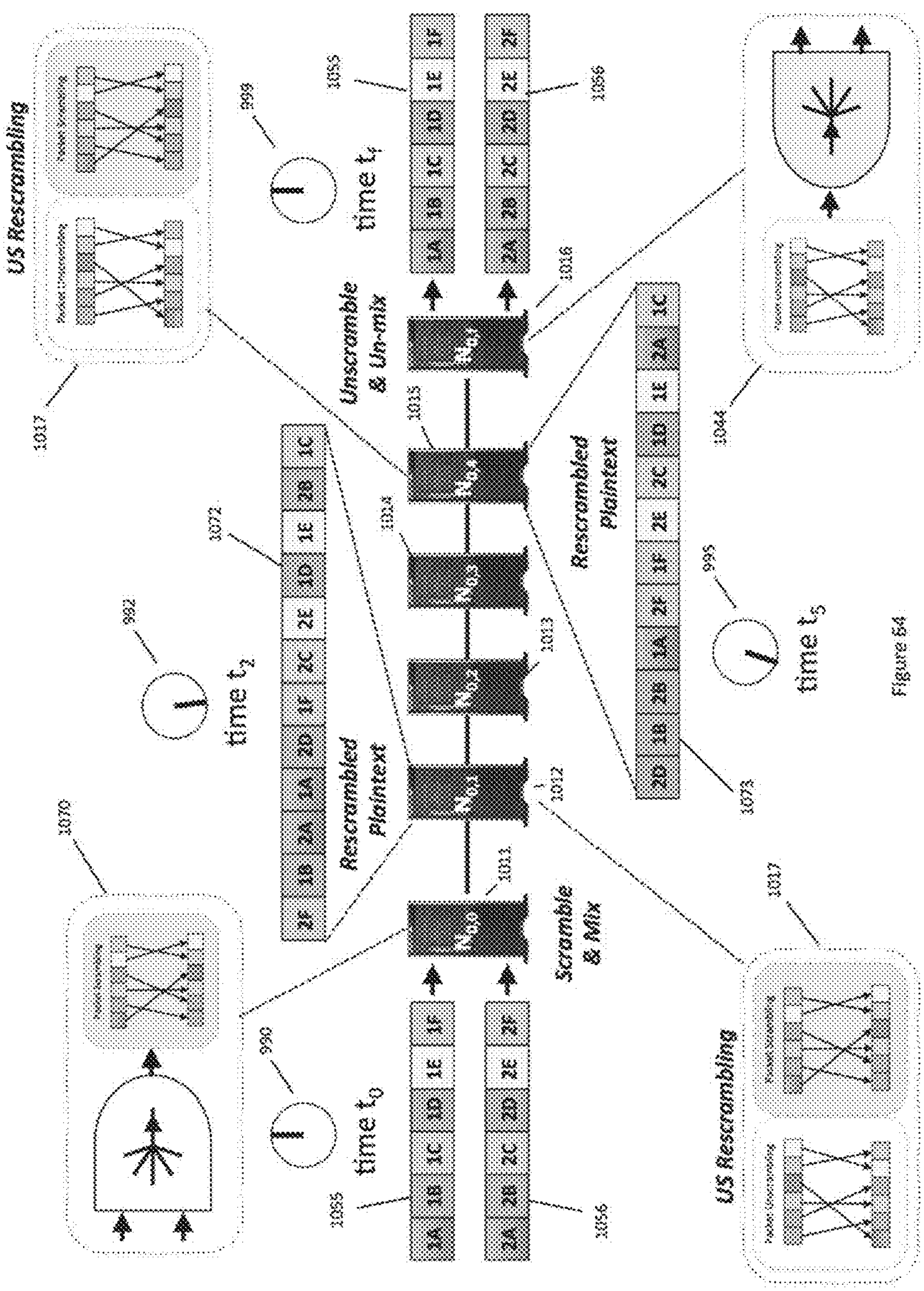
FIG. 64 is a schematic diagram showing dynamic scrambled mixing in a linear network.

FIG. 64 illustrates an example of dynamic scrambled mixing in a SDNP communication network. As in the prior static SDNP example, plaintext data packets 1055 and 1056 are input into communication node $N_{0,0}$, hosted on server 1011, which performs mixing and scrambling operation 1070, comprising mixing followed by scrambling. The mixed scrambled packet is the subjected to a US re-scrambling operation 1010 in server 1012 to form a mixed scrambled packet 1072 at time $t_2$ corresponding to state 992. Servers 1013 and 1014 then perform US re-scrambling operation 1017 to repeatedly unscramble and then re-scramble the data packet. The US re-scrambling operation is repeated in communication node $N_{0,4}$, hosted on server 1015, resulting in newly re-scrambled data packet 1073 at time is corresponding to state 995. Final communication node $N_{0,f}$, hosted on server 1016, then performs unscrambling splitting operation 1044 to recover packets 1055 and 1056. In the dynamic network implementation shown, the unscrambling operation used in each US re-scrambling operation 1017 utilizes the time or state of the data packet created in the prior server then re-scrambles the data packet at the current time. For example, data packet 1072, created at time $t_2$ in server 1012 is re-scrambled in server 1013, i.e., unscrambled, using the state associated with time $t_2$, and then scrambled again using the state associated with the current time (not shown). As such, FIG. 64 illustrates by example that mixing and splitting operations can nest repeated and successive operations of scrambling and unscrambling.

Encrypted Scrambled Mixing

Figure 65:
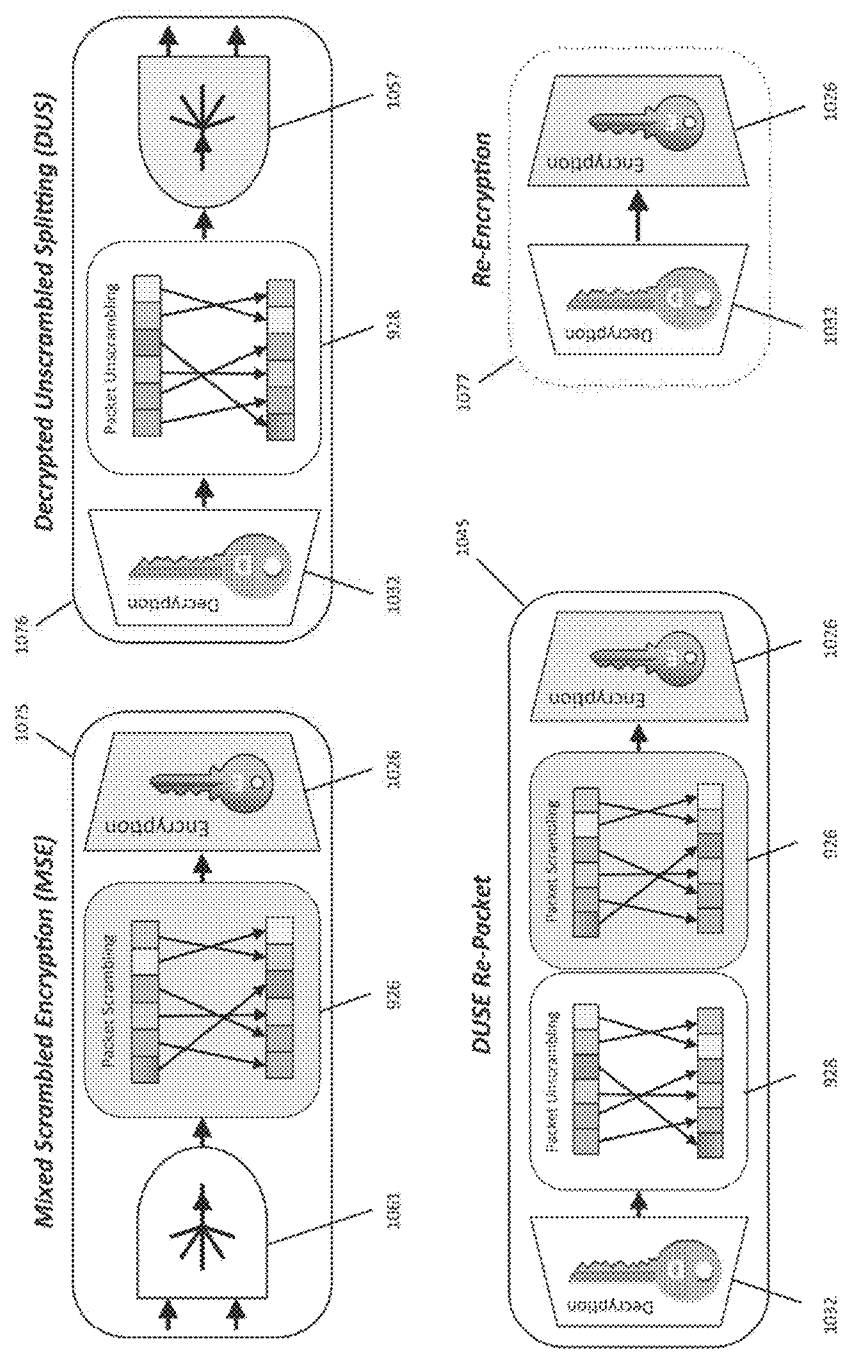
FIG. 65 is a schematic diagram depicting various encrypted packet processes.
Figure 65A:
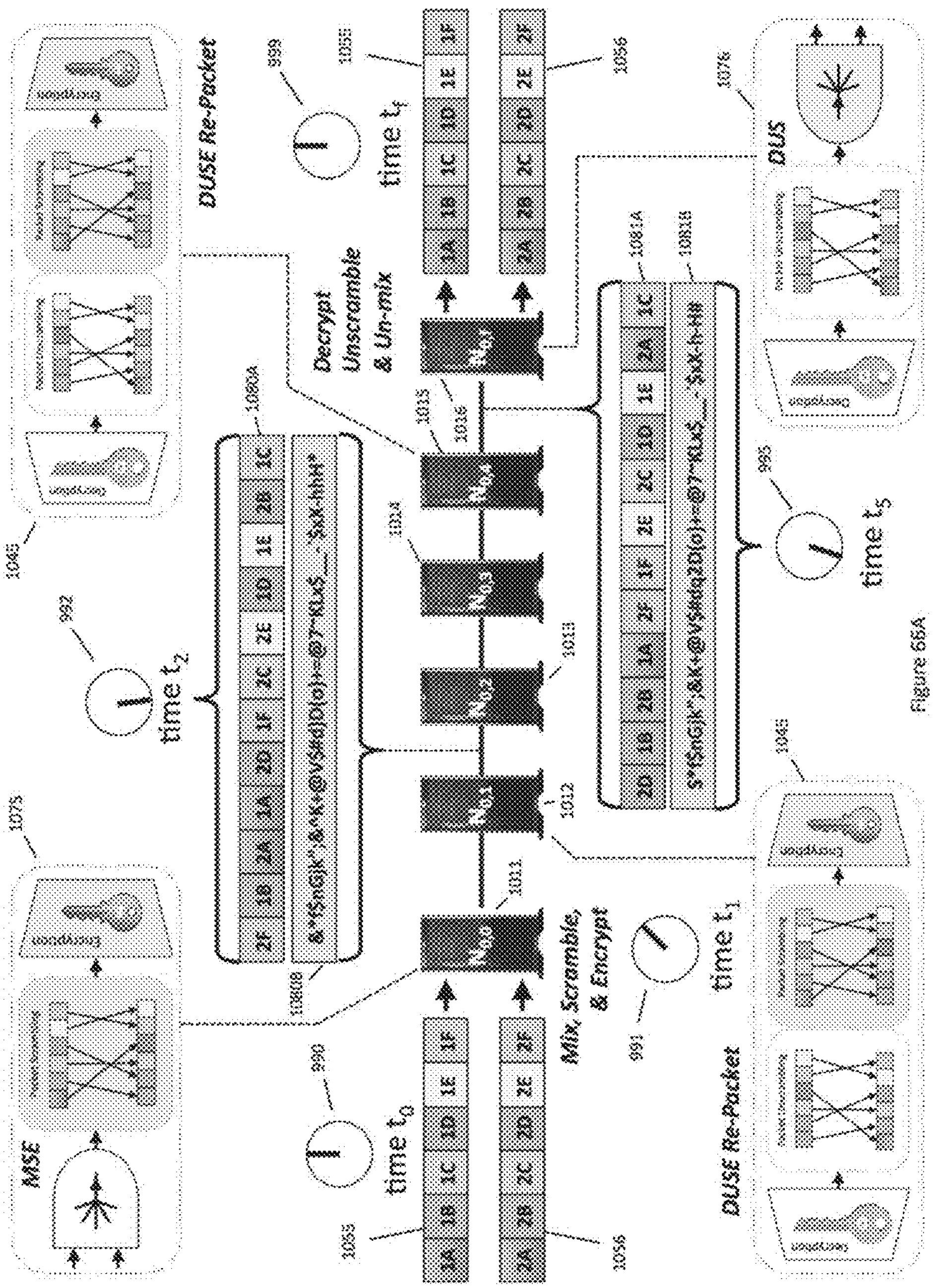
Figure 65B:
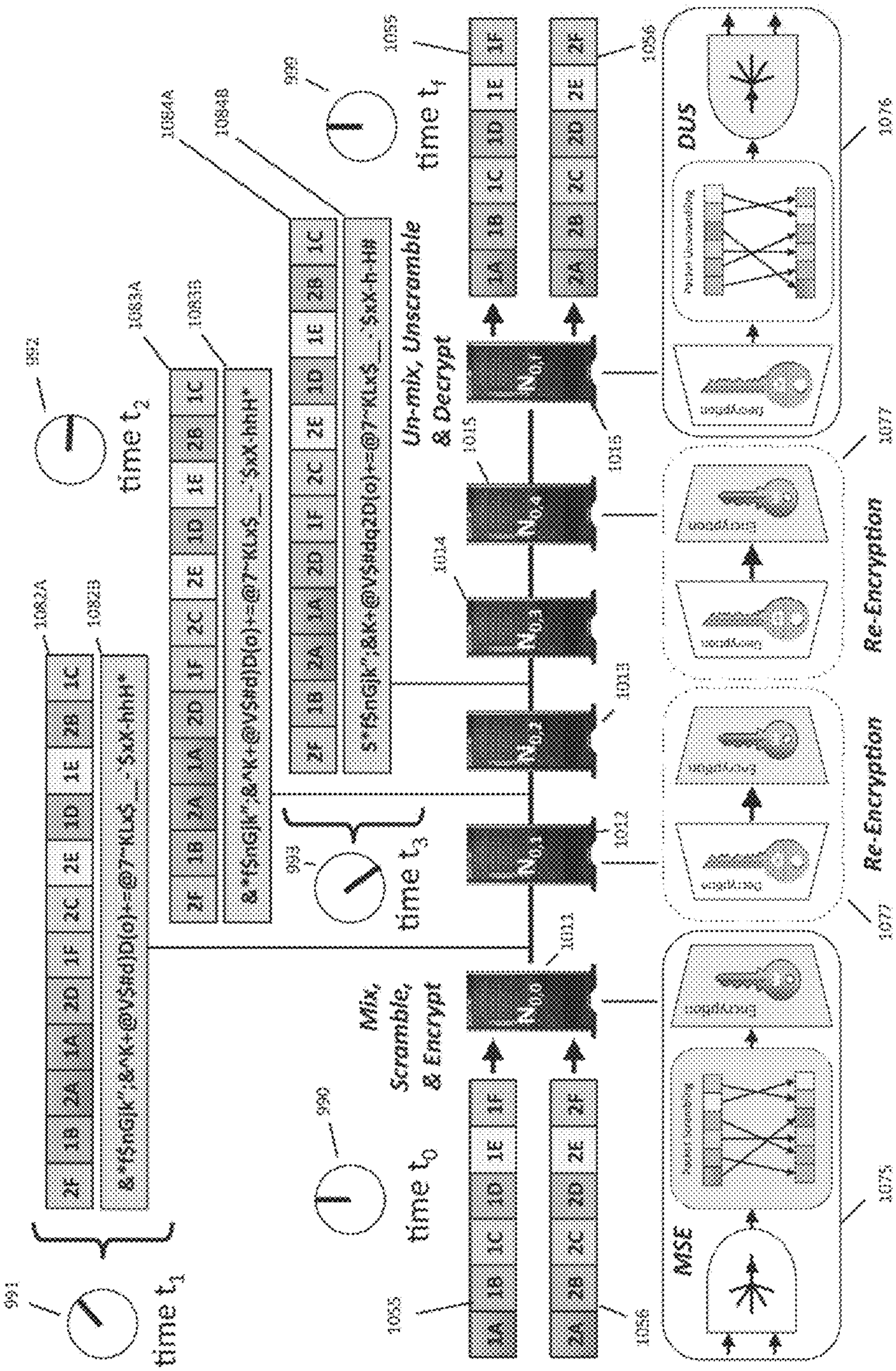
Figure 56C:
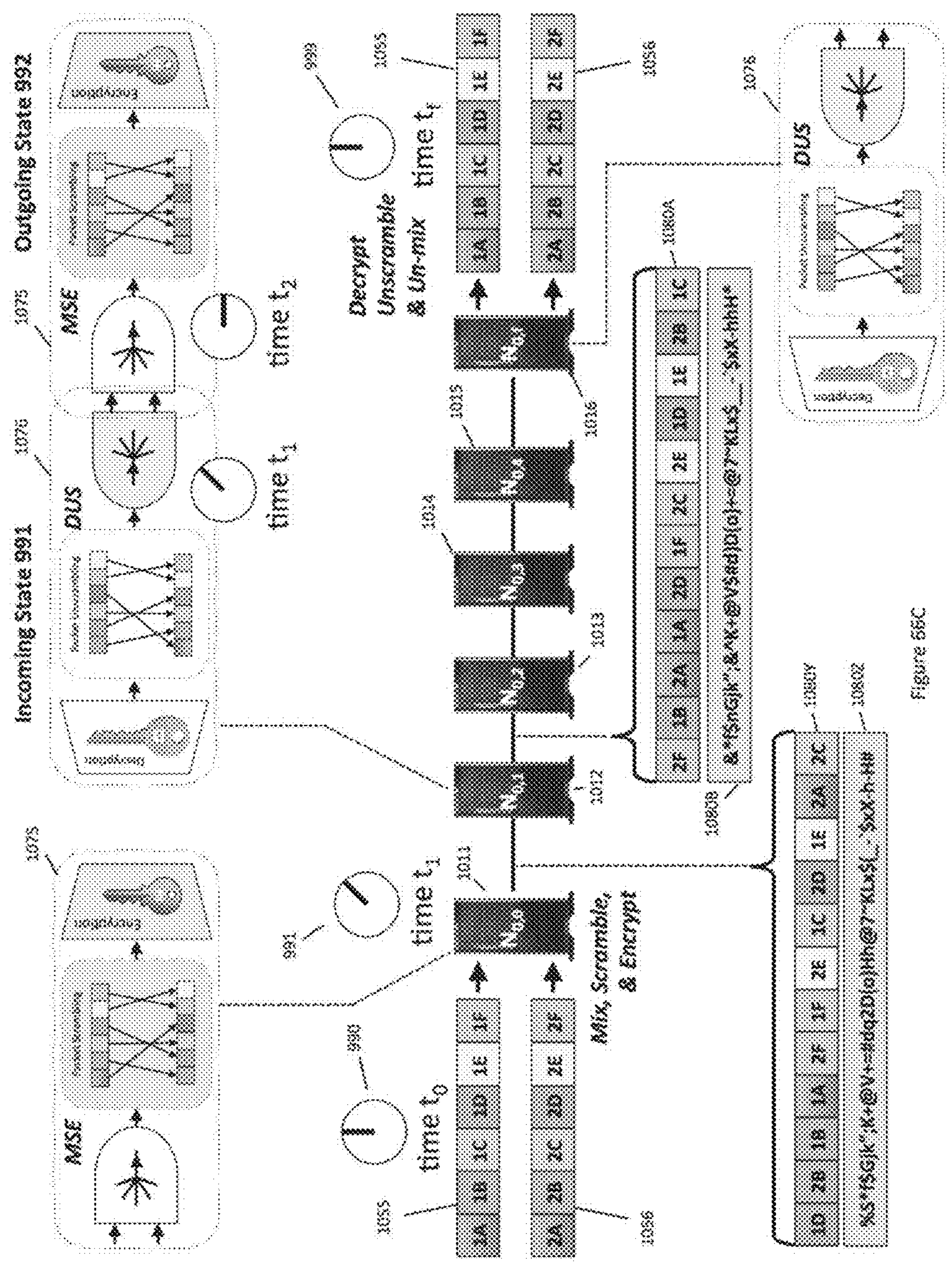
Figure 65D:
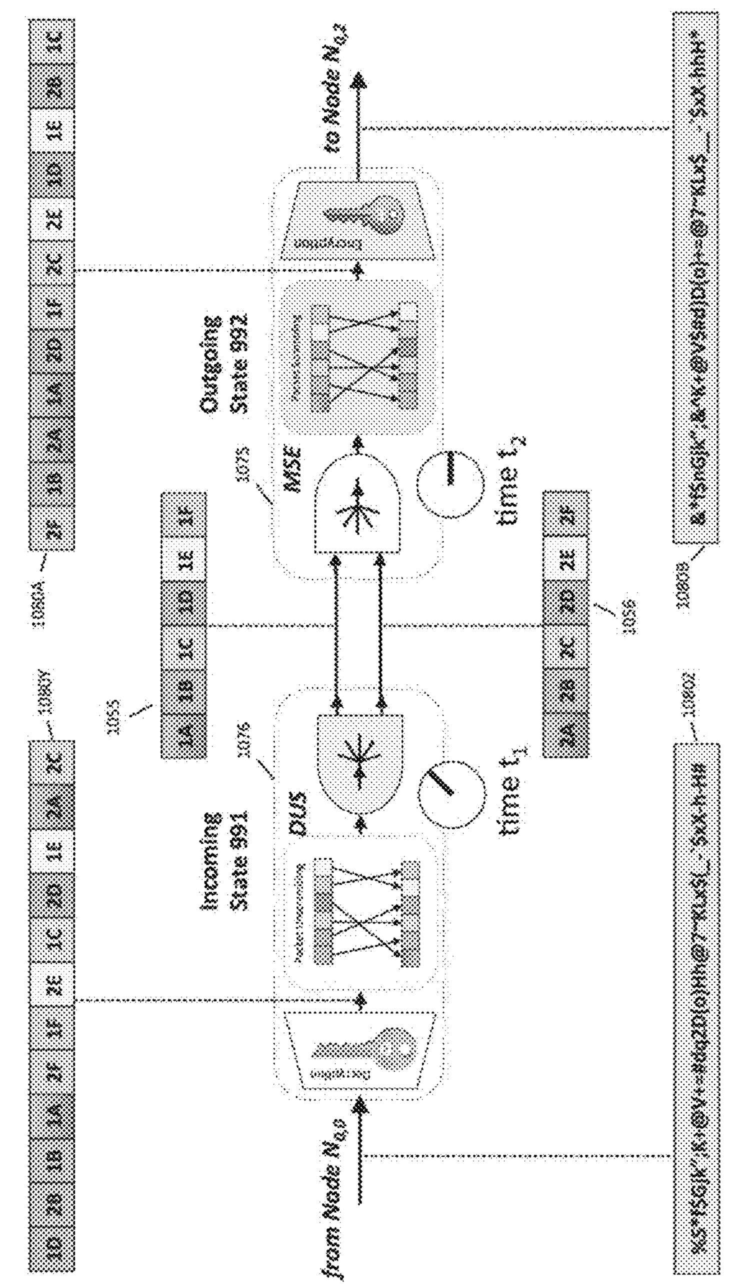

The disclosed methods of packet communication using the splitting and mixing of data packets into various combinations of sub-packets combined with packet scrambling can, in accordance with the disclosed invention be combined with encryption. FIG. 65 illustrates several examples of functions combining mixing, scrambling and encryption and their corresponding inverse functions. One example is mixing scrambling encryption or MSE operation 1075, comprising a sequence of mixing operation 1061, followed by scrambling operation 926, and lastly encryption operation 1026. The inverse function, decryption unscrambling splitting, or DUS operation 1076, comprises the inverse sequence of operations, namely decryption operation 1032, unscrambling operation 928, and splitting operation 1057. The output of MSE operation 1075 and the input of operation DUS 1076 involve ciphertext. To communicate and recover the original content, albeit in pieces, the same shared secrets, numeric seeds, and encryption/decryption keys used to create a ciphertext packet must be used to undo it.

Intermediate nodes may involve only re-encryption operation 1077, comprising the combination of decryption operation 1032 and encryption operation 1026, or may involve DUSE operation 1045 sequentially comprising the functions of decryption operation 1032, unscrambling operation 928, scrambling operation 926, and encryption operation 1026. In re-encryption operation 1077 and DUSE operation 1045 the functions of decryption operation 1032 and unscrambling operation 928 may require the seeds or key of the communication node sending the packet to them at a prior time or state. The functions of encryption operation 1026 and re-scrambling operation 926 may both employ information, seeds, and keys generated at the present time or state, i.e. at the time a communication node "refreshes" a data packet. Data packet refreshing makes it more difficult for cyber-assaults to access information in a data packet because the packet data in newly obfuscated and the time available to break the code is shortened.

One example of the use of dynamic combinational mixing, scrambling, and encryption and their inverse functions is illustrated in FIG. 66A where two data packets 1055 and 1056 enter communication node $N_{0,0}$, hosted on server 1011, at time $t_0$. The two packets may represent the same kind of data types, e.g. two voice packets, two text message files, two documents, two pieces of software, etc. or may represent two dissimilar types of information, e.g. one voice packet and one text file, one text packet, and one video or photo image, etc. Then, at time $t_1$ using state 991 information for generating keys, numeric seeds, or other secrets, communication node $N_{0,0}$, hosted on server 1011, performs mixing scrambling encryption (MSE) operation 1075. The result is a scrambled data packet in ciphertext format, illegible and interpretable to any observer not in possession of the state information used to create it. Also at time $t_1$, a numerical seed representing the time or state when packet mixing occurred is generated and passed to final node $N_{0,f}$, either by sending this information ahead of the mixed data packet, or alternatively embedding this seed into the data packet itself in a packet header (described later in this disclosure).

The data is next passed to communication node $N_{0,1}$, hosted on server 1012, which performs DUSE operation 1045, decrypting and unscrambling the incoming data based on state 991 information corresponding to time $t_1$ then refreshing the security by scrambling and encrypting the data again based on state 992 information, corresponding to time $t_2$. If state information 991 is being passed to final node $N_{0,f}$, by embedding it in the data packet or its header, then two copies of the state information are required—one to be used by final node $N_{0,f}$, comprising state 991 when mixing occurred, and a second state used by the DUSE operation changing each time the data packet hops from one node to the next, i.e. from state 991 to 992, 993, etc. Using the state of the last operation performed on an incoming data packet, DUSE operation 1045 performs re-scrambling on unencrypted data by decrypting it first, performing the re-scrambling, then encrypting the data again, i.e. the re-scrambling operation is nested within a re-encryption operation. The resulting outgoing data packet comprises ciphertext 1080B with underlying unencrypted content represented by plaintext 1080A. DUSE operation 1045 is repeated successively in servers 1013, 1014, and 1015, resulting in ciphertext 1081B with underlying unencrypted content represented by plaintext 1081A at time $t_5$. Communication is completed by communication node $N_{0,f}$, hosted on server 1016, which performs decryption unscrambling splitting (DUS) operation 1076, decrypting, unscrambling the incoming data packet based on state 995 information corresponding to time $t_5$ used to last refresh it, then splitting the packet in accordance with state 991 when mixing first occurred. Since the intermediate nodes are unaware of the mixing condition, even a network operator with access to the intermediate nodes is unaware of the conditions used at mixing. The resulting plaintext outputs 1055 and 1056 at time $t_f$ recover the data sent across the network starting at time $t_0$. Since the packet's content was re-scrambled and re-encrypted as the packet passes through each node $N_{0,x}$ where x=0, 1, 2, . . . f, the opportunity for intercepting and interpreting the data packets being communicated is extremely complex and provides little time for hacking.

A simpler method for establishing secure communication involves mixing and scrambling of the packet at the beginning of the communication but utilizes repeated steps of re-encryption. Unlike the fully dynamic encrypted scrambling and mixing example of the prior illustration, FIG. 66B combines static mixing and scrambling in server 1011 with dynamic encryption in servers 1011-1015, meaning only the encryption changes with time. The communication commences at time $t_0$, starting with data packets 1055 and 1056 delivered to communication node $N_{0,0}$, hosted on server 1011. As in the prior example the two packets may represent any mix of data types including voice packets, text messages, documents, software, video or photo images, etc.

Then at time $t_1$, using state 991 information for generating keys, numeric seeds, or other secrets, communication node $N_{0,0}$ performs mixing scrambling encryption (MSE) operation 1075. The resulting ciphertext 1082B is a scrambled data packet in ciphertext format, illegible and interpretable to any observer not in possession of the state information used to create it. The underlying data packet comprising plaintext 1082A is scrambled and even without encryption is also incomprehensible to cyber-pirates attempting to recover the source data, text, picture, or sound without the state information, keys, seeds, and secrets.

The data is next passed to communication node $N_{0,1}$, hosted on server 1012, which, rather than performing the DUSE operation as in the previous example, only re-encrypts the incoming data, i.e. decrypts the data based on state 991 information corresponding to time $t_1$ then encrypts it again based on state 992 information corresponding to the current time $t_2$. The process, shown as re-encryption operation 1077, results in outgoing data packet comprising ciphertext 1083B with underlying scrambled plaintext 1083A identical to previous plaintext 1082A. A re-encryption operation 1077 is repeated successively in servers 1013, 1014, and 1015 resulting in new ciphertext. For example ciphertext 1084B and underlying unchanged plaintext 1084A represent the data traveling between servers 1013 and 1014. The underlying plaintext 1084A is unchanged from before it was originally scrambled by MSE operation 1075 in communication node $N_{0,0}$ at time $t_1$. The re-encryptions in communication nodes $N_{0,1}$ and $N_0$, however, have changed the ciphertext two times since it left communication node $N_{0,0}$.

The shared secrets used to perform static mixing and scrambling and dynamic encryption and to reverse the process require two times or states—time $t_1$ and corresponding state 991 used for the static mixing and scrambling in server 1011 and needed for unscrambling and splitting in the final DUS operation 1076 in server 1016, and the dynamic time and the corresponding state used by the last communication node to execute each of the re-encryption operations 1077 in servers 1012-1015, a state that varies dynamically and constantly as the data packet traverses the packet-switched communication network. In the final step, communication is completed by communication node $N_{0,f}$, hosted on server 1016, which performs a DUS operation 1045, decrypting, unscrambling and splitting (un-mixing) the incoming data packet to reproduce plaintext outputs 1055 and 1056, the same data sent across the network starting at time $t_0$.

Since the packet is encrypted in node $N_{0,0}$, re-encrypted as it passes through each of nodes $N_{0,1} \ldots N_{0,f-1}$, and decrypted in node $N_{0,f}$, even though the data was mixed and scrambled only once, the opportunity for intercepting and interpreting the data packets being communicated is extremely complex and provides little time for hacking. Moreover, the mixing of multiple sources of data as described previously in this application, further confounds outsider attempts at hacking and cyber-piracy because the interloper has no idea what the various pieces of data are, where they came from, or where they are headed—in essence lacking both detail and context in the nature of the data packet.

Another method to manage data packet content during transport is to "return to normal" on every single hop. In this method illustrated in FIG. 66C, with the exception the gateway nodes, every node performs the sequential operation of DUS operation 1076 followed immediately by MSE operation 1075, in essence completely rebuilding the data packet for transport on every hop. As shown, incoming data packets 1055 and 1056 are first mixed by node $N_{0,0}$ at time $t_1$ using state 991 resulting in ciphertext 1080Z corresponding to plaintext 1080Y. Ciphertext 1080Z is then sent to node $N_{0,1}$ where DUS operation 1076 identifies the incoming packet was created using state 991 corresponding to time $t_1$ and as shown in detail in FIG. 66D sequentially decrypts it, converting incoming ciphertext 1080Z into plaintext 1080Y. Plaintext 1080Y is then unscrambled and split (i.e. unmixed) thereby recovering original data packets 1055 and 1056.

In preparation for the next network hop, the two original data packets are once again mixed and scrambled, this time using algorithms selected at the time $t_2$ corresponding to state 992 resulting in plaintext 1080A which is subsequently encrypted to produce ciphertext 1080B ready to be sent to node $N_{0,1}$. Using this method the incoming data packets are returned to the initial normal state each time they enter a node and depart in a completely new "refreshed" condition corresponding to present state. In this method each node only needs to know the state of the incoming packet and does not require knowledge of any prior states used during data transport.

Mixing & Splitting Operations

The process of mixing and splitting packets to combine and separate data of different types shown previously in FIG. 60A and FIG. 60B illustrates fixed-length packets obeying the principle of "conservation of data segments" where the total length of the long data packet 1054 has the same number of data segments as the sum of the shorter data packets 1055 and 1056 created from it. In essence, conservation of data segments means during successive mixing and splitting operations, data segments are neither created nor destroyed. This simple principle is problematic in communication because the quantity of real-time data may be sparse, unable to fill even one complete packet.

Figure 67A:
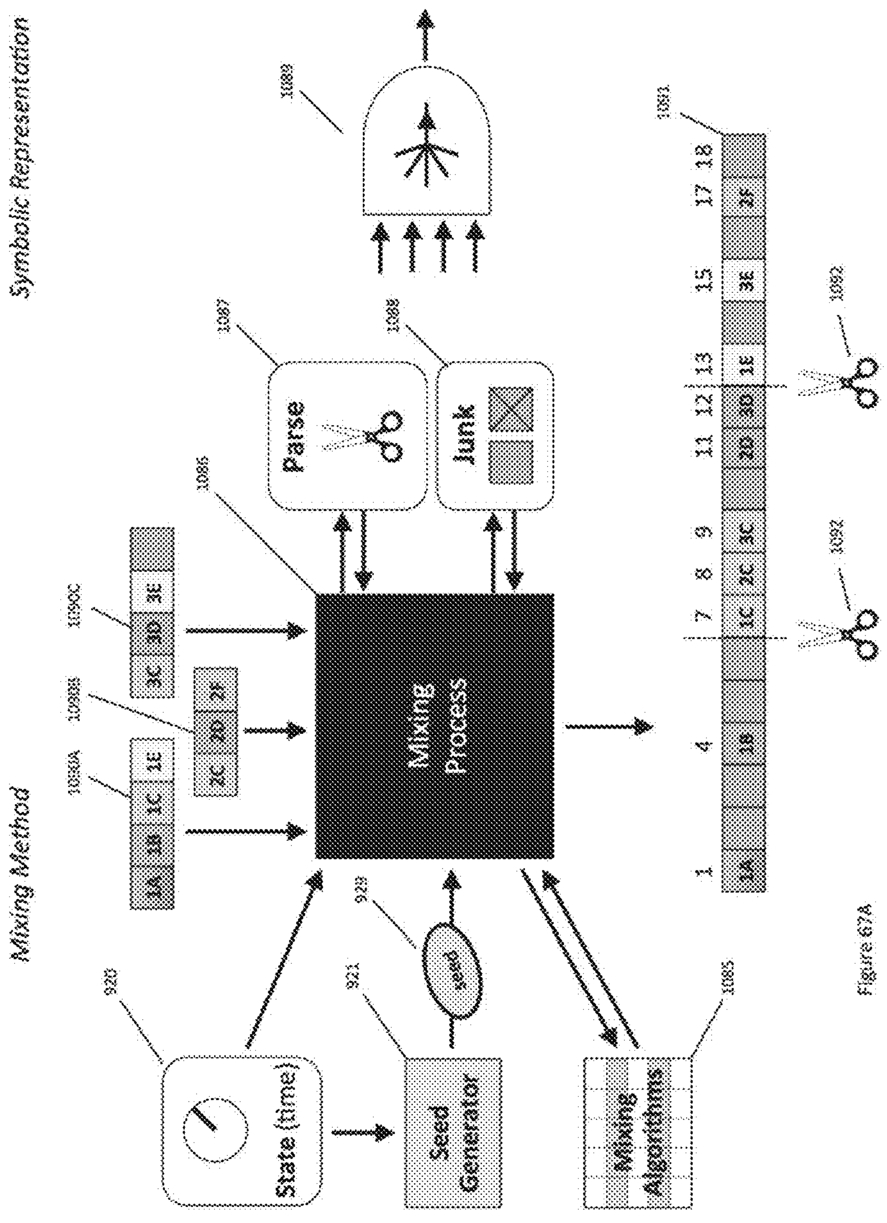
FIG. 67A is a schematic diagram showing single-output packet mixing.

In the opposite extreme, where a network may be heavily congested, a server may be unable to accept a long packet without imposing long propagation delays resulting in high latency. For this and other reasons, the dynamic mixing and splitting of data packets in accordance with the disclosed invention provides a means to manage, combine and separate data packets of varying length, controlling both the length and number of data packet inputs as well as the number and length of data packet outputs. The use of variable length packets containing content directed to different destinations further confounds hackers, conferring an added degree of security to the network. As shown in FIG. 67A, the parse operation 1087, and the junk operation 1088, for junk insertions and deletions, are conjunctively used to manage and control data packet length in mixed data packets, applicable for either single-output or multi-output mixing operations.

FIG. 67A illustrates an example of single-output packet mixing where multiple inputs of varying length, in the example shown as 4-data segment packets 1090A and 1090C, and 3-data segment packet 1090B, are mixed using mixing operation 1086 to produce one long data packet 1091. The mixing operation 1086 is selected from a list of mixing algorithms 1085 in accordance with the current time or state 920 when the mixing occurs including the use of numeric seed 929 as generated by seed generator 921. During mixing operation 1086, junk operation 1088 inserts junk data segments into data packet output 1091 in accordance with the algorithm selected.

After mixing, long data packet 1091, or alternatively sub-packets resulting from parsing operation 1092, may either be stored locally, e.g. waiting for other data packets to arrive, or may be sent on to other nodes in the communication network. Before storage or routing each packet or sub-packet is "tagged" with a header or sub-header identifying the packet. The tag is critical to recognize an incoming packet so that it may be processed according to instructions received previously as to what to with its data, including how to mix, scramble, encrypt or split, unscramble, and decrypt the data packet's content. The use of data packet headers and sub-headers to identify and tag data packets is described in greater detail later in this application.

So in addition to confounding cyber-attackers, another role of parsing, junk, and de-junk operations is to manage the length of data packet. For example, if the resulting long data packet 1091 is too long, then in accordance with a selected algorithm, the parse operation 1087 breaks the long data packet output 1091 into shorter pieces. The length of the shorter pieces may be prescribed by the selected algorithm, e.g. cut the merged long packet at regular intervals 1092 of "n" sub-packets. The desired packet length can be decided a priori or can be based on a network condition, e.g. the maximum acceptable length may be calculated based on network delays. For instance, if the propagation delay $\Delta t_{prop}$ between two nodes exceeds a certain value, then the data packet will be parsed to make it smaller, e.g. where long data packet 1091 is broken up at regular intervals by parsing operation 1092 into "n" sub-packets.

Figure 67B:
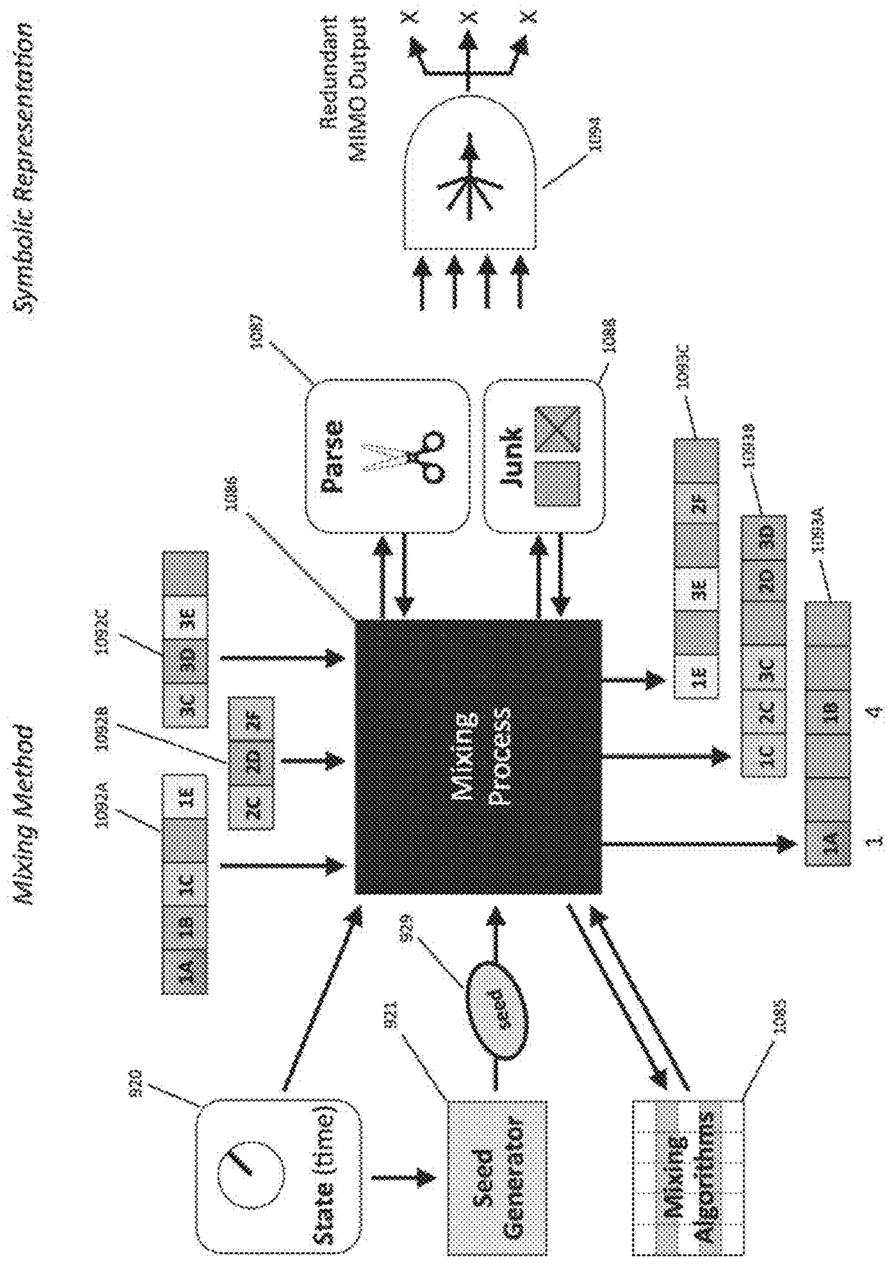
FIG. 67B is a schematic diagram showing multiple-output packet mixing.

Regardless as to how the long packet is parsed, the multiple-output mixing operation produces multiple data packet outputs, e.g. data packets 1093A, 1093B, and 1093C, as shown in FIG. 67B. In the process as shown, junk data may be inserted into the sub-packets to produce sub-packets of controlled or fixed lengths. Each segment of a data packet or sub-packet, e.g. 1A, 1B, 1C, etc., is identified not by its value or content, but by its "slot" position in the packet. For example long data packet 1091 contains 18 data slots with data present in slots 1, 4, 7, 8, 9, 11, 12, 13, 15, and 17, while sub-packet 1093A is only 6 slots long, containing actual data content or audio in the $1^{st}$ and $4^{th}$ slots For convenience sake, the multiple-input single-output (MISO) mixing operation is symbolically represented herein by symbol 1089 while the multiple-input multiple-output (MIMO) mixing operation is symbolically represented by symbol 1094, similar to the earlier, more idealized example shown in FIG. 60A. In accordance with the invention disclosed herein, multiple-input single-output mixing 1089 is useful for secure last-mile connections while multiple-input multiple-output mixing 1094 is useful in realizing multi-path and meshed routing networks described later in the application. In the taxonomy of disclosed SDNP network elements and operations, MISO mixing operation 1089 may be considered a special case of MIMO mixing operation 1094.

Figure 67C:
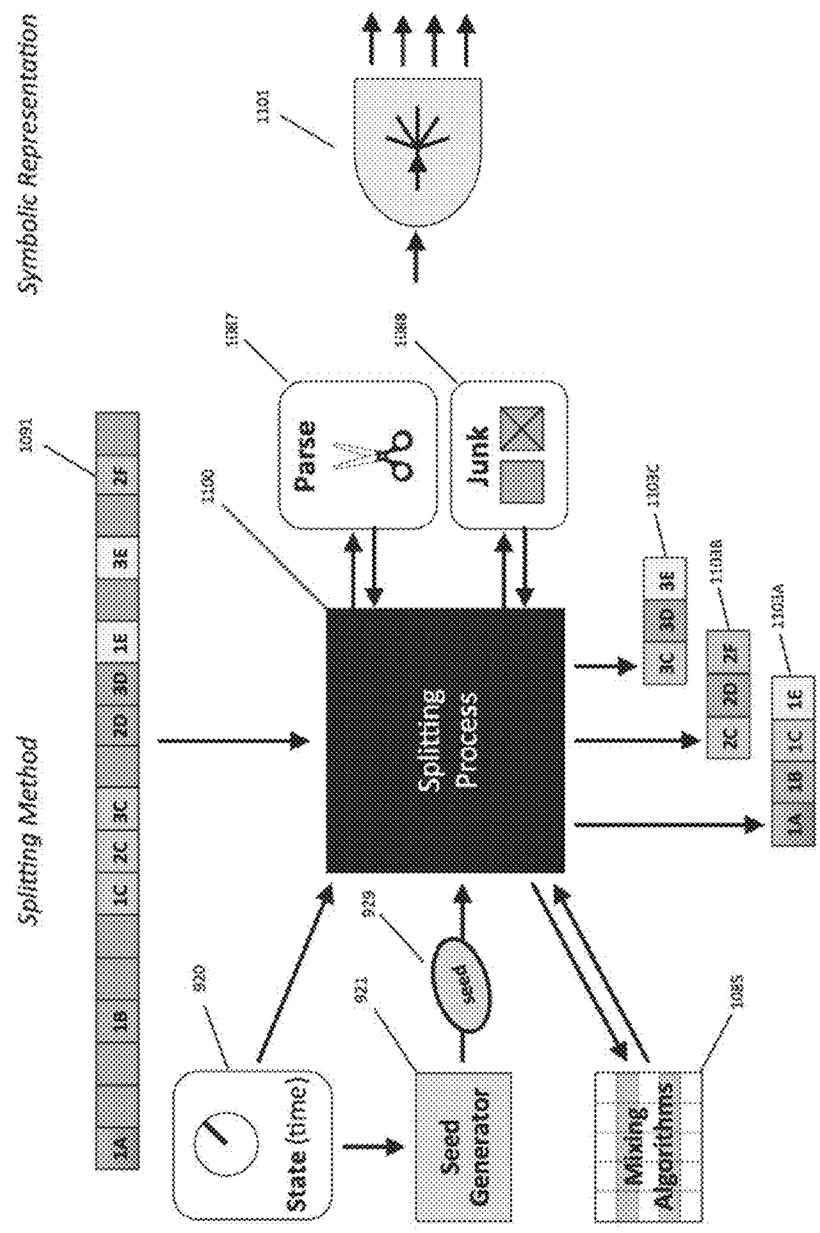
FIG. 67C is a schematic diagram showing variable length packet splitting.

The inverse function to multiple-input single-output or MISO mixing is single-input multiple-output or SIMO splitting. In one embodiment, shown in FIG. 67C, a single long data packet 1091 is divided by splitting operation 1100 into multiple data sub-packets 1103A, 1103B, and 1103C which may comprise sub-packets of fixed or varying length. In the example shown, sub-packet 1103A contains 4 data slots while sub-packets 1103B and 1103C each contain only 3 slots.

Figure 67D:
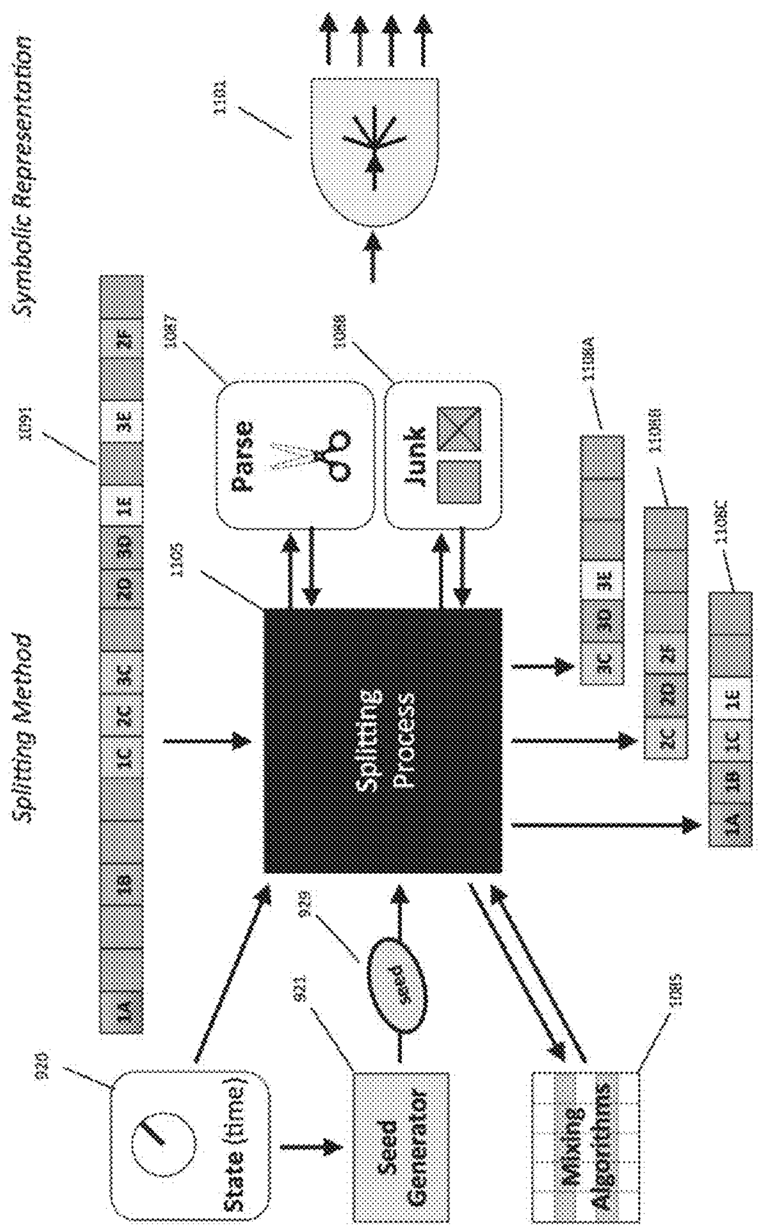
FIG. 67D is a schematic diagram showing fixed-length packet splitting.

In a second embodiment, shown in FIG. 67D, a single long data packet 1091 is divided by splitting operation 1105 into multiple sub=packets 1108A, 1108B, and 1108C of identical, fixed lengths using junk data segments as filler when inadequate data is present to fill an entire data packet. In both examples, the time or state 920 and numeric seed 929 used when the incoming data packets were created are required to select a mixing algorithm from table 1085 and to set parameters needed to executing splitting operations 1100 and 1105. Although mixing algorithm table 1085 references the term "mixing", the same algorithm table is used to identify and select the inverse function needed for performing "splitting", i.e. mixing algorithm table 1085 contains the information needed both for mixing data packets and for splitting data packets. Because the two functions involve the same steps performed in reverse order, table 1085 could also be renamed as "mixing/splitting" algorithms table 1085. For clarity's sake however, the table is labeled only by the function and not by its inverse function. The methods used to perform data packet mixing and splitting are algorithmic, and in many ways similar to the scrambling algorithms described previously except that they generally involve more than one data packet as input or output. One exceptional case where mixing or splitting operations may be performed on a single data packet is during the insertion or removal of junk data.

Figure 67E:
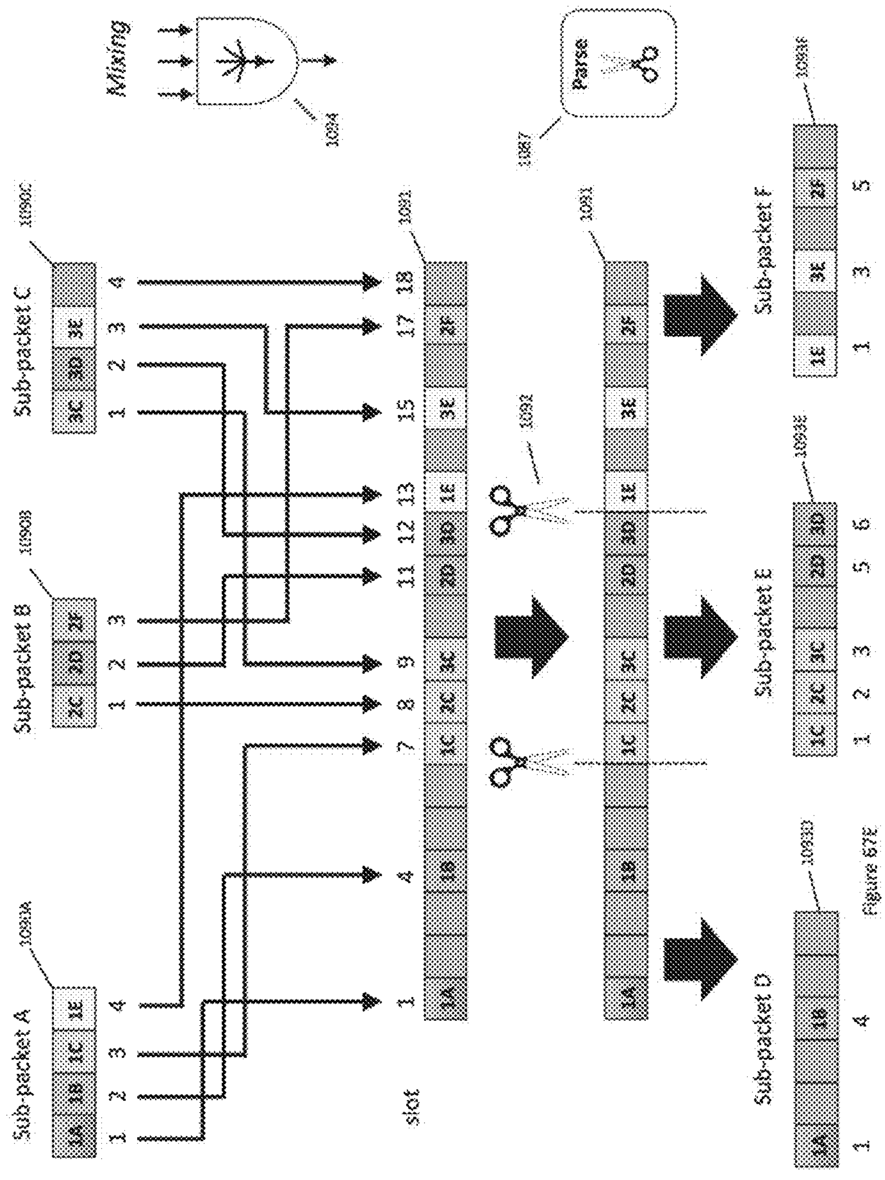
FIG. 67E is a flow chart illustrating a mixing algorithm.

FIG. 67E illustrates one specific mixing algorithm mixing three incoming data packets 1090A labeled Sub-packet A, 1090B labeled Sub-packet B, and 1090C labeled Sub-packet C, into one long data packet 1091, then parsing long data packet 1091 into three different outgoing sub-packets packets 1090D labeled Sub-packet D, 1090E labeled Sub-packet E, and 1090F labeled Sub-packet F. As represented graphically, mixing operation 1094 remaps the data content from the slots of the incoming data packets into the long packet and well as inserting junk data into some intervening slots. For example as shown, the $3^{rd}$ slot of sub-packet 1090A containing data segment 1C is moved into the $11^{th}$ slot of long data packet 1091, the $3^{rd}$ slot of sub-packet 1090B containing data segment 2F is moved into the $17^{th}$ slot of long data packet 1091, and the $2^{nd}$ slot of sub-packet 1090C containing data segment 3D is moved into the $12^{th}$ slot of long data packet 1091. The complete mixing algorithm therefore comprises a substitution table as shown by example here below:

| Long Packet Slot # | Incoming Sub-packet # | Incoming Sub-packet Slot # | Data Contained In Slot |
|---|---|---|---|
| Slot 1 | Sub-packet A | Slot 1 | 1A |
| Slot 2 | | Junk Data Inserted | |
| Slot 3 | | Junk Data Inserted | |
| Slot 4 | Sub-packet A | Slot 2 | 1B |
| Slot 5 | | Junk Data Inserted | |
| Slot 6 | | Junk Data Inserted | |
| Slot 7 | Sub-packet A | Slot 3 | 1C |
| Slot 8 | Sub-packet B | Slot 1 | 2C |
| Slot 9 | Sub-packet C | Slot 1 | 3C |
| Slot 10 | | Junk Data Inserted | |
| Slot 11 | Sub-packet B | Slot 2 | 2D |
| Slot 12 | Sub-packet C | Slot 2 | 3D |
| Slot 13 | Sub-packet A | Slot 4 | 1E |
| Slot 14 | | Junk Data Inserted | |
| Slot 15 | Sub-packet C | Slot 3 | 3E |
| Slot 16 | | Junk Data Inserted | |
| Slot 17 | Sub-packet B | Slot 3 | 2F |
| Slot 18 | Sub-packet C | Slot 4 | Junk |

So in general the function of the mixing operation is to define which slot in the in the mixed packet or long packet the incoming data is inserted, and to define which slots of the mixed packet contain junk.

The table representation of the algorithm is exemplary to illustrate that any remapping of incoming data sub-packets into a long data packet is possible. As part of mixing operation 1094, parsing operation 1087 is next performed, cutting 1092 long data packet 1091 into three equal length pieces to create outgoing sub-packets 1093D, 1093E and 1093F, labeled correspondingly as Sub-packet D, Sub-packet E, and Sub-packet F.

Figure 67F:
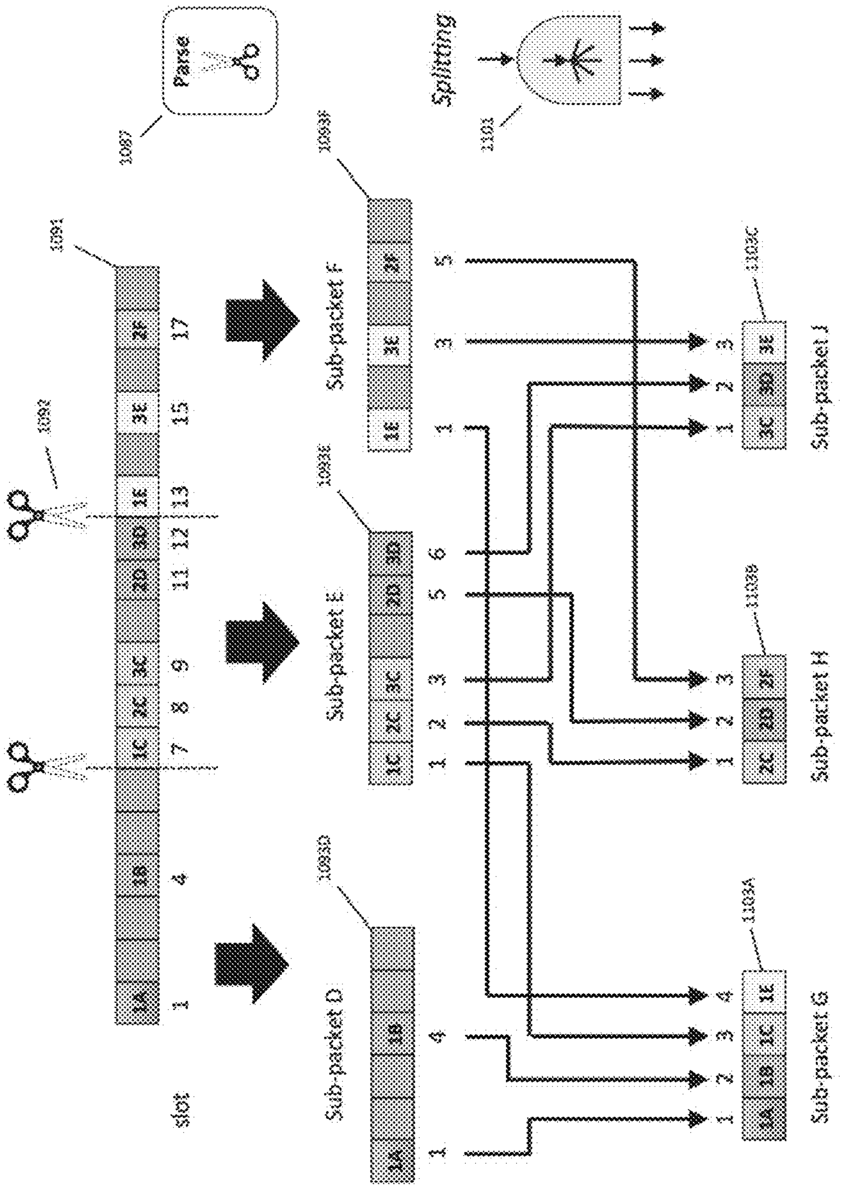
FIG. 67F is a flow chart illustrating a splitting algorithm.

FIG. 67F illustrates an algorithm performing the splitting or "un-mixing" operation 1101 starting with three equal length sub-packets 1093D, 1093E, and 1093F resulting from previous parsing operation 1087, and remapping the data to create new sub-packets 1103A, 1103B, and 1103C of differing length as detailed in the table below. The purpose of the parsing operation is to break up a long packet into various pieces of smaller size or of shorter duration for local storage, or to serialize the data for data transmission.

| Incoming Sub-packet | Incoming Slot # | Split Output Sub-packet | Split Output Slot # | Data Contained In Slot |
|---|---|---|---|---|
| Sub-packet D | Slot 1 | Sub-packet G | Slot 1 | 1A |
| | Slot 2 | Junk data removed | | |
| | Slot 3 | Junk data removed | | |
| | Slot 4 | Sub-packet G | Slot 2 | 1B |
| | Slot 5 | Junk data removed | | |
| | Slot 6 | Junk data removed | | |
| Sub-packet E | Slot 1 | Sub-packet G | Slot 3 | 1C |
| | Slot 2 | Sub-packet H | Slot 1 | 2C |
| | Slot 3 | Sub-packet J | Slot 1 | 3C |
| | Slot 4 | Junk data removed | | |
| | Slot 5 | Sub-packet H | Slot 2 | 2D |
| | Slot 6 | Sub-packet J | Slot 2 | 3D |
| Sub-packet F | Slot 1 | Sub-packet G | Slot 4 | 1E |
| | Slot 2 | Junk data removed | | |
| | Slot 3 | Sub-packet J | Slot 3 | 3E |
| | Slot 4 | Junk data removed | | |
| | Slot 5 | Sub-packet H | Slot 3 | 2F |
| | Slot 6 | Junk data removed | | |

As shown, sub-packet 1103A labeled as Sub-packet G comprises 4 slots, where slot 1 is filled with data segment 1A from slot 1 of sub-packet D corresponding to slot 1 of long packet 1091, slot 2 is filled with data segment 1B from slot 4 of sub-packet D corresponding to slot 4 of long packet 1091, slot 3 is filled with data segment 1C from slot 1 of sub-packet E corresponding to slot 7 of long packet 1091, and slot 4 is filled with data segment 1E from slot 1 of sub-packet E corresponding to slot 13 of long packet 1091. Similarly, sub-packet 1103B labeled Sub-packet H comprises three slots, the first containing data segment 2C from the $2^{nd}$ slot of Sub-packet E, the second containing data segment 2D from the $5^{th}$ slot of Sub-packet E, and the third containing data segment 2F from the $5^{th}$ slot of Sub-packet F. Sub-packet 1103C also comprises three slots. In slot 1, data segment 3C comes from slot 6 of Sub-packet E. In slot 2, data segment 3D comes from slot 6 of Sub-packet E. In slot 3 of Sub-packet J, data segment 3E comes from slot 3 of Sub-packet F.

As such a splitting algorithm defines (a) how many split sub-packets there will be, (b) how many slots there will be in each split sub-packet, (c) into which slot of the split sub-packets the data of the long packet will go (d) which slots will be removed because they contain junk data, and (e) if new slots containing junk data are introduced, possibly to facilitate generating a specific length sub-packet. In cases where a splitting operation that follows a mixing operation, the number of sub-packets in the split packets has to equal the number of sub-packets in the packets before they are mixed unless junk data is removed or inserted.

The roles of the disclosed mixing and splitting operations made in accordance with this invention may be adapted to implement fragmented data transport through any network with the caveat that all the nodes in the network know what sequence of operations is to be performed. In single route transport such as shown previously in FIG. 61B, the data packets 1055 and 1056 represent different conversations or communiqués from different callers or sources. Once merged, the long data packet, or parsed versions thereof are ready for transport through the network. Such a function can be considered a multiple-in single-out communication or MISO node.

The original data packets are recovered by the inverse function, a single-in multiple-output or SIMO communication node, performing splitting. If the data packets in single-route communication have reached their final destination, they long packet data is split for the last time and the junk is removed to reconstitute the original data packet. The mixed data does not necessarily need to be the same data types. For example, one caller could be talking on the phone and sending text messages simultaneously, thereby generating or receiving two different data streams concurrently. If, however, the split data packets are intended continue routing onward in the network in an unmixed stated, junk data is included in the data packets to make data sniffing unusable.

Figure 67G:
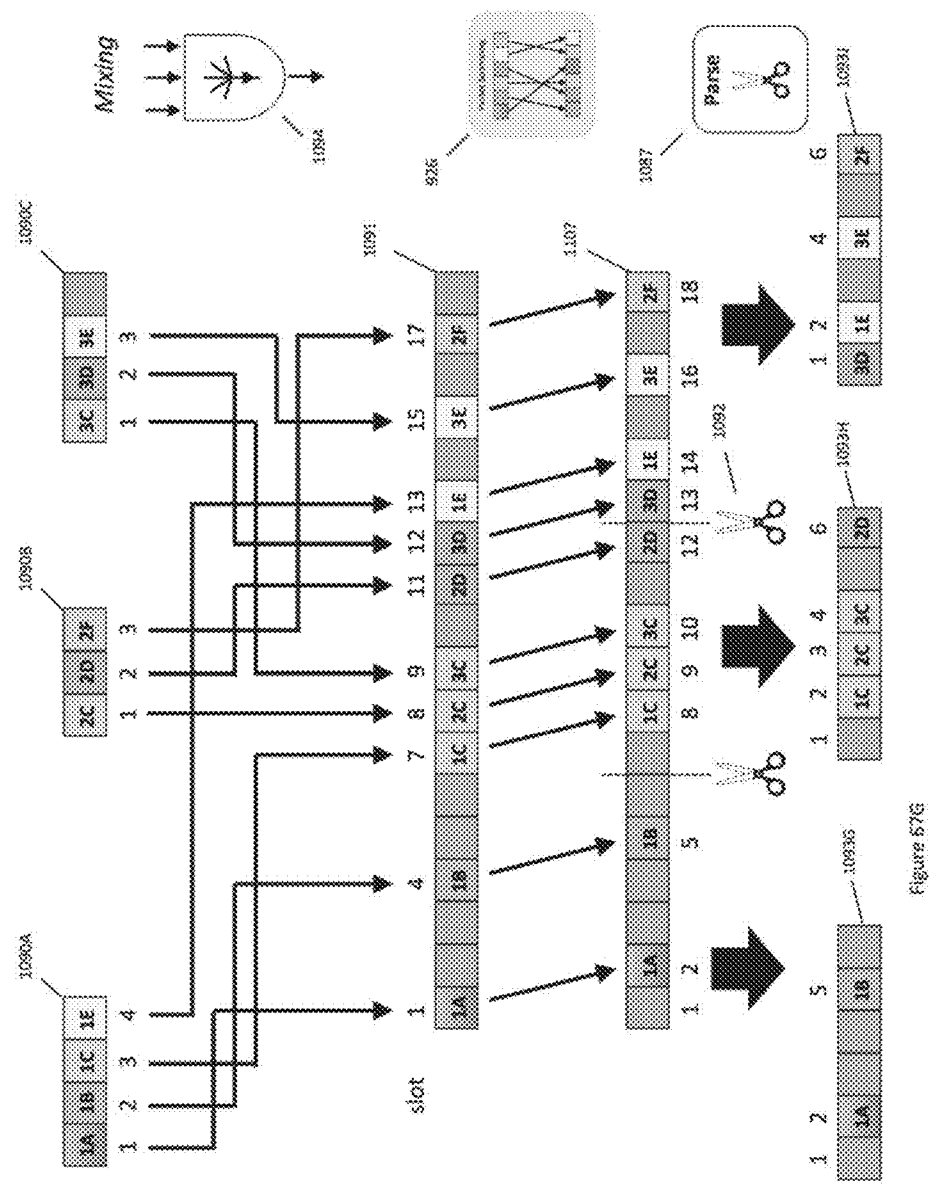
FIG. 67G is a flow chart illustrating a two-step mixing and scrambling algorithm.
Figure 57H:
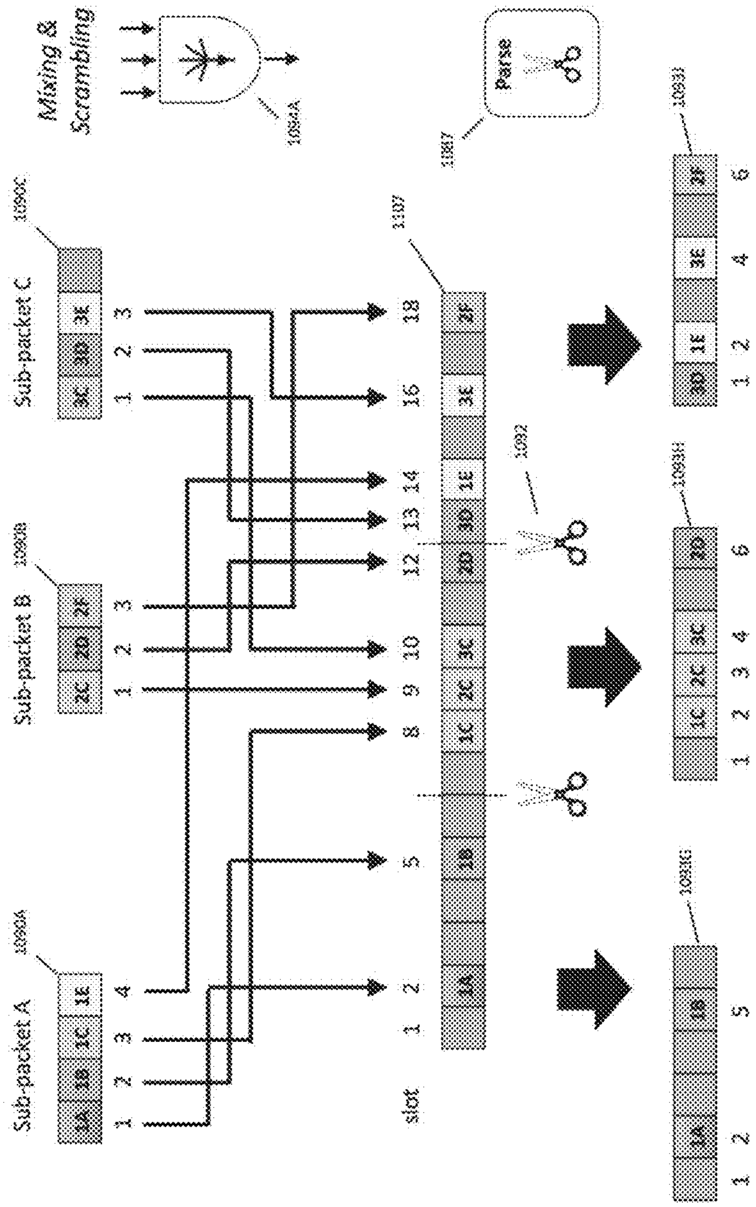

In the transport of homogeneous data, security is achieved primarily through scrambling shown in FIG. 64, or through the combination of scrambling and encryption as shown in FIG. 66A. The combination of mixing followed by scrambling used in both examples is further elaborated in the exemplary illustration of FIG. 67G where mixing operation 1094 mixes incoming data sub-packets 1090A, 1090B and 1090C to form unscrambled long data packet 1091. Scrambling operation 926, then in this example performs a linear phase shift by one data slot to the right, e.g. where the data 1A in slot 1 of the unscrambled packet moves to slot 2 in scrambled packet, the data 1C is slot 7 move to slot 8 in the scrambled package and so on, to create scrambled long data packet 1107.

Parsing operation 1087 then cuts scrambled long data packet 1107 along cut lines 1092 after the $6^{th}$ and the $12^{th}$ slots to produce outputted sub-packets 1093G, 1093H, and 1093J. The consequence of the phase shift not only affects the position of data in the outputted sub-packets but it actually alters the packets' content. For example, when data segment 3D in slot position 12 in the unscrambled long data packet 1107 moves to position 13 after scrambling, parsing operation 1087 located in cut line 1092 after the $12^{th}$ slot, naturally dislocates the data from data sub-packet 1093H to 1093J, as evidenced by a comparison of sub-packet 1093H with its new sequence of data segments J-1C-2C-3C-J-2D (where J indicates junk data) against sub-packet 1093E in FIG. 67E having the sequence of data segments 1C-2C-3C-J-2D-3D.

FIG. 67H illustrates combining an algorithmic mixing, i.e. a mapping incoming data from sub-packets to form a long data packet, with a subsequent scrambling algorithm can be reproduced identically by merging the mixing and scrambling operations into a single step, just by changing the mapping algorithm. The hybrid mixing and scrambling operation 1094A is identical to the prior mixing algorithm except it dislocates the data by one position to the right in the long data packet 1107 during mapping. For example, data segment 1A in sub-packet 1090A is mapped into slot 2 of long data packet 1107 rather than into slot 1, data segment 3D in sub-packet 1090C is mapped into slot 13 of long data packet 1107 rather than into slot 12. The resulting outputted sub-packets 1093G, 1093H, and 1093J are identical to the sub-packets output using the sequence of mixing followed by scrambling shown in FIG. 67G. In essence, a mix then scramble algorithm represents another mixing algorithm. Because there is no difference in the resulting output, throughout the text, this disclosure will continue to identify separate mixing and scrambling operations with the understanding that the two numeric processes can be merged. Similarly, it is understood that the inverse process unscrambling and then splitting a data packet can be replaced by a single combined operation performing both unscrambling and splitting in a single step.

Figure 67I:
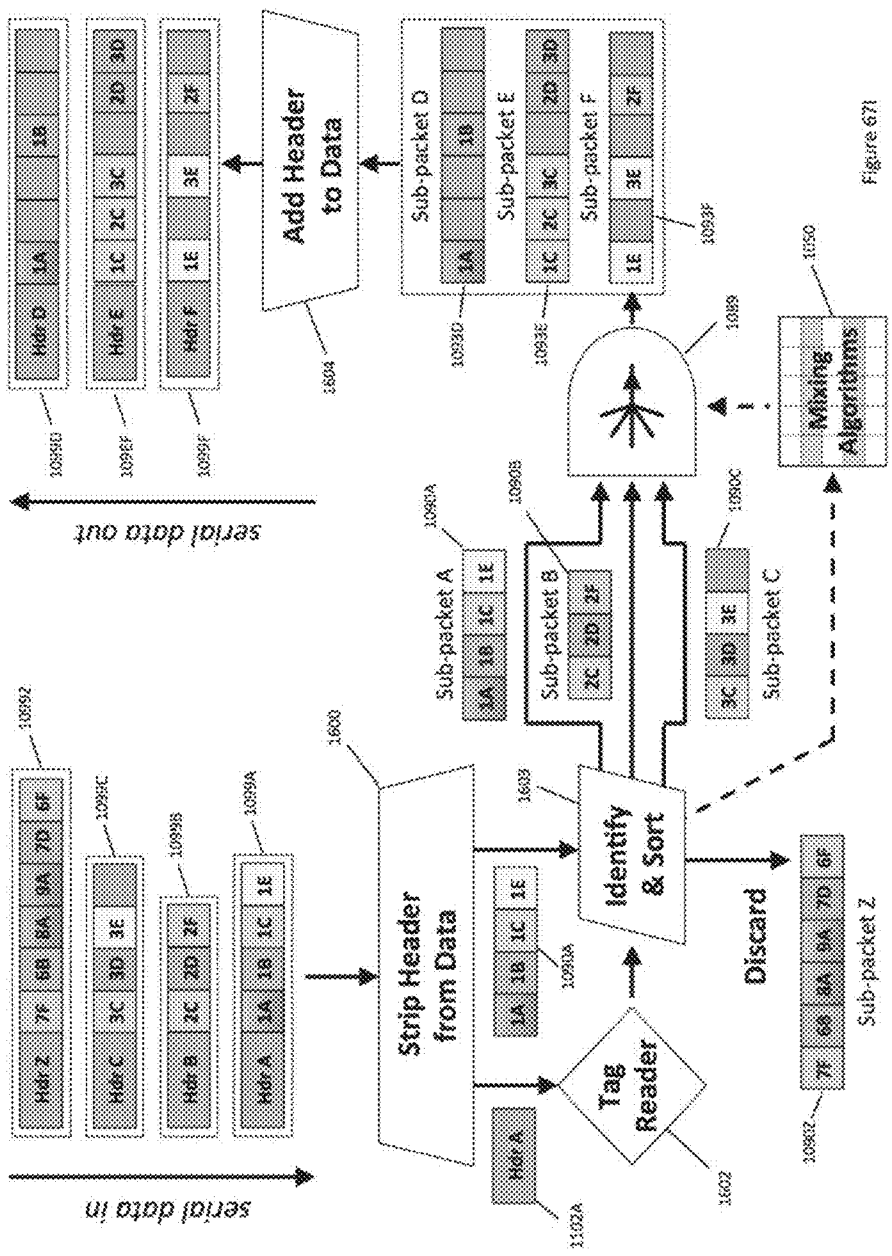
FIG. 67I is a flow chart illustrating tag identification.

In single route data transport, data packets cannot take parallel paths, but must instead travel in serial fashion across a single path between media servers or between a client's device and the cloud gateway, i.e. data transport over the last mile. Before the data sub-packets can be sent onto the network, they must be tagged with one or more headers to identify the packet so that the target communication node can be instructed what to do with the incoming packet. Although the formatting and information contained in these headers is described in greater detail later in the disclosure, for clarity's sake a simplified realization of packet tagging is shown in FIG. 67I. As shown, a series of data packets 1099A, 1099B, 1099C, and 1099Z arrive in sequence in the communication node. Each data packet includes a header such as 1102A, and its corresponding data, e.g. 1090A.

As the data packets arrive at the node, operation 1600 separates the header from the data for processing. As shown for the first incoming packet 1099A, header 1102A labeled Hdr A is separated from data packet 1099A, then fed into tag reader operation 1602 which determines whether the communication node has received any instructions bearing on packet 1099A. If it has not received any instructions relating to packet 1099A, the corresponding data is discarded. This is shown for example by sub-packet 1092, labeled sub-packet Z, which contains data from conversations 6, 7, 8, 9 unrelated to any of the instructions received by the communications node. If, however, the data packet is "expected," i.e., its tag matches an instruction previously received by the communication node from another server, then the recognized data packets, in this case sub-packets 1090A, 1090B and 1090C, are sent to mixing operation 1089. The proper algorithm previously selected for the incoming data packets is then loaded from mixing algorithm table 1050 into mixing operation 1089. In other words, the communication node has previously been instructed that when it receives the three packets identified by Hdr A, Hdr B and Hdr C, respectively, it is to mix the three packets in accordance with a particular mixing algorithm in table 1050. As noted above, this mixing algorithm may include a scrambling operation.

In accordance with this disclosure, mixing operation 1059 then outputs data sub-packet 1093D, 1093E and 1093F in sequence, each of which are tagged with a new identifying header, i.e. Hdr D, Hdr E, and Hdr F to product data packets 1099D, 1099E, and 1099F ready for transport to the next communication node in the network. In single route communications these data packets are sent serially along the same route to their target destination. While the flow chart represents how the tags are used to identify packets for mixing, the tag identification method is identical for executing specific scrambling and encryption operations, and their inverse functions decrypting, unscrambling, and splitting.

The mixing and splitting operations can be applied to multi-route and meshed transport described next using multiple output mixing and splitting operations. The various outputs represented by outward facing arrows in SIMO splitting symbol 1101 in FIG. 67F may be used to direct data packets across a network in different directions, paths, and routes. The instructions received by the communication node specify the tag to be applied as a header to each of the split packets as well as the identity of the node to which each of the split packets is to be sent. The recipient nodes are also instructed to expect the packets. Similarly, multiple input multiple output mixing operation 1094 shown in FIG. 67B may be applied to multiple route communication. As shown later in this application, MISO and MIMO data packet mixing and SIMO data packet splitting represent key elements in realizing multiroute and meshed routing. Even in the absence of packet scrambling and encryption, multipath and meshed data packet routing greatly diminishes the risk of meaningful data interception by cyber-pirates, packet sniffing, and man-in-the middle attacks on the network because no one communication node carries the entire conversation, or receives, or transmits any data set in its entirety. For illustrative purposes, the number of sub-packets shown in the disclosed figures is for illustrative purposes only. The actual number of packets communicated may comprise tens, hundreds or even thousands of sub-packets.

Packet Routing

As illustrated throughout the application thus far, a single path carries the serial stream of data packets used in packet-switched based network communication such as the Internet. Although this path may vary over time, intercepting the data stream by packet sniffing would, at least for some time interval, provide a cyber-pirate with complete data packets of coherent serial information. Without scrambling and encryption used in the SDNP communication disclosed in accordance with this invention, any sequence of data packets once intercepted, could easily be interpreted in any man-in-middle attack enabling effective and repeated cyber-assaults.

Such single-route communication is the basis of Internet, VoIP, and OTT communication, and one reason Internet-based communication today is very insecure. While the successive packets sent may take different routes, near the source and destination communication nodes the chance that successive packets will follow the same route and transit through the same servers becomes increasingly likely because packet routing in the Internet is decided by service providers monopolizing a geography. Simply by tracing a packet's routing back toward its source, then packet sniffing near the source the chance of intercepting multiple packets of the same conversation and data stream increases dramatically because the communication is carried by only a single geographically based Internet service provider or ISP.

Figure 68A:
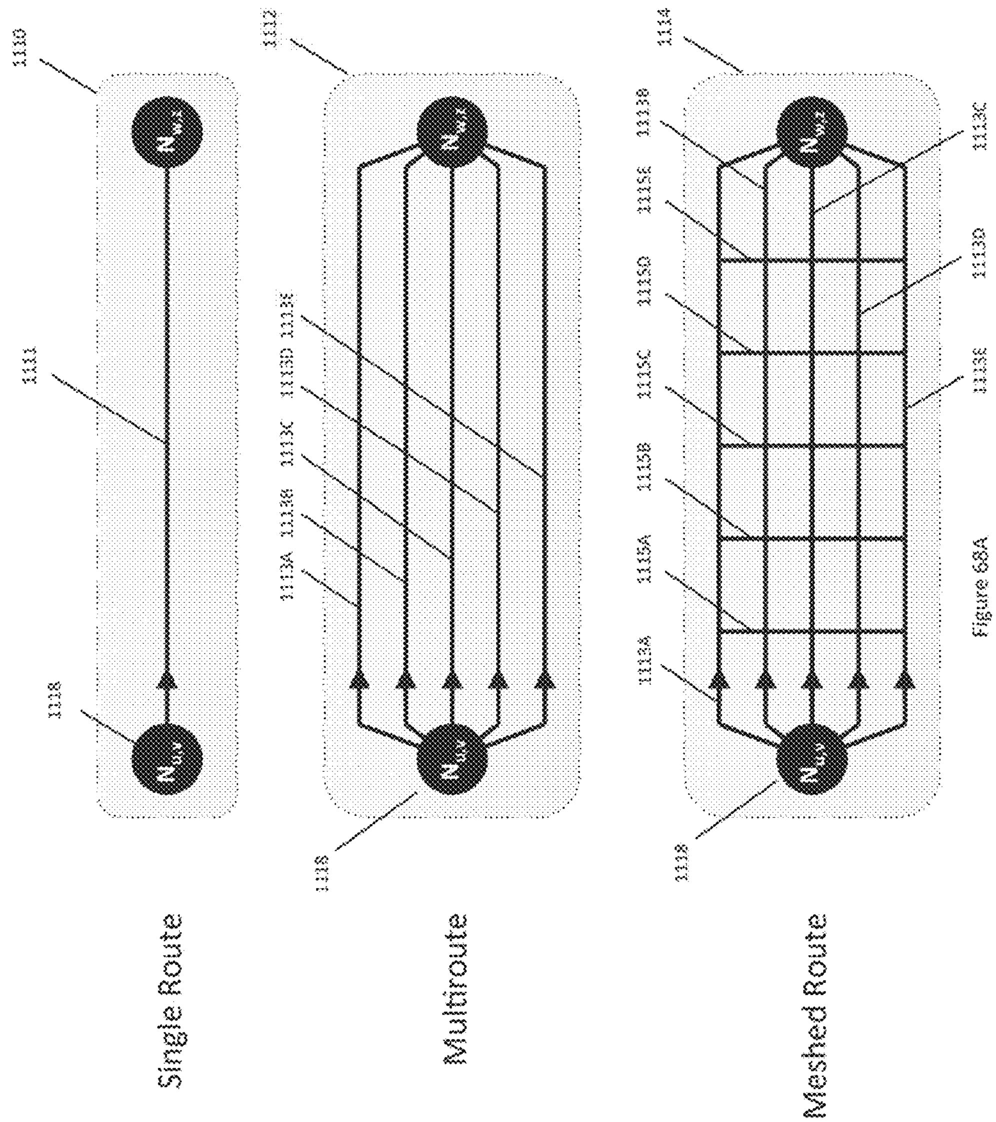
FIG. 68A is a schematic diagram depicting various types of packet routing.
Figure 68B:
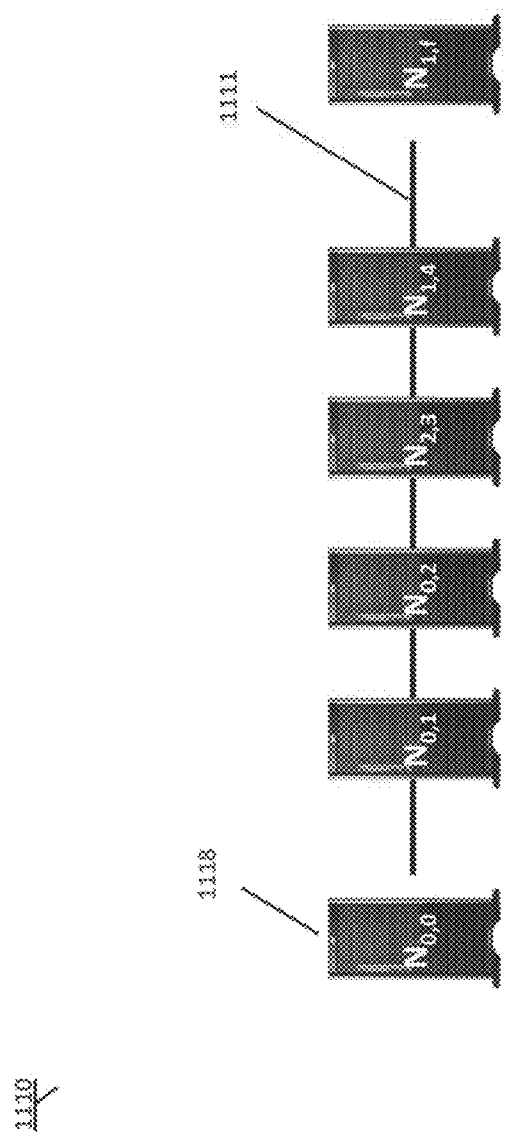
FIG. 68B is a schematic diagram depicting single route or linear transport.

As illustrated graphically in FIG. 68A, single-route communication 1110 represents serial data flow 1111 from a communication node $N_{u,v}$ to another communication node, in this case communication node $N_{w,z}$. Although the path may vary over time, at any given instances, each coherent packet is serially transmitted on to the network transiting to its destination along one single path. As a matter of notation communication node $N_{u,v}$ designates a communication node hosted on server "v" located in network "u", while communication node $N_{w,z}$ designates a communication node hosted on server "z" located in network "w". Networks "u" and "w" represent the clouds owned operated by different ISPs. Although data packet routing in the middle of Internet routing may be carried by any number of ISPs, as the data packets near their destination they invariably become carried by a common ISP and network, making it easier to trace and packet-sniff successive data packets comprising the same conversation. This point is exemplified graphically in FIG. 68B where single-path communication 1111 occurs through a series of servers 1118 representing a single serial path communication network 1110. As shown, the communication starts from communication node $N_{0,0}$ traveling successively through communication nodes $N_{0,1}$ and $N_{0,2}$ all in the same network numbered "0", till reaching communication node $N_{2,3}$, carried by a different ISP over network 2. After that, the data is sent to the final nodes, both on network 1, i.e. communication nodes $N_{1,4}$ and $N_{1,f}$. So during transit the packet data first transmitted on to the Internet remains in server 0 before it has a chance to spread on to another ISP's network. Likewise, as the data packet approaches its destination, the likelihood that successive packets travel through the same nodes increases because they are all located on ISP network 1.

In sharp contrast to single-path packet communication used for Internet OTT and VoIP communications, in one embodiment of SDNP communication in accordance with this invention, the content of data packets is not carried serially by coherent packets containing information from a common source or caller, but in fragmented form, dynamically mixing and remixing content emanating from multiple sources and callers, wherein said data agglomerates incomplete snippets of data, content, voice, video and files of dissimilar data types with junk data fillers. The advantage of the disclosed realization of data fragmentation and transport is that even unencrypted and unscrambled data packets are nearly impossible to interpret because they represent the combination of unrelated data and data types.

As illustrated in FIG. 68A, SDNP communication of fragmented data packets is not serial as in single route transport 1110 but in parallel, using multiroute transport 1112 or "meshed route" transport 1114. In multiroute transport 1112 an array of two or more packet-switched communication nodes $N_{u,v}$ and $N_{w,z}$ establish and transport data concurrently over multiple routes 1113A, 1113B, 1113C, 1113D and 1113E. While five routes are shown, transport can occur in as few as two routes and up to a dozen or more if so needed. In is important to emphasize that this realization of a communication network does not represent simple redundant routing commonly employed by the Internet and packet-switched networks, i.e. where the same data may be sent on any one path or even on multiple paths simultaneously. Transmitting or communicating complete coherent packets of data redundantly over multiple channels actually increases the risk of being hacked because it affords a cyber-pirate multiple sources of identical data to sniff, analyze and crack.

Figure 68C:
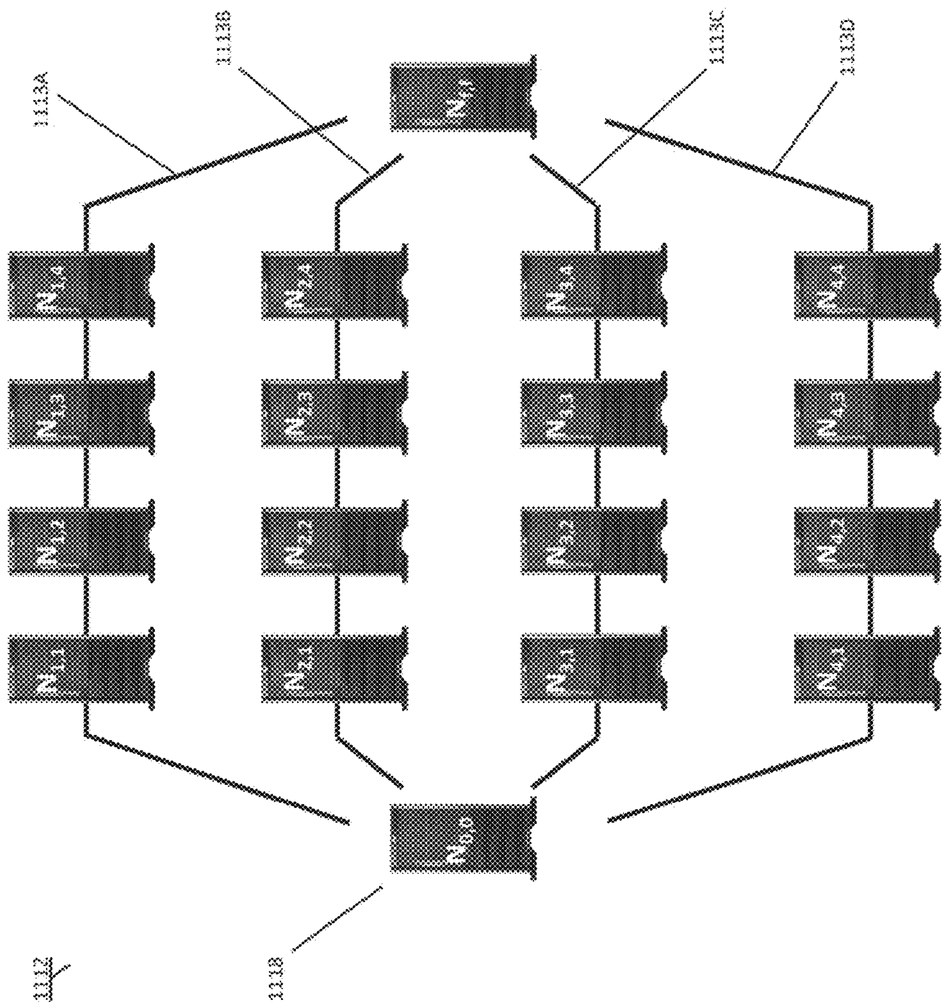
FIG. 68C is a schematic diagram depicting multi-route or parallel transport.

Instead, in SDNP communication, the information is fragmented, for example, with some portion of the data being sent across routes 1113A, 1113B, and 1113D with no data sent initially across route 1113C and 1113E and then at a later time, fragmented data split and combined differently and sent across routes 1113A, 1113C, and 1113E with no data being sent across route 1113B and 1113D. An example of multiroute transport 1112 is illustrated in FIG. 68C by the network comprising an array of communication servers 1118 arranged to establish multiple data paths between communicating communication nodes $N_{0,0}$ and $N_{f,f}$. As shown, the multipath transport occurs on four sets of interconnected servers representing networks 1 through 4. One data path, route 1113A, comprises communication nodes $N_{1,1}$, $N_{1,2}$, $N_{1,3}$, and $N_{1,4}$. A parallel data path, route 1113B, comprises communication nodes $N_{2,1}$, $N_{2,2}$, $N_{2,3}$, and $N_{2,4}$. Similarly, parallel data route 1113C comprises interconnected communication nodes $N_{3,1}$, $N_{3,2}$, $N_{3,3}$, and $N_{3,4}$ while route 1113D comprises interconnected communication nodes $N_{4,1}$, $N_{4,2}$, $N_{4,3}$, and $N_{4,4}$.

Figure 68D:
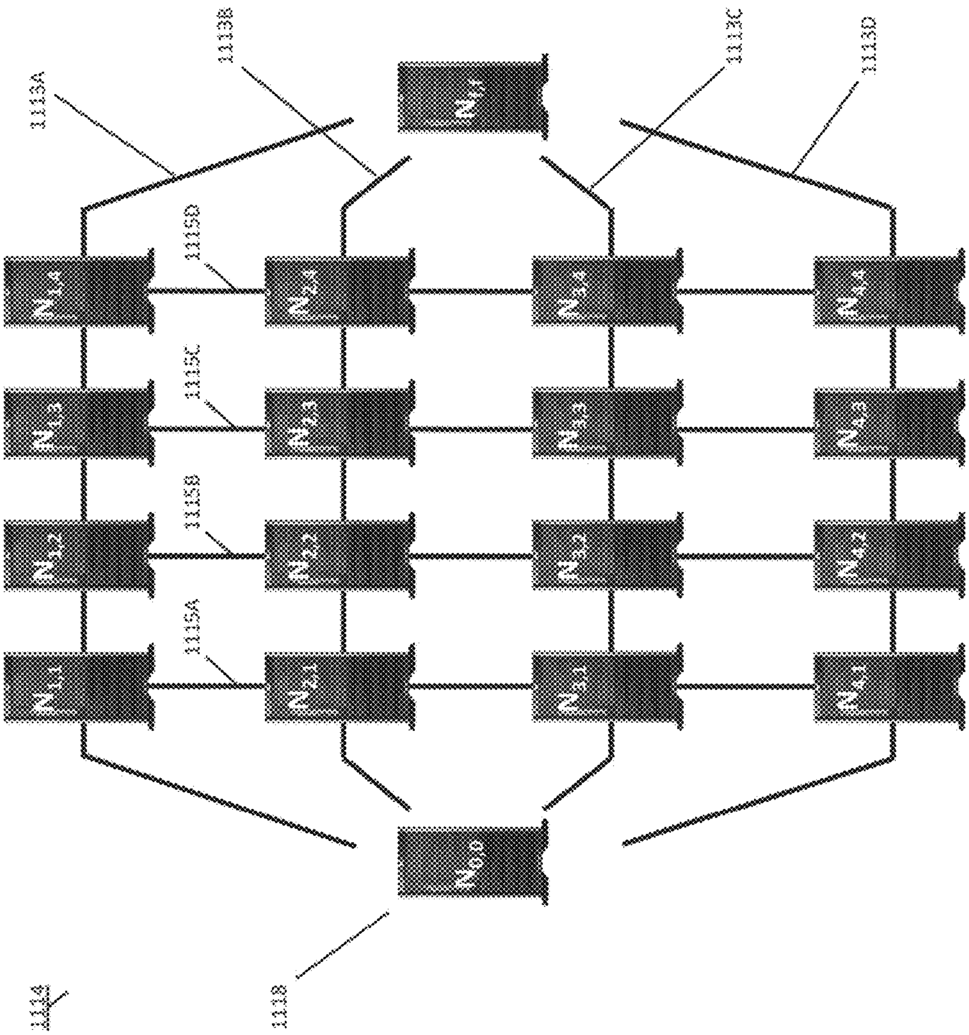
FIG. 68D is a schematic diagram depicting meshed route transport.
Figure 68E:
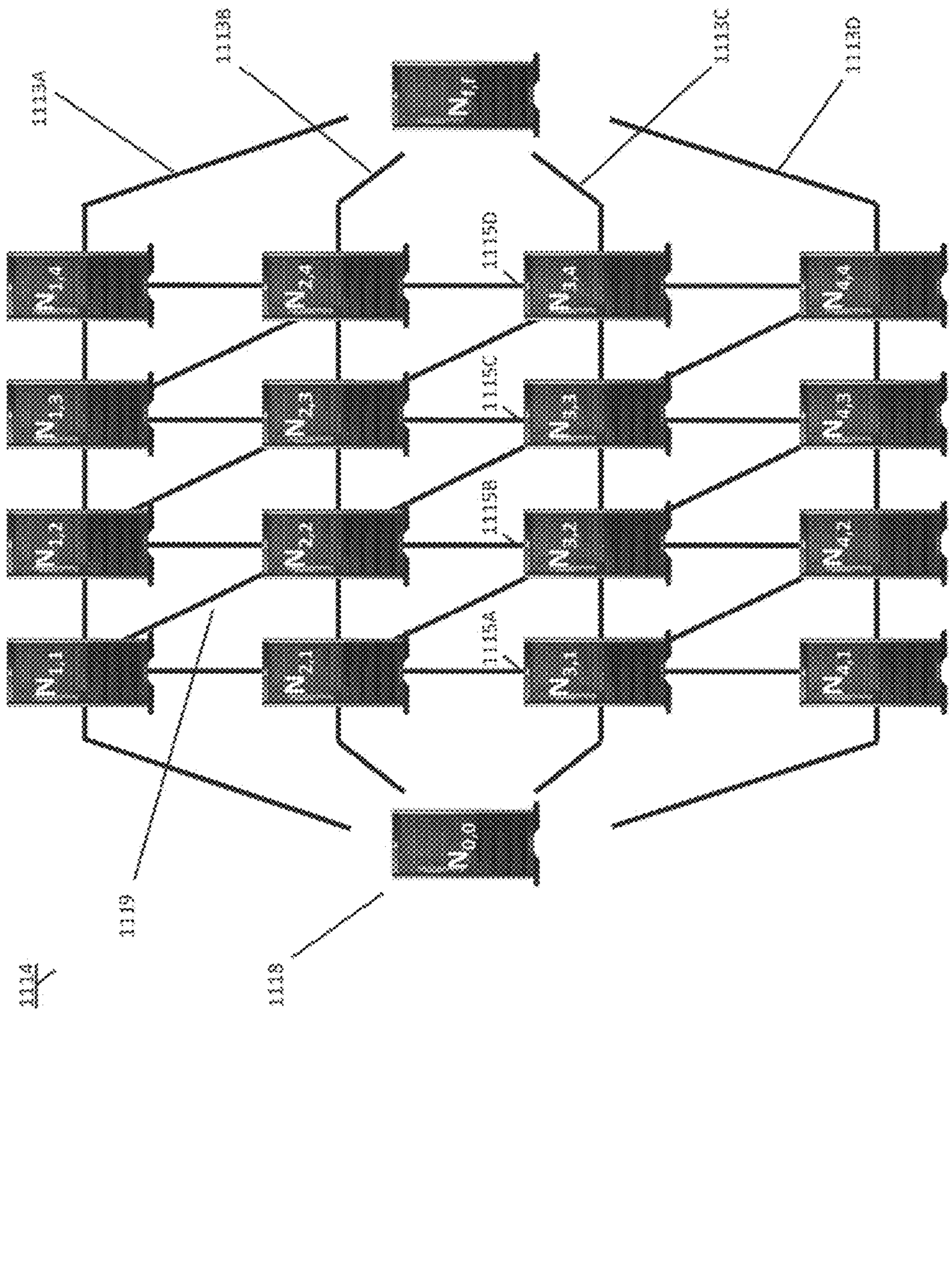
FIG. 68E is a schematic diagram depicting an alternate embodiment of meshed route transport.

In "meshed route" transport 1114, illustrated also in FIG. 68D, communication is sent along multiple interacting routes including the aforementioned routes 1113A, 1113B, 1113C, 1113D and 1113E as well as the cross-connections 1115A through 1115E between the routes 1113A through 113D. Together the connections form a "mesh" whereby data packets can travel by any combination of routes, and even be mixed or recombined dynamically with data packets being sent by other routes. In meshed transport 1114 the network comprises an array of communication servers 1118 arranged to establish meshed data paths between communicating communication nodes $N_{0,0}$ and $N_{f,f}$. As shown, the multipath transport occurs on interconnected servers with both horizontally and vertically oriented data paths. The horizontally oriented route 1113A comprises communication nodes $N_{1,1}$, $N_{1,2}$, $N_{1,3}$, and $N_{1,4}$, route 1113B, comprises communication nodes $N_{2,1}$, $N_{2,2}$, $N_{2,3}$, and $N_{2,4}$, route 1113C comprises interconnected communication nodes $N_{3,1}$, $N_{3,2}$, $N_{3,3}$, and $N_{3,4}$ and route 1113D comprises interconnected communication nodes $N_{4,1}$, $N_{4,2}$, $N_{4,3}$, and $N_{4,4}$. The vertically oriented route 1115A comprises communication nodes $N_{1,1}$, $N_{2,1}$, $N_{3,1}$, and $N_{4,1}$, route 1115B comprises communication nodes $N_{1,2}$, $N_{2,2}$, $N_{2,3}$, and $N_{4,2}$, route 1115C comprises interconnected communication nodes $N_{1,3}$, $N_{2,3}$, $N_{3,3}$, and $N_{4,3}$ and route 1115D comprises interconnected communication nodes $N_{1,4}$, $N_{2,4}$, $N_{3,4}$, and $N_{4,4}$. The network can further be augmented by diagonal interconnections 1119, as shown in FIG. 68E.

Figure 69:
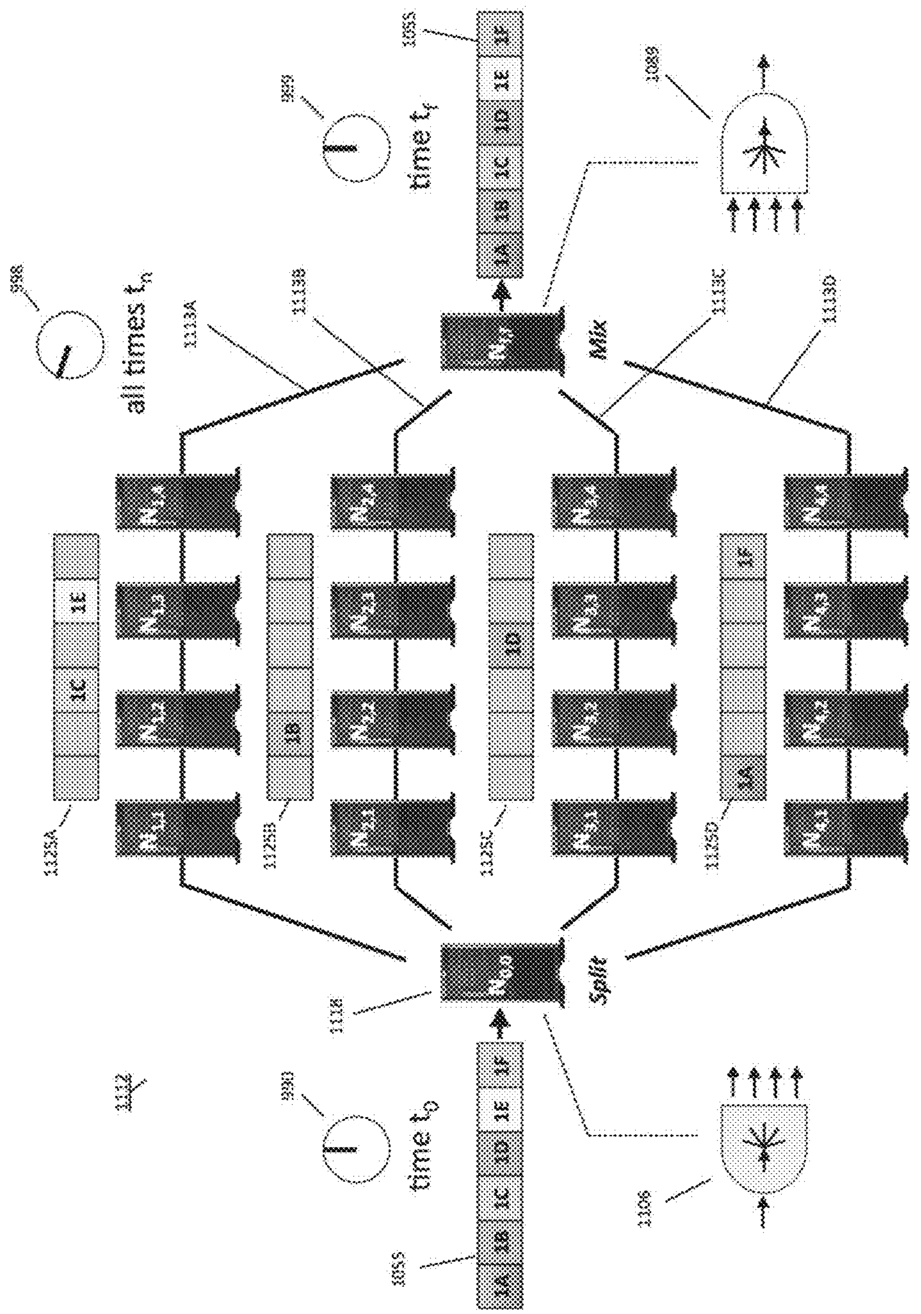
FIG. 69 is a schematic diagram showing static multi-route transport.
Figure 7D:
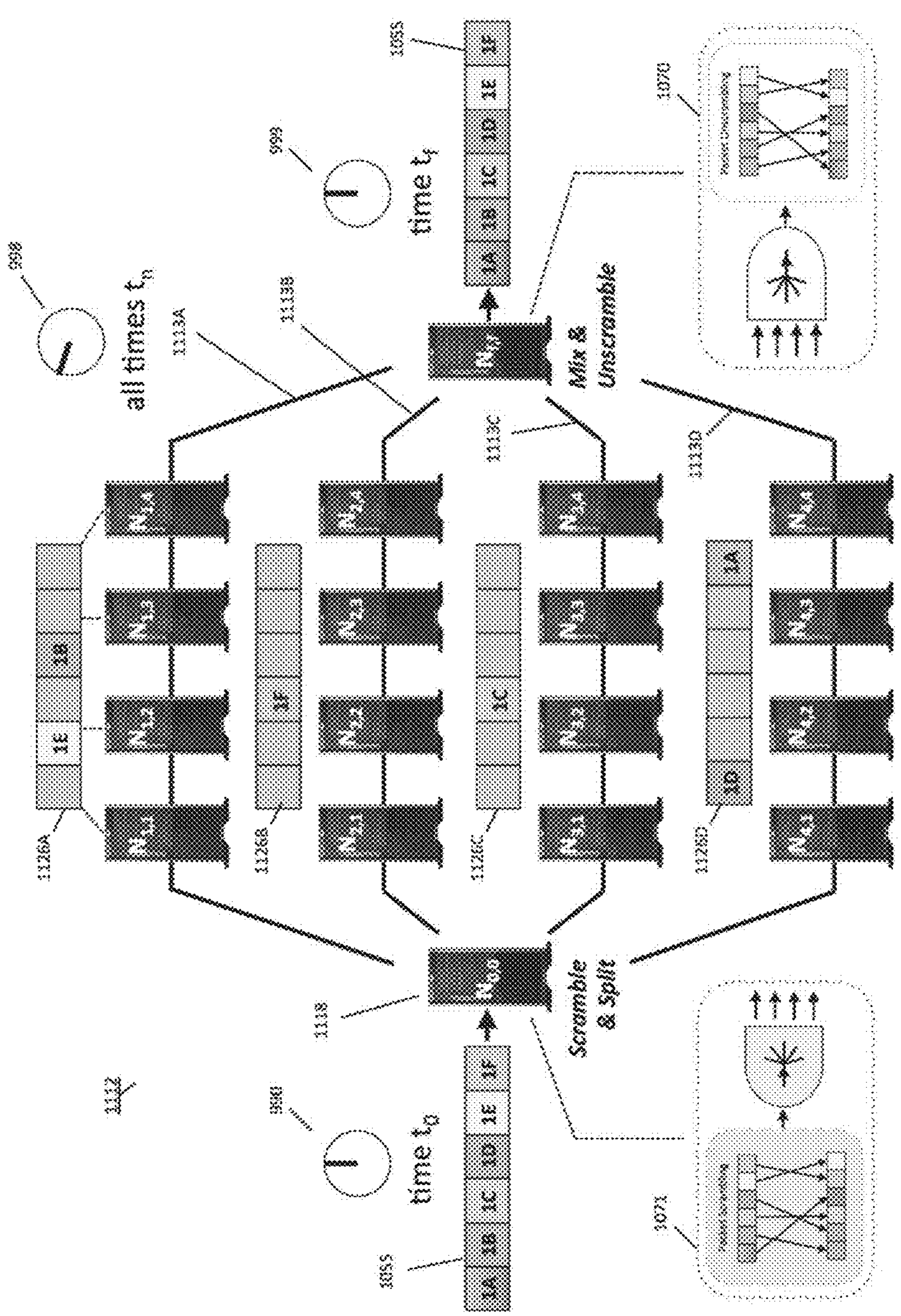

Multiroute transport may be combined in various ways with scrambling and encryption. An example of multiroute transport with no scrambling is illustrated in FIG. 69, where a network of communication servers 1118 transports data packet 1055 from communication node $N_{0,0}$ at time $t_0$ to communication node $N_{f,f}$ at time $t_f$. In transport 1112, communication node $N_{0,0}$ performs splitting operation 1106 sending data segments 1C and 1E in data packet 1125A on data route 1113A, sending data segment 1B in data packet 1125B on data route 1113B, sending data segment 1D in data packet 1125C on data route 1113C, and sending data segments 1A and 1F in data packet 1125C on data route 1113D. The sub-packets may comprise a mix of data and unrelated sub-packets or junk data. Because the sub-packets are not scrambled, the sequence of data segments 1C and 1E in data packet 1125A remain in sequential order, even if other data segments may be inserted in between or before or after them. Finally, in communication node $N_{f,f}$ mixing operation 1089 reconstructs the original data packet at time $t_f$. At all times $t_n$ between time $t_0$ and time $t_f$, the contents of data packets 1125A through 1125D remain constant.

A simple variant of the aforementioned multiroute transport with no scrambling is illustrated in FIG. 70, comprising multiroute transport with static scrambling, meaning incoming data packet 1055 is scrambled before being split and delivered over multiple routes in the network. Specifically, communication node $N_{0,0}$ performs scrambling and splitting operation 1071 instead of just performing splitting operation 1106 shown in FIG. 69. The resulting scrambled mixed data packets 1126A through 1126D, like in the prior example, are static and time invariant remaining unchanged at all times to while they independently traverse the network upon paths 1113A through 1113D respectively, until they reach the final communication node $N_{f,f}$ where they are merged back together and unscrambled using unscrambling and mixing operation 1070 to recover original data packet 1055. Compared to the prior example of FIG. 69, the only major difference in the data packets 1126A-1126D of FIG. 70 is that the packets are scrambled, i.e. the data segments they contain are not in the original sequential order. For example, in data packet 1126A, data segment 1E occurs before 1B and in data packet 1126D, data segment 1D occurs before 1A. A disadvantage of static packet communication is that, while it is not subject to simple packet sniffing, it does afford a cyber-pirate unchanging data to analyze. Nonetheless, because the data present in any one data packet traveling on any one route is incomplete, fragmented, scrambled and mixed with other unrelated data sources and conversations, it is still significantly superior to OTT communication over the Internet.

Figure 71A:
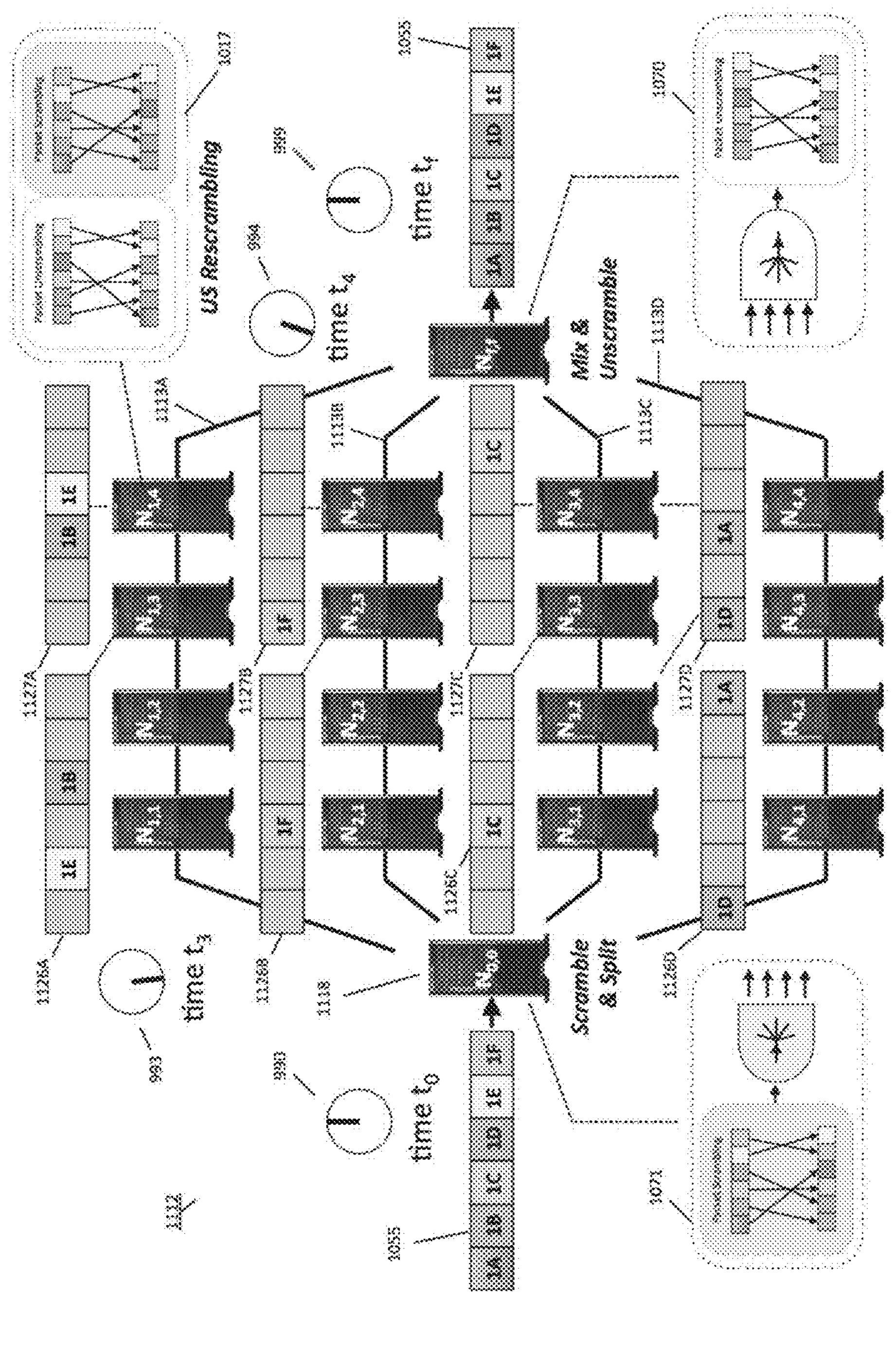
FIG. 71A is a schematic diagram showing dynamic multi-route scrambling.

An improvement to static scrambling is to employ dynamic scrambling shown in FIG. 71A where repeated packet scrambling, i.e. US re-scrambling operation 1017, changes the data segment order in the data packet as a data packet traverses the network, meaning a comparison of any data packet traversing a given route changes over time. For example, regarding the data packet traversing route 1113A, in data packet 1126A at time $t_3$ immediately after undergoing US re-scrambling operation 1017 in communication node $N_{1,3}$, data segment 1E is located in the second time slot and precedes data segment 1B located in the fourth time slot. At time $t_4$ after communication node $N_{1,4}$ performs US re-scrambling operation 1017, data packet 1127A has changed with data segment 1B located before 1E successively located in time slots three and four. Comparing data packet 1126D to 1127D, the position of data segments 1D and 1A change but the order remains unchanged. This method employs the technique of dynamically scrambling every data segment in a data packet, not just the data from a specific source or conversation. It is possible to vary a packet's length immediately after it is unscrambled and before it is scrambled again, e.g. by inserting or deleting junk data. In the example shown, however, the packet lengths remains fixed, with only their sequence changing.

As shown, the first communication node $N_{0,0}$ performs scramble and split operation 1071, the last communication node $N_{f,f}$ performs mix and unscramble operation 1070, and all the intervening communication nodes perform US re-scrambling operation 1017. In each case, the unscrambling operation relies on the time or the state of the incoming packet, and the scrambling operation utilizes the time or state of the outgoing data packet. In parallel multi-route transport, splitting occurs only once in communication node $N_{0,0}$ and mixing occurs only once, at the end of transport in communication node $N_{f,f}$. Methodologically, this sequence can be categorized as "scramble then split". In the embodiment of dynamic scrambling as shown in FIG. 71A, known herein as sequential or linear scrambling, no matter what the sequence, the prior operations must be undone in the inverse order in which they occurred, whereby the reordering of each data segments location in a data packet occurs algorithmically with no regard to what the content is or from whence it came. In this manner, the first communication nodes after splitting, namely communication nodes $N_{1,1}$, $N_{2,1}$, $N_{3,1}$, and $N_{4,1}$ all perform the same unscrambling operation to undo the impact of the original scrambling of scramble-then-split operation 1071, returning each data segment containing data to its original location before re-scrambling it. In the splitting process, the location of a packet remains in the same position where it was located originally with the unused slots filled with junk data. For example if data segment 1B is moved to the fifth position in the packet by scramble and split operation 1118, after splitting the packet containing data segment 1B will retain it in the fifth position. Unscrambling the packet will move data segment 1B back to the second slot where it belongs even if all the other slots are filled with junk data. The dislocation of junk data is irrelevant since the junk data packets will be removed, i.e. "de-junked" later in the data recovery process anyway. Once the position of a specific data segment is restored to its original slot by an unscrambling operation, it may be scrambled again moving it to a new position. The combination of restoring a data segment to its original position and then scrambling anew into a new position, means the "rescrambling" process comprises unscrambling then scrambling, hence its name US rescrambling 1017.

Figure 71B:
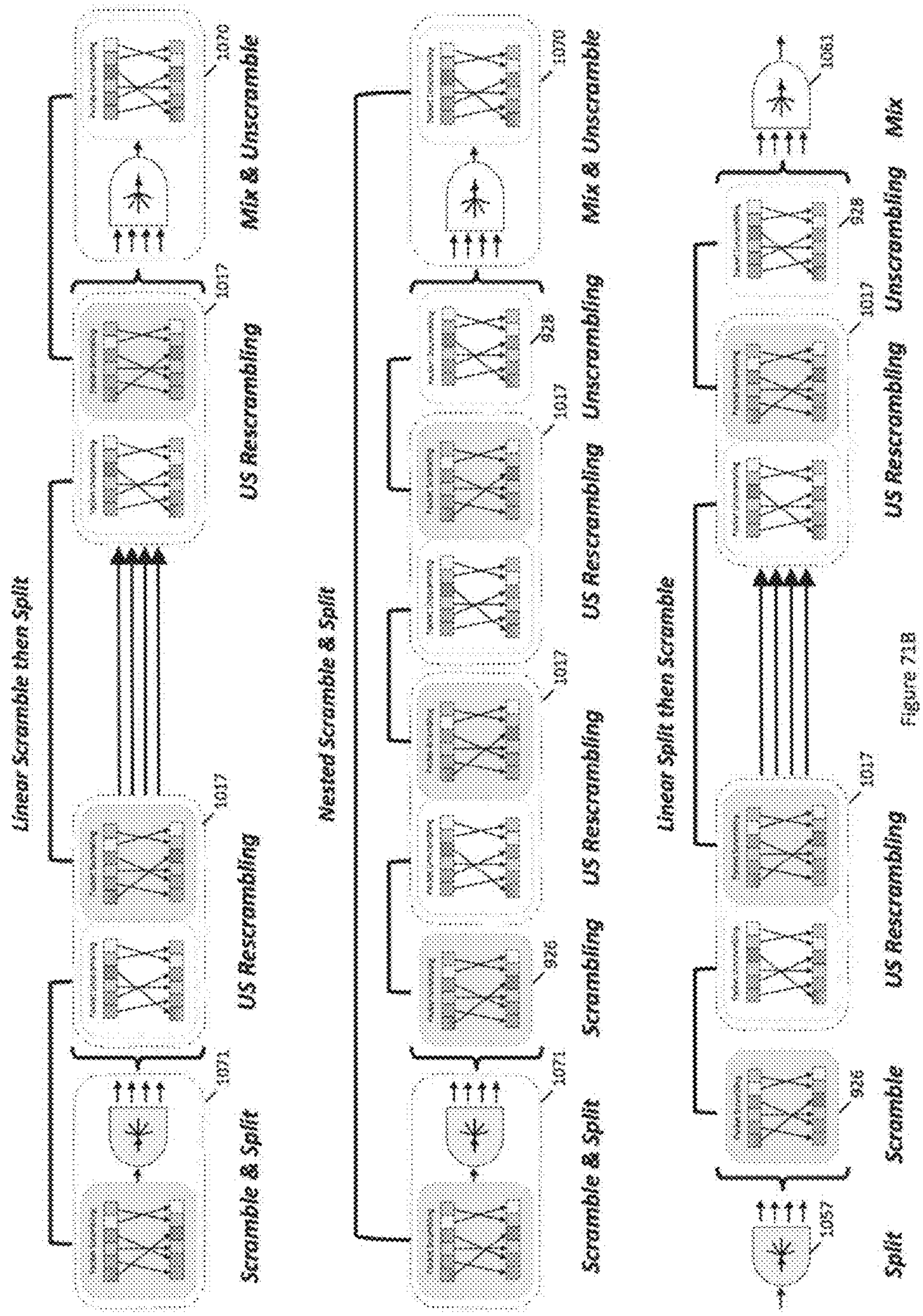
FIG. 71B is a schematic diagram depicting various combinations of scrambling and splitting.

A simplified description of the previously detailed "linear scramble then split" method shown in FIG. 71B is contrasted to two other alternate embodiments of the disclosed invention, referred to herein as "nested scramble then split" and "linear split then scramble". In the linear scramble then split method, successively and repeatedly scrambling and unscrambling every data packet refreshes the security of the data packet. As such, the scrambling first performed in scramble and split operation 1071 must be undone by US re-scrambling operation 1017 separately in each of the data paths, where the brackets symbolically represent multiple parallel paths or routes, meaning the time, state or numeric seed used to select and perform the pre-split scrambling operation in scramble and split operation 1071 is passed to the first communication node in every communication route so that unscrambling in US re-scrambling operation 1017 can be executed. Thereafter, each route separately scrambles and unscrambles the data packets traversing that route, where the US re-scrambling operation 1017 always employs the time, state, or numeric seed used to execute the last scrambling, then uses its current time or state to execute the new scrambling. In the last step, mix and unscramble operation 1070, the scrambled components are re-assembled in scrambled form and then finally unscrambled using the state or time when they were last scrambled to recover the original data.

In the "nested scramble & split" example also shown in FIG. 71B, scramble then split operation 1071 first scrambles the data packet at an initial time or state and then after splitting the data into multiple routes, each data path independently performs a second scrambling operation 926 unrelated to the first, without ever undoing the first scrambling operation. Since a scrambling operation is performed on an already scrambled data packet, the scrambling can be considered as "nested", i.e. one scrambling inside the other. In programming vernacular for nested objects or software code, the first scrambling as performed by scrambling and split operation 1071 comprises an "outer" scrambling loop while the second and all successive scrambling US re-scrambling operations 1017 represent an inner scrambling loop. This means the data traversing the network has been twice scrambled and must be unscrambled twice to recover the original the data. The final step of the inner scrambling loop comprises unscrambling operation 928, restoring each route's data packets into the same condition, i.e. the same data segment sequence, as immediately after packet splitting first occurred. The data packets are then reassembled into a single data packet and unscrambled using mix and unscramble operation 1070.

Figure 71C:
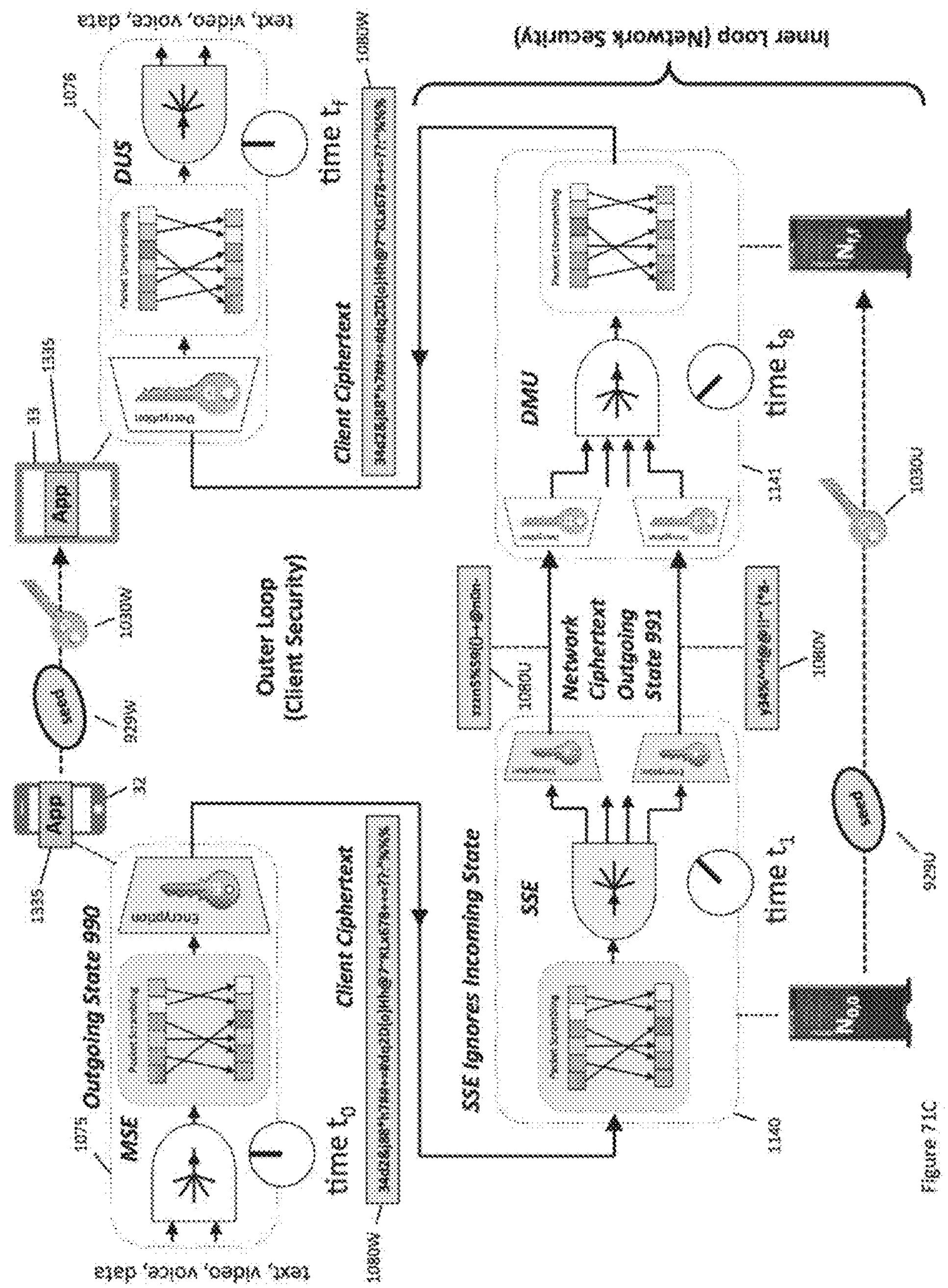
FIG. 71C is a schematic diagram depicting nested mixing, splitting, scrambling and encryption.

The same concept of nested operations can be used in performing nested splitting and mixing operations as shown in FIG. 71C. Within a client's SDNP application 1335, various sources of data including video, text, voice, and data files can be mixed, serialized, inserted with junk data, scrambled then encrypted by MSE operation 1075. The security credentials including key 1030W and seed 929W can be exchanged from the sending client cell phone 32 directly to the receiving client tablet 33, without using media nodes carrying the content. For example, this information could be sent to the receiver using a separate "signaling server" network (described later) or alternatively, since the seeds and keys do not contain useful information for outsiders, such information could even be forwarded to the receiving client over the Internet. This first operation occurring in the client's device or application represents the beginning of the outer loop used to realize client security independent from the SDNP network.

Once mixed, junked, scrambled and encrypted, the unreadable client ciphertext 1080W is next sent to the SDNP gateway server $N_{0,0}$ where it is once again processed using different shared secrets with different algorithms, states, and network specific security credentials such as seed 929U and key 1030U in preparation for transport through the SDNP cloud. This inner loop facilitates cloud-server security and is completely independent from the client's security loop. As part of the gateway SSE operation 1140 for incoming data packets, the data packet may be scrambled a second time, split into different sub-packets and encrypted into ciphertext 1080U and 1080V for multiroute or meshed transport.

Eventually the multiple sub-packets arrive at the destination gateway $N_{f,f}$ where they are processed by DMU operation 1141 to undo the effect of the initial gateway's splitting operation, i.e. DMU operation 1141 undoes the effects of SSE operation 1140 completing the inner security loop's function. As such, gateway $N_{f,f}$ undoes all network related security measures implemented by incoming gateway $N_{0,0}$ and restores the original file, in this case client ciphertext 1080W to the same condition as when as it entered the SDNP cloud.

But because this data packet was already mixed, scrambled and encrypted, the data packet comprising ciphertext 1080W exiting the SDNP gateway and being sent to the receiving client is still encrypted, un-interpretable by anyone but the receiving client's application 1335. The restored ciphertext once delivered to the client is then decrypted and unscrambled by DUS operation 1076 in accordance with the sending client's state 990 when it was created at time $t_0$ and finally split to recover various sources of data components including video, text, voice, and data files, completing the outer security loop.

So to thwart network subversion, i.e. where a cybercriminal posing as a SDNP network operator attempts to defeat the SDNP security from "inside" the network, the outer loop security credentials, i.e. shared secrets, seeds, keys, security zones, etc. are intentionally made different than that of the inner security loop.

In another embodiment of this invention also shown in FIG. 71B, in the process of "linear split then scramble" data is first split, then separately scrambled on each data route. Data splitting operation 1057 is followed by independent scrambling operation 926 realized and executed on a route-by-route basis. Once scrambled, the data packets traversing each route are successively re-scrambled by US re-scrambling operations 1017 where the incoming packet is unscrambling using the same time, state, or numeric seeds used by scrambling operation 926 to create it. Thereafter, each route separately scrambles and unscrambles the data packets traversing that route, where the US re-scrambling operation 1017 always employs the time, state, or numeric seed used to execute the last scrambling, then uses its current time or state to execute the new scrambling. The final step comprises unscrambling operation 928, restoring each route's data packets into the same condition, i.e. the same data segment sequence, as immediately after packet splitting first occurred. The data packets are then reassembled into a single unscrambled data packet using mixing operation 1061.

Figure 72:
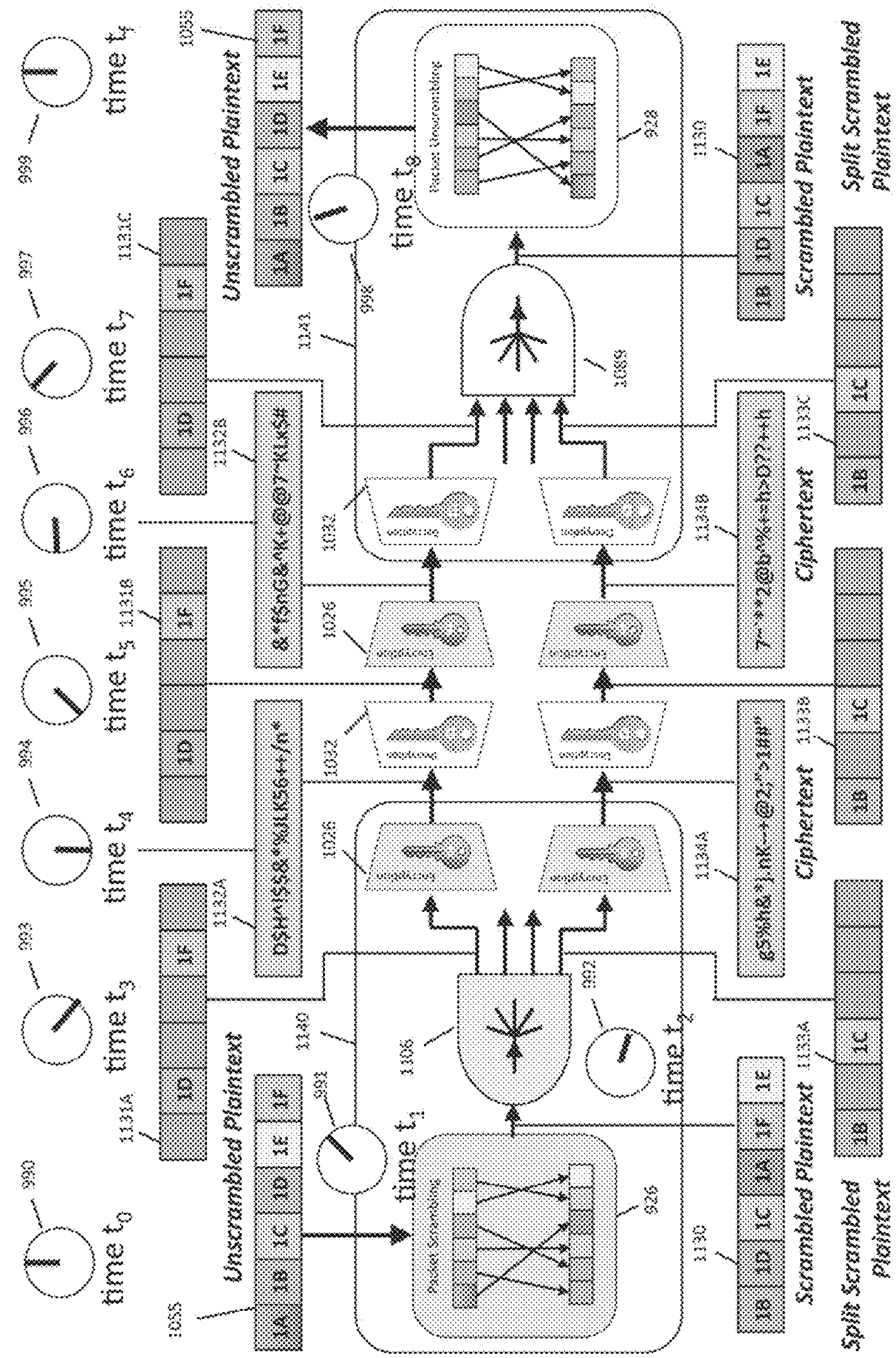
FIG. 72 is a schematic diagram showing static scramble then split & dynamically encrypt method.

Regardless of the sequence of mixing and scrambling employed, the processed data packets can also be subjected to static or dynamic encryption to facilitate an added degree of security. One example of this combination is shown in FIG. 72 comprising a method described as "static scrambling then splitting and dynamic encryption" comprising the following steps:

1. Starting with input unscrambled plaintext at time to
2. Scramble unscrambled plaintext 1055 using static packet scrambling 926 at time $t_1$ 3. Splitting scrambled plaintext 1130 into multiple split data packets 1131A, 1133A and others using splitting operation 1106 at time $t_2$
4. Directing split data packets 1131A, 1133A and others on multiple dissimilar non-overlapping parallel routes at time $t_3$ (note that only two of these parallel routes are shown in detail in FIG. 72)
5. Independently encrypting each data packet 1131A, 1133A and others at time $t_4$ using encryption 1026 including encryption keys and numeric seeds corresponding to state 994, resulting in ciphertext 1132A, 1134A, and others
6. Independently decrypting each data packet 1132A, 1134A, and others with state 994 information, including shared secrets, keys, numeric seeds, etc. using decryption 1032 resulting in unencrypted plaintext 1131B, 1133B, and others
7. Independently re-encrypting unencrypted plaintext 1131B, 1133B and others using encryption 1026 at time $t_6$ using encryption keys and numeric seeds corresponding to state 996 resulting in ciphertext 1132B, 1134B, and others
8. Independently decrypting each data packet 1132B, 1134B, and others with state 996 information, including shared secrets, keys, numeric seeds, etc. using decryption 1032 resulting in unencrypted plaintext 1131C, 1133C and others
9. Mixing unencrypted plaintext 1131C, 1133C and other at time $t_7$ using mixing operation 1089 to produce scrambled plaintext 1130
10. Unscrambling scrambled plaintext 1130 at time $t_8$ using state 991 corresponding to time $t_1$ when the scrambling first occurred to recover the original unscrambled plaintext 1055.

In the example shown, the initial data packet processing comprises the sequential application of scrambling, splitting and encryption shown as operation 1140. The final operation comprises decryption, mixing and unscrambling shown by operation 1141. All intermediate steps comprise re-encryption, which itself comprises both decryption and encryption.

Figure 73:
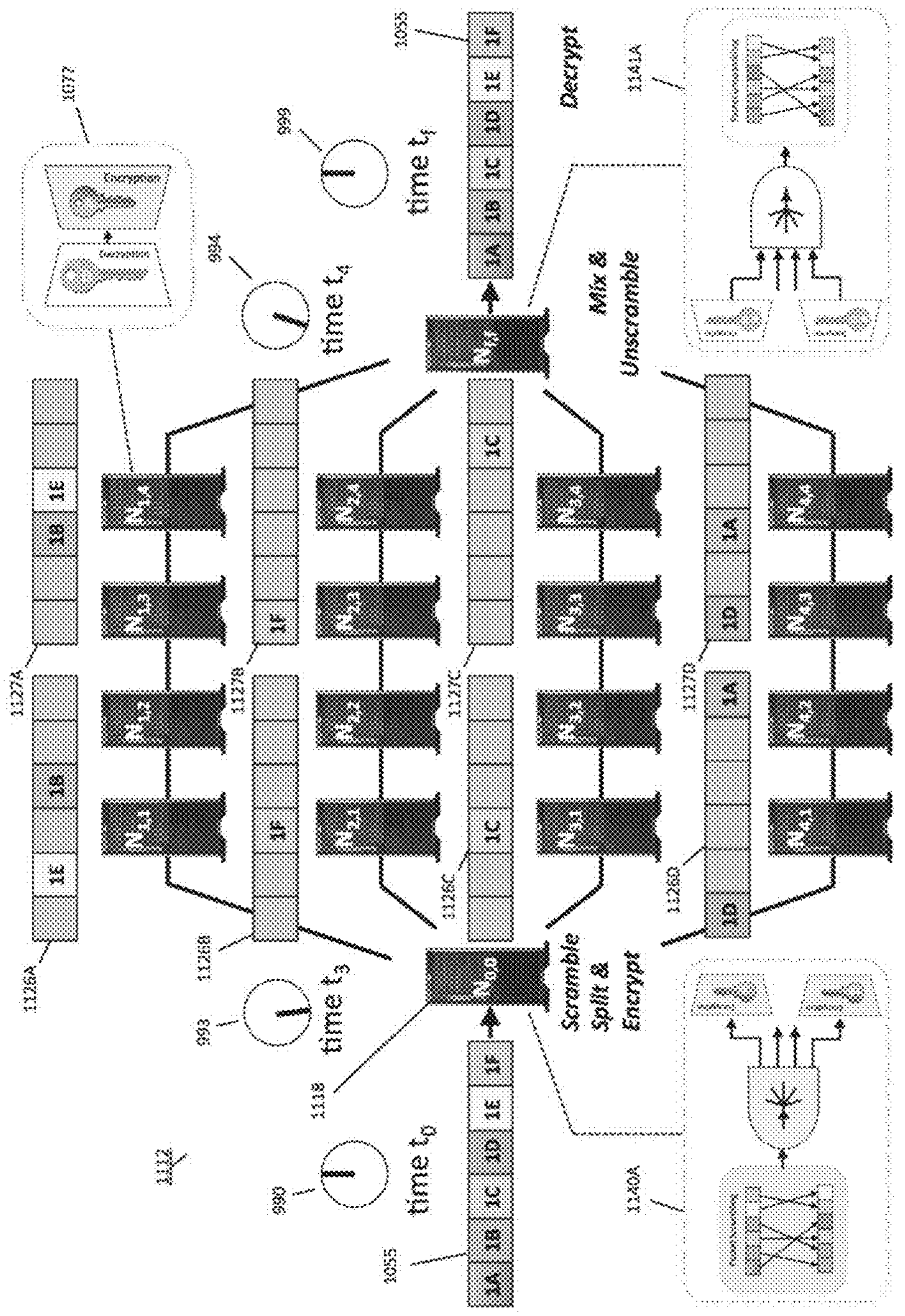

One example of the use of this method in multiroute transport is illustrated in FIG. 73 where communication node $N_{0,0}$ performs scrambling, splitting, encryption operation 1140A and communication node $N_{f,f}$, performs decryption, mixing and unscrambling operation 1141A, while all intermediate nodes perform re-encryption operation 1077. In multiroute transport in accordance with this invention, various combinations of static and dynamic scrambling and static and dynamic encryption are possible.

Figure 74:
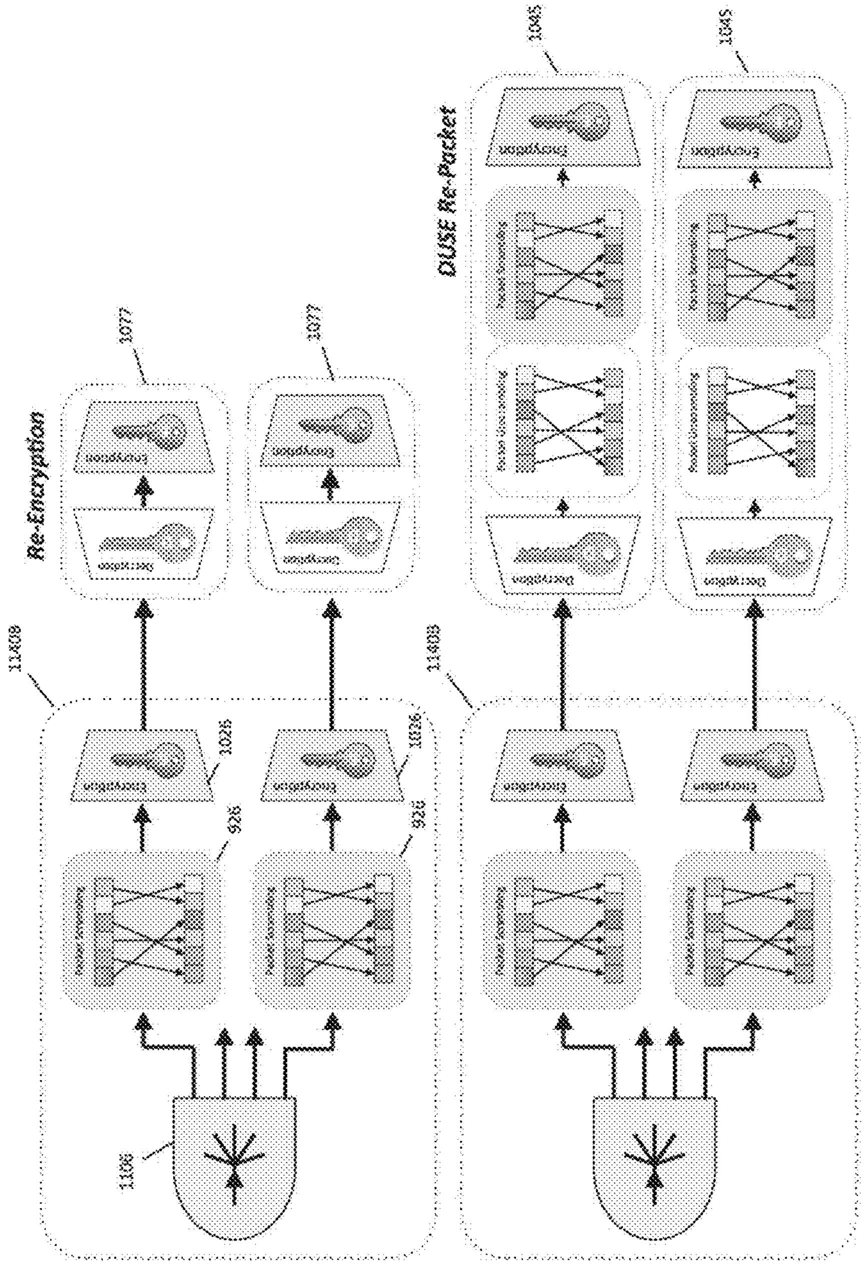

As an option to scramble, split and encrypt, in an alternate embodiment of this invention, data packets may be split then scrambled and encrypted using the split, scramble, encrypt operation 1140B shown in FIG. 74. In this method, the incoming data packet is first split in operation 1106. Subsequently, the data packets in each route are independently scrambled in operation 926 and encrypted in operation 1026. The resulting data packets may then independently be repetitively unencrypted then re-encrypted using re-encryption operation 1077 or may be unencrypted, unscrambled, re-scrambled, and re-encrypted using DUSE re-packet operation 1045.

In contrast to meshed routing described below, in the multi-route transport as exemplified in FIG. 69 through FIG. 73, each data packet traversing the network is processed only once by a given communication node and no communication node processes more than one data packet carrying related data or common conversation, i.e. data routes 1113A, 1113B, 1113C and 1113D are separate, distinct, and non-overlapping.

Meshed Routing

Returning again to FIG. 68A, meshed packet routing and transport disclosed herein is similar to parallel multiroute transport except that data packets traversing the network in different paths may cross paths in the same servers. In static meshed routing as disclosed herein, these data packets pass through a common server without interacting, as though the other conversation or communication data did not even exist. In dynamic meshed routing, however, upon entering a communication node, the data packets may interact with the other data packets concurrently present in the same server.

Using the previously described method of splitting and mixing, groups of data segments may be separated or removed from one data packet, combined with or merged into another data packet, and sent on a trajectory to a destination different from the one from whence it came. Meshed routing in accordance with this invention may utilize variable-length or fixed-length data packets. In variable-length packets, the number of data segments comprising a data packet may vary based on the amount of traffic traversing a given communication node. In fixed-length meshed transport, the number of data segments used to constitute a full data packet is fixed at some constant number or alternatively at some number of data segments adjusted in quantized integer increments.

The main difference between the use of variable- and fixed-length data packets is in the use of junk data as packet fillers. In variable length-data packets, the use of junk data is purely optional, mainly based on security considerations, or to exercise unused paths in order to monitor network propagation delays. The use of junk data in fixed-length data packets is mandatory because there is no way to insure that the proper number of data segments is available to fill the packets departing the communication node. As such, junk data is necessarily used constantly and continuously as packet filler to insure each data packet exiting the server is filled to the specified length before being sent onward across the network.

Figure 75:
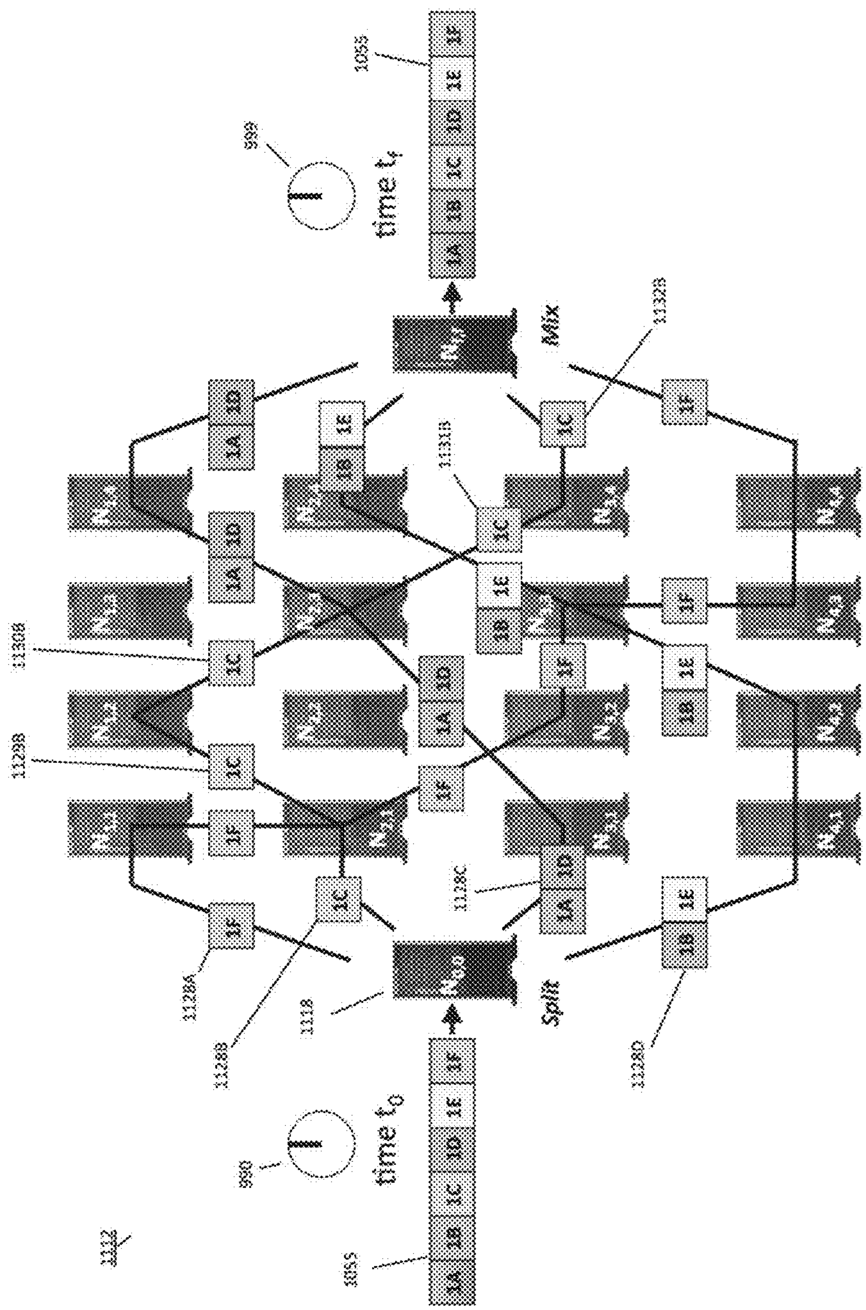

An example of static meshed data transport across communication network 1112 is illustrated in FIG. 75, where data packet 1055 is split by communication node $N_{0,0}$ at time $t_0$ into four packets of varying length, specifically data packet 1128A comprising data segment 1F, data packet 1128B comprising data segment 1C, data packet 1128C comprising data segments 1A and 1D, and data packet 1128D comprising data segments 1B and 1E. The data segments shown may be combined with other data segments from other data packets and conversations, also of variable length. Data segments from other conversations have been intentionally left out of the illustration for clarity's sake.

During static transport the data packet's content, i.e. the data segments it contains, remains unchanged as it traverses the network. For example, data packet 1128A, comprising data segment 1F, traverses communication nodes in sequence from communication node $N_{0,0}$ first to communication node $N_{1,1}$ then on to communication nodes $N_{2,1}$, $N_{3,2}$, $N_{3,3}$, $N_{4,3}$, and $N_{4,4}$, before finally being reassembled with packets 1128B, 1128C and 1128D in final communication node $N_{f,f}$ to recreate data packet 1055 at time $t_f$. In similar fashion, data packet 1128C, comprising data segments 1A and 1D, traverses communication nodes in sequence from communication node $N_{0,0}$ first to communication node $N_{3,1}$ then on to communication node $N_{2,3}$, and communication node $N_{1,4}$, before finally being reassembled with packets 1128A, 1128B and 1128D in final communication node $N_{f,f}$ at time $t_f$. During static meshed transport, multiple data packets pass through common servers without mixing or interacting. For example, data packets 1128A and 1128B both pass through communication node $N_{2,1}$, data packets 1128B and 1128C both pass through communication node $N_{2,3}$, and data packets 1128A and 1128D both pass through communication node $N_{3,3}$ without disturbing one another, exchanging content, or swapping data segments.

Since the data paths may be of different lengths and exhibit different propagation delays, some data packets may arrive at final communication node $N_{f,f}$ before others. In such instances, in accordance with this invention, the data packets must be held temporarily in communication node $N_{f,f}$ until the other related data packets arrive. And while the drawing shows that the final assembly and recovery of original data packet 1055 occurs in communication node $N_{f,f}$, in practice the final packet reassembly, i.e. mixing, can occur in a device such as a desktop, notebook, cell phone, tablet, set top box, automobile, refrigerator, or other hardware device connected to the network. In other words, in regards to meshed transport, there is no distinction between a communication node and a device connected to a communication node, i.e. communication node $N_{f,f}$ could be considered a desktop computer instead of being a true high-capacity server. The connection of a device to the disclosed SDNP cloud, i.e. the last-mile connection, is discussed in further detail later in this application.

Figure 76:
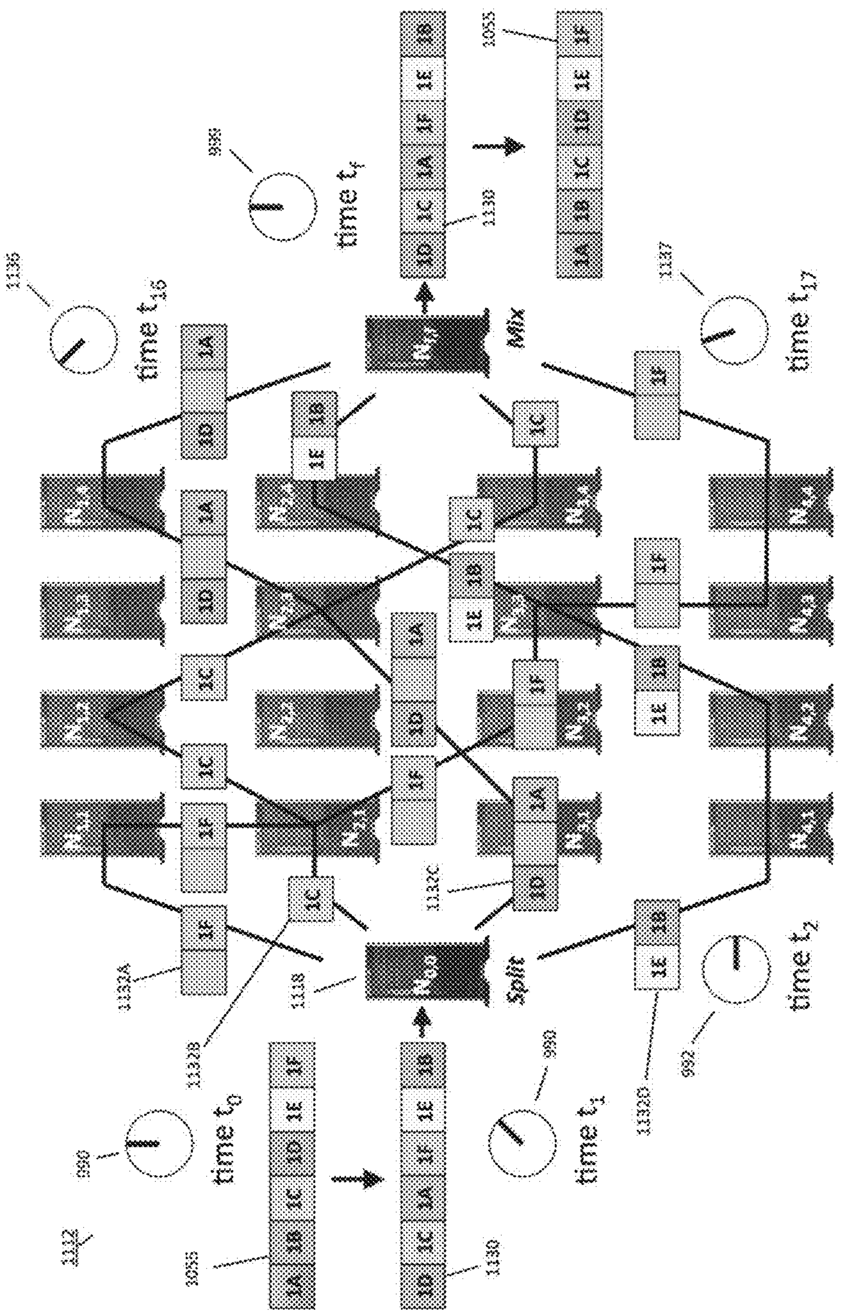

The aforementioned static routing can be merged with any of the aforementioned SDNP methods as disclosed, including scrambling, encryption, or combinations thereof. For example, in FIG. 76, variable-length static meshed routing is combined with static scrambling. As shown, at time $t_1$ unscrambled data packet 1055 is converted into scrambled plaintext data packet 1130, which is then split by communication node $N_{0,0}$ and then the split packets mixed with junk data are sent across network 1112. Routing is similar to the prior example except that the data segments are intentionally disordered and mixed with junk data segments before routing. For example, data packet 1132C comprising data segments 1D and 1A separated by a intervening junk packet traverses communication nodes in sequence from communication node $N_{0,0}$ first to communication node $N_{3,1}$ then on to communication nodes $N_{2,3}$, $N_{3,2}$, and $N_{1,4}$, before finally being reassembled with packets 1128A, 1128B and 1128D in final communication node $N_{f,f}$ to recreate data packet 1055 at time $t_f$. In similar fashion, data packet 1132D comprising data packets 1E and 1B in inverse order traverses communication nodes in sequence from communication node $N_{0,0}$ first to communication node $N_{4,1}$ then on to communication nodes $N_{4,2}$, $N_{3,3}$, and $N_{2,4}$, before finally being reassembled with packets 1128A, 1128B and 1128C in final communication node $N_{f,f}$ at time $t_f$. In this final node, during mixing a de-junk operation is performed removing junk data to produce original scrambled data 1130. After unscrambling, the original data 1055 is recovered.

Figure 77A:
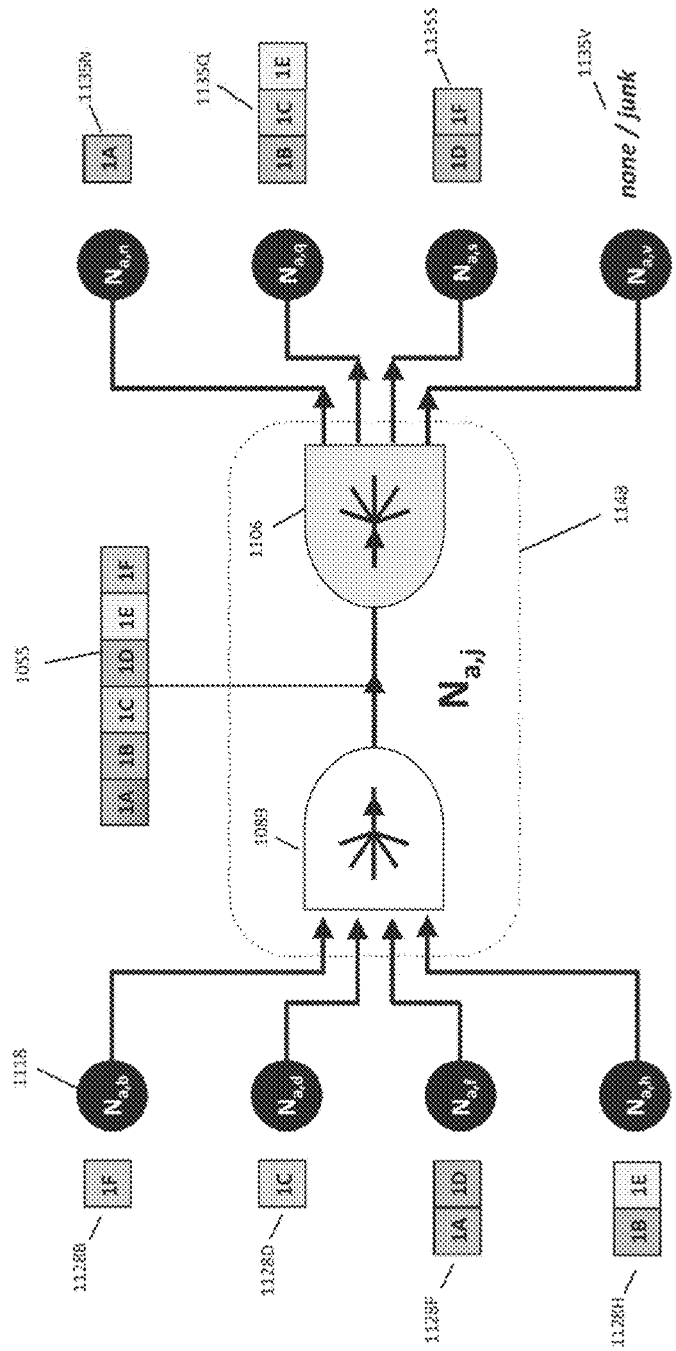

To implement dynamic meshed transport in accordance with the invention disclosed herein, packets must be processed to change their content and direction within each communication node processing a packet. This process involves merging incoming data packets into a single long data packet, or alternatively utilizing a data buffer containing the same sub-packets as if the long data packet was created, then splitting these packets into different combinations and sending those packets to different destinations. The process may employ variable- or fixed-length packets as described previously. FIG. 77A shows elements of a SDNP communication network including communication nodes $N_{a,b}$, $N_{a,d}$, $N_{a,f}$, and $N_{a,h}$, all in network "A" sending corresponding variable length data packets 1128B, 1128D, 1128F and 1128H respectively to communication node $N_{a,j}$ that performs mixing operation 1089, assembling the packets into either short or long data packet 1055. Packet 1055 is then split, using split operation 1106, in communication node $N_{a,j}$ to create new data variable length data packets 1135N, 1135Q, and 1135S are sent to communication nodes $N_{a,n}$, $N_{a,q}$ and $N_{a,s}$, respectively. No data or junk data 1135V is sent to communication node $N_{a,v}$. In each case, the length of the incoming packets is variable and the packets may contain junk data or data from other communications, conversations or communiqués not shown. As shown, the combination of mixing operation 1089 and splitting operation 1106 is performed by communication node $N_{a,j}$ to facilitate dynamic meshed routing utilizing data mixing and splitting operation 1148. In a manner explained below, the newly split packets 1135N, 1135Q, 1135S and 1135V (assuming the latter contains junk data) and their routing are determined either by dynamic instructions sent to communication node $N_{a,j}$ by the SDNP network or by using a predefined algorithm or instruction set in the absence of such incoming command and control signals.

In order to process the incoming packets, i.e. mix them, then split them into new packets of different combinations, node $N_{a,j}$ must receive instructions before the data arrives telling the node how to identify the data packets to be processed and what to do with them. These instructions may comprise fixed algorithms stored locally as a shared secret, i.e. a predefined algorithm or instruction set, or the sequence can be defined explicitly in a command and control "dynamic" instruction sent to the node in advance, of the data, ideally from another server controlling routing but not on a server carrying data. If the instructions of what to do to the incoming data are embedded within the data stream itself, i.e. part of the media or content, the routing is referred to herein as "single-channel" communication. If the data packet routing is decided by another server and communicated to the media server, the data routing is referred to as "dual-channel" (or possibly tri-channel) communication. The operational details of single- and dual/tri-channel communication are described in greater detail later in the application.

Regardless of how the instructions are delivered, the media node must recognize the incoming data packets to know the instruction that pertains to a specific data packet. This identifying information or "tag" operates like a zip code or a courier package routing bar code to identify the packets of interest. The incoming data packets 1128B, 1128D, 1128F, and 1128H shown in FIG. 77A, however, only represent the audio or textual content of the packet, not the identifying tags. The process of using tagged data present within a packet header to identify each specific data packet and to determine how incoming data packets are to be mixed was described previously for FIG. 67I. Specific examples of tag and routing information contained within the data packets are discussed further later in the application. Once node $N_{a,j}$ has been informed what data packets to look for and what algorithm to use in mixing operation 1089 and splitting operation 1106, the data can be processed.

Figure 77B:
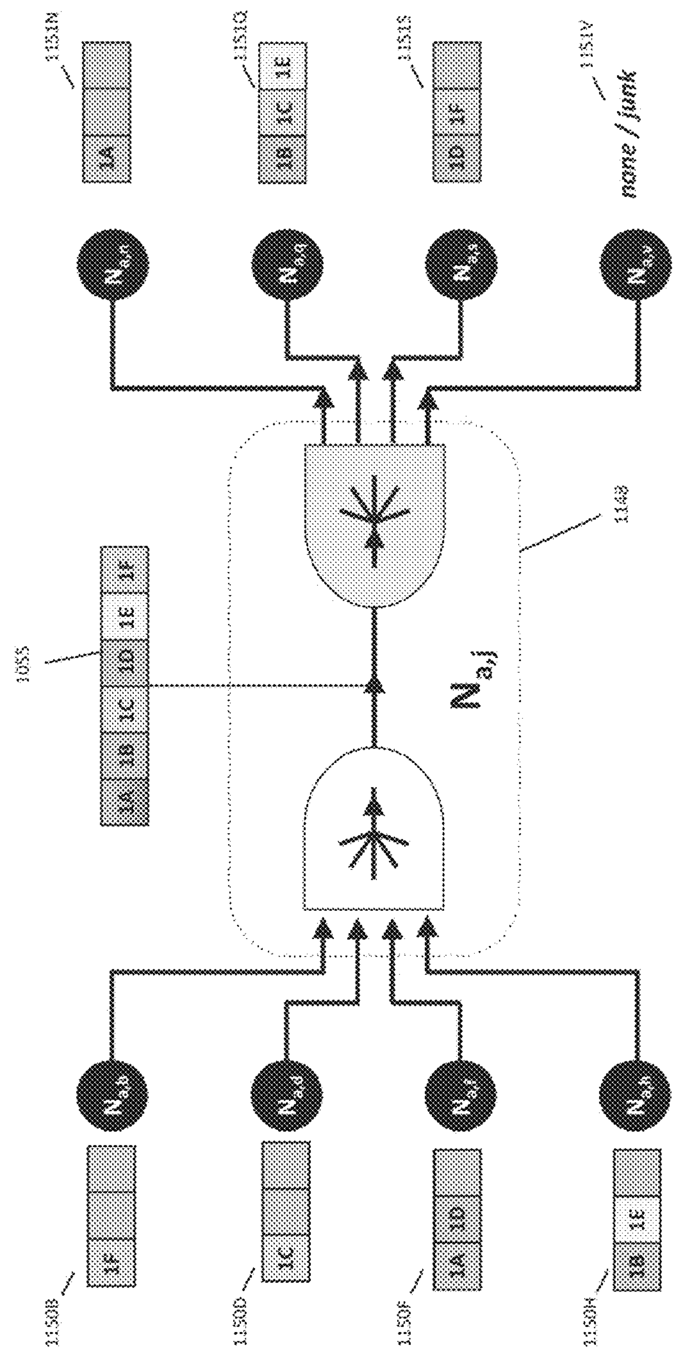

The fixed-length data packet equivalent of the same operation is shown in FIG. 77B, where communication nodes $N_{a,b}$, $N_{a,d}$, $N_{a,f}$, and $N_{a,h}$, all in network "A" send corresponding fixed-length data packets 1150B, 1150D, 1150F and 1150H, respectively, to communication node $N_{a,j}$ that in turn performs mix and split operation 1148 to create new fixed length data packets 1151N, 1151Q, and 1151S, sent to communication nodes $N_{a,h}$, $N_{a,q}$ and $N_{a,s}$ respectively. No data or junk data 1151V is sent to communication node $N_{a,v}$. In each case, the length of the incoming packets is fixed and necessarily contains junk data fillers or data from other conversation of communiqués not shown to maintain data packets of fixed lengths, i.e. containing a prescribed number of data segments.

Figure 77C:
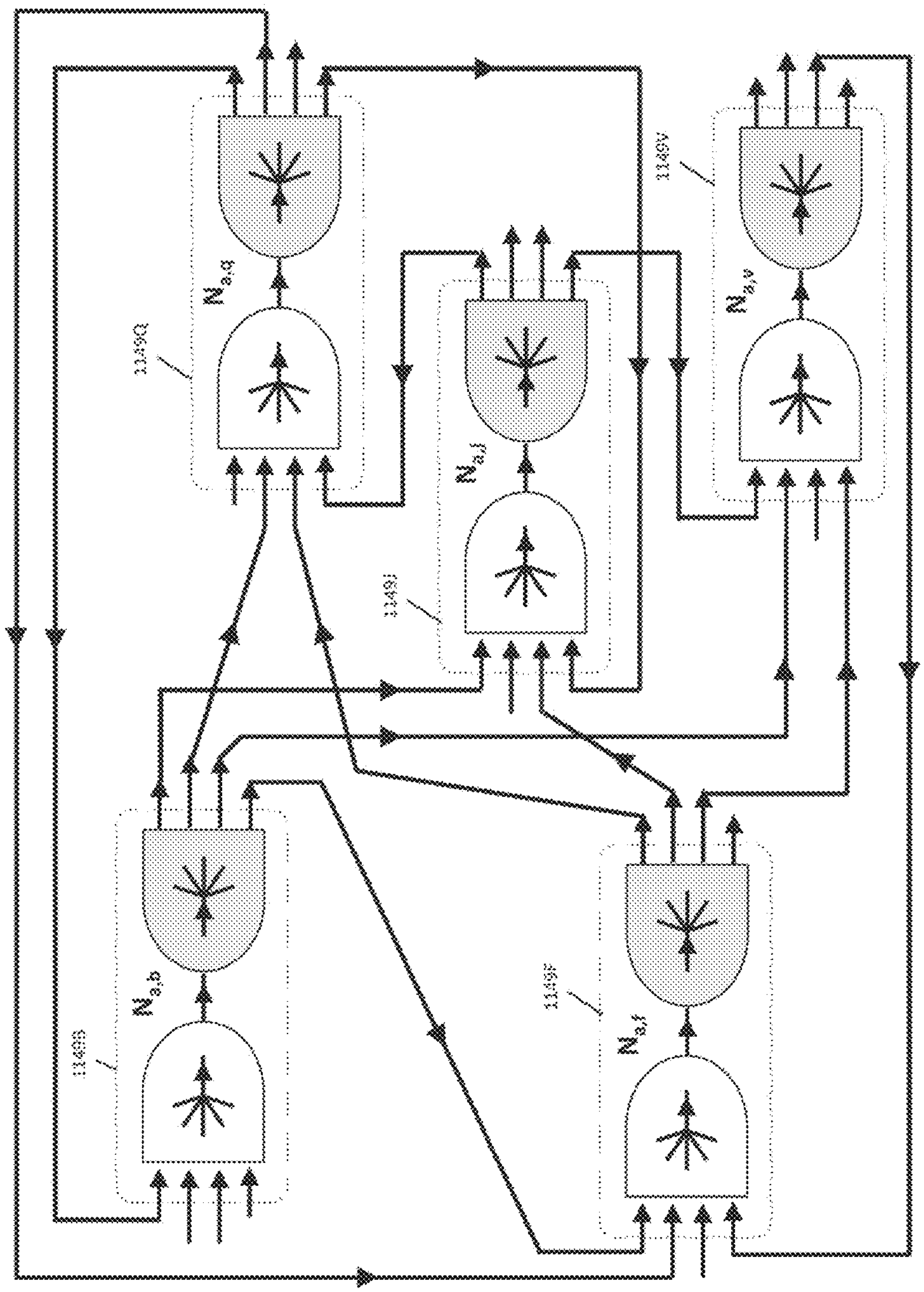

The interconnection of servers as described in network Layer-3 protocol comprises a myriad of connections, each communication node output connected to the input of another communication node. For example, as shown in FIG. 77C, the outputs of communication node $N_{a,b}$ performing mixing and splitting operation 1149B are connected to the inputs of communication nodes $N_{a,j}$, $N_{a,q}$, $N_{a,v}$, and $N_{a,f}$. The outputs of communication node $N_{a,q}$ performing mixing and splitting operation 1149Q are connected to the inputs of communication nodes $N_{a,b}$, $N_{a,j}$ and $N_{a,f}$ and another communication node not shown in the illustration. In similar fashion, the outputs of communication node $N_{a,f}$ performing mix and splitting operation 1149F are connected to the inputs of communication nodes $N_{a,q}$, $N_{a,j}$ and $N_{a,v}$ and another communication node not shown in the illustration; the outputs of communication node $N_{a,j}$, performing mixing and splitting operation 1149J, are connected to the inputs of communication nodes $N_{a,q}$, and $N_{a,v}$ along with other communication nodes not shown in the illustration; and the outputs of communication node $N_{a,v}$ performing mixing and splitting operation 1149V are connected to the inputs of communication nodes $N_{a,f}$, and other communication nodes not shown in the illustration.

Since the output-to-input connections are network descriptions and not simply PHY layer 1 connections or circuits, these network connections between devices can be established or dissolved on an ad hoc basis for any device having a Layer 1 PHY connection and a Layer 2 data link to the aforementioned network or cloud. Also, since the connections represent possible network communication paths and not fixed, permanent electrical circuits, the fact that the output of communication node $N_{a,b}$ is connected to input of communication node $N_{a,q}$ and the output of communication node $N_{a,q}$ is connected to input of communication node $N_{a,b}$ does not create feedback or a race condition as it would in electrical circuits.

In fact, any computer electrically connected to the network can be added or removed as a communication node dynamically and on an ad hoc basis using software. Connecting a computer onto a network involves "registering" the communication node with the name server or any server performing the name server function. As described in the background section of this application, in the Internet the name server is a network of computers identifying their electronic identity as an Internet address using IPv4 or IPv6 formats. The top-most Internet name server is the global DNS or domain name servers. Some computers do not use a real Internet address, but instead have an address assigned by a NAT or network address translator.

In a similar manner, the disclosed secure dynamic network and protocol utilizes a name server function to keep track of every device in SDNP network. Whenever a SDNP communication node is launched, or in computer vernacular, whenever a SDNP node's software is booted up, the new device dynamically registers itself onto the network's name server so that other SDNP nodes know it is online and available for communication. In tri-channel communication, the SDNP name servers are separate from the servers used for command and control, i.e. the signaling servers, and from the media servers carrying the actual communication content. In single-channel communication, one set of servers must perform both the name server task as well as control routing and carry the content. Thus, the three types of SDNP systems described herein—single-channel, dual-channel and tri-channel—are distinguished by the servers used to perform the transport, signaling and naming functions. In single-channel systems, the communication node servers perform all three functions; in dual-channel systems, the signaling and naming functions are separated from the transport function and are performed by signaling servers; and in tri-channel systems, the naming function is separated from the transport and signaling functions and is performed by the name servers. In practice, a given SDNP network need not be uniform but may be subdivided into portions that are single-channel, portions that are dual-channel, and portions that are tri-channel.

Any new SDNP communication node coming online registers itself by informing the name server of its SDNP address. This address is not an Internet address, but an address known only by the SDNP network, and cannot be accessed through the Internet, because like a NAT address, the SDNP address is meaningless to the Internet, despite following the Internet protocol. As such, communication using the disclosed secure dynamic network and protocol represents "anonymous" communication because the IP addresses are unrecognizable on the Internet, and because only the last SDNP address and next SDNP address, i.e. the packet's next destination, are present within a given packet.

An important embodiment of the SDNP network is its ability to modulate the total available bandwidth of the cloud automatically as traffic increases or declines within any given hour of the day. More SDNP communication nodes are automatically added into the network as traffic increases and dropped during slow minimizing network cost without compromising stability or performance.

Figure 77D:
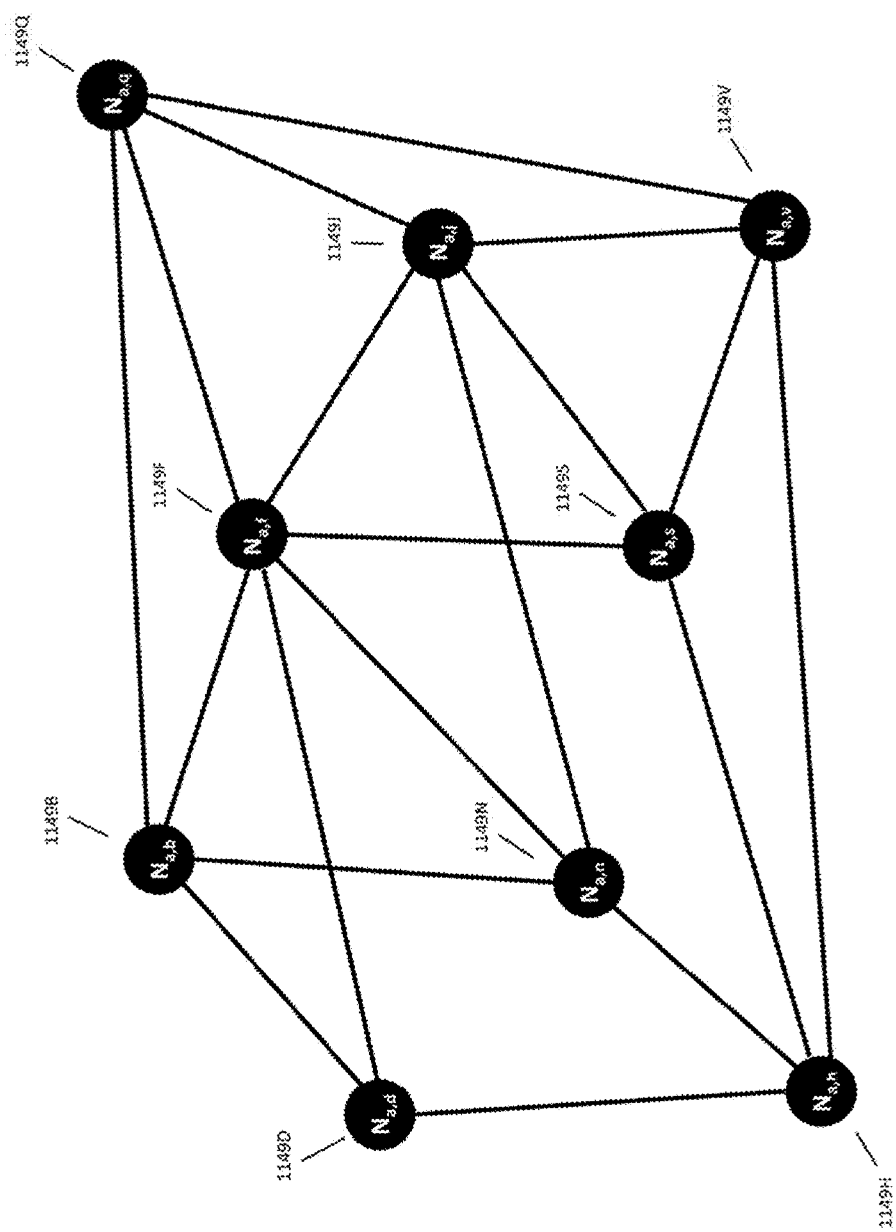

This feature means the bandwidth and expanse of the SDNP network disclosed herein can also be dynamically adjusted to minimize operating costs, i.e. not paying for unused compute cycles on an unutilized node, while being able to increase capability as demand requires it. The advantages of the software-implemented or "soft-switch" embodiment of the SDNP network sharply contrasts with the fixed hardware and high cost of hardware-implemented packet-switched communication networks still pervasive today. In the soft-switch realized network, any communication node loaded with the SDNP communication software and connected to the network or Internet can be added into the SDNP as needed, as shown in the network graph of FIG. 77D, where computer servers 1149D, 1149B, 1149F, 1149Q, 1149H, 1149N, 1149J, 1149S, and 1149V can be added as corresponding communication nodes $N_{a,q}$, $N_{a,d}$, $N_{a,b}$, $N_{a,f}$, $N_{a,q}$, $N_{a,h}$, $N_{a,n}$, $Na_j$, $N_{a,s}$, and $N_{a,v}$, respectively as the need arises for traffic in the node or communication across its connections.

So each link in the SDNP cloud can be viewed as an always-on physical connection of the Layer 1 PHY with corresponding a data link Layer 2, combined with a Layer 3 network connection that is established only when the SDNP launches, i.e. activates, a new communication node as needed. So the soft-switch based SDNP cloud itself is adaptive and dynamic, changing with demand. Unlike peer-to-peer networks where data is relayed through any device or computer, even of unknown bandwidth and reliability, each SDNP communication node is a prequalified device, loaded with the SDNP soft-switch software and fully authorized to join the SDNP cloud and carry data using its prescribed secure communication protocol, which comprises the informational content (such as a shared secret) plus the syntax, e.g. a specific format of header. Shared secrets describe algorithms, seed generators, scrambling methods, encryption methods, and mixing methods but do not stipulate the format of an entire SDNP data packet. Security settings, i.e. the settings being used at a particular time and for specific communications, are a type of shared secrets, but shared secrets also include the entire list of algorithms even ones not in use. Since the software is encrypted and the algorithm and shared secrets are processed dynamically, even in the event the SDNP code is hosted on a public cloud such as Amazon or Microsoft, the server operators have no means by which to monitor the content of data traffic on the SDNP communication node other than the total data volume being transported.

As a natural extension of the dynamic network, new SDNP clients such as a cell phone, tablet, or notebook, also register automatically with the SDNP name server or gateway whenever they are turned on. So not only the SDNP cloud but the number of clients available for connection adjusts automatically, accurately reflecting the number of network connected and active users at any given time.

Scrambled or Encrypted Meshed Routing

To support dynamic autonomous capability, each SDNP communication node executes a prescribed combination of data mixing and splitting, scrambling and unscrambling, encryption and decryption concurrently to simultaneously support multiple conversations, communiqués and secure sessions. In the soft-switch embodiment of the SDNP network, all functions implemented and the sequence of these operations can be entirely configured through software-based instructions as defined through shared secrets, carried by the data packet, or defined by a parallel signal channel for command and control, separate and distinct from the SDNP communication nodes used for carrying media. While a large number of permutations and combinations are possible, the examples shown herein are intended to represent the flexibility of SDNP-based communication and not to limit the application of the various SDNP functions described to a specific sequence of data processing steps. For example scrambling can precede or follow mixing or splitting, encryption can occur first, last or in between, etc.

Figure 78A:
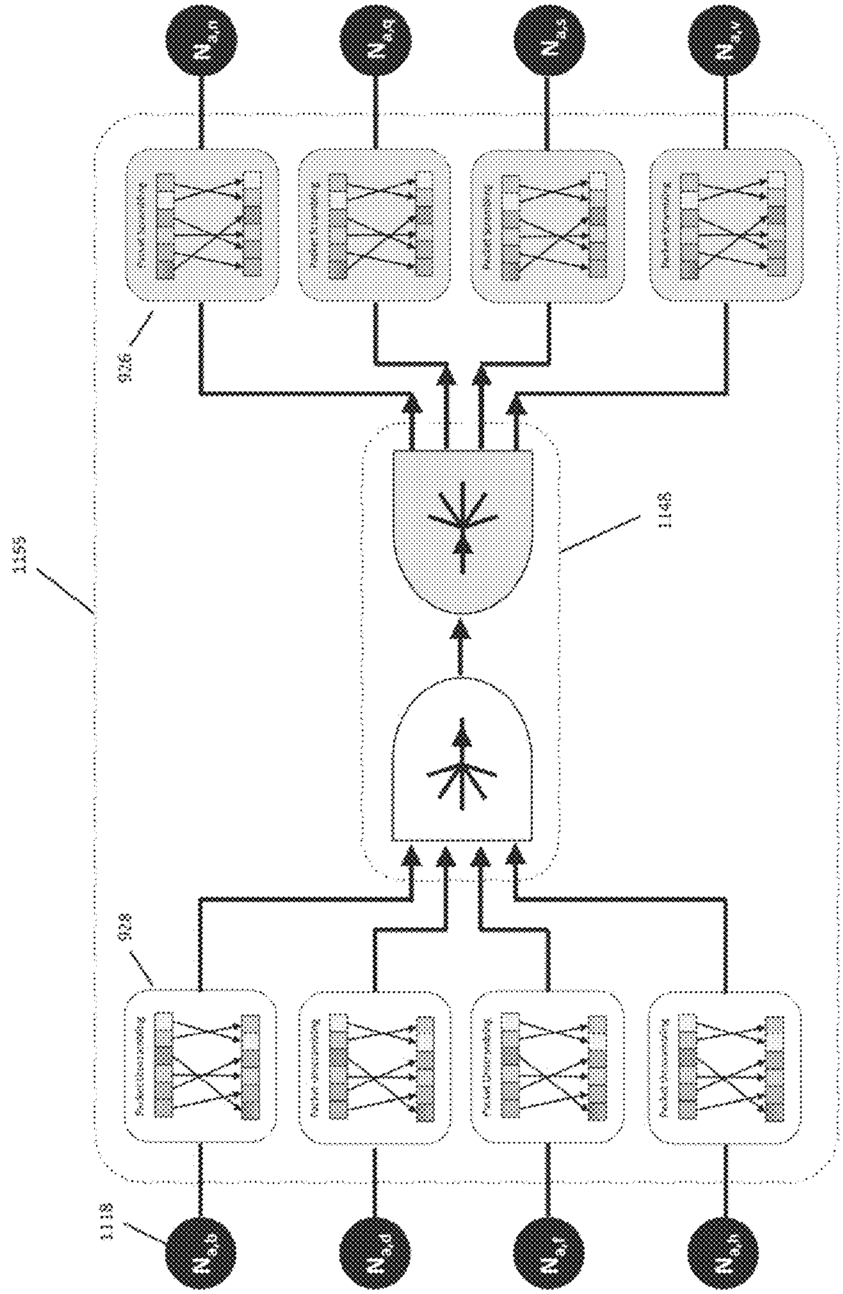
Figure 78B:
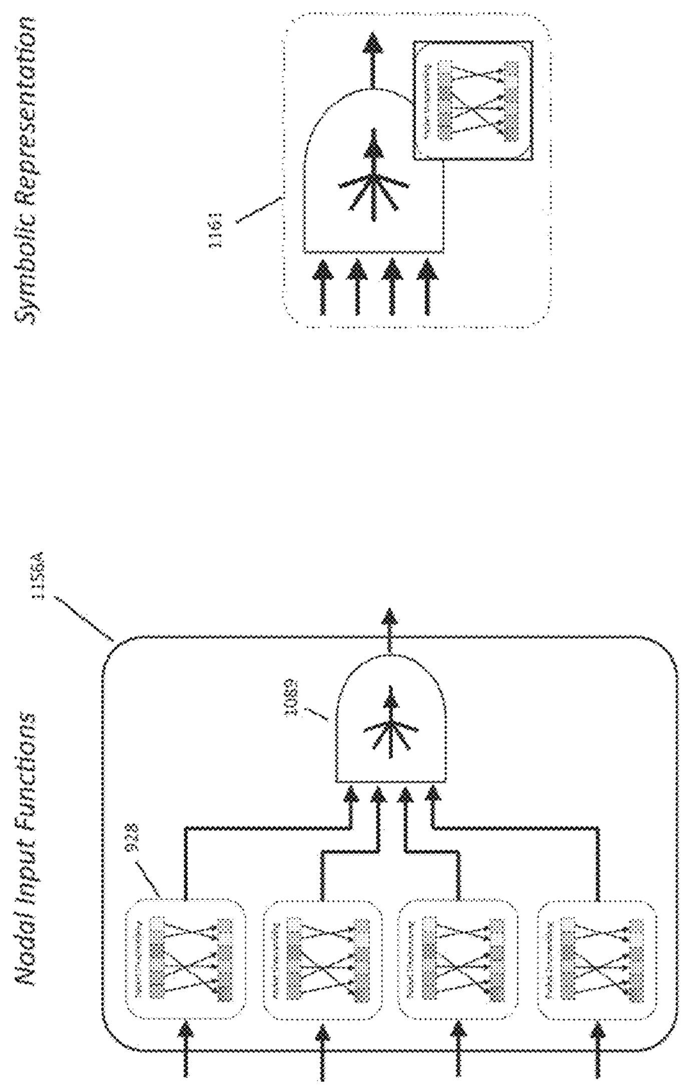

One such operation, re-scrambled mixing and splitting operation 1155 shown in FIG. 78A performs a sequence of SDNP specific functions on multiple incoming data packets from communication nodes $N_{a,b}$, $N_{a,d}$, $N_{a,f}$ and $N_{a,h}$ comprising unscramble operation 928 performed on each incoming data packet, mixing and then splitting the data packets using mixing and splitting operation 1148, followed by re-scrambling the new data packets using scrambling operation 926, and forwarding these packets on to the meshed communication network. As shown in FIG. 78B, the sequence of performing multiple independent unscrambling operations 928 on each input followed by mixing operation 1089 together comprises "unscrambled mixing of meshed inputs" operation 1156A. For convenience sake, the sequence may be represented symbolically by unscramble and mix operation 1161.

Figure 78C:
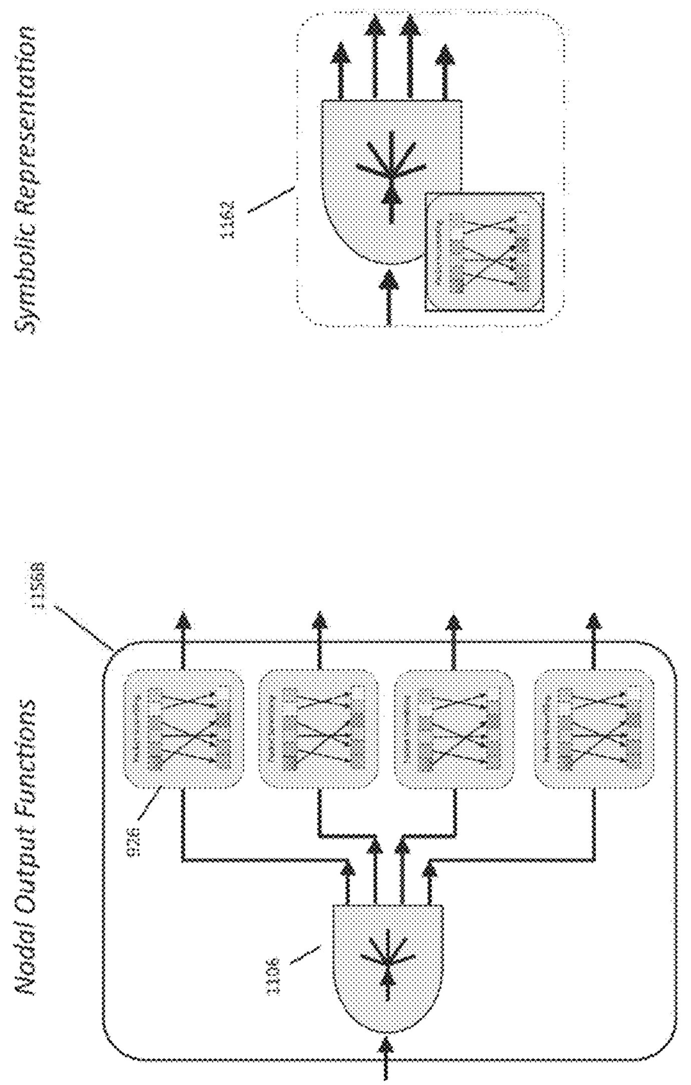
Figure 78D:
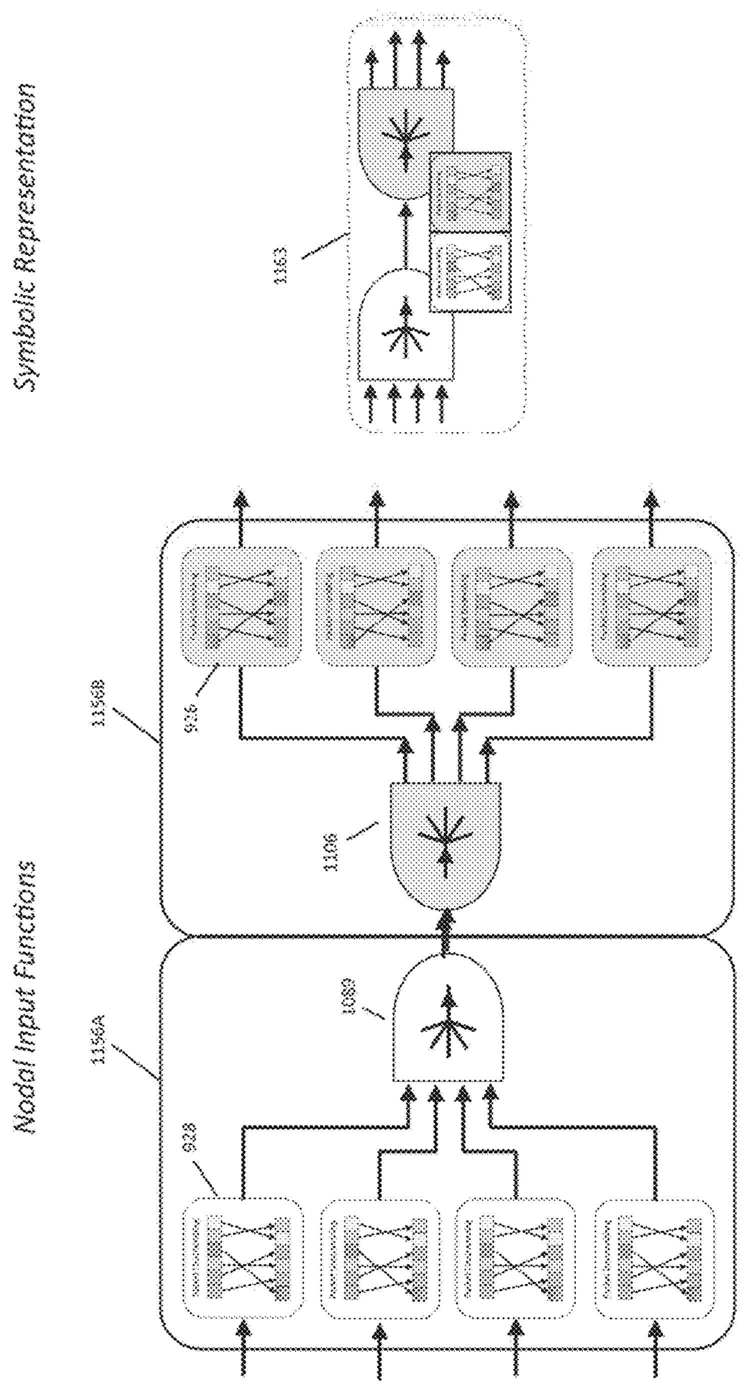

The inverse of the unscramble and mix operation, the "split and scramble operation" 1156B for meshed outputs, illustrated in FIG. 78C, comprises the sequence of splitting a data packet with splitting operation 1106 followed by performing multiple independent scrambling operations 926 for each output. For convenience sake, the sequence may be represented symbolically by split and scramble operation 1162. As shown in FIG. 78D, the sequential combination of the two—combining unscrambled mixing of meshed inputs operation 1156A followed by the split and scramble operation 1156B for meshed outputs comprises the "re-scramble and remix" operation for meshed transport shown symbolically as operation 1163.

The application of the aforementioned unscrambled mixing of meshed inputs operation 1161 followed by the split and scramble operation 1162 for meshed outputs is shown in FIG. 79A, where fixed length data packet inputs 1157B, 1157D, 1157F, and 1157H from corresponding communication nodes $N_{a,b}$, $N_{a,d}$, $N_{a,f}$ and $N_{a,h}$ are processed by unscrambled mixing of meshed inputs operation 1156 in communication node $N_{a,j}$ to form long data packet 1160. While operation 1156 includes functionality for independently unscrambling the incoming data packets prior to mixing, the step is not required and therefore skipped because fixed-length data packet inputs 1157B, 1157D, 1157F, and 1157H are not scrambled. Long data packet 1160 is next processed by split and scramble operation 1162 resulting in mixed, scrambled data packets 1158N, 1158Q, 1158S and 1158V sent on to to corresponding communication nodes $N_{a,n}$, $N_{a,q}$, $N_{a,s}$ and $N_{a,v}$ for meshed transport.

The same scrambled mix and split operation for meshed transport of fixed-length packets is illustrated in FIG. 79B for incoming data packets 1165B, 1165D, 1165F, and 1165H that are scrambled. These data packets include junk data segments, as indicated by the data segments without an identifying number. Unscrambling and mixing operation 1161 in communication node $N_{i,j}$ then creates long packet 1166 that is shorter than the prior example because the junk data packets have been intentionally removed. In an alternative embodiment of the invention, the junk packets can be retained. Long packet 1166 is next processed by splitting and scrambling operation 1162 to produce multiple data packet outputs 1165N, 1165Q, 1165S and 1165V, sent on to to corresponding communication nodes $N_{a,n}$, $N_{a,q}$, $N_{a,s}$ and $N_{a,v}$ for meshed transport. In these data packets, junk data has been reinserted to fill the data packets with a prescribed number of data segments. While in general it is preferred and easier to process inserting junk data segments at the end of a data packet, like that shown by data packets 1165N and 1165S, if the algorithm so prescribes, the junk packets could optionally be inserted elsewhere in a data packet, e.g. in the first slot as shown in data packet 1165V.

An example of dynamic meshed data transport with static scrambling across communication network 1114 in accordance with this invention is illustrated in FIG. 80, which includes a network of interconnected computer servers 1118 running SDNP communication software. Communication node $N_{0,0}$ performs scramble and split operation 1162, communication node $N_{f,f}$ performs mix and unscramble operation 1161, and all the other communication nodes perform re-scramble and remix operation 1163. Although in the example shown each server performs only one dedicated operation, it is understood that the SDNP software installed on all computer servers 1118 is capable of performing any of the SDNP functions as required including scramble and split operation 1162, unscramble and mix operation 1161, re-scramble and remix operation 1163, and others as disclosed herein In operation, incoming data packet 1055 is first scrambled by communication node $N_{0,0}$ at time $t_1$ by scramble and split operation 1162, creating scrambled data packet 1130, which is then split into four packets of varying length, specifically data packet 1170A comprising data segment 1F and associated a junk data segment in the first slot, packet 1170B comprising data segment 1C, data packet 1170C comprising data segments 1A and 1D in reverse order, and data packet 1170D comprising data segments 1B and 1E in ascending order. The data segments shown may be combined with other data segments from other data packets and conversations, also of variable length, where data segments from other conversations have been intentionally left out of the illustration for clarity's sake. It will be understood that time passes as the data packets traverse the network and their contents are split and remixed. For the purpose of illustration clarity, however, the times have been intentionally left out of the drawing except for some exemplary times shown at the beginning and conclusion of the communication process.

During dynamic meshed transport the data packet's content, its data segments change as it traverses the network. For example, data packet 1170A, comprising a junk data segment and a data segment 1F, traverses communication nodes in sequence from communication node $N_{0,0}$ first to communication node $N_{1,1}$ then on to communication node $N_{2,1}$, where it is mixed with data packet 1170B comprising data segment 1C, to form data packet 1171A, containing the data segment sequence 1C, 1F, and the junk data segment, which is sent to communication node $N_{1,2}$, and then on to communication node $N_{2,3}$. During the same time period, data packet 1170C comprising the data segment sequence 1D, 1A is transported from communication node $N_{0,0}$ to communication node $N_{3,1}$, where it is forwarded unchanged as data packet 1171C to communication node $N_{3,2}$. As part of the mixing and splitting operation performed by communication node $N_{3,1}$, a second data packet 1171B, comprising entirely junk data with no content, is generated and sent to communication node $N_{2,1}$. The reason for routing an entirely junk packet devoid of content is two-fold—first to confuse cyberpirates by outputting more than one data packet from communication node $N_{3,1}$, and second to gain updated intra-network propagation delay data from otherwise unused links or routes.

Upon entering communication node $N_{3,2}$ data packet 1171C is split into two data packets, data packet 1172C comprising data segment 1D, which is sent to communication node $N_{3,3}$, and data packet 1172B comprising data segment 1A and a leading data segment comprising junk data, which is sent to communication node $N_{2,3}$. Upon reaching server $N_{2,3}$, data packet 1172B is mixed with incoming packet 1171A and then split again into packet 1173A, comprising data segments 1F and 1A, and sent to communication node $N_{1,4}$ where trailing junk data segments are added to form data packet 1174A, which is sent on to final communication node $N_{f,f}$ at time $t_{14}$. In a concurrent sequence, as a result of the splitting operation performed in communication node $N_{2,3}$, data packet 1173B is sent onward to communication node $N_{3,4}$ where a trailing junk data segment is added to data segment 1C before sending it on to final communication node $N_{f,f}$ at time $t_{16}$ (time not shown).

Meanwhile, data packet 1170D comprising data segments 1E and 1D is transported from communication node $N_{0,0}$ to communication node $N_{4,1}$ and on to communication node $N_{4,2}$ where it is re-scrambled, forming data packet 1172D, comprising data segments 1B and 1E in reverse order. Upon entering communication node $N_{3,3}$, data packet 1172D is mixed with data packet 1172C and then split anew, forming data packets 1173C and 1173D. Data packet 1173C, comprising data segment 1B is sent to communication node $N_{2,4}$, where it is forwarded on to final server $N_{f,f}$ at time $t_{15}$ as data packet 1174B. Although data packets 1173C and 1174B are identical, each containing only data segment 1B, i.e. packet 1173C is in effect unchanged by communication node $N_{2,4}$, this is consistent with time $t_{15}$ and its corresponding state, including seeds, keys, shared secrets, algorithms, etc., in communication node $N_{2,4}$. The other data packet, i.e. data packet 1173D, exiting communication node $N_{3,3}$ is then routed to communication node $N_{4,3}$ and on to communication node $N_{4,4}$, where an intervening junk data segment is inserted between data segments 1E and 1D to create data packet 1174D at time $t_{17}$ with corresponding state 1137. Data packets 1174A, 1174B, 1174C, and 1174D, each formed using different states and created at different times, specifically at times $t_{14}$, $t_{15}$, $t_{16}$, and $t_{17}$ are then unscrambled and mixed together in communication node $N_{f,f}$, using unscramble and mix operation 1161, to recreate the original unscrambled data packet 1055 at time $t_f$. All nodes know what to do to process an incoming packet of data either because the state of the packet or another identifier corresponds to a set of shared secrets known by the node or because a separate server called a signaling server to the node a priori what to do when a particular packet arrives As in static meshed transport, in dynamic meshed transport the data paths may be of different lengths and exhibit different propagation delays. As a result, some data packets may arrive at final communication node $N_{f,f}$ before others. In such instances, in accordance with this invention, the data packets must be held temporarily in communication node $N_{f,f}$ until the other related data packets arrive. And while the drawing shows that the final assembly and recovery of original data packet 1055 occurs in communication node $N_{f,f}$, in practice the final packet reassembly can occur in a device such as a desktop, notebook, cell phone, tablet, set top box, automobile, refrigerator, or other hardware device connected to the network. In other words, in regards to meshed transport, there is no distinction between a communication node and a device connected to a communication node, i.e. communication node $N_{f,f}$ could be considered a desktop computer instead of being a true high-capacity server. The connection of a device to the disclosed SDNP cloud, i.e. the last-mile connection, is discussed in further detail later in this application.

As stated previously, the aforementioned dynamic routing can be combined with one or more of the aforementioned SDNP methods as disclosed, including scrambling, encryption, or combinations thereof. One such operation, encrypted mixing and splitting operation 1180 shown in FIG. 81A performs a sequence of SDNP specific operations on multiple incoming data packets from communication nodes $N_{a,b}$, $N_{a,d}$, $N_{a,f}$ and $N_{a,h}$ comprising decryption operations 1032 performed on each incoming data packet, mixing and the splitting the data packets using mixing and splitting operation 1148, followed by re-encrypting the new data packets using encryption operation 1026, and forwarding these packets across the meshed communication network. As illustrated, incoming data packets have been previously encrypted and comprise illegible ciphertext packets 1181A, 1183A and others not shown. The decryption keys needed to decrypt the ciphertext inputs, specific to the time, state, and encryption algorithms used to create each incoming packet must be passed to decryption operation 1032 prior to performing decryption, either as a shared secret, keys present in a non-encrypted data packet sent with the specific data packet or communiqué, or keys supplied through other communication channels. As described later in the disclosure, the keys may be symmetric or asymmetric. The topic of key exchange is discussed later in this disclosure.

Once decrypted, the data packets become plaintext packets 1182A, 1184A and others not shown, then are mixed by communication node $N_{a,j}$ into long packet 1185, also comprising plain text, and subsequently split into new plaintext packets 1182B, 1184B and others not shown. Using new different encryption keys based on that specific time or state, the data packets are then encrypted to form new ciphertext packets 1181B, 1183B and others not shown, sent to other communication nodes. As shown in FIG. 81B, the sequence of performing multiple independent decryption operations 1032 on each input followed by mixing operation 1089 together comprises "decrypting mixing of meshed inputs" represented symbolically by decrypting mixing operation 1090. The "splitting and encrypting" operation for meshed outputs, illustrated in FIG. 81C, comprises the sequence of splitting a data packet with splitting operation 1106 followed by performing multiple independent encryption operations 1026 for each output. For convenience sake, the sequence may be represented symbolically by splitting and encrypting operation 1091.

FIG. 82A illustrates an example of re-encrypting, re-scrambling and re-splitting data packets from multiple communication nodes $N_{a,b}$, $N_{a,d}$, $N_{a,f}$ and $N_{a,h}$ for meshed transport in accordance with this invention Using re-encryption re-scrambling mixing and splitting operation 1201 on incoming data packets entering communication node $N_{a,j}$, each incoming data packet is independently decrypted by a decryption operation 1032, unscrambled by an unscrambling operation 928, then mixed by mixing operation 1089, and subsequently split into multiple new data packets by splitting operation 1106. Each data packet is then independently scrambled again using scrambling operation 926, encrypted again using encryption 1026 and then forwarded onward using the meshed communication network. As illustrated, incoming data packets have been previously encrypted and comprise illegible ciphertext 1194A, 1197A and others not shown The time and state information, shared secrets, numeric seeds, algorithms, and decryption keys needed to unscramble and decrypt the ciphertext inputs, specific to the time, state, and algorithms used to create each incoming packet must be passed to decryption operation 1032 prior to performing decryption and to unscrambling operation 928, either as a shared secret, keys or numeric seeds present in an unencrypted data packet sent with the specific data packet or communiqué, or keys and numeric seeds supplied through other communication channels. The keys may be symmetric or asymmetric. The topic of key exchange and numeric seed delivery is discussed later in this disclosure. All nodes know what to do to process an incoming packet of data either because the state of the packet or another identifier such as the seed corresponds to a set of shared secrets known by the node or because a separate server called a signaling server to the node a priori what to do when a particular packet arrives Once decrypted, the plaintext packets 1195A, 1198A and others not shown, are then unscrambled using unscrambling operations 928 to create corresponding unscrambled plaintext packets 1196A, 1199A and others not shown. Using mixing operation 1089, the unscrambled plaintext packets are mixed by communication node $N_{a,j}$ into long packet 1220, which is subsequently split into new unscrambled plaintext packets 1196B, 1199B and others not shown in splitting operation 1106, and then scrambled anew by scrambling operations 926 using new numeric seeds corresponding to the present time or state to form scrambled plaintext packets 1195B, 1198B and others not shown. Using new, different encryption keys based on that specific time or state, the data packets are next encrypted again by encryption operations 1026 to form new ciphertext 1194B, 1197B and others not shown, and subsequently sent to other communication nodes.

As disclosed in accordance with this invention, SDNP communication can comprise any sequence of encryption, scrambling, mixing, splitting, unscrambling, and decryption. At least in theory, if the executed sequence occurs in a known sequence, described mathematically as the functions y=H{G[F(x)]} where innermost function F is performed first and outermost function H is performed last, then in order to recover the original data x the anti-function should performed in the inverse sequence where $H^{-1}$ is performed first $F^{-1}$ and is performed last, i.e. $x=F^{-1}\{G^{-1}[H^{-1}(y)]\}$. This first-in last-out operation sequence should undo the alterations and recover the original content, but only if no data is removed from or inserted into the packets in the course of the process. If data is removed from or inserted into the packets, the scrambled or encrypted file is contaminated and cannot be repaired. For example, mixing data encrypted using different encryption methods yields data that cannot be unencrypted without first recovering the original components. One key benefit of dynamically meshed communication using SDNP transport—obscuring all content by dynamically mixing, splitting and rerouting multiple conversations, is lost if a given communication node is not free to mix or split packets as needed.

It is therefore one embodiment of SDNP communication to independently perform scrambling and encryption on the data packets exiting a communication node's individual outputs rather than to mix the data packets prior to the scrambling and encryption operations. Correspondingly, if the data packets entering a communication node are encrypted, scrambled, or both, then they should be independently unscrambled and unencrypted prior to mixing, i.e. prior to forming the long, mixed packet. As such the preferred operating sequence for incoming packets is to sequentially decrypt, unscramble and mix the incoming data on each input of a communication node, or in an alternative sequence to unscramble, decrypt, and mix the incoming data.

The former case is illustrated in FIG. 82B where the decrypt, unscramble and mix meshed inputs operation, schematically shown as "DUM" operation 1209 and symbolically by DUM operation 1210, comprises independently performing for each input the sequence of decryption operation 1032, unscrambling operation 928, and then mixing the resulting data packets using mixing operation 1089. The individual switches 1208A and 1208B, present on each input are used to divert, as needed, data packets around one of decryption operations 1032 or one of unscrambling operations 928, respectively. For example if both switches in a specific input are "open", then all data packets must pass through both the accompanying decryption operation 1032 and the accompanying unscrambling operation 928, and the data packet will necessarily be decrypted and unscrambled. When both-switches are closed, the operations are "shorted out," and the data is not processed by either the decryption operation 1032 or the unscrambling operation 928, i.e. the data is passed into the mixing operation 1089 unchanged.

If switch 1208A is closed and 1208B is open, then the data is diverted around decryption operation 1032 but passes through unscrambling operation 928 meaning the incoming data packet will be unscrambled but not decrypted. On the other hand, if switch 1208A is open and switch 1208B is closed, the data will pass through decryption operation 1032 but be diverted around unscrambling operation 928, meaning the incoming data packets will be decrypted but not unscrambled. Since the decryption operations 1032 and the unscrambling operations 928 are generally implemented in software, there are no physical switches diverting the signal. The switches 1208A and 1208B symbolically represent the operation of the software. Specifically, if a switch parallel to an operation is open, the applicable software performs the operation, and if the switch parallel to an operation is closed, the applicable software does not perform the operation but simply passes its input to its output unchanged. In the electronics metaphor, the function is "shorted out" by a closed switch so that the signal passes through unprocessed. The combinations are summarized in the following truth table where switch 1208A in parallel with decryption operation 1032 is referred to as switch A and switch 1208B in parallel with scrambling operation 928 is referred to as switch B.

| Switch A | Switch B | Decryption | Unscrambling | Effect of Data Packet |
|---|---|---|---|---|
| Open | Open | Yes | Yes | Decrypted then Unscrambled |
| Closed | Open | No | Yes | Unscrambled Only |
| Open | Closed | Yes | No | Decrypted Only |
| Closed | Closed | No | No | Data Packet Unaltered |

The inverse function, the split, scramble and encryption operation is shown in FIG. 82C schematically by "SSE" operation 1209 and symbolically by SSE operation 1213, comprising splitting using split operation 1106 followed by independently performing unscrambling operation 926 followed by encryption operation 1026. Switches 1211B and 1211A, present on each input are used to divert, as needed, data packets around either scrambling operation 926 or encryption operation 1026 respectively. For example, if both switches 1211B and 1211A in a specific input are "open", then all data packets must pass into and be processed by scrambling operation 926 and encryption operation 1026, and the data packet will necessarily be scrambled and encrypted. When both switches are closed, the operations are "shorted out" and the data passes through the switches 1211B and 1211A and is not processed by either the scrambling operation 926 or the encryption operation 1026, meaning the data in that particular input is passed from the splitting operation 1106 to the output unchanged.

If switch 1211B is closed and 1211A is open, then the data is diverted around scrambling operation 926 but processed by encryption operation 1026, meaning that the outgoing data packet will be encrypted but not scrambled. Alternatively, if switch 1211B is open and switch 1211A is closed, the data will be processed through scrambling operation 926 but be diverted around encryption operation 1026, meaning that the outgoing data packets will be scrambled but not encrypted.

As stated previously, since the scrambling operations 926 and the encryption operations 1026 are generally implemented in software, there are no physical switches diverting the signal, and the switches 1211B and 1211A symbolically represent the operation of the software. Specifically, if a switch parallel to an operation is open, the applicable software performs the operation, and if the switch parallel to an operation is closed, the applicable software does not perform the operation but simply passes its input to its output unchanged. In the electronics metaphor, the function is "shorted out" by a closed switch so that the signal passes through unprocessed. The combinations are summarized in the following truth table where switch 1211B in parallel with scrambling operation 926 is referred to as switch B and switch 1211A in parallel with encryption operation 1026 is referred to as switch A.

| Switch B | Switch A | Scrambling | Encryption | Effect of Data Packet |
|---|---|---|---|---|
| Open | Open | Yes | Yes | Scrambled then Encrypted |
| Closed | Open | No | Yes | Encrypted Only |
| Open | Closed | Yes | No | Scrambled Only |
| Closed | Closed | No | No | Data Packet Unaltered |

The combination of a multiple-input DUM 1209 and multiple-output SSE 1212 forms a highly versatile element for achieving secure communication in accordance with this invention, herein referred to as a SDNP media node 1201, shown in FIG. 83A. As shown the data entering any one of the multiple inputs may in sequence first be decrypted by decryption operation 1032, or decryption operation 1032 may be bypassed. The data packet may then be unscrambled by unscrambling operation 928, or unscrambling operation 928 may be bypassed. The various inputs once processed may be then be mixed using mixing operation 1089, and subsequently split into new packets by splitting operation 1106. Each individual output's data packets are next scrambled by scrambling operation 926, or alternatively scrambling operation 926 is bypassed, and then encrypted by encryption 1026 or alternatively encryption operation 926 may be bypassed.

The name "media node" reflects the application of this communication node's communication software, or "soft-switch" in accordance with this invention, specifically to carry, route and process content representing real-time voice, text, music, video, files, code, etc., i.e. media content. The SDNP media node is also represented symbolically for convenience as SDNP media node $M_{a,j}$, hosted on server 1215, as shown in FIG. 83B. Using the same code, all combinations of signal processing are possible using the disclosed SDNP media node, including the following examples:

"Single Route Pass-Through" where a single input is routed to single output "as is" or alternatively by inserting or removing junk packets or parsing the incoming data packet into multiple shorter data packets. This function, shown in FIG. 83C schematically and symbolically as single route pass-through operation 1217A, is useful when a media node is operating simply as a signal repeater in a communication network. The junk and parse functions 1053 and 1052 as shown are integral features of packet mixing operation 1061 and packet splitting operation 1057 and are included here only for convenience sake.

"Redundant Route Replication" where a single input is copied and sent "as is" to two or more outputs, or alternatively by inserting or removing junk packets or parsing the incoming data packet into multiple shorter data packets before forwarding identical copies and/or data sequences to two or more outputs. This function, shown schematically and symbolically in FIG. 83D as redundant route replication operation 1217B, is useful in implementing "race routing" for VIP clients or urgent communication, i.e. sending two copies by different paths and using the one that arrives at its destination first. The junk and parse functions 1053 and 1052 are integral features of packet mixing operation 1061 and packet splitting operation 1057 and are included here only for convenience sake.

"Single Route Scrambling" where a single input is scrambled and routed to a single output irrespective as to whether the packet was previously encrypted. As shown in FIG. 83E, single-route scrambling is useful for first-mile communication between a client and the cloud or in communiqués before data packets are split or mixed for multi-route or meshed transport. The function represented schematically and symbolically as single route scrambling operation 1217C, comprises single input packet splitting operation 1057, in this case used only for junk insertions and deletions and for parsing, followed by scrambling-only operation 1268B.

"Single Route Unscrambling" the inverse of single-route scrambling, shown symbolically as single route unscrambling operation 1217D in FIG. 83F, is used to return a scrambled packet to its unscrambled state irrespective as to whether the packet was previously encrypted prior to scrambling. The function comprises the series combination of unscrambling only operation 1226A followed by single-route mixing operation 1061 used for junk insertions and deletions and for packet parsing.

By performing the two prior single-route unscrambling and scrambling functions in sequence, "Single Route Re-scrambling", shown schematically and symbolically as single route re-scrambling operation 1216C in FIG. 83G, is useful to dynamically refresh packet scrambling in single path routes.

"Single Route Encryption" where a single input is encrypted and routed to a single output irrespective as to whether the packet was previously scrambled. This function, represented schematically and symbolically as single route encryption operation 1217E in FIG. 83H, is useful for first-mile communication outside the cloud or for communiqués before data packets are split or mixed for multi-route or meshed transport. The function as shown comprises single-input packet splitting operation 1057, in this case used only for junk insertions and deletions and for parsing, followed by encryption-only operation 1226D.

The inverse of single-route encryption, "Single Route Decryption" shown symbolically as single route decryption operation 1217F in FIG. 83I is used to return an encrypted packet to its unencrypted state irrespective as to whether the packet was previously scrambled prior to encryption. The function comprises the series combination of decryption only operation 1226C followed by single-route mixing operation 1061 used for junk insertions and deletions and for packet parsing.

By performing the two prior single-route decryption and encryption functions in sequence, "Single Route Re-encryption", shown schematically and symbolically as single route re-encryption operation 1216D in FIG. 83J, is useful to dynamically refresh packet encryption in single path routes "Single Route Scrambling Encryption" where a single input is both scrambled, encrypted, and routed to a single output. This function, represented schematically and symbolically as single route scrambling encryption operation 1217G in FIG. 83K is useful for first-mile communication outside the cloud or for communiqués before data packets are split or mixed for multi-route or meshed transport. The function as shown comprises single-input packet splitting operation 1057, in this case used only for junk insertions and deletions and for parsing, followed by scrambling and encryption operation 1226E.

The inverse of single-route scrambling encryption, "Single Route Unscrambling Decryption" shown symbolically as single route unscrambling decryption operation 1217G in FIG. 83L, is used to return a scrambled encrypted packet to its original unscrambled unencrypted state. The function comprises the series combination of decryption unscrambling operation 1226D followed by single-route mixing operation 1061 used for junk insertions and deletions and for packet parsing.

By performing the prior single-route decryption, unscrambling, scrambling and encryption functions in sequence, "Single Route Re-packeting", shown schematically and symbolically as single route re-packeting operation 1216E in FIG. 83M, is useful to dynamically refresh packet scrambling and encryption in single path routes.

"Meshed SDNP Gateway Input" also known as "single-input, multiple-output SDNP gateway" shown schematically and symbolically as single-input, multiple-output operation 1216F in FIG. 83N, where a single input is split and routed to multiple outputs for multi-route or meshed transport irrespective as to whether the packet was previously scrambled or encrypted. This function is useful to initiate unscrambled un-encrypted meshed routing in a SDNP gateway, including junk and parse functions 1053 and 1052 as an integral feature of its packet splitting operation.

The inverse of the prior meshed gateway input function is "Meshed Packet Gateway Output" also known as "multi-input, single-output SDNP gateway" shown schematically and symbolically as multi-input, single-output operation 1216G in FIG. 83O, where a single input is split and routed to multiple outputs for multi-route or meshed transport irrespective as to whether the packet is scrambled or encrypted. The function is used to re-collect the component packets of a message in a SDNP gateway for last-mile communication or for cloud-to-cloud hops, i.e. to conclude SDNP meshed routing and optionally includes junk and parse functions 1053 and 1052 as an integral feature of packet its mixing operation.

"Scrambled SDNP Gateway Input" is shown symbolically as single-input, multiple-output scrambling operation 1217H in FIG. 83P, where a single input is split, scrambled separately for each output, and then routed to multiple outputs for multi-route or meshed transport irrespective as to whether the packet was previously encrypted. This function is useful to initiate scrambled meshed routing in a SDNP gateway including optional junk and parse functions (not shown) as an integral feature of its splitting operation.

The inverse of the prior scrambled gateway input function is "Unscrambled SDNP Gateway Output" also known as "unscrambling multi-input, single-output SDNP gateway" is shown symbolically as multi-input, single-output unscrambling operation 1217J in FIG. 83P where multiple meshed inputs are first independently unscrambled and then mixed and routed to a single output or client irrespective as to whether the packet is encrypted. The function is used to re-collect and unscramble the component packets of a message in a SDNP gateway for last-mile communication or for cloud-to-cloud hops, i.e. to conclude SDNP meshed routing and optionally includes junk and parse functions (not shown) as an integral feature of its packet splitting operation.

"Encrypted SDNP Gateway Input" is shown symbolically as single-input, multiple-output encryption operation 1217K in FIG. 83Q, where a single input is split, encrypted independently for each output, and then routed to multiple outputs for multi-route or meshed transport irrespective as to whether the packet was previously scrambled. This function is useful to initiate encrypted meshed routing in a SDNP gateway including optional junk and parse functions (not shown) as an integral feature of its splitting operation.

The inverse of the prior encrypted gateway input function is "Decrypted SDNP Gateway Output," shown symbolically as multi-input, single-output decryption operation 1217L in FIG. 83Q, where multiple meshed input are first decrypted independently for each input then mixed and routed to a single output or client irrespective as to whether the packet is scrambled. The function is used to re-collect and decrypt the component packets of a message in a SDNP gateway for last-mile communication or for cloud-to-cloud hops, i.e. to conclude SDNP meshed routing including optional junk and parse functions (not shown) as an integral feature of its packet mixing operation "Scrambled Encrypted SDNP Gateway Input" is shown symbolically as single-input, multi-output scrambling-encryption operation 1217M in FIG. 83R, where a single input is split, then scrambled and subsequently encrypted independently for each output, and finally routed to multiple outputs for multi-route or meshed transport. This function is useful to initiate encrypted meshed routing in a SDNP gateway including optional junk and parse functions (not shown) as an integral feature of its splitting operation.

The inverse of the prior scrambled encrypted gateway input function is "Unscrambled Decrypted SDNP Gateway Output" is shown symbolically as multi-input, single-output unscrambling-decryption operation 1217N in FIG. 83R, where multiple meshed inputs are first decrypted then unscrambled independently for each input, then mixed and routed to a single output or client. The function is used to re-collect, decrypt and unscramble the component packets of a message in a SDNP gateway for last-mile communication or for cloud-to-cloud hops, i.e. to conclude SDNP meshed routing including optional junk and parse functions (not shown) as an integral feature of its packet mixing operation.

"Meshed Re-scrambling" is shown symbolically as multi-input, multi-output unscrambling-scrambling operation 1216A in FIG. 83S where multi-route or meshed inputs are first unscrambled independently for each input irrespective as to whether the packet is encrypted, merged into a long data packet or equivalent, removing junk packets if applicable. The long data packet is next split into multiple new data packets, inserting junk data as applicable. Each data packet is then independently scrambled and finally routed to multiple outputs for multi-route or meshed transport. The function is used to refresh scrambling to new state or time conditions, i.e. to facilitate data packet "re-scrambling", as data packets traverse the SDNP cloud.

"Meshed Re-encryption" is shown symbolically as multi-input, multi-output decryption-encryption operation 1216B in FIG. 83S, where multi-route or meshed inputs are first decrypted independently for each input irrespective as to whether the packet is scrambled, merged into a long data packet or equivalent, removing junk packets if applicable. The long data packet is next split into multiple new data packets inserting junk data as applicable. Each data packet is then independently encrypted and finally routed to multiple outputs for multi-route or meshed transport. The function is used to refresh encryption to new state or time conditions, i.e. to facilitate data packet "re-encryption", as data packets traverse the SDNP cloud.

"Meshed Re-packeting" shown previously in schematic form in FIG. 83A and in symbolic form in FIG. 83B where a where multi-route or meshed inputs are first decrypted and subsequently unscrambled independently for each input, and next merged into a long data packet or equivalent, removing junk packets if applicable. In one embodiment, the long packet should comprise unencrypted plaintext or the format of data sent from a client. Thereafter, the long data packet is split into multiple new data packets inserting junk data as applicable. Each data packet is then independently scrambled and encrypted and finally routed to multiple outputs for multi-route or meshed transport. The function is used to refresh both scrambling and encryption to new state or time conditions, i.e. to facilitate data packet "re-packeting", as data packets traverse the SDNP cloud.

The above preferences are not intended to limit the possible permutations and combinations by which the disclosed SDNP media node can be used. For example, the number of input and output channels, i.e. the number of SDNP media nodes connected to any specific SDNP media node may vary from one to dozens of connections per device. Four inputs and outputs are shown for convenience. FIG. 84A, a schematic diagram representing signal flow, illustrates the communication between any nodes such as media nodes $M_{a,b}$, $M_{a,j}$ and $M_{a,h}$ comprising computer servers 1220B, 1220J, and 1220H respectively all running the SDNP communication software. This drawing illustrates two connections between any two media nodes—one connected from an output of a media node, e.g. $M_{a,b}$, to an input of another media node, e.g. $M_{a,j}$ and a second connection from an output of the last named media node, $M_{a,j}$ to an input of the former media node, $M_{a,b}$. This depiction is meant to represent a layer 3 network connection, not a PHY or data link layer which may in fact comprise a single fiber, coaxial link, twisted pair, Ethernet, or satellite link between the communication media nodes. Because the representation is at a network level, there is no risk of electrical feedback, race conditions, or instability created by having the output of a device connected to another device's input and that device's output connected to the former device's input, i.e. the network schematic does not describe an electrical feedback network.

In order to realize a communication network or SDNP cloud 1114 in accordance with this invention, as shown in FIG. 84B, an array of computer servers comprising servers 1220B, 1220D, 1220F, 1220H, 1220J, 1220S, and 1220Q, each running software to implement an SDNP media node 1215, create a secure network with corresponding media nodes $M_{a,b}$, $M_{a,d}$, $M_{a,f}$, $M_{a,h}$, $M_{a,j}$, $M_{a,s}$, and $M_{a,q}$, which may represent a portion of the nodes of a larger secure cloud.

The computer servers need not necessarily run the same operating system (OS) so long as the software running in SDNP media node 1215 comprises executable code consistent with the hardware's OS. Executable code is the computer software running on a given hardware platform performing specific application functions. Executable code is created by compiling "source code". While source code is recognizable as logically organized sequential operations, algorithms, and commands, once the source code is converted into executable code, the actual functionality of the program is difficult or impossible to recognize. The process is unidirectional—source code can generate executable code but executable code cannot be used to determine the source code from whence it came. This is important to prevent theft of the operating system so hackers can reverse engineer the actual code.

Source code is not executable because it is a language and syntax used by programmers, not machine code intended to be executed on a specific operating system. During the compile operation, the executable code generated is specific to one operating system, iOS, Android, Windows 9, Windows 10, MacOS, etc. Executable code for one operating system will not run on another. Source code can, however, be used to generate executable code. The source code of the SDNP network is therefore available only to the developers of its source code and not to the network operators running SDNP executable code.

Network connectivity, typically following standardized protocols such as Ethernet, WiFi, 4G, and DOCSIS described in the background section of this application provide a common framework to interconnect the devices in a manner completely unrelated to their manufacturer or OS. In operation, the network connection delivers and transmits data packets to and from the computer server's operating system which routes it to and from the SDNP software running atop the computer's OS. In this manner, the SDNP media node based soft-switch communication function can be realized in any device, regardless of its manufacturer, and can be made compatible with any major supported operation system including UNIX, LINUX, MacOS 10, Windows 7, Windows 8, etc.

Another principle is that the SDNP-realized cloud has no central control point, no single device deciding the routing of packages, and no common point that has full knowledge of the data packets being sent, what they are, where they are going, and how they were mixed, split, scrambled, and encrypted. Even a network operator has no full picture of the data traffic in the network. As described, FIG. 84B represents a network of computers in the same cloud. The meaning of being in the same cloud is a subjective and arbitrary term and should not be meant to limit the universality of the disclosed invention. A second cloud comprising media nodes $M_{b,b}$, $M_{b,e}$, $M_{b,f}$, $M_{b,g}$, $M_{b,j}$, $M_{b,s}$, and $M_{b,t}$. (not shown) may comprise a different geographic region, or be hosted by a different service provider. For example, Amazon may host "Cloud A," while Microsoft may host "Cloud B," and a private company or ISP may host "Cloud C." In general, the intra-nodal connectivity is greater and denser within a cloud than for cloud-to-cloud connections, which are fewer in number and require using true Internet compatible IP addresses to communicate rather than utilizing temporary packet routing numbers assigned by a network address translator (NAT).

In regards to representing the functions performed by any given SDNP, the same principle of either including or bypassing a function with virtual switches—either performing the function or passing the data through unaltered, is equally applicable to the above discussion or in an alternate embodiment where the scrambling and encryption functions are swapped in order, i.e. performing unscrambling before decryption, and performing encryption before scrambling. For brevity's sake, these alternate data flows are not illustrated separately with the understanding that the sequence may be altered so long that the inverse function is performed in the opposite operational sequence. Because the data packet processing occurs in software, this sequence can be altered simply by changing the algorithm's sequence on an ad hoc or periodic basis, e.g. monthly, daily, hourly, or on a call-by-call, time, or state basis.

As discussed previously, any scrambling, encrypting and mixing sequence may be utilized so long that the original data is recovered in precisely the inverse order on precisely the same data set. Changing the content in between operations without undoing the change before unscrambling, decrypting, or remixing will result in irrevocable data loss and permanent data corruption. That said, a packet can even be scrambled more than once or encrypted more than once in a nested order so long the inverse sequence rule is followed to recover the original data. For example, the client application can encrypt a message using its own proprietary method to create ciphertext whereon upon entering the SDNP gateway, the gateway media node can encrypt the packet a second time for network transport. This method will work so long that the final gateway decrypts the network's encryption on a complete packet-by-packet basis, before the client application decryption occurs.

Aside from the case of client-based encryption, to avoid the risk of data corruption and packet loss, in one embodiment in accordance with this invention, the following guidelines are beneficial in implementing SDNP based communication:

- SDNP packet scrambling should be performed in the client's SDNP-enabled application or alternatively upon entering a SDNP cloud in the SDNP media node gateway,
- Ideally, SDNP encryption should occur on every hop between two SDNP media nodes, i.e. a data packet is encrypted before routing and decrypted immediately upon entering the next SDNP media node.
- In the very least, re-scrambling should occur every time a data packet enters or leaves a SDNP cloud, either for last-mile communications or for cloud-to-cloud hops. If the data packet is SDNP encrypted, it should be decrypted before it is unscrambled, and then scrambled again before it is encrypted again.
- It is preferable to decrypt and unscramble incoming data packets before mixing. Decrypting and unscrambling mixed long packets can result in data corruption. Likewise it is preferable to scramble and encrypt data after splitting. Decrypting and scrambling mixed long packets can result in data corruption.
- Junk packets should be removed from incoming data packets after decryption and unscrambling but before mixing. Junk deletions on mixed long packets can result in data corruption. Likewise it is preferable to insert junk data after splitting but prior to scrambling and encryption. Junk insertions on mixed long packets can result in data corruption.
- User application encryption aside, re-scrambling (i.e. unscrambling and then scrambling) preferably should not be performed on encrypted data.
- Junk data insertions should be performed in a consistent manner for ease of insertion and removal.
- Incoming data packets should be decrypted and unscrambled in accordance with the time, state, and algorithms in which their encryption and scrambling occurred. Outgoing data packets should be encrypted and scrambled in accordance with the current time, associated state, and related algorithm.
- The plaintext packets are preferably recreated only within the media nodes. All packets are scrambled, encrypted, mixed, split and/or contain junk data segments while they are in transit between the media nodes.

While the above methods represent possible methods in accordance with this invention, they are not intended to limit the possible combination or sequence of SDNP functions. For example, encrypted packages can be subsequently scrambled so long the same data packet is unscrambled before decryption.

In one implementation, scrambling is only performed within a client's SDNP application and not by the media nodes in the SDNP cloud. In such cases, secure intra-node communication is purely a sequence of encryptions and decryptions like that shown in FIG. 84C, where the SDNP functional components of media node $M_{a,h}$ comprising splitting operation 1106, encryption operations 1225A, mixing operation 1089, and decryption operations 1225B is shown explicitly, while SDNP media nodes $M_{a,f}$ and $M_{a,j}$ are depicted performing SDNP media node function meshed re-encryption 1216B only symbolically.

In operation, data coming into media node $M_{a,j}$ from another media node (not shown) is first directed to a decryption operation 1225B at one of the inputs of media node $M_{a,h}$ and into mixing operation 1089, where, if they arrive at the same time, the packets are combined with data packets coming from media node $M_{a,f}$ independently that have been processed by another decryption operation 1225B. Once mixed, the data packets are split into new and different combinations with different destinations based on a splitting algorithm executed by splitting operation 1106. The individual outputs are then independently encrypted by separate encryption operations 1225A, and then directed to media nodes $M_{a,f}$ and $M_{a,j}$ and on to other media nodes in the network.

During this routing, the long packet momentarily existing between mixing operation 1089 and splitting operation 1106 may in fact contain data packets from the same conversation, one data packet traveling from media node $M_{a,f}$ to media node $M_{a,j}$ through media node $M_{a,h}$, the other data packet traveling from media node $M_{a,j}$ through media node $M_{a,h}$ to media node $M_{a,f}$ at the same time but in the other direction. Because of precise routing control available in the SDNP network in accordance with this invention, described in greater detail later in this disclosure, a long data packet can, at any given time, contain any combination of related and unrelated content, even data or sound snippets from the same full duplex conversation going in opposite directions. If the data does not arrive at the same time, then the data packets pass serially through the media node in opposite directions without ever sharing the same long packet. In either case, there is no interaction or performance degradation in a SDNP media node carrying multiple conversations in full duplex mode.

While at first this unique form of network communication may appear confusing, representing the data transport in a manner shown in FIG. 84D quickly reveals the simplicity of data communication in a SDNP media node, even when a media node supports both directions of full duplex communication concurrently. For example, data packets, shown as shaded lines, entering media node $M_{a,j}$ first pass through decryption 1032 then mixing operation 1089, splitting operation 1106 and encryption operation 1026 finally exiting media node $M_{a,j}$ and entering media node $M_{a,h}$ in a newly encrypted state, and thereafter repeating the same sequence but at a new time and state. Finally, the data packets from media node $M_{a,h}$ enter media node $M_{a,f}$ where they are decrypted, mixed, split and re-encrypted and finally sent to the next media node in the cloud. Concurrently, data passing the other direction, shown by un-shaded lines, enters media node $M_{a,f}$ where it is decrypted, mixed, split and re-encrypted then passed to media node $M_{a,h}$ and finally sent through media node $M_{a,j}$ to other media nodes in the SDNP cloud.

Last-Mile Communication

The data link between a client and the SDNP cloud is described herein as the last mile communication. The term "last mile" includes the "first mile", the connection between a caller and the cloud, because all communication is invariably two-way involving a sent message and a reply, or possibly a full duplex conversation. As such, the term "last mile," as used herein, shall mean any connection between a client and the SDNP cloud regardless as to whether the client initiated the call or was the person being called, i.e. the recipient. An example of a last-mile connection is illustrated in FIG. 85A, where SDNP cloud 1114 comprises a network of computer servers 1118 running software to operate as SDNP media nodes $M_{a,b}$, $M_{a,d}$, $M_{a,f}$, $M_{a,h}$, $M_{a,j}$, $M_{a,s}$, and $M_{a,q}$, together representing at least a portion of the nodes of a secure cloud. Specifically, in the example shown, computer server 1220H, facilitating SDNP media node $M_{a,h}$, operates as a SDNP gateway media node connected directly or indirectly to LTE base station 17 and is connected via cellular tower 18 and radio link 13 to cell phone 32 as a client. As used herein, the term "gateway node" or "gateway media node" refers to a media node that connects with a node that is outside the SDNP network, typically a client device such as a cell phone or a computer, in which case, the connection between the gateway node and the client device is a "last mile" connection.

An example where a secure SDNP gateway node connects to an unsecure last mile is shown in FIG. 85B, e.g. the SDNP gateway node is connected to a phone that does not have a SDNP application installed on it. As shown, cell phone 32 is connected by radio link 28 to cellular tower 18, which sends and receives data packets from cell phone 32 and converts them to wireline communications such as Ethernet, fiber, coaxial cable, copper cable, etc. using LTE base station 17. Although the data packets are carried bidirectionally on a single PHY layer 1 connection, wire, cable, radio or satellite link, the data flow is represented separately for packets sent from cell phone 32 to SDNP media node $M_{a,h}$, and vice versa. As illustrated, the last mile is unsecure unless the application being used in the cell phone has built-in encryption and the person being called is using the same application with the same encryption.

In operation, open data packets sent from cell phone 32 to SDNP gateway media node $M_{a,h}$, are neither decrypted nor unscrambled because these functions are disabled, i.e. shorted out and as such are not shown. Instead incoming data packets are passed directly into mixer operation 1089 mixing them with other packets then splitting them out into multiple outputs for meshed transport using splitting operation 1106. Each of these outputs is then secured using scrambling operation 926 and encryption operation 1026 before transport. One output shown as an example is routed to media node $M_{a,f}$ in server 1220F. The message may in turn be processed media node $M_{a,f}$ for intra-cloud communication as described previously and sent onward to another media node, e.g. media node Ma,j in computer server 1220J.

Data flow from the cloud to cell phone 32 from media node $M_{a,f}$ in server 1220F and from other media nodes are processed in inverse sequence, starting with decryption operations 1032, and unscrambled using unscrambling operations 928, and then mixed with other incoming packets into a temporary long packet by mixing operation 1089. The long packet is then split into pieces by splitting operation 1106 directing some packets onward in the network and separating the packets to be sent to cell phone 32. These packets may be sent together or parsed and sent successively in separate data packets back to LTE base station 17 and onward to cell phone 32.

The data packets traversing the network may be repeatedly re-encrypted and re-scrambled, as described previously. Alternatively, in one embodiment, the data packets remain scrambled without re-scrambling throughout the cloud but can be repeatedly re-encrypted at each media node. In such a scramble-once unscramble-once system, the scrambling occurs in the gateway node where the packets enter the cloud and the unscrambling occurs in the gateway node where the packets leave the cloud, i.e. in the gateway media nodes connected to the first and last miles. While, as noted above, a media node connected to the first or last mile may be called a gateway node, in actuality it comprises the same SDNP media node software and functionality as any other media node in the cloud, but functions differently in order to contact a client.

Another option to implement scramble-once unscramble-once SDNP communication is to implement the scrambling in the client's device using software. As shown in FIG. 85C, in a connection between cell phone 32 and SDNP media node $M_{a,f}$ in computer server 1220F, SDNP media node $M_{a,h}$ acts as a gateway media node between the client and the SDNP cloud where SDNP gateway media node $M_{a,h}$ comprises mixing operation 1089, splitting operation 1106, encryption operation 1225A, scrambling operation 1226B, decryption operation 1225B and unscrambling operation 1226A. As defined previously, any media node, a communication node designated with an M node name, is capable of any combination of all these security operations, i.e. mixing and splitting, encrypting and decrypting, scrambling and unscrambling, etc. In operation, the data packets are scrambled within the cell phone 32 by SDNP software, travel by radio link 28 to LTE tower 18, where LTE base station 17 converts the signals into Ethernet, fiber, or other wireline for communication to the SDNP gateway node. Depending on the local carrier, portions of this link may comprise traffic over a private NAT or involve data traveling over the Internet. The data packets are then sent from LTE base station 17 to SDNP media node $M_{a,h}$ acting as a SDNP gateway node.

The incoming data packet is then is routed to pass-through operation 1216H and subsequently mixed with other incoming data packets using mixing operation 1089, then split by splitting operation 1106, with the data packets from cell phone 32 directed to media node $M_{a,f}$ through encryption operation 1225A. In this manner the data traversing the cloud is encrypted by the gateway but scrambled by the client's SDNP application. Conversely, encrypted and scrambled data traffic from the SDNP cloud is routed through media node $M_{a,f}$, passed through decryption operation 1225B, mixed by mixing operation 1089, and split into new packets by splitting operation 1106, extracting the data packets with cell phone 32 as their destination, and sending the data packets to cell phone 32 unmodified by pass-through operation 1216H. In this manner, the entire communication is scrambled from end-to-end but only encrypted within the SDNP cloud.

A modification to the above method still provides scrambling both in the last mile and in the cloud, but the last-mile scrambling is different than the scrambling used in the cloud. As shown in FIG. 85D, in a connection between cell phone 32 and SDNP media node $M_{a,f}$ in computer server 1220F, SDNP media node $M_{a,h}$ acts as a gateway node between the client and the SDNP cloud, where SDNP media node $M_{a,h}$ comprises mixing operation 1089, splitting operation 1106, scrambling and encryption operation 1226C, decryption and unscrambling operation 1226D, scrambling operation 1226B and unscrambling operation 1226A. In operation, data packets are scrambled within the cell phone 32 by SDNP software, travel by radio link 28 to LTE tower 18, and LTE base station 17 converts the signals into Ethernet, fiber, or other wireline communication to the SDNP gateway node. Depending on the local carrier, portions of the link from cell phone 32 to LTE base station 17 may comprise traffic over a private NAT or involve data traveling over the Internet. The data packets are then sent from LTE base station 17 to SDNP media node $M_{a,h}$ acting as a SDNP gateway node.

The incoming data packet is then is routed to unscrambling operation 1226A and subsequently mixed with other incoming data packets using mixing operation 1089, then split by splitting operation 1106, with the data packets from cell phone 32 directed to media node $M_{a,f}$ through scrambling and encryption operation 1226C. In this manner, the data traversing the cloud is encrypted and scrambled by the gateway node but in a manner different than the scrambling used by the client's SDNP application for last-mile security. Conversely, encrypted and scrambled data traffic from the SDNP cloud is routed through media node $M_{a,f}$, through decryption and unscrambling operation 1226D, then mixed by mixing operation 1089, and split into new packets by splitting operation 1106, extracting the data packets with cell phone 32 as their destination, and sending the data packets to cell phone 32 through scrambling operation 1226B. The data packets entering cell phone 32 are unscrambled by an SDNP-enabled application. In this manner, communication in the cloud is both encrypted and scrambled within the media nodes while the last mile is scrambled by the gateway node and the phone application in a manner distinct from the cloud scrambling. One important aspect of scrambling and un-scrambling data packets within the phone is the method used to pass state information, numeric keys, or shared secrets between the cloud and the client. This subject is discussed later in this disclosure.

Fragmented Data Transport

In accordance with this invention, a network of computer servers running software to perform SDNP media node functions facilitates secure global communication to a wide variety of devices based on data fragmentation in packet-switched communication. As illustrated in FIG. 86, SDNP cloud 1114, comprising a network of computer servers running software to operate as SDNP media nodes $M_{a,b}$, $M_{a,d}$, $M_{a,f}$, $M_{a,h}$, $M_{a,j}$, $M_{a,s}$, and $M_{a,q}$ and others not shown may connect to a large variety of devices and clients including: (a) LTE base station 17 with radio links 28 to cell phone 32 and tablet 33. Base station 17 may also be linked by radio to any other LTE-enabled device; (b) public WiFi system 100 with WiFi antenna 26 providing WiFi radio link 29 to notebook 35 or to tablets, cell phones, e-readers and other WiFi-connected devices, including Internet appliances; (c) cable CMTS 101 connected by optical fiber or coaxial cable to cable modem 103 and then to desktop computer 36 or home WiFi base station, Ethernet-connected devices, etc.; (d) cable CMTS 101 connected by optical fiber or coaxial cable to set top box TV STB 102 and then to HDTV 39; (e) a wireline connection to Internet routers 66A, 66B, 66C; (f) professional radio networks 14 such as TETRA and EDACs connected by radio tower 15 to walkie-talkie 16B, base stations 16A, and professional vehicles 40; (g) corporate broadcast exchange PBX 8 and desktop phones 9; and (h) PSTN bridge 3 to conventional phone networks and POTS. As shown, any SDNP media node can operate as a gateway node.

A simplified illustration of data packet transport is illustrated in FIG. 87, showing examples of SDNP cloud-based communication between tablet 33 and automobile 1255, comprising data packet 1056, sequentially 2A, 2B, 2C, 2D, 2E and 2F, and between notebook 35 and cell phone 32, comprising data packet 1055, sequentially 1A, 1B, 1C, 1D, 1E, and 1F. Another data packet 1250, sequentially as 3A, 3B, 3C, 3D, 3E, and 3F; a data packet 1252, sequentially as 4A, 4B, 4C, 4D, 4E, and 4F; and a data packet 1251, sequentially as 5A, 5B, 5C, 5D, 5E, and 5F, are also transported through the network concurrent with data packets 1255 and 1256. The shorter packets represent components at various times during transport, displayed collectively to illustrate the dynamic nature of network transport.

In the example shown, data of every packet is scrambled so the sequence of data segments may be in random order or may by chance be in ascending order. Data segments of one communiqué or conversation may also be interspersed with unrelated data segments. In fact it is highly unlikely that a data packet once entering the SDNP cloud would not be mixed with other unrelated data segments. In fact in any given data packet transiting between two SDNP media node, the mixing of unrelated data segments and scrambling of the order of these packets is a normal condition. With a large number or conversation and data packets traversing the cloud simultaneously, the chance of all of the data remaining in the same data packet is statistically remote. In the absence of sufficient data, the mixing operation within the media nodes introduces junk data. The inclusion of various data segments of unrelated data as shown illustrates the principle of mixing of communiqués and conversations in data packets during SDNP transport, but does not accurately represent the true quantity and frequency of unrelated data or junk data segments and filler present in the data packets.

FIG. 88A illustrates the beginning of communication at time $t_0$ and corresponding state 990 from notebook 35 to cell phone 32 starting with data packet 1055 and unrelated data packets 1056 and 1250 through 1252 entering the network through various gateway nodes including $M_{a,q}$, $M_{a,h}$, $M_{a,b}$, and $M_{a,s}$. As shown in FIG. 88B, at time $t_1$ and corresponding state 991, data packet 1055 is split into several component data packets. One such data packet 1261A comprising data segments 1A and 1B in ascending order but mixed with unrelated data segments, is sent to media node $M_{a,b}$. Data packet 1261B comprising data segments 1D, 1C, and 1F in scrambled order and also mixed with unrelated data segments, is routed to media node $M_{a,j}$, and packet 1261C comprising data segment 1E is sent to media node $M_{a,h}$.

As shown in FIG. 88C, at time $t_2$ and corresponding state 992, the data is separated into new combinations of component data packets. Specifically, data packet 1261A is split into new data packets 1262A and 1262B where data packet 1262A comprising data segment 1A and other data segments is routed to media node $M_{a,s}$ while data packet 1262B comprising data segment 1B is routed to media node $M_{a,d}$.

Data packet 1261B is also split into component data packets 1262C and 1262D, where data packet 1262C, comprising data segments 1C and 1F in ascending order but intermixed with unrelated data segments, is routed to media node $M_{a,d}$ while component data packet 1262D, comprising data segment 1D is directed to media node $M_{a,f}$. Meanwhile, data packet 1262E comprising data segment 1E continues transit alone or mixed with unrelated data packets (not shown) to media node $M_{a,f}$.

As shown in FIG. 88D, at time $t_3$ and corresponding state 993, data packet 1263A, comprising data segment 1A, and data packet 1263C comprising data segments 1D and 1E, are transported to media node $M_{a,d}$ while data packet 1263B, comprising data segments 1B, 1C and 1F, waits for their arrival in the same media node $M_{a,d}$. As shown in FIG. 88E, at time $t_4$ and corresponding state 994, media node $M_{a,d}$ mixes data packets 1263A, 1263B and 1263C, restoring the original data packet 1055, and routes the data packet 1055 to cell phone 32, either together or in piecemeal fashion. A summary of the data packet transport between notebook 35 and cell phone 32 is shown in FIG. 88F.

As shown in FIG. 89A, independently of and concurrent with the communication between notebook 35 and cell phone 32, tablet 33 is communicating to automobile 1255, starting at time $t_0$ and corresponding state 990, when data packet 1056 enters secure cloud 1114. As shown in FIG. 89B, at time $t_1$ and corresponding state 991, the incoming data packet 1056 is split into component data packets 1261D and 1261E, where packet 1261D, comprising data segments 2B and 2C in scrambled but coincidently ascending order, is routed to media node $M_{a,q}$, and packet 1261E comprising data segments 2E, 2F, 2A and 2D in scrambled order, is routed to media node $M_{a,j}$.

As shown in FIG. 89C, at time $t_2$ and corresponding state 992 data packet 1261D is modified, scrambling the data order and inserting data segments from other sources to create data packet 1262F. Likewise, data packet 1261E is split by media node $M_{i,j}$, into several data packets 1262G, 1262H, and 1262J. Data packet 1262J, comprising data segment 2A, is routed to media node $M_{a,f}$. Scrambled data packet 1262H, comprising data segments 2D and 2E mixed with a number of unrelated data segments, is routed to media node $M_{a,d}$. Also, at time $t_2$ data packet 1262G comprising data segment 2F is routed to media node $M_{a,s}$.

As shown in FIG. 89D, at time $t_3$, and corresponding state 993, data packet 1263D comprising data segments 2B and 2C in ascending order is routed to node $M_{a,s}$ where data packet 1263E, comprising data segment 2F, is waiting for other packets to arrive. Concurrently, data packet 1263G is routed to media node $M_{a,d}$, where data packet 1263F, comprising data segments 2D and 2E in ascending order, is waiting. This condition highlights that in the SDNP network, data packets may transit immediately or, if desired, may be held temporarily. As shown in FIG. 89E, at time $t_4$ and corresponding state 994, data packet 1264B comprising data segments 2D, 2A, and 2E in scrambled order, is routed to media node $M_{a,s}$, where data packet 1264A, comprising data segments 2B, 2C, and 2F, is waiting. As shown in FIG. 89F, at time $t_f$ the final data packet 1056 is assembled and routed to automobile 1255, or alternatively all the data segment components of final data packet 1056 are routed in unmixed form to automobile 1255 and reassembled there. A summary of the routing of data packet 1056 from tablet 33 to automobile 1255 is shown in FIG. 89G.

As shown, data packets transiting through the SDNP cloud carry multiple concurrent conversations to different destinations, dynamically changing in content from one SDNP media node to the next. There is no adverse impact, data loss, or bleeding from one conversation with another through the mixing or splitting of unrelated data segments. For example, as illustrated in FIG. 87, data packet 1257 contains data segments 1C and 1F routed to cell phone 32, data segments 2D and 2E routed to automobile 1255, and other unrelated data segments and junk data, all of which are delivered to different destinations unaffected by the temporary sharing of data packets with other un-related data segments.

Moreover, since no data packet contains a complete word, sound, or conversation, the data fragmentation and meshed routing employed by the SDNP media nodes in accordance with this invention renders the data packet's content incomprehensible and invulnerable to man-in the middle attacks. As shown in FIG. 90, at time $t_1$, man-in-middle attacker 630 sniffing data packets in transit in and out of media node $M_{a,j}$ sees only ciphertext packets 1270A, 1271A, 1272A, and 1273A. In the unlikely event that the encrypted files are broken, the underlying plaintext content of the packets 1270B, 1271B, 1272B, and 1273B comprises a scrambled incomplete mix of data segments. This data condition persists for only a fraction of a second before new data packets traverse the same media node. Even without scrambling and mixing, the limited time available to decrypt a data packet before it is re-encrypted, re-scrambled, re-split, or re-packeted renders even supercomputer attacks ineffective.

FIG. 91A illustrates the dynamic nature of SDNP media transport using time as the basis by which to represent the data transport. The data shown here is the same as the data overlay illustrated in the network graph of FIG. 87. In a time based representation, data packet 1056 from tablet 33 is split into data packets 1261A, 1261B, and 1261C. At time $t_2$, packet 1261A is split into new data packets 1262A and 1262B, and data packet 1261B is split into new data packets 1262C and 1262D; and data packet 1261C is updated to data packet 1262E without a change in content. At time $t_3$, data packet 1262A is updated into data packet 1263A without changing its content; and data packets 1262B and 1262C are mixed into data packet 1263B, while data packets 1262D and 1262E are mixed into data packet 1263. At time $t_4$, data packets 1263A, 1263B and 1263C are mixed to reconstitute data packet 1055.

SDNP data transport can also be represented in tabular form. For example, table 1279, shown in FIG. 91B, illustrates the processing of data packets at time $t_3$, showing the source media nodes, the incoming packets, the time the incoming packets were encrypted, the time the incoming packets were scrambled, the last time the data packets were mixed and split, i.e. meshed, and the resulting outbound packets. A media node uses this information in order to know what to do with incoming data packets, how to re-packet the data and how to re-encrypt or re-scramble the data if so desired.

As shown in FIG. 91C, another aspect of dynamic nature of SDNP media transport is its ability to temporarily hold packets in a media node waiting for other packets to arrive. Using the same data as shown previously in FIG. 87, this mechanism is illustrated in a time-based representation of packet 1056. At time $t_1$, the incoming data packet 1056 is scrambled and then split into data packet 1261D, comprising data segments 2B and 2C, and data packet 1261E, comprising packets 2A, 2D, 2E and 2F. At time $t_2$, the communiqué is broken into four pieces, data packets 1262F, 1262G, 1262H, and 1262J, the latter three the result of splitting data packet 1261E into data packet 1262G, comprising data segment 2F; data packet 1262H, comprising data segments 2D and 2E; and data packet 1262J comprising data segment 2A. Data packet 1261D, comprising data segments 2B and 2C, moves through the network with its content unchanged, i.e. as data packet 1262F at time $t_2$, and as data packet 1263D at time $t_3$. Similarly at time $t_3$, data packet 1262J, comprising data segment 2A, remains unchanged in its content as data packet 1263G.

To represent a data packet that is temporarily held in a media node, FIG. 91C illustrates the data packet moving from a given media node to the same media node in successive increments of time. For example, between time $t_3$ and time $t_4$, data packet 1263E comprising data segment 2F, the same as its predecessor data packet 1262G, is shown to move from media node $M_{a,s}$ to media node $M_{a,s}$, i.e. the packet is stationary. Although stationary data packet's state, encryption, and scrambling may change to reflect an updated time, the schematic's depiction of the content of data packet 1263E traveling from source media node $M_{a,s}$ to an identical destination media node $M_{a,s}$ at time $t_4$ means it is held in memory by media node $M_{a,s}$.

Similarly, between time $t_3$ and time $t_4$, data packet 1263F comprising data segments 2D and 2E, the same as its predecessor data packet 1262H, is shown to move from media node $M_{a,d}$ to media node $M_{a,d}$, again meaning the packet is stationary and held temporarily in memory. At time $t_4$ incoming data packet 1263D is mixed in media node $M_{a,s}$ with data packet 1263E, which has been held in memory there since time $t_3$ resulting in new merged data packet 1264A, comprising concatenated data segments 2B, 2C and 2F. This new data packet 1264A remains held in media node $M_{a,s}$ awaiting more incoming data. Meanwhile at time $t_4$ in media node $M_{a,d}$, data packets 1263F and 1263G are mixed and routed to media node $M_{a,s}$ as data packet 1264B, comprising data segments 2A, 2D and 2E. At time $t_f$, incoming data packet 1264B is mixed with stationary data packet 1264A waiting in media node $M_{a,s}$ since time $t_4$, creating original data packet 1056 sent to automobile 1255.

As described, in the methods shown in accordance with this invention, data may transit through the SDNP cloud or be held stationary in a specific media node awaiting the arrival of incoming data before proceeding.

Transport Command & Control

In order for a media node to know how to process incoming data packets, it must somehow obtain information regarding the algorithms, numeric seeds, and keys to be used in scrambling, unscrambling, encrypting, decrypting, mixing, splitting, inserting and deleting junk, and parsing data packets. This important information can be passed in variety of means or some combination thereof, including

- Passing shared secrets to the media node as part of SDNP software installation or revisions,
- Passing control data through the media nodes prior to sending content,
- Passing control data through the media nodes as part of the data packet,
- Passing control data through a data channel separate from the media nodes that are communicating the information, e.g. through a network "signaling server" operating in parallel to the media nodes,
- Storing information regarding the identity of devices connected to the SDNP network and their corresponding IP or SDNP addresses on SDNP name servers separate from signaling servers or servers operating as media nodes carrying content.

For example, as shown in FIG. 92A, at time $t_3$ corresponding to state 993 data packet 1262B, comprising data segment 1B, data packet 1262C, comprising data segments 1C and 1F, and data packet 1262H comprising unrelated data segments enter media node $M_{a,d}$. Upon entering the media node, the incoming data packets 1262B, 1262C and 1262H, which for clarity are shown in unencrypted form, are first processed by decryption and unscrambling operations. The data packets 1262B, 1262C and 1262H are then mixed including de-junking, i.e. removing junk bits, to produce output data packet 1263B, comprising data segments 1B, 1C and 1F. In order to perform this task, computer server 1220D, which is the host for media node $M_{a,d}$, must first obtain certain information relating to the times and corresponding states used to create the incoming data packets. This information can be contained in the data packet as a header or sent in advance to the media node from a signaling node or another media node. As described in the table of FIG. 91B, these incoming data packets were last encrypted at time $t_2$. The packets were last scrambled either at time $t_1$, corresponding to state 1301A, or possibly at time $t_2$, corresponding to state 1301B. This information must be delivered to node $M_{a,d}$ for it to properly process the incoming data in accordance with the conditions used to create the data packets. The state information at times $t_1$ and $t_2$ is used to create corresponding D-keys 1306A and 1306 needed for packet decryption of the incoming packets using $D_1$ key generator 1305A and $D_2$ key generator 1305B. The decryption key generators are realized using software located in a DMZ server attached to communication node $M_{a,d}$. The general operation and generation of encryption and decryption keys were described in the background of this disclosure. Unlike static encryption, encryption in the SDNP network is dynamic, meaning that the only way to create the proper decryption key is to know when the file was encrypted. This information is conveyed as a time or state delivered along with the incoming data packet, or alternatively before the packet arrives, and used to select the appropriate encryption algorithm to generate the associated decryption key. The encryption algorithms and their associated decryption key generators are stored as shared secrets in a secure DMZ server attached to communication node $M_{a,d}$.

Although the data packets may be encrypted, for the sake of illustration, the data packets are shown in their unencrypted form. The same state information is also employed by numeric seed generator 1303 to produce corresponding numeric seeds 1304A and 1304B to determine the algorithms used at times $t_1$ and $t_2$ to create the data packets. The numeric seeds can be generated in two ways. In one case the seeds are generated using software located in the DMZ servers attached to media nodes where scrambling, mixing and encryption of the communicated data packets occurred. In such cases the seeds must be delivered to communication node $M_{a,d}$ prior to the data packet's arrival.

In the other case, the time of the incoming packet's creation is delivered to communication node $M_{a,d}$ either as part of the incoming data packet's header or in a separate packet delivered in advance of the data. The time is then fed into numeric seed generator 1303 located within the DMZ server attached to communication node $M_{a,d}$. Regardless of where they are generated locally or at the source and then delivered, the generated numeric seeds are fed into selector 1307, comprising tables of scrambling algorithms 1308A, mixing algorithms 1308B, and encryption algorithms 1308C. Aside from the seed or state information associated with the data packets, i.e. contained within the packet's header or delivered prior to the data packet, the algorithms used to create the incoming data packets are not carried by or contained within the packet itself but instead are present locally either within the media node $M_{a,d}$ or in a secure server to which the media node $M_{a,d}$ has access. These algorithms, stored locally as shared secrets for a specific region 1302A, in this case zone Z1, are shared with every media node in the same zone. By knowing the time and state when a data packet was created, the media node $M_{a,d}$ is able to determine how each of the packets 1262B, 1262C and 1262H was created and how to undo the process to recover the plaintext data of each of the packets 1262B, 1262C and 1262H, e.g. how to decrypt an encrypted packet, unscramble a scrambled packet, etc. The use of shared secrets, as well as how they are distributed, is described later in the application.

The decryption keys 1306A and 1306B work together with the selected encryption algorithm 1309C to decrypt ciphertext into plaintext. Specifically, the encryption algorithm 1309C represents a sequence of mathematical steps that may be used to convert a data packet from ciphertext into plaintext. The decryption keys 1306A and 1306B then select a specific combination of those steps that is to be used in decrypting the packet, each one corresponding to the state or time when the incoming data packets were last encrypted. If both incoming packets were encrypted at the same time, only a single decryption key is needed. While the reference above is to "encryption" algorithm 1309C, it will be understood that an encryption algorithm defines its inverse—a decryption algorithm. With the exception of certain types of encryption using "asymmetric" keys, most of the algorithms are symmetric, meaning that the inverse of the algorithm used to encrypt or scramble a data packet can be used to decrypt or unscramble the data packet and restore its original content. In the specific example shown in FIG. 92A, for each time and state corresponding to incoming data packets 1262B, 1262C and 1262H, selector 1307 outputs a selected encryption algorithm 1309C needed for decrypting the incoming packet, a selected scrambling algorithm 1309A needed to unscramble the incoming packet, and a selected mixing algorithm 1309B needed to combine the packets into a certain order and remove junk data. As such, the encryption, scrambling, and mixing algorithms selected by selector 1307 are used to perform decryption, unscrambling, and mixing operations, respectively, on data packets 1262B, 1262H and 1262C by computer server 1220D at media node $M_{a,d}$. How the data is processed by the media node therefore depends both on the time and state of the incoming data packet and on the algorithms chosen. For example, selected mixing algorithm 1309B may arrange the incoming packets to be concatenated into a long packet in a sequence of decreasing time based on when the packet originated, e.g. with the oldest packet being placed at the front of the long packet and the newest data packet placed at the back. Or alternatively, the data can be arranged in chronological sequence of data segments as shown in data packet 1263B, i.e. data segment 1B before 1C, data segment 1C before 1F, etc. The processing of incoming data packets therefore requires time and state information pertaining to the creation of the incoming packets, not the current time or present state. Without first intercepting the state and time information of incoming packets, even a hacker gaining access to the algorithm tables and current states cannot decode, decipher, read or interpret a media node's incoming data. As stated previously, the selection of the algorithms by selector 1307 and key generation by key generators 1305A and 1305B depends on the geographical region or "subnet" where the data packets were created, shown in the example as zone info 1302A as "zone Z1". The use of zones will be described further later in this disclosure.

In contrast to the previous illustration showing control of incoming data packets, the control of outgoing data packets, shown in FIG. 92B depends, not on past times, and states, but on the current time and its corresponding state. As shown, at time $t_3$ and its corresponding state 1301C, numeric seed generator 1303 produces numeric seed 1304C used by selector 1307 to select the corresponding algorithms for splitting, scrambling and encryption from tables of scrambling algorithms 1308A, mixing algorithms 1308B, and encryption algorithms 1308C. Since mixing algorithm 1308B is commonly a symmetric function, the inverse of the algorithm employed for mixing is used for splitting, in this case splitting the long data packet into multiple packets ready for transport. In dual-channel or tri-channel communication, the destinations for all the generated packets are communicated to the node from a signaling server managing packet routing. In single-channel communication, the media nodes themselves must emulate the signaling server function, mapping their own route between callers.

The same state information 1301C is fed into $E_3$ key generator 1305C to produce E-key 1306C needed for encrypting outgoing data packets and into seed generator 1303 to produce the seed 1304C that is used to select the encryption algorithm 1309C from the table 1308C. The $E_3$ key works together with the selected encryption algorithm 1308C to encrypt plaintext into ciphertext. Specifically, the encryption algorithm represents a sequence of mathematical steps that may be used to convert a data packet from plaintext into one of millions, billions, or trillions of possible ciphertext results. The encryption key then selects a specific combination of those steps that is to be used in encrypting the packet.

In symmetric key cryptography, such as the Advanced Encryption Standard or AES, described in http://en.wikipedia.org/wiki/advanced_encryption_standard, the key used to encrypt the file is the same key used to decrypt it. In such an instance, it is beneficial to generate the key locally as a shared secret contained within each media node, e.g. using $E_3$ key generator 1305C. If a symmetric key must be supplied to a media node over a network, it is beneficial to deliver the key over a different communication channel than the media, i.e. the data packets and content, uses. Multi-channel communication is discussed later in this application.

Other means to improve secure delivery of a symmetric key is to supply it to the media nodes at a time unrelated to the communiqué itself, e.g. one week earlier, to encrypt the key with another layer of encryption, or to split the key into two pieces delivered at two different times. Another method employs using a key splitting algorithm in the $E_3$ key generator 1305C where part of the key remains locally in every media node as a shared secret, i.e. never present on the network, and the other portion is delivered openly. Security is enhanced because a cyber-pirate has no way to determine how many bits the real key is because they can only see a portion of the key. Not knowing the length of the key renders guessing the right key virtually impossible because the key length and each of the key's elements must be guessed.

In the case of an asymmetric or public key algorithm, $E_3$ key generator 1305C concurrently generates a pair of keys—one for encryption, the other for decryption based on the state 1301C or upon time $t_3$. The decryption key is retained in the media node as a shared secret while the encryption key is safely and openly forwarded to the media node preparing to send a data packet to it. One complication of using symmetric keys in real time networks is that the encryption key needs to be generated and forwarded to all the media nodes prior to launching the data packet containing content on the media channel, otherwise the data packet may arrive before the key to decrypt it and the data go stale, i.e. become too late to use. Descriptions of the use and management of asymmetric and public encryption keys is available in numerous texts and online publications such as http://en-.wikipedia.org/wiki/public-key_cryptography. While public key encryption is known technology, the disclosed application comprises a unique integration of cryptography into a real time network and communication system.

Algorithms, numeric seeds, and encryption keys are all generated for the current subnet zone 1307A, in this case zone Z1. Based on this zone and the current time $t_3$, encryption key 1306C, along with selected splitting algorithm 1309B, selected scrambling algorithm 1309A and selected encryption algorithm 1309C, is supplied to media node $M_a$, hosted on computer server 1220D to produce two outputs—output data packet 1263C comprising unrelated data segments sent onward at time $t_3$ and output data packet 1263B comprising data segments 1B, 1C and 1F to be held until time $t_4$ before routing to the next media node may continue. Instructions on whether to hold a data packet or data segment temporarily or send it on to the next media node immediately can be delivered to the media node in several ways. In one case the incoming data packet can embed instructions to hold it and till what time or for what precondition. Alternatively a signaling server, i.e. another communications channel, can give instructions to the media node what to do. The use of signaling servers in multi-channel secure communication is described later in this disclosure.

As shown in FIG. 93, in order to select an algorithm from a table of algorithms, which could be scrambling/unscrambling, encryption/decryption or mixing/splitting algorithms, selector 1307 must search through a list of algorithms and memory addresses 1308D, comparing them to an address 1304D generated by seed generator 1303 from time $t_x$ and corresponding current state 1301D. When the state-generated address 1304D matches an item in algorithm table 1308D, the selected algorithm 1309D is output from the search routine for use. For example if seed generator 1303 generates an address 1304D having a value of "356", then selector 1307 will identify the matching item from the table, namely "phase shift mod 2" and output it as selected algorithm 1309D.

To prevent systematic tracking, the list of algorithms and their corresponding memory addresses is reshuffled regularly, e.g. daily or hourly, so that the same address does not invoke the same algorithm even if it accidentally repeats. As shown in FIG. 94, the algorithm tables for day 318 in zone Z1 comprise algorithm address table 1308D used for scrambling and unscrambling in zone Z1 on day 318, i.e., algorithm address table 1308E used for splitting or mixing data packets in zone Z1 on day 318, i.e., and algorithm address table 1308F table used for encryption or decryption in zone Z1 on day 318. Then, on a prescribed event date 1311 and time 1310, re-assign address operation 1312 shuffles, i.e. mixes up, the lists of algorithms and addresses, producing three new tables comprising algorithm address table 1308G for scrambling and unscrambling in zone Z1 on day 319, a second table—algorithm address table 1308H for mixing and splitting in zone Z1 on day 319, and a third table for encryption and decryption in zone Z1 on day 319, i.e. algorithm address table 1308J. As shown for instance, on day 318, "transpose mod 5" has a corresponding memory address 359, but one day later the address changes to 424. In this manner, the conversion table between addresses and algorithms is shuffled to avoid hacking.

Zones and Bridges

In order to communicate globally while preventing a hacker or cyber-pirate from gaining access to the entirety of the SDNP cloud and network, in another embodiment of this invention, the SDNP communication network is subdivided into "zones." Herein, a zone represents a sub-division of the network, i.e. a "subnet" where each zone has its own unique command, control, and security settings including distinct and separate algorithms and algorithm tables that define mixing and splitting, scrambling and unscrambling, and encryption and decryption used in the zone as well as separate encryption keys and distinct numeric seeds. Naturally, communication servers running the SDNP software within the same zone share the same zone settings, operating in a manner completely agnostic to what zone it is in.

Each subnet can comprise different server clouds running the SDNP software hosted by different ISPs or hosting companies, e.g. Microsoft, Amazon, Yahoo, or may comprise private hosted clouds or network address translators (NATs), such as rented private clouds comprising dark fiber dedicated bandwidth. It is also beneficial to treat carriers providing last-mile service such as Comcast northern California, local PSTN, or local cell phone connections as separate zones. The key benefit of employing zones is, in the worst-case scenario where a genius cyber-pirate temporally defeats the SDNP security provisions, to limit the geographic scope of their assault to a smaller subnet, preventing access of end-to-end communications. In essence, zones contain the damage potential of a cyber assault.

An example of the use of zones is illustrated in FIG. 95A where cloud 1114 comprising computer servers 1118 running SDNP software is divided into two subnets, subnet 1318A comprising "zone Z1" and subnet 1318C comprising "zone Z2". As shown, Subnet 1318A comprises SDNP media nodes $M_{a,w}$, $M_{a,s}$, $M_{a,j}$, $M_{a,b}$, $M_{a,q}$, and $M_{a,f}$, along with $M_{b,d}$ and $M_{b,h}$, while subnet 1318C comprises SDNP media nodes $M_{c,j}$, $M_{c,n}$, $M_{c,v}$, $M_{c,u}$, and $M_{c,z}$, also along with media nodes $M_{b,d}$ and $M_{b,h}$. While the media nodes with the leading subscript "a", i.e. $M_{a,\_}$ are unique to zone Z1 and the media nodes with the leading subscript "c", i.e. $M_{c,\_}$ are unique to zone Z2, the media nodes $M_{b,d}$ and $M_{b,h}$, hosted by computer servers 1220D and 1220H, are unique in that they are shared by both subnets 1318A and 1318C. The SDNP software that runs on computer servers 1220D and 1220H must understand how to communicate with other media nodes in both zone Z1 and in zone Z2. Such devices, act as "bridges" between two subnets, and necessarily must translate data from zone Z1 secured files into data formatted in accordance with zone Z2 secured files, and vice versa.

The translation function performed in a bridge media node such as bridge media node $M_{b,d}$ is illustrated in FIG. 95B, which depicts the data flow from zone Z1 to zone Z2 where DUM operation 1210 within bridge computer server 1220D, which hosts bridge media node $M_{b,d}$, performs decryption, unscrambling and mixing for subnet 1318A, zone Z1, using algorithm tables 1308K, to create a long packet which it transfers to SSE operation 1213, also within media node $M_{b,d}$, which performs splitting, scrambling and encryption for subnet 1318C, zone Z2, using algorithm tables 1308L. The full duplex version of the bridge media node $M_{b,d}$ is shown in FIG. 95C, which shows that bridge media node $M_{b,d}$ performs bidirectional data transfer and translation from zone Z1 to zone Z2, and vice versa. For data translation from zone Z1 to zone Z2, SDNP bridge computer server 1220D, which is the host for bridge media node $M_{b,d}$, performs DUM operation 1210 on the data packets as they leave zone Z1 (subnet 1318A) followed SSE operation 1210 on the data packets as they enter zone Z2 (subnet 1318C). Conversely, for data translation from zone Z2 to zone Z1, SDNP bridge computer server 1220D performs DUM operation 1210 on the data packets as they leave zone Z2 (subnet 1318C) followed by SSE operation 1213 on the data packets as they enter zone Z1 (subnet 1213A). All four data operations performed at bridge media node $M_{b,d}$ are performed in software residing in the same computer server host, in this case computer server 1220D.

The fully integrated SDNP bridge media node $M_{b,d}$ illustrated in FIG. 95C, performs both DUM and SSE operations for two different zones, i.e. zone Z1 and zone Z2, all in shared computer server 1202D. Such a fully integrated implementation can only realized if the two connected subnets are hosted within the same ISP or cloud. If the subnets, however, reside in different clouds, hosted by different service providers, as shown by subnets 1318A and 1318C in FIG. 95D, a communication bridge must be realized between two computer servers not residing in the same cloud. As shown, bridge communication link 1316B connects SDNP bridge media node $M_{b,h}$ operating in zone Z1 to SDNP bridge media node $M_{b,u}$ operating in zone Z2, but zone Z1 operates in cloud 1114 while zone Z2 operates in a different cloud 1315. Utilizing the same method shown previously in FIG. 95C becomes problematic in the multi-cloud case because bridge communication link 1316B traveling between the clouds will be unsecured and vulnerable to sniffing and cyber-assaults. FIG. 95E illustrates such a case where DUM operation performed by bridge media node $M_{b,h}$ hosted by computer server 1220H in subnet 1318A and zone Z1 sends data packets through bridge communication link 1316B to bridge media node $M_{b,u}$ hosted by computer server 1220U in subnet 1318C and zone Z2 for translation, but because the communication is an unencrypted unscrambled long packet output from the DUM operation of bridge media node $M_{b,h}$, the cloud-to-cloud hop is unsecured and exposed to cyber-assaults.

The solution to this problem is to employ the two full-duplex bridge interface media nodes, one in each cloud as shown in FIG. 95F with secure communication transport between the interfaces. In zone Z1 to zone Z2 communication, data packets incoming from zone Z1 within subnet 1318A are converted into single-channel zone Z2 data, including scrambling and encryption. This function requires media node $M_{b,d}$ to have access to both zone Z1 and zone Z2, numeric seeds, encryption keys, algorithm tables, and other security items. All the processing is performed in computer server 1220D located within subnet 1318A, not in the zone Z2 destination cloud. The secure data is then transferred from bridge interface media node $M_{b,d}$ in subnet 1318A to bridge interface media node $M_{b,u}$ in subnet 1318C using secure bridge communication link 1316A. Upon arrival in bridge interface media node $M_{b,u}$ the data packets are processed in accordance with zone Z2 information and sent onwards into subnet 1318C.

Conversely, in zone Z2 to zone Z1 communication, incoming data packets from zone Z2 and subnet 1318C to media node $M_{b,u}$ are converted into single-channel zone Z1 data including scrambling and encryption. This function requires media node $M_{b,d}$ to have access to both zone Z1 and zone Z2, numeric seeds, encryption keys, algorithm tables, and other security items. All packets are processed in computer server 1220U located within subnet 1318C, not in the zone Z1 destination cloud. The secure data is then transferred from bridge interface media node $M_{b,u}$ in subnet 1318C to bridge interface media node $M_{b,d}$ in subnet 1318A using secure bridge communication link 1316C. Upon arrival in bridge interface media node $M_{b,d}$ the data packet is processed in accordance with zone Z1 information and sent onwards into subnet 1318A. Although secure bridge communication links 1316A and 1316C are depicted as separate lines, the lines represent distinct communication channels at the network layer 3 and are not intended to correspond to separate wires, cables, or data link at a hardware or PHY layer 1 description. Alternatively, a receiving bridge node can translate the data from the Z1 sending zone to the Z2 receiving zone, so long as the receiving bridge node hold shared secrets for both Z1 and Z2 zones.

SDNP Gateway Operation

The previous section describes a "bridge" as any media node or pair of media nodes communicating between separate subnets, networks, or clouds. In a similar manner, a SDNP "gateway media node" disclosed herein provides a communication link between the SDNP cloud and a client's device, e.g. a cell phone, automobile, tablet, notebook, or IoT device. Gateway media node operation is illustrated in FIG. 96A, where computer server 1220F in SDNP cloud 1114 hosting SDNP media node $M_{b,f}$ acts as a SDNP gateway media node between subnet 1318A and last-mile connection 1318D to tablet 33. Unlike subnet 1318A, last-mile connection 1318D may occur over the Internet, a private cloud, a cable TV connection, or a cellular link. In the last-mile routing cannot be controlled precisely as it is in subnet 1318A. For example, gateway media node $M_{b,f}$ links to server 65A by connection 1317 but beyond that point, routing to public WiFi base station 100 is controlled by local Internet routers. The WiFi radio link 29 from WiFi antenna 26 to tablet 33 is also controlled by a local device, often located in an airport, hotel, coffee shop, convention center, amphitheater, or other public venue.

Alternatively, the last mile may comprise a wired link to LTE base station 17, with a radio link 28 from antenna 18 to tablet 33. Because of its uncertain routing and access, it is beneficial not to share security settings or secrets used in the SDNP cloud with devices used in last-mile routing to a client. As such, last-mile link 1318D does not have access to zone Z1 information, but instead uses a separate zone U2 to manage security settings. In order to link the cloud 1114 and the last-mile, gateway media node $M_{b,f}$ necessarily has access to both zone Z1 and zone U2 security settings, facilitating communication between cloud interface 1320 and client interface 1321. To provide secure last-mile communication, the client, in the example shown tablet 33, must also be running SDNP client software application 1322.

SDNP gateway node $M_{b,f}$ comprises cloud interface 1320, facilitating communication among the media nodes within cloud 1114, and client interface 1321 facilitating communication across the last mile. As shown in FIG. 96B, cloud interface 1320 comprises two data paths, i.e. SSE 1213 and DUM 1210. Client interface 1321 shown in FIG. 96C also comprises two data paths—one for data flow from the gateway to the client, the other for data flow in the reverse direction from the client to the gateway. Specifically, data flow from the gateway to the client sequentially involves single-route splitting operation 1106 used to insert junk data into the data stream, followed by packet scrambling 926 and finally encryption 1026. In the opposite direction, data flow from the client to the gateway sequentially involves decryption 1032, packet un-scrambling 928, and single-route mixing operation 1089 used to remove junk data from the data stream. The roles of mixing and splitting operations in single route communication such as the last mile are two-fold. Firstly, and importantly, the real time data stream is divided into numerous sequential sub-packets each with their own identifying tags and possibly of varying length to defy easy detection. The resulting serial data stream therefore requires some data sub-packets to be held temporarily while the first packets are sent. Since communication data rates occur in the SDNP cloud at hundreds of gigabits per second, serialization is nearly instantaneous, requiring only nanoseconds. Within last mile communication the data rate is slower (but in modern systems is still very fast), e.g. two gigabits per second. No added delay occurs because WiFi, 4G/LTE, DOCSIS 3 and Ethernet all transmit data serially anyway.

Figure 67J:
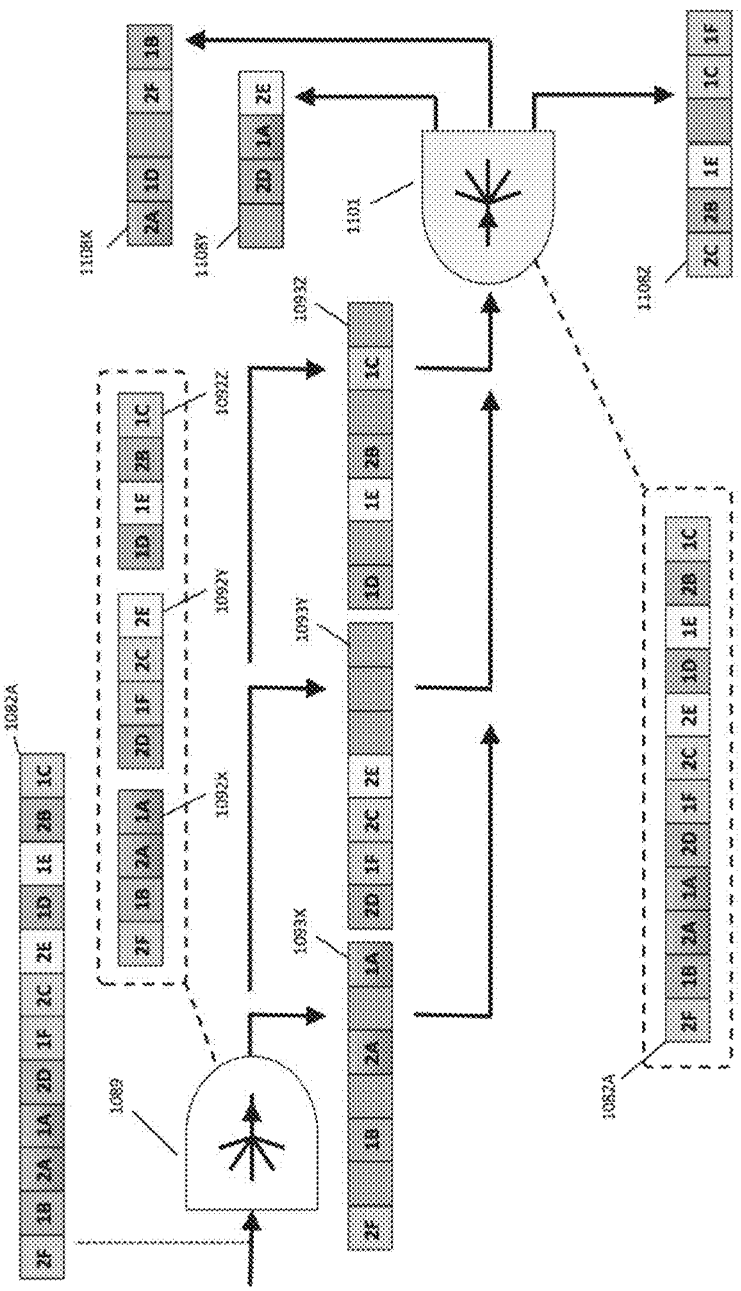
FIG. 67J is a flow chart illustrating the injection of junk data into the sub-packets.

The second need for single-channel mixing, the single-route mixing operation is also used to inject junk data into the sub-packets in varying ways to confound analysis in a manner previously described in regards to FIG. 67J.

As shown in FIG. 96D, to communicate securely over the last mile, the client must run client 1322 software. In a cell phone or tablet, this client software must run on the device's operating system, e.g., Android or iOS. In a desktop or notebook computer, client software runs on the computer's operating system, e.g., MacOS, Windows, Linux, or Unix. In the event that communication occurs with a consumer device such as IoT incapable of hosting the SDNP client software, a hardware device with embedded client firmware may be used as an interface. The communication related functions performed by client 1322 comprise processing of incoming data packets by decryption operation 1032, packet unscrambling 928, and de-junking using single route mixing operation 1089 to recover the packets payload. The content is then used in applications 1336 including data used for an audio CODEC, MPEG files, images, non-media files and software.

The communication related functions performed by client 1322 for outgoing data packets comprise inserting junk data in single-route splitting operation 1026, packet scrambling 926, and finally encryption operation 1106 to prepare the data packet for last mile communication to the gateway. Within client 1322 software, single-route mixing 1089 algorithmically removes junk data from the incoming data stream while the role single-route splitting 1026 is to insert junk data into the data packets.

Operation of secure SDNP gateway node $M_{b,f}$ is further detailed in FIG. 97A, where cloud interface 1320 and client interface 1321 receive incoming data packets from media node $M_{a,h}$, performing decryption, unscrambling, and mixing using DUM operation 1210 in accordance with zone Z1 security settings, resulting in exemplary data packet 1330 representing unscrambled plaintext. The data packet 1330 is then forwarded into client interface 1321, also operating within gateway media node $M_{b,f}$, which inserts junk packets 1053 as part of single-route splitting operation 1106 used for inserting junk 1053 into the data packets, but using zone U2 security settings, not the zone Z1 security setting that are used by the cloud. The data packet is next scrambled using scrambling operation 926, again utilizing last-mile specific zone U2 security settings to produce data packet 1329.

In the example shown, scrambling operation 926 utilizes an algorithm whereby the actual data segments are scrambled but every other data segment comprises a junk data segment. Next, encryption operation 1026 is also performed in client interface 1321, also using zone U2 security settings, to produce outgoing ciphertext 1328. The data fields may be individually encrypted separately from the junk data (as shown), or in an alternative embodiment, the entire data packet 1329 may be encrypted to form one long ciphertext. The encrypted data packet is finally forwarded, i.e. "exported", through a single communication channel to the client.

Concurrently, data received via the last-mile single-channel routing from the client comprising scrambled ciphertext 1327 is decrypted by decryption operation 1032, using zone U2 security settings including algorithms, decryption keys, etc., to produce scrambled plaintext data packet 1326, comprising a combination of scrambled data segments of data interspersed with junk data segments. In one embodiment of this invention, the junk packets of this incoming data packet 1326 are not positioned in the same slots as outgoing scrambled plaintext data packet 1329. For example, in the example of outbound data, every other packet comprises junk data, while in in the incoming data packet every $3^{rd}$ and $4^{th}$ slot, and integer multiples thereof, contain junk data.

The scrambled plaintext data packet 1326 is next processed using zone U2 security settings by packet unscrambling operation 928 and then by mixing operation 1089 to restore the original data order and to remove the junk packets, i.e. to de junk 1053 the data, resulting in unencrypted unscrambled data packet 1325. This data packet is then passed from client interface 1321 to cloud interface 1320, to perform cloud specific splitting, scrambling and encryption using SSE operation 1213, before forwarding the resulting fragmented data in different data packets for meshed routing to media node $M_{b,h}$ and others.

As further illustrated in FIG. 97B, the SDNP gateway media node $M_{b,f}$ utilizes software to facilitate full-duplex communication in both cloud interface 1320 in accordance with zone Z1 security settings, and in client interface 1321 in accordance with zone U2 security settings. The last-mile connection 1355 from client interface 1321 to tablet 33 via LTE base station 27, LTE radio tower 18, and radio link 28 is secure because the communication is scrambled and encrypted, and junk data has been inserted into the data packets. To interpret the incoming data packets and be able to securely respond, the client device, in this case tablet 1322, must be running SDNP-enabled device application software 1322.

The processing of data packets in the SDNP client interface is further detailed in FIG. 98, where client node $C_{2,1}$ securely communicates with SDNP gateway media node $M_{b,d}$ by the full duplex data exchange between client interface 1321 and SDNP client 1322, both being in security zone U2. In operation, data packets arriving from client interface 1321 are decrypted in decryption operation 1032, unscrambled in unscrambling operation 928, and de-junked using splitting operation 1089 before being processed by applications 1336. Conversely, the output of applications 1336 is processed by mixing operation 1026 to insert junk, then scrambled in scrambling operation 926 and encrypted in encryption operation 1106 before the data is forwarded to client interface 1321.

Using the methods disclosed herein, secure communication between two or more clients, statically or dynamically routed across a meshed network may employ any combination of mixing, splitting, encryption and scrambling algorithms managed in separate zones with separate keys, distinct numeric seeds, and dissimilar security-related secrets. As illustrated in FIG. 99A, a meshed network comprising computer servers 1118 running software-based SDNP media nodes includes computer servers 1220F and 1220D, hosting gateway media nodes $M_{b,f}$ and $M_{b,d}$. Security within subnet 1318A is managed by the security settings for zone Z1. Gateway media node $M_{b,d}$ connects to client node $C_{1,1}$, hosted on an external device, in this case cell phone 32, accessed through last-mile link 1318E. Security on last-mile link 1318E is governed by the security settings for zone U1. Similarly, gateway media node $M_{b,f}$ connects to client node $C_{2,1}$, hosted on tablet 33 and connected through last-mile link 1318D. Security for the last-mile link 1318D is governed by the security settings for zone U2.

As shown, communication using encryption operation 1339, symbolized by a padlock, provides security throughout the network and over the last mile links. To secure the last mile, encryption is necessarily performed within the client devices. Optionally, packets may be re-encrypted or double encrypted by the gateway media nodes, or in another embodiment, decrypted and re-encrypted by every media node in the meshed transport network. One embodiment of the invention disclosed herein is to facilitate multi-level security. For example, in FIG. 99A the last-mile communication links 1318D and 1318E rely solely on encryption, i.e. single level or 1-dimensional security. Within network 1318A, communication utilizes 2-dimensional or dual-level security, combining encryption with meshed network operation involving static splitting, multi-route transport, and mixing. In the event that the security settings vary with time, i.e., "dynamically," as data packets transit across the network, an added level of security is realized, i.e. 2-dimensional or dual-level security over the last mile and 3-dimensional security within the SDNP cloud.

As shown in FIG. 99B, adding scrambling into network 1318A augments security, into a higher grade of multi-level security combining meshed transport and encryption with scrambling. Specifically, in this approach, communication from client node $C_{2,1}$ to client node $C_{1,1}$ involves adding scrambling operation 926 into gateway media node $M_{b,f}$ and unscrambling operation 928 into gateway media node $M_{b,d}$. In communication from client node $C_{1,1}$ to client node $C_{2,1}$, encrypted data packets from client node $C_{1,1}$ are first decrypted, and then split for multi-route transport, scrambled by scrambling operation 926, and encrypted in gateway media node $M_{b,d}$. After transport through network 1318A, the data packets are decrypted, unscrambled using unscrambling operation 928, and then mixed. While this approach provides multi-dimensional security within network 1318A it does not provide multi-level security in the last mile, which employing single-channel transport without scrambling relies solely on encryption for its security.

Another embodiment of this invention, shown in FIG. 99C, extends the multi-level security technique combining encryption and scrambling to cover both network 1318A and last-mile connection 1318D to client node $C_{2,1}$. As such, communication from client node $C_{2,1}$ to client node $C_{1,1}$ includes scrambling operation 926 within client node $C_{2,1}$ and unscrambling operation 928 within gateway media node $M_{b,d}$. Communication from client node $C_{1,1}$ to client node $C_{2,1}$ utilizes scrambling operation 926 in gateway media node $M_{b,d}$ and unscrambling operation 928 hosted in client node $C_{2,1}$. Last-mile connection 1318E between client node $C_{1,1}$ and gateway media node $M_{b,d}$, however, relies solely on encryption. Such a case could occur where client node $C_{2,1}$ is running SDNP security-enabled software application but client node $C_{1,1}$, is only employing off-the-shelf encryption.

Another embodiment of the invention, shown in FIG. 99D, extends scrambling and encryption for multi-dimensional security from client-to-client, i.e. from end to end. As such, communication from client node $C_{2,1}$ to client node $C_{1,1}$ involves adding scrambling operation 926 within client node $C_{2,1}$ and unscrambling operation 928 within client node $C_{1,1}$. Communication from client node $C_{1,1}$ to client node $C_{2,1}$ involves adding scrambling operation 926 within client node $C_{1,1}$ and unscrambling operation 928 hosted in client node $C_{2,1}$. In operation, client node $C_{1,1}$ scrambles and encrypts any outgoing data packets and performs decryption and unscrambling on incoming data through SDNP-enabled software running in cell phone 32. Similarly, client node $C_{2,1}$ scrambles and encrypts any outgoing data packets and performs decryption and unscrambling on incoming data through SDNP enabled software running in tablet 33. Together, they facilitate end-to-end secure communication with dual-layer or 2-dimensional security, i.e. comprising encryption and scrambling, in last-mile connections 1318D and 1318E, and 3-dimensional or tri-layer security within meshed network 1318A through meshed and multi-route transport. In the event that the security settings vary with time "dynamically" as data packets transit across the network, an added level of security is realized, i.e. 3-dimensional or tri-level security over the last mile and 4-dimensional security within the SDNP cloud.

A possible weakness of this implementation is that the same scrambling methods and numeric seeds used by the client are also used to secure the SDNP cloud. As a result, the security settings for zones U2, Z1 and U1 are necessarily shared, risking the entire network and routing to discovery through last-mile cyber-assaults. One method available to counteract exposed cloud security settings is illustrated in FIG. 99E, where last-mile connection 1318D utilizes scrambling using zone U2 security settings while the cloud, uses zone Z1 security settings for its scrambling. In this example the client node $C_{2,1}$, running as an application in tablet 33, facilitates scrambling 926 according to zone U2 security settings. Gateway media node $M_{b,f}$ hosted by computer server 1220F unscrambles the incoming data packet using zone U2 security settings, then scrambles the data packets again using zone Z1 security settings for transport over meshed network 1318A. In this manner, the cloud's zone Z1 security settings are never revealed in last-mile connection 1318D.

A further improvement on multi-level security is illustrated in FIG. 99F, where scrambling and encryption occur using different security settings in three distinct zones—last-mile connection 1318D connecting the client node $C_{2,1}$ to gateway media node $M_{b,f}$, which utilizes zone U2 security settings, meshed network 1318A including gateway media nodes $M_{b,f}$ and $M_{b,d}$, which utilizes zone Z1 security settings, and last-mile connection 1318E, connecting gateway media node $M_{b,d}$ to client node $C_{1,1}$, which utilizes zone U2 security settings. This approach provides end-to-end security with end-to-end encryption, end-to-end scrambling, and meshed routing in the cloud representing dual-layer or 2-dimensional security in last-mile and tri-layer or 3-dimensional security in the cloud. In the event that the security settings vary with time dynamically as data packets transit across the network, an added level of security is realized, providing 3-dimensional or dual-level security over the last-mile and 4-dimensional security within the SDNP cloud.

In communication from client node $C_{2,1}$ to client node $C_{1,1}$, i.e. from tablet 33 to cell phone 32, a SDNP application running on client node $C_{2,1}$ scrambles the outgoing data packet using scrambling operation 926 with zone U2 security settings followed by encryption. The single-channel data packet traversing last-mile connection 1318D is first decrypted and then unscrambled by unscrambling operation 928 performed by gateway media node $M_{b,f}$, using zone U2 security settings. Using zone Z1 security settings, gateway media node $M_{b,f}$ then splits, scrambles and encrypts the data for meshed transport over network 1318A, using zone Z1 security settings. In gateway media node $M_{b,d}$, the data packet is decrypted, unscrambled with unscrambling operation 928, and then mixed into a data packet for single-channel communication, using zone Z1 security settings.

Gateway media node $M_{b,d}$ then scrambles and encrypts the single-channel data packet again, using zone U1 security settings, and then forwards the data on to client $C_{1,1}$. An SDNP-enabled application running on cell-phone 32 decrypts and then unscrambles using unscrambling operation 928 the final packet delivered to its destination using zone U1 security settings.

Similarly in the opposite direction, i.e. in communication from client node $C_{1,1}$ to client node $C_{2,1}$, i.e. from cell phone 32 to tablet 33, a SDNP application running on client node $C_{1,1}$ scrambles the outgoing data packet using scrambling operation 926 with zone U1 security settings, followed by encryption. The single-channel data packet traversing last-mile connection 1318E is first decrypted and then unscrambled by unscrambling operation 928, performed by gateway media node $M_{b,d}$, using zone U1 security settings. Using zone Z1 security settings, gateway media node $M_{b,d}$ then splits, scrambles and encrypts the data for meshed transport over network 1318A, using zone Z1 security settings. In gateway media node $M_{b,f}$ the data packet is decrypted, unscrambled with unscrambling operation 928, and then mixed into a data packet for single-channel communication using zone Z1 security settings. Gateway media node $M_{b,f}$ then scrambles and encrypts the single-channel data packet, using zone U2 security settings, and forwards the data to client node $C_{2,1}$. An SDNP-enabled application running in tablet 33 decrypts and then unscrambles the data using unscrambling operation 928 and zone U2 security settings. The data packet is then delivered to the client, in this case tablet 33.

As stated previously, all communications links shown carry encrypted data regardless of scrambling and mixing, as depicted by pad lock icon 1339. The detailed encryption and decryption steps are not shown for the purpose of clarity. In one embodiment, the data packets are decrypted and encrypted (i.e., re-encrypted) each time data traverses a new media node. In the very least, in every media node performing re-scrambling, incoming data packets are decrypted before unscrambling then scrambled and encrypted. A summary of the available multilayer security achievable with meshed transport, encryption, and scrambling—all employing zone-specific security settings—is shown in the following table.

| Security Method | Cloud Security | Last Mile Security |
|---|---|---|
| Meshed Routing in Cloud, No Encryption, No Scrambling | 1-D | None |
| Meshed Routing, End-to-End Encryption, No Scrambling | 2-D | 1-D |
| Meshed Routing, End-to-End Scrambling + Encryption | 3-D | 2-D |
| Dynamic Meshed Routing, End-to-End Scrambling + Encryption | 4-D | 3-D |
| Dynamic Meshed Routing, End-to-End Scrambling + Encryption + Junk | 4-D | 3.5-D |

As shown in the above table, adding dynamic changes to the encryption and scrambling during transport over time confers an added level of security by limiting the time in which a cyber-criminal has to sniff the packet and "break the code" to read a data packet. Dynamic changes can occur on a daily, hourly, or scheduled period or on a packet-by-packet basis, changes roughly every 100 msec. From the above table, it is also clear that the last mile is less secure than transport through the cloud.

One means of augmenting the last-mile security is to dynamically insert junk data segments into the data stream, and even to send packets consisting entirely of junk, as decoys, wasting the computing resources of cyber-criminals by decoding worthless data. This improvement is represented as by the change from 3-D to 3.5-D, signifying that inserting junk data is not as good a security enhancement as that achieved through encryption, scrambling, and multi-route transport, but it is still an improvement, especially if the junk insertions vary over time, and differ in incoming and outgoing packets. Another important aspect to improve SDNP security in accordance with this invention is to employ "misdirection", i.e. to obscure the real source and destination during packet routing, a topic discussed later in this disclosure.

Delivery of Secrets, Keys, and Seeds

SDNP-based secure communication relies on exchanging information between communicating parties that outside parties are not privy to or aware of or whose meaning or purpose they are unable to comprehend. Aside from the actual content of the data being transmitted, this information may include shared secrets, algorithms, encryption and decryption keys, and numeric seeds. A "shared secret," as used herein, is information that only certain communicating parties know or share, e.g., a list of mixing, scrambling, and/or encryption algorithms, an encryption and/or decryption key, and/or a seed generator, number generator, or another method to select specific ones over time. For example, the selector 1307, shown in FIG. 92B, is a shared secret.

Working in conjunction with shared secrets, numeric seeds, which may be based on a time and/or state, are then used to select specific algorithms, invoke various options, or execute programs. By itself, any specific numeric seed has no meaning, but when combined with a shared secret, a numeric seed can be used to communicate a dynamic message or condition across a network without revealing its meaning or function if intercepted.

Similarly, to execute encrypted communication, encryption requires a specific algorithm agreed upon by the communicating parties, i.e. a shared secret, and the exchange of one or two keys used for encryption and decryption. In symmetric key methods, the encryption and decryption keys are identical. Symmetric key exchanges are resilient to attacks provided the key is long, e.g. 34 bits or 36 bits, and that the time available to break the cipher is short, e.g. one second or less. For any given encryption algorithm, the ratio of the number of bits used in a symmetric encryption key divided by the time in which the key is valid is a measure of the robustness of the encryption. As such, symmetric keys can be used in a dynamic network, provided that they are large and that the time available to break the encryption is short. As an alternative, encryption algorithms may be employed wherein the encryption and decryption keys are distinct, or "asymmetric" with one key for encryption and another for decryption. In open communication channels, asymmetric keys are advantageous because only the encryption key is communicated and the encryption key gives no information about the decryption key. Working in concert, the combination of symmetric and asymmetric encryption keys, numeric seeds, and shared secrets—all varying over time dynamically, provides superior multi-dimensional security to SDNP communication. Numerous general references on cryptography are available, e.g. "Computer Security and Cryptography" by Alan G. Konheim (Wiley, 2007). Adapting encryption to real time communication is, however, is not straightforward and not anticipated in the available literature. In many cases, adding encryption to data communication increases latency and propagation delay, degrading the network's QoS.

Shared secrets can be exchanged between client nodes and media nodes prior to an actual communiqué, message, call, or data exchange. FIG. 100A illustrates how shared secrets can be distributed in conjunction with SDNP-executable code installation. Within zone Z1, secure software package 1352A comprises executable code 1351 and zone Z1 shared secrets 1350A, which may include seed generator 921, number generator 960, algorithms 1340, encryption key 1022, and decryption key 1030, or some combination thereof. Secure software package 1352A for zone Z1, including executable code 1351 and shared secrets 1350A, is delivered to the media servers 1118 in cloud 1114 and to both "DMZ" servers 1353A and 1353B. The installation of executable code 1351 in media nodes $M_{a,b}$, $M_{a,f}$ and others hosted in servers 1118 occurs concurrently with the installation of the shared secrets for zone Z1, i.e. Z1 secrets 1350A, in separate computers referred to here as DMZ servers 1353A and 1353B.

The term DMZ, normally an acronym for demilitarized zone, in this case means a computer server not directly accessible through the Internet. DMZ servers can control one or numerous network-connected servers functioning as media nodes, but no media server 1118 can access any DMZ server—DMZ servers 1353A, 1353B and any others (not shown). All software and shared secrets distribution occurs in secure communications valid for only a short duration as depicted by time clocked padlock 1354. If the software delivery is late, an SDNP administrator must reauthorize the download of the secure software package 1352A for zone Z1 after personally confirming the account holder's identity and credentials.

To elaborate, the description of DMZ server as a "computer server not connected directly to the Internet" means that no direct electronic link exists between the Internet and the servers. While Z1 file 1352A may in fact be delivered to the server or server farm over the Internet, file installation into the DMZ requires the intervention account administrator of the server or server farm working in cooperation with the account holder. Before installing files into the DMZ, the account administrator confirms the identity of the account holder and the validity of the installation.

After confirming the installation, the administrator then loads the file containing Z1 secrets into the DMZ server using a local area network (LAN) linking the administrator's computer directly to the DMZ server. The LAN is, therefore, not directly connected to the Internet, but requires authorized transfer through the administrator's computer after a rigorous authentication process. The installation of the shared secrets is unidirectional, the files being downloaded into the DMZ servers with no read access from the Internet. Uploading the DMZ content to the Internet is similarly prohibited, thereby preventing online access or hacking.

The shared secret installation process is analogous to a bank account that is not enabled for online banking, but where only with the client's approval can a bank officer manually perform an electronic wire transfer. By denying Internet access, intercepting shared secrets would require a physical entry and on-location attack at the server farm, one where the LAN fiber must be identified, spliced, and intercepted precisely at the time of the transfer. Even then, the file being installed is encrypted and available for only a short duration.

The same concept can be extended to multi-zone software deployment, shown in FIG. 100B, where an SDNP administration server 1355 is used to send a secure software package 1352A for zone Z1 to DMZ server 1353A, as zone Z1 secrets 1350A, and to media servers 1118 in cloud 1114, as executable code 1351. SDNP administration server 1355 is likewise used to distribute a secure software package 1352B for zone Z2 to DMZ server 1353B, as zone Z2 shared secrets 1350B, and to the media servers in cloud 1315, as executable code 1351. SDNP administration server 1355 also delivers a secure software package 1352C including the executable code 1351 to the bridge media nodes $M_{b,f}$ in SDNP cloud 1114 and $M_{b,n}$ in SDNP cloud 1315, and the shared secrets 1350C for both zones Z1 and Z2, to DMZ server 1353C. Bridge media nodes $M_{b,f}$ in SDNP cloud 1114 and $M_{b,n}$ in SDNP cloud 1315 receive the executable code 1351 directly from administration server 1355 and the zone Z1 and zone Z2 shared secrets from DMZ server 1353C. Since bridge media node $M_{b,f}$ performs a translation between Z1 and Z2 secrets, only it (and any other bridge server not shown) need access to both Z1 and Z2 shared secrets. Otherwise the nodes in zone Z1 require access only to zone Z1 shared secrets and the nodes in zone Z2 require access only to zone Z2 shared secrets It is important to highlight that while SDNP administration server 1355 supplies shared secrets to DMZ servers 1353A, 1353B and 1353C, SDNP administration server 1355 has no knowledge as to what happens to the shared secrets after delivery, nor does it perform any command or control influence over the shared secrets once delivered. For example, if a list of algorithms is shuffled, i.e. reordered, so that the address for a specific algorithm changes, SDNP administration server 1355 has no knowledge as to how the shuffling occurs. Likewise, SDNP administration server 1355 is not a recipient of numeric seed or key exchanges between communicating parties and therefore does not represent a point of control. In fact, as disclosed, no server in the entire SDNP network has all the information regarding a package, its routing, its security settings, or its content. Thus, the SDNP network is uniquely a completely distributed system for secure global communication.

Delivery of shared secrets to a DMZ server, as shown in FIG. 101A, is performed in a strictly defined process whereby SDNP administration server 1355 establishes communication with DMZ server 1353A and goes through an authentication process to confirm if the computer is in fact an SDNP-authorized DMZ server. The process can be automated or can involve human interaction and verification of account owners in a manner similar to a bank transfer. In either case, only when authentication confirms the authenticity of DMZ server 1353A, is an electronic authorization certificate 1357 generated, allowing SDNP administration server 1355 to transfer its secrets and code to DMZ server 1353A. Once loaded, these settings are sent to media servers 1361, 1362, and 1363, instructing media nodes $M_1$, $M_2$, and $M_3$, respectively how to process incoming and outgoing data packets.

The same DMZ server 1353A can manage more than one media server, e.g. media server array 1360, or alternatively multiple DMZ servers can carry the same security settings and shared secrets. The media nodes may all be operating to carry media, content, and data cooperatively using timesharing, and load balancing. If the communication loading on media server array 1360 drops, media node $M_3$ can be taken offline, indicated symbolically by open switches 1365A and 1365B, leaving media node $M_2$ still operating, as indicated by closed switches 1364A and 1364B. The switches do not indicate that the input and the outputs of the particular server are physically disconnected but just that the server is no longer running the media node application, thereby saving power and eliminating hosting use fees for unneeded servers. As illustrated, one DMZ server 1353A can control the operation of more than one media server by downloading instructions, commands, and secrets from DMZ server 1353A to any server in server array 1360, but the converse is not true. Any attempt to gain information, to write, query, or inspect the contents of DMZ server 1353A from a media server is blocked by firewall 1366, meaning that the content of the DMZ server 1353A cannot be inspected or discovered through the Internet via a media node.

An example of secure communication in accordance with this invention based on shared secrets is illustrated in FIG. 101B, where prior to any communication, shared secrets 1350A for zone Z1 were supplied by an administration server (not shown) to all DMZ servers in zone Z1, including DMZ servers 1353A and 1353B. Such shared secrets may include, without limitation, seed generator 921, number generator 960, algorithms 1340, encryption key 1022, and decryption key 1030. During communication between sending media node $M_S$ and receiving media node $M_R$ hosted by media servers 1118, DMZ server 1353A passes shared secrets to sending media node $M_s$ to prepare payload packet 1342 comprising data 1341 and state 920, describing the time payload packet 1342 was created. Before transmission from media node $M_S$, payload packet 1342 is also encrypted, using encryption operation 1339, represented symbolically by a padlock.

Upon receiving secure payload packet 1342, receiving media node $M_R$ decrypts packet 1342, using decryption key 1030 contained within shared secrets 1350A supplied by DMZ server 1353B, and then, using state information 920 specific to the data packet 1342, recovers data 1341. In an alternative embodiment, numeric seed 929 may also be sent a priori, i.e. before the communication of payload packet 1342, from sending media node $M_S$ to receiving media node $M_R$ as a numeric seed 929 with a temporary life. If it is not used within a certain period of time or if payload packet 1342 is delayed, the seed's life expires and it self-destructs, rendering media node $M_R$ unable to open payload packet 1342.

Another example of secure communication in accordance with this invention, based on shared secrets combined with a seed and a key encapsulated within the packet being delivered, is illustrated in FIG. 101C. In this example, prior to any communication, shared secrets 1350A for zone Z1 are supplied to all zone-Z1 DMZ servers, including servers 1353A and 1353B. Such shared secrets may, without limitation, include seed generator 921, number generator 960, and algorithms 1340, but they do not include keys such as encryption key 1022, and decryption key 1030. During communication between sending media node $M_S$ and receiving media node $M_R$ hosted by media servers 1118, DMZ server 1353A passes shared secrets to sending media node $M_S$ to prepare payload packet 1342, comprising data 1341, state 920 (describing the time payload packet 1342 was created), and encryption key 1022 (which is used for encrypting future payload packets). Before routing, payload packet 1342 is encrypted using encryption operation 1339, represented symbolically by a padlock.

Upon receiving secure payload packet 1342, receiving media node $M_R$ decrypts packet 1342, using decryption key 1030, which has a temporary life and was supplied a priori, i.e. before the communication of payload 1342, in a separate communication between sending media node $M_s$ and receiving media node $M_R$. This earlier data packet may be secured by shared secrets such as another decryption, a dynamic algorithm, a numeric seed, or a combination thereof. If decryption key 1030 is not used within a certain period of time, or if data packet 1342 is delayed, the decryption key 1030 expires and self-destructs, rendering media node $M_R$ unable to open payload packet 1342. While decryption key 1030 can alternatively be included in payload packet 1342, this technique is not preferred.

One way to avoid delivering all of the security-related information with the content is to split and separate the channel used to deliver command and control signals from the media communication channel used to deliver content. In accordance with this invention, such a "dual-channel" communication system, shown in FIG. 102, comprises a media channel carried by media servers and a command and control channel carried by a second network of computers, referred to herein as signaling servers. During communication, the signaling server 1365 running installed SDNP software operates as signaling node $S_1$ for carrying command and control signals while the media servers 1361, 1362, and 1363 running installed SDNP software operate as media nodes $M_1$, $M_2$, $M_3$ respectively for carrying content and media. In this manner, the media channel does not carry command and control signals and command and control signals need not be delivered over the media channel either combined with the payload or separately as an a priori data packet delivered in advance of the data packet containing the message content.

In operation, packets are delivered to signaling node $S_1$ describing the routing and security settings for media packets expected as incoming packets to server array 1360. These special purpose packets are referred to herein as "command and control packets." During communication, the command and control packets are sent to media servers 1361, 1362, and 1363 instructing media nodes $M_1$, $M_2$, and $M_3$, respectively how to process incoming and outgoing data packets. These instructions are combined with information residing within DMZ server 1353A. As previously described, the same DMZ server 1353A can manage more than one media server, e.g. media server array 1360. The media nodes may all be operating to carry media, content, and data cooperatively, using timesharing, and load balancing. If the communication loading on media server array 1360 drops, media node $M_3$ can be taken offline, indicated symbolically by open switches 1365A and 1365B, leaving media nodes $M_1$ and $M_2$ still operating, as indicated by closed switches 1364A and 1364B. The switches do not indicate that the input and the outputs of the particular server are physically disconnected, but rather that the server is no longer running the media node application, thereby saving power and eliminating hosting use fees for unneeded servers.

As illustrated, one DMZ server 1353A, working in conjunction with signaling server 1365 can control the operation of more than one media server by downloading instructions, commands, and secrets from DMZ server 1353A to any server in server array 1360, but the converse is not true. Any attempt to gain information, to write, query, or inspect the contents of DMZ server 1353A from signaling server 1365 or from media servers 1361, 1362, and 1362 is blocked by firewall 1366, meaning that the content of the DMZ server 1353A cannot be inspected or discovered through the Internet via a media node.

Thus, in a dual-channel communications system the command and control of a communications network uses a different communications channel, i.e. unique routing, separate from the content of the messages. A network of signaling servers carry all of the command and control information for the network while the media servers carry the actual content of the message. Command and control packets may include seeds, keys, routing instructions, priority settings, etc. while media includes voice, text, video, emails, etc.

One benefit of dual-channel communication is the data packets contain no information as to their origins or ultimate destinations. The signaling server informs each media server what to do with each incoming data packet on a "need to know" basis, i.e. how to identify an incoming packet by the address of the node that sent it, or alternatively by a SDNP "zip code," what to do with it, and where to send it. In this way a packet never contains more routing information than that pertaining to its last hop and its next hop in the cloud. Similarly, the signaling servers carry command and control information but have no access to the content of a data packet or any communication occurring on the media channel. This partitioning of control without content, and content without routing confers a superior level of security to dual-channel SDNP-based networks.

An example of dual-channel secure communication in accordance with this invention is illustrated in FIG. 103A, where command and control data packets comprising seed 929 and decryption key 1080 are communicated by signaling servers 1365 while media and content are communicated between media servers 1118. In this example, prior to any communication, zone Z1 secrets 1350A are supplied to all zone-Z1 DMZ servers including servers 1353A and 1353B, where such shared secrets may, without limitation, include seed generator 921, number generator 960, and algorithms 1340, but do not include keys such as decryption key 1030. Before communication commences, signaling node $S_s$, hosted by sending signaling server 1365, sends a command and control packet comprising numeric seed 929 and decryption key 1030 or other security settings to destination signaling node $S_d$. This information, combined with shared secrets and security settings contained within DMZ servers 1353A and 1353B, is then used to instruct how sending media node $M_S$ should transfer encrypted payload 1342 to receiving media node $M_R$. The encryption of payload 1342 information is illustrated by padlock 1339.

In this manner, aside from the data 1341 being communicated, the only security-related data included within payload packet 1342 is state 920, describing the time that payload packet 1342 was created. Once payload packet 1342 arrives at receiving media node $M_R$, it is decrypted by decryption key 1030. After being decrypted, seed 929, combined with state information 920 and shared secrets 1350A supplied by DMZ server 1353B, is used to unscramble, mix and split payload packet 1342 and other incoming data packets in accordance with the previously disclosed methods. Although the data packet may carry information of the time it was last modified—state information especially useful for generating decryption keys locally, the concurrent use of a seed transmitted over the command and control channel enables identifying splitting and unscrambling operations performed previously on the incoming data packet but at a time not necessarily performed in the immediately previous node.

In an alternate embodiment shown in FIG. 103B, numeric seed 929 is delivered a priori, i.e. before payload packet 1342, over the media channel but decryption key 1030 is still delivered over the signaling channel. As such, a combination or permutations of delivery methods is possible in order to communicate securely. As an alternative, the delivery of seeds, keys and other dynamic security settings can be varied over time.

In order to facilitate the end-to-end security described previously, executable code, shared secrets, and keys also have to be installed in a client, typically downloaded as an application. To prevent revealing security settings used on the SDNP network, these downloads are defined in a separate zone known only by the client and the cloud gateway node with which it communicates. As shown in FIG. 104, to enable a mobile device such as cell phone 32 to communicate using the SDNP cloud, it must first become an authorized SDNP client. This step involves downloading zone U1 software package 1352D from SDNP administration server 1355 to client node $C_{1,1}$, i.e. cell phone 32, using secure download link 1354, valid for only a limited time window. If the download takes too long to complete or fails to meet certain authentication criteria confirming that the user is a real device and not a hacker's computer pretending to be a client, the file is never decrypted or installed on the cell phone 32. Contained within zone U1 software package 1352D is executable code 1351, specific to the OS of the cell phone 32 or other device to which the code is being installed, e.g. iOS, Android, Windows, MacOS, etc., and zone U1 secrets 1350D, which may include some combination of seed generator 921, number generator 960, algorithms 1340, encryption key 1022 and decryption key 1030, all specific to client zone U1.

For any zone U1 external client node $C_{1,1}$ to communicate with the zone Z1 SDNP cloud 1114, gateway nodes such as media node $M_{a,d}$, must receive information regarding both the zone Z1 and the zone U1 security settings, as contained within the zone U1, Z1 download package 1352E. Using time-limited, secure download methods indicated by padlock 1354, both the zone Z1 and the zone U1 secrets are downloaded via link 1350C into DMZ server 1353C, and executable code 1351 is downloaded via link 1351 and installed into SDNP media node $M_{a,d}$ as well as into any other zone Z1 media nodes required to perform gateway connections between cloud 1114 and external clients, i.e. connections supporting last-mile connectivity. Once both media node $M_{a,d}$ in zone Z1 and client node $C_{1,1}$ in zone U1 are both loaded with the content of download packages 1352E and 1352D respectively, then secure communication 1306 can ensue, including encryption operation 1339.

Since communication from a secure cloud in zone Z1 hosted on media servers 1118 to client node $C_{1,1}$ hosted on an external device such as cell phone 32 in zone U1 may likely occur over a single communication channel, some means is needed to convert the dual-channel communication employed within the cloud 1114 to single-channel communication needed over the last mile. An example of the role of the SDNP gateway node in implementing dual-channel to single-channel conversion is illustrated in FIG. 105A, where zone Z1 command and control packets entering signaling node $S_d$ in signaling server 1365 are combined with media content in gateway media node $M_R$ to create single-channel communication with payload packet 1342, comprising data 1341 along with zone U2 security settings including state 920, providing the time when the data packet 1342 was created, numeric seed 929, and encryption key 1022, to be used for encrypting the next packet, i.e. the packet to be created by node $C_{1,1}$.

Payload packet 1342 is encrypted using encryption operation 1339. To decrypt payload packet 1342, decryption key 1030 must be used, where the decryption key 1030 comprises one of several shared zone U1 secrets 1350D, downloaded previously into secure app and data vault 1359 along with other zone U1 secrets such as seed generator 921, number generator 960 and algorithms 1340. Alternatively, as shown in FIG. 105B, an a priori seed 929 can be delivered first and used to unscramble a scrambled decryption key

1030, which in turn is used to decrypt payload 1342. State 920 may then be used to decrypt or unscramble data 1341 providing multiple barriers to combat security breaks in last-mile communication.

In order to prevent pattern recognition of algorithms used repeatedly by a client, the address or code used to select an algorithm from a list of algorithms installed on a client is, in accordance with this invention, changed at a regular schedule, for example, weekly, daily, hourly, etc. This feature, referred to as "shuffling" occurs in a manner analogous to shuffling the order of cards in a deck and similar to the shuffling performed within the network. Shuffling reorders the numbers used to identify any given algorithm in a table of algorithms, regardless whether such algorithm table comprises a method for scrambling, mixing, or encryption. As shown in FIG. 106, to shuffle any algorithm table in client node $C_{1,1}$, e.g. hosted on cell phone 32, while insuring that the SDNP cloud is able to interpret the new algorithm addresses, signaling server 1365, hosting signaling node $S_s$, sends numeric seed 929 to client node $C_{1,1}$, which in turn feeds the seed into zone U1 number generator 960. The resulting number is used to trigger shuffling algorithm 1312, converting zone U1 algorithm table 1368A into a new zone U1 algorithm table 1368F and storing the revised table in secure apps and data register 1359, located within client node $C_{1,1}$. A signaling server (not shown) creates numeric seed 929 based on state information derived from schedule time 1310 and event date 1311 used to schedule the shuffling process. The same state and date information is used to shuffle the tables in DMZ server 1353A, insuring that the cloud and client algorithm tables are identical and synchronized.

An improved method to pass security settings from the cloud to client node $C_{1,1}$ is to employ dual-channel communication, as shown in FIG. 107, where media node $M_R$, hosted by media server 1118, sends numeric seed 929 to the client node $C_{1,1}$, and signaling node $S_d$, hosted by a separate signaling server 1365, sends decryption key 1030 to client node $C_{1,1}$. The advantage of this method is that that the decryption key 1030 comes from a different source, with a different SDNP packet address, than the numeric seed 929 and the payload packet 1342. A possible disadvantage is that, despite the fact that the communication paths are different, it is likely in many cases that both network channels are carried by the same physical medium, for example a single WiFi or LTE connection to cell phone 32. Scrambling or encrypting decryption key 1030 before its transport from signaling server 1365 to the client node $C_{1,1}$ can largely correct this deficiency, so that it cannot be intercepted or read by packet sniffing.

In operation, numeric seed 929, passed via the media channel from media node $M_R$ to client node $C_{1,1}$, is used to select a decryption algorithm from algorithm table 1340 and unlocking the security on decryption key 1030 shown by padlock 1339C. Once unlocked, decryption key 1030 is used to unlock the encryption performed on payload packet 1342 by encryption operation 1339B. Numeric seed 929, in conjunction with zone U1 secrets 1350D, is then used to recover data 1341 for use by client node $C_{1,1}$.

If an asymmetric key exchange is employed, as shown in FIG. 108, DMZ server 1353A creates a pair of asymmetric keys comprising secret decryption key 1030A, and public encryption key 1370A The decryption key 1030A remains secret in the DMZ server as a zone Z1 secret and the public encryption key 1370A is passed via signaling node $S_d$ to key exchange server 1369. The key exchange server 1369 holds the encryption key 1370A until it is needed, then passes it as needed to client device 1335. When client node $C_{1,1}$ prepares a payload data packet 1342 to be sent to media node $M_R$, it first downloads the zone Z1 encryption key 1370A from key exchange server 1369 While the signaling server can pass the encryption key to client node $C_{1,1}$ directly, numerous advantages exist for using key exchange server 1369. The first benefit of using a public key exchange server is the benefit of being hidden in plain sight, i.e. "safety in numbers". Since a public key server potentially issues millions of encryption keys there is no way for an interloper to know which key to ask for to hack into an unauthorized conversation. Even if by some miracle they choose the right key, the encryption key only allows them to encrypt messages, not to decrypt them. Thirdly, the distribution of public keys frees the signaling server from having to distribute keys and confirm delivery. Finally, by employing a public key exchange server, there is no way for a cyber pirate to trace where the encryption key came from, making it difficult to trace a caller through their signaling server.

After obtaining the encryption key 1370A, node $C_{1,1}$ on client device 1335 encrypts the payload packet 1342 using the selected encryption algorithm and encryption key 1371B. Since media node $M_R$ has access to the decryption key 1030 from DMZ server 1353A, it is able to unlock payload packet 1342 and read the file. Conversely, zone U1 secrets 1350D contain a decryption key 1030 corresponding to an encryption key (not shown) passed from client node $C_{1,1}$ to key exchange server 1369. When media node $M_R$ prepares a data packet for client node $C_{1,1}$, it downloads the zone U1 encryption key 1370A and then encrypts the payload packet 1342 for delivery to client node $C_{1,1}$. Since cell phone 32 has access to the zone U1 secrets, including zone U1 decryption key 1030, it is able to decrypt and read payload packet 1342.

In the aforementioned specified methods and other combinations thereof, secure communication including the delivery of software, shared secrets, algorithms, number generators, numeric seeds, and asymmetric or symmetric encryption keys can be realized in accordance with this invention.

SDNP Packet Transport

Another inventive aspect of secure communication in accordance with this invention is the inability for a cyber attacker to determine where a data packet or a command and control packet came from and to where it is destined, i.e. the true source and the final destination are disguised, revealing only the source and destination of a single hop. Moreover, within a single SDNP cloud the SDNP addresses employed are not actual IP addresses valid on the Internet but only local addresses having meaning with the SDNP cloud, in a manner analogous to a NAT address. In contrast to data transport in a NAT network, during the routing of data across the SDNP network, the SDNP addresses in the data packet header are rewritten after each node-to-node hop. Moreover, the media node does not know the routing of a data packet other than the last media node where it came from and the next media node where it will go. The protocols differ based on the previously disclosed single-channel and dual-channel communication examples, but the routing concepts are common.

Single-Channel Transport

One example of single-channel communication is shown in FIG. 109, where data packets are transported across a SDNP meshed network connecting tablet 33 and cell phone 32, each running SDNP-enabled application 1335. In secure communication from client node $C_{2,1}$ to client node $C_{1,1}$ the data traverses a single-channel last-mile routing in zone U2 from client node $C_{2,1}$ to media node $M_{a,f}$, followed by meshed routing in the zone Z1 SDNP cloud from gateway media node $M_{a,f}$, to gateway media node $M_{a,d}$, culminating in single-channel last-mile routing in zone U1 from media node $M_{a,d}$ to client node $C_{1,1}$. Data packet 1374B illustrates the IP addressing where the packet is sent from source IP Addr TB to IP Addr MF, the IP address for media server 1220F.

These last-mile addresses represent real IP addresses. Once entering the zone Z1 cloud, the source IP address in SDNP packet 1374F changes to a pseudo-IP address SDNP Addr MF, an NAT type address that has no meaning in the Internet. Assuming for simplicity's sake that network routing involves a single hop, then the destination address is also a pseudo-IP address, in this case SDNP Addr MD. Over the last mile in zone U1, the addresses shown in SDNP packet 1374G revert to real IP addresses, with a source address of IP Addr MD and a destination IP Addr CP. In real-time packet transport, all of the SDNP media packets use UDP, not TCP. As described previously, the payload varies by zone—in last-mile zone U2, the payload of SDNP media packet 1374B comprises a U2 SDNP packet, in meshed network and SDNP cloud zone Z1 the payload of SDNP media packet 1374F comprises a Z1 SDNP packet, and in last-mile zone U1 the payload of SDNP media packet 1374G comprises a U1 SDNP packet. So unlike in Internet communication, a SDNP media packet is an evolving payload, changing in address, format and content and it traverses the communication network.

FIGS. 110A-110F contain a series of flow charts illustrating how a single-channel SDNP communication takes place. In single-channel ad hoc communication, the communicating parties exchange information over a single channel, the media channel, in a sequence to create a session and then to transfer data or voice. As shown in step 1380A of FIG. 110A, the client opens the SDNP-enabled application 1335 and commences a dialog with any SDNP default media server listed on default SDNP server table 1375. Any one of the default SDNP servers, in this case media server 1120S, hosting media node $M_{a,s}$, is used as a first contact number whenever an authorized client wishes to initiate a call or establish a session using the SDNP network. In single-channel communication, server 1220S performs two functions—acting as a default server for first contact from new callers, and concurrently performing the function of a media server for carrying calls already initiated. In an alternative embodiment, a separate dedicated "name server" is used to operate as first contact, not at the time a call is initiated but whenever the devices first connects, i.e. registers, on the network. The use of a name server in accordance with this invention is disclosed later in this application.

The client's SDNP-enabled application 1335 can be an SDNP-enabled secure application like a personal private messenger or secure email running on a cell phone, tablet or notebook. Alternatively, the client may comprise secure hardware devices running embedded SDNP software. SDNP-embedded devices may include an automotive telematics terminal; a POS terminal for credit card transactions; a dedicated SDNP-enabled IoT client, or a SDNP router. A SDNP router disclosed herein is a general purpose hardware peripheral used to connect any device not running the SDNP software to the secure SDNP cloud, e.g. any notebook, tablet, e-reader, cell phone, game, gadget with Ethernet, WiFi or Bluetooth connectivity.

After client application 1335 contacts one of the default SDNP servers, it is next redirected to a SDNP gateway node. The gateway node may be selected by its physical proximity between the client's location and the server, by the lowest network traffic, or as the path with the shortest propagation delay and minimum latency. In step 1380B, the default SDNP server 1220S redirects the client's connection to the best choice SDNP gateway media server 1220F, hosting SDNP gateway media node $M_{a,f}$. Gateway media node $M_{a,f}$, then authenticates both parties' certificate 1357, confirms the user, establishes whether the call is free or a premium feature and, as applicable, confirms an account's payment status, and thereafter commences a SDNP session.

In step 1380C, the client application 1335 sends an initial SDNP packet 1374A requesting address and routing information for the call destination, i.e. the person or device to be called, using route query 1371, directed to gateway media server 1220F. Since the SDNP packet 1374A, which includes route query 1371, represents a command and control packet rather than real-time communication (i.e., data packet), it is delivered using TCP rather than UDP. The route query 1371 may specify that the contact information be provided to client application 1335 in any number of formats, including the phone number, SDNP address, IP address, URL, or a SDNP specific code, e.g. a SDNP zip code of the destination device, in this case cell phone 32. Route query 1371 is therefore a request for information about the party being called, i.e. for any necessary information to place the call, comprising for example either the SDNP zip code, their IP address, or their SDNP address.

In step 1380D of FIG. 110B the SDNP gateway media node $M_{a,f}$ searches the SDNP cloud 1114, acquires the destination address, meaning that media node $M_{a,f}$ identifies the party being called and obtains any necessary information to place the call, comprising for example either the SDNP zip code, the IP address, or the SDNP address of the person being called, and then in step 1380E, SDNP gateway media node $M_{a,f}$ supplies the routing information, the path which the call will take, and the encryption keys needed to traverse the specific zone to client application 1335 Once the client, tablet 33, obtains the destination address, in step 1380F, tablet 33, initiates a call with SDNP data packet 1374B. Voice sound waves 1384A, captured by microphone 1383A, are converted into digital information by an audio CODEC (not shown) and fed into application 1335. Combining the audio data with address routing and other information assembled into to a SDNP header, application 1335 constructs SDNP data packet 1374B for first-mile routing from "IP Addr TB" to "IP Addr MF" and commences packet transport to media node $M_{a,f}$. SDNP header, embedded into the payload 1372 of data packet 1374B, may include urgency, delivery preferences, security protocols, and data-type specifications. Since the first-mile routing of SDNP data packet 1374B occurs using an IP address, packet transport is similar to conventional Internet traffic, except that the actual data content is scrambled and encrypted using SDNP zone U2 security settings, and the SDNP header contained in the U2 SDNP payload 1372 encapsulating the data is also formatted specifically in accordance with the secure dynamic network protocol for zone U2. The secure dynamic network protocol for zone U2 is the set of shared secrets specifically applicable for communication traversing that specific zone, e.g. a zone U2 seed calculated using a zone U2 specific seed generator, i.e. a seed generation method using an algorithm, as described previously in the example of FIG. 51A, but using security settings, tables, etc. specific to Zone U2. Similarly, the zone U2 encryption and scrambling algorithms are based on the security settings specific to Zone U2. As such, packets transmitted by tablet 33 are scrambled and encrypted in the manner described above based on a state (time) and that these packets contain decryption keys and seeds that identifies the state (time) they were created enabling the packets to unscrambled and decrypted by media node $M_{a,f}$ using the security settings specific for zone U2.

To summarize, each node identifies each packet it receives by its tag. Once the node has identified the packet, it performs whatever decryption, unscrambling, mixing, scrambling, encryption and splitting operations on the packet that the signaling server has instructed it to perform, in the order specified. The algorithms or other methods used in these operations may be based on a state, e.g., the time when the packet was created, or a seed generated in accordance with an algorithm that is determined by a state. In performing each operation, the node may use the state or seed to select a particular algorithm or method from a table in its memory. Again as instructed by signaling server, the node gives each packet a tag and then routes the packet on to the next node in its journey across the SDNP network. It is understood, of course, that where the incoming packets have been mixed and/or split, the packets transmitted by a node will not normally be the same as the packets it receives, as some data segments may have been transferred to other packets, and data segments from other packets may have been added. Thus, once a packet has been split, each resulting packet gets its own tag and travels on its own route completely ignorant of how its "siblings" will make it to the same ultimate destination. The node is ignorant of the route of each packet except for the next hop.

In single-channel SDNP systems, the gateway and other media nodes have to perform triple duty, emulating the jobs of the name server and the signaling server. In fact, single-channel, dual-channel and tri-channel systems differ in that the three functions—packet transmission, signaling and "name"—are performed in the same servers in a single-channel system, in two types of servers in a dual-channel system, and the three types of servers in a tri-channel system. The functions themselves are identical in all three types of systems.

In a distributed system, the servers that perform the signaling function know the ultimate destination of the packets, but no single server knows the entire route of the packets. For example, the initial signaling server may know a portion of the route, but when the packets reach a certain media node the signaling function is handed off to another signaling server, which takes over the determination of the route from that point on.

To take a rough analogy, if a packet is to be sent from a cell phone in New York City to a laptop in San Francisco, the first signaling server (or the first server performing the signaling function) might route the packet from the cell phone to a local server in New York (the entry gateway node) and from there to servers in Philadelphia, Cleveland, Indianapolis and Chicago, a second signaling server might route the packet from the Chicago server to servers in Kansas City and Denver, and a third signaling server might route the packet from the Denver server to servers in Salt Lake City, Reno and San Francisco (the exit gateway node) and finally to the laptop, with each signaling server determining the portion of the route that it is responsible for based on the propagation delays and other current traffic conditions in the SDNP network. The first signaling server would instruct the second signaling server to expect the packet in the Chicago server, and the second signaling server would instruct the third signaling server to expect the packet in the Denver server, but no single signaling server (or no server performing the signaling function) would know the full route of the packet.

Of course, as indicated above, the packet may be mixed and split along its route. For example, instead of simply routing the packet from the Philadelphia server to the Cleveland server, the signaling server could instruct the Philadelphia server to split the packet into three packets and route them to servers in Cincinnati, Detroit and Cleveland, respectively. The signaling server would then also instruct the Philadelphia server to give each of the three packets a designated tag and it would inform the servers in Cincinnati, Detroit and Cleveland of the tags so that they could recognize the packets Step 1380G of FIG. 110C illustrates SDNP data packet 1374C being routed from gateway media node $M_{a,f}$, hosted by media server 1220F, to SDNP media node $M_{a,j}$, hosted by media server 1220J. In single-channel communication, the routing of the data is first determined at the time that the gateway first obtained the address being called in step in 1380D. Unlike the first-mile routing of IP data packet 1374B, this first intra-cloud hop of SDNP packet 1374C occurs using SDNP addresses "SDNP Addr MF" and "SDNP Addr MJ," not recognizable on Internet. In single-channel communication, the routing of the data, i.e., the sequence of nodes through which each packet will pass on its route to its destination, is determined at the time that the gateway node (here node $M_{a,f}$) first obtains the address being called (here in step 1380D.

Payload 1373A of SDNP data packet 1374C is scrambled and encrypted, using SDNP zone Z1 security settings, and the SDNP header contained in the SDNP data packet 1374C encapsulating the data within payload 1373A is also formatted specifically in accordance with the secure dynamic network protocol for zone Z1. The secure dynamic network protocol for any zone is the set of shared secrets specifically applicable for communication traversing that specific zone, in this case a zone Z1 seed calculated using a zone Z1 seed algorithm, a zone Z1 encryption algorithm and so on. For security purposes, zone Z1 security settings are not communicated to zone U2, and vice versa.

Step 1380H illustrates SDNP data packet 1374D being routed from media node $M_{a,j}$, hosted by media server 1220J, to SDNP media node $M_{a,s}$, hosted by media server 1220S The cloud hop of SDNP packet 1374D also occurs using SDNP addresses "SDNP Addr MJ" and "SDNP Addr MS," not recognizable on the Internet. Payload 1373B of SDNP data packet 1374D is scrambled and encrypted, using SDNP zone Z1 security settings, and the SDNP header contained in the SDNP data packet 1374D encapsulating the data within payload 1373B is also formatted specifically in accordance with the secure dynamic network protocol for zone Z1.

This process of sending a packet between nodes in the SDNP cloud may occur once or may be repeated multiple times, each repetition involving re-packeting and re-routing operation 1373.

The final cloud-hop of SDNP packet 1374E, shown in step 1380J of FIG. 110D, likewise occurs using SDNP addresses "SDNP Addr MS" and "SDNP Addr MD," not recognizable on Internet. SDNP data packet 1374E is routed from media node $M_{a,s}$, hosted by media server 1220S, to SDNP gateway media node $M_{a,d}$, hosted by media server 1220D. Payload 1373C within SDNP data packet 1374E is scrambled and encrypted using zone Z1 SDNP security settings, and the SDNP header contained in the SDNP data packet 1374E encapsulating the data within payload 1373C is also formatted specifically in accordance with the secure dynamic network protocol for zone Z1.

In step 1380K, data packet 1374G is routed out of the secure cloud from gateway media node $M_{a,d}$, hosted by media server 1220D, to client node $C_{1,1}$, hosted by application 1335 on cell phone 32. This last-mile routing of IP packet 1374G occurs using IP addresses "IP Addr MD" and "IP Addr CP," recognizable on the Internet, except that payload 1374 within IP packet 1374G is scrambled and encrypted using SDNP zone U1 security settings, and the SDNP header contained in the SDNP data packet 1374G encapsulating the data within payload 1374 is also formatted specifically in accordance with the secure dynamic network protocol for zone U1. Upon delivering the data contents of payload 1374 to application 1335 in cell phone 32, speaker 1388B converts the digital code into sound 1384A using an audio CODEC (not shown).

In step 1380L, shown in FIG. 110E, the called person responds with voice directed in the opposite direction from the original communication. As such, voice sound waves 1384B are captured by microphone 1383B and converted into digital code by an audio CODEC (not shown) implemented within application 1335 in cell phone 32. Using zone U1 SDNP security settings, the voice data is combined with a zone U1 SDNP header to create payload 1375, and directed from "IP Addr CP" to "IP Addr MD," using IP data packet 1374H. This first-mile routing of IP packet 1374H occurs using IP addresses recognizable on the Internet, except that payload 1375 within data packet 1374H is scrambled and encrypted using zone U1 SDNP security settings, and the SDNP header contained in the SDNP packet 1374H encapsulating the data within payload 1375 is also formatted specifically in accordance with the secure dynamic network protocol for zone U1.

As shown in step 1380M, upon receiving the IP packet 1374H, gateway media node $M_{a,d}$, hosted by server 1220D, converts the addressing to SDNP routing and sends SDNP data packet 1374J and its payload 1376A to media node $M_{a,j}$, hosted by computer server 1220U, using zone Z1 security settings. This SDNP node-to-node communication may comprise a single node-to-node hop or involve transport through a number of media nodes, with each hop involving re-packeting and re-routing operation 1373.

In step 1380N of FIG. 110F, SDNP data packet 1374K and its zone Z1 specific payload 1376B is directed from media node $M_{a,j}$, hosted by computer server 1220J, to gateway media node $M_{a,f}$, hosted by computer server 1220F. The SDNP addresses "SDNP Addr MJ" and "SDNP Addr MF" used within SDNP packet 1374K are SDNP-specific addresses similar to NAT addresses and do not represent valid Internet routing. In step 1380P, gateway media node $M_{a,f}$ converts the contents of the incoming data packet from a zone Z1 specific payload 1376B into a zone U2 payload 1377 and using IP addresses "IP Addr MF" and "IP Addr TB" directs IP packet 1374L to client node $C_{2,1}$ hosted by tablet 33, as shown in FIG. 109. Application 1335 then extracts the payload 1377 data and after decryption and unscrambling converts the digital code using an audio CODEC (not shown) into sound waves 1384B produced by speaker 1388A.

The entire ad hoc communication sequence to initiate the call and to route voice from the caller, i.e. tablet 33, to the person called, i.e. cell phone 32, is summarized in FIG. 111A. As shown, IP command and control packet 1374A is used to obtain contact information to determine routing, and IP data packet 1374B is used to initiate first-mile routing, using IP addresses to reach the SDNP gateway node $M_{a,f}$ at an IP address of "IP Addr MF". All first-mile communication between tablet 33 and the SDNP cloud 1114 uses zone U2 security settings.

The gateway media node $M_{a,f}$ then converts the routing to SDNP-specific routing addresses and uses SDNP packets 1374C, 1374D, and 1374E to move the communication through the SDNP cloud 1114 from "SDNP Addr MF" to "SDNP Addr MJ" to "SDNP Addr MS" to "SDNP Addr MD" respectively, all using zone Z1 security settings. This sequence is functionally equivalent to SDNP data packet 1374F directing the communication packet from "SDNP Addr MF" directly to SDNP Addr MD". Because there is no routing supervisor in ad hoc communication to oversee packet delivery, the command and control of packet routing within the SDNP cloud 1114 can be accomplished in one of two ways. In one embodiment, the source and destination addresses of each of SDNP data packets 1374C, 1374D, and 1374E explicitly and rigorously define the hop-by-hop path of the packet through the SDNP network, the path being chosen in single-channel communication by the gateway media node in advance for the best overall propagation delay during transport. In an alternative embodiment, a single "gateway-to-gateway" packet, e.g. SDNP data packet 1374F, is used to define the SDNP nodal gateways into and out of the SDNP cloud, but not to specify the precise routing. In this embodiment, each time a packet arrives in a SDNP media node, the media node prescribes its next hop much in the same way as routing over the Internet occurs, except that the SDNP media node will automatically select the shortest propagation delay path, whereas the Internet does not.

Finally, when packet 1374E reaches the gateway media node $M_{a,d}$ at "SDNP Addr MD," the gateway media node $M_{a,d}$ creates IP data packet 1374G, converting the incoming data packet into IP addresses "IP Addr MD" and "IP Addr CP" and changes the security settings to those of zone U1.

Another summary of this routing is shown in FIG. 111B, comprising three intra-cloud hops 1441C, 1441D and 1441E, and two last-mile routings 1441B and 1441F. The packet addresses shown below the cloud map reveal a mix of two forms of packet addresses during transport—IP address routing and SDNP address routing, analogous to the use of NAT addresses. Specifically, packet addresses 1442A and 1442F represent Internet IP addresses while packet addresses 1442C and 1442D represent SDNP IP addresses. Packet addresses 1442B and 1442E, used by the gateway media nodes, contain both IP and SDNP addresses, meaning SDNP gateway nodes are responsible for address translation as well as for converting zone U2 security settings into zone Z1 security settings and for converting zone Z1 settings into zone U1 security settings.

In a similar manner, FIG. 112A summarizes the reply portion of the communication, comprising first-mile zone U1 data packet 1374J, using IP addresses "IP Addr CP" and "SDNP Addr MD"; SDNP cloud routing using SDNP addresses "SDNP Addr MD", "SDNP Addr MJ', and "SDNP Addr MF" in zone Z1 specific data packets 1374K and 1374L; and last-mile zone U2 data packet 1374J, using IP addresses "IP Addr CP" and "SDNP Addr MD". The corresponding cloud routing map is shown in FIG. 112B, where first-mile hop 1441H and last-mile hop 1441L use IP only addresses 1442G and 1442L, intra-cloud hops 1441J and 1441K use only SDNP addresses, and gateway media nodes $M_{a,d}$ and $M_{a,f}$ perform translation between IP and SDNP addresses 1442H and 1442K.

FIG. 113A is a schematic diagram illustrating how an SDNP packet is prepared. During a voice or video communication, sound, voice or video signal 1384A is converted into analog electrical signals by microphone 1383A and then digitized by audio video CODEC 1385. The resulting digital data string 1387 comprising a sequence of data segments represented in sequence alphabetically (9A, 9B, etc.), is then subjected to parse operation 1386 to make smaller data packet 1388 comprising audio or video content, then junk 1389 is inserted by single-channel splitting operation 1106. Single-channel splitting operation 1106 involves parsing 1386 long packet 1387 into smaller packet 1388 and inserting junk data 1389, resulting in extended data packet 1390 comprising two sections—one with header Hdr 9, the other with junk header J. The string of data segments contained between Hdr 9 and Hdr J contain the audio or video data in packet 1388 with some trailing junk data segments. The data segments following Hdr J contain no useful data. SSE operation 1213 then scrambles the data from former packet 1388 to create data string 1391, adds SDNP preamble 1399A to create SDNP packet 1392, and then encrypts the entire packet, except for the SDNP preamble, to create scrambled, encrypted payload 1393A, which in turn is loaded into SDNP packet 1374B with source address "IP Addr TB" and destination address "IP Addr MF", ready for routing. The headers Hdr 9 and Hdr J allow each component piece to be identified within the payload. The function and the format of the headers and the SDNP preamble are discussed later in the application.

In a similar manner, the data segments 9G et seq. in data string 1387 are formed into additional SDNP packets.

FIG. 113B illustrates various other methods can be used in the creation of a payload from its original serial data. For example, the data string 1387 from CODEC 1385 can be parsed and split in a different manner. As shown, data segments 9A, 9B, 9D, and 9F are assembled into the Hdr 91 section with missing data segments replaced by junk data, while data segments 9C and 9E are assembled into the Hdr 92 section, together creating data packet 1394. Next, the data segments in each header's section are scrambled so that the individual data segments in data field 1399C following Hdr 91 are not mixed with the data segments in data field 1399E following Hdr 92. The resulting SDNP packet 1395 comprises SDNP preamble 1399A, a first header 1399B labeled Hdr 91, a first data field 1399C, a second data header 1399D (Hdr 92) and a second data field 1399E. Other methods may be employed to spread the data segments 9A-9F of data string 1387 across the various data fields. The one shown is for illustrative purposes only.

SDNP packet 1395, containing multiple data fields separated by multiple headers, may then be encrypted in one of several ways. In full-packet encryption, all of the data in SDNP packet 1395 is encrypted, except for the data in SDNP preamble 1399A, i.e. all the content of first header 1399B, first data field 1399C, second data header 1399D and second data field 1399E are all encrypted to form SDNP packet 1396 comprising unencrypted SDNP preamble 1399A and ciphertext 1393A. Alternatively, in message encryption, SDNP packet 1397 comprises two separately encrypted ciphertext strings—ciphertext string 1393B, comprising the encryption of data header 1399B and data field 1399C, and ciphertext string 1393C, comprising the encryption of data header 1399D and data field 1399E. In another embodiment of this invention, referred to as data-only encryption, only data-fields 1399C and 1399E are encrypted into ciphertext strings 1393D and 1393E, but data headers 1399B and 1399D are left undisturbed. The resulting SDNP packet 1398 comprises plaintext for SDNP preamble 1399A, first data header 1399B, and second data header 1399D and ciphertext strings 1393D and 1393E, representing independently encrypted versions of data fields 1399C and 1399E respectively In single-channel communication, to relay required routing and priority information to the next media node, SDNP payload 1400, shown in FIG. 114, must carry the requisite information. This data is contained either in the SDNP preamble 1401 or in the data field header 1402. SDNP preamble 1401 comprises information relevant to the entire packet, including a description of the number of data fields "Fld #" with up to eight possible fields, the length of each data field "L Fld X," where in this embodiment, X may vary from 1 to 8 fields, the SDNP zone where the SDNP packet was created, e.g. zone Z1, two numeric seeds, and two keys generated through the shared secrets.

Data field header 1402 follows a fixed format for each one of the X data fields. Data field header 1402 includes an address type for the destination and the destination address of the specific data field, i.e. the destination of this specific hop in the cloud. The destination address of every data field in a given packet is always the same because the packet remains intact until it arrives at the next media node. When a packet is split into multiple packets, however, the field destination addresses in each of the split packets is different from the field destination addresses in each of the other split packets if the packets are going to different media nodes.

In multi-route and meshed transport, the field destination address is used for splitting and mixing the various fields used in dynamic routing.

The address type of the next hop can change as the packet traverses the network. For example it may comprise an IP address between the client and the gateway, and an SDNP address or a SDNP zip once it enters the SDNP cloud. The destination may comprise an SDNP specific routing code, i.e. SDNP address, SDNP Zip, or an IPv4 or IPv6 address, a NAT address, a POTS phone number, etc.).

The packet field labeled "Field Zone" describes the zone where a specific field was created, i.e. whether a past encryption or scrambling was performed with U1, Z1, U2, etc. zone settings. In some instances, unscrambling or decrypting a data packet requires additional information, e.g. a key, seed, time or state, in which case the packet field labeled "Field Other" may be used to carry the field-specific information. The packet field labeled "Data Type", if used, facilitates context-specific routing, distinguishing data, prerecorded video, text and computer files not requiring real time communication from data packets containing time sensitive information such as voice and live video, i.e. to distinguish real-time routing from non-real-time data. Data types include voice, text, real-time video, data, software, etc.

The packet fields labeled "Urgency" and "Delivery" are used together to determine best how to route the data in a specific data field. Urgency includes snail, normal, priority, and urgent categories. Delivery includes various QoS markers for normal, redundant, special, and VIP categories. In one embodiment of this invention, the binary size of the various data fields as shown in table 1403 is chosen to minimize the required communication bandwidth. For example, data packets as shown may range from 0 to 200B whereby eight packets of 200B per data field means that a SDNP packet can carry 1,600B of data.

Dual-Channel Communication

In one embodiment of dual-channel SDNP data transport, shown in FIG. 115, content travels through media channels from client node $C_{2,1}$, hosted on tablet 33, to gateway media node $M_{a,f}$ over zone U2 first-mile routing, then across zone Z1 meshed routing, hosted on computer servers 1118, and finally from gateway media node $M_{ad}$ over zone U1 last-mile routing to client $C_{1,1}$ hosted on cell phone 32. Routing is controlled by first-mile IP packet 1374B, SDNP packet 1374F over the SDNP meshed network, and last-mile IP packet 1374G.

In parallel, to the media and content transport, client $C_{2,1}$, communicating with signaling node $S_s$, hosted by signaling server 1365, sends numeric seed 929 and decryption key 1030 to client $C_{1,1}$ through signaling server $S_d$, seed 929 and decryption key 1030 being based on the time or state when client $C_{2,1}$ sent them. By exchanging security settings such as keys and seeds (also known as security credentials) directly between the clients over signaling route 1405, and not through zone Z1, end-to-end security is realized beneficially eliminating any risk of a network operator in zone Z1 gaining access to security settings and compromising the security of Zone U1 or Zone U2. This embodiment represents yet another dimension of security in SDNP network communication. Seed 929, for example, may be used to scramble and unscramble the data packets in the client's applications. Similarly, as shown, decryption key 1030 allows only client $C_{1,1}$ to open the encrypted message. Since key 1030 and numeric seed 929 never pass through zone Z1, a network operator cannot compromise the network's security. When the data packets enter the gateway node $M_{a,f}$ from client $C_{2,1}$, the incoming data packets are already encrypted and scrambled. The packets received by client $C_{1,1}$ from gateway node $M_{a,d}$ are in the same scrambled and/or encrypted form as those leaving client $C_{2,1}$ and destined for gateway node $M_{a,f}$. The network's dynamic scrambling and encryption present in every node (but not explicitly shown in FIG. 115) represent a second layer of security facilitated by the SDNP cloud. In other words, this outer end-to-end security layer comprising the exchange of security credential directly between clients is in addition to the SDNP-cloud's own dynamic scrambling and encrypting.

Thus, as shown in FIG. 115, the signaling nodes $S_s$ and $S_d$ instruct the media nodes $M_{a,f}$ and $M_{a,d}$ to route the data from "IP Addr TB" to "IP Addr MF" in zone U2 using IP packet 1374B, from "SDNP Addr MF" to "SDNP Addr MD" in zone Z1 using SDNP packet 1374F, and from "IP Addr MD" to "IP Addr CP" in zone U1 using IP packet 1374G. In this embodiment, since signaling nodes $S_s$ and $S_d$ only communicate directly with client nodes $C_{2,1}$ and $C_{1,1}$ and indirectly through the data packets on the media communication channel with gateway media nodes $M_{a,f}$ and $M_{a,d}$, the only routing instruction to the meshed network is from gateway to gateway, using SDNP packet 1374F. The signaling servers $S_s$ and $S_d$ are unable to communicate to intermediate media nodes within the meshed network. So, in the embodiment shown in FIG. 115, the media nodes manage dynamic security within the cloud as a single-channel communication system while the signaling nodes are used to facilitate end-to-end security beyond the SDNP cloud, i.e. beyond Zone Z1.

In another embodiment of dual-channel SDNP data transport, shown in FIG. 116, the signaling nodes $S_s$ and $S_d$, hosted by servers 1365, facilitate end-to-end security for the clients and concurrently manage dynamic routing and security within the SDNP cloud. As such the signalizing nodes $S_s$ and $S_d$ not only transmit numeric seed 929 and decryption key 1030 between client nodes $C_{2,1}$ and $C_{1,1}$ end-to-end, using signal route 1405, but they also pass zone-specific seed 929 and decryption key 1030 as well as node-by-node single hop routing instructions, using dynamic SDNP packet 1374Z, carried by signal route 1406, to every single media node in the meshed network through which the communication packets and content move. In this manner, the signaling nodes $S_s$ and $S_d$ control routing and security, and the media nodes within the network carry content and implement the instructions from the signaling nodes $S_s$ and $S_d$. In such an implementation, either the media nodes or the signaling nodes $S_s$ and $S_d$ carry the responsibility of tracking which media servers are online and which ones are not, and what their dynamic IP addresses are at the time.

Tri-Channel Communication

Greater security and enhanced network performance can be achieved by separating the responsibility of tracking the nodes in the network from the actual data transport. In this approach, a redundant network of servers, referred to as "name servers," constantly monitors the network and its media nodes, freeing the signaling servers to do the job of routing and security data exchange, and enabling the media servers to concentrate on executing routing instructions received from the signaling nodes. This yields what is referred to herein as a "tri-channel" system and is illustrated in FIG. 117 where name server 1408, hosting name server node NS, maintains a list of active SDNP nodes in the network, comprising network node list 1410 Upon request from signaling node S, hosted by signaling server 1365, name server node NS, hosted by name server 1408, passes the network description, whereby signaling node S tracks and records the condition and propagation delay between all the media nodes in the SDNP cloud 1114, as shown in network condition table 1409, including zones U2, Z1, U1 and others. In the process of making a call, signaling node S supplies routing instructions to every node involved in the planned transport of a data packet through the network, including instructions for zone U2 first-mile routing to client node $C_{2,1}$ hosted by tablet 33, instructions for zone U1 last-mile routing to client node $C_{1,1}$, hosted by cell phone 32, and instructions for zone Z1 routing for all the intermediate media nodes in secure SDNP cloud 1114 used to transport the media content in SDNP data packets.

To maintain an updated network description, each time a device logs on to the network, the data regarding its status and its IP address, its SDNP address, or in some cases both, is transferred to name server 1408, as shown in FIG. 118. The network status and/or address data is then stored in network address table 1415, which is stored in application 1335 running in tablet 33 or cell phone 32, application 1411 running on notebook 35 or on a desktop (not shown), embedded applications 1412 and 1413 running on automobile 1255 or in IoT device 34, represented graphically by a refrigerator. Network address table 1415 also tracks the status of all media servers in the cloud including, for example media node $M_{a,f}$, hosted by computer 1220F, and media node $M_{a,d}$, hosted by computer 1220D. Network address table 1415 records the routing address for any network-connected device. In nearly every case the IP address or SDNP address of a connected device is recorded and tracked in the network address table 1415. In other cases, such as media servers and optionally personal mobile devices running SDNP-enabled communication applications, network address table 1415 may record both an IP address and a SDNP address, needed for address translation in gateway media nodes.

While name server node NS maintains an exhaustive description of the network, signaling node S, hosted by signaling server 1365, shown in FIG. 119, maintains a table of propagation delays 1416 between every combination of media nodes in the network available. Propagation delays table 1416 is updated by delay calculations derived from the normal movement of data packets through the network's media nodes, illustrated symbolically by stopwatches 1415A, 1415B, and 1415C, monitoring the propagation delays between media servers 1220D and 1220F, 1220F and 1220H, and 1220D and 1220H, respectively. In the event that ongoing traffic is scarce or infrequent, the SDNP network also utilizes test packets to check the health of a connection. One test packet method is illustrated in FIG. 120, where a media server is instructed by the signaling server to send out a series of packet bursts, where the data packets sent increase in size or in frequency while the delay is tracked. The resulting loading graph shown by curve 1417 reveals that the maximum loading of the specific communication route or link should be limited in size or rate not to exceed maximum loading, shown as line 1418.

Given that the aforementioned information regarding the network, its node addresses, and its propagation delays is readily available in the name servers and the signaling servers, high QoS communication can best be achieved using tri-channel communication as depicted in FIG. 121. As shown, signaling node S, hosted by signaling server 1365, entirely controls the routing of data through media servers 1118 and to clients 1335 by distributing SDNP packets 1420 comprising node-to-node routing data 1374Z and zone-specific numeric seeds 929 and decryption keys 1030. In establishing a call, the client node $C_{2,1}$, in this case SDNP application 1335 in tablet 33, contacts name server node NS on name server 1406, to register itself on the network and to find its nearest signaling server, whereby it contacts signaling node S on signaling server 1365 to initiate a call. Thereafter, the signaling node S manages the routing, and the media servers route the data accordingly, changing security settings for each of zones U2, Z1 and U1.

Because of the importance of the name server in maintaining an up-to-date network node list 1410, shown in FIG. 122, name server node NS, hosted on name server 1408, works in concert with one or more redundant servers, illustrated by backup name server node NS2, running on backup name server 1421. In the event that any client nodes or media nodes cannot reach name server 1408, the information query automatically and seamlessly transfers to the backup name server 1421. The same redundancy method is utilized for signaling servers to insure constant availability for placing a call or for packet routing. As shown in FIG. 123, signaling node S, hosted on signaling server 1365, has a backup signaling node S2, hosted on backup signaling server 1422, which automatically takes over in the event that signaling server 1365 fails or is attacked.

Communication using tri-channel SDNP packet routing in accordance with this invention is illustrated in FIG. 124A, where in step 1430A the device or caller logs into the network. To do this, the client's application 1335 on tablet 33 automatically contacts and registers itself with name server node NS, hosted on name server 1408. This event is associated with a client logging into the network, not necessarily placing a call. In the registration process name server node NS passes a list of name servers, i.e. SDNP name servers list 1431, and optionally a list of signaling servers, to the client's application 1335. With that information the device is ready and able to place a SDNP call.

In the first step 1430B in actually placing the call, the tablet 33 sends IP packet 1450A to the name server node NS, requesting routing and contact information for the destination or person to be called. The contact information request, i.e. route query 1431, may come in the form of an IP address, SDNP address, phone number, URL, or other communication identifier. In step 1480C, name server node NS, hosted by name server 1408, supplies the client's SDNP application 1335 with the intended recipient's address. The reply is delivered by IP packet 1450B, using the TCP transport layer. In an alternate embodiment, the client requests the routing information from a signaling server and the signaling server requests the information from the name server.

In step 1430D, shown in FIG. 124B, the client is finally able to initiate the call with IP packet 1450C from "IP Addr TB" to "IP Addr S", the IP address of signaling server 1365, hosting signaling node S. Since IP packet 1450C is carrying the recipient's address, not real-time data, IP packet 1450C preferably employs TCP as a transport layer. Using its knowledge of the network's node-to-node propagation delays shown in table 1416, signaling node S develops a network routing plan for the SDNP network 1114 as well as last-mile connection to the SDNP gateway servers and in step 1430E communicates this routing information to SDNP cloud 1114. The signaling server sends a command and control data packet to each of the media servers to instruct them how to handle incoming data packets. The command and control data packet looks like an ordinary data packet, except that rather than carrying audio content, its payload comprises a series of instructions informing the media node how to route a packet with a specific identifying tag, SDNP address, or SDNP zip code to a new destination. Alternatively, as described above, in distributive embodiments no single signaling server develops the entire routing plan but rather a series of signaling servers develop successive parts of the routing plan as the packet proceeds through the SDNP network.

Then, in step 1430F, the signaling node S sends to application 1335 in tablet 33 the gateway media node address, the zone U2 decryption keys 1030, the seeds 929 and other security settings needed for securing the first packet to be sent across the first mile.

Once tablet 33 obtains the zone U2 security settings in step 1430F, it initiates a call with SDNP packet 1450D, as shown in FIG. 124C. Sound represented voice waves 1384A, captured by microphone 1383A, are converted into digital information by an audio CODEC (not shown) and fed into application 1335 in tablet 33. Combining the audio data with the address routing and other information assembled into to an SDNP header, application 1335 constructs SDNP packet 1450D for first-mile routing from "IP Addr TB" to "IP Add MF" and commences packet transport to the gateway media node $M_{a,f}$. The SDNP header, embedded into the data packet's payload 1432 may include urgency, delivery preferences, security protocols, and data type specifications. The SDNP header also includes the SDNP preamble plus the MAC address, the source and destination IP addresses and the protocol field, basically the layer 2, 3 and 4 information with a payload that encapsulates the SDNP header, and all the data packets with their own SDNP sub-headers. Since the first-mile routing of SDNP packet 1450D occurs using IP addresses, packet transport is similar to conventional Internet traffic, except that the actual data content is scrambled and encrypted using the security settings for zone U2, and the SDNP header contained in the SDNP payload 1432, which also contains the data, is formatted specifically in accordance with the secure dynamic network protocol for zone U2.

Step 1430H, also shown in FIG. 124C, illustrates SDNP data packet 1450E being routed from gateway media node $M_{a,f}$, hosted by media server 1220F to media node $M_{a,j}$, hosted by media server 1220J in the SDNP cloud. Unlike the first-mile routing of IP data packet 1450D, this first intra-cloud hop of SDNP packet 1450D occurs using SDNP addresses "SDNP Addr MF" and "SDNP Addr MJ," not recognizable on the Internet. Moreover, payload 1433 is scrambled and encrypted using SDNP zone Z1 security settings, and the SDNP header contained in the Z1 SDNP packet encapsulating the data is also formatted specifically in accordance with the shared secrets for zone Z1. For security purposes, zone Z1 security settings are not communicated to zone U2, and vice versa.

In step 1430J, shown in FIG. 124D, data packet 1450F is routed out of the secure SDNP cloud from gateway media node $M_{a,d}$, hosted by media server 1220D, to client node $C_{1,1}$, hosted by application 1335 on cell phone 32. This last-mile routing of IP packet 1450F occurs using IP addresses "IP Addr MD" and "IP Addr CP," recognizable on the Internet, but payload 1434 is scrambled and encrypted using SDNP zone U1 shared secrets, and the SDNP header contained in the payload 1434 is also formatted specifically in accordance with the shared secrets. Upon delivering the data contents of payload 1434 to application 1335 in cell phone 32, speaker 1388B converts the digital code into sound waves 1384A using an audio CODEC (not shown).

When the incoming SDNP packet 1450F is received by application 1335 in cell phone 32, it can only see from the address the last media node $M_{a,d}$ where the data packet left the SDNP cloud. Unless the SDNP payload carries information regarding the caller, or unless the signaling node S supplies this information, there is no way for the person called or receiving the data to trace its origins or its source. This feature, "anonymous" communication and untraceable data delivery is a unique aspect of SDNP communication and an intrinsic artifact of the single-hop dynamic routing in accordance with this invention. The SDNP network delivers information about the caller or source only if the caller so desires it, otherwise there is no information available—anonymity is the default condition for SDNP packet delivery. In fact, the sending client's SDNP application has to intentionally send a message informing a person being called or messaged that the information came from the specific caller. Since the signaling server knows the caller and the packet's routing it can determine a route for a reply data packet without ever revealing the caller's identity.

Alternatively the signaling server could reveal an alias identity or avatar, or limit access of the caller's identity to only a few close friends or authorized contacts. Anonymity is especially valuable in applications like gaming, where there is no reason for a player to share their true identity—especially with an unknown opponent. Another condition requiring anonymous communication is in machine-to-machine or $M_2M$, IoT or Internet-of-Things, vehicle-to-vehicle or V2V, or vehicle-to-infrastructure or V2X communication where a client doesn't want machines, gadgets and devices to be giving out contact and personal information to potentially hostile devices, agents, or cyber-pirate devices. For the extremely paranoid user, voice can also be disguised electronically so that even vocal communication can be achieved anonymously.

As shown in step 1430K of FIG. 124D in response to an incoming packet, application 1335, hosted by cell phone 32, sends IP packet 1450G to signaling node S hosted on signaling server 1365. The outgoing packet requests reply routing information. In one embodiment, signaling node S can then supply the person called with the caller's true identity, whereby the SDNP application program of the person being called may reply by repeating, in the reverse direction, the entire connection process used to connect to them, i.e. contact the name server, find their SDNP or IP address, contact the signaling server, route a reply, etc. In another embodiment, the signaling server knows where the packet came from and designs a route for a reply packet to be sent without ever disclosing the contact information of the caller.

Regardless of the reply method employed, in step 1430L of FIG. 124E, reply IP packet combines audio data comprising voice waves 1384B captured by microphone 1383B and converted into analog signals then converted into digital code by audio CODEC (not shown). The audio content once processed, scrambled, encrypted and packaged becomes the secure payload 1435 of IP packet 1450H routed from "IP Addr CP" to the SDNP gateway media node "IP Addr MF". These IP addresses are recognizable on the Internet, except that payload 1435 comprises scrambled and encrypted content using SDNP zone U1 security settings, and the SDNP header contained in the payload 1435 is formatted specifically in accordance with the shared secrets for zone U1.

In step 1430M the reply packet exits the secure SDNP cloud without ever executing any node-to-node hop within the SDNP cloud. In this case, gateway media node $M_{a,f}$ hosted by media server 1220F, converts the contents of the SDNP packet 1450H from a zone Z1 specific payload 1435 into a zone U2 payload 1436 and, using IP addresses "IP Addr MF" and "IP Addr TB," directs IP packet 1450J to client node $C_{2,1}$, hosted by tablet 33. This last-mile routing of IP packet 1450J occurs using IP addresses "IP Addr MF" and "IP Addr TB" recognizable on the Internet, but payload 1436 is scrambled and encrypted using SDNP zone U2 security settings, and the SDNP header contained in the payload 1436 is formatted specifically in accordance with the secure dynamic network protocol for zone U2. Once received by cell phone 33, SDNP enabled application 1335 then extracts the payload data and after decryption and unscrambling converts the digital code using an audio CODEC (not shown) into sound 1384B produced by speaker 1388A. In the sequence shown in steps 1430K-1430M, only one gateway media node is involved in the communication, and thus the "first mile" is immediately followed by the "last mile."

A summary of the call sequence using tri-channel communication in accordance with this invention is illustrated in FIG. 125A where, using TCP transport based IP packets 1450A and 1450B, application 1335, running on tablet 33, and name server node NS establish a dialogue, whereby, once receiving the contact information or IP address of the person being contacted, tablet 33 instructs signaling node S to place a call and establish a session with the recipient, using TCP transport-based IP packet 1450C. Thereafter, voice waves 1384A are captured, packaged and routed by media nodes to their destination, using a combination of IP packets 1450D and 1450F for the first mile and the last mile, respectively, and SDNP packet 1450E for transmission through the SDNP cloud. The resulting routing, from tablet 33 to gateway media node $M_{a,f}$ to a second gateway media node $M_{a,d}$ to cell phone 32, is shown in FIG. 125B. All transport except for node-to-node hop 1453B uses IP addresses rather than SDNP addresses. This sequence is shown in the flow chart at the bottom of FIG. 125B.

The reply sequence is shown in FIG. 126A, where application 1335 in cell phone 32, using IP packet 1452G, requests signaling node S to send a reply packet to tablet 32, and the gateway media node routes the voice reply, using IP packets 1452H and 1452J. The resulting packet transport, shown in FIG. 126B, comprising hops 1453D and 1453E is almost too short, because transport occurs entirely over the Internet except for the routing through gateway media node $M_{a,f}$, which enhances security only by rewriting the source and destination IP addresses and converting the data packet security settings from zone U1 to zone U2. In such an example, no node-to-node hop within the SDNP cloud occurs, which has the disadvantage of making it easier to track and correlate data packets in and out of a single node, in this case media server 1220F.

In such a case it is advantageous to insert a dummy node in the data transport path to facilitate misdirection, as shown in FIG. 126C. In such a case, the routing is modified to include a second server address "IP Addr MF2," either in the same server or in the same server farm as the address "IP Addr MF," and to convert incoming IP packet 1452H from "IP Addr CP" to "IP Addr MF" into an outgoing IP packet 1462L from "IP Addr MF2" to "IP Addr TB" by inserting an intermediate IP packet 1452K, which "hands off" packet 1452K from "IP Addr MF" to "IP Addr MF2," or alternatively from "SDNP Addr MF" to "SDNP Addr MF2". The port assignment also changes during the translation process. In such a case, it does not matter whether the address is an Internet IP address, a NAT address or a SDNP address, because data packet 1452K never leaves the server or server farm, i.e. it represents an internal handoff and transfer.

Payload "Fields"

Payload processing of an incoming data packet entering the SDNP client through a gateway media node is illustrated in FIG. 127, where incoming IP packet 1374B is first unpacked to extract encrypted payload comprising ciphertext 1393, then decrypted using the appropriate key from the zone in which the encryption occurred and using as needed the time or state when it occurred. The resulting payload comprises plaintext 1392 which if scrambled must also be unscrambled, again using the appropriate zone and state security settings. Next, the SDNP preamble is stripped, revealing a content data packet 1391 comprising various fields, in this case comprising a field 9 with a corresponding header Hdr 9, as well as a junk field with corresponding header Hdr J.

In alternative embodiment, also shown in FIG. 127, incoming IP packet 1460 is decrypted and unscrambled, its preamble is removed, and it is parsed to produce two valid data fields—field 6 with corresponding header Hdr 6, and field 8 with corresponding header Hdr 8. These packets may then be merged with other fields to form new IP packets and SDNP packets accordingly.

Using the nested fields data structure, packing several fields of data with their own headers into one packet's payload, is much like placing multiple boxes inside a bigger box. The process of SDNP re-packing the data, i.e. opening a box, taking out the smaller boxes and putting them into new big boxes, involves many choices in routing of data segments. To avoid packet loss, it is preferable that data segments of the same origin are not comingled into the same fields as with data segments from other data, conversations and communiqués, but remain uniquely separate as identified by header and arranged by sender. For example, in FIG. 128, incoming payloads 1461 and 1393, from SDNP or IP data packets (not shown), are both decrypted using decryption operation 1032, possibly using different decryption keys from different states or zones, resulting in two plaintext payloads 1392 and 1462. Mixing operation 1061 combines the payloads 1392 and 1462 and, after parsing, produces content for three fields—field 6 comprising packet 1464, field 8 comprising packet 1463, and field 9 comprising packet 1459, which together form data content 1470. The three packets 1459, 1463 and 1464 may be stored separately or merged into a long packet. Because of their SDNP headers, each field of data is easily identified, even though they have been removed from the SDNP or IP packet used to deliver them. Collectively, the data content 1470 represents the data present in the media node at that specific instant. The process is dynamic, with the content ever-changing as packets traverse the SDNP network. After a prescribed period of time, when there is no reason to wait for more incoming data, the data content 1470 is split into new combinations by splitting operation 1057 whereby payload 1472 contains some of the data segments from each of the three fields, i.e. data segments 9C and 9D from field 9, data segment 8B from field 8, and data segments 6C and 6D from field 6. The numbers of these fields are carried over into payload 1472. The plaintext is scrambled if desired, and then it is encrypted using encryption operation 1026 at the present state and for the current zone to produce payload 1474, ready to be assembled into a SDNP packet or an IP packet and routed on its way.

Splitting operation 1057 also creates a second payload 1471, containing data segments for three fields, i.e. field 9 containing data segments 9B, 9A, 9F and 9E, field 8 containing only data segment 8F, and field 6 containing data segment 6F.

As shown, all of the fields in payloads 1471 and 1472 also contain one or more junk data segments. Unless re-scrambling is executed, the scrambled payload 1471 is then encrypted using encryption operation 1026 at the present state and for the current zone to produce payload 1473, ready to be assembled into a SDNP packet or an IP packet. Similarly, payload 1472 is encrypted using encryption operation 1026 at the present state and for the current zone to produce payload 1474, ready to be assembled into a SDNP packet or an IP packet. Payload 1473 is routed to a different media node than payload 1474. In this illustration, the IP or SDNP addresses and the rest of the data packet are excluded from the illustration for the sake of clarity.

The dynamic nature of re-packeting is illustrated in FIG. 129A, where at time $t_4$ and corresponding state 994, payloads 1483A and 1483B, comprising data segment data from fields Fld 91 and Fld 92, respectively, are mixed using mixing operation 1061 to form hybrid payload 1484A. At time $t_5$ and corresponding state 995, mixing operation 1061 combines hybrid payload 1484A with payload 1484B, containing data for Fld 93, to produce hybrid long payload 1485A, comprising data segments 9B, 9A, 9F and 9E in scrambled order in field 91 with header Hdr 91, data segment 9C in field 92 with Hdr 92, and data segment 9D in field 93 with Hdr 93. At time $t_f$ and state 999, application 1335, hosted by cell phone 32, processes the hybrid multi-field payload 1485A and reassembles original data sequence 1489A comprising data segments 9A through 9F arranged sequentially In some instances, shown previously herein, it may be necessary to temporarily store some data segments or fields while awaiting others to arrive. This storage operation can occur within any given node in SDNP network, including interior media nodes or gateway media nodes. Alternatively, the storage can occur within a client's application hosted on a cell phone, tablet, notebook, etc. Such an example is shown in FIG. 129B where at time $t_4$ payloads 1483A and 1483B comprising data segments from fields 91 and 92 are mixed by mixing operation 1061 to create hybrid payload 1484A. This new payload is held in stasis in network cache 1550, either as its component fields 1485B and 1485C or as a long hybrid payload 1484A. Finally, at time $t_5$ when payload 1485D arrives, the contents of network cache 1550 are released to mixing operation 1061, producing at time $t_6$ and corresponding state 996 hybrid payload 1486A comprising data segments 9A through 9F split across fields Fld 91, Fld 92, and Fld 93. At time $t_f$ and state 999, application 1335 hosted by cell phone 32 processes the hybrid multi-field payload 1486A and reassembles original data sequence 1489A comprising data segments 9A through 9F arranged sequentially.

In another embodiment of this invention, final reassembly and caching of fields occurs within application 1335 on cell phone 32, i.e. within the client's application—not in the SDNP cloud. As illustrated in FIG. 129C, at time $t_4$ payloads 1483A and 1483B comprising data segments from fields 91 and 92 are mixed by mixing operation 1061 to create hybrid payload 1484A, which is immediately transferred to application 1335 in cell phone 32 and held in a secure client application cache 1551 as payloads 1484C and 1484D. When payload 1485E arrives at time $t_4$ and is subsequently directed to application 1335 in cell phone 32 at time $t_5$ and with corresponding state 995, then application 1335 is, at time $t_f$, able to reassemble original data packet 1489A comprising data segments 9A through 9F arranged sequentially.

A summary flow chart summarizing client reconstruction of a SDNP packet is illustrated on FIG. 129D, where a single-channel data packet 1490, comprising one or multiple ciphertext blocks is decrypted by decryption operation 1032 to produce multi-field plaintext 1491, which is unscrambled by unscrambling operation 928 to produce multi-field plaintext strings 1492A, 1492B and 1492C, which are then merged by mixing operation 1061, including parsing operation 1087 and de-junking (not-shown), to produce original data packet 1493. Finally, data packet 1493 is converted by audio CODEC 1385 into sound or voice waves 1384A.

Command & Control

As a final element of SDNP communication in accordance with this invention, the command and control of media nodes by the signaling nodes is a key component in insuring high QoS and low-latency delivery of real-time packets without sacrificing security or audio fidelity. One example of a basic decision tree used to determine routing and priority treatment of clients, conversations, and data packets is shown in FIG. 130. As shown, when client node $C_{2,1}$, representing tablet 33, requests to place a call to signaling node S on signaling server 1365, it specifies in command and control packet 1495A not only who the caller wants to contact but the nature of the call, e.g. is it a voice call, a video call, etc., its urgency, the preferred delivery method, e.g. normal best effort, guaranteed delivery, VIP delivery, etc. Signaling node S interprets delivery request 1499A, using "select delivery method" (step 1500), based on the request, the client's business status, payment history or any number of business considerations. Several outcomes may result. If the customer is a VIP or preferred customer based on their volume or income potential, then the communication session will be tagged as a VIP. VIP delivery may also utilize a special performance boost known as race routing, described later in this disclosure.

If the most important factor is the file is guaranteed delivery, then guaranteed packet delivery may be employed, i.e. sending multiple redundant copies of the packets and minimizing the number of node-to-node hops to minimize the risk of packet loss even if real-time performance is sacrificed. Special delivery may include customer-specific authentication procedures. Otherwise, normal SDNP routing will be employed. In FIG. 130, the output of the select delivery method (step 1500) decision, along with the address or phone number 1499B of the person to be called, is used to govern routing affecting the operation "determine and rank routing options" (step 1501). Once the route options are ranked, the urgency request 1499C and any special finance consideration such as rush fees are judged by the decision "select packet urgency" (step 1502), whereby the output may include normal, priority, urgent, and a lower cost "snail" option for sending data with the proviso that audio quality will not be sacrificed.

Combining the routing options (step 1501) and the urgency selection (step 1502) allows the signaling node S to best select the routing for each packet, frame or data segment (step 1503). If the selected route passes through multiple zones, it will involve various security settings (step 1504) for each zone. This data comprising seeds, decryption keys 1030 and other security-related information is then combined with the node-by-node routing, splitting and mixing for meshed transport, used to generate preambles for every data packet including IP packets for the first and last mile, comprising SDNP zone U2 preamble 1505A, SDNP zone U1 preamble 1505C, and multiple SDNP zone Z1 preambles for meshed transport in the SDNP, collectively represented by preamble 1505B. Preambles 1505A, 1505B, 1505C and others are then combined with IP addresses and SDNP addresses to create the various IP (Internet Protocol) and SDNP packets. These routing instructions include IP packet 1506A sent to tablet 33 detailing the routing for a call or communiqué from client node $C_{2,1}$ to the SDNP gateway media node, multiple SDNP packets 1506B sent to media servers 1118 and used for routing the call or communiqué among the media nodes $M_{i,j}$ in the SDNP cloud, and IP packet 1506C, sent to cell phone 32, detailing the routing for a call or communiqué from the SDNP gateway node to client node $C_{1,1}$, representing cell phone 32. In this manner, the media nodes only need to direct the incoming payloads according to the instructions they receive from the signaling servers, a mechanism completely opposite to that of the routing procedure used in Internet-based OTT communication.

For example, as stated previously, Internet routers are hosted by many different ISPs and telephone companies who do not necessarily have the best interests of a client in mind in routing their packets with the lowest propagation delay or shortest latency. In fact, unlike SDNP communications in accordance with this invention, Internet routers cannot even distinguish data packets carrying real-time audio or video from junk mail. In real-time communication, latency is critical. Delays of a few hundred milliseconds noticeably affect QoS, and delays over 500 milliseconds become unbearable for holding a coherent voice conversation. For this and numerous other reasons, the real-time performance of the SDNP network described herein constantly monitors propagation delays and chooses the best route for each real-time data packet at the time its transport ensues.

As illustrated in FIG. 131 a requested routing from "IP Addr TB", i.e. tablet 33, to "IP Addr CP", i.e. cell phone 32 has many potential routes. Each node-to-node propagation delay, tracked and recorded in propagation delay table 1416, varies constantly. Moreover, routing a call through the least number of media servers does not necessarily result in the lowest latency communications. For example, routing a call from client node $C_{2,1}$ to media node $M_{a,f}$ and then to client node $C_{2,1}$ has a total propagation delay of 55+60=115 ms while routing the call from media node $M_{a,f}$ through media node $M_{a,d}$ instead of directly to client node $C_{1,1}$, shown by the shaded path and detailed in FIG. 132A, exhibits a delay of only of 55+15+15=85 ms, which is 20% faster, even though it transits through an additional media node. In SDNP dynamic routing, signaling server S always considers the best combination of paths, not only to maintain the lowest latency but also to fragment the data and send the content using meshed transport for enhanced security. As shown, another short delay path, shown by the shaded path through media node $M_{a,h}$, detailed in FIG. 132B, has a cumulative propagation delay of 25+20+15+15+15=105 ms—still superior to other options despite the large number of hops involved.

Another important function of command and control is in directing packet reconstruction. This function is key to mixing, splitting and rerouting SDNP packets in the cloud. FIG. 132C illustrates one embodiment of how signaling node S can communicate with a media server, in this example hosting media node $M_{a,q}$ to manage data packets entering and leaving a specific node. With full knowledge of all relevant security settings 1504 for an incoming SDNP packet and its payload frames, using command and control data packet 1496C signaling node S instructs media node $M_{a,q}$ how to process incoming SDNP packet 1497A to produce outgoing data packet 1497B. As shown, after extracting the payload 1511A, comprising multiple frames, media node $M_{a,q}$, in DUM operation 1210, decrypts and unscrambles every frame from payload 1511A and every frame from the payloads in other incoming packets (not shown), based on the state information 920, seeds, 929, and decryption keys 1030 used when each of them was created, and then mixes all the incoming fields to make a long packet, in this case represented by all the independent frames collectively as data frames 1512 and individually as data frames 1, 6, 9, 12, 23 and 31, respectively.

This data is then fed into SDNP zip sorter 1310 to sort the frames into groups of frames, each group having a common destination on its next hop in the SDNP cloud, all in accordance with routing information in the SDNP packet 1506B supplied previously by the signaling node S for each frame or SDNP packet in response to the call information specified in command and control packet 1495A. SSE operation 1213 then splits the frames into the groups having common destinations, using current state 920 information, updated seeds 929, and new decryption keys 1030. One such payload, payload 1511B, containing data for frames 1, 9, and 23, is destined for media node $M_{a,j}$, whereas the previous payload 1511A comprised data for frames 1, 6 and 9. So, as instructed by signaling node S, media node $M_{a,q}$ removed the frame 6 data and replaced it with the frame 23 data to make payload 1511B, which it assembled into outgoing SDNP packet 1487B and sent onward to media node $M_{a,j}$.

Using the 7-layer OSI model, the SDNP connection shown in FIG. 133A represents a secure gateway-to-gateway tunnel 1522, supporting end-to-end secure communication 1529 between respective SDNP applications 1335 hosted on only two clients, in this case tablet 33 and cell phone 32. In embodiments of this invention, physical and data link layers 1525 do not typically involve any special design for realizing SDNP operation. Network Layer 3, however, operates completely differently than the Internet because the SDNP controls the routing of every single hop within the SDNP cloud for security, to minimize latency, and to offer the best possible QoS. Transport Layer 4, while it uses TCP for control and an augmented version of UDP for real-time data, employs contextual transport, changing its methods and its priorities based on some knowledge as to what the SDNP packet, payload or frame is and what priority it has Session Layer 5 is unique to SDNP operation as well, where command and control information—communicated either through command and control packets sent on the media channel or on the signal channel—determines the management of every session, including routing, quality, delivery conditions, and priority.

In SDNP communication Presentation Layer 6 executes network hop-by-hop encryption and scrambling, unrelated to the client's own encryption.

In Application Layer 7, SDNP communication is again unique because any SDNP-enabled application must be able to mix and restore fragmented data, and to know what to do if part of a fragmented payload does not arrive, again contextual transport.

All of the above security and performance of the disclosed SDNP network are achieved without the use of client encryption and private key management. If a client's application is also encrypted, e.g. a private company's security, then the VPN-like tunneling is combined with the data fragmentation to make a new type of secure communication—fragmented tunneled data, a hybrid of Presentation Layer 6 and Application Layer 7, shown in FIG. 133B.

One unique aspect of SDNP communication in accordance with this invention is the example of "race routing" shown in FIG. 134. Since the SDNP network is built on meshed transport of fragmented data, there is no overhead involved in sending fragmented data fields across the meshed network in duplicate or triplicate. Conceptually, to achieve the shortest possible latency while not sacrificing security, a payload is divided into sub-packets and organized into two complementary frames. Rather than sending one frame by one route and the second frame by another, in race routing multiple copies of each frame are sent over different routes, and the first one to arrive at its destination is the one used. The copies that arrive later are simply discarded. For example, as shown frame 91 is sent over two paths, specifically paths 1540 and 1541, while frame 92 is also sent by multiple paths, paths 1541 and 1543. Whichever combination of paths is the first to deliver one frame-91 payload and one frame-92 payload, that is the combination that will be used.

SUMMARY

The foregoing disclosure illustrates the numerous advantages in performance, latency, quality, security, and privacy achieved by SDNP communication in accordance with this invention. Table FIG. 135 compares the disclosed secure dynamic network and protocol (SDNP) to over-the-top or OTT carriers, virtual private networks or VPNs, and peer-to-peer or PTP networks. As revealed by the table, all the competing and prior art communication methods rely on transport over one route at a time, relying solely on encryption to protect the content of the communication. Encryption in a VPN aside, all of the existing communication methods expose the source and destination addresses of the communicating parties, enabling phishing, sniffing, and profiling as a vulnerability to cyber-assaults. In all of them security is static, remaining constant as a packet traverses the network. Since none of the prior art methods control the routing of a communication, they cannot detect whether or not the communication has been hijacked; and they cannot control the latency or real-time performance of the network. Moreover, OTT and PTP networks have no guarantee a high-bandwidth router will even be available to support a call, leading to constant shifts in sound quality and incessant call drops. Lastly, in every case except the disclosed SDNP communication method and meshed network, should a hacker break an encryption code, the hacker can use the knowledge to inflict significant damage before the security breach is discovered and will therefore be able to read or hear the full contents of private or personal communications.

In the disclosed SDNP network, even in the event that a cyber attacker breaks the encryption, the data in any one packet is garbled, incomplete, mixed with other messages, and scrambled out of order—basically the content of any SDNP packet is useless except to the person for which it was intended. Moreover, even if the network's encryption were broken, a challenge that can take years to complete, even with quantum computing, one-tenth of a second later the dynamic encryption of every packet traversing the entire SDNP cloud changes. This means that a would-be hacker must start all over every 100 ms. With such dynamic methods, a five-minute conversation, even if it were completely available in a single data string, would take hundreds of years to decode. Beyond this, with the addition of data fragmentation, dynamic scrambling, and dynamic mixing and rerouting, any benefits to be gained by breaking the encryption would be totally illusory.

The combination of the multiple levels of security realized by the secure dynamic network and protocol described herein, including dynamic scrambling, fragmented data transport, anonymous data packets, and dynamic encryption far exceeds the security offered by simple static encryption. In SDNP communication as disclosed herein, data packets from a single conversation, dialog, or other communication do not travel across a single route but are split into incomprehensible snippets of meaningless data fragments, scrambled out of sequence and sent over multiple paths that change continuously in content, by mix, and by the data's underlying security credentials. The resulting communication method represents the first "hyper-secure" communication system.

We claim:

1. A method of transmitting data packets securely through a cloud, the data packets comprising digital data, the digital data comprising a series of data segments, the cloud comprising a network of media nodes, the media nodes being hosted on servers, each of the media nodes receiving data packets from other media nodes in the network and transmitting data packets to other media nodes in the network, the method comprising:

storing shared secrets in a first media node or in a server associated with the first media node, the shared secrets comprising a list of concealment algorithms;

storing the shared secrets in a second media node or in a server associated with the second media node;

causing the first media node to perform a first concealment operation on a data packet in accordance with one or more concealment algorithms in the list of concealment algorithms to conceal at least a portion of the digital data in the data packet, the one or more concealment algorithms used by the first media node in performing the first concealment operation being selected from the list of concealment algorithms in accordance with a dynamic state, the dynamic state comprising a changing parameter;

causing the first media node to transmit the data packet, a mixed data packet including the data packet, or a constituent sub-packet of the data packet to the second media node;

transmitting a digital value representing the dynamic state used in selecting the one or more concealment algorithms used by the first media node in performing the first concealment operation on the data packet to the second media node or the server associated with the second media node;

causing the second media node or the server associated with the second media node to use the digital value representing the dynamic state to identify the one or more concealment algorithms used by the first media node in performing the first concealment operation on the data packet;

causing the second media node to perform an inverse of the first concealment operation so as to recreate the data packet in the form that the data packet existed before the first media node performed the first concealment operation on the data packet, using the one or more concealment algorithms used by the first media node in performing the first concealment operation on the data packet.

2. The method of claim 1 wherein the shared secrets comprise at least one of the following:

a seed generator for generating a seed, the seed comprising the digital value representing the dynamic state;

a hidden number generator for generating a hidden number from the dynamic state or from a seed;

zone information; and algorithm shuffling processes.

3. The method of claim 1 wherein the dynamic state comprises a time at which the first media node performs the first concealment operation on the data packet.

4. The method of claim 1 wherein the dynamic state comprises one or more of the following:

a media node number;

a network identification;

a GPS location;

a number generated by incrementing a random number each time a packet traverses a media node in the network; and an algorithm for selecting a concealment algorithm based on a parametric value derived from data contained within the data packet.

5. The method of claim 1 comprising using the digital value representing the dynamic state as an input variable in executing at least one of the concealment algorithms.

6. The method of claim 1 wherein the first concealment operation comprises at least one technique selected from the group consisting of:

scrambling the data packet by changing an order of at least some of the data segments in the data packet in accordance with a scrambling algorithm;

encrypting the data packet by encrypting at least some of the data in the data packet in accordance with an encryption algorithm;

splitting the data packet into at least two sub-packets in accordance with a splitting algorithm;

mixing the data packet by combining the data packet with at least one other data packet in accordance with a mixing algorithm to form a mixed data packet; and adding junk data to and/or removing junk data from the data packet in accordance with at least one junk data algorithm.

7. The method of claim 1 wherein an address of the second media node used by the first media node to transmit the data packet, a mixed data packet including the data packet, or a constituent sub-packet of the data packet to the second media node is chosen by a server not hosting the first media node.

8. The method of claim 1 comprising causing the first media node to transmit the data packet, a mixed data packet including the data packet, or a constituent sub-packet of the data packet through at least one intermediary media node en route to the second media node, wherein the at least one intermediate node does not change the digital data in the data packet, mixed data packet or constituent sub-packet except to update a destination address for a next hop of the data packet, mixed data packet or constituent sub-packet.

9. The method of claim 8 wherein an address of the at least one intermediate media node used by the first media node to transmit the data packet, mixed data packet or constituent sub-packet to the at least one intermediary media node is chosen by another server not hosting the first media node.

10. The method of claim 1 comprising causing the first media node to generate a seed and to transmit the seed to the second media node, the seed comprising the digital value representing the dynamic state used in selecting the one or more concealment algorithms from the shared secrets to perform the first concealment operation.

11. The method of claim 1 comprising causing the second media node to perform a second concealment operation on the data packet, the second concealment operation comprising at least one technique selected from the group consisting of:

scrambling the data packet by changing an order of at least some of the data segments in the data packet in accordance with a scrambling algorithm;

encrypting the data packet by encrypting at least some of the data in the data packet in accordance with an encryption algorithm;

splitting the data packet into at least two sub-packets in accordance with a splitting algorithm;

mixing the data packet by combining the data packet with at least one other data packet in accordance with a mixing algorithm to form a mixed data packet; and adding junk data to and/or removing junk data from the data packet in accordance with at least one second junk data algorithm, wherein the second concealment operation is selected in accordance with the dynamic state and is different from the first concealment operation.

12. The method of claim 11 wherein the dynamic state comprises a time.

13. The method of claim 11 comprising using a digital value representing the dynamic state as an input variable in executing at least one of the scrambling, encryption, splitting, mixing and junk data algorithms.

14. The method of claim 1 wherein the server associated with the first media node comprises a first DMZ server and the server associated with the second media node comprises a second DMZ server, and wherein the shared secrets are stored in the first and second DMZ servers, the first and second DMZ servers being isolated from the network such that none of media nodes in the network, including the first and second media nodes, has access to the shared secrets.

15. The method of claim 14 comprising causing the first DMZ server to select the one or more concealment algorithms from the shared secrets in accordance with the dynamic state and to instruct the first media node to perform the first concealment operation on the data packet by using the one or more concealment algorithms.

16. The method of claim 15 comprising:

causing the first DMZ server to generate a seed, the seed comprising a digital value representing the dynamic state used by the first DMZ server to select the one or more concealment algorithms from the shared secrets; and causing the seed to be delivered to the second DMZ server.

17. The method of claim 16 wherein causing the seed to be delivered to the second DMZ server comprises causing the first DMZ server to transmit the seed to the first media node, causing the first media node to transmit the seed to the second media node, and causing the second media node to transmit the seed to the second DMZ server.

18. The method of claim 16 wherein causing the seed to be delivered to the second DMZ server comprises causing the first DMZ server to transmit the seed to a signaling server and causing the signaling server to transmit the seed to the second DMZ server.

19. The method of claim 16 comprising causing the second DMZ server to use the seed to identify the one or more concealment algorithms used by the first media node in performing the first concealment operation on the data packet and to instruct the second media node to perform the inverse of the first concealment operation on the data packet.

20. The method of claim 19 wherein causing the second DMZ server to use the seed to identify the one or more concealment algorithms used by the first media node in performing the first concealment operation on the data packet comprises causing the second DMZ server to use the seed to generate a hidden number and using the hidden number to identify the one or more concealment algorithms used by the first media node in performing the first concealment operation on the data packet, the hidden number and an algorithm used to generate the hidden number being part of the shared secrets and not being available to any media node in the network.

21. The method of claim 14 comprising causing the second media node to perform a second concealment operation on the data packet, the second concealment operation comprising at least one technique selected from the group consisting of:

scrambling the data packet by changing an order of at least some of the data segments in the data packet in accordance with a scrambling algorithm;

encrypting the data packet by encrypting at least some of the data in the data packet in accordance with an encryption algorithm;

splitting the data packet into at least two sub-packets in accordance with a splitting algorithm;

mixing the data packet by combining the data packet with at least one other data packet in accordance with a mixing algorithm to form a mixed data packet; and adding junk data to and/or removing junk data from the data packet in accordance with at least one junk data algorithm, wherein the second concealment operation is selected in accordance with the dynamic state and is different from the first concealment operation.

22. The method of claim 21 wherein causing the second media node to perform a second concealment operation on the data packet comprises causing the second DMZ server to select one or more of the scrambling, encryption, splitting, mixing, and junk data algorithms from the shared secrets in accordance with the dynamic state and to instruct the second media node to perform the second concealment operation on the data packet by using the one or more second concealment algorithms.

23. The method of claim 22 wherein the dynamic state used by the second DMZ server in performing a second concealment operation on the data packet comprises a time.

24. The method of claim 1 wherein the first and second media nodes are located in a first zone of the cloud and wherein the cloud comprises a second zone, the second zone comprising a plurality of media nodes, the method comprising:

storing a second set of shared secrets in media nodes in the second zone or in servers associated with the media nodes in the second zone, the second set of shared secrets comprising a second list of concealment algorithms, the second list of concealment algorithms being different from the list of concealment algorithms in the shared secrets; and using the second set of shared secrets to select concealment algorithms to be used by media nodes in the second zone to perform concealment operations on the data packets as the data packets pass through media nodes in the second zone.

25. The method of claim 24 wherein the cloud comprises a bridge media node linking the first and second zones, the bridge media node performing an inverse of concealment operations on data packets arriving from media nodes in the first zone in accordance with the shared secrets and performing concealment operations on data packets destined for media nodes in the second zone in accordance with the second set of shared secrets.

26. The method of claim 1 wherein the cloud comprises a gateway node, the gateway node being connected to a client device via a last mile connection, the method comprising storing the shared secrets and a second set of shared secrets in the gateway node or in a server associated with the gateway node and storing the second set of shared secrets in the client device, the second set of shared secrets comprising a second list of concealment algorithms, the second list of concealment algorithms being different from the list of concealment algorithms in the shared secrets and comprising a plurality of algorithms selected from the group consisting of:

scrambling algorithms;
encryption algorithms;
splitting algorithms;
mixing algorithms; and
junk data insertion and/or removal algorithms.

27. The method of claim 26 comprising:

causing the client device to perform a second concealment operation on a second data packet in accordance with one or more algorithms in the second list of concealment algorithms, the one or more algorithms used by the client device in performing the second concealment operation being selected in accordance with a dynamic state;

causing the client device to transmit the second data packet, a mixed data packet including the second data packet, or a constituent sub-packet of the second data packet to the gateway node; and causing the client device to transmit to the gateway node or to the server associated with the gateway node a digital value representing the dynamic state used by the client device in performing the second concealment operation on the second data packet.

28. The method of claim 27 comprising causing the gateway node to perform an inverse of the second concealment operation so as to recreate the second data packet in the form that the second data packet existed before the client device performed the second concealment operation on the second data packet, using the one or more algorithms on the second list of concealment algorithms used by the client device in performing the second concealment operation on the second data packet.

29. The method of claim 28 wherein the server associated with the gateway node comprises a gateway DMZ server, the method comprising:

storing the shared secrets and the second set of shared secrets in the gateway DMZ server, the gateway DMZ server being isolated from the network such that none of media nodes in the network, including the gateway node and the first and second media nodes, has access to the shared secrets or the second set of shared secrets; and causing the client device to generate a seed and causing the seed to be delivered to the gateway DMZ server, the seed comprising a digital value representing the dynamic state used by the client device in performing the second concealment operation on the second data packet.

30. The method of claim 29 comprising causing the gateway DMZ server to use the seed to identify the one or more algorithms on the second list of concealment algorithms used by the client device in performing the second concealment operation on the second data packet and to instruct the gateway node to perform the inverse of the second concealment operation on the second data packet by using the one or more algorithms on the second list of concealment algorithms.

31. The method of claim 30 comprising:

causing the gateway DMZ server to select at least one concealment algorithm from the shared secrets in accordance with the dynamic state and to instruct the gateway node to perform a third concealment operation on the second data packet, the third concealment operation being different from either of the first and second concealment operations; and causing the gateway node to send the second data packet, a mixed data packet including the second data packet, or a constituent sub-packet of the second data packet to a third media node in the network.

32. The method of claim 1 comprising periodically changing the shared secrets by changing the concealment algorithms in the list of concealment algorithms, the order of the concealment algorithms in the list of concealment algorithms, or numerical values identifying the concealment algorithms.

33. The method of claim 1 comprising routing the data packet through at least one intermediate media node between the first and second media nodes.

34. The method of claim 33 comprising routing the data packet through a plurality of intermediate media nodes between the first and second media nodes and re-scrambling and/or re-encrypting the data packet in at least some of the intermediate nodes, wherein a scrambling algorithm and/or encryption algorithm used to scramble and/or encrypt the data packet in each of the intermediate media nodes in which the data packet is re-scrambled and/or re-encrypted is different from a scrambling algorithm and/or encryption algorithm used to scramble the data packet in every other intermediate media node in which the data packet is re-scrambled and/or re-encrypted.

35. The method of claim 1 wherein the first concealment operation comprises splitting the data packet into at least two sub-packets, the at least two sub-packets comprising a first sub-packet and a second sub-packet, the method comprising routing the first sub-packet through a first series of intermediate media nodes between the first media node and the second media node;

routing the second sub-packet through a second series of intermediate media nodes between the first media node and the second media node; and mixing the first and second sub-packets in the second media node.

36. The method of claim 35 wherein the first series of intermediate media nodes does not comprise any media node that is comprised within the second series of intermediate media nodes.

37. The method of claim 35 wherein the first series of intermediate media nodes comprises at least one media node that is comprised within the second series of intermediate media nodes and at least one media node that is not comprised within the second series of intermediate media nodes.

38. The method of claim 1 wherein the first concealment operation comprises mixing the data packet by combining the data packet with at least one other data packet to form a mixed data packet and wherein the mixed data packet comprises at least one of the following:

two or more headers;

two or more identifying tags;

two or more destination addresses; and two or more data segments on which a concealment operation was performed in accordance with different values of a dynamic state, respectively.

39. The method of claim 1 wherein a first client device is connected to an entry gateway node in the network via a first mile connection and a second client device is connected to an exit gateway node in the network via a last mile connection, the method comprising:

providing one or more signaling servers;

providing a signaling server with an address of each of the first and second client devices;

causing the signaling server to develop a network routing plan, the network routing plan designating at least some of the media nodes in a route of a data packet through the network in a communication from the first client device to the second client device, none of the media nodes having access to the network routing plan; and causing the signaling server to send command and control packets to media nodes designated in the network routing plan, each command and control packet informing a media node designated in the network routing plan where to send an incoming data packet on a next hop in the network routing plan.

40. The method of claim 39 wherein the signaling server stores a network node list, the network node list comprising a list of media nodes and client devices, and wherein the signaling server develops a network routing plan by considering propagation delays between media nodes on the network node list in order to reduce a transit time of a data packet through the network in the communication from the first client device to the second client device.

41. The method of claim 39 wherein the signaling server stores a network node list, the network node list comprising a list of media nodes and client devices, the method comprising:

causing the first client device to transmit to the signaling server an identification of the second client device and a request for an address of the second client device; and causing the signaling server to pass the address of second client device to the first client device.

42. The method of claim 39 wherein at least one of the command and control packets instructs a media node designated in the network routing plan to split an incoming data packet into sub-packets or to mix an incoming data packet with another packet to form a mixed data packet and instructs the media node where to send each of the sub-packets or the mixed data packet.

43. The method of claim 39 wherein none of the media nodes in the network other than the entry gateway node knows an address of the first client device and none of the media nodes in the network other than the exit gateway node knows an address of the second client device.

44. The method of claim 39 comprising:

providing a name server node, the name server node comprising one or more name servers and storing a network node list, the network node list comprising a list of active media nodes and client devices;

causing the first client device to transmit to the name server node an identification of the second client device and a request for an address of the second client device;

causing the name server node to pass the address of second client device to the first client device; and causing the first client device to transmit the address of the second client device to the signaling server.

45. The method of claim 1 wherein a first client device is connected to an entry gateway node in the network via a first mile connection and a second client device is connected to an exit gateway node in the network via a last mile connection, the network comprising a third media node, the third media node performing a name server function and a signaling function, the method comprising:

providing the third media node with an address of each of the first and second client devices;

causing the third media node to develop a network routing plan, the network routing plan designating at least some of the media nodes in a route of a data packet through the network in a communication from the first client device to the second client device, none of the media nodes other than the third media node having access to the network routing plan; and causing the third media node to send command and control packets to media nodes designated in the network routing plan, each command and control packet informing a media node designated in the network routing plan where to send an incoming data packet on a next hop in the network routing plan.

46. The method of claim 45 wherein the third media node stores a network node list, the network node list comprising a list of active media nodes and client devices, the method comprising:

causing the first client device to transmit to the third media node an identification of the second client device and a request for an address of the second client device; and causing the third media node to pass the address of second client device to the first client device.

47. The method of claim 45 wherein the third media node comprises the entry gateway node.

48. The method of claim 1 wherein a first client device is connected to an entry gateway node in the network via a first mile connection and a second client device is connected to an exit gateway node in the network via a last mile connection, the method comprising causing the first client device to scramble and/or encrypt the data packet and to transmit security credentials to the second client device, the security credentials enabling the second client device to unscramble and/or decrypt the data packet so as to recreate the data packet as the data packet existed before the data packet was scrambled and/or encrypted by the first client device, the security credentials not being transmitted to or known by any media node in the network.

49. The method of claim 48 wherein the first client device transmits the security credentials to the second client device through a signaling server.

50. The method of claim 1 wherein a first client device is connected to an entry gateway node in the network via a first mile connection and a second client device is connected to an exit gateway node in the network via a last mile connection, the method comprising:

causing the first client device to split a data packet so as to form a plurality of sub-packets and to create a copy of a sub-packet;

causing the first client device to send the sub packet to a the second client device over a first route through the cloud and to send the copy of the sub-packet to the second client device over a second route through the cloud, the second route being different from the first route; and causing the second client device to combine whichever of the sub-packet and the copy of the sub-packet arrives first with the others of the plurality of sub-packets so as to recreate the data packet.

51. The method of claim 50 comprising causing the second client device to discard whichever of the sub-packet and the copy of the sub-packet arrives later.

52. A method of transmitting data packets securely from a first client device to a second client device through a cloud, the cloud comprising a network of media nodes, the media nodes being hosted on servers, each of the media nodes receiving data packets from other media nodes in the network and transmitting data packets to other media nodes in the network, the first client device being connected to an entry gateway node in the network via a first mile connection and the second client device being connected to an exit gateway node in the network via a last mile connection, the method comprising:

providing one or more signaling servers;

providing a signaling server with an address of each of the first and second client devices;

causing the signaling server to develop a network routing plan, the network routing plan designating at least some of the media nodes in a route of a data packet through the network in a communication from the first client device to the second client device, none of the media nodes having access to the network routing plan; and causing the signaling server to send command and control packets to media nodes designated in the network routing plan, each command and control packet informing a media node designated in the network routing plan where to send an incoming data packet on a next hop in the network routing plan.

53. A method of transmitting data packets securely from a first client device to a second client device through a cloud, the cloud comprising a network of media nodes, the media nodes being hosted on servers, each of the media nodes receiving data packets from other media nodes in the network and transmitting data packets to other media nodes in the network, the first client device being connected to an entry gateway node in the network via a first mile connection and the second client device being connected to an exit gateway node in the network via a last mile connection, the network comprising a first media node, the first media node performing a name server function and a signaling function, the method comprising:

providing the first media node in the network with an address of each of the first and second client devices;

causing the first media node to develop a network routing plan, the network routing plan designating at least some of the media nodes in a route of a data packet through the network in a communication from the first client device to the second client device, none of the media nodes other than the first media node having access to the network routing plan; and causing the first media node to send command and control packets to media nodes designated in the network routing plan, each command and control packet informing a media node designated in the network routing plan where to send an incoming data packet on a next hop in the network routing plan.

54. The method of claim 52 wherein the incoming data packet is identified by a tag and the command and control packet received by a media node informs the media node designated in the network routing plan what tag to apply to the data packet before sending the data packet to a next media node in the network routing plan.

55. The method of claim 52 wherein the signaling server stores a network node list, the network node list comprising a list of media nodes and client devices, the method comprising:

causing the first client device to transmit to the signaling server an identification of the second client device and a request for an address of the second client device; and causing the signaling server to pass the address of second client device to the first client device.

56. The method of claim 55 wherein the first client device transmits to the signaling server the identification of the second client device and the request for an address of the second client device via the entry gateway node.

57. The method of claim 52 wherein the signaling server develops the network routing plan by considering propagation delays between media nodes in the network in order to reduce a transit time of a data packet through the network in the communication from the first client device to the second client device.

58. The method of claim 52 comprising automatically taking a media node offline if loading on the media node in receiving and transmitting data packets falls below a predetermined level.

59. The method of claim 52 wherein the first client device is identified by a network address known to media nodes in the network but not accessible through the internet and by an internet address accessible through the internet, the method comprising causing the first client device to log on to the network by transferring both the network address and the internet address to a signaling server.

60. The method of claim 52 comprising providing a backup signaling server, the function of the backup signaling server being to automatically take over tasks performed by a signaling server if one of the client devices or media nodes is unable to reach the signaling server or if the signaling server fails or is attacked.

61. The method of claim 52 wherein none of the media nodes in the network other than the entry gateway node knows an address of the first client device and none of the media nodes in the network other than the exit gateway node knows an address of the second client device.

62. The method of claim 52 comprising:

providing a name server node, the name server node comprising one or more name servers and storing a network node list, the network node list comprising a list of active media nodes and client devices;

causing the first client device to transmit to the name server node an identification of the second client device and a request for an address of the second client device;

causing the name server node to pass the address of second client device to the first client device; and causing the first client device to transmit the address of the second client device to the signaling server.

63. The method of claim 62 comprising:

causing the name server node to pass to the signaling server a list of media nodes required to develop a network routing plan; and causing the signaling server to develop the network routing plan using the list of media nodes.

64. The method of claim 62 wherein the first client device is identified by a network address known to media nodes in the network but not accessible through the internet and by an internet address accessible through the internet, the method comprising causing the first client device to log on to the network by transferring both the network address and the internet address to a name server.

65. The method of claim 62 comprising providing a backup name server, the function of the backup name server being to automatically take over tasks performed by a name server if one of the client devices or media nodes is unable to reach the name server or if the name server fails or is attacked.

66. The method of claim 53 wherein the incoming data packet is identified by a tag and the command and control packet informs the media node designated in the network routing plan what tag to apply to the data packet before sending the data packet to a next media node in the network routing plan.

67. The method of claim 53 wherein the first media node stores a network node list, the network node list comprising a list of media nodes and client devices, the method comprising:

causing the first client device to transmit to the first media node an identification of the second client device and a request for an address of the second client device; and causing the first media node to pass the address of second client device to the first client device.

68. The method of claim 53 wherein the first media node develops the network routing plan by considering propagation delays between media nodes in the network in order to reduce a transit time of a data packet through the network in the communication from the first client device to the second client device.

69. The method of claim 53 wherein none of the media nodes in the network other than the entry gateway node knows an address of the first client device and none of the media nodes in the network other than the exit gateway node knows an address of the second client device.

70. The method of claim 53 wherein the first media node comprises the entry gateway node.

* * * * *